(12) United States Patent
Duchesneau

(10) Patent No.: US 9,543,787 B2
(45) Date of Patent: Jan. 10, 2017

(54) FRAME (FORCED RECUPERATION, AGGREGATION AND MOVEMENT OF EXERGY)

(71) Applicant: Scrutiny, Inc., Kent, WA (US)

(72) Inventor: David D. Duchesneau, Puyallup, WA (US)

(*) Notice: Subject to any disclaimer, the term of this patent is extended or adjusted under 35 U.S.C. 154(b) by 528 days.

(21) Appl. No.: 13/732,247

(22) Filed: Dec. 31, 2012

(65) Prior Publication Data

US 2014/0183957 A1 Jul. 3, 2014

Related U.S. Application Data

(60) Provisional application No. 61/582,182, filed on Dec. 30, 2011.

(51) Int. Cl.
| | | |
|---|---|---|
| *H02J 9/00* | (2006.01) |
| *F01K 13/00* | (2006.01) |
| *F22B 1/00* | (2006.01) |
| *G06F 1/20* | (2006.01) |
| *H04L 29/06* | (2006.01) |
| *H05K 7/20* | (2006.01) |

(52) U.S. Cl.
CPC .............. *H02J 9/00* (2013.01); *F01K 13/006* (2013.01); *F22B 1/00* (2013.01); *G06F 1/206* (2013.01); *H04L 63/20* (2013.01); *H05K 7/20836* (2013.01); *Y02B 60/1275* (2013.01); *Y10T 307/615* (2015.04)

(58) Field of Classification Search
None
See application file for complete search history.

(56) References Cited

U.S. PATENT DOCUMENTS

| | | | | |
|---|---|---|---|---|
| 7,658,000 B2* | 2/2010 | Sufka | ................... | G01P 15/125 29/594 |
| 8,120,916 B2* | 2/2012 | Schmidt | .................. | G06F 1/20 165/104.33 |
| 2009/0216910 A1* | 8/2009 | Duchesneau | ................ | 709/250 |

FOREIGN PATENT DOCUMENTS

WO    WO2008131446    * 10/2008    .................... 307/151

* cited by examiner

*Primary Examiner* — Jared Fureman
*Assistant Examiner* — Aqeel Bukhari
(74) *Attorney, Agent, or Firm* — Foster Pepper PLLC; Richard T. Black; P. G. Scott Born

(57) ABSTRACT

The present invention is directed to an apparatus for more efficient exergy and power usage in data centers. Denominated FRAME (standing for "Forced Recuperation, Aggregation & Movement of Exergy"), the apparatus is a power production and exergy management system (exergy being energy available to do useful work, as opposed to energy, which can be changed to a form, usually heat, rendering it unavailable). The apparatus integrates generally isothermal operation with phase-change and single-phase liquid cooling having variable operating temperatures and pressures, aided by a dynamically reconfigurable "thermal bus" comprising multi-fluid thermal fluid transport channels, virtual plumbing, and associated support devices. The apparatus minimizes exergy use through efficient operation and by recuperating and aggregating useful exergy that may then be dynamically repurposed to meet energy or power needs that would otherwise have to be met via external means.

15 Claims, 112 Drawing Sheets

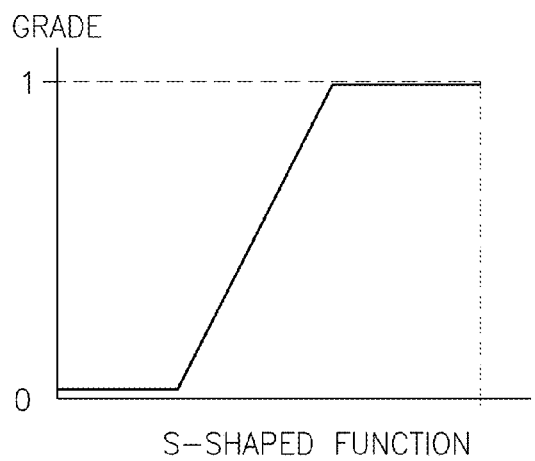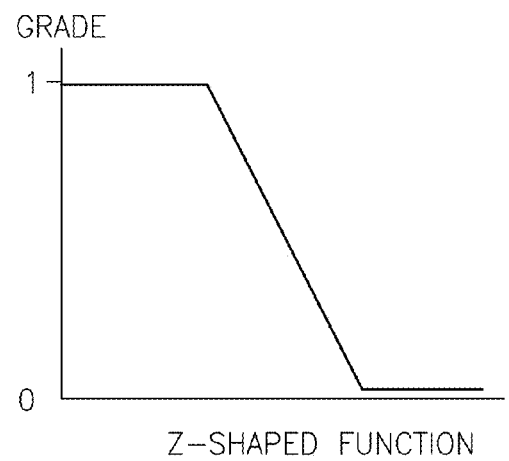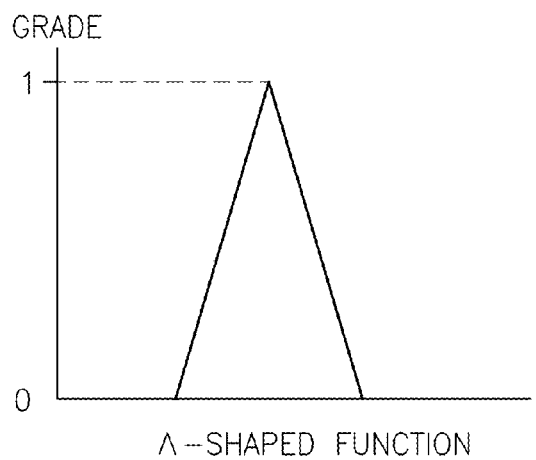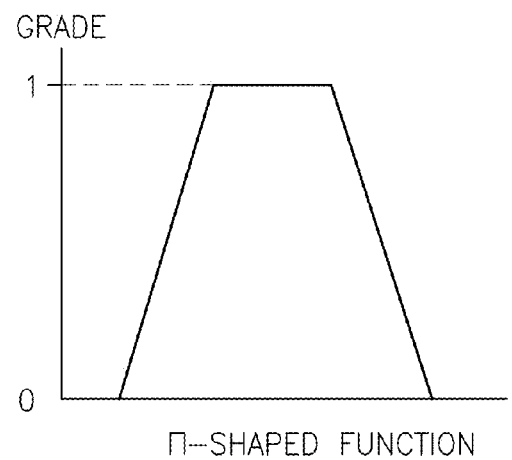
FIG.4

$$2a \begin{cases} 2.1a \begin{cases} S13 & 300\text{--}700°C \text{ LIQUID} \\ S12 & 250\text{--}325°C \text{ LIQUID} \\ S11 & 150\text{--}250°C \text{ LIQUID} \\ S10 & 60\text{--}150°C \text{ LIQUID} \end{cases} & \text{e.g., RUBE}^{TM} \text{ HT1 FLUID} \\ 2.2a \begin{cases} S9 & 40\text{--}130°C \text{ VAPOR} \\ S8 & 30\text{--}40°C \text{ 2-PHASE} \\ S7 & 20\text{--}34°C \text{ LIQUID} \\ S6 & 10\text{--}20°C \text{ LIQUID} \\ S5 & 0\text{--}10°C \text{ LIQUID} \\ S4 & (-120)\text{--}0°C \text{ LIQUID} \end{cases} & \text{e.g., RUBE}^{TM} \text{ LT2 FLUID} \\ 2.3a \begin{cases} S3 & (-83)\text{--}20°C \text{ NG VAPOR} \\ S2 & (-100)\text{--}(-84)°C \text{ LNG} \\ S1 & (-130)\text{--}(-100)°C \text{ LNG} \\ S0 & (-165)\text{--}(-130)°C \text{ LNG} \end{cases} & \text{e.g., RUBE}^{TM} \text{ CF FLUID} \end{cases}$$

$$2b \begin{cases} 2.1b \begin{cases} R13 & 300\text{--}700°C \text{ LIQUID} \\ R12 & 250\text{--}325°C \text{ LIQUID} \\ R11 & 150\text{--}250°C \text{ LIQUID} \\ R10 & 60\text{--}150°C \text{ LIQUID} \end{cases} & \text{e.g., RUBE}^{TM} \text{ HT1 FLUID} \\ 2.2b \begin{cases} R9 & 40\text{--}130°C \text{ VAPOR} \\ R8 & 30\text{--}40°C \text{ 2-PHASE} \\ R7 & 20\text{--}34°C \text{ LIQUID} \\ R6 & 10\text{--}20°C \text{ LIQUID} \\ R5 & 0\text{--}10°C \text{ LIQUID} \\ R4 & (-120)\text{--}0°C \text{ LIQUID} \end{cases} & \text{e.g., RUBE}^{TM} \text{ LT2 FLUID} \\ 2.3b \begin{cases} R3 & (-83)\text{--}20°C \text{ NG VAPOR} \\ R2 & (-100)\text{--}(-84)°C \text{ LNG} \\ R1 & (-130)\text{--}(-100)°C \text{ LNG} \\ R0 & (-165)\text{--}(-130)°C \text{ LNG} \end{cases} & \text{e.g., RUBE}^{TM} \text{ CF FLUID} \end{cases}$$

FIG.14

| TRUTH TABLE ||||
|---|---|---|---|
| A | B | C | CONFIGURATION |
| 0 | 0 | 0 | OFF |
| 0 | 0 | 1 | #1 ONLY (FULL) |
| 0 | 1 | 0 | #1, #2 SERIES |
| 0 | 1 | 1 | #1 FULL, #2 HALF |
| 1 | 0 | 0 | #2 ONLY (FULL) |
| 1 | 0 | 1 | #1, #2 PARALLEL |
| 1 | 1 | 0 | #1 HALF, #2 FULL |
| 1 | 1 | 1 | #1 HALF, #2 TWO-THIRDS |

| TRUTH TABLE (ABBREVIATED) | | | | | | | | | |
|---|---|---|---|---|---|---|---|---|---|
| A | B | C | 1A | 1B | 1C | 2A | 2B | 2C | CONFIGURATION |
| 0 | 0 | 0 | 0 | 0 | 0 | 0 | 0 | 0 | OFF |
| 0 | 0 | 1 | 0 | 0 | 1 | X | X | X | #1.1 ONLY |
| 0 | 0 | 1 | 1 | 0 | 0 | X | X | X | #1.2 ONLY |
| 1 | 0 | 0 | X | X | X | 0 | 0 | 1 | #2.1 ONLY |
| 1 | 0 | 0 | X | X | X | 1 | 0 | 0 | #2.2 ONLY |
| 0 | 0 | 1 | 0 | 1 | 0 | X | X | X | #1.1, #1.2 IN SERIES |
| 0 | 1 | 0 | 0 | 0 | 1 | 0 | 0 | 1 | #1.1, #2.1 IN SERIES |
| 0 | 1 | 0 | 0 | 0 | 1 | 1 | 0 | 0 | #1.1, #2.2 IN SERIES |
| 0 | 1 | 0 | 1 | 0 | 0 | 0 | 0 | 1 | #1.2, #2.1 IN SERIES |
| 0 | 1 | 0 | 1 | 0 | 0 | 1 | 0 | 0 | #1.2, #2.2 IN SERIES |
| 1 | 0 | 0 | X | X | X | 0 | 1 | 0 | #2.1, #2.2 IN SERIES |
| 0 | 1 | 0 | 0 | 1 | 0 | 0 | 0 | 1 | #1.1, #1.2, #2.1 IN SERIES |
| 0 | 1 | 0 | 0 | 1 | 0 | 1 | 0 | 0 | #1.1, #1.2, #2.2 IN SERIES |
| 0 | 1 | 0 | 0 | 0 | 1 | 0 | 1 | 0 | #1.1, #2.1, #2.2 IN SERIES |
| 0 | 1 | 0 | 1 | 0 | 0 | 0 | 1 | 0 | #1.2, #2.1, #2.2 IN SERIES |
| 0 | 1 | 0 | 0 | 1 | 0 | 0 | 1 | 0 | #1.1, #1.2, #2.1, #2.2 SERIES |
| 0 | 0 | 1 | 1 | 0 | 1 | X | X | X | #1.1, #1.2 IN PARALLEL |
| 1 | 0 | 1 | 0 | 0 | 1 | 0 | 0 | 1 | #1.1, #2.1 IN PARALLEL |
| 1 | 0 | 1 | 0 | 0 | 1 | 1 | 0 | 0 | #1.1, #2.2 IN PARALLEL |
| 1 | 0 | 1 | 1 | 0 | 0 | 0 | 0 | 1 | #1.2, #2.1 IN PARALLEL |
| 1 | 0 | 1 | 1 | 0 | 0 | 1 | 0 | 0 | #1.2, #2.2 IN PARALLEL |
| 1 | 0 | 0 | X | X | X | 1 | 0 | 1 | #2.1, #2.2 IN PARALLEL |
| 1 | 0 | 1 | 1 | 0 | 1 | 0 | 0 | 1 | #1.1, #1.2, #2.1 IN PARALLEL |
| 1 | 0 | 1 | 1 | 0 | 1 | 1 | 0 | 0 | #1.1, #1.2, #2.2 IN PARALLEL |
| 1 | 0 | 1 | 0 | 0 | 1 | 1 | 0 | 1 | #1.1, #2.1, #2.2 IN PARALLEL |
| 1 | 0 | 1 | 1 | 0 | 0 | 1 | 0 | 1 | #1.2, #2.1, #2.2 IN PARALLEL |
| 1 | 0 | 1 | 1 | 0 | 1 | 1 | 0 | 1 | #1.1, #1.2, #2.1, #2.2 IN PARALLEL |

FIG.24

| TEMPERATURE CODE | C | L | M | H | S | X |
|---|---|---|---|---|---|---|
| NOTIONAL TEMPERATURE RANGE | CRYOGENIC | LOW | MEDIUM | HIGH | SUPERCRITICAL | EXTREME |
| EXAMPLE LOWER WORKING TEMPERATURE | −165°C | −120°C | −10°C | 50°C | (ABOVE BOILING POINT) | 350°C |
| EXAMPLE UPPER WORKING TEMPERATURE | −80°C | 130°C | 100°C | 315°C | (GREATLY ABOVE BOILING POINT) | 550°C |

FIG.28

| WORKING FLUIDS TYPE CODE | PRIMARY WORKING FLUID ROLE |
|---|---|
| T | HEAT TRANSFER FLUID (e.g., COOLANT OR REFRIGERANT); PHASE BEHAVIOR NOT SPECIFIED |
| T1 | HEAT TRANSFER FLUID, SINGLE-PHASE (e.g., COOLANT) |
| T2 | HEAT TRANSFER FLUID, PHASE-CHNAGE (e.g., REFRIGERANT) |
| F | FUEL (MAY DOUBLE AS TYPE-1 OR TYPE-2 HEAT TRANSFER FLUID NOT SPECIFIED) |
| F1 | FUEL (MAY DOUBLE AS SINGLE-PHASE HEAT TRANSFER FLUID NOT SPECIFIED) |
| F2 | FUEL (MAY DOUBLE AS PHASE-CHANGE HEAT TRANSFER FLUID NOT SPECIFIED) |

FIG.29

| RUBE FLUID | TEMPERATURE CLASS | PRIMARY ROLE | FLUID TYPE | PHASES | EXEMPLARY FLUIDS | REMARKS |
|---|---|---|---|---|---|---|
| CT1 | CRYOGENIC | 1-PHASE TRANSFER | THERMAL OIL | LIQUID | PARATHERM CR | ENGINEERED DIELECTRIC THERMAL FLUID |
| LT1 | LOW | 1-PHASE TRANSFER | GAS | GAS | • NITROGEN ($N_2$)<br>• ARGON ($Ar$) | INERT GASES FOR CONTROLLED ATMOSPHERES, PRESSURIZATION, DRYING |
| MT1 | MEDIUM | 1-PHASE TRANSFER | AQUEOUS | LIQUID | • WATER<br>• WATER+ADDITIVES<br>• ETHYLENE GLYCOL (EG) (no $H_2O$ ADDED) | CHILLED WATER SYSTEMS, GEOTHERMAL LOOPS |
| HT1 | HIGH | 1-PHASE TRANSFER | THERMAL OIL | LIQUID | PARATHERM NF | ENGINEERED DIELECTRIC THERMAL FLUIDS |
| ST1 | SUPERCRITICAL | 1-PHASE TRANSFER | GAS | GAS | SUPERCRITICAL $CO_2$ | GAS ABOVE $T_{CRITICAL} \approx 31.1°C$ |
| XT1 | EXTREME | 1-PHASE TRANSFER | METAL | LIQUID | LBE ALLOY (LEAD-BISMUTH EUTECTIC) | LIQUID ABOVE $T_{MELT} \approx 123.5°C$ |

FIG. 30

| RUBE FLUID | EXEMPLARY FLUIDS | $T_{MELT}$ (°C) | $T_{CRITICAL}$ (°C) (@ PSIA) | $T_{OP-MIN}$ (°C) | $T_{OP-MAX}$ (°C) |
|---|---|---|---|---|---|
| CT1 | PARATHERM CR | -120 | 376 (421 PSI) | -100 | 130 |
| LT1 | NITROGEN ($N_2$) | -210 | -147 (492 PSIA) | -205 | |
| | ARGON (Ar) | -189 | -122 (706 PSIA) | -185 | |
| MT1 | WATER | 0 | 374 (3200 PSIA) | 3 | 350 |
| | WATER+ADDITIVES | VARIES | VARIES | -20 | VARIES |
| | ETHYLENE GLYCOL (EG) (no $H_2O$ ADDED) | -13 | 447 (1189 PSIA) | -10 | 250 |
| HT1 | PARATHERM NF | -43 | 534 (163 PSIA) | 49 | 315 |
| ST1 | SUPERCRITICAL $CO_2$ | -78 | 31 (1070 PSIA) | 32 | 600 |
| XT1 | LBE ALLOY (LEAD-BISMUTH EUTECTIC) | 123.5 | 2138 (TBD PSIA) | 350 | 550 |

FIG.31

| | | | | |
|---|---|---|---|---|
| CT2 | CRYOGENIC | 2-PHASE TRANSFER | REFRIGERANT | ○ NITROGEN ($N_2$)<br>○ CARBON DIOXIDE ($CO_2$) | ○ LIQUID, GAS<br>○ SOLID, GAS | ○ GAS ABOVE $T_{CRITICAL} = -147°C$<br>○ GAS ABOVE $T_{CRITICAL} = 31°C$ |
| LT2 | LOW | 2-PHASE TRANSFER | REFRIGERANT | ○ 1-METHOXY-HEPTAFLUOROPROPANE ($C_3F_7OCH_3$)<br>○ NOVEC 1230 OR C6K ($CF_3CF_2C(O)CF(CF_3)_2$) | LIQUID, GAS | ENGINEERED DIELECTRIC THERMAL FLUIDS |
| MT2 | MEDIUM | 2-PHASE TRANSFER | REFRIGERANT | ○ WATER<br>○ WATER+ADDITIVES | LIQUID, GAS | LOW-PRESSURE EVAPORATIVE APPLICATIONS |
| HT2 | HIGH | 2-PHASE TRANSFER | REFRIGERANT | | | |
| ST2 | SUPERCRITICAL | 2-PHASE TRANSFER | REFRIGERANT | | | |
| XT2 | EXTREME | 2-PHASE TRANSFER | REFRIGERANT | WATER | LIQUID, GAS | CONDENSATE/SUPERHEATED VAPOR (STEAM) |

FIG. 32

|  |  |  |  |  |
|---|---|---|---|---|
| CT2 | NITROGEN (N₂) | −210 | −147 (492 PSIA) | −200 |
| | CARBON DIOXIDE (CO₂) | −78 | 31 (1070 PSIA) | −75 |
| LT2 | 1-METHOXY-HEPTAFLUOROPROPANE (C₃F₇OCH₃) | −122 | 165 (360 PSIA) | 130 |
| | NOVEC 1230 OR C6K (CF₃CF₂C(O)CF(CF₃)₂) | −108 | 169 (270 PSIA) | 160 |
| MT2 | WATER | 0 | 374 (3200 PSIA) | 3 |
| | WATER+ADDITIVES | VARIES | VARIES | −20 |
| HT2 | | | | |
| ST2 | | | | |
| XT2 | WATER | 0 | 374 (3200 PSIA) | 3 |

FIG. 33

| | | | | |
|---|---|---|---|---|
| CF | CRYOGENIC | FUEL | FUEL | LIQUID | LNG (CH$_4$) | LIQUEFIED NATURAL GAS (TYP. 97% METHANE) |
| LF | LOW | FUEL | FUEL | LIQUID | ◦ DME, BioDME<br>◦ LPG (C$_3$H$_8$)<br>◦ ETHANE (C$_3$H$_6$) | ◦ DIMETHYL ETHER (NON-TOXIC)<br>◦ LIQUEFIED PETROLEUM GAS (USA: 90% PROPANE)<br>◦ ISOLATED DURING PRODUCTION OF NG OR LNG |
| MF | MEDIUM | FUEL | FUEL | LIQUID | ◦ METHANOL (MeOH OR CH$_3$OH)<br>◦ ETHANOL | PROMISING FUEL FOR FUEL CELLS, VEHICLES (MeOH CONTAINS MORE H$_2$ THAN LIQUID H$_2$) |
| HF | HIGH | FUEL | FUEL | LIQUID | ◦ B100 (PURE BIODIESEL)<br>◦ DIESEL<br>◦ JP-8 (COMMON JET FUEL)<br>◦ CETANE (C$_{16}$H$_{34}$) | COMMON VEHICLE FUEL AND PRECURSORS |
| SF | SUPERCRITICAL | FUEL | FUEL | GAS | VAPORIZED LNG (CH$_4$) | GAS ABOVE T$_{CRITICAL}$ = −82°C |
| XF | EXTREME | FUEL | FUEL | GAS | UNCOOLED SYNGAS | USEFUL AS FUEL OR PRECURSOR (e.g., TO DME) |

FIG. 34

| | | | | |
|---|---|---|---|---|
| CF | LNG (CH₄) | −182 | −82 (673 PSIA) | −165 | −83 |
| LF | DME, BioDME (USA: 90% PROPANE) | −139 | 127 (779 PSIA) | −130 | 220 |
| | LPG (C₃H₈) | −188 | 97 (616 PSIA) | −180 | TBD |
| | ETHANE (C₃H₆) | −182 | 32 (708 PSIA) | −175 | TBD |
| MF | METHANOL (MeOH OR CH₃OH) | −143 | 239 (1172 PSIA) | −140 | 100 |
| | ETHANOL | −114 | 241 (914 PSIA) | −110 | >240 |
| HF | B100 (PURE BIODIESEL) | 0 | >784 (>174 PSIA) | | |
| | DIESEL | −16 TO 0 | 296 (357 PSIA) | | |
| | JP-8 (COMMON JET FUEL) | > −47 | >385 (>218 PSIA) | | |
| | CETANE (C₁₆H₃₄) | 18 | 321 (29 PSIA) | | |
| SF | VAPORIZED LNG (CH₄) | −182 | −82 (673 PSIA) | −82 | 30 |
| XF | UNCOOLED SYNGAS | | | 1000 | 1400 |

FIG.35

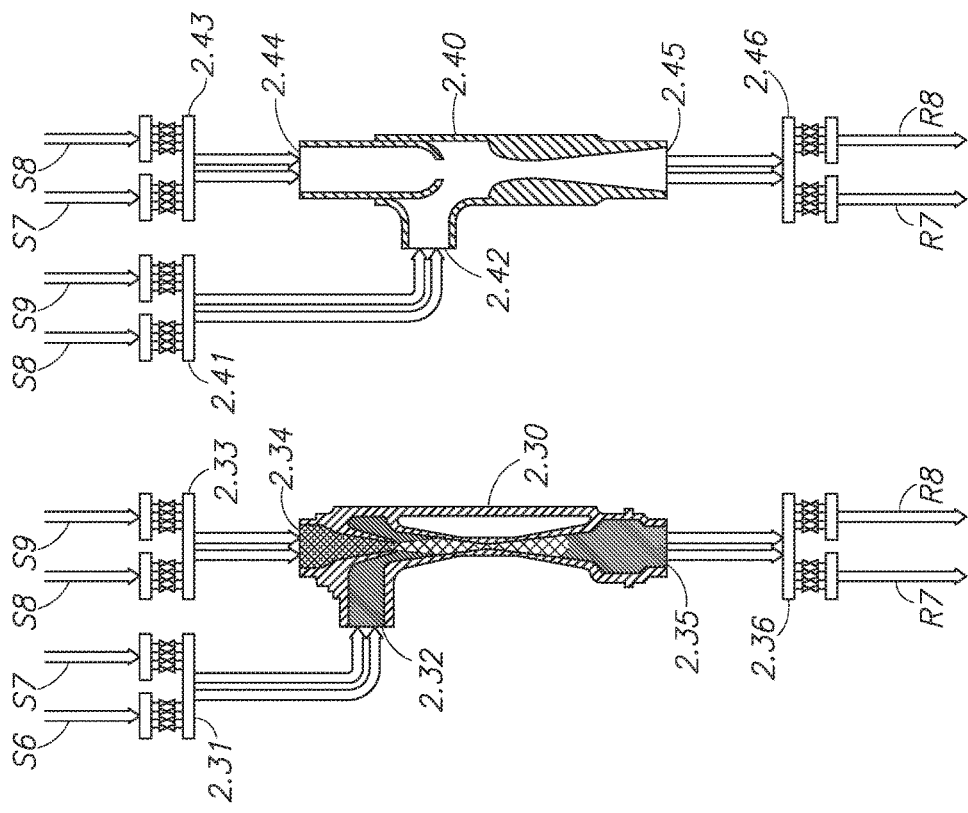

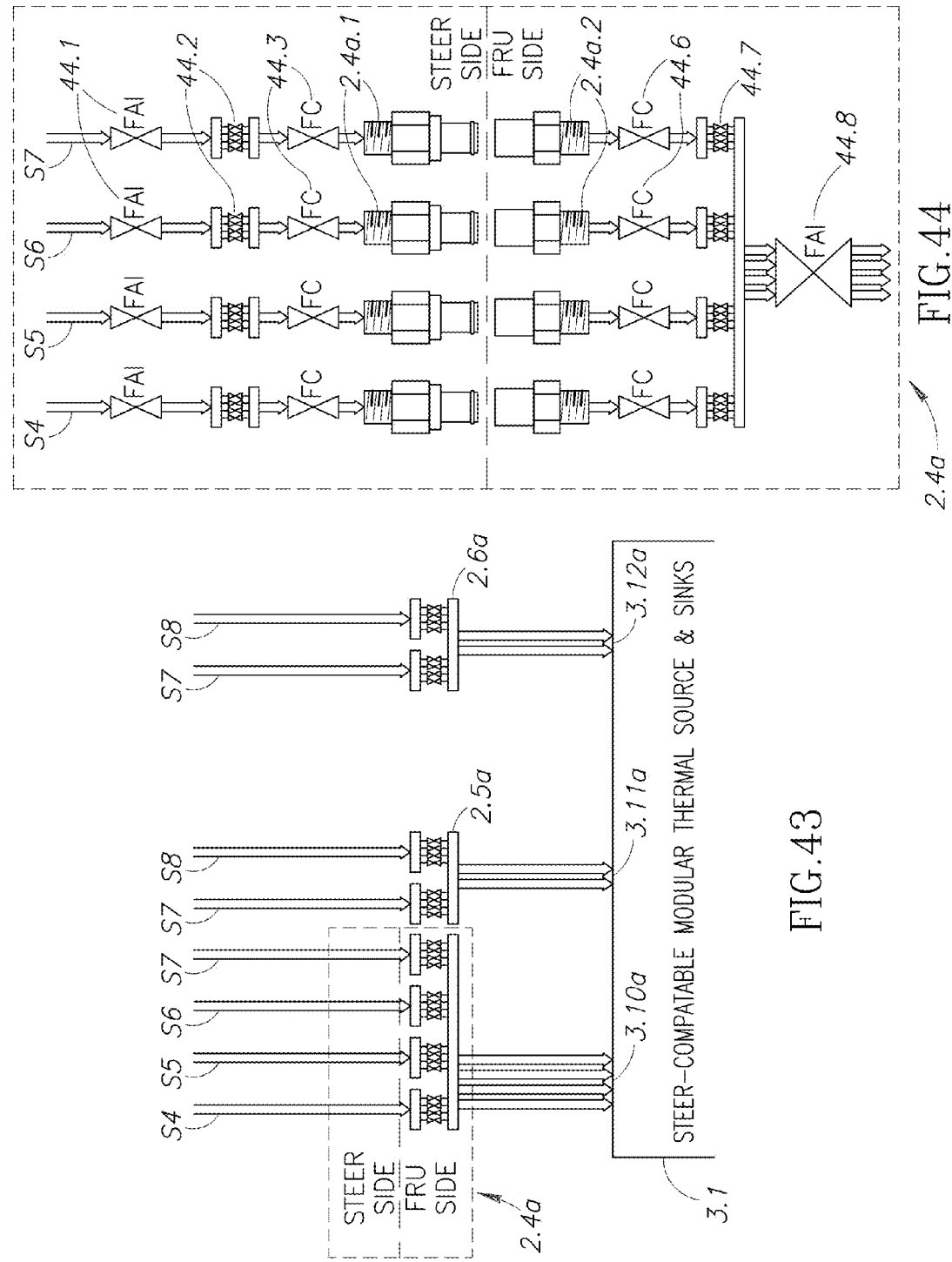

| TCASE MAX(°C) | TCASE MAX(°F) | PROCESSOR "A" | PROCESSOR "B" | PROCESSOR "C" |
|---|---|---|---|---|
| 49 | 120 | 22 | 28 | 13.2 |
| 51 | 123.8 | 28 | 36 | 17 |
| 53 | 127.4 | 34 | 44 | 20 |
| 55 | 131 | 41 | 52 | 24 |
| 57 | 134.6 | 47 | 60 | 28 |
| 59 | 138.2 | 53 | 68 | 32 |
| 61 | 141.8 | 59 | 76 | 36 |
| 63 | 145.4 | 66 | 84 | 40 |
| 65 | 149 | 72 | 92 | 43 |
| 67 | 152.6 | 78 | 95 | 47 |
| 69 | 156.2 | 84 | N/A | 51 |
| 71 | 159.8 | 89 | N/A | 55 |
| SLOPE | | 3.05 | 4.00 | 1.90 |

| $C_3F_7OCH_3$ | | $-30°C < T > 165°C$ |
|---|---|---|
| PRESSURE | | BOILING POINT |
| (BAR) | (TORR) | (°C) |
| 0.045 | 34 | −2.95 |
| 0.05 | 38 | −27.8 |
| 0.075 | 56 | −20.7 |
| 0.1 | 75 | −15.4 |
| 0.15 | 113 | −7.6 |
| 0.2 | 150 | −1.7 |
| 0.25 | 188 | 3.0 |
| 0.3 | 225 | 6.9 |
| 0.35 | 263 | 10.4 |
| 0.4 | 300 | 13.5 |
| 0.45 | 338 | 16.2 |
| 0.5 | 375 | 18.7 |
| 0.55 | 413 | 21.0 |
| 0.6 | 450 | 23.2 |
| 0.65 | 488 | 25.2 |
| 0.7 | 525 | 27.0 |
| 0.75 | 563 | 28.8 |
| 0.8 | 600 | 30.5 |
| 0.85 | 638 | 32.0 |
| 0.9 | 675 | 33.5 |
| 0.95 | 713 | 35.0 |
| 1 | 750 | 36.4 |
| 1.25 | 938 | 42.5 |
| 1.5 | 1125 | 47.7 |
| 1.75 | 1313 | 52.2 |
| 2 | 1500 | 56.3 |
| 3 | 2250 | 69.2 |
| 4 | 3000 | 78.9 |
| 5 | 3750 | 86.9 |
| 6 | 4500 | 93.7 |
| 7 | 5250 | 99.6 |

FIG.57

| HOT SIDE TEMPERATURE (°C) | 27°C | 50°C |
|---|---|---|
| $\Delta T_{MAX}$ (°C, DRY N2): | 56.5°C | 64.0°C |
| $Q_{MAX}$ (WATTS): | 127 | 141 |
| $I_{MAX}$ (A): | 13.9 | 13.8 |
| $V_{MAX}$ (VDC): | 14.1 | 15.7 |
| AC RESISTANCE (OHMS): | 0.83 | -- |

FIG. 72

| ELECTROLYTE | SURFACE ROUGHNESS ($H_{MAX}$) IN MICRONS | | |
|---|---|---|---|
| | LOW | HIGH | MEAN |
| HYDROCHLORIC ACID | 7.5 | 10.0 | 8.5 |
| NITRIC ACID | 2.2 | 3.2 | 2.7 |

| BRAZING ALLOY | COPPER, Cu% | NICKEL, Ni% | TIN Sn% | PHOSPHORUS, P% | MELTING RANGE °C |
|---|---|---|---|---|---|
| OKC 600 | BALANCE | 4.2 | 15.6 | 5.3 | 600-610 |
| VZ 2255 | BALANCE | 7.0 | 9.3 | 6.5 | 600-630 |

FIG.95

| PROPERTIES | UNIT | FIN COPPER SM 0502 (STANDARD TEMPER) | | FIN COPPER SM 0502 (SOFT TEMPER) | | TUBE BRASS SM 2385, C66420 ($CuZn_{14}Fe_{0.9}$) | | HEADER MATERIAL SM 2464, C74400 ($Cu_{64}ZnNi_3$) | |
|---|---|---|---|---|---|---|---|---|---|
| | | BEFORE BRAZING | AFTER BRAZING | BEFORE BRAZING | AFTER BRAZING | BEFORE BRAZING | AFTER BRAZING | BEFORE BRAZING | AFTER BRAZING |
| CONDUCTIVITY | %IACS | 60 | 90 | 60 | 90 | 35 | 30 | | |
| YIELD STRENGTH | $N/mm^2$ | 340 | 260 | 122 | 160 | 340 | 270 | 115 | 105 |
| TENSILE STRENGTH | $N/mm^2$ | 400 | 330 | 264 | 297 | 420 | 400 | 350 | 340 |
| YOUNG'S MODULUS | $N/mm^2$ | | 118,000 | | | | 122,000 | | 103,400 |
| HARDNESS | HV | 120 | 100 | 69 | 77 | 130 | 115 | 70 | 67 |
| ELONGATION AS0 | % | 1 | 10 | 35 | 28 TO 30 | 25 | 30 | 70 | 75 |
| DENSITY | $kg/m^3$ | | 8,900 | | | | 8,750 | | 8,500 |
| MELTING TEMPERATURE | °C | | 1,083 | | | | 1,000 TO 1,025 | | 910 TO 930 |
| SPECIFIC HEAT | kJ/kg-°C | | 0.385 | | | | 0.380 | | 0.377 |
| THERMAL EXPANSION 20 TO 300°C | um/m-°C | | 17.7 | | | | 19 | | 19 |

FIG. 96

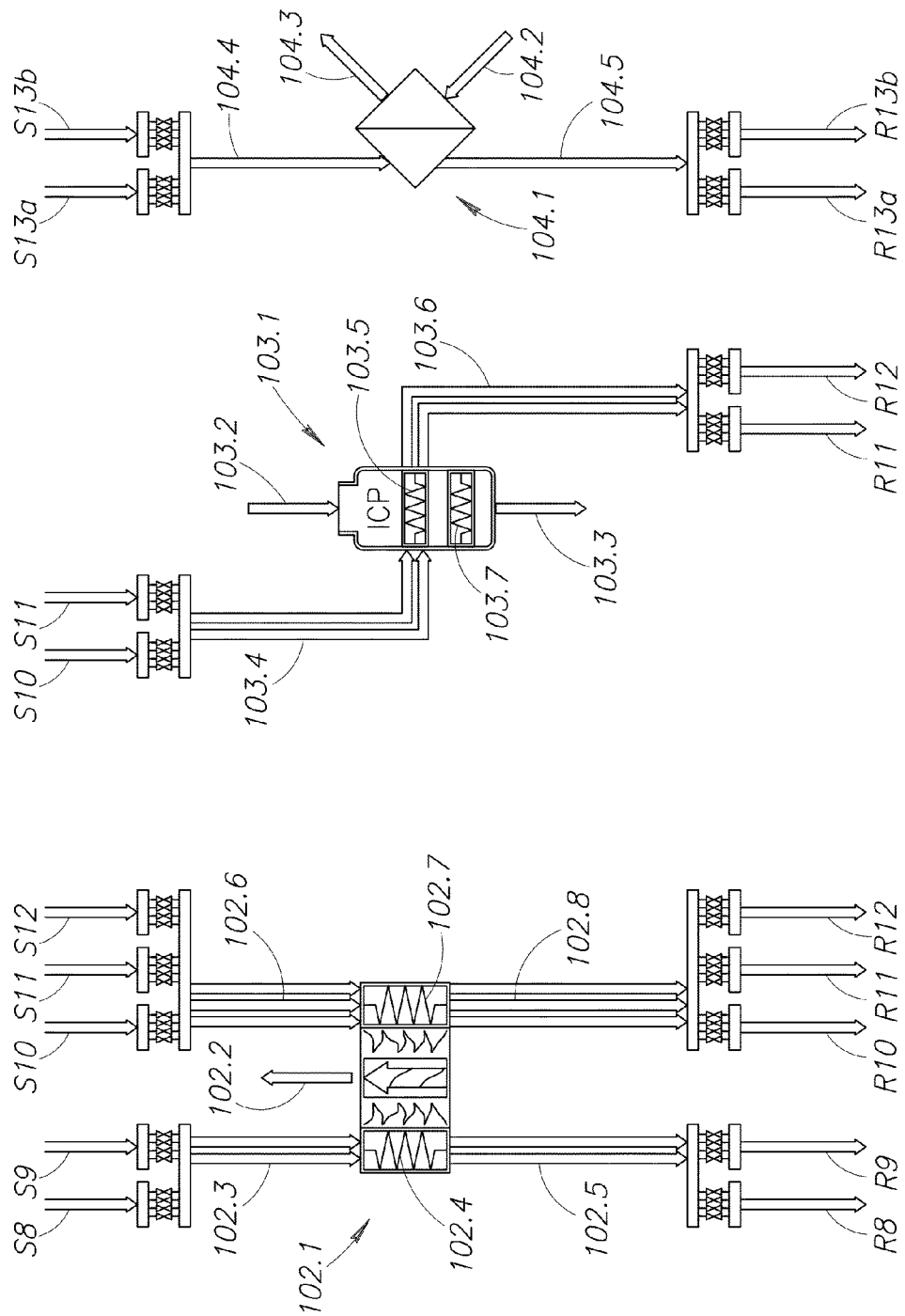

| PRESSURE (BAR) | PRESSURE (TORR) | WATER B.P.(°C) | RUBE™ LT2 B.P.(°C) |
|---|---|---|---|
| 2.0 | 1500 | 120 | 56.3 |
| 1.0 | 750 | 100 | 36.4 |
| 0.5 | 375 | 81 | 18.7 |
| 0.25 | 188 | 64 | 3 |
| 0.2 | 150 | 59 | −1.7 |
| 0.1 | 75 | 44 | −15.4 |
| 0.05 | 38 | 30 | −27.8 |
| 0.01 | 8 | 3 | −52.3 |

FIG.111

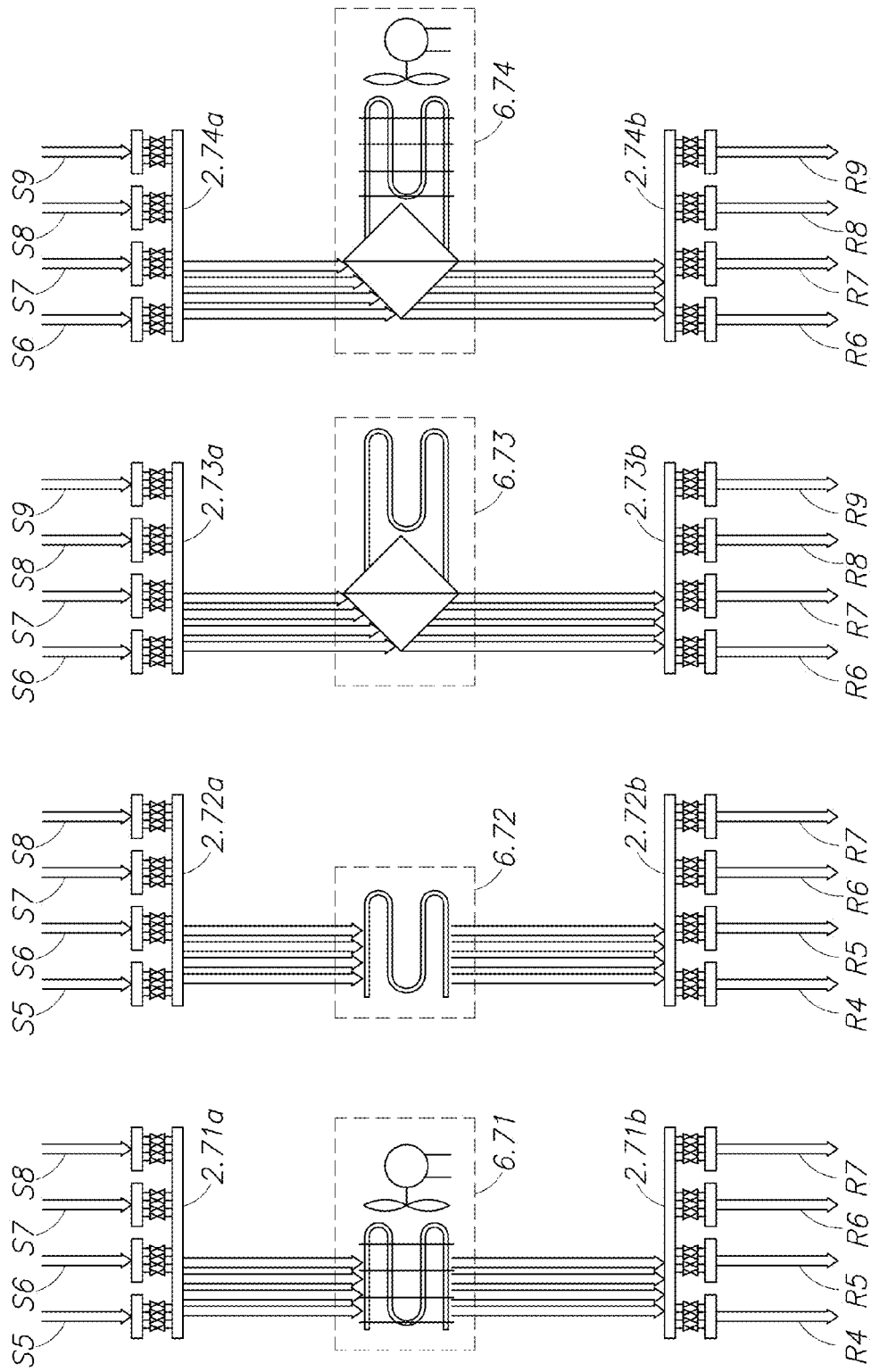

FRAME (FORCED RECUPERATION, AGGREGATION AND MOVEMENT OF EXERGY)

PRIORITY CLAIM

This application claims priority to U.S. Provisional Patent Application No. 61/582,182 filed Dec. 30, 2011. This application also claims priority to and is a continuation in part of: U.S. application Ser. No. 12/370,554 filed Feb. 12, 2009, which is a continuation in part of U.S. application Ser. No. 12/270,793 filed Nov. 13, 2008, which is a continuation in part of U.S. application Ser. No. 12/108,482 filed Apr. 23, 2008, which claims priority to U.S. Provisional Application No. 61/027,975 filed Feb. 12, 2008, and to U.S. Provisional Application No. 61/027,967 filed Feb. 12, 2008 and to U.S. Provisional Application No. 60/913,502 filed Apr. 23, 2007. All of the foregoing applications are hereby incorporated by reference in their entirety as if fully set forth herein.

FIELD OF THE INVENTION

This application relates to the field of power production and exergy management, particularly with respect to the design, construction, and operation of data centers which may be unattended by humans.

BACKGROUND

With the explosion of internet usage, including cloud computing, in recent years, data centers have proliferated all over the world, and have brought with them enormous demand for electricity. A recent report in the New York Times (Sep. 22, 2012) after a year-long investigation quotes a designer of hundreds of data centers: "It's staggering for most people, even people in the industry, to understand the numbers, the sheer size of these systems. A single data center can take more power than a medium-size town."

Industry experts told the Times that all data centers in the world taken together probably consume around 30 billion watts of electricity—approximately the output of 30 nuclear power plants—with data centers in the U.S. consuming one fourth to one third of that. In 2010, U.S. data centers used approximately 76 billion kilowatt-hours, approximately 2 percent of all electricity used in the U.S.

The Times report cites an estimate by EMC and the International Data Corporation "that more than 1.8 trillion gigabytes of digital information were created globally last year." About three quarters of that was created by ordinary consumers doing what now are ordinary things on the internet (such as sending emails with attached videos), with little thought given to how much infrastructure and energy these uses take up.

This explosion of data shows no signs of slowing down, or even leveling off. For just one example, Facebook announced that it had reached one billion active users on Sep. 14, 2012 (http://newsroom.fb.com/download-media/4227). The New York Times report further quotes a former utility executive now consulting for the power and IT industries: "It's just not sustainable. They're going to hit a brick wall."

Industry attempts to deal with exploding power demands by data centers have given rise to the metric Power Usage Efficiency, or PUE. This is a data center's total power consumption (numerator) divided by the power actually running the electronics (denominator). A data center with a PUE of 1.7, for example, which is typical for a recently-built facility, would consume 1.7 megawatts of electricity in order to furnish 1 megawatt to the electronics doing the computing work. The additional 0.7 megawatts, or 700 kilowatts, represents overhead.

A sizeable fraction of this overhead is devoted to cooling the electronics. The typical state of the art is to use air cooling, with ambient air, pre-cooled with air conditioning equipment if need be, blown over and through the servers with electric powered fans. Some work has been done using liquid cooling of key individual electronic components, usually processors, but the remainder is still air-cooled.

For the foregoing reasons, there is a need for systems increasing the efficiency with which data centers use electrical power.

SUMMARY

Accordingly, the present invention is directed to an apparatus that satisfies the need for more efficient power usage in data centers. In this document denominated FRAME (standing for "Forced Recuperation, Aggregation & Movement of Exergy"), the apparatus is a power production and exergy management system that integrates multiple conventionally disparate exergy management functions into a single, integrated system utilizing shared, interoperable facilities for recuperating, aggregating, storing, transporting, and applying exergy at a site. (Exergy is energy available to do useful work, as opposed to energy as referred to in the laws of physics, which, outside the domain of quantum mechanics, is never used up or destroyed but rather can change its form, e.g., to heat, so as to become unavailable.) Because of FRAME's integration and interoperability, the site where it operates may host one or several colocated underground silo-based data centers, which may operate independently or collectively, or FRAME may be incorporated into a conventional facility.

The heart of FRAME is a system of phase-change liquid cooling of heat-dissipating components such as electronics devices, which are immersed in, or otherwise in intimate contact with, the working fluid inside a pressure vessel. In lieu of conventional heat sinks and heat spreaders, surfaces of such components may be augmented with specialized coatings or other treatments that reduce thermal resistance and aid in the transfer of heat to the working fluid. The preferred fluid for data center electronics has a volumetric heat capacity ("VHC," a measure of the fluid's ability to absorb and move heat energy) 1,407 times the VHC of dry air at 0° C. (this factor increases as the air becomes warmer and therefore loses VHC). This fluid is selected in part for the temperature at which it boils, or changes phase, which is close to the ideal temperature for operation of electronics. During phase change, due to the latent heat of vaporization, the VHC effectively increases dramatically, absorbing large quantities of heat without increasing in temperature (isothermal operation). Accordingly, FRAME by design preferentially does its cooling at this point. Then the effective VHC of the working fluid is 153,000 times greater than that of dry air at 0° C.

This isothermal operation works equally well in reverse. When it comes time to reject heat from the working fluid, at its boiling point it readily gives up the heat it acquired to any heat sink with a lower temperature. For example, the earth itself becomes an excellent heat sink. At a depth of just 30 feet underground, the average temperature remains essentially constant year-round, almost anywhere on earth, varying geographically from about 7° C. to 27° C. A ground temperature of 27° C., is sufficient to readily and efficiently accept the heat from working fluid at or above 34° C. the boiling point of the preferred working fluid for data center electronics. FRAME incorporates a novel counterflow ground-coupled heat exchanger that is particularly efficient when heat needs to be rejected into the earth.

In addition, the bulky and expensive internal heat exchangers, thermal grease, and fans or blowers conventionally used to transfer heat from electronics to an internal airstream are not needed. FRAME replaces these with low-cost novel diamond-based coatings, thinner than typical human hair, that minimize thermal resistance and enhance heat transfer principally with their three-dimensional surface topology.

Because the working fluid and immersed electronics are contained in a pressure vessel, its internal pressure, and therefore the phase-change temperature, is under the system's control. If the system determines that a higher boiling point would better contribute to meeting the system-wide goals, it may raise the boiling point by raising the internal pressure, and conversely may lower the boiling point by lowering the pressure.

The most immediately apparent consequence of phase-change liquid cooling for data centers is vastly increased cooling efficiency. In a perfect data center, all power would go to the electronics with no overhead, for a PUE of 1.0. This represents something of an asymptote, which real-world data centers can approach but never hope to reach. But a data center with phase-change liquid cooling will always approach this asymptote much more closely than one with air cooling because of the vastly increased efficiency of the working fluid. A PUE of slightly over 1.0 should be routine, in contrast to a well-designed conventional data center, which might enjoy a PUE of about 1.7 (which is a big improvement over the typical PUE of about 2.5 that may be found in legacy data centers). Note that data centers which achieve a PUE of 1.7 usually do so by taking advantage of the ambient environment, such as the use of air-side economization, rather than through air-conditioning or other refrigeration techniques.

A perhaps less immediately apparent consequence is the strongly isothermal nature of the cooling system, meaning that the internal temperature is very nearly uniform throughout. Hot spots in the electronics, where components that dissipate large amounts of power get much hotter than their surroundings, are minimized or eliminated. Vicious circles where components start to dissipate heat at a faster rate as their temperatures go up become a thing of the past. With air-cooled systems, a manufacturer can specify a server inlet air temperature, but the temperature of a particular component downstream from the inlet is harder to specify with any precision because it will depend on where the component is positioned in the airflow. Normally, with no failures, the temperature of a given air-cooled component can vary from the air inlet temperature typically by 10° C. to 30° C., or more. With the FRAME system, the internal temperatures of even high-power-dissipating processors can be counted on to be within about 3° C. of the working fluid temperature, an order-of-magnitude improvement in temperature stability, which reduces the thermal stresses on the electronics.

Closely related is the strong thermal inertia of the system. Because of the working fluid's high VHC, if a device-local hot spot were to occur somewhere, say because of an outright failure of a component, there would ordinarily be time to address the problem. In contrast, with an air-cooled system, when something goes wrong, the problem can get serious—to the point of threatening meltdown of electronics—fast.

With FRAME's highly efficient cooling, high thermal inertia, and control over the phase change point, fine-grained control over component temperature, and therefore the power efficiency of the electronics in doing computational work, becomes possible.

Although not necessarily widely known in the industry, most processors (e.g., CPUs) work at maximum power efficiency at lower temperatures (very hard to achieve with air cooling) as measured by such metrics as GFLOPS per watt dissipated. Conversely, as the temperature goes up, power efficiency drops. At some temperature point, some processors start giving wrong answers (which may go undetected), and at some other, usually higher, point, thermal throttling occurs as an internal protection mechanism, and the working life of processors obviously shortens (an accepted heuristic is that, as electronics nears the upper end of its specified temperature range, every 10° C. increase reduces its life by half). There is little agreement on exactly where these points are, or whether they are within the working range of cooling systems using only outside air without refrigeration. Moreover, many processors can be overclocked (run at frequencies higher than the manufacture specifies) provided that their temperatures can be kept low enough. For every processor, there is a "sweet spot," the point of maximum power efficiency (where the power efficiency is 100% of the maximum possible under ideal conditions).

FRAME can take advantage of these characteristics by controlling the phase-change point. For routine operations, it can operate at the 34° C. phase change point of the preferred working fluid at atmospheric pressure, and for most chips that represents a significant gain in computational work per unit of exergy. Assuming internal air-cooled server temperature rises on the order of 30° C., and ignoring heat transfer efficiency, an isothermal 34° C. liquid temperature compares to a typical cooling air input temperature of around 0° C. to 10° C. for ambient air cooled data centers. This is well below today's typical server inlet temperatures, and somewhat below what is typically achievable with advanced-but-conventional techniques, even with the latest air-side economization approaches.

With FRAME's phase-change liquid cooling, however, 34° C., is just the starting point. If a job comes in requiring supercomputer-scale computation (or just more computing power than may be otherwise immediately available), the system may reduce the internal pressure, lowering the phase-change point and thus lowering the temperature of the electronics, and then proceed to overclock the processors. Modest built-in overclocking may even occur automatically with some processors, but only if there is sufficient thermal headroom, which FRAME may provide by lowering the temperature of the working fluid, which directly drives processor temperatures downward. If quick load-shedding to another system data center is required, say in response to a spike in demand, the system can similarly overclock to allow substantially more time to get the load-shedding well under way. If saving even more exergy than usual becomes a system priority, say in response to an impending shortage of fuel, the system may conserve fuel by adjusting the internal pressure, thereby moving the phase-change point (and thus the temperature of the electronics) to the point which is most miserly for the available resources. At the same time, the system may be reconfigured to take maximum advantage of "use it or lose it" energy sources (e.g., grid power, which may be more expensive) while conserving or even expanding its stored exergy reserves such as stored fuel, battery capacity, and hot or cold working fluids.

In addition, FRAME may use some of the thermal exergy carried by the working fluid to provide some or all of the motive force required to move itself. It does so in part by means of the RUBE liquid eductor and vapor injector described in the Description section. These devices use no electricity, and in the right conditions can provide sufficient motive force so as to enable electric pumps to be turned down or off. The consequent savings in electricity go to reduce the numerator of the PUE fraction.

FRAME's liquid cooling system is a part of its overall exergy management system. The enabler of this system is a novel "thermal bus," fully described below in the Description section, which moves thermal exergy using various working fluids and various differing conditions of temperature and pressure system-wide, so that individual system components may plug directly into the bus rather than requiring complex point-to-point plumbing to reach other components.

Two examples of the system's capabilities follow as illustrations. More are described in detail in the Description section. In an embodiment of the invention with on-site power generation fueled by natural gas ("NG," and in its liquid state "LNG"), the system combines power cycles to substantially boost locally generated power and cooling capacity by recuperating exergy in waste heat and "cold" that in other systems would be rejected or otherwise lost to the environment. Waste heat is generated, for example, by NG-fueled power generators such as microturbines and stationary fuel cells, and also by the electronics (removed by the phase-change cooling previously described).

Where fuel is stored on-site as LNG, it needs to be vaporized into NG by low-grade heat. Ordinarily this is done by supplying additional exergy, such as from fuel-powered heaters or the utility grid, but FRAME uses low-grade heat originating with the electronics and recuperated with the above-described phase-change liquid cooling system, or from other sources within the system (or even the ambient environment), and circulated in the thermal bus.

The system may also recuperate exergy in the form of high pressure energy (e.g., more than 1000 psi) which is released as LNG fuel is vaporized. The resulting high pressure drives a separate turboalternator which generates additional electrical power and refrigeration while letting down the pressure.

Now at a suitably and substantially lower pressure, the NG may be consumed by power generators such as microturbines and stationary fuel cells to produce the bulk of the locally generated electricity. Such generators are typically only 25% to 50% efficient in their generation of electrical power, meaning that 50% to 75% of the fuel energy is normally lost as relatively high-grade heat (e.g., up to about 330° C.). FRAME recuperates most of the exergy in this heat to drive additional power cycles, such as low-pressure turboalternators which generate additional electricity, significantly boosting local power generation efficiency.

To do so, the turboalternator working fluid needs to reach a temperature of 125° C., whereas the lower-grade waste heat the system may recuperate from electronics typically goes no higher than about 100° C. Even so, FRAME may use it to preheat the turboalternator working fluid to as much as 100° C. essentially for "free," so that much less of the higher-grade heat (e.g., 330° C.) in the system, a relatively scarce resource, is needed to bring the working fluid up the final 25° C. to 125° C.

Note that the PUE metric may have outlived its usefulness when it comes to measuring the exergy use efficiency of a FRAME system. The denominator of the PUE fraction is just power used by the data center's electronics, regardless of how efficiently the electronics are doing the computational work. Ordinarily where the PUE is measured, the concern is with the numerator, the total power consumed by the data center. FRAME also addresses the denominator, by setting the temperature of the electronics at their "sweet spot," where the computational load is most efficiently executed. Moreover, the PUE fraction as usually calculated takes no account of a system's ability to recuperate and repurpose otherwise wasted exergy to generate additional power and cooling essentially for "free."

From the point of view of both the data center owner wanting to minimize operational costs and the host country wanting to minimize exergy usage nationwide, the best embodiment for many if not most sites may be to use on-site power generation to the extent practical, using grid power only as backup, if at all. The reasons are that the combined-cycle equipment used (e.g., NG-powered kilowatt-scale turbines and stationary fuel cells, augmented with turboalternators on both fuel inputs and exhausts) is typically more efficient overall, since it enables conversion of both fuel and exergy recuperated from local generation of power and cooling to electricity and cooling. The use of grid power, on the other hand, incurs long-distance power transmission and distribution losses, and forecloses the opportunity to recuperate exergy from local generation of power and cooling (in most cases the supplying power plant does no similar recuperation). Furthermore, with locally generated power, low-cost natural gas—or even landfill gas or other gas (e.g., flare gas) that would otherwise go to waste—may be used, supplemented by renewable sources, or some combination of the foregoing.

FRAME perhaps less directly achieves further exergy use efficiencies by the data center form factor it enables, which is a vertical steel cylinder, or silo, buried underground, typically 60 to 130 feet deep. For electronics designed with very high compute density and for operation unattended by humans, that is enough space to house the electronics and infrastructure for a very powerful data center, ranking with some of the most powerful conventional data centers now in use, plus the on-site power generation and other infrastructure equipment. This density is only possible with the phase-change liquid cooling. Air cooling could not keep the electronics from thermal shutdown or permanent damage.

Each field-replaceable unit, for example, may typically contain thousands of processors and associated electronics in a volume approximating a two-drawer file cabinet. Since such a unit weighs several thousand pounds, it cannot be easily moved or installed by humans. Therefore, FRAME incorporates relatively simple automated handling of field-replaceable units, which is further enabled by the silo's cylindrical form factor. The silo resembles a highly efficient automated warehouse of very dense data center equipment. It may be viewed as a stack of doughnuts where the doughnuts have been sliced somewhat like a pizza. The space occupied by each slice of doughnut constitutes a location where field-replaceable units can be plugged in (all connectors and couplers are blind-mating and therefore hands-free). The automated handling equipment moves vertically in the doughnut holes and inserts or removes field-replaceable units by rotational and horizontal motion at a particular level. This same stack-of-doughnuts arrangement may be used for vehicles that service a silo—the automated handling equipment simply reaches into the above-ground vehicle to retrieve or insert a field-replaceable unit.

With the silo's design for unattended operation and relatively small form factor, there are many items ordinarily requiring power (which goes into the numerator of the PUE fraction) missing entirely. These include everything for human support (lights, aisles, catwalks, ventilation, bathrooms, water coolers, telephones), space for staging, moving, and accessing rack-mounted gear such as servers and network switches, more space for extensive cabling and plumbing, backup diesel generators, and extra space to expand into in the future, to mention a few.

In addition to leaving out unnecessary components, the silo's cylindrical form factor is itself highly efficient in exergy usage. Primarily it enables any component to reach any other component by a route for which the horizontal distance is at most half the circumference of the inside diameter of the cylinder. Compare that proximity to the huge distances that wiring and plumbing must travel in conventional data centers, inherently consuming more exergy because of the consequent voltage and pressure drops, and associated increases in wire and pipe diameters.

BRIEF DESCRIPTION OF THE DRAWINGS

Preferred and alternative examples of the present invention are described in detail below with reference to the following drawings:

FIG. 4: Examples of Common Symmetric Fuzzy Membership Functions FIG. 14: Example STEER Thermal Bus—Temperature Key

FIG. 24: Example Truth Table for FIG. 23 Nested Virtual Reconfigurators (Modular) (Example 2)

FIG. 28: STEER Working Fluid Temperature Codes FIG. 29: STEER Working Fluid Type Code—Primary Types and Roles FIG. 30: Examples of STEER & Candidate RUBE™ Single-Phase Working Fluids by Type Code FIG. 31: Key Temperatures of Example STEER & Candidate RUBE™ Single-Phase Working Fluids FIG. 32: Examples of STEER & Candidate RUBE™ Two-Phase Working Fluids by Type Code FIG. 33: Key Temperatures of Example STEER & Candidate RUBE™ Two-Phase Working Fluids FIG. 34: Examples of STEER & Candidate RUBE™ Working Fluid Fuels by Type Code FIG. 35: Key Temperatures ° of Example STEER & Candidate RUBE™ Working Fluid Fuels FIG. 37: STEER—RUBE™ Thermal Pumps Example (Vapor Injector, Thermal Eductor)

FIG. 38: Thermal Pumps—Identifying Common Parts of the Vapor Injector and Thermal Eductor of FIG. 37.

FIG. 43: STEER Thermal Bus—Blind-Mate Interfaces—Conceptual FRU-Side Mixing/Splitting Example FIG. 44: STEER Thermal Bus—Blind-Mate Interfaces—Physical FRU-Side Mixing/Splitting Example

FIG. 57: RUBE™ LT2 Fluid Candidate $C_3F_7OCH_3$—Pressure vs. Boiling Point

FIG. 72: Exemplary TEC Device Parameters

FIG. 95: Nominal Composition of CuproBraze® Filler Metals FIG. 96: Nominal Physical Properties of Selected CuproBraze® Copper Materials

FIG. 102: PRIME—Conventional High-Heat Sources for Thermal Power

FIG. 103: PRIME—Inductively Coupled Plasma (ICP) as a High Heat Source for Thermal Power FIG. 104: PRIME—Thermal Power Take-Off (PTO)

FIG. 111: Refrigerant Comparison—Water vs. a RUBE™ LT2 Fluid ($C_3F_7OCH_3$)

FIG. 114: STORE—Thermal Interfaces to Ambient—Air Cooled Direct HX with RUBE™ LT2 Fluid FIG. 115: STORE—Thermal Interfaces to Ambient—Ground-Coupled Direct HX with RUBE™ LT2 Fluid FIG. 116: STORE—Thermal Interfaces to Ambient—Ground-Coupled Indirect HX with Antifreeze Solution FIG. 117: STORE—Thermal Interfaces to Ambient—Air Cooled Indirect HX with Antifreeze Solution

DESCRIPTION

Equivalents

Figure 1:
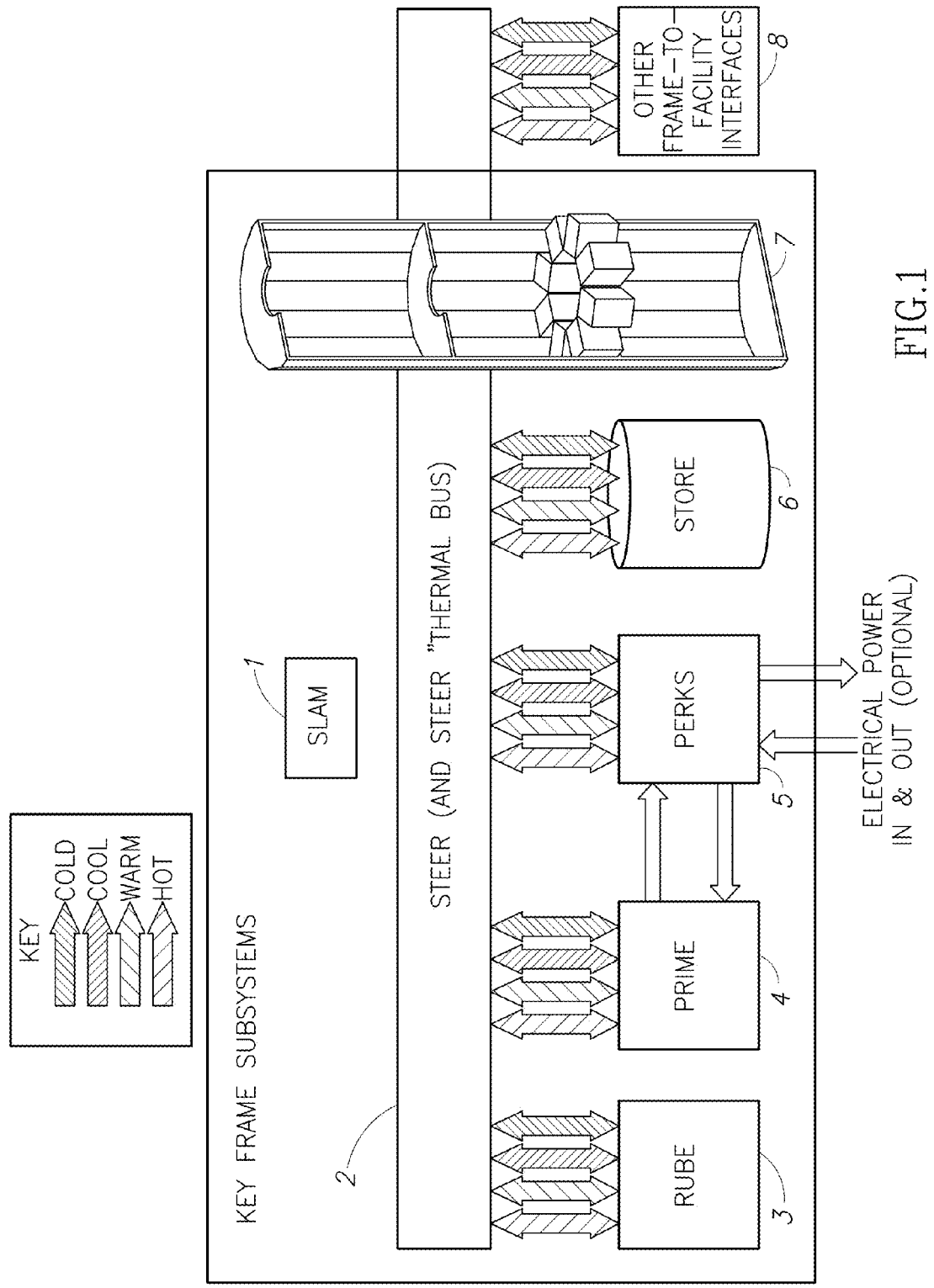
FIG. 1: Overview of Key FRAME Subsystems and Exergy-Based Relationships

In the Summary above and in the Description and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. Except when specified as an otherwise unqualified absolute limit, a numerical value should be construed in light of the number of reported significant digits and by applying ordinary rounding techniques. As used herein, the term "about" means plus or minus 10% of the numerical value of the number with which it is being used. Therefore, about 50% means in the range of 45%-55%.

Although the invention has been described in connection with certain exemplary embodiments, it will be evident to those of ordinary skill in the art that many alternatives, modifications, and variations may be made to the disclosed invention in a manner consistent with the detailed description provided below. Also, it will be apparent to those of ordinary skill in the art that certain aspects of the various disclosed example embodiments could be used in combination with aspects of any of the other disclosed embodiments or their alternatives to produce additional, but not herein explicitly described, embodiments incorporating the claimed invention but more closely adapted for an intended use or performance requirements. Accordingly, it is intended that all such alternatives, modifications and variations that fall within the spirit of the invention are encompassed within the scope of the appended claims.

Document Conventions

For convenience, the first digit of the numbered major sections and subsections corresponds to the numbered subsystems depicted in FIG. 1.

General Notes about Figures and Prior-Art Figure "Insets" within this Document

Note that the drawings or figures are presented expressly for the purpose of illustration and description only and are not intended as a definition of the limits of the invention.

Figure 64:
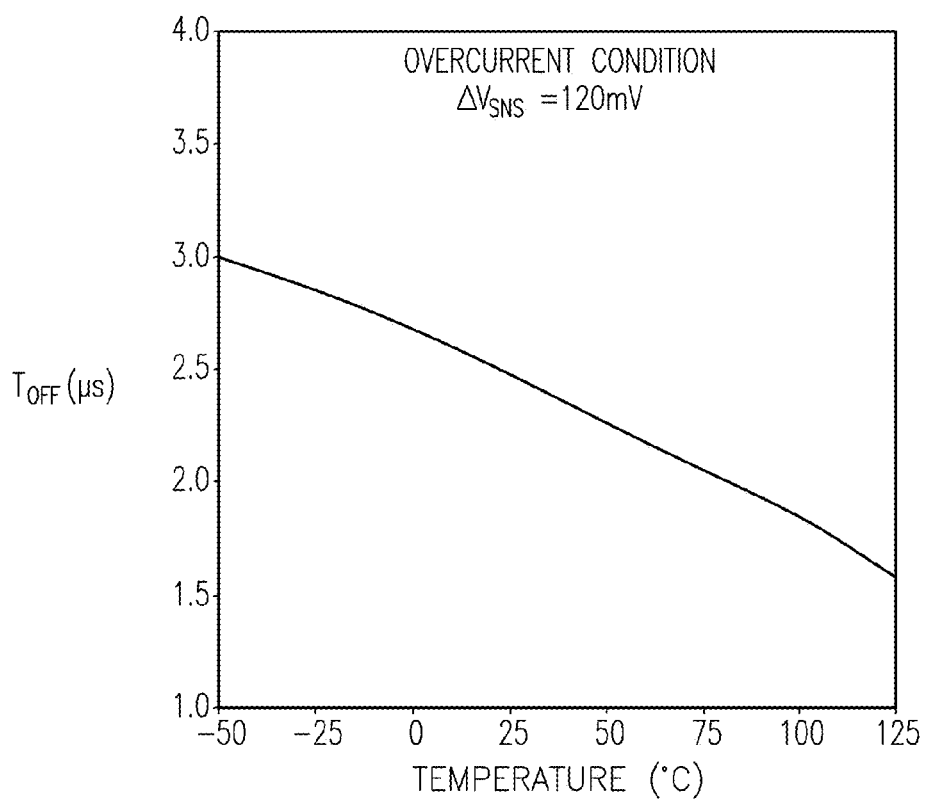
FIG. 64: Example Temperature-Based Turn-Off Time Curves for Inrush Limiter

In this document, figures which are excerpted from prior art are labeled with "FIG. x" in all-uppercase letters, where "x" is replaced with the figure number as it appears in the source document from which it was excerpted, which will be cited inline (e.g., "FIG. 64 from US20090216910").

Prior-art figures may occur alone or as an inset to another figure, but will also always be associated with a caption which is numbered relative to this document (and which appears in the BRIEF DESCRIPTION OF THE DRAWINGS). In the text, such captions are prefixed with a "Fig. x" label having only an initial uppercase "F" followed by "ig" in lowercase, in order to simplify case-sensitive searches within this document. The actual figure number will be substituted for "x" (e.g., "FIG. 37"). In the drawings, the figure number will fully capitalized (e.g., "FIG. 21A").

To simplify searching, no spaces are used in either of the figure label types "FIG. x" and "Fig. x".

Figure 5:
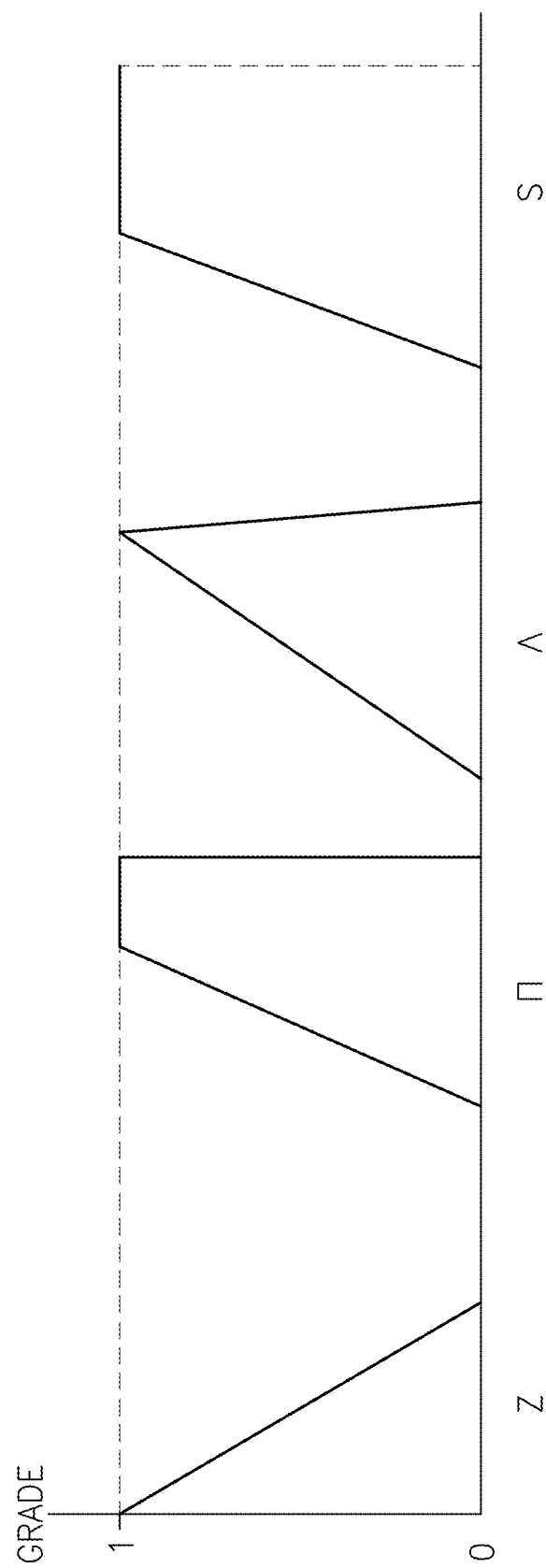
FIG. 5: Example Asymmetric Fuzzy Membership Functions
Figure 6:
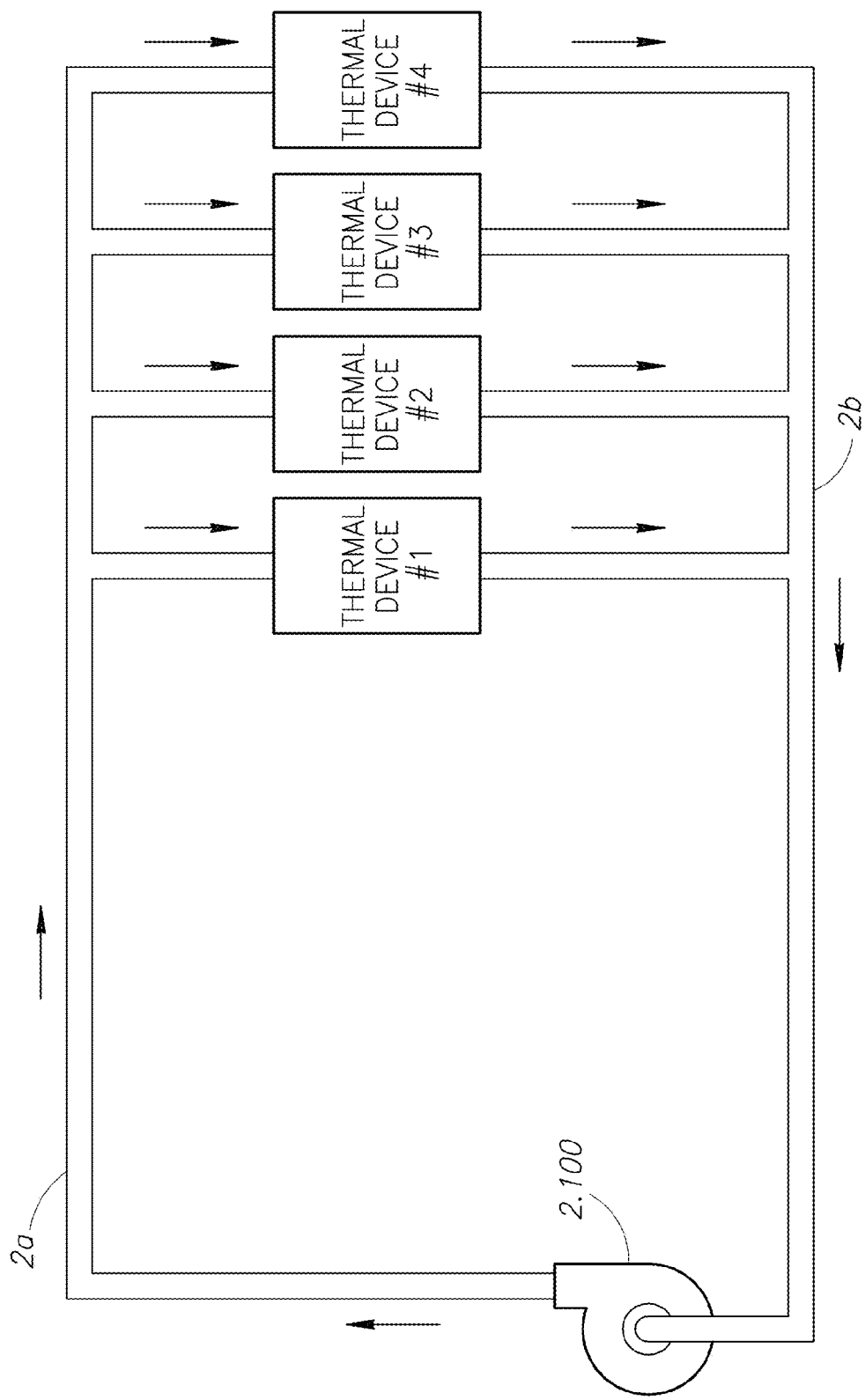
FIG. 6: One-Way Mechanical Piping—One Pump, Four Thermal Devices
Figure 7:
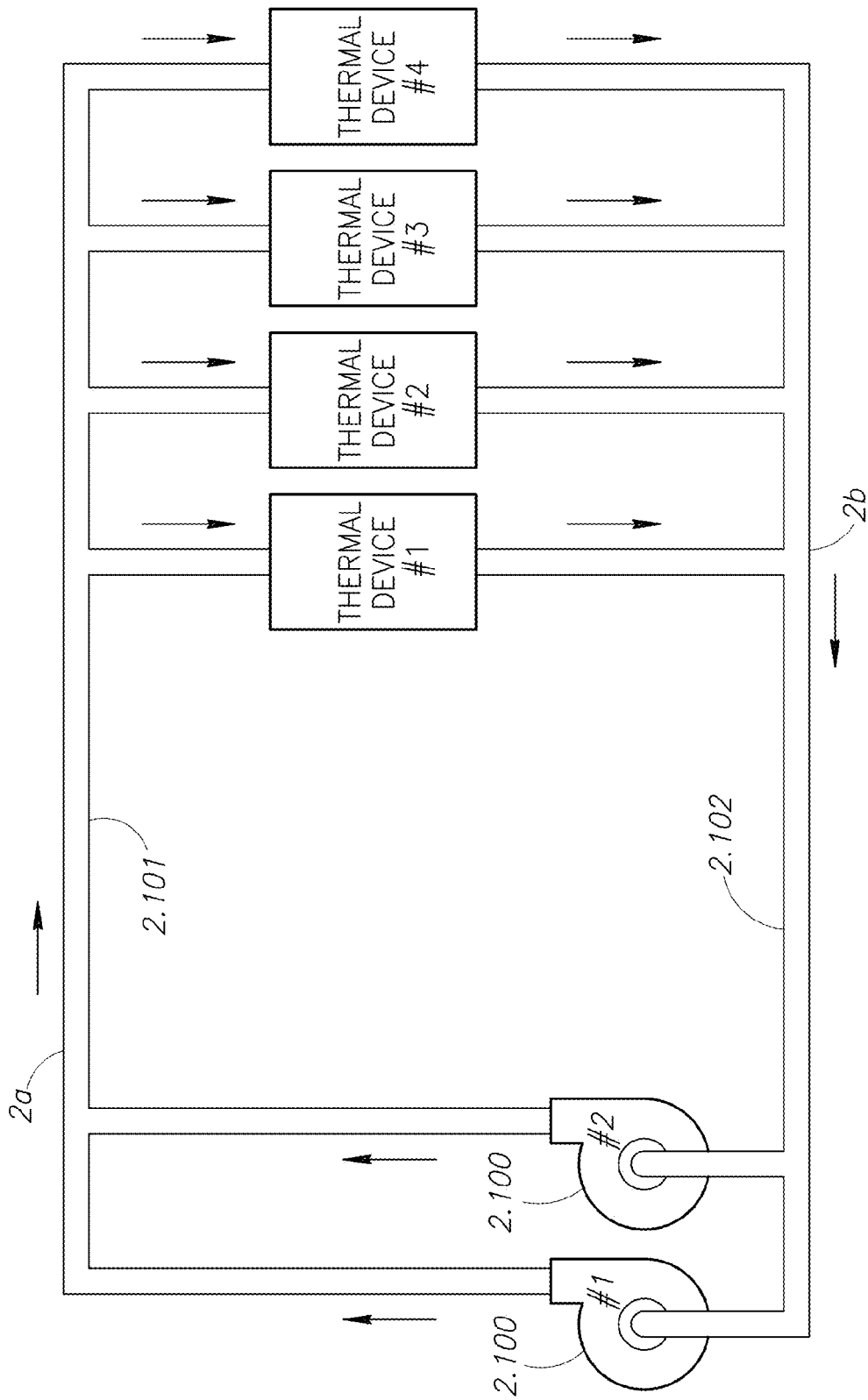
FIG. 7: One-Way Mechanical Piping—Two Pumps, Four Thermal Devices
Figure 8:
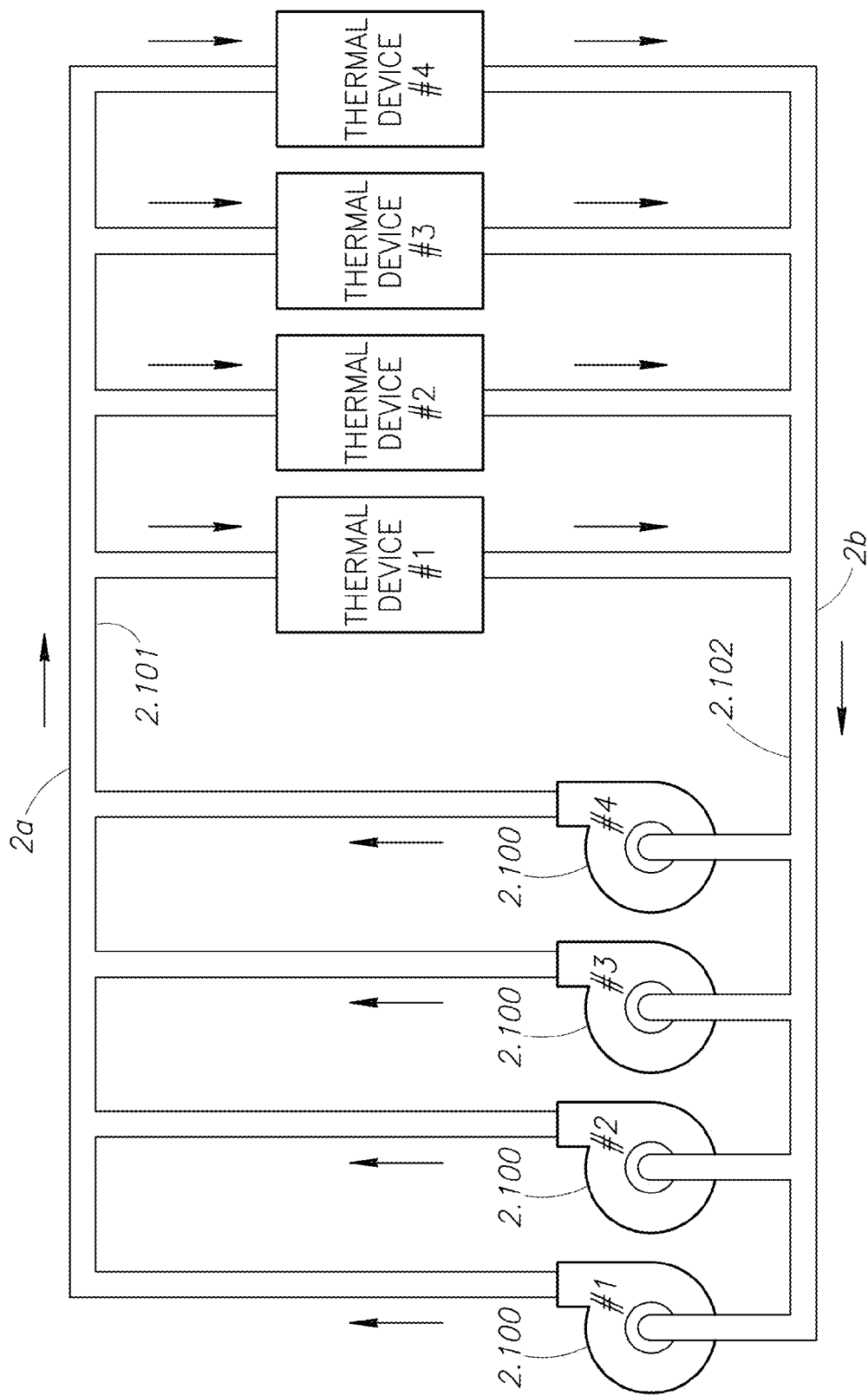
FIG. 8: One-Way Mechanical Piping—Four Pumps, Four Thermal Devices
Figure 9:
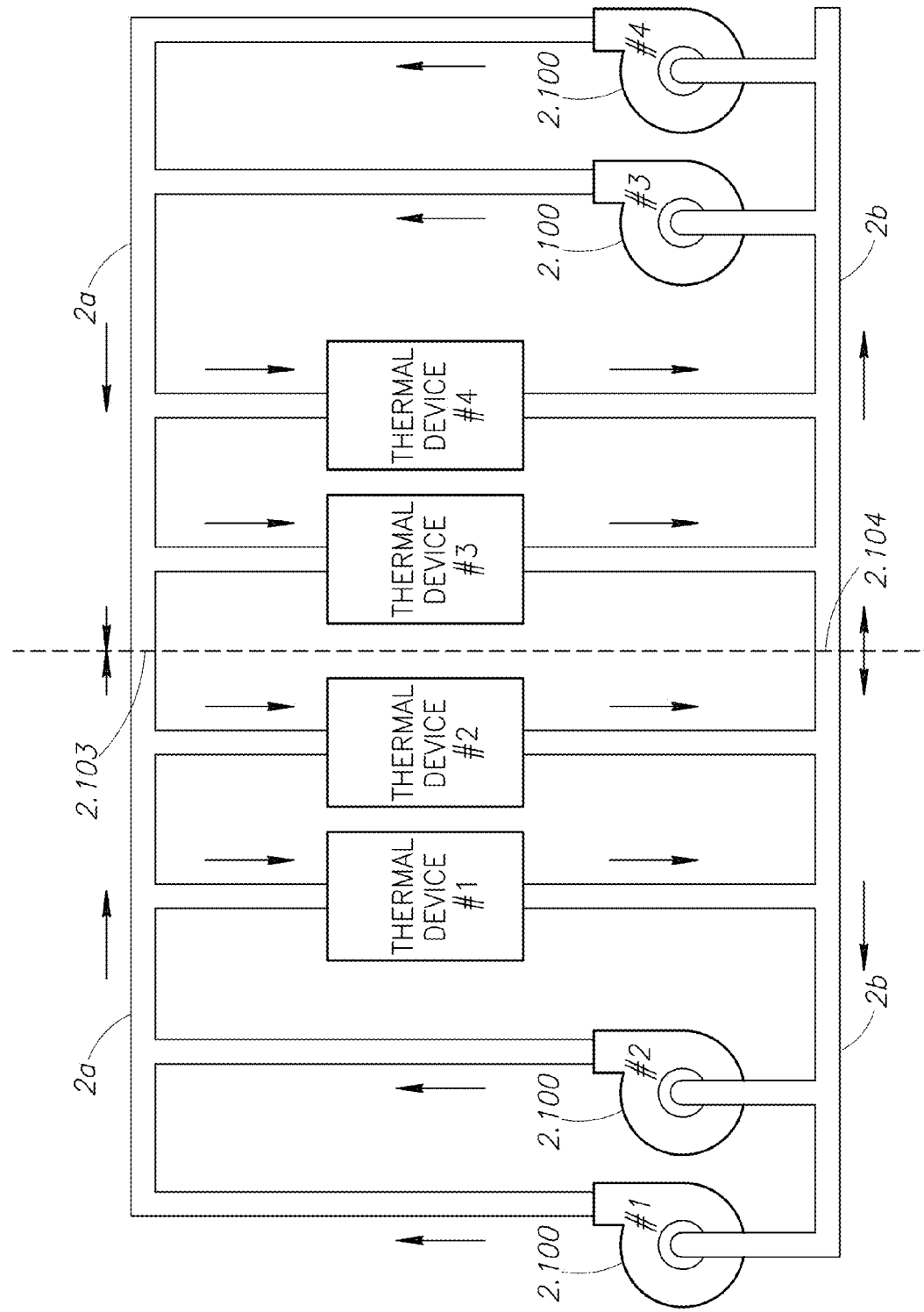
FIG. 9: Two-Way Mechanical Piping—Four Pumps (2×2), Four Thermal Devices
Figure 10:
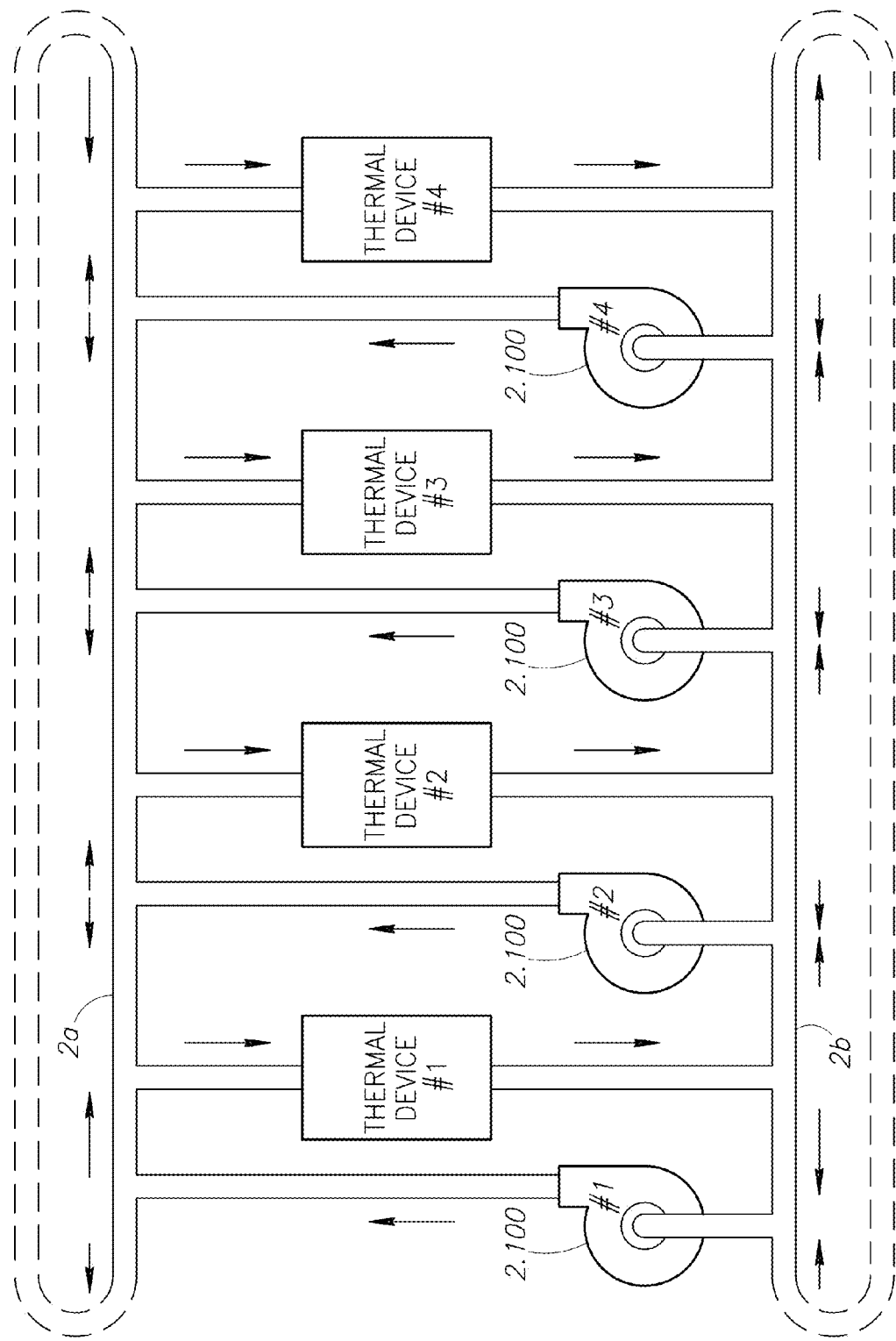
FIG. 10: STEER Dynamically Balanced Bidirectional Flow Example—Four Pumps (4×1), Four Thermal Devices

To simplify searching, when multiple figures are referred to in the text, all references are to individual figure numbers (e.g., "FIG. 8, FIG. 9, and FIG. 10" rather than something similar to "FIGS. 5-7" or "FIGS. 5, 6, and 7").

Callout numbers ("callouts") in figures originating in this document, when referring to a system, subsystem, or component of the present invention, will begin with a single digit corresponding to the relevant subsystem to which the called-out item may belong (or with which it may be closely associated), where the digit-subsystem associations are as depicted in FIG. 1. The single digit may be followed by a decimal point and other digits, and/or an optional lowercase letter. No decimal point may appear if the called-out item is a subsystem or apparatus notionally depicted in FIG. 1

Callouts in all prior art figures excerpted from US20090216910, "Computing Infrastructure" (which is incorporated herein by this reference), appear here with the same three-digit numbers (e.g., "231") as in US20090216910, and they have no decimal point. Callouts in figures originating in this document will not overlap with the three-digit numbering of US20090216910, and will either have fewer digits, or a decimal point, or a lowercase letter, or some combination thereof (e.g., "1", "2a", "2.1", "2.1b", "3.12a", "2.45", and so on).

Callouts in figures originating in this document, when referred to in the text, will appear in square brackets (e.g., [1], [2a], [2.1], [2.1b], [3.12a], [2.45], and so on).

Textual descriptions involving conceptual flows among called-out components in a figure may optionally describe the paths of flow by enumerating a list of callouts of the key components involved. For example, the text associated with FIG. 54 describes a cooling circuit as having the path [2.4a] [3.10a], [3.13], [3.10b], [2.4b].

General Notes about Truth Tables within this Document

To simplify searching and improve readability, tables are generally provided as figures, or contained within figures.

In truth tables having binary control variables or logical control inputs (for example, such as the tables in FIG. 20 and FIG. 24), an input value of "0" means "off, "1" means "on,", and "X,", if present, means "don't care" (i.e., the input value does not affect the corresponding outputs).

General Notes about STEER Thermal Bus Diagram Decluttering within this Document

Details may be commensurate with the depicted level of abstraction.

Figure 13:
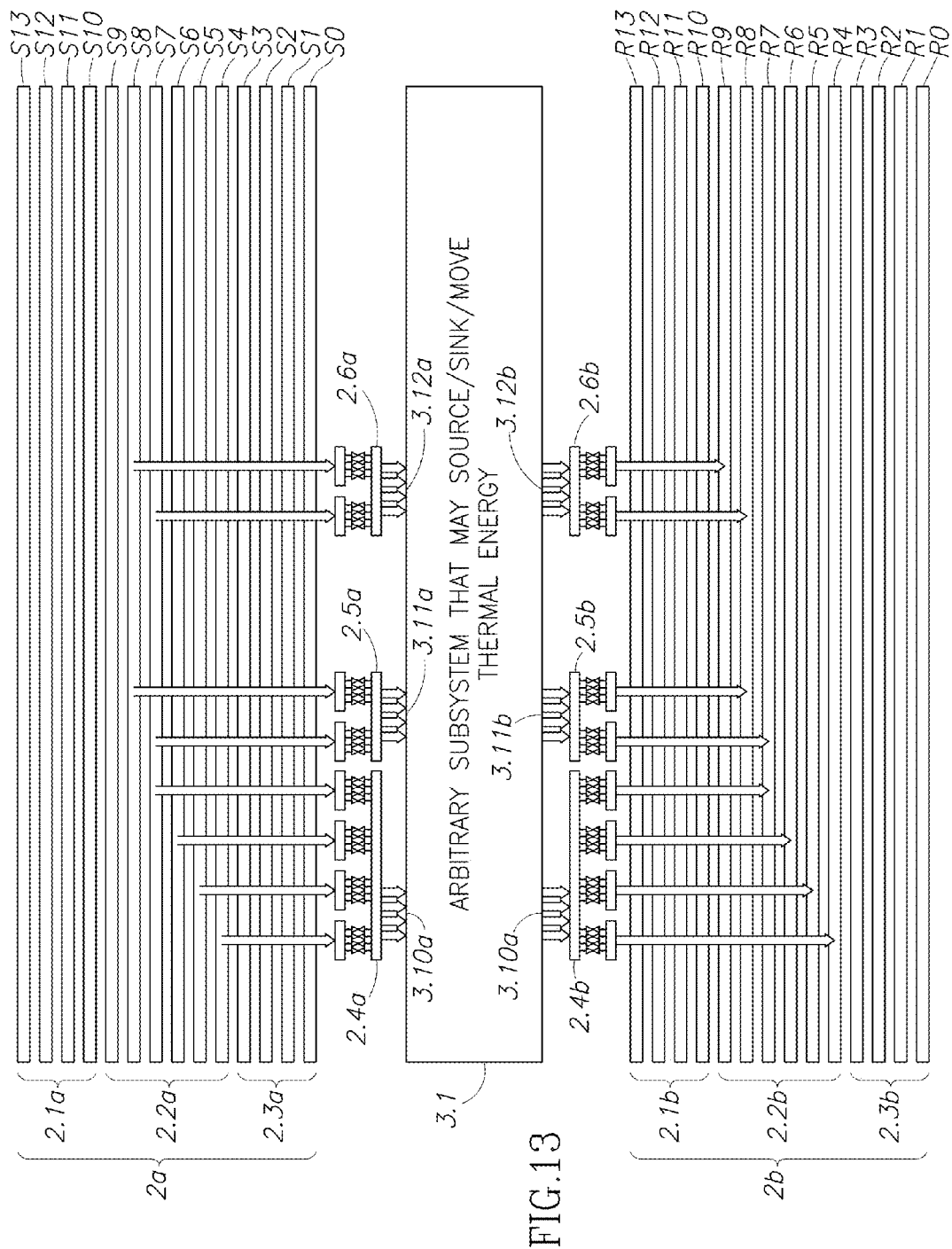
FIG. 13: STEER Thermal Bus Concept

An example STEER Thermal Bus is depicted in FIG. 13 as having three different working fluids and a total of fourteen different temperature ranges. Rather than repeating depictions similar to FIG. 13 throughout this document, a simplified scheme is used to minimize the clutter in drawings which relate to the STEER Thermal Bus. In particular, whenever a flow is to originate from a STEER Thermal Bus supply line, it is labeled with the letter "S" (supply) and a number from 0 to 13 denoting a particular channel. Similarly, whenever a flow is to terminate at a STEER Thermal Bus return line, it is labeled with the letter "R" (return) and a number from 0 to 13 denoting a particular channel. FIG. 14 provides a key to the example working fluids and temperature ranges assigned to each channel for illustrative purposes (i.e., to illustrate the connectivity and functionality of various exemplary apparatus that may be connected to the STEER Thermal Bus). Note that it is normal for the set of labeled supply and return temperatures to differ for a heat-producing or cold-producing component, although overlapping ranges is quite typical.

Digital mixer and splitter valves (see FIG. 17 and FIG. 18, respectively, and associated discussion) appear frequently throughout the drawings to indicate the range of supply temperatures which may be dynamically mixed to meet the needs of the downstream device, or the range of return temperatures to which the flow from an upstream device may be allocated and diverted ("split"). In most diagrams, the same number of flows on one side of a mixer or splitter (i.e., on the "manifold" side of either type of device) are also shown on the opposite side. However, when multiple flows are on the downstream side of a mixer or the upstream side of a splitter, they represent the logical flows of working fluid at the various temperatures involved, not multiple physical flows (there is only one physical flow on the downstream side of a mixer or the upstream side of a splitter, and some drawings may depict only the physical flow).

Sensors (e.g., temperature, pressure), couplers, and check valves are generally not shown and may be assumed to be ubiquitous.

Some pumps may not be shown, and, if shown, may be optional. In general, subsystems, components, field-replaceable units (FRUs) interfacing to the STEER Thermal Bus may be viewed as connecting to a well-matched fluid supply and return capability having temperature, pressure, and flow-rates that may vary dynamically as needed, under system control, in order to properly support connected devices. For example, a device that may be passive with respect to flow (like a heat exchanger) may be depicted as being connected to the STEER Thermal Bus without the need to also depict a pump to induce flow. In a preferred embodiment, the system control capability may include advance recognition of the devices attempting to connect or presented for connection at the physical interfaces, which may enable prevention or blocking of undesirable connection attempts, or conversely, dynamic modification of operating parameters to enhance the accommodation of particular connections. In a preferred embodiment, every physical FRU interface may be subject to such control, but none of this detail is generally depicted in this document.

Pumps may optionally be depicted, such as when pumping functions of the STEER Thermal Bus are described, or when the location of a pump within a virtual plumbing circuit may be relevant, or when a pumping function may be external to the STEER Thermal Bus.

Some pumps depicted via a general industry-accepted pump symbol may actually be thermal pumps.

Although many conventional pumps are not reversible, such pumps may be augmented with a dynamic flow-reversal device (see FIG. 25, FIG. 26, FIG. 27, and associated discussion) that may reverse the flow as viewed by a plumbing circuit, even while the pump or pumps supplying the motive force may continue to operate in the forward direction.

By convention, in this document, pumps may generally be shown (and their presence may be assumed) as having ingress via return channels, and egress to supply channels. Thus, pumps may generally provide suction on return channels and pressure on supply channels. Note, however, that pump-induced flows on a particular set of channels may be dynamically reversed (see previous paragraph), so that normally induced suction and pressure may be dynamically reversed.

All electric pumps may be variable-speed, so no special variable-speed symbol may appear.

Heat exchangers may be generally be of the counterflow type when flow direction is relevant, in order to maximize heat transfer efficiency, even if depicted otherwise (i.e., as non-counterflow) for convenience (in order to simply the visual routing of depicted plumbing circuits). Although heat-exchanger type (such as counterflow vs. concurrent flow) may be commonly viewed as being related to fluid-to-fluid heat exchange, it may also be relevant, for example, in ground-coupled heat exchangers involving a thermal gradient (such as when ground temperature varies with depth).

"High Availability" (HA) configuration details (e.g., triple-modular-redundant, or TMR) known in the art may be generally omitted. Details may be supplied for new applications of HA practices in specific sections.

Generally, multiplicity of components and/or subsystems may not be depicted.

Approximate temperature ranges, if shown, may be for conceptualization purposes, as they may vary with specific working fluid selections, and, for any specific working fluid, may also vary under system control.

Splitting/combining devices may not be limited to a 4-valve configuration as frequently depicted for convenience (for example, any number of valves may be paralleled).

Splitting/combining devices may not be limited to 2, 3, or 4 groups of paralleled valves per shared inlet or outlet manifold, although they may be frequently depicted that way for decluttering purposes (to simplify visualization).

Any number of systems, subsystems, components, or devices depicted as interfacing to the STEER Thermal Bus may be packaged together into a single field-replaceable unit (FRU) having a defined set of capabilities, which may generally include the capability for blind-mate insertion and removal (e.g., to enable automated handling by robotics). Accordingly, FRU working fluid interfaces, as contemplated in this document, may typically comprise any number of blind-mate couplers (i.e., two-piece couplers, with each half capable of opening fully when mated, and closing fully when unmated), as well as one or more computer-controlled flow-control valves on each side of the interface (i.e., between each blind-mate "half-coupler" and the rest of the equipment on the half-coupler's side of aforesaid interface. In general, none of these details may be depicted.

In lieu of depicting the blind-mate coupling details mentioned in the previous bullet point, each such interface may be depicted as one "port" of a single set of "mixer" valves (for fluid ingress from a STEER Thermal Bus supply source) or as one port of a single set of "splitter" valves (for fluid egress to a STEER Thermal Bus return). For example, the devices called out as [2.4a], [2.5a], and [2.6a] in FIG. 13 depict mixer valves for working fluid ingress, with mixer [2.4a] having 4 ports, mixer [2.5a] having 2 ports, and mixer [2.6a] having 2 ports. The example of FIG. 13 also depicts splitter valves for working fluid egress, which are called out as [2.4b], [2.5b], and [2.6b], with 4, 2, and 2 egress ports, respectively. In FIG. 13, for example, but also generally, the various mixers and splitters are each depicted as connecting to a called-out inlet or outlet of a subsystem or component which may be the subject of descriptive text. In the example of FIG. 13, the "arbitrary subsystem" [3.1] may be just such a subsystem, wherein ingress mixers [2.4a], [2.5a], and [2.6a] may transfer fluid from the STEER Thermal Bus supply [2.2a] to arbitrary subsystem [3.1] inlets [3.10a], [3.11a], and [3.12a], respectively, and egress splitters [2.4b], [2.5b], and [2.6b] may transfer fluid from arbitrary subsystem [3.1] outlets [3.10b], [3.11b], and [3.12b], respectively, to the STEER Thermal Bus return [2.2b]. In a setup like that depicted in FIG. 13, the physical enclosure of arbitrary subsystem [3.1] (which may be generally representative of any other similarly interfaced subsystems) may incorporate and enclose the depicted mixers [2.4a], [2.5a], and [2.6a] and splitters [2.4b], [2.5b], and [2.6b] within its boundaries, along with any other flow-control valves or other devices positioned between the aforesaid mixers/splitters and the enclosure's corresponding blind-mate half-couplers.

Figure 42:
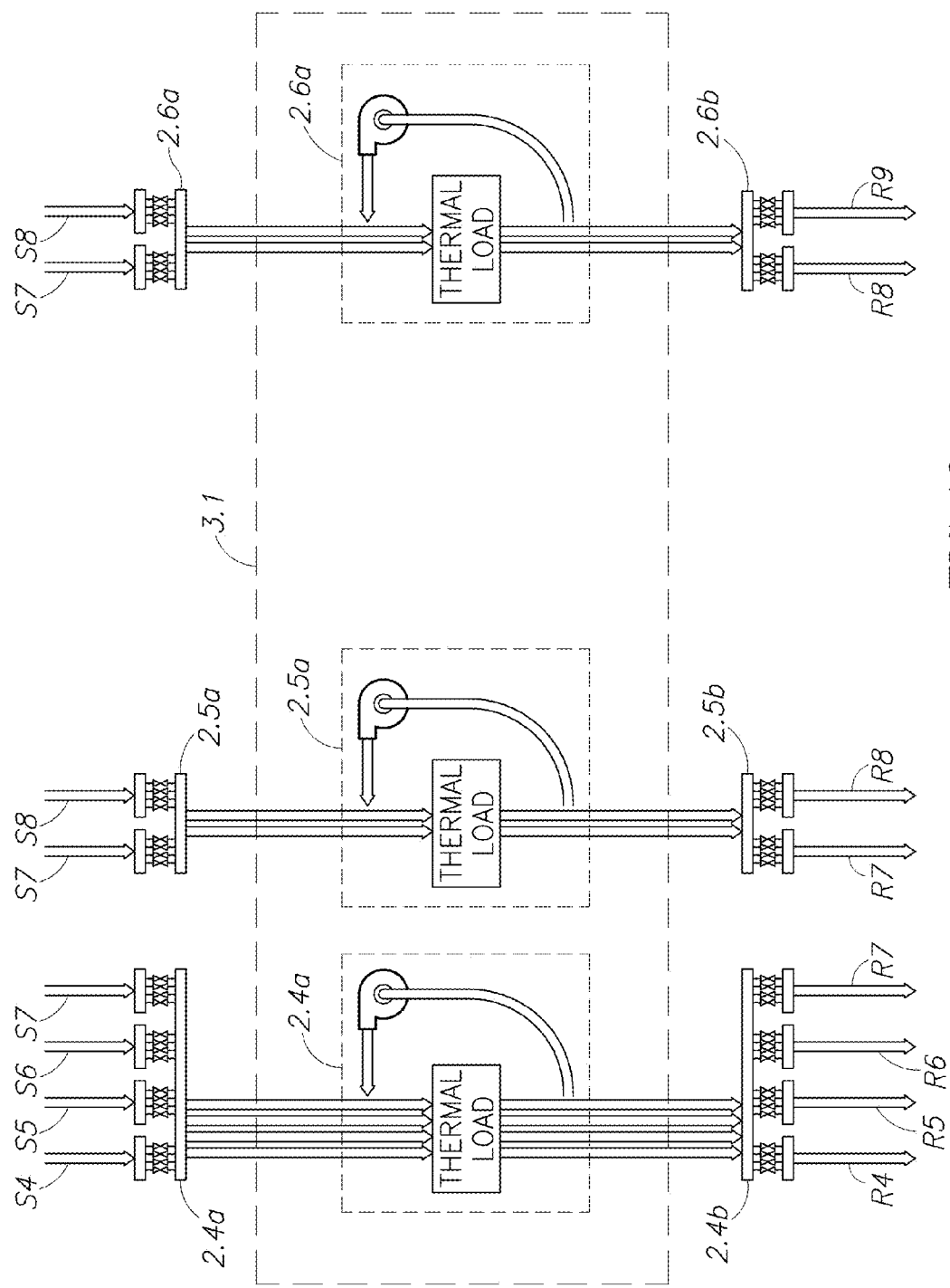
FIG. 42: STEER Thermal Bus—STEER-Compatible Modular Thermal Sources & Sinks

In accordance with the discussion in the previous bullet point, the box or other visual boundary delineating arbitrary subsystem [3.1] in FIG. 13, and also in FIG. 42 (and likewise in other figures may depict such delineation differently, or not at all), which is depicted as delineating arbitrary subsystem [3.1] (along with its called-out working fluid inlets and outlets) from the STEER Thermal Bus supply [2a] and return [2b] (along with its called-out mixers and splitters), represents a functional delineation rather than a physical delineation. Depicting a physical delineation of working fluid interfaces would require a diagram incorporating such a delineation to "zoom in" so as to depict a bisection of blind-mate coupler halves (i.e., between half-couplers such as [2.4a.1] and [2.4a.2]) at their corresponding physical working fluid interfaces, as depicted in the examples of FIG. 43, FIG. 44, FIG. 45, FIG. 46, and FIG. 47, which is a level of detail (i.e., "clutter") that, for most diagrams in this document, is neither appropriate nor relevant.

Overview

FRAME is an acronym for Forced Recuperation, Aggregation & Movement of Exergy. FRAME refers to certain versions of the present invention, a power production and exergy management system whose key subsystems (listed below) are notionally depicted in FIG. 1, and whose goals may include reducing operational costs while enhancing or enabling survivability of the system and its dependents:

SLAM (Security, Location, Authentication, & Maintenance)

STEER (Selectable Temperature-Economizing Exergy Reserves)

RUBE (Recuperative Use of Boiling Energy)

PRIME (Primary, Reactor or Internal Multifueled Engine)

PERKS (Peak Exergy Reserve, Kilowatt-Scale)

STORE (Storage & Transport of Operating & Reserve Exergy)

SUREFIRE (Survivable Unmanned Renewably Energized Facility & Independently Reconfigurable Environment)

Exergy may be safely asserted to be "the only rational basis for evaluating: fuels and resources, process, device, and system efficiencies, dissipations and their costs, and the value and cost of systems outputs." [Gaggioli, R. A., ed., 1980. *Thermodynamics: Second Law Analysis*, ACS Symposium Series no. 122, American Chemical Society, Washington, D.C.]

Exergy is synonymous with "available energy." Like energy, exergy may be measured in joules. As a combination property of a system and its environment, exergy depends on the state of a system as well as the state of its environment (i.e., its surroundings), and the extent to which they are in equilibrium (after they reach equilibrium, the exergy is zero).

NOTE: The concepts of energy and exergy may be explained simply:

Energy is motion or ability to produce motion, whereas Exergy is work or ability to produce work. The first and second laws of thermodynamics reflect this. Note that, respectively: (1) Energy is always conserved in a process and (2) Exergy is always conserved in a reversible process, but is always consumed in an irreversible process.

According to the Second Law of Thermodynamics, the entropy of an isolated system that is not in equilibrium will tend to increase over time, approaching a maximum value at equilibrium. The creation of entropy is closely related to the destruction of exergy, i.e., the "available energy" of a system. Whereas energy can be neither created nor destroyed in a process (it may only be transformed or converted from one form to another), exergy accounts for the irreversibility of a process due to increase in entropy, and thus is destroyed in proportion to the entropy increase of a system together with its surroundings. In essence, a system's exergy is consumed or destroyed as the system approaches equilibrium.

FRAME may significantly reduce the energy inputs required to operate a heat-dissipating system (such as a computing system) by minimizing the large losses of exergy commonly associated with such systems. This reduction in exergy losses may occur by various means such as, for example, through the use of isothermal processes, the aggressive reduction of heat-producing electrical loads, and the recuperation, storage, and application of exergy in general. FRAME may gain further advantage by place-shifting or time-shifting the generation or consumption of power to the most effective and/or efficient places or time-frames. In a preferred embodiment, modular thermal sources and sinks may be dynamically controlled, and may also dynamically inserted and removed from FRAME's STEER apparatus [2], and such insertion or removal may be physical or virtual, under the dynamic control of the SLAM apparatus [1].

Overview of Key FRAME Subsystems

The key FRAME subsystems notionally depicted in FIG. 1 are briefly described below. Each also has its own numbered major section, with the SLAM, STEER, RUBE, PRIME, PERKS, STORE, and SUREFIRE subsystems being numbered from 1 to 7, respectively, as depicted in FIG. 1. A last major section, numbered 8, briefly addresses some external interfaces to other facilities.

Brief Overview of SLAM Subsystem

SLAM is an acronym for Security, Location, Authentication, & Maintenance. SLAM [1] refers to a fault-tolerant, high-availability, automated control subsystem of certain versions of the present invention, as depicted notionally in FIG. 1, which may also interact with, and participate as a subsystem of, other systems outside the scope of this description. The SLAM apparatus [1] may monitor, track, and control a node's physical environment (signal flows not depicted here). Within the context of the FRAME subsystem, SLAM may provide SCADA (supervisory control and data acquisition), safety, security, and maintenance functions, particularly with respect to establishing and maintaining the proper system thermal parameters, in order to optimize the use of exergy resources, particularly with respect to the generation of power, dissipation of heat, and recuperation of thermal exergy.

Brief Overview of STEER Subsystem

STEER is an acronym for Selectable Temperature-Economizing Exergy Reserves. STEER [2] refers to an apparatus or subsystem of certain versions of the present invention, as depicted notionally in FIG. 1, and again later in FIG. 13. The STEER apparatus [2] is conceptually a reconfigurable thermal exergy "bus" or "virtual plumbing system" that may enable dynamic near-optimal matching of exergy sources and sinks, and may comprise a separate supply and return for each of potentially several and diverse working fluids, wherein each supply (and each return) for a particular working fluid may further comprise a multiplicity of individual channels, each of which may carry or store working fluid within an independently controllable temperature range and pressure range.

In a preferred embodiment, the STEER apparatus [2] may further comprise reservoirs, buffers, manifolds, pumps, pipes, sensors, valves (usually computer-controlled, e.g., via SLAM apparatus [1], as depicted in FIG. 1), and other components that may collectively work somewhat like a crossbar switch, in order to dynamically control the flow of one or more potentially diverse working fluids between various sources and sinks of thermal exergy, mixing working fluids of different temperatures or pressures as needed to meet specific goals for the availability of the working fluids at specified temperature ranges.

In the depiction of FIG. 1, four broad (and non-specific) temperature ranges are depicted notionally, without reference to specific working fluids, operating temperature ranges, or operating pressure ranges, but in principle as many working fluids and operating ranges as needed may be used. The STEER apparatus [2] ingress/egress arrows and temperature ranges depicted in FIG. 1 are notional and may not fully represent a workable system (enabling details to follow).

Brief Overview of RUBE Subsystem

RUBE is an acronym for Recuperative Use of Boiling Energy. RUBE [3] refers to an apparatus or subsystem of certain versions of the present invention, as depicted notionally in FIG. 1. In a preferred embodiment, a RUBE apparatus [3] may comprise multiple subsystems or sub-subsystems that may function independently, may be co-located and may directly connect to each other—or not. For example, in the context of a computing infrastructure, data center servers, network switches, or other electronics loads (or any other power-consuming or heat-dissipating components) may be viewed as RUBE sub-subsystems, especially if in direct thermal communication with the RUBE apparatus [3]. In a preferred embodiment, such computing infrastructure may be co-designed with RUBE technology, so that it may actually become part of an integrated RUBE apparatus [3] and enjoy optimized thermal operation.

An optimally advantageous aspect of the RUBE apparatus [3] may be its ability to facilitate or otherwise contribute to heat exchange oriented at, around, or through the boiling point of one or more working fluids, which may enable taking advantage of the relatively large thermal exergy transfer associated with phase-change behavior. In a preferred embodiment, various RUBE apparatus [3] may comprise co-designed subsystems and components such as working fluid mixers, separators, heat exchangers, heaters, subcoolers, and chillers that may be specifically oriented to enabling, facilitating, controlling, and optimizing local or remote exergy transfer associated with the phase-change behavior of selected working fluids, in conjunction with available exergy sources and sinks.

An instructive example of this involves an electronics cooling load comprising processors or CPUs of a computing capability such as may be found in a data center. The inventors have observed that by keeping the processors or CPUs under test sufficiently cool, the processors actually dissipated significantly less power, with power reductions of up to 75%. Such reductions may thereby directly improve the total functionality delivered per unit of energy input (such as GFLOPS per watt, which is a measure of power efficiency), as was first discussed in US20090216910. Of course, improvements in CPU power efficiency in a data center may very well complement any other efficiencies achieved. Also, TCO (total cost of ownership) may be significantly reduced as a direct consequence of increased component life and reliability, which also may be directly tied to reduced operating temperature (a well-known heuristic is that a 10° C. increase in operating temperature may reduce electronic component life by half, whereas similar decreases in operating temperature may double it).

In a preferred embodiment, the RUBE apparatus [3] may serve a key role of recuperating low-grade or medium-grade heat (such as from electronics loads) and transferring it via the STEER apparatus [2] to other subsystems, such as PERKS apparatus [5] or STORE apparatus [6]. In a preferred embodiment, for example, the PERKS apparatus [5] may use the exergy in the low-grade heat recuperated by the RUBE apparatus [3] to aid in the generation of additional electrical power and cooling. For another example, the STORE apparatus [6] may use the exergy in the low-grade heat recuperated by the RUBE apparatus [3] to aid in the generation of additional heat-driven cooling (e.g., via adsorption or absorption chilling processes). In a preferred embodiment, the additional electrical and cooling power may be subsequently used by electronics loads like those from which RUBE apparatus [3] may have originally recuperated the exergy.

Brief Overview of PRIME Subsystem

PRIME is an acronym for Primary Reactor or Internal Multifueled Engine. PRIME [4] refers to a subsystem of certain versions of the present invention, as depicted notionally in FIG. 1. In a preferred embodiment, PRIME may comprise a local power source, or prime mover (i.e., a machine, such as an engine or turbine, that transforms energy—such as from chemical, thermal, electrical or pressure form—to useful work, or to one or more alternative useful forms of energy).

In a preferred embodiment, the PRIME apparatus [4] may comprise any number of prime mover apparatus, such as gas turbine or microturbine, fuel cell, or other apparatus (which may be commercially available off-the-shelf or in custom configurations, such as for OEMs or ODMs) operating independently or cooperatively under the control of the SLAM apparatus [1].

In a preferred embodiment, the PRIME apparatus [4] may comprise a combination of one or more microturbines and stationary fuel cells configured to operate in a diverse but complementary manner while sharing common fuel types and/or sources, yielding an aggregate output typically ranging from about 200 KW to about 4 MW of direct electrical power and from about 400 KW to about 5 MW or more of recuperable thermal power. In alternate embodiments, smaller or larger aggregations of electrical or thermal capacity may be employed, in accordance with local constraints or conditions.

In a preferred embodiment, a prime mover apparatus may consume fuel and directly or indirectly transform latent chemical energy into a combination of high-grade electrical energy (typically corresponding to 25% to 50% of the fuel energy input) and potentially recuperable thermal exergy (typically 100% to 200% of the electrical output), with any otherwise unavailable energy (i.e., non-exergy) ultimately rejected to the ambient environment (e.g., as unrecuperable exhaust energy or "stack losses"), although possibly in a useful manner. In a preferred embodiment comprising cryogenic working fluids, in some operational modes there may be no energy that is intentionally rejected to the ambient environment (since even very low grade heat may be beneficially applied in conjunction with extremely cold fluids, due to the large temperature difference).

In a preferred embodiment, recuperable exergy originating with the PRIME apparatus [4] may be captured, transformed, stored, by other subsystems, and ultimately utilized, such as, for example, by the PERKS apparatus [5] which may produce additional electrical power, or the STORE apparatus [6], which may produce additional cooling.

Brief Overview of PERKS Subsystem

PERKS is an acronym for Peak Exergy Reserve, Kilowatt-Scale. PERKS [5] refers to a subsystem of certain versions of the present invention, as depicted notionally in FIG. 1. In a preferred embodiment, the PERKS apparatus [5] may directly capture excess or low-cost electrical energy from a multiplicity of sources (for example, from the utility grid, when electricity is cheapest or most readily available) and store it for later reuse, such as during peak periods (when power is most expensive or less available). The notion of "kilowatt-scale" here refers to a typical modular component having a variable and scalable capacity that may range from a few kilowatts to hundreds of kilowatts (a single local system typically may not exceed a few megawatts of aggregate power).

In a preferred embodiment, the PERKS apparatus [5] may provide all of the system's external electrical power interfaces, i.e., between the local system and any external facilities (such as, for example, the utility grid or a campus co-generation system). In one preferred embodiment, such as may be appropriate for a relatively large system with several megawatts of aggregate grid-tied power transfer (regardless of whether the local system is supplying or using utility power), the PERKS apparatus [5] may interface at medium distribution-level three-phase AC voltages (e.g., 15,000-volt class to 380 VAC to 480 VAC three-phase line-level voltages). In such a configuration, oil-cooled distribution-class transformers may be in thermal communication with the STEER apparatus [2], so that low-grade heat energy may be recuperated. It may be optimally advantageous that such a configuration may provide significant operating reserve for transformers so connected, such that overheating (and subsequent damage) may be prevented during periods of high levels of ground-induced currents (GICs), as further described later.

In another embodiment, such as may be appropriate for a system with a relatively smaller external interface having only a few megawatts (or perhaps less than a megawatt) of aggregate grid-tied power transfer (again, regardless of whether the local system is supplying or using utility power), the PERKS apparatus [5] may interface at line-level voltages (e.g., 380 VAC to 480 VAC three-phase, typically). In still another embodiment, the PERKS apparatus [5] may interface at intermediate or high DC voltages (e.g., at or below 600 VDC, or at significantly higher DC voltages, respectively).

In a preferred embodiment, the packaging and external electrical interfaces of the PERKS apparatus [5] may be fully or selectively conditioned (regardless of whether a particular electrical flow is inbound or outbound) so as to protect against electromagnetic pulse (EMP) and other inbound electromagnetic environmental effects (sometimes abbreviated "E$^3$" or "E3," but not to be confused with the "$e_3$" of the set of three distinctly different EMP field types, namely, "$e_1$," "$e_2$", and "$e_3$"). In a preferred embodiment, the PERKS apparatus [5], in conjunction with other co-located apparatus such as the SUREFIRE apparatus [7], may protect against the effects of EMP such as System EMP (SEMP), Nuclear EMP (NEMP) and High-altitude EMP (HEMP), as well as the effects of lightning strikes, geomagnetic storms, and other electromagnetic phenomena on local or external power systems and other conductors (such effects may include, for example, ground-induced currents, also known as GICs, whose quasi-DC voltages may saturate and destroy utility grid transformers through immediate or cumulative damage).

Note that in these examples, the size or capacity of the external electrical interfaces does not necessarily constrain a system's local power production capacity, but only the local system's ability to acquire, buy, sell, transfer, or otherwise share power via said interfaces. In the absence of said interfaces, or in the case of malfunction, whether intentional or not, the local system may operate on a self-powered, stand-alone, or off-grid basis to the extent of its capacity and energy reserves. In a preferred embodiment representing a departure from conventional practice, the local system may normally operate on a self-powered or stand-alone basis, but use the utility grid for backup or reserve capacity. In another preferred embodiment also representing a departure from conventional practice, the local system may normally operate on a self-powered or stand-alone basis, but export power to the utility grid on demand (in coordination with the utility operations center) to help a region mitigate power issues or recover from a grid failure.

NOTE: In the case of generating power for export to the utility grid, the PERKS apparatus [5] does not generate the bulk of the power (that's the job of the PRIME apparatus [4]), but it may help meet a large peak power demand from its battery-based reserves. In any case, the PERKS apparatus [5] provide the necessary external electrical interfaces to the utility power grid, in order to protect itself and the local site from externalities of the grid.

In a preferred embodiment, of the PERKS apparatus [5] may comprise one or more kilowatt-scale turboalternators, which may serve as auxiliary power units (APUs) which generate electrical power from exergy reserves such as that recuperated from heat-dissipating sources such as electronics loads and the PRIME apparatus [4], or from pressure energy released during the vaporization of cryogenic fuel (for example, liquefied natural gas, or LNG).

Brief Overview of STORE Subsystem

STORE is an acronym for Storage & Transport of Operating & Reserve Exergy. STORE [6] refers to a subsystem of certain versions of the present invention, as depicted notionally in FIG. 1. In a preferred embodiment, thermal exergy in the form of available "heat energy" or "cold energy" contained in diverse working fluids and materials (further comprising the potential from temperature and pressure differences, such as between hot and cold fluids) and operating at diverse potentially useful temperature and pressure ranges may be safely stored and converted or transported using, for example, specially insulated tanks, pipes, tubing, heat exchangers or other low-loss STORE apparatus [6], and may be connected to STEER apparatus [2] directly or indirectly via heat exchangers (details to follow). Likewise, other forms of exergy (such as chemical or potential energy), may also be stored or transported in addition to, or in lieu of, thermal energy.

In a preferred embodiment, STORE apparatus [6] may comprise any combination of appropriately insulated storage, plumbing, and pumping subsystems and components, which may further comprise above-ground, in-ground, or underground thermal storage and transport systems, which may further comprise geothermal storage mechanisms wherein the earth itself (which may further comprise, without limiting the generality of the foregoing, solids, semi-solids, liquids, and gases) may serve as a thermal exergy source or sink, as appropriate.

In one preferred embodiment, STORE apparatus [6] may comprise one or more novel "deep-hole" ground-coupled heat exchangers (GCHE) wherein each such device may implement a counterflow heat exchanger (as a class, counterflow heat exchangers are known in the art to maximize efficient heat transfer), taking into account, for example, the "heat flow" of the earth itself, with a thermal gradient of 25° C. to 30° C. per kilometer of depth (away from tectonic plate boundaries, down to about 100 to 200 kilometers). In contrast, a common GCHE may implement a concurrent or parallel flow heat exchanger that may work against itself as the working fluid flowing therein is returned to the surface. In a further preferred embodiment of a counterflow GCHE, integration with the STEER apparatus [2] may enable the direction of flow to be reversed on demand, which may further enable application of thermal exergy to meet a differing need, including the ability to "recharge" the thermal field toward a new threshold.

In a preferred embodiment, exergy may be stored in the form of temperature differentials between "cold energy" and "heat energy" reservoirs, such as the large temperature differential (477° C., or 858° F.) between cryogenically stored liquefied natural gas (LNG) fuel (which typically may be stored in liquid form at near-ambient pressure at −162° C. or lower, or as a liquid under higher pressures at or below the critical temperature of −83° C.) and thermal oil such as RUBE™ HT1 (high-temperature) fluid (which may be stored at +315° C.), or such as the smaller temperature differential (200° C., or 360° F.) between LNG fuel stored at about −162° C. and a phase-change working fluid such as RUBE™ LT2 at an operating pressure where its boiling point may be, say, about 38° C.

In another preferred embodiment, exergy may be stored and retrieved via alternating sorption and desorption cycles which take advantage of the working fluids and various temperatures and pressures that may be available via the STEER apparatus [2] from elsewhere in the system, which may also include the STORE apparatus [6] itself. Such alternation of sorption and desorption cycles may induce desirable temperature or pressure changes to the various working fluids involved, which may be manifest as refrigeration, for example.

Brief Overview of SUREFIRE Subsystem

SUREFIRE is an acronym for Survivable Unmanned Renewably Energized Facility & Independently Reconfigurable Environment. SUREFIRE [7] refers to an optional apparatus or subsystem co-located with, and possibly annexed to, certain versions of the present invention, as depicted notionally in FIG. 1. In a preferred embodiment, the FRAME system may be co-located with an embodiment of SUREFIRE apparatus [7], which, through co-designed functionality, may provide an optimal deployment arrangement of FRAME. Thus, for the purposes of this document, the SUREFIRE apparatus [7] may be considered a co-designed automated subsystem of FRAME capable of dynamically accepting, handling, securing, installing, configuring, operating, reconfiguring, and replacing modular payloads comprising other FRAME subsystems. (Conceptually, this may be akin to something like a secure, fully automated equipment warehouse, except that the "stored items" may also be automatically installed, secured, configured, and placed into service while they're at rest, and also automatically removed or replaced and transferred elsewhere when optimally advantageous).

In a preferred embodiment exemplifying co-designed functionality, a manufactured SUREFIRE [7] subsystem (e.g., a silo or vault) may comprise pre-tested, inspected, and certified plumbing, electrical, cabling, and security subsystems implementing the relatively fixed portions of the STEER apparatus [2], RUBE apparatus [3], PRIME apparatus [4], and PERKS apparatus [5].

In a preferred embodiment exemplifying co-designed reconfigurability, a manufactured SUREFIRE [7] silo may comprise pre-tested, inspected, and certified automated or automatic mechanisms (e.g., robotics, actuators, positioners, rails, tracks, locks, blind couplers and connectors, etc.) which implement and enable the automated dynamic deployment, configuration, transfer, or removal of modular units of the SLAM apparatus [1]. STEER apparatus [2], RUBE apparatus [3], PRIME apparatus [4], and PERKS apparatus [5]. In an alternative embodiment, some of the automated mechanisms may be field-installed, and may require additional testing, inspection, and certification (e.g., in accordance with regulatory authorities).

In a preferred co-location arrangement, the SUREFIRE apparatus [7] may provide nearly ideal interfaces to energy and exergy sources and to the ambient environment, with a minimal footprint, while also providing significant security, survivability, and operational benefits. In a preferred embodiment, the SUREFIRE apparatus [7] may be implemented as an underground silo with an optional top-mounted cylindrical tower extending axially above the surface to a height of up to 110 feet (from the ground to the top of the tower wall), such that a protruding portion of the underground silo may overlap with, and be in mechanical communication with, the inner wall of the optional top-mounted tower. In a preferred embodiment incorporating the top-mounted tower, the SUREFIRE apparatus [7] may use the tower (and optionally, openings in the tower wall) as its primary ambient air interface, which may further comprise or interface with ductwork, dampers, filters, and other HVAC-type equipment. In a preferred embodiment, modular field-replaceable HVAC-type equipment, whether silo-hosted or tower-hosted, may be treated as payloads for the automated mechanisms (e.g., robotics, actuators, positioners, rails, tracks, locks, blind couplers and connectors, etc.) which implement and enable the automated dynamic deployment, configuration, transfer, or removal of modular units of the FRAME system.

In a preferred embodiment, a single SUREFIRE silo may comprise a cylindrical outer sleeve or steel casing with an inner diameter sufficient to contain an inner cylinder further comprising a silo payload, such that the cylindrical outer sleeve or casing may be inserted into the ground as a continuous single unit or in welded-on sections, to a depth sufficient to ensure that the top of selected silo payloads may be at the desired or required depth below the surface. In a preferred embodiment, the insertion of the cylindrical outer sleeve or casing may be accomplished with shaft drilling and boring techniques known to those skilled in the art, according to the site-specific terrain and soil conditions, which may further comprise solid rock. In an alternate embodiment, the insertion of the cylindrical outer sleeve or casing may be accomplished with pile-driving techniques known to those skilled in the art. In one embodiment, the shaft into which the cylindrical outer sleeve or casing is inserted may extend beyond the bottom of said cylindrical outer sleeve or casing.

In a preferred embodiment, a silo, along an optional above-the-surface extension, optional above-ground tower, and access-control apparatus may be capable of withstanding the eventualities of region-specific hazards or threats, such as earthquakes, hurricanes, tornadoes, floods, or fires. For example, in a preferred embodiment intended to withstand severe floods, an above-the-surface extension and optional above-ground tower may act as a snorkel that may enable continuous off-grid or on-grid operation despite the presence of potentially deep flood waters covering the normal ground surfaces.

In still another alternative preferred embodiment, multiple silos may be colocated so as to share one or more optional above-the-surface extensions, optional above-ground towers, or access-control apparatus. In a preferred embodiment, a seismically protected underground horizontal shaft may connect any pair of colocated underground silos, such that a linear-actuator-based or other type of conveyance system may securely shift modular payloads between silos, thereby implementing an underground side-loading capability. In a preferred embodiment, the underground side-loading capability may comprise access-control apparatus. In a preferred embodiment, the conveyance system of the underground side-loading capability may be implemented with rigid chain and suitable actuators, preferably in a push-pull configuration between silos.

Note that, depending on one's viewpoint, the SUREFIRE apparatus [7] silo facility is both a subsystem and an independent-but-co-designed-facility to host the other FRAME subsystems. It has a symbiotic relationship with the other subsystems and provides permanent or quasi-permanent infrastructure components upon which the other subsystems depend. The SUREFIRE apparatus [7] silo facility stands in contrast to the other FRAME subsystems due to its permanent or quasi-permanent nature, whereas most of the subsystems may be viewed as comprising modular "payloads" [3.1] or field-replaceable units that may interoperate with it. This is somewhat analogous to a fighter jet carrying fuel tanks which can be jettisoned, and may therefore be viewed as part of the vehicle's payloads. The fuel tanks themselves are also active subsystems for at least as long as they are connected to the vehicle, and the vehicle and its fuel tanks have a symbiotic relationship in that they need each other to operate. In this analogy, the SUREFIRE silo is the vehicle, which may be viewed as "quasi-permanent" in that it will likely last much longer than a jettisoned fuel tank.

Brief Overview of Other FRAME-to-Facility Interfaces

In a preferred embodiment which may not comprise a SUREFIRE environment, the FRAME system may be co-located with facilities using air conditioning or chilled water for cooling data-center-like heat loads. Such facilities may route the hot return air or hot return water directly into a stand-alone RUBE apparatus [3] or through heat exchangers into the STEER apparatus [2], so that the RUBE apparatus [3] may reject additional heat into the hot return side (increasing overall efficiency), rather than creating an additional load on the facility's cold supply side (details to follow).

In another preferred embodiment which may not comprise a SUREFIRE environment, the FRAME system may be co-located with facilities having roof access or other access to outside air, or having access to one or more ground-coupled heat exchange loops, or access to other external heat sinks. Such facilities may reject heat to the FRAME system in a manner akin to a water-side economizer while avoiding most or all of the energy cost associated with a conventional CWS or HVAC system (FRAME, and specifically, the RUBE apparatus [3], may reject its waste heat primarily via isothermal phase-change heat-transfer, which may be thermodynamically efficient since no compressor may be required).

Alternatively, where applicable, low-grade waste heat may also be put to good use in heating or preheating applications (e.g., hot water heating, snow removal, etc.). The waste heat temperature available from FRAME may be significantly higher (e.g., by 10° F. to 30° F. or more) than typical data center waste heat, and therefore may be potentially more useful.

1. SLAM (Security, Location, Authentication, & Maintenance)

SLAM is an acronym for Security, Location, Authentication, & Maintenance. SLAM [1] refers to a fault-tolerant, high-availability, automated control subsystem of certain versions of the present invention, as depicted notionally in FIG. 1, which may also interact with, and participate as a subsystem of, other systems outside the scope of this description. The SLAM apparatus [1] may monitor, track, and control a node's physical environment (signal flows not depicted here). Within the context of the FRAME subsystem, SLAM may provide SCADA (supervisory control and data acquisition), safety, security, and maintenance functions, particularly with respect to establishing and maintaining the proper system thermal parameters, in order to optimize the use of exergy resources, particularly with respect to the generation of power, dissipation of heat, and recuperation of thermal exergy.

1.1 SLAM Overview

As noted in the overview, SLAM is an acronym for Security, Location, Authentication, & Maintenance. SLAM [1] refers to a fault-tolerant, high-availability, automated supervisory control subsystem of certain versions of the present invention, as depicted notionally in FIG. 1, which may also interact with, and participate as a subsystem of, other systems outside the scope of this description. Fault-tolerance and high availability of the control system may be implemented or augmented with commercially available SCADA systems and apparatus or with individually available SCADA components, and relatively standard industrial, infrastructure, or facility processes.

NOTE: SCADA (an acronym for "Supervisory Control And Data Acquisition") is a type of industrial control system that monitors and controls industrial processes that exist in the physical world. SCADA systems may monitor and control large-scale processes, potentially across multiple sites and large distances, and said processes may further comprise industrial, infrastructure, and facility-based processes. In the context of FRAME and the SCADA functions of SLAM, industrial processes may comprise those of power generation and fuel processing, and may run in continuous, batch, repetitive, or discrete modes. Infrastructure processes may comprise those of biogas collection and treatment, natural gas pipelines, electrical power transmission and distribution, wind farms, solar energy arrays, large communication systems, water treatment and distribution, or wastewater collection and treatment. Facility processes may comprise those of security, location (e.g., asset-tracking), access (e.g., authentication), environmental control (e.g., heating, cooling, ventilation), power flows (e.g., power generation and usage), and exergy status (e.g., production, consumption, loss).

In a preferred embodiment, the SLAM apparatus [1] may monitor, track, and control a node's physical environment (signal flows not depicted here), and may comprise commercially available asset-tracking and location devices which may be embedded or otherwise integrated into modular components of the system.

In a preferred embodiment, the SLAM apparatus [1] may be distributed across multiple modules within a site, and across multiple sites. In a preferred embodiment, a pair of SLAM apparatus [1] nodes (e.g., two of N distributed nodes, such as may be depicted in FIG. 63 from US20090216910) may cooperate to accomplish their collective purposes. In a preferred embodiment, at least two such nodes may be embedded in every field-replaceable unit (FRU) of the FRAME system, and preferably, also in every field-replaceable unit of FRAME's dependent systems and subsystems. In a preferred embodiment, the various SLAM nodes (which may be geographically distributed as well as co-located) may securely communicate and cooperate to provide system monitoring and control as further outlined below, particularly when operating at fixed locations.

In a preferred embodiment, during transport various SLAM nodes may remain powered (preferably in a lower-power state) in order to implement various tracking, safety, and security functions for which they may be responsible, including secure communications with one or more asset-tracking and/or security monitoring centers. During transport, co-located SLAM nodes in different field-replaceable units (FRUs) may be in secure communication with each other, such as via radio-frequency communications, and may thus cooperate to act as a unit in order to achieve their mutual goals and to share and/or conserve their individual and combined resources (such as energy and communications bandwidth). For example, one FRU, which may not be able to acquire clean global positioning signals (e.g., from GPS or Glonass satellites), may determine or corroborate its correct location and system time by combining information or signals acquired from co-located units with information from its own internal inertial navigation system (INS) and timekeeping devices.

1.2 Local or Remote Interfaces May be Physical or Virtual

Figure 63:
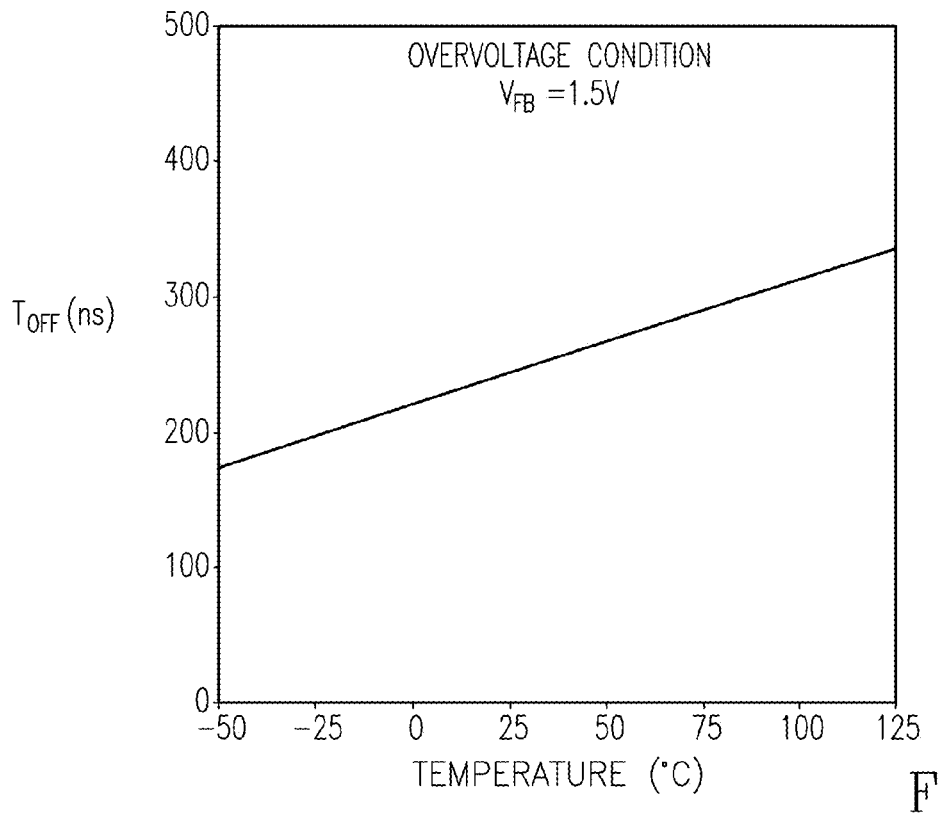
FIG. 63: Example Temperature-Based Turn-Off Time Curves for OVP Regulator

Each of the SLAM apparatus [1] nodes in depicted in FIG. 63 from US20090216910 (PRIOR ART) is depicted as comprising a user interface [212], biometric sensors [211], and an environmental interface [210]. In a preferred embodiment, any of these may be local or remote, and physical (e.g., embedded or attached) or virtual, in any combination.

For example, in one embodiment, a user interface [212] may be physically present as a local panel with controls, or in another it may be implemented virtually so that no human need be physically present to view or control the user interface [212]. In a preferred embodiment, virtual user interfaces [212] may be implemented as one or more cellular phone (e.g., "smartphone") or other computer applications ("apps"), or as any combination of web pages, applications, scripts, displays, and controls accessible in a web browser (e.g., such as on a cellular phone or on an operator console), or any combination of these and other possibilities.

It is an object of certain versions of the present invention for the control of the FRAME system and apparatus by the SLAM apparatus [1] subsystem to be fully automatic, especially for normal operation and anticipated failures and anomalous conditions, thereby intentionally and generally relegating the need for user interfaces to the remote monitoring and handling of truly exceptional conditions, and to regulatory and/or oversight roles.

Due to the nature of the FRAME system (involving the aggregation and movement of exergy, including available electrical, thermal, and fuel/chemical energy, and potentially, nuclear energy), and due to the anticipated value of any assets or other resources that may depend on the FRAME system, and due to the likely requirement for the safety of, and/or proper operation of, said assets or resources, it may be anticipated that access to the monitoring and control capabilities of the system may of necessity be restricted to duly authorized individuals whose roles and responsibilities require such access, and whose prior training may enable such access to properly fulfill said roles and responsibilities.

In a preferred embodiment, multi-factor authentication may be optimally advantageous for establishing the identity and authority of any human to be granted access to the monitoring and control capabilities of the FRAME system (e.g., via SLAM, such as via any user interface [211]). To protect both humans and the system and its dependents, remote forms of such authentication may also be strongly preferred prior to allowing any human to approach or come into proximity with the FRAME system or subsystems, or its exergy sources, or its dependents.

In a preferred embodiment, one or more of the required authentication factors may be input from the user via one or more biometric sensors. Although the biometrics sensor(s) [211] depicted in FIG. 63 from US20090216910 (PRIOR ART) may be in some cases be considered part of a user interface, they are called out separately because many user interfaces do not currently (i.e., yet) include reliable biometric sensors. As with the user interface [212], the biometrics sensor(s) [211] may be local or remote, and physical or virtual, in any combination, and may be implemented in a manner similar to the aforementioned user interface [212]. The biometrics sensor(s) [211] may be thought of as just another means of providing user input. Examples may include any combination of fingerprint sensor connected to or embedded into a smartphone, personal computer (PC), or operator console, likewise connected or embedded camera(s) such as for iris-scanning, vein-scanning, or facial recognition (or visual recognition by humans responsible for access control), microphone(s) for voice recognition, and other such devices as may be suitable for the acquisition of personally identifying biometric information.

1.3 Fault-Tolerant, Distributed SCADA

Within the context of the FRAME subsystem, SLAM may provide optimally advantageous SCADA (supervisory control and data acquisition), safety, security, and maintenance functions, particularly with respect to establishing and maintaining the proper system thermal parameters, in order to optimize the use of exergy resources, particularly with respect to the generation of power, dissipation of heat, and recuperation of thermal exergy. However, due to the potentially nonlinear and time-varying behavior of the system, and the need for multi-variable decision-making, one may reasonably assume that close supervisory control by humans may be infeasible, and in any case, is not desirable.

In a preferred embodiment, the SLAM functionality may be implemented on a highly reliable, high-availability distributed computing platform, with fault-tolerance and redundancy commensurate with risks and consequences, and with various internal and external protections from natural and man-made electromagnetic effects. Said distributed computing platform may be purpose-built, or acquired from commercial vendors (e.g., Siemens, Rockwell Automation, OMRON Industrial Automation). In a preferred embodiment, the SLAM functionality may be distributed across various modular components of the system in which SLAM may be embedded, and may provide security (e.g., tamper detection and mitigation), location-tracking, and authentication (e.g., to enable locking/unlocking of mechanical or electrical actuators such as those which may enable or prevent physical movement or disconnection).

In a preferred embodiment, the SLAM apparatus [1] may provide steering signals to various FRAME subsystems and interfaces, and particularly to the STEER apparatus [2] flow control (and flow-rate control) valves, and flow-rate-control signals to various pumps and motivating devices, especially in order to optimize the temperature and pressure ranges associated with each of its embedded manifolds, reservoirs, and pseudo-reservoirs. The SLAM apparatus [1] may interact with other FRAME subsystems [1]) through [6] (which may further comprise other or redundant SLAM apparatus, or with components and interfaces thereof, to carry out the desired energy resource usage policies).

In a preferred embodiment, the SLAM apparatus [1] may communicate with counterpart SLAM apparatus [1] at one or more other locations or sites, and such communicating SLAM apparatus may coordinate and control the system behavior at their respective locations so as to achieve a desired operational profile among the locations, which may comprise optimizing operations with respect to specific policies, goals, resources, loads, or other criteria.

In a preferred embodiment, the SLAM apparatus [1] may communicate with counterpart SLAM apparatus at one or more other locations or sites, and such communicating SLAM apparatus may independently or cooperatively coordinate and control the overall system behavior, such that the SLAM apparatus [1] at one or more locations may yield to, or be overridden by, coordination and decision-making operations of a larger group of communicating SLAM apparatus whose collective monitoring, analysis, and control capabilities may address needs that may be more global or strategic than local or tactical, so as to achieve a desired operational profile among their various locations, which may comprise optimizing operations with respect to specific policies, goals, resources, loads, or other criteria.

1.4 Process Control Mechanisms

In a preferred embodiment, one or more of the dynamic real-time control algorithms employed in the SLAM apparatus may be implemented with "fuzzy logic" monitoring and control rules and processing techniques well known in the art, in order to simplify programming and optimize system responsiveness while enabling straightforward verification and validation of system control mechanisms and behavior. In a preferred embodiment, the implementation may be automated without being software-centric, so that the implementer may need ordinary skill in the art associated with a particular process, such as a thermodynamic process to be controlled, but may not need to be a skilled programmer also (i.e., domain expertise should be sufficient).

In a preferred embodiment, the automatic control of the system may further comprise programmable logic controllers (PLCs) using straightforward and relatively simple control logic which may comprise fuzzy-logic-based control algorithms (which may further comprise fuzzy logic rules and membership functions) and simple logic processes, the latter being defined or programmed using standards-based "programming" languages such as those defined by the IEC 61131-3 standard (2003). The definition of simple logic processes may be most applicable when a process to be controlled operates in stable conditions.

Figure 2:
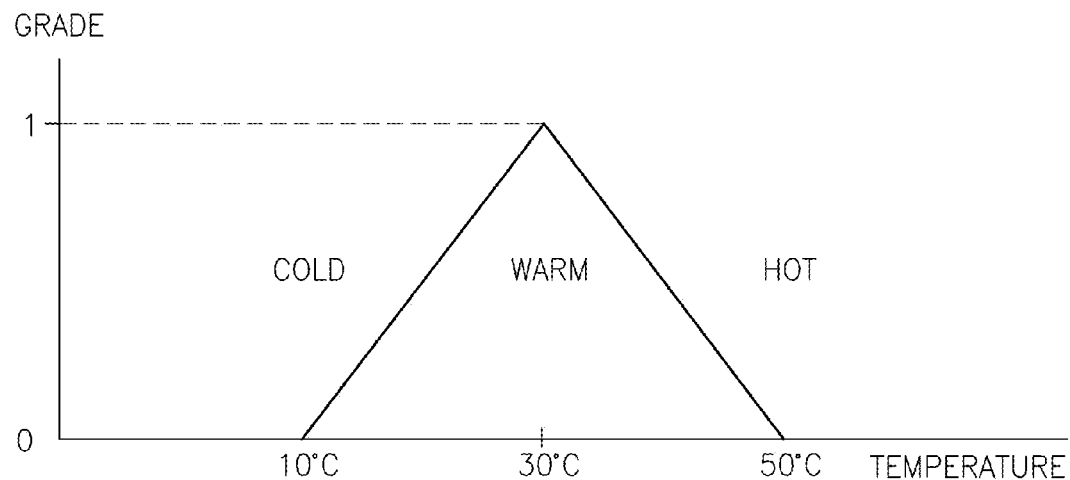
FIG. 2: Example Fuzzy 'Warm' Liquid Temperature Range
Figure 3:
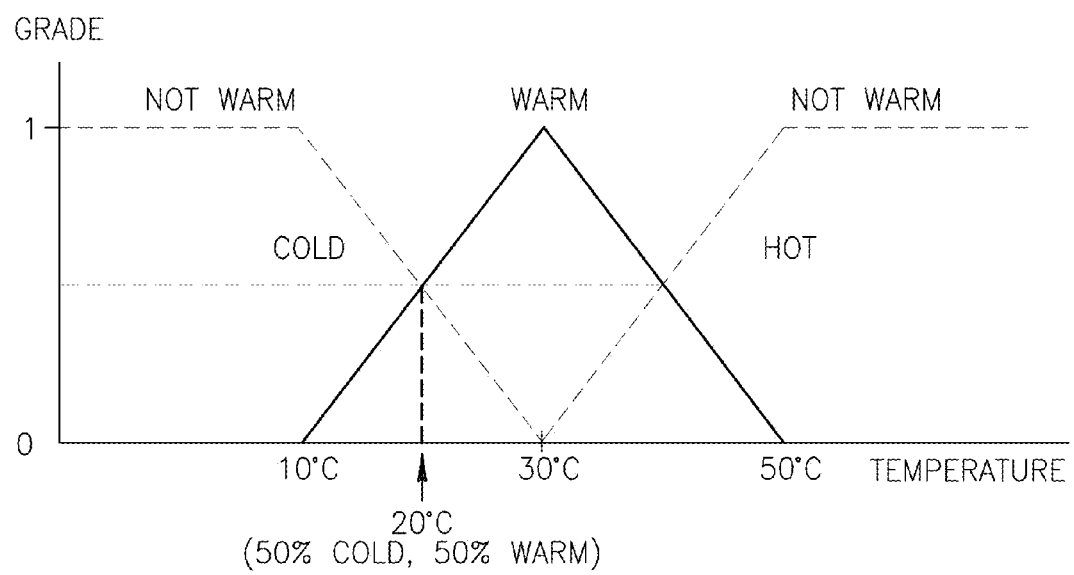
FIG. 3: Example Fuzzy 'Warm' Liquid Temperature Range with dashed lines showing 'Not Warm' Ranges

NOTE: Fuzzy logic is a branch of artificial intelligence that deals with reasoning algorithms which attempt to emulate human thinking and decision-making in machines (such as by applying simple rules initially supplied by humans with domain expertise). These algorithms may be particularly useful in applications where process data cannot be represented in binary form (e.g., "on" or "off," with no intermediate values allowed). For example, the statements "the liquid is cool" and "the vapor pressure is low" are not discrete statements. They do not provide concrete data about the liquid temperature or the vapor pressure (i.e., the liquid is at 30° C. or the vapor pressure is 10 psig). Fuzzy logic interprets vague statements like these so that they make logical sense. In the case of the warm liquid, a fuzzy logic algorithm would interpret both the level of warmness or warmth and its relationship to hot and cold, to ascertain that "warm" means somewhere between hot and cold. In straight binary logic, hot would be one of the two possible discrete values (e.g., logic 1) and cold would be the other (e.g., logic 0), leaving no value to represent a warm temperature. In contrast to binary logic, fuzzy logic can be thought of as "gray logic," which creates a way to express in-between data values. Fuzzy logic associates a grade, or level, with a data range, giving it a value of 1 at its maximum and 0 at its minimum, with fractional values in between. Any number of overlapping ranges may be defined and labeled (e.g., "cold". "warm", "hot"), so a given value may be a "member" of multiple ranges. For example, in a particular context, the defined ranges may comprise the range 10° C. to 50° C. ("warm," where 30° C., is 100% warm and both 10° C. and 50° C. are 0% warm, as depicted in FIG. 2), the range 0° C. to 30° C. ("cold," where 10° C. and below is 100% cold and 30° C. and above is 0% cold), and the range 30° C. to 50° C. ("hot," where 30° C. and below is 0% hot and 50° C. and above is 100% hot). In said context, a temperature of 20° C. may be interpreted, for example, as simultaneously 50% cold and 50% warm, as depicted in FIG. 3. Additional labeled ranges may be defined as needed to specify special conditions, such as "very hot" or "too hot." To be somewhat more precise, each input may have several labeled membership functions that define its conditions, such that the membership functions collectively span from the data range's minimum point to its maximum point. For example, an input variable such as temperature might have five membership functions labeled as cold, cool, normal, warm, and hot. Each membership function may be defined by its label, along with user-defined charts such as those depicted in FIG. 4 (common symmetric shapes) and FIG. 5 (example asymmetric shapes). Fuzzy processing involves the execution of IF . . . THEN rules, which are based on the input conditions. Inputs and outputs may both be specified in terms of labeled ranges, so that rules may specify vague or approximate actions to accompany vague or approximate inputs (e.g., "IF temperature is too warm THEN slightly reduce the heat applied"). An input's grade specifies how well it fits into a particular graphic set (e.g., too little, normal, too much). The output of a fuzzy controller may also be defined by grades, with the grade determining the appropriate output value for the control element, so that, for example, a variable-speed pump may be commanded to operate at a particular speed, or a digitally controlled valve may be commanded to open or close sufficiently so as to enable or limit a particular flow rate.

In a further preferred embodiment, logic processes may preferably be defined via the inherently parallel IEC 61131-3 graphical programming notation called "sequential function charts" (SFCs). In a preferred embodiment, SFCs may be used to program concurrent processes that can be split into steps with associated actions, transitions with associated logic conditions, and directed links between steps and transitions. In a preferred embodiment, SFCs may implement control logic used to coordinate different continuous functions or to control complex process sequences, without requiring the control logic to be defined by a skilled programmer (the implementer may need ordinary skill in the art associated with a particular process, however). In a preferred embodiment, said control logic may execute autonomously on distributed control system (DCS) components, such as PLCs, and may also report to supervisory SCADA nodes (e.g., to SLAM nodes).

In a preferred embodiment, the fuzzy-logic-based control algorithms may be created with a commercially available tool that may convert fuzzy logic rules into an add-on instruction which may be downloaded into compatible IEC 61131-3-compliant PLCs. For example, FuzzyDesigner, which may be commercially available from Rockwell Automation, Inc. (of Milwaukee, Wis., http://RockwellAutomation.com) as part of the RSLogix 5000 Programming Software (also from Rockwell Automation), for use with the company's line of PLCs (e.g., Logix 5000 family, SLC500 and PLC5). The inputs and outputs of fuzzy logic, which may vary over a continuum from 0 to 1, may be particularly well-suited to the monitoring and control of the STEER apparatus [2] variable flow control (and flow-rate control) valves and active devices, which may implement digitally specified flow channels and rates. Fuzzy logic processes may be most preferable when a process to be controlled operates in unstable conditions, such as in the presence of strong disturbances (non-linearity), time-varying process parameters (non-linearity), or dead times.

In a more preferred embodiment, a sensitivity-based self-learning fuzzy logic control (SLFLC) scheme known in the art (e.g., see "*Sensitivity-based Self-learning Fuzzy Logic Controller as a PLC Super Block*", S. Bogdan, Z. Kovačić, and D. Krapinec, Proc. of 15th Mediterranean Conf. on Control & Automation, Jul. 27-29, 2007, Athens, Greece) may enable fuzzy rules to be learned or improved by the controller of a particular subsystem (and especially for a time-varying non-linear control system, whose fuzzy rules or parameters may be more difficult to establish), potentially starting from a blank or nearly blank fuzzy rule-table, in order to enable a completely automated modification of the fuzzy control surface.

In a preferred embodiment, FRAME comprises primarily field-replaceable units (FRUs), each of which may further comprise internal SLAM nodes and PLCs that may exchange relevant information (such as constraints, set points, status, requests, and acknowledgments) with other nodes and FRUs of the system with which it may be sharing resources and responsibilities, so that it may "think globally" and "act locally" to some degree.

In a preferred embodiment, the processes for each FRU may be defined by its supplier, which is presumed to have access to those who are familiar with the specific requirements of the FRU and are sufficiently skilled in the art comprising the relevant processes of said FRU.

In a preferred embodiment, the automatic control of the system may be implemented by a combination of the aforesaid SLFLCs, singleton fuzzy controllers, and PLCs, where fuzzy logic functionality may correctly handle non-linearities and multi-variable decision-making, and then control the setpoints of simpler control mechanisms accordingly.

For example, in a preferred embodiment, multi-variable inputs for a single channel may comprise working fluid temperature and pressure, and their derivatives, along with current and expected flow rates, and their derivatives. However a particular system flow may involve multiple channels acting in concert, so the number of basic inputs may be multiplied by the number of channels involved in a particular virtual plumbing circuit. In one embodiment, a hierarchy of fuzzy-logic-based control algorithms may determine, for example, the necessary set point for each simple controller associated with each channel's flow control valves, pumps, or other devices. In an alternate embodiment, said hierarchy of fuzzy-logic-based control algorithms may determine, for example, the settings to be directly latched into a set of magnetic latching valves or to be communicated to a digitally controllable pump, without the need for an intermediating "simple controller."

2. STEER (Selectable Thermal Exergy-Economizing Reconfigurators)

2.1 STEER Overview

STEER is an acronym for Selectable Temperature-Economizing Exergy Reserves. STEER [2] refers to a subsystem of certain versions of the present invention, as depicted notionally in FIG. 1, and again later in FIG. 13. The STEER apparatus [2] is conceptually a reconfigurable thermal exergy "bus" or "virtual plumbing system" that may enable dynamic near-optimal matching of exergy sources and sinks, and may comprise a separate supply and return for each of potentially several and diverse working fluids, wherein each supply (and each return) for a particular working fluid may further comprise a multiplicity of individual channels, each of which may carry or store working fluid within an independently controllable temperature range and pressure range.

In a preferred embodiment, the STEER apparatus [2] may further comprise reservoirs, buffers, manifolds, pumps, pipes, sensors, valves (usually computer-controlled, e.g., via SLAM apparatus [1], as depicted in FIG. 1), and other components that may collectively work somewhat like a crossbar switch, in order to dynamically control the flow of one or more potentially diverse working fluids between various sources and sinks of thermal exergy, mixing working fluids of different temperatures or pressures as needed to meet specific goals for the availability of the working fluids at specified temperature ranges.

In the depiction of FIG. 1, four broad (and non-specific) temperature ranges are depicted notionally, without reference to specific working fluids, operating temperature ranges, or operating pressure ranges, but in principle as many working fluids and operating ranges as needed may be used. The STEER apparatus [2] ingress/egress arrows and temperature ranges depicted in FIG. 1 are notional and may not fully represent a workable system (enabling details to follow).

2.2 Conventional Systems—Expansion of Static Configurations

In a conventional mechanical piping and plumbing subsystem such as may be used in a data center chilled water system, the subsystem must generally be designed and purpose-built to achieve a particular configuration, and expansion options must generally be planned for in advance, and thus may be viewed as an essentially static configuration. Data centers, in particular, may suffer the consequences of multiple expansions, due to phased build-outs and the rapid advancement of technology. Without thorough master planning and knowledge of the future, subsequent upgrades may temporarily resolve immediate problems of meeting demand, while compounding existing design and operating issues (e.g., low-ΔT syndrome).

For example, the layout may need to accommodate a sprawling plant where the pressure drops between mechanical components may be significant, causing the need for large pipes to handle the preferred flows. In a real-world example, a chilled water system with three chillers operating at only 60% of their installed tonnage could barely meet existing demand (with no hope for expansion without a major overhaul), resulting in an overall 40% loss in capacity. In this example, the chilled-water distribution was piped and controlled as a primary/secondary pumping system, with a chilled water plant consisting of two 200-ton screw chillers located in one mechanical room and a 200-ton centrifugal chiller in a second mechanical room. The pressure drops in the system resulted in an unnecessary 21 to 23 feet of head, which subsequently increased the need for more horsepower. The 6-inch piping connecting two separate mechanical rooms was over 100 feet long and would only allow 400 tons of cooling to be delivered to the secondary distribution system (based on a best-case scenario of 1,000 GPM and a ΔT of 10° F.), when at least 600 tons of cooling was needed to support an immediately upcoming expansion.

Conventional solutions to this real-world problem involving significant increases in flow requirements generally involve overhauls and equipment upgrades, with one more or larger pipes and pumps, as depicted in FIG. 6, FIG. 7, and FIG. 8, as described in the following subsections.

Example

Conventional One-Way System with Doubled Flow Requirements

In the example of FIG. 6, with a single pump and four thermal devices, the original pipes are sized (by their diameter) to accommodate the original maximum flow from the pump, which is also sufficient to meet the flow requirements of the four thermal devices at the designed-for "normal" loads.

NOTE: In this one-way system, the ump may be the limiting factor that constrains the flow of working fluid, especially if multiple devices (each of which represents a pressure drop) create a flow demand that exceeds the capacity of a single pump. Substituting a larger pump to meet 2× peak flow demands (keeping the same pipe) may require more than 2× horsepower at peak (especially if pipe diameter becomes a limiting factor), and more than 1× horsepower even at the original 1× flows, thus wasting energy continually. FIG. 6 depicts potentially flow-starved devices (okay at 1× load but not at 2× loads).

In FIG. 6, if the thermal devices were to be operated at higher loads, such as to require, for example, twice the original design flow (supply flow [2a] and return flow [2b]), then the pump [2.100] would not be able to keep up, and the devices would become flow-starved. In a conventional system, one solution to such a problem would be to substitute a larger pump [2.100] to handle the double (2×) flow. If the pipe itself (e.g., supply [2.101] and return [2.102]) is a limiting factor (which it will likely be if not oversized), then doubling the pump capacity will more than double the horsepower required for pumping the doubled flow. Given a supply pipe [2.101] and return pipe [2.101] optimized for a particular flow rate, doubling the flow has the effect of squaring the pressure differential, and cubing the energy required. Also, the higher horsepower pump will require more energy just to meet the original (non-doubled) flow requirements.

Another conventional solution to handle the required doubling of flow might be adding a second pump [2.100] to double the pumping capacity, as depicted in FIG. 7. At the original flow rates (i.e., before doubling the flow required), adding a second pump [2.100] would actually require less energy for the pair than for a single pump, since operating the two pumps in parallel would be more efficient. However, since the original design (e.g., pipe diameter) was not oversized in this example, adding a second pump [2.100] to meet the doubled flow required would again cause the pipe itself (rather than the pumping capacity) to be a limiting factor. As with the previous solution (larger pump), doubling the flow would have the effect of squaring the pressure differential, subsequently cubing the energy required. A larger pipe diameter could be substituted to restore the original pressure differential and avoid the huge energy increase, but pipe replacement may be mechanically or operationally problematic and costly.

NOTE: Adding a second pump would meet a 2× peak flow rate, with even less energy for low flow rates, if the nine is adequate. However, in this one-way system, the diameter of this pipe may become the limiting factor that constrains the flow of working fluid, rather than pumping capacity. Doubling the flow squares the pressure differential and cubes the energy required to increase the flow. A larger pipe diameter may be needed, but may be mechanically problematic, and certainly more expensive.

Example

Conventional One-Way System with Quadrupled Flow Requirements

In the extreme example of FIG. 8, the expansion requirements call for a quadrupling of the flow (i.e., 4×). This situation is actually more likely than it might appear. The normal load could easily be doubled as in the previous examples (the primary reason for the expansion effort), and then doubled again to a peak load. In this scenario, given the original design with "right-sized" pipe (but no overdesign), the pipe diameter (supply pipe [2.101] and return pipe [2.102]) will almost certainly constrain the flow (supply [2a] and return [2b]), and may thereby become the limiting factor. As in the previous example with the original pipe diameter, doubling the flow will square the pressure differential, but quadrupling the flow will raise the original pressure differential to the fourth power (i.e., squaring an already squared value). As before, doubling the flow will cube the energy required, but quadrupling the flow will raise the original energy required to the ninth power (i.e., cubing an already cubed value). The obvious solution would call for increasing the pipe diameter (supply pipe [2.101] and return pipe [2.102]).

NOTE: In a 4× load scenario (say, due to 2× expansion and 2× peak), the diameter of this pipe, rather than the pumping capacity, will almost certainly constrain the flow of working fluid. Given the same size pipe, doubling the flow squares the pressure differential and cubes the energy required to increase the flow. Doubling the flow again squares the pressure differential again and cubes the energy required, again (over the result from the first doubling of the flow).

Example

Less Conventional Two-Way System with Quadrupled Flow Requirements

A less conventional (but non-obvious) solution that may exist in the art involves reconfiguring the existing plumbing from a "one-way" plumbing system (as depicted in FIG. 8) to a dynamically balanced bidirectional "two-way" plumbing system that splits the flow between different segments of the same pipe and allows them to effectively operate in parallel rather than in series (like drinking a milkshake from two straws instead of one), as depicted in FIG. 9.

NOTE: In this dynamically balanced system, a two-way configuration with the same size pipe can now carry a 2× or 4× flow as easily as a one-way configuration carries a 1× or 2× flow, respectively. Points of zero flow will shift dynamically, since various pumps and thermal devices may have individually determined flows and pressure drops.

In the example solution of FIG. 9, the number of pumps [2.100] is quadrupled, in order to handle the worst-case quadrupled flow (supply flows [2a] and return flows [2b]). However, the pipe diameter is the same as the original design (supply pipe [2.101] and return pipe [2.102] of FIG. 8), and has not been enlarged to meet the increased flow requirements, thus avoiding any problems with pipe replacement. By switching from a one-way usage of the pipe to a two-way usage, the same pipe may be fed from both ends, doubling the flow capacity of the pipe. As depicted in FIG. 9, a point of zero flow exists somewhere in the middle of the pipe (at [2.103] in the supply flow [2a], and at [2.104] in the return flow [2b]). At this point of zero flow, the pressure from the pumps on either side is equal and in balance with the loads, and this point may shift dynamically as loads, pump outputs, or pressure drops vary. We don't really care where the point occurs, but only that its existence enables a doubling of pipe capacity without increasing the pipe diameter.

Keeping in mind that the quadrupling of the required flow in this example is due to a doubling of the normal flow that is further compounded by another doubling due to peak load, the solution of FIG. 9 offers a number of useful features. During non-peak times the normal flow is only doubled, so the load may be handled by any combination of two or more pumps [2.100] (preferably from opposing sides), and the proper number can be determined on the basis of energy efficiency. In this normal scenario, unused pumps [2.100] may also provide built-in redundancy and the pipe may have sufficient capacity to handle the doubled flow at the pressure differential of the original design. During peak times involving up to a second doubling of the flow, another pump or two may be brought online to handle the peak flow requirement. In this quadrupled flow scenario, there will not, however, be a fourth-power increase in pressure differential or a ninth-power increase in energy required. Rather, the pressure differential will be only squared and the energy required will be only cubed, but only during the peak period. Of course, this is not necessarily an ideal solution, but it is better than the others presented thus far.

The examples of this section are not intended to recite the merits of this (or any) particular configuration, but rather, to teach and highlight known mechanisms for multiplying the capacity of a pipe by feeding it from both ends, thereby creating a bi-directional (two-way) flow.

2.3 STEER Thermal Bus Overview

As previously noted, the STEER apparatus (depicted as subsystem [2] in FIG. 1, a notional example of which is depicted later, in FIG. 13 of the next section) is conceptually a reconfigurable thermal exergy "bus" or "virtual plumbing system" that may comprise a separate supply and return for each of potentially several and diverse working fluids (which may also include fuels), wherein each supply (and each return) for a particular working fluid may further comprise one or more individual channels, each of which may carry a potentially unique working fluid within an independently controllable temperature range and pressure range and thereby constitute a relatively independent virtual plumbing subsystem. Hereafter, a collection of such virtual plumbing channels may be referred to in this document as the STEER Thermal Bus (without regard to a particular instantiation or configuration).

STEER Thermal Bus: Pipe-Splitting to Amplify Pipe Capacity

Figure 11:
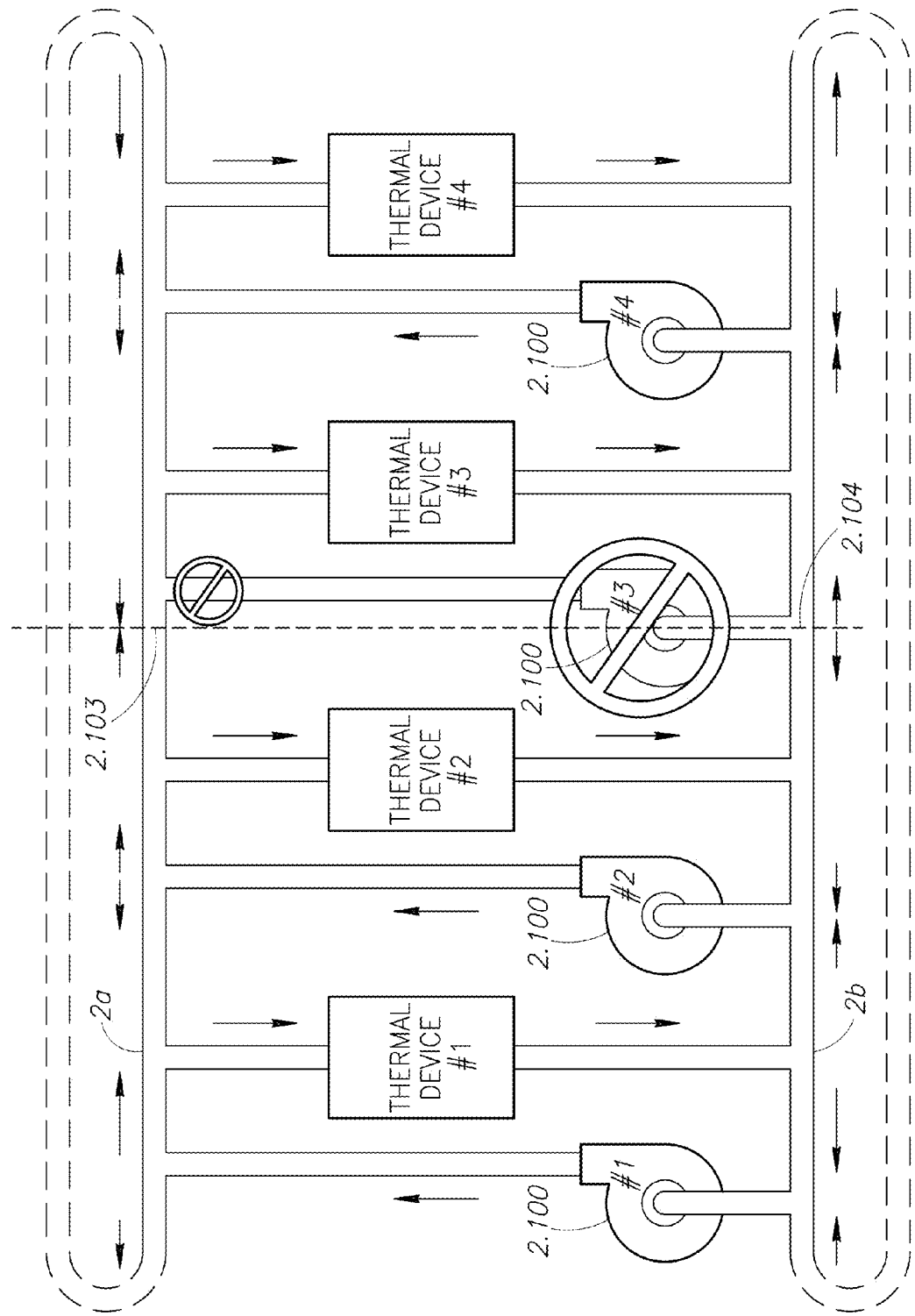
FIG. 11: STEER Dynamically Balanced Bidirectional Flow Example—Four Pumps (4×1), Four Thermal Devices, Minus One
Figure 12:
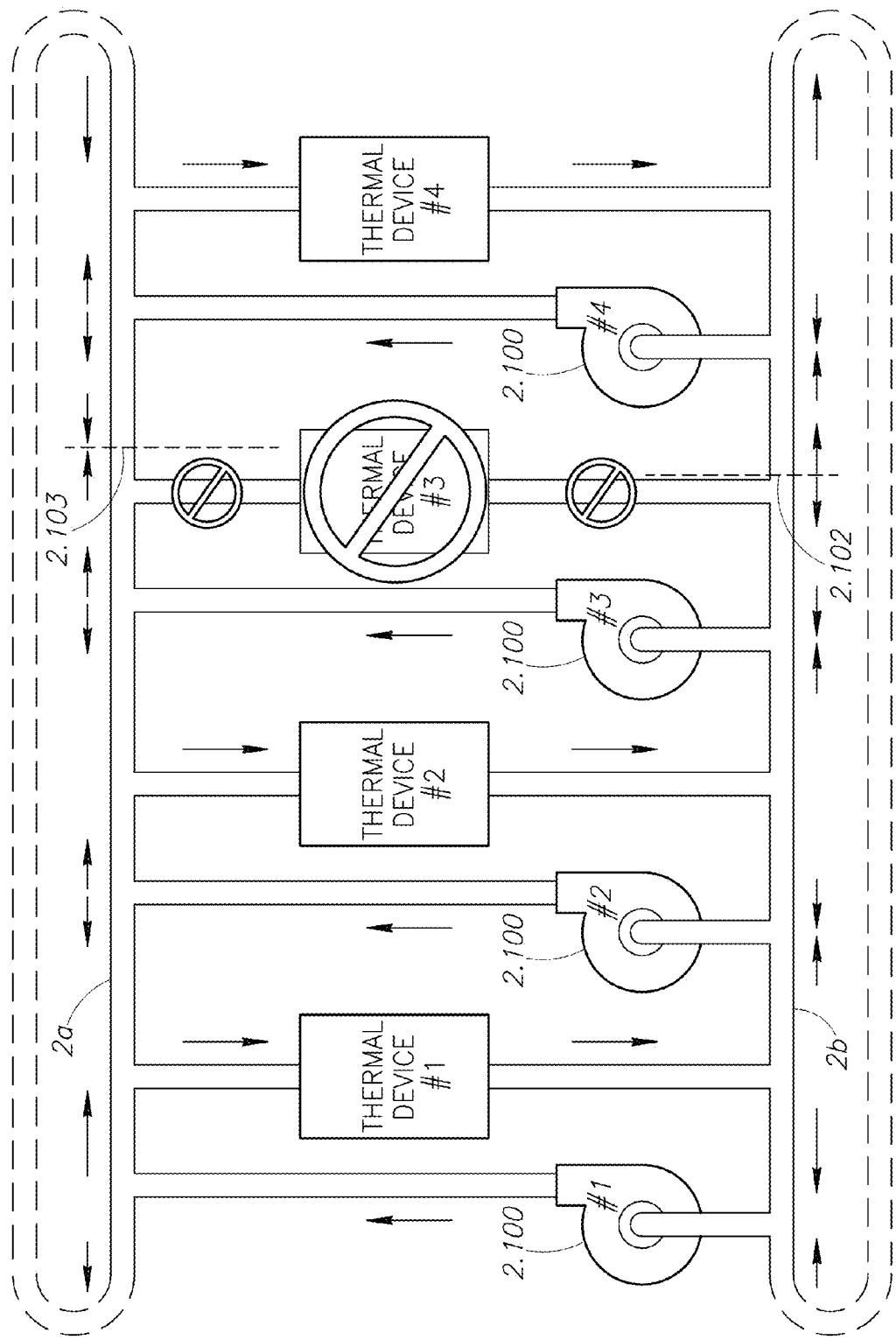
FIG. 12: STEER Dynamically Balanced Bidirectional Flow Example—Four Pumps (4×1) Minus One, Four Thermal Devices

In a preferred embodiment, the STEER Thermal Bus enables "virtual plumbing circuits" that may be dynamically reconfigured to maximize the use of bidirectional ("two-way") flows, so that many segments may effectively operate in parallel rather than in series, thereby amplifying pipe capacity as notionally depicted in FIG. 10, FIG. 11, and FIG. 12. Note that, in a preferred embodiment, these three figures each depict only a portion of a single channel of the STEER Thermal Bus (where one channel may handle a single working fluid at a single temperature), out of many channels which may be implemented for a given deployment.

NOTE: Here, the term "virtual plumbing circuit" refers to an actual, physical plumbing circuit that exists in a particular configuration at a point in time, e.g., $t_{NOW}$, that may have been dynamically reconfigured from what existed in the recent past (i.e., at time $t_{PREVIOUS} < t_{NOW}$), or earlier, and which may also differ slightly or substantially from the actual, physical plumbing circuit that may exist in the near future (i.e., at time $t_{FUTURE} > t_{NOW}$), or later. The "virtual" nature of such plumbing circuits refers to their dynamic reconfigurability rather than a lack of physical characteristics. Indeed, more physical hardware and associated capital cost may be required to implement "virtual plumbing circuits" than might be required to implement conventional "fixed" plumbing circuits, although this is not necessarily the case.

In the example of FIG. 10, representing a non-failure scenario for a single STEER Thermal Bus channel having four pumps [2.100] (P=4) and four pressure drops (D=4) through thermal devices #1, #2, #3, and #4, the two ends of the supply [2a] (depicted as the top rail) may be connected to each other to form a "loop," and likewise for the return [2b] (depicted as the bottom rail). The dotted paths near the top and bottom rails of FIG. 10 are intended to serve as a reminder of the "loop" nature of the supply and return rails. Note that these "loops," however, are very much unlike a traditional plumbing loop in a closed-loop system, in that, in the general case, the plumbing circuit is not around each loop, but rather, between the top and bottom loops (i.e., via a multiplicity of circuits through the pumps [2.100] and thermal devices between the supply loop [2a] and the return loop [2b]). Also note that, in an actual implementation, P and D may be much larger than four (P>>4, D>>4).

NOTE: In this dynamically balanced system, a two-way configuration with the same size pipe can now carry a 4× flow as easily as a one-way configuration carries a 1× flow. Points of zero flow, if any, will shift dynamically, since the various pumps and thermal devices may have individually determined flows and pressure drops.

The P pump devices [2.100] (which need not be electric) may be distributed around the supply [2a] and return [2b] loops such that the input flow to each pump may be obtained from the return loop, and the output from each pump [2.100] may be delivered to the supply loop. By distributing the connections of a number of pumps (P) around the loops thusly, each loop may be effectively segmented into P bidirectional pipes operating in parallel to handle flows to/from pump devices. In FIG. 10, where P=4, the supply loop [2a] (top rail) and return loop [2b] (bottom rail) each have P=4 segments interfaced to pumps [2.100] and operating in parallel.

Similarly, the D thermal devices (each of which may correspond to a pressure drop) may be distributed around the supply [2a] and return [2b] loops such that the input flow to each thermal device may be obtained from the supply loop [2a], and the output from each thermal device may be delivered to the return loop [2b]. By distributing the connections of a number of thermal devices (D) and corresponding pressure drops around the loops thusly, each loop may be effectively segmented into D bidirectional pipes operating in parallel to handle flows to/from thermal devices. In FIG. 10, where D=4, the supply loop [2a] (top rail) and return loop [2b] (bottom rail) each have D=4 segments interfaced to thermal devices and operating in parallel.

In FIG. 10, where P=4 and D=4, the configuration is symmetric by virtue of having an equal number of pump devices [2.100] and thermal devices (pressure drops). As depicted, the segmented bidirectional supply loop [2a] may carry four times the flow that could normally be carried by a unidirectional flow in a pipe of identical diameter.

Conceptually, points of zero flow may occur in the supply [2a] and return [2b] loops at locations (e.g., [2.103], [2.104]) between pumps where the outputs from a pair of pumps (which are pushing flows toward each other in head-on fashion) are exactly equal. Points of zero flow, if any, will shift dynamically, since various pumps [2.100] and thermal devices may have individually determined flows and pressure drops. However, since the thermal devices (pressure drops) are also distributed around the supply [2a] and return [2b] loops, and are located between the pumps, the conceptually colliding outputs from a pair of pumps is summed and channeled toward the interposed pressure drop(s).

If an interposing pressure drop were to be shut off (say via a valve) such that no exit path exists between a pair of pumps so distributed, then there would be an actual point of zero flow between them. As depicted in FIG. 11, the loss of Thermal Device #3 would cause a point of zero-flow [2.103] between Pump #3 and Pump #4, resulting in increased flows toward Thermal Device #2 and Thermal Device #4, and also toward Thermal Device #1 (since the supply and return loops are bidirectional).

NOTE: In this dynamically balanced two-way configuration, loss (or intentional shutdown) of a pump may be accommodated by adjusting the flow through the remaining variable flow pumps. Points of zero flow, if any, will shift dynamically (by design), since various pumps and thermal devices may have individually determined flows and pressure drops.

In the scenario of FIG. 11, there may be more pumping power (P=4) than optimally advantageous for the pressure drops (D=3) from thermal devices, which may increase the flows beyond what is needed, and may also consume more power than optimally advantageous. In a preferred embodiment, one or more redundant thermal devices may be available so that a failing device may simply be replaced dynamically on demand. In a preferred embodiment where redundant thermal devices are not available, or where such devices may be shut down for other reasons (including lack of demand), the output from each pump [2.100] (which may be a variable flow device) may be reduced so as to compensate for the overall reduction in demand, or one or more pumps may be turned off. In a preferred embodiment, the STEER devices may be under the dynamic control of the SLAM apparatus [1] called out in FIG. 1 and Fig. z2.

The example of FIG. 12 contemplates a scenario similar to FIG. 11, but where a pump device [2.100] fails (or is shut down) and is thus valved off. In this case, the output of Pump #3, which is interposed between Thermal Device #2 and Thermal Device #3, is normally split between the two pressure drops and pushes half of its flow equally to each of them (assuming the pressure drops are equal).

NOTE: In this dynamically balanced two-way configuration, loss (or intentional shutdown) of a thermal device may also be accommodated, by adjusting the flow through the variable flow pumps. Points of zero flow, if any, will shift dynamically (by design), since various pumps and thermal devices may have individually determined flows and pressure drops.

When the output of Pump #3 is shut off, then a point of zero flow may occur in the supply [2a] and return [2b] loops at the location (e.g., [2.103], [2.104]) between pressure drops where the missing pump would normally be. The combined pressure drop of Thermal Device #2 and Thermal Device #3 becomes a low-pressure point (think of downhill flow toward a low point). The outputs from the surviving pumps (which are collectively pushing flows toward the greatest pressure drop from opposite directions in head-on fashion) are exactly equal at a point between Thermal Device #2 and Thermal Device #3. Whenever a zero flow point (e.g., [2.103]) exists in the supply loop [2a], its counterpart (e.g., [2.103]) exists in the return loop [2b].

In the scenario of FIG. 12, there may be less pumping power (P=3) than is needed for the pressure drops (D=4) from thermal devices, which may decrease the flows below what is needed. In a preferred embodiment, one or more redundant pump devices may be available so that a failing pump may simply be replaced dynamically on demand. In a preferred embodiment, the output from each pump [2.100] (which may be a variable flow device) may be increased so as to compensate for an overall reduction in capacity or increase demand, or one or more additional pumps may be turned on. In a preferred embodiment, various of the thermal devices may also have reconfigurable modes or other operational settings that enable dynamic balancing by varying their corresponding pressure drops. In a preferred embodiment, the STEER devices may be under the dynamic control of the SLAM apparatus [1] called out in FIG. 1 and Fig. z2.

STEER Thermal Bus: Multiple Virtual Plumbing Subsystems, Multiple Working Fluids In a preferred embodiment, the STEER Thermal Bus, notionally depicted in the example of FIG. 13, is a reconfigurable thermal exergy "bus" or "virtual plumbing system" that may comprise a separate supply and return for each of potentially several and diverse working fluids (which may also include fuels), wherein each supply (and each return) for a particular working fluid may further comprise one or more individual channels, each of which may carry a potentially unique working fluid within an independently controllable temperature range and pressure range and thereby constitute a relatively independent virtual plumbing subsystem. FIG. 14 provides a corresponding key to the example working fluids and temperature ranges assigned to each channel for illustrative purposes.

In a preferred embodiment, the STEER Thermal Bus is intended to service primarily modular blind-mating subsystems, but may service arbitrary subsystems that can benefit from: 1) an upstream supply of one or more working fluids in particular temperature and pressure ranges, and 2) a downstream return that can accept those same working fluids in temperature and pressure ranges that likely differ from those supplied.

Key constraints and parameters affecting potential virtual plumbing circuits and any subsequent mixing of fluids (which may comprise, for example, both liquids and gases, both single-phase and two-phase fluids, both combustible and non-combustible fluids, and both cryogenic and non-cryogenic fluids), aside from their respective fluids and materials compatibilities, may further include the conservation of energy (inputs and outputs), the need to blend changing temperatures and pressures adaptively while respecting the desired operating ranges, and the need to dynamically and adaptively reconfigure the system in response to the current operational context (such as changing economic factors, demand, resources, capacities, or capabilities).

In a preferred embodiment, the STEER apparatus [2] may further comprise reservoirs, buffers, manifolds, pumps, pipes, sensors, valves (usually computer-controlled, e.g., via SLAM [1], as depicted in FIG. 1) and other components that may collectively work somewhat like a crossbar switch, in order to dynamically control the flow of one or more potentially diverse working fluids between various sources and sinks of thermal exergy, supplying working fluids of different temperatures or pressures as needed to meet specific goals for the availability of the working fluids at specified temperature ranges. The specifics of various STEER apparatus are described in subsequent sections.

In a preferred embodiment each fluid channel and associated devices (including connected devices that may not be part of the STEER apparatus) may be individually super-insulated with temperature-range-appropriate insulation, such as commercially available Pyrogel® XT aerogel (−40° C. to 650° C.) for example channel groups [1a] and [2a], as well as the upper end of [1b] and [2b], and Cryogel® Z aerogel (−270° C. to 90° C.) for the lower end of example channel groups [1b] and [2b]. Insulation techniques for fluids at extremely cold (e.g., cryogenic) or fluctuation-sensitive (e.g., supercritical) temperatures may alternatively or further comprise vacuum-jacketed apparatus, inert gases in interstitial spaces, or other advanced measures.

In a preferred embodiment, various devices to be virtually plumbed may be "plugged" into the STEER Thermal Bus apparatus somewhat like appliances, preferably with blind-mating couplers and valves suitable for the working fluids involved. In a preferred embodiment, any of the devices to be virtually plumbed via pluggable connections (such as via blind-mating couplings) into the STEER Thermal Bus apparatus [2] may also have electrical power and/or signal connections, preferably with blind-mating connectors, that may be connected concurrently with the establishment of working fluid connections, preferably as part of same plug-in operation. In a preferred embodiment, the establishment of working fluid connections may not imply (and typically will not imply) the establishment of any physical or virtual plumbing circuit or path, which may only be effected by subsequent control operations, such as by the SLAM apparatus [1] depicted in FIG. 1.

The STEER apparatus [2] ingress/egress arrows and temperature ranges depicted in FIG. 1 and in FIG. 13 (as well as in subsequent figures) are notional and may not individually fully represent a workable system. In practice, more working fluids and operating ranges may typically be depicted in order to more fully describe a particular operational context or configuration (in practice, as many ranges as needed may be used). Whereas FIG. 1 depicts a notional thermal bus with only four broad (and non-specific) temperature ranges, and without reference to specific working fluids, operating temperature ranges, or operating pressure ranges, FIG. 13 provides fourteen temperature ranges and additional detail for an example embodiment which may be nonetheless limited in scope for the sake of simplicity.

In a preferred embodiment, valves (other than check valves) in the STEER apparatus [2] may typically be of the latching type, remotely controllable (e.g., by SLAM [1]), which, once set to their particular open/closed settings, may retain their settings indefinitely without any additional control or power input (a minor amount of power may be required only to initialize any valve to its desired open/closed setting, such as may be required for a magnetic latching valve, motorized valve, pneumatic valve, or other dynamically actuated valve).

In a preferred embodiment, operating conditions affecting the STEER apparatus [2] may be monitored (e.g., by SLAM [1]) via appropriately located sensors capable of sensing the properties to be monitored (e.g., temperature, pressure, flow, composition, etc.) with the required accuracy and precision, and with the required levels of reliability, availability, and redundancy.

In the conceptual example depicted in FIG. 13, a total of fourteen somewhat overlapping temperature ranges is shown for supply [2a] and return [2b] channels associated with three exemplary working fluids (working fluids are discussed in the next section). FIG. 13 is oriented toward temperature ranges of exemplary fluids and does not indicate operating pressures, but in principle and practice as many working fluids and as many operating temperature and pressure ranges as are needed may be used.

Rather than repeating depictions similar to FIG. 13 throughout this document, a simplified scheme is used to minimize the clutter in drawings which relate to the STEER Thermal Bus. In particular, whenever a flow is to originate from a STEER Thermal Bus supply line, it is labeled with the letter "S" (supply) and a number from 0 to 13 denoting a particular channel. Similarly, whenever a flow is to terminate at a STEER Thermal Bus return line, it is labeled with the letter "R" (return) and a number from 0 to 13 denoting a particular channel. FIG. 14 provides a key to the example working fluids and temperature ranges assigned to each channel for illustrative purposes (i.e., to illustrate the connectivity and functionality of various exemplary apparatus that may be connected to the STEER Thermal Bus).

Starting from the bottom of the example 14-channel STEER Thermal Bus, FIG. 13 and FIG. 14 depict four useful and somewhat overlapping temperature ranges for the supply [2.3a] and return [2.3b] of a cryogenic fuel RUBE™ CF fluid (in this example, RUBE™ CF is liquefied natural gas, or LNG). Similarly, six somewhat overlapping temperature ranges are depicted for the supply [2.2a] and return [2.2b] of a low-boiling point phase-change working fluid such as RUBE™ LT2 (e.g., an engineered dielectric thermal fluid). Immediately above those are positioned four somewhat overlapping temperature ranges for the supply [2.1a] and return [2.1b] of a higher-temperature single-phase working fluid such as RUBE™ HT1 (e.g., a thermal oil). Example candidates for various working fluids are listed in the tables of FIG. 30, FIG. 31, FIG. 32, FIG. 33, FIG. 34, and FIG. 35.

STEER Thermal Bus: Circuit Conventions for Connecting Supplies and Returns

For simplicity and flexibility, the STEER Thermal Bus apparatus [2], such as that depicted in FIG. 13, comprises five conceptual components: 1) supply channels, 2) return channels, 3) flow consumers, 4) flow producers, and 5) flow controls. The simplest circuit comprises a loop wherein a fluid supply channel may connect through a flow control to the ingress of a flow consumer, the egress of a flow consumer may connect through a flow control to a fluid return channel, the return channel may connect through a flow control to the ingress of a flow producer, and the egress of the flow producer may connect through a flow control to the original fluid supply channel, thus completing the loop.

In a preferred embodiment, the STEER Thermal Bus [2a] Supply channels and STEER Thermal Bus [2b] Return channels comprise pipe, tubing, manifolds, and other passive components further comprising materials and construction that may be compatible with, and suitable for, whatever fluid is intended to flow within. Additionally, said fluid supply and return channels may have varying capacities, useful/allowable operating temperature/pressure ranges, fluid compatibilities in general, or specific chemical resistances. In a preferred embodiment, the construction of some fluid channels may be oriented to materials suitability or compatibility with particular fluids, temperatures, pressures, or safety requirements. For example, as previously explained, in a preferred embodiment, channels for hot or cold fluids may be well insulated, such as with aerogel-based materials, whereas channels for cryogenic fluids may be vacuum-jacketed (possibly in addition to other insulation). In a preferred embodiment, there may be multiple independent supply and return channels for each type of fluid and operating temperature/pressure range (which may mean that there may be multiple independent channels for fluids of a given type that may be present in different phases (e.g., liquid, vapor, or liquid/vapor combinations).

Flow "consumers" such as heat exchangers or other devices which may accept pressurized flows at one or more ingress ports and pass said flows to one or more egress ports (typically with a net flow resistance of some sort, which may be manifest as a pressure drop) may be typically arranged so that their ingress ports may conceptually connect through flow controls to one or more STEER Thermal Bus [2a] Supply channels, and their egress ports may conceptually connect through flow controls to one or more STEER Thermal Bus [2b] Return channels.

NOTE: In a preferred embodiment, some flow "consumers" may be advantageously connected to STEER Thermal Bus [2a] Supply channels and STEER Thermal Bus [2b] Return channels through dynamically reconfigurable reversing devices (see FIG. 25, FIG. 26, and FIG. 27, and associated discussion). This enables flow in a forward or reverse direction through a flow "consumer" thusly connected, without requiring reversible pumps (or reversing action, even if pumps are reversible, and they're usually not).

Flow "producers" such as pumps or other devices which may actively operate against a partial vacuum at an ingress port or operate against back pressure at an egress port, or both, in such a way as to increase said partial vacuum at in ingress port or increase the pressure at an egress port, or both, may be typically arranged so that their ingress ports may conceptually connect through flow controls to one or more STEER Thermal Bus [2b] Return channels, and their egress ports may conceptually connect through flow controls to one or more STEER Thermal Bus [2a] Supply channels.

In this context, "flow controls" refers to substantially passive devices such as check valves, shut-off valves, variable-flow valves, magnetic latching valves, motorized valves, blind-mate couplers with build-in quick-connect valves, or other devices capable of interrupting, varying, regulating, or otherwise controlling the flow, but generally excluding devices which may be better categorized as flow producers (e.g., pumps) according to the previous paragraph. Although flow controls may be active in the electromechanical sense (so as to enable automated flow control), they may be viewed as passive with respect to the flows under control (i.e., said flows experience negligible increases or decreases in exergy which are inherently due to the presence of said flow controls, excluding commanded flow restrictions or interruptions).

2.4 STEER Flow-Switching Mechanisms

In a preferred embodiment, the STEER apparatus may implement a reconfigurable virtual plumbing system that may further comprise sensors, reservoirs, manifolds, pumps, valves (usually computer-controlled), and other components, which may collectively work somewhat like an active, regenerative crossbar switch, in order to dynamically monitor and control the flow of working fluid between various sources and sinks of thermal exergy, such as the arbitrary subsystem [3.1], mixing working fluid of different temperatures and pressures as needed to meet specific goals for the availability of the working fluid to the arbitrary subsystem [3.1] at the temperature ranges it needs.

In the example depicted in FIG. 13, the arbitrary subsystem [3.1] may need to be supplied only one working fluid, but potentially at three different ingress ports [3.10a] [3.11a] [3.12a], each of which may require a specific combination of inlet temperature, pressure, and volumetric flow or mass-flow rate, and each of which has a corresponding egress port [3.10b], [3.11b], or [3.12b], also with an associated outlet temperature, pressure, and volumetric flow or mass-flow rate. In this example, the first inlet port [3.10a] in FIG. 13 may be connected to the outlet of a 4-port digital mixer valve [2.4a], each of whose upstream inlet ports may connect to one of the four lowest temperature supply channels of the six RUBE™ LT2 supply channels [2.2a] available. What this means is the first inlet port [3.10a] of arbitrary subsystem [3.1] may be supplied with working fluid from any one of the four available channels depicted, or any mix of working fluid from any combination of channels, with a specified percentage from each channel. For example, if the temperatures currently available in the four channels are −60° C., 10° C., 15° C., and 38° C., FRAME may direct the STEER apparatus, via digital mixer valve [2.4a], to deliver working fluid to inlet port [3.10a] in the following flow percentages: 25% at −60° C., 50% at 10° C., 25% at 15° C., and 0% at 38° C.

Within this document, when there are multiple ingress and egress ports, and when the internal flows of a depicted device are not shown (as if the labels for ports [3.10b], [3.11b], and [3.12b] were missing from the arbitrary subsystem [3.1] box of FIG. 6), the corresponding ingress and egress ports will typically be aligned vertically relative to each other, implying an internal path of some sort between them. Thus, in the example of FIG. 13, since the 4-port digital splitter valve [2.4b] and its egress port are depicted as being aligned vertically with the corresponding digital mixer valve [2.4a] and its ingress port, and since no internal flows are shown, it may be assumed (i.e., even without the labels) that there is some internal path between the corresponding ingress and egress ports, such that under computer control, flow from the ingress port may exit the egress port and pass through splitter valve [2.4b], which may distribute a percentage of the egress flow to each of the four return channels to which it connects (i.e., to the four lowest temperature return channels of the six depicted RUBE™ LT2 fluid return channels [2.22b] available). As depicted, the four return channels connected at splitter valve [7] may be in the same four temperature ranges as the supply channels connected at ingress [4], but this need not be the case (and may often not be, especially if there may be a significant temperature shift that may normally occur within the arbitrary subsystem [3.1]). The other ingress/egress port-pairs of arbitrary subsystem [3.1] may work similarly (i.e., mixer valves [2.5a] correspond with splitter valves [2.5b], and mixer valves [2.6a] correspond with splitter valves [2.6b], respectively). Note, however, that while the temperature ranges associated with supply-side mixer valves [2.6a] may overlap those of corresponding return-side splitter valves [2.6b], they may not always be identical, as depicted. In this example, the non-identical inlet and outlet temperature ranges may be due to an anticipated temperature increase caused by arbitrary subsystem [3.1]), and this situation may be quite common in practice.

In general, the interfaces between an arbitrary subsystem [3.1] and its supply channels [2a] and return channels [2b] may have digital mixer valves (e.g., like [2.4a], [2.5a], and [2.6a]) interposed on the supply side, and corresponding digital splitter valves (e.g., like [2.4b], [2.5b], and [2.6b], respectively) interposed on the return side. In a preferred embodiment, the interposing mixer valves (e.g., [2.4a], [2.5a], and [2.6a]) and splitter valves (e.g., [2.4b], [2.5b], and [2.6b]) that may be associated with a particular arbitrary subsystem [3.1] may be implemented internal to, and contained within, the arbitrary subsystem [3.1] itself, although for clarity such valves may typically be depicted external to most arbitrary subsystems [3.1] throughout this document. One implication of this is that an arbitrary subsystem [3.1] needing access only to specific working fluids and/or temperature ranges may need to embed only the preferred mixer and splitter valves for the desired fluids and ranges. Note that mixers and splitters which internally have no check valves or other internal directional flow constraints may be interchangeable, and any such device may be referred to as a "mixer-splitter," especially when used in a bidirectional flow context.

The key limitations driving the various dynamic mixing and splitting configurations may be the conservation of energy (inputs and outputs), the need to blend changing temperatures and pressures adaptively while respecting the desired operating ranges, and the need to dynamically and adaptively reconfigure the system in response to the current context (such as a change in economic factors, a change in demand or priorities, and a change in or loss of resources, capacities, or capabilities). Note that the STEER apparatus [2a] [2b] ingress/egress directional arrows and temperature ranges depicted in this document's diagrams are notional and may vary considerably in a working system (for example, because the plumbing "circuits" are virtual, a temperature range in a physical segment may be significantly shifted or even dynamically repurposed so as to increase the capacity of some other range).

STEER Redundant Latching Digital Rate Control (Modular)

In a preferred embodiment, valves in the STEER apparatus [2], once set to their particular open/closed settings, may retain their settings indefinitely without any additional power input (a minor amount of power may be required only to initialize any valve to its desired open/closed setting, such as may be required for a magnetic latching valve, motorized valve, pneumatic valve, or other dynamically actuated valve).

As described earlier, the STEER apparatus and STEER "Thermal Bus" (depicted as [2] in FIG. 1) is conceptually a reconfigurable thermal exergy "bus" or "virtual plumbing system" comprising a separate supply and return for each of potentially several and diverse working fluids, wherein each supply (and each return) for a particular working fluid may further comprise a multiplicity of individual channels, each of which may carry working fluid within an independently controllable temperature range and pressure range.

In a preferred embodiment, the STEER apparatus may derive a large degree of reconfigurability from sets of digitally controllable "latching" valves or "fluid switches" that may require energy inputs only to change from one configuration to another (but in general, not to hold a desired switch configuration). In a preferred embodiment, magnetic latching valves may be used in modular arrangements to implement the desired fluid-switching capabilities. In another embodiment, various types of motorized or pneumatic valves may be used. In any embodiment, it may be optimally advantageous to select valves and latching mechanisms that are compatible with and appropriate for the fluids to be switched, taking into account the associated fluid operating temperatures, pressures, flammability, volatility, toxicity properties, as well as other properties, in conjunction with other constraints, including applicable standards, laws, and regulatory requirements.

One embodiment of digitally controllable "latching" valves, a "Latching Digital Rate Control" [230], is described in US20090216910 (see FIG. 62) (PRIOR ART), which is incorporated herein by this reference. As can be seen in an example of the described apparatus, depicted in FIG. 15, three of said devices [230] are in series, each having four digital latching valves tied to a shared ingress manifold [232] and a shared egress manifold [234], but it should be noted that any number (fewer or more) of such digital latching valves may be so configured in order to meet particular requirements, such as redundancy, granularity of flow control, pressure drop, or aggregate flow rate.

Although a configuration of four digital latching valves with two positions each (i.e., open, closed) yields 16 possible combinations ($2^4=2^4=16$), the various combinations are not all unique, as described in US20090216910, and this is similarly true for other numbers of valves. As described in US20090216910, there are effectively five different flow rates possible with a 4-valve setup (0%, 25%, 50%, 75%, and 100%), with varying redundancy, which is sufficient both for teaching the prior and instant inventions, and also for many practical applications.

While additional valves in parallel may provide enable finer-grained rate control, redundancy may be enhanced primarily for "stuck-closed" type faults (i.e., failure to open). In other words, if a particular valve will not open, a different valve may be opened instead (in the case of multiple failures, or a call for 100% flow, the stuck-closed valves may not enable the full flow rate requested). In a preferred embodiment, however, duty may be rotated among the switches for all flow rate settings other than 0% and 100%, and this may increase the useful lifetime of the overall configuration by distributing the switching load. In the case of "stuck-open" faults (i.e., failure to close), any unit with one or more valves stuck open will not be able to restrict the flow rate below the aggregate flow rates of the stuck-open valves. Thus, in a non-redundant 4-valve digital rate control unit [230] as depicted in FIG. 62 of US20090216910 (PRIOR ART), a single failed valve in the stuck-open position means that the overall flow rate may not be reduced below 25% of the maximum flow (assuming that each valve can deliver at most 25% of the total capacity, which might not actually be the case).

Figure 15:
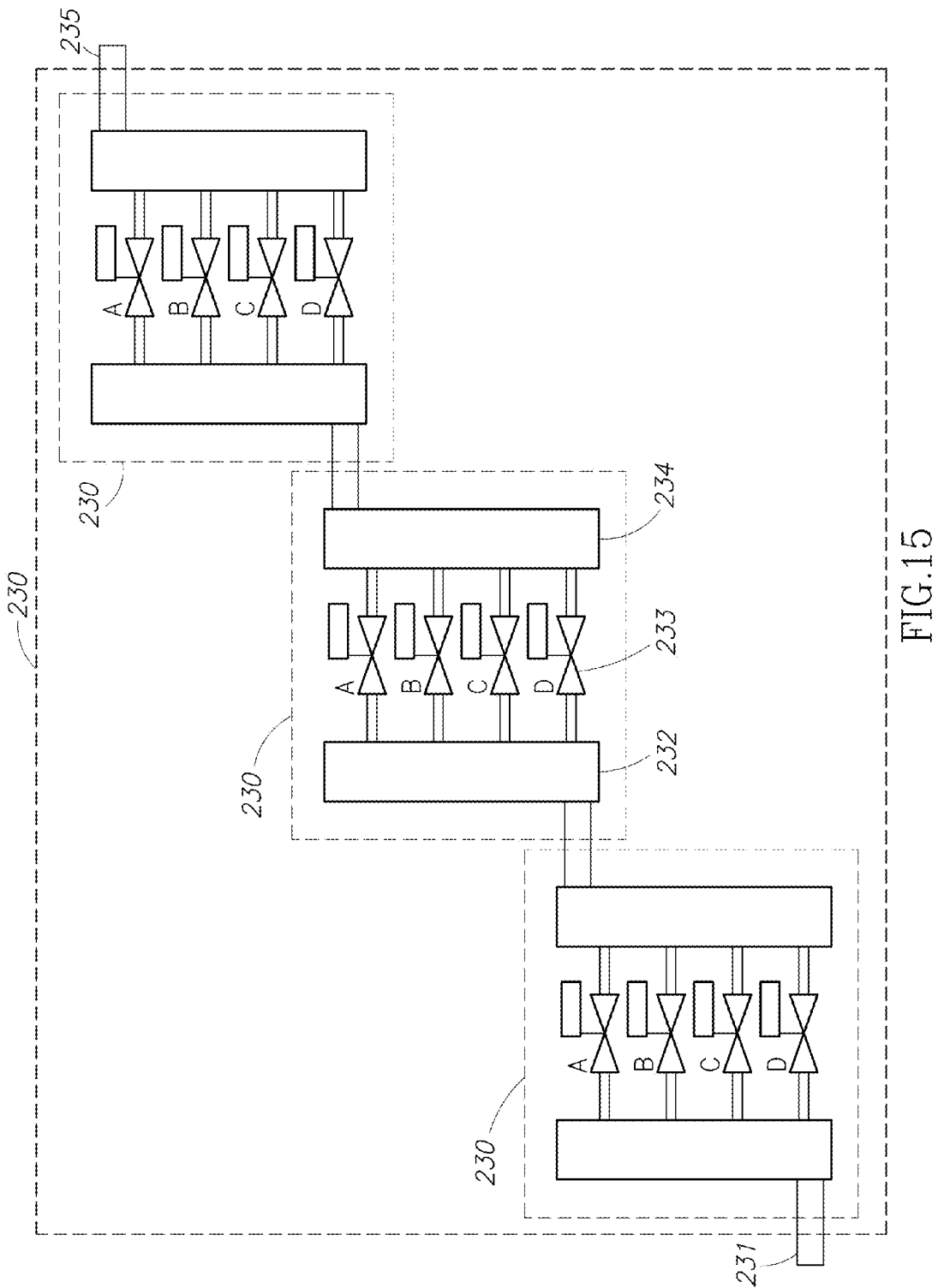
FIG. 15: STEER Redundant Latching Digital Rate Control (Modular)
Figure 62:
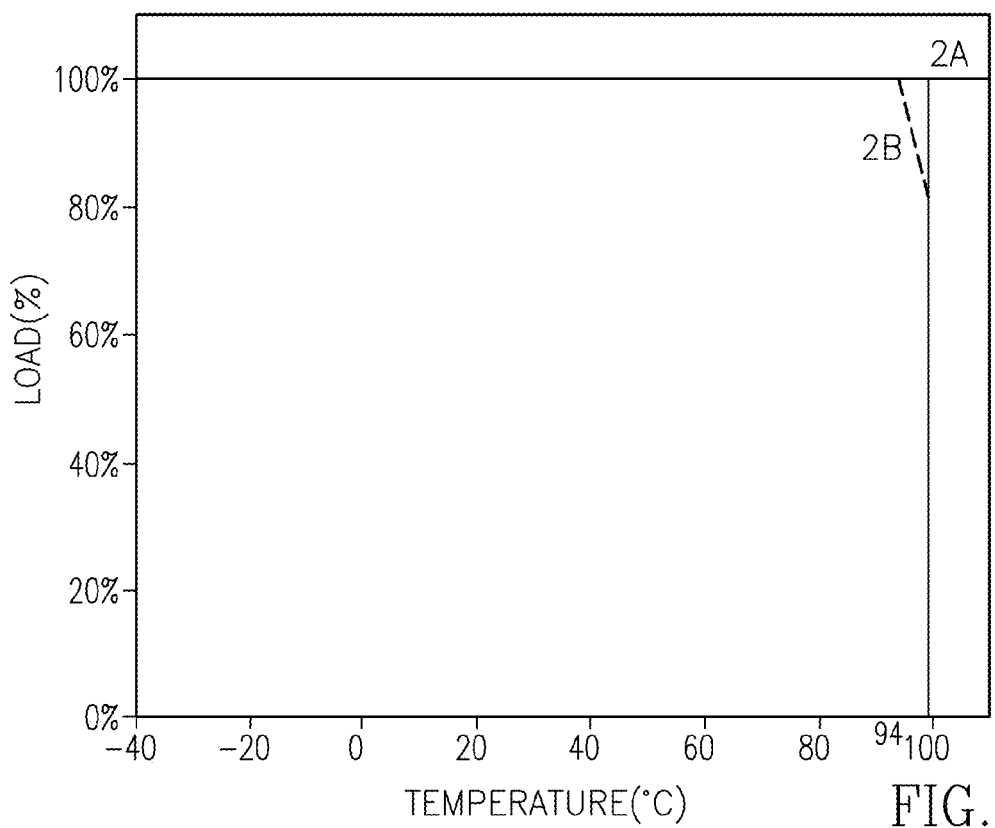
FIG. 62: Example Temperature-Based Derating Curves for High-Reliability Electronics Cooling Loads 2A & 2B

In a preferred embodiment of a modularly redundant implementation of "Latching Digital Rate Control" [230] as described in FIG. 62 of US20090216910 (PRIOR ART), a plurality of the aforementioned Latching Digital Rate Control units [230] may be placed in series as depicted in the cascade diagram of FIG. 15 (effectively creating a series-parallel configuration), where the number of units in series may be determined according to various factors such as degree of redundancy desired, cost constraints, space constraints, pressure drop constraints, and so on. In FIG. 15, three 4-valve Latching Digital Rate Control units [230] are placed in series, thus ensuring that the flow rate can be set to 0% even if two of the three units suffer from any number of stuck-open faults (at least one of the units in series must be able to close all its valves to achieve a 0% flow). By placing the appropriate number of such units in series, an arbitrary number of stuck-open faults may be endured, with graceful degradation. Note that in FIG. 15, the series arrangement of three units [230] is also labeled "[230]" to indicate that the redundant series-parallel unit may serve as a drop-in replacement for the less-redundant parallel-only unit [230] depicted in FIG. 62 of US20090216910 (PRIOR ART).

STEER Redundant Latching Digital Rate Control (Integrated)

Figure 16:
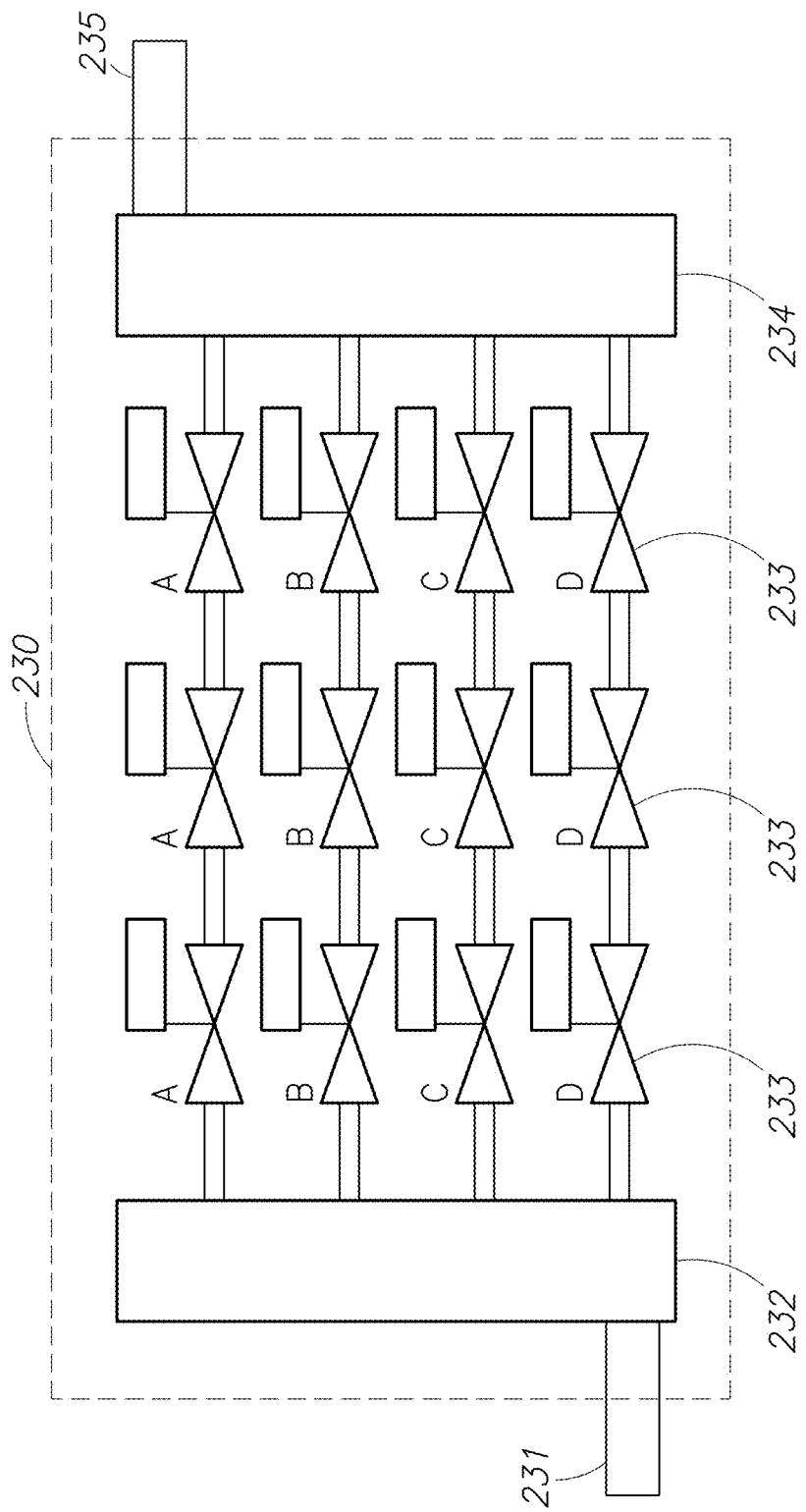
FIG. 16: STEER Redundant Latching Digital Rate Control (Integrated)

FIG. 16 depicts an alternative embodiment of a modularly redundant implementation of "Latching Digital Rate Control" [230] as described in FIG. 62 from US20090216910 (PRIOR ART). Rather than placing a plurality of the aforementioned Latching Digital Rate Control units [230] in series in a modular way as depicted in FIG. 15 (effectively creating a series-parallel configuration), each individual valve may instead be replicated in an integrated way, internal to the unit, which may have additional benefits such as reduced pressure drop, fewer external or otherwise exposed connections, lower total cost, and improved ability to handle stuck-open faults (i.e., failure to close). As depicted in FIG. 16, the integrated version may eliminate two internal ingress manifolds [232] and two egress manifolds [234] from the modular version of FIG. 15.

Similarly to FIG. 15, the number of valves in series may be determined according to various factors such as degree of redundancy desired, cost constraints, space constraints, pressure drop constraints, and so on. In FIG. 16, the equivalent of three 4-valve Latching Digital Rate Control units [230] are placed in series. However, whereas the modular version of FIG. 15 could ensure that flow rate may be set to 0% even if two of the three units suffer from any number of stuck-open faults (at least one of the units must be able to close all its valves to achieve a 0% flow), this configuration may improve on that; as long as at least one valve can close successfully along each path, a 0% flow may be achieved.

By placing the appropriate number of valves in series, an arbitrary number of stuck-open faults may be endured, with improved graceful degradation. Note that in FIG. 16, the series-parallel arrangement of twelve valves is still labeled "[230]" to indicate that the redundant series-parallel unit may serve as a drop-in replacement for the less-redundant parallel-only unit [230] as depicted in FIG. 62 of US20090216910 (PRIOR ART).

Effectively, as the Latching Digital Rate Control [230] is described in US20090216910 (see FIG. 62) (PRIOR ART), there may be five different flow rates possible with a 4-valve setup (0%, 25%, 50%, 75%, and 100%), and this is also true for both of the series-parallel redundant versions (see FIG. 15 and FIG. 16). As with the unit described in US20090216910 (see FIG. 62) (PRIOR ART), redundancy may be enhanced for "stuck-closed" type faults (i.e., failure to open) by virtue of having four valves in parallel, because if a particular valve will not open, a different valve may be opened instead (in the case of multiple failures, or a call for 100% flow, the stuck-closed valves still may not enable the full flow rate requested). Improving upon the unit described in US20090216910 (PRIOR ART), redundancy may be enhanced for "stuck-open" type faults (i.e., failure to close) by virtue of having three valves in series along each path, because if a particular valve will not close, a different valve in that path may be closed instead (in the case of too many failures, such as all three valves in the same path, the successfully closed valves still may not enable the restricted flow rate requested).

In a preferred embodiment, with redundancy based on either series-parallel configuration of a Latching Digital Rate Control [230] (i.e., as in FIG. 15 or FIG. 16), normal duty may be rotated among the non-failing switches for all flow rate settings, including 0% and 100%, and this may increase the useful lifetime of the overall configuration by distributing the switching load.

STEER Latching 4-Port Digital Mixer Valve—Example

Figure 17:
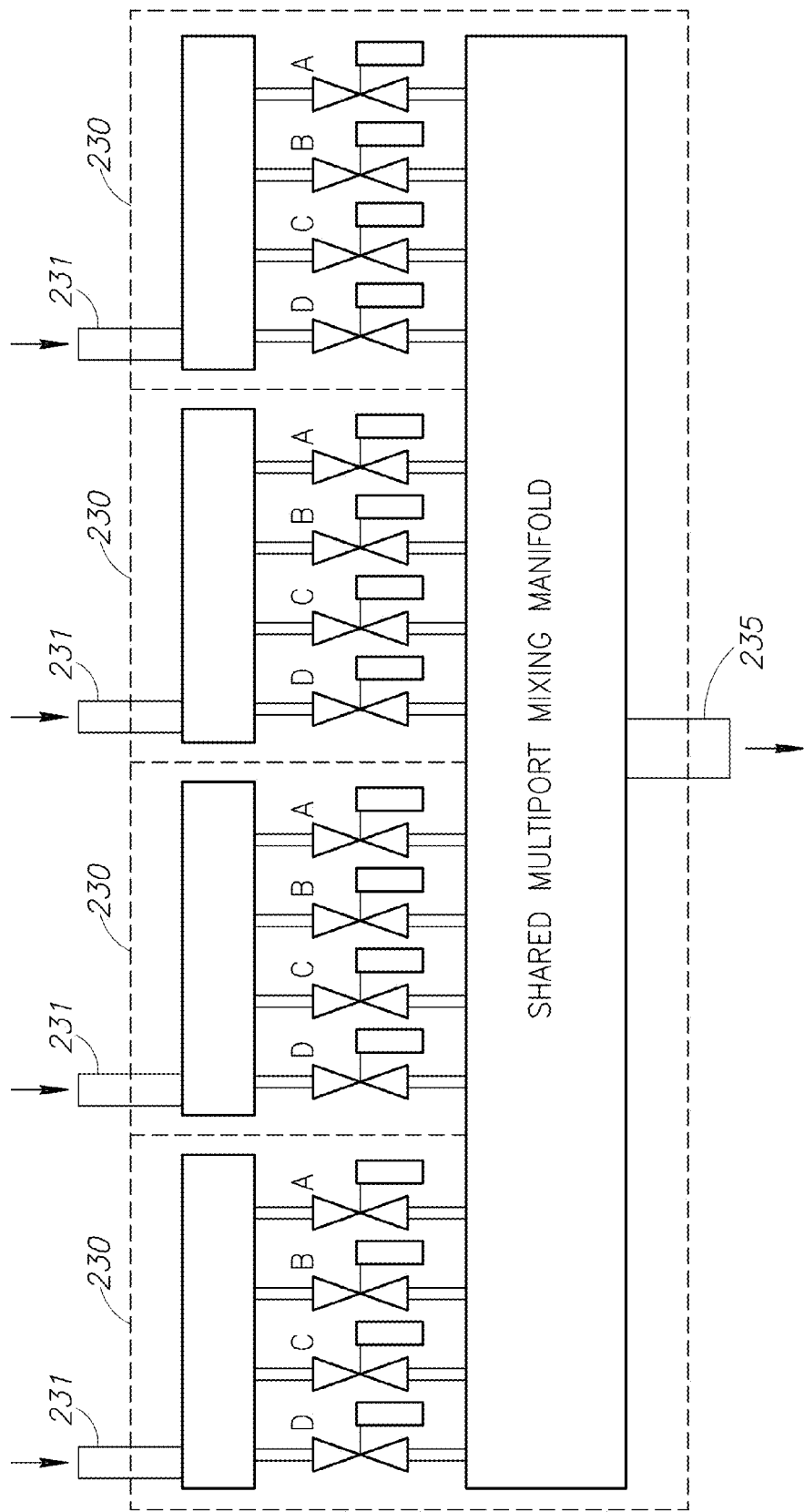
FIG. 17: STEER Latching 4-Port Digital Mixer Valve—Example

As described earlier, the STEER apparatus and STEER "Thermal Bus" (depicted as [2] in FIG. 1) is conceptually a reconfigurable "virtual plumbing system" comprising a separate supply and return for each of potentially several and diverse working fluids, wherein each supply (and each return) for a particular working fluid may further comprise a multiplicity of individual channels, each of which may carry working fluid within an independently controllable temperature range and pressure range. FIG. 17, below, depicts an example embodiment of a digital mixer valve [2.4a] which may be used to accomplish such reconfigurability.

Although the example digital mixer valve [2.4a] depicted in FIG. 17 has four individual ingress ports [231], it should be understood that any convenient number of ports may be implemented. In a preferred embodiment, each egress port [231] comprises a latching digital rate control [230] as described in FIG. 62 from US20090216910 (PRIOR ART), but with a shared multiport mixing manifold (see FIG. 17), and has associated with it the same number of digital rate control valves as its sibling ports, and thus the same redundancy and granularity of flow rate control, but this need not be so (a difference in surviving redundancy and rate control granularity may also occur in the case of failure of one or more internal valves, depending on the built-in redundancy scheme).

In a preferred embodiment, the STEER apparatus achieves a large degree of reconfigurability from sets of digitally controllable "latching" valves or "fluid switches" that may be variously configured to achieve ingress flows from one or more supply channels, while mixing operating temperatures and pressures as optimally advantageous to deliver a fluid stream that is within specification, but also optimal for the current operating conditions, and particularly, as near-optimal as practical for the receiving device(s). In a preferred embodiment, a configuration referred to here as a digital mixer valve [2.4a] and depicted in FIG. 17 comprises one or more individual ingress ports [231], each of which feeds its own latching digital rate control valve [230], further comprising an individual ingress manifold [232] and one or more internal latching digital control valves, the collective output of which feeds a shared multiport mixing manifold, which feeds a shared egress port [235] that may supply a target device or subsystem. The one or more latching digital rate control valves [230] may each (independently) be of the partially parallel-redundant type described in FIG. 62 of US20090216910, or a series-parallel redundant type as previously described and depicted in FIG. 15 and FIG. 16.

In a preferred embodiment of the STEER apparatus, each ingress port [231] of a digital mixer valve [2.4a] may be connected to a particular supply channel of the STEER Thermal Bus, such that said channel may supply a particular working fluid at a particular temperature, operating pressure, and flow rate, all of which may vary over time under system control. In a preferred embodiment, all of the ports (of those connected) of a given digital mixer valve [2.4a] may typically be connected to supplies of the same type of fluid, with the digital mixer valve [2.4a] providing the mixing of thermodynamic properties rather than actually different fluids, in most situations. Note that different types of compatible fluids may also be mixed, however, under system control, if that is what is needed. Further, one type of fluid may be used at one point in time, on all ports, with a dynamic transition to a different fluid at another point in time, under system control. In the case of incompatible current and target fluids, one or more transition fluids may be used to transition between one or more current fluids and one or more target fluids.

In a preferred embodiment, valves in the digital mixer valve [2.4a], once set to their particular open/closed settings, may retain their settings indefinitely without any additional power input. A minor amount of power may be required to initialize any valve to its desired open/closed setting, such as may be required for a magnetic latching valve, motorized valve, pneumatic valve, or other actuated valve, but a subsequent loss of power may not cause the valve to revert to a previous setting, or to any new setting without further intentional control inputs.

In a preferred embodiment of the STEER apparatus, each ingress port [231] or shared egress port of a digital mixer valve [2.4a] may be equipped with a suitable internal or external check valve (not shown) to ensure that flow occurs only in the direction of the arrows depicted in FIG. 17. Otherwise, it may be possible for unwanted flows ("sneak circuits") to occur, since there may be no requirement or expectation that the various sources and sinks operate at the same temperatures, pressures, or flow rates. If said check valves are implemented external to digital mixer valve [2.4a] and may be directionally reversed, then digital mixer valve [2.4a] is a dual of the digital splitter valve [2.4b] as described in the next section, and either may substitute for the other's functionally (which may avoid the need to manufacture and inventory two different assemblies).

STEER Latching 4-Port Digital Splitter Valve—Example

After a target device or subsystem has been supplied with a stream of working fluid via a digital mixer valve [2.4a] as described in the FIG. 17, the stream may eventually exit the target and return to the STEER Thermal Bus, thereby completing at least one physical and virtual circuit. In a preferred embodiment, the exiting working fluid stream may be directed to the shared ingress port of a digital splitter valve [2.4b], as depicted in FIG. 18, below, which may cause the stream to be dynamically apportioned to its egress ports under system control, which may thereby effect an optimal split-stream return to the STEER Thermal Bus via one or more channels.

Figure 18:
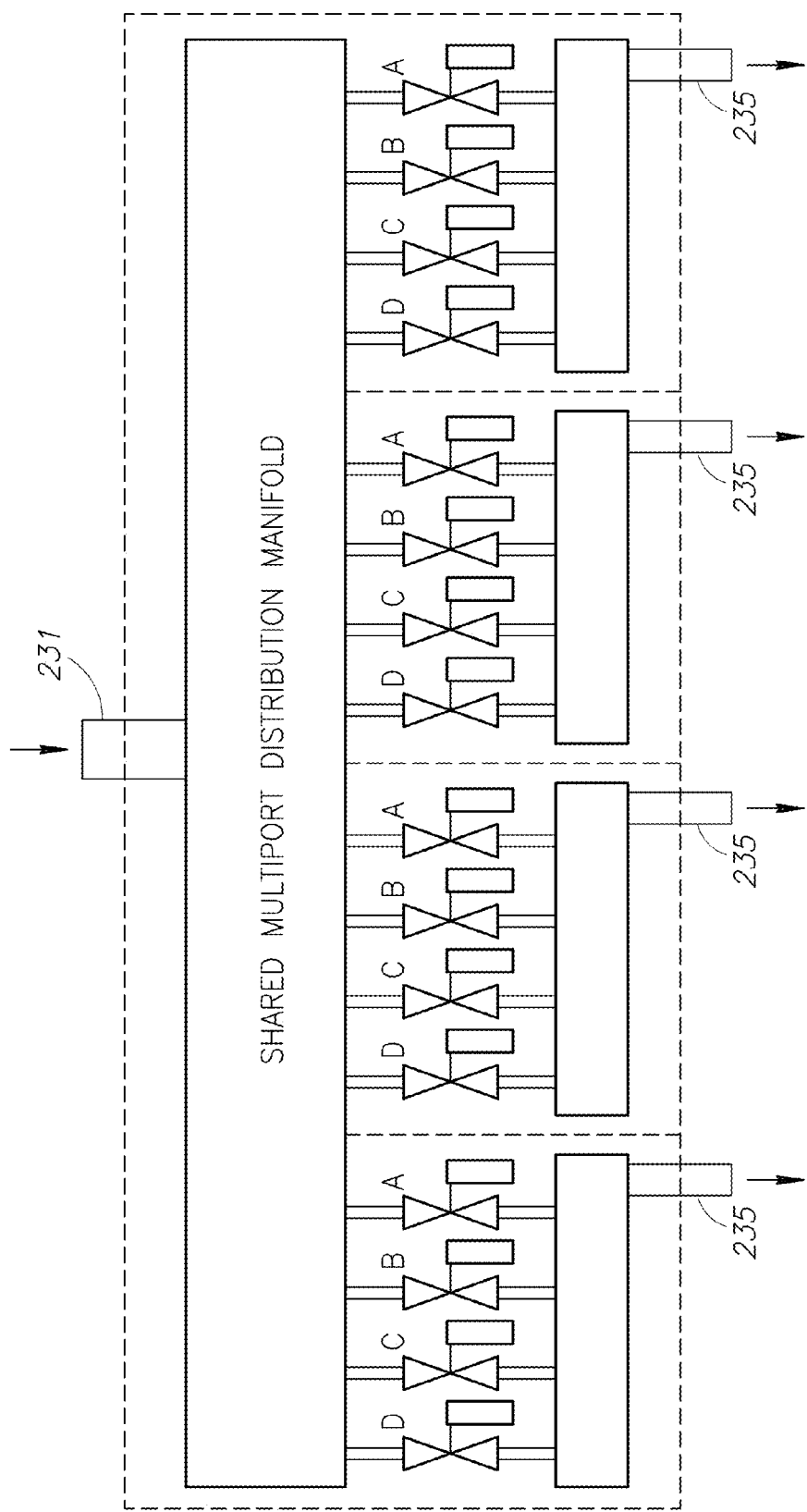
FIG. 18: STEER Latching 4-Port Digital Splitter Valve—Example

Although the example digital splitter valve [2.4b] is depicted in FIG. 18 with four egress ports, it should be understood that any convenient number of ports may be implemented. In a preferred embodiment, each egress port may have associated with it the same number of digital rate control valves as its sibling ports, and thus the same redundancy and granularity of flow rate control, but this need not be so (differences in surviving redundancy and rate control granularity may also occur in the case of failure of one or more internal valves, depending on the built-in redundancy scheme).

In a preferred embodiment, a configuration referred to here as a digital splitter valve [2.4b] and depicted in FIG. 18 may comprise a shared ingress port, which may feed a shared multiport distribution manifold, which may feed one or more latching digital rate control valves [230], each further comprising one or more internal digital latching valves (which may be fed by a shared multiport distribution manifold) which may collectively feed an associated individual egress manifold [234], which may feed an associated single individual egress port [235]. The one or more latching digital rate control valves [230] may each (independently) be of the partially parallel-redundant type described in US20090216910 (see FIG. 62, which also appears in FIG. 17), or a series-parallel redundant type as described in previous figures).

In a preferred embodiment, the STEER apparatus may monitor the temperatures, pressures, and flow rates exiting the target device and entering the shared ingress port of the digital splitter valve [2.4b], and such information, in conjunction with other sensory information, operating parameters, goals, and control policy, may be used to dynamically determine the desired apportionment across the splitter valve's individual egress ports.

In a preferred embodiment of the STEER apparatus, each egress port [235] of a digital splitter valve [2.4b] may be connected to a particular return channel of the STEER Thermal Bus, such that said channel may accept the particular working fluid at the available temperature, operating pressure, and flow rate, all of which may vary over time under system control. In a preferred embodiment, all of the ports (of those connected) of a given digital splitter valve [2.4b] may typically be connected to return channels that may accept the temperature and type of fluid supplied at the shared ingress port (and such type may actually be a mixture, which would be seen as inseparable by the digital splitter valve [2.4b]), with the digital splitter valve [2.4b] providing the splitting of flow rates and pressures (and specifically, not the separation of fluids by temperature or type).

Note that, in some situations, different types of compatible fluids may arrive at the shared ingress port already mixed, under system control. These cannot be separated by a digital splitter valve [2.4b], which is capable only of apportionment. However, a digital splitter valve [2.4b] may be connected to return channels of different fluid types, such that, under system control, a different but compatible fluid may be injected into the return channel. Further, one type of fluid may be used at one point in time, on all ports, with a dynamic transition to a different fluid at another point in time, under system control. In the case of incompatible current and target fluids, one or more transition fluids may be used to transition between one or more current fluids and one or more target fluids.

In a preferred embodiment, valves in the digital splitter valve [2.4b], once set to their particular open/closed settings may retain their settings indefinitely without any additional power input. A minor amount of power may be required to initialize any valve to its desired open/closed setting, such as may be required for a magnetic latching valve, motorized valve, pneumatic valve, or other actuated valve.

In a preferred embodiment of the STEER apparatus, the shared ingress port or each egress port [235] of a digital splitter valve [2.4b] may be equipped with a suitable internal or external check valve (not shown) to ensure that flow occurs only in the direction of the arrows depicted in FIG. 18. Otherwise, it may be possible for unwanted flows ("sneak circuits") to occur, since there may be no requirement or expectation that the various sources and sinks operate at the same temperatures, pressures, or flow rates.

STEER Parallel-Series Virtual Reconfigurator

Figures 19, 20:
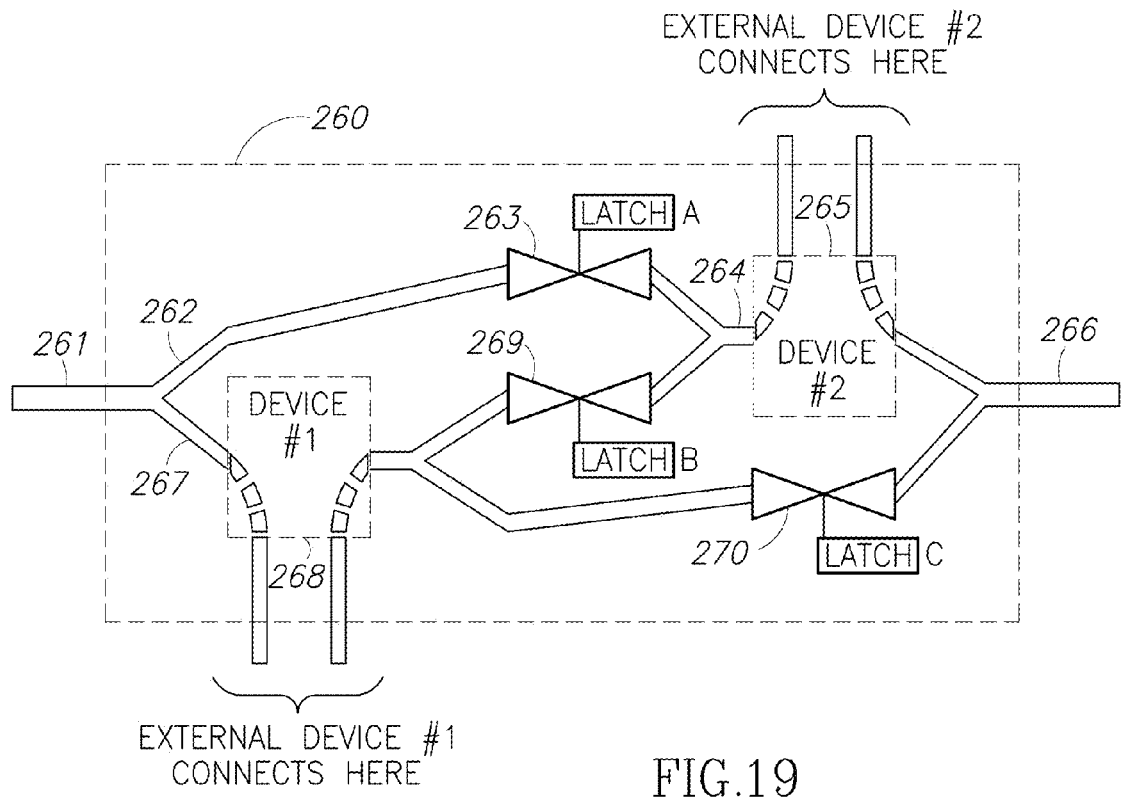
FIG. 19: STEER Parallel-Series Virtual Reconfigurator
FIG. 20: Example Truth Table for FIG. 19 STEER Parallel-Series Virtual Reconfigurator

FIG. 19 depicts an embodiment of a modularly redundant implementation of "Parallel-Series Virtual Reconfigurator" [260] (hereafter, also simply "Reconfigurator [260]") as described in US20090216910 (see FIG. 66), which is incorporated herein by this reference. In a preferred embodiment, in order to dynamically reconfigure the flow to various fluid-based devices without actually modifying the physical plumbing connections, for example by using digital control signals, the STEER apparatus may advantageously comprise one or more Reconfigurators [260].

For simplicity, in a preferred embodiment each Reconfigurator [260] may support only two devices, and larger configurations may be supported by treating each two-device Reconfigurator [260] as a single device that may be substituted into a separate Reconfigurator [260] apparatus operating at a higher level.

In an alternate embodiment, and with potentially increased complexity, additional devices may be supported within a single Reconfigurator [260] by introducing additional control variables as desired and defining the appropriate control states. In a preferred embodiment, a Reconfigurator's configuration may be determined by a truth table such as one having three binary control variables (i.e., logical control inputs, where "0" means "off, "1" means "on,", and "X,", if present, means "don't care" or "doesn't matter"), as in FIG. 20, and thus having eight ($2^3=2^{\wedge}3=8$) possible states, of which five (those highlighted in the truth table) may be generally valid (the other three states may not normally be needed, but may be used for special circumstances or unusual devices).

In a preferred embodiment, a Reconfigurator [260] may be used to dynamically "re-plumb" a mated pair of devices (e.g., Device #1 [268] and Device #2 [265] of FIG. 66) from a parallel configuration (i.e., A=On, B=Off, C=On) to a serial configuration (i.e., A=Off, B=On, C=Off), or vice-versa. In a preferred embodiment, multiple Reconfigurators [260] may be combined as optimally advantageous to achieve nearly arbitrary parallel-series combinations. For example, in an environment where the energy availability, power requirements, cooling load, ambient temperature, etc., are all changing dynamically, and possibly dramatically, it may be very difficult to "tune" the system to a configuration that is optimal using conventional means.

However, the use of Reconfigurators [260] may enable dynamic reconfiguration and tuning of the system to match changing real-world requirements.

Figure 66:
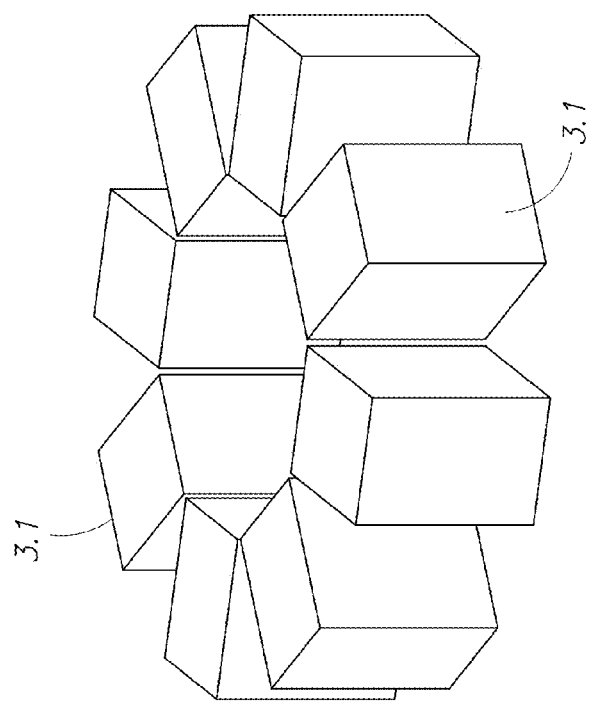
FIG. 66: Example Closed-Bath Immersion Modules—Arbitrary System as Field-Replaceable Unit (FRU)

In the Reconfigurator [260] depicted in FIG. 66 (within FIG. 19), the flow enters at [261]. In a preferred embodiment, the flow capacity at entry point [261] and exit point [266] may be normally at least equal to the aggregate capacity of the branches that split from [261] into points [262] and [267], and ultimately, the branches that merge again at point [266]. In a preferred embodiment, the branches at [262] and [267], and all other internal flow points, including latching valves [263], [269], and [270], are each at least equal to the flow capacity of the greater of the flow capacities of Device #1 [268] and Device #2 [265]. In a preferred embodiment, flow capacities of Device #1 [268] and Device #2 [265] may be identical.

In an alternative preferred embodiment, any of the individual binary latching valves depicted in FIG. 66 may each be substituted with a STEER Latching Digital Flow Rate Control Valve apparatus [230] (an example of which is depicted in FIG. 64 and described in US20090216910, and also elsewhere in this document). While such substitution may make the configuration significantly more complex conceptually, it may be modeled easily and may afford opportunity to provide additional dynamic balancing of system flows, including the possibility of taking advantage of one or more partial-flow configurations listed in the truth table.

In a preferred embodiment, multiple Reconfigurator [260] devices may be placed in high-availability configurations (e.g., industry-standard TMR configurations, which are well known in the art). In an alternate embodiment, an integrated approach may be taken, whereby any of the latching valves [263], [269], and [270] may be replaced with an equivalent series-parallel configuration of latching valves according to the selected or required redundancy approach (e.g., TMR). When implementing such high-availability configurations, the various partial-flow configurations depicted in the truth table above may taken advantage of, either to reduce the number of latching valves needed to reach a fixed availability threshold, or to increase the availability achievable with a fixed number of latching valves.

In a preferred embodiment configured for high availability, with redundancy based on either series-parallel (e.g., TMR) configurations of multiple Reconfigurators [260] or a single Reconfigurator [260] having integrated redundancy (e.g., TMR), normal duty may be rotated among the non-failing latching valves [263], [269], and this may increase the useful lifetime of the overall configuration by distributing the switching load.

Example 1

Four Common Dynamically Selectable Virtual Configurations

Figure 21:
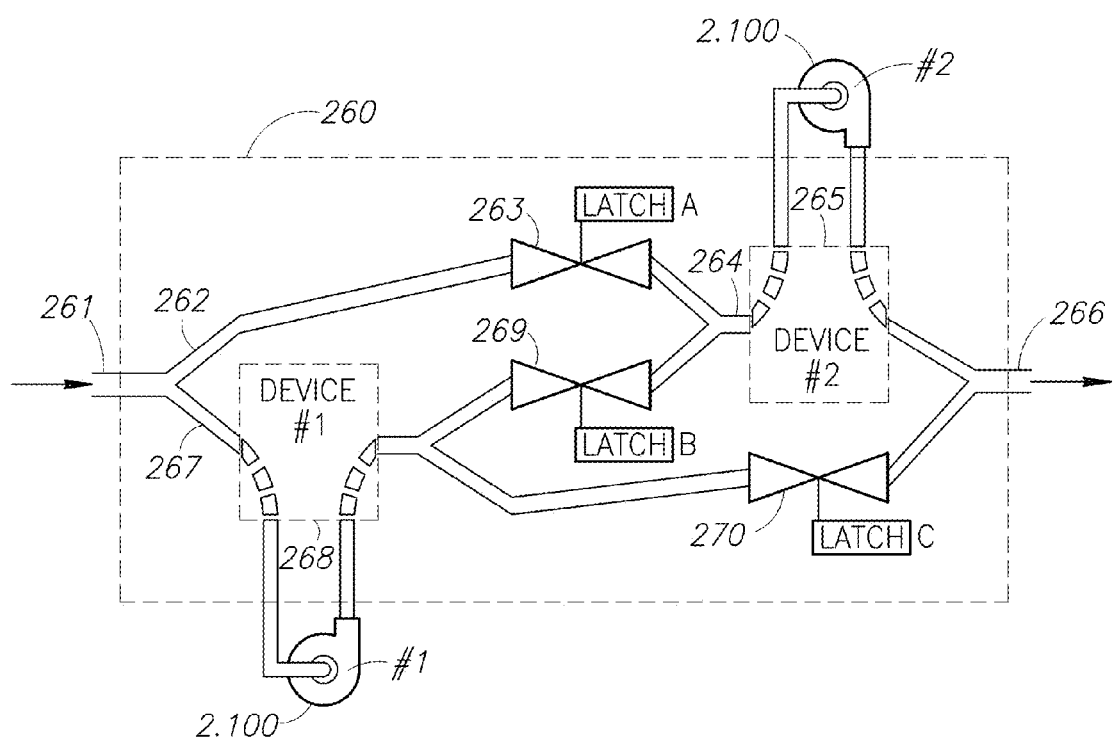
FIG. 21: STEER Parallel-Series Virtual Reconfigurator—Example 1: Physical Configuration

In the example of FIG. 21, a single "Parallel-Series Virtual Reconfigurator" [260] (hereafter, also simply "Reconfigurator [260]") as described in US20090216910 (see FIG. 64) (PRIOR ART) is depicted above (see lower right) with one pump device [268] on each of its two device interfaces. Note that although pump devices are depicted here, the Reconfigurator [260] is by no means limited to the reconfiguration of pump devices.

Figure 22:
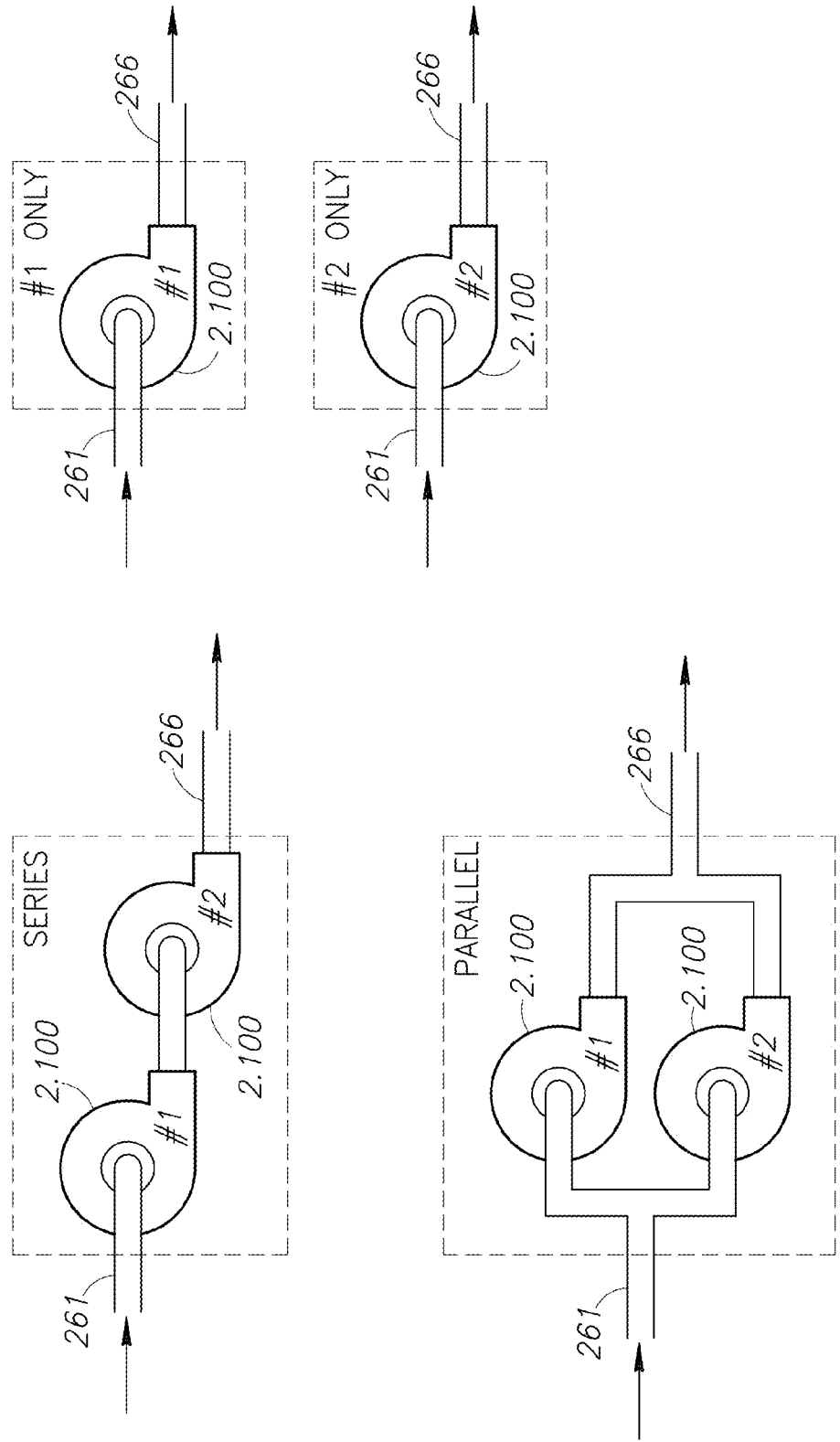
FIG. 22: STEER Parallel-Series Virtual Reconfigurator—Example 1: Dynamically Selectable Virtual Configurations

FIG. 22 depicts what may be the four most common dynamically selectable virtual configurations (others are possible; see FIG. 20 for the corresponding truth table) when a pair of pump devices or other external devices are connected at their corresponding connection points, such as indicated in FIG. 19 and depicted in the example of FIG. 21. Any of these configurations may be selected simply by setting the latch values (e.g., "A", "B", and "C") of Reconfigurator [260] to the appropriate values in the truth table shown in FIG. 20.

In the example of FIG. 21 and FIG. 22, the "Ingress" and "Egress" arrows correspond to the external interfaces for each configuration.

Example 2

Nested Virtual Reconfigurators—Modular

Figure 23:
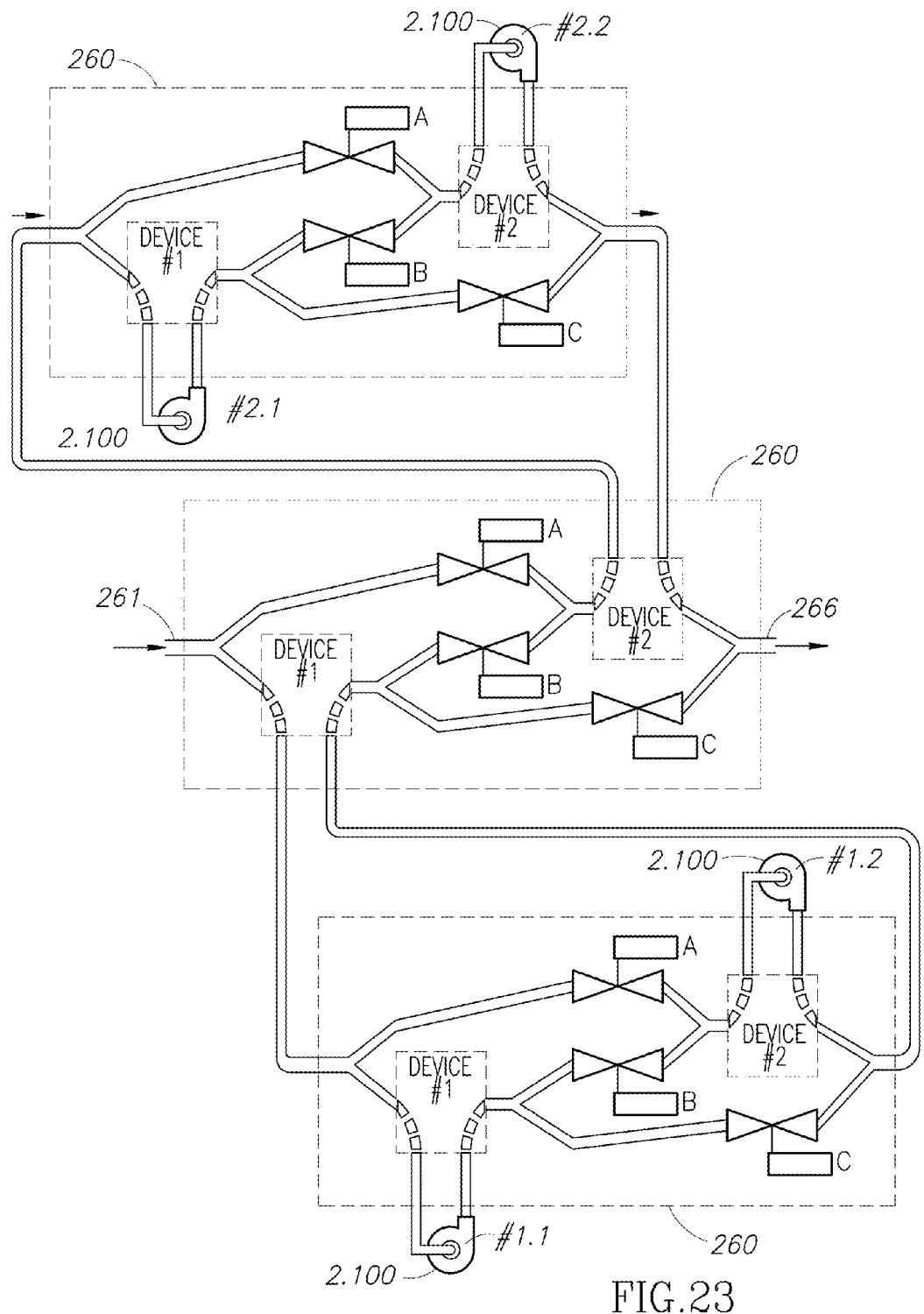
FIG. 23: STEER Parallel-Series Virtual Reconfigurator—Example 2: Nested Virtual Reconfigurators—Modular

In the example of FIG. 23, a set of three "Parallel-Series Virtual Reconfigurators" [260] (hereafter, also simply "Reconfigurators [260]") as described in US20090216910 (see FIG. 64 of US20090216910) (PRIOR ART) is depicted (see lower right) with one pump device [268] on each of the two device interfaces of two of the Reconfigurators [260], with those two Reconfigurators [260] then connected to the device interfaces of the third Reconfigurator [260].

Note that although pump devices are depicted here, the Reconfigurator [260] is by no means limited to the reconfiguration of pump devices, as may be observed by the fact that Reconfigurators [260] are themselves serving as nested devices.

In the example of FIG. 23, the "Ingress" and "Egress" arrows correspond to the external interfaces for the virtual configuration.

The truth table in FIG. 24 depicts what may be the twenty-seven most common dynamically selectable virtual configurations (others are possible, note that entries for the other possibilities are not included the truth table, but may easily be determined by inspection by one of ordinary skill in the art). The twenty-seven most common virtual configurations may be summarized by noting that each configuration may belong to one of three categories, as follows.

Summary of Typical Virtual Configurations

Any single device (e.g., device #1.1, 1.2, 2.1, or 2.2)
Any combination of 2 to 4 devices in series
Any combination of 2 to 4 devices in parallel Any of the virtual configurations in FIG. 24 (and others as well) may be selected simply by setting the latch values "A", "B", and "C" on the ingress/egress Reconfigurator [260], as well as the latch values "1A", "1B", and "1C" on the Reconfigurator [260] connected to device port #1 [268] of the ingress/egress Reconfigurator [260], and also the latch values "2A", "2B", and "2C" on the Reconfigurator [260] connected to device port #2 [268] of the ingress/egress Reconfigurator [260], based on the appropriate values in the truth table shown.

STEER Latching Digital Reversing Valve Assembly—Example

Figure 25:
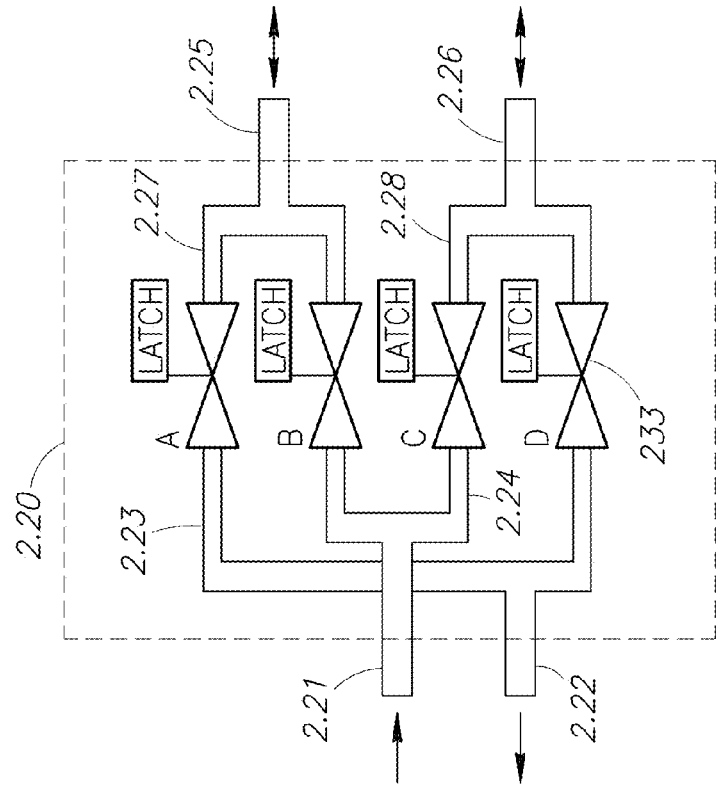
FIG. 25: STEER Latching Digital Reversing Valve Assembly and Truth Table—Example

As described earlier, the STEER apparatus and STEER "Thermal Bus" (depicted as [2] in FIG. 1) may be viewed conceptually as a reconfigurable "virtual plumbing system" comprising a separate supply and return for each of potentially several and diverse working fluids. FIG. 25, below, depicts an example embodiment of a latching digital reversing valve [2.20] which may be used to accomplish such reconfigurability. Whereas a conventional may be plumbed with implicit or explicit directionality, such as supply channels flowing toward return channels, channels of may not have such constraints. For example, in conjunction with a STEER Latching Digital Reversing Valve Assembly, a supply channel may be configured to be a return channel, or vice-versa, even though it may be configured with pumps that may only pump in the forward direction.

In several preferred embodiments, also described earlier, the STEER apparatus may achieve a large degree of reconfigurability from sets of digitally controllable "latching" valves or "fluid switches" [233] (from FIG. 62 in US20090216910, and shown in FIG. 25) that may be variously configured to achieve optimal flows between one or more devices and one or more supply and return channels. As noted earlier, any embodiment of digital mixer or splitter valves may be internally or externally configured with check valves that ensure one-way flow, so as to avoid sneak circuits, for example. However, sneak circuits may also be avoided by other means, such as by configuring check valves elsewhere in the system, e.g., directly on one-way devices that may not be designed to accept reversed flows.

When digital mixer and splitter valves are not configured with check valves as described earlier (said check valves would make them one-way devices), then mixers and splitters that may be otherwise identical may be functionally interchangeable as two-way "mixer-splitter" devices (i.e., each device's behavior as a mixer or splitter may depend only on direction of flow). In terms of implementing "virtually reconfigurable plumbing." what may be needed is a simple means for dynamically reconfiguring plumbing so as to further comprise the dynamic control of flow direction.

In a preferred embodiment, the STEER Latching Digital Reversing Valve [2.20] (hereafter, also, "reversing valve [2.20]") depicted in FIG. 25 may serve as the interface between a one-way circuit and a two-way circuit, such that the unidirectional flow in the one-way circuit may be dynamically controlled to implement a bidirectional flow (i.e., in the FORWARD or REVERSE direction) in the two-way circuit. In a further preferred embodiment, the dynamic control may comprise additional flow paths as noted in the example truth table of FIG. 25, in order to provide various bypass and loop-test capabilities.

The reversing valve [2.20] is conceptually similar to the "Latching Digital Rate Control" [230] as described in US20090216910 (see FIG. 64 inset in FIG. 25). In a preferred embodiment, the reversing valve [2.20] may be implemented in the same manner as the "Latching Digital Rate Control" [230], except that the former may have twice as many manifolds and interface ports, and they may be connected differently, although they both have one external interface port per manifold. In particular, in the example depicted in FIG. 64, the Latching Digital Rate Control [230], a single ingress manifold [232] may be shared across four latching valves [233] (with another manifold [234] shared across the same four latching valves [233] for egress), with one ingress port [231] and one egress port [235] (i.e., one port per manifold).

In contrast, the reversing valve [2.20] may require twice the manifolds, because each manifold may be internally connected to only half of the latching valves [233]. In particular, the so-called "supply" port [2.21] may connect to manifold [2.24], which may be shared by two latching valves [233]. Similarly, the so-called "return" port [2.22] connects to manifold [2.23], which may be shared by two different latching valves [233]. On the other side of the four latching valves [233], reversible manifolds [2.27] and [2.28] may serve to cross-connect the supply [2.21] and return [2.22] manifolds to their respective bidirectional ports, the so-called "top" port [2.25] and "bottom" port [2.26].

In a preferred embodiment, latching valves [233] internal to reversing valve [2.20], once set to their particular open/closed settings may retain their settings indefinitely without any additional power input (a minor amount of power may be required to initialize any valve to its desired open/closed setting, such as may be required for a magnetic latching valve, motorized valve, pneumatic valve, or other actuated valve).

In a preferred embodiment of the STEER apparatus, the supply ingress port [231] or return egress port of a reversing valve [2.20] may be optionally equipped with a suitable internal or external check valve (not shown), i.e., in the "one-way loop" as depicted above, to ensure that flow may occur only in the direction of the "one-way loop" arrows depicted in the figure above. However, any check valves or other flow-direction-constraining devices on the "two-way loop" side of the reversing valve [2.20] may prevent its proper operation (i.e., in particular, it may not able to dynamically toggle between forward and reversed flow directions).

In a preferred embodiment, dynamic path control may be achieved by means of the duality of the manifold configurations (i.e., the one-way [2.21] [2.22] and two-way [2.25] [2.26] sides of reversing valve [2.20] are duals of each other, and may be swapped). For example, a system having reversible supply/return paths may implement them with interfaces to the two-way loop rather than to the one-way loop depicted, and one or more devices (e.g., inherently one-way devices, or any check-valved devices) may be interfaced to the one-way loop rather than the two-way loop (i.e., the truth table will still hold, which may enable alternate uses of reversing valve [2.20] than as depicted).

STEER Latching Digital Reversing Valve—FORWARD Example

Figure 26:
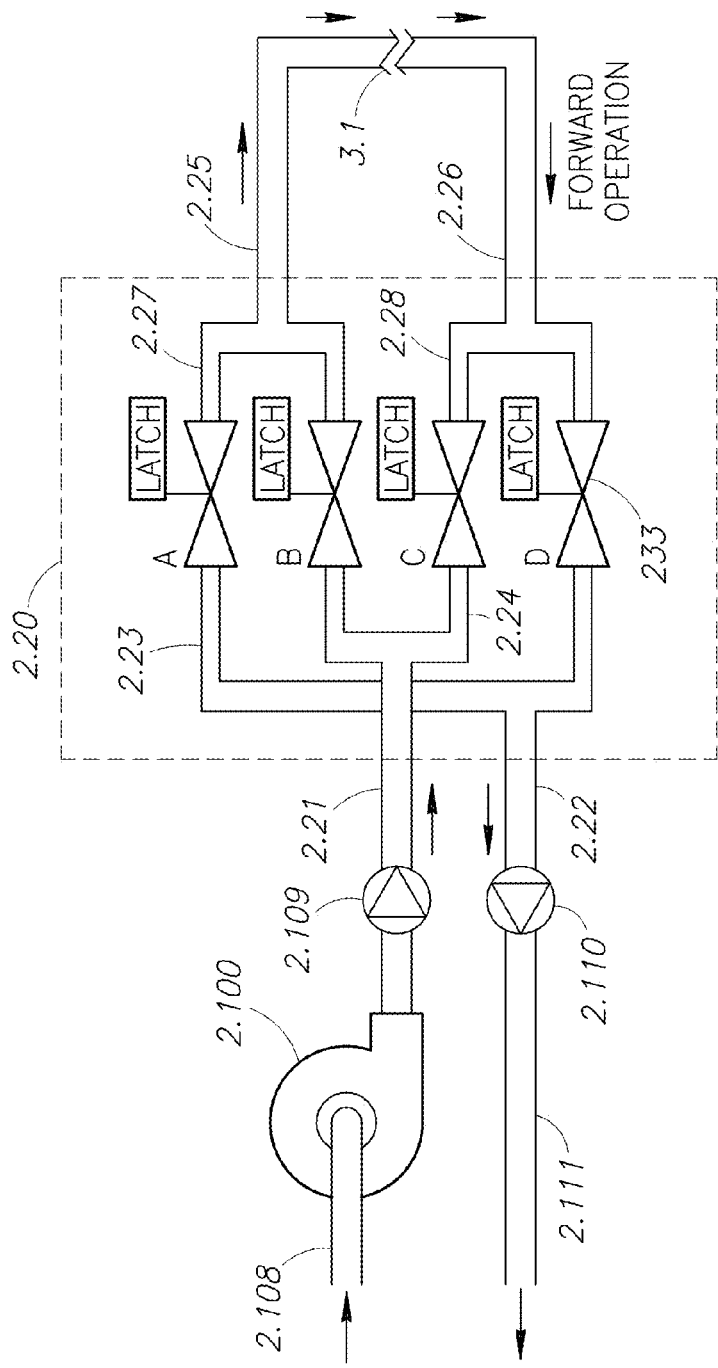
FIG. 26: STEER Latching Digital Reversing Valve and Truth Table—FORWARD Example

In the example of FIG. 26, below, a STEER Latching Digital Reversing Valve [2.20] (hereafter, "reversing valve [2.20]") is depicted with a pump-driven, check-valve-constrained one-way flow, with ingress at supply port [2.21], and egress via return port [2.22]. For this example, which depicts "FORWARD" flow, some arbitrary device [3.1] capable of handling reversible (i.e., bidirectional) flow may be connected to the so-called "top" port [2.25] and "bottom" port [2.26].

In this example of forward flow, the dynamic configuration of reversing valve [2.20] is set according to the truth table entry A=0 ("Off"), B=1 ("On"), C=0 ("Off"), and D=1 ("On"), where "Off" corresponds to "Closed" (preventing flow) and "On" corresponds to "Open" (enabling flow), as depicted in the truth table of FIG. 26 (which is an abbreviation of the truth table in FIG. 25). A one-way pumped supply flow may enter reversing valve [2.20] at ingress port [2.21], flow through manifold [2.24], into and through latching valve [233]-B, which may be open, and then into manifold [2.27] and out top-port [2.25] toward bidirectional-flow device [3.1]. Note that no flow may possible from manifold [2.24], into or through latching valve [233]-C, because it is closed (according to the abbreviated truth table depicted in FIG. 26). Likewise, no unwanted (backwards) flow may be possible from manifold [2.27], into or through latching valve [233]-A, because it may also be closed.

On the return leg from bidirectional-flow device [3.1], flow may enter bottom-port [2.26], flow through manifold [2.28], into and through latching valve [233]-D, which may be open, and into manifold [2.23] and out return-port [2.22] toward the check-valved return channel. Note that no flow may be possible from manifold [2.28] into or through latching valve [233]-C, because it may still be closed (according to the truth table in FIG. 26). Likewise, no unwanted (backwards) flow may be possible from manifold [2.23], into or through latching valve [233]-A, because it may also still be closed.

STEER Latching Digital Reversing Valve—REVERSE Example

Figure 27:
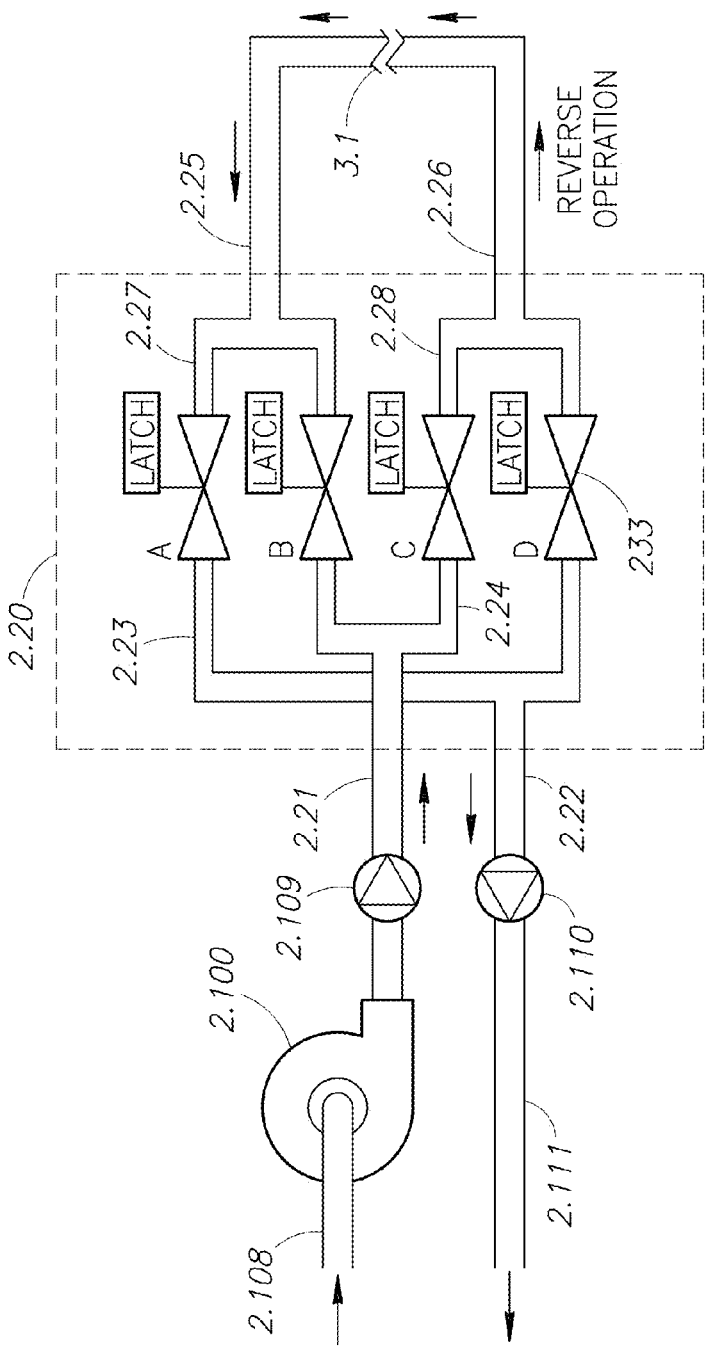
FIG. 27: STEER Latching Digital Reversing Valve and Truth Table—REVERSE Example

In the example of FIG. 27, below, a reversing valve [2.20] is depicted as in FIG. 26, with a pump-driven, check-valve-constrained one-way flow, with ingress at supply port [2.21], and egress via return port [2.22]. However, FIG. 27 depicts "REVERSE" flow rather than "FORWARD" flow. As earlier, some arbitrary device [3.1] capable of handling reversible (i.e., bidirectional) flow may be connected to the so-called "top" port [2.25] and "bottom" port [2.26].

In this example of reverse flow, the dynamic configuration of reversing valve [2.20] is set according to the truth table of FIG. 27 (which is identical to that of FIG. 26), and specifically, entry A=1 ("On"), B=0 ("Off"), C=1 ("On"), and D=0 ("Off"), where, as before, "Off" corresponds to "Closed" (preventing flow) and "On" corresponds to "Open" (enabling flow). As in FIG. 26, a one-way pumped supply flow enters reversing valve [2.20] at ingress port [2.21], flows through manifold [2.24], but cannot enter into or through latching valve [233]-B, which is now closed. Instead, the flow enters into and through latching valve [233]-C, which is now open, and into manifold [2.28] and out bottom-port [2.26] toward bidirectional-flow device [3.1]. However, unlike the example of FIG. 26, the flow through device [3.1] is now in the reverse direction, relative to its direction in FIG. 26.

On the return leg from bidirectional-flow device [3.1], flow may enter top-port [2.25], flow through manifold [2.27], into and through latching valve [233]-A, which may now be open, and into manifold [2.23] and out return-port [2.22] toward the check-valved return channel. Note that no flow may be possible from manifold [2.27] into or through latching valve [233]-B, because it may still be closed (according to the truth table in FIG. 27). Likewise, no unwanted (backwards) flow may be possible from manifold [2.23], into or through latching valve [233]-D, because it also may still be closed.

2.5 STEER Working Fluids (a.k.a. RUBE™ Fluids)

It may be beneficial to identify in advance a number of STEER working fluids (a subset of which may be referred to hereafter as "RUBE™" working fluids or simply RUBE™ fluids in various contexts) which may be well-suited to particular roles in conjunction with the STEER Thermal Bus apparatus and dependent or otherwise connected devices. The nomenclature for STEER working fluids and RUBE™ working fluids is the same, and provides a general designation that may apply to, and be shared by, a number of different fluids. However, for a given implementation, or within a limited context, a particular designation may usually be associated with a specific fluid, and this is the case for the subset of fluids known as RUBE™ fluids within this document (preferred fluid properties may be called out elsewhere in this document, such as under the major heading for the RUBE subsystem).

In particular, the general operating temperature range and primary role of various RUBE™ working fluids may be determined by a two- or three-character designation, where a first character (e.g., C, L, M, H, S, or X) may indicate the general nature of the temperature range, a second character (e.g., T or F) may indicate a general role, and an optional third character (e.g., 1 or 2) may indicate relevant phase-change properties.

A specific concatenation of these characters may serve as a convenient label for a particular STEER thermal bus channel in a drawing or other depiction of configured apparatus, and this technique is used often with this document.

The table in FIG. 28 identifies a set of temperature codes that may be used to indicate the notional working temperature range of such fluids, which may be a key property that serves to help identify a particular set of potentially useful working fluids by some of their relevant properties.

The second character of a two-character or three-character RUBE™ working fluid designation is a letter (T or F) that indicates whether the primary role of the fluid is that of a heat Transfer fluid or a Fuel. Note that a heat Transfer fluid, if combustible, may provide a secondary role as a fuel (such as a thermal oil that may be combusted when it reaches the end of its useful life). Conversely, any working fluid designated as a Fuel may serve a secondary role as a heat transfer fluid prior to being consumed.

An optional third character may be present to designate whether the role of a particular fluid is that of a single-phase fluid or a phase-change fluid. In the STEER working fluid designation used in this document and elsewhere, single-phase fluids may be designated with a "1" or phase-change fluids designated with a "2" as the optional third digit, when relevant.

The table in FIG. 29 identifies a set of working fluid types, each of which may refer to the primary nature or thermodynamic role of a particular fluid within this document and elsewhere.

The tables in FIG. 30, FIG. 31, FIG. 32, FIG. 33, FIG. 34, and FIG. 35 identify a set of candidate fluids and one possible categorization of them with respect to particular roles they might be assigned (as indicated by a RUBE™ fluid designator, which is also the STEER working fluid designator). Recall that the third character of the designator in the leftmost column is optional, but may be used here to help indicate the "fitness" of a particular fluid for the corresponding role, at least with respect to a particular set of candidate fluids. A two-letter designation may be used when phase-change properties are not germane to the immediate discussion.

In a preferred embodiment, a subset of the candidate fluids in FIG. 30, FIG. 31, FIG. 32, FIG. 33, FIG. 34, and FIG. 35 may be useful as exemplary fluids (RUBE™ fluids) according to their complementary generic properties. In a preferred embodiment, the key properties of such subset may be identified as those listed in the table below, where specific labels are assigned for convenience to help identify the fluids (and, if applicable, their assigned roles) within this document.

TABLE

Selected Example Subset of RUBE ™ Candidate Working Fluids

| RUBE ™ FLUID | Description, Key Properties, Primary Role, and Candidate Fluids |
|---|---|
| CT1 | Low-toxicity cryogenic-capable, low-temperature, dielectric, single-phase, engineered heat transfer fluid with a typical operating temperature range of −100° C. |

TABLE-continued

Selected Example Subset of RUBE™ Candidate Working Fluids

| RUBE™ FLUID | Description, Key Properties, Primary Role, and Candidate Fluids |
|---|---|
| | to +130° C. (e.g., a thermal oil like Paratherm ® CR). Very useful for storing cryogenic or low-temperature exergy ("cold energy") at a much lower cost than some other low-temperature fluids such as RUBE™ LT2. |
| HT1 | Non-toxic high-temperature, dielectric, single-phase, low-vapor-pressure engineered heat transfer fluid with a typical operating temperature range of −49° C. to +315° C. (e.g., a thermal oil like Paratherm ® NF). Very useful for capturing, transferring, and storing high-grade exhaust or waste heat energy, such as from a gas turbine, microturbine, fuel cell, internal combustion engine, catalytic heater, solar array, industrial process, or other heat-producing apparatus. |
| LT2 | Low-toxicity quasi-cryogenic-capable, low-boiling-point (phase-change at +34° C. at STP) engineered heat transfer fluid (e.g., an inert dielectric fluid like 1-methoxy-heptafluoropropane, or $C_3F_7OCH_3$) with a typical operating range of −122° C. to +130° C. Very useful for capturing sensible cryogenic or low-temperature exergy ("cold energy"), as well as isothermally capturing low-grade to medium-grade sensible and latent heat energy such as from electronics. Also very useful as a working fluid in a power cycle (e.g., Rankine cycle; see FORCE turbine), and as a refrigerant in adsorption chillers. At reasonably low pressures, this fluid may isothermally reject heat to virtually any ambient, with ease. RUBE™ LT2 has zero ozone depletion potential (ODP) and low global warming potential (GWP). RUBE™ LT2 has a volumetric heat capacity (VHC) of 1.82 J/cc, which is is 1,403x better than air. Due to its Latent Heat of Vaporization, RUBE™ LT2 fluid at 34° C. is 150,000x more efficient at cooling than 0° C. dry air. |
| CF | Cryogenic fuel that is also useful as a source of cryogenic exergy ("cold energy") with a typical operating temperature range of −165° C. to −84° C. (e.g., liquefied natural gas, or LNG). As a liquid, RUBE™ CF may be stored at near ambient pressure (not compressed, at sub-atmospheric pressure), and is more than 600 times as dense as natural gas. As the temperature of RUBE™ CF increases beyond its −163° C. boiling point, its pressure rises rapidly. Regardless of pressure, RUBE™ CF vaporizes to a gas above −83° C. (its critical point), at which point it may become useful as a supercritical fluid (see RUBE™ SF, below). RUBE™ LT2 fluid (which see) may be an excellent transfer target for the exergy from RUBE™ CF fluid. |
| LF | Non-toxic low-temperature fuel that may also be useful as a source of "cold energy" (a form of exergy) with a typical operating temperature range of −26° C. to +126° C. (e.g., liquefied dimethyl ether, DME, or bioDME). RUBE™ LF may be stored in either a pressurized, semi-pressurized, or refrigerated condition. As a pressurized liquid (most often at about 5 bar, or 73 psia), it may be stored and handled similarly to LPG, but at much lower pressures. As a refrigerated liquid, RUBE™ LF may be stored like LNG, at near-ambient pressure (about 1 psi at −25° C.), and storage/handling apparatus capable of handling RUBE™ CF (e.g., LNG) may alternatively handle RUBE™ LF, but at warmer-than-cryogenic temperatures. As the temperature of RUBE™ LF increases beyond its boiling point of −24.9° C. to −23.6° C. (depending on purity), its pressure rises to about 74-77 psia at +20° C. Regardless of pressure, RUBE™ LF vaporizes to a gas above +127° C. (its critical point), at which point it may become useful as an alternative supercritical fluid (starting at 779 psia), though not as useful as RUBE™ CF, which has a cryogenic boiling point (see RUBE™ SF, below), and thus easily reaches much higher pressures at lower temperatures. Nonetheless, RUBE™ LF is thermally stable to +220° C., and may be very useful as a working fluid in a power cycle (e.g., an open-cycle backpressure turbine or closed Rankine cycle; see FORCE turbine), and as a refrigerant with thermodynamic properties similar to R-12. RUBE™ LF does not react or decompose under normal conditions (it is basically chemically inert). RUBE™ LT2 fluid (which see) may be an excellent transfer target for exergy recuperated from RUBE™ LF fluid. |
| MF | Medium-temperature fuel with a typical operating temperature range of −143° C. to +65° C. (e.g., pure methanol). As a fuel, it contains more hydrogen per unit mass than liquid hydrogen, and is thus particularly useful for direct methanol fuel cells (DMFCs). RUBE™ MF fluid may also advantageously contain up to 30% ethanol, which increases the heating value, especially when used with catalytic heaters or in combustion power cycles (however, concentrations of more than 30% ethanol may prevent catalytic heaters from self-starting). From a thermodynamic viewpoint, this fuel may be stored indefinitely as a liquid at ambient temperature and pressure, without refrigeration. Its low melting (freezing) point may make it very useful for exergy storage, and its relatively low boiling point enables self-pressurized motive force for local transport through the addition of low-grade waste heat. |
| SF | Supercritical fluid fuel useful as a source of both exergy (in the form of "cold energy") and pressure, with a typical operating temperature range of −83° C. to +35° C. (e.g., vaporized LNG, above the −83° C. critical point). As the vapor absorbs heat within a pressure vessel or other containment, the pressure increases extremely rapidly, up to 1500 psi or more as it approaches the top of the operating range, and this pressure may be used to drive a power cycle (e.g., |

TABLE-continued

Selected Example Subset of RUBE™ Candidate Working Fluids

| RUBE™ FLUID | Description, Key Properties, Primary Role, and Candidate Fluids |
|---|---|
| | an open-cycle backpressure turbine; see FORCE turbine). The use of RUBE™ SF in a backpressure turbine power cycle makes the supercritical fluid colder at the outlet than at the inlet, so that further exergy may be subsequently recuperated. When the supercritical fluid is to be consumed locally as a fuel, the exergy recuperation rate may be constrained by the local fuel consumption rate. RUBE™ LT2 fluid (which see) may be an excellent transfer target for the exergy recuperated from RUBE™ SF fluid. |

Preferences for RUBE™ LT2 Working Fluid, from among the Preferred Candidates

In this document, RUBE™ LT2 is shorthand for the preferred fluid for direct contact (e.g., immersion) with electronics (regardless of whether the electronics are enhanced with coatings such as thermal transfer coatings). Although RUBE™ LT2 fluids may comprise selected members of the perfluorocarbon, hydrofluorinated ether, and fluorinated ketone families of fluids, RUBE™ LT2 fluid may preferably comprise a hydrofluorinated ether such as $C_3F_7OCH_3$, or a fluorinated ketone such as $C_6F_{12}O$. Among the RUBE™ LT2 candidate fluids, a hydrofluorinated ether such as $C_3F_7OCH_3$ may be the more preferred, primarily because it has a much lower boiling point (preferably 20° C. to 40° C., and more preferably 30° C. to 35° C. (at STP) than for example, a fluorinated ketone such as $C_6F_{12}O$, which may often be substituted whenever the higher boiling point of 40° C. to 60° C., is acceptable, provided that chemical compatibility, pour point, and other factors that may be specifically relevant are taken into account.

In an alternative preferred embodiment, RUBE™ LT2 fluid may preferably comprise a relatively new fluorinated-ketone-based engineered fluid such as $C_5F_{12}O$, or even newer $C_6F_{12}O$, having a molecular weight of 266 g/mol, a boiling point of about 24.2° C. at STP, a critical temperature ($T_{CRITICAL}$) of about 150.3° C. (estimated via simulation), a critical pressure ($P_{CRITICAL}$) of about 340 psia (estimated via simulation), a critical density of about 590.4 kg/m$^3$ (estimated via simulation), a critical volume of about 44.2 cc/mole (calculated from critical density), a heat of vaporization of 89.2 kJ/kg at the boiling point (calculated from Martin-Hou's equation of state (Martin-Hou, *A.I.Ch.E. Journal*, 1:142, 1955), and a vapor pressure of about 15.1 psi at 25° C. Key reasons for preferring this engineered fluid may include, for example, its higher molecular weight, lower boiling point, higher critical pressure, higher critical density, and higher vapor pressure at its boiling point. Key reasons for not preferring this engineered fluid at this time may include, for example, its much lower heat of vaporization and its relative new-ness (and therefore lack of characterization with respect to other important properties such as electrical and thermal conductivity, dielectric constant, freeze point, coefficient of expansion, and materials compatibility).

Figure 36:
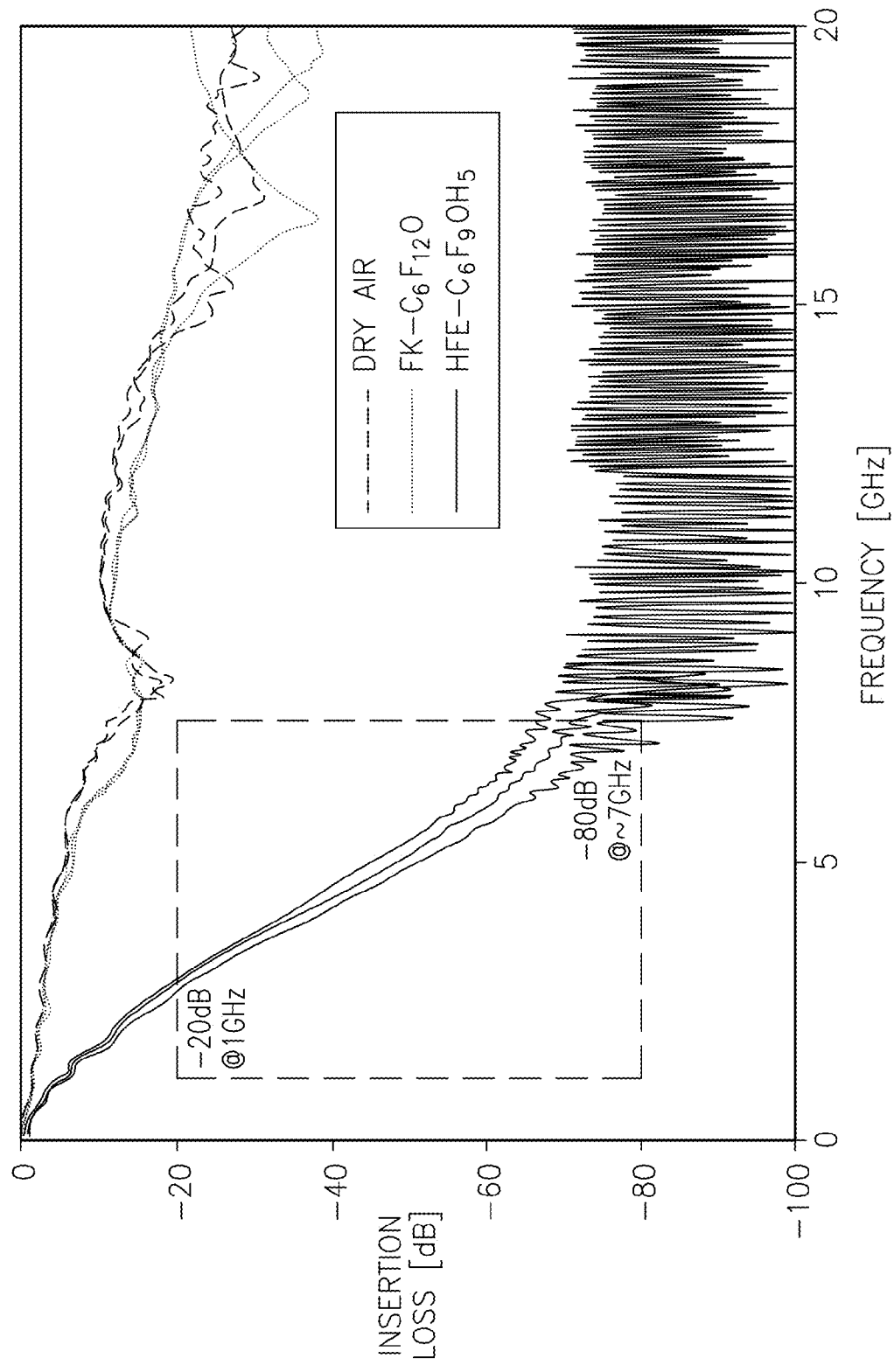
FIG. 36: STEER—RUBE™ LT2 Candidate Fluids—RF Insertion Loss

A secondary reason for preferring a hydrofluorinated ether such as $C_3F_7OCH_3$ among the RUBE™ LT2 candidate fluids is its propensity to absorb radio frequency (RF) energy. FIG. 36 depicts the insertion loss of radio frequency (RF) energy (as measured by the Mayo Clinic) that occurs when an active RF radiator (e.g., an intentional radiator like an antenna) is immersed in the working fluid (e.g., dry air, or one of the candidate working fluids). This same data is directly applicable to unintentional radiators also, such as CPUs or other electronics operating at high frequencies. The figure reveals is that neither dry air nor the fluorinated ketone (FK) fluid $C_6F_{12}O$ (which is a candidate RUBE™ LT2 working fluid) cause any significant loss of RF energy in the operating frequency range of computer-related electronics (say, up to 10 GHz). For intentional radiators (i.e., antennas) that's a good thing.

In contrast, the hydrofluorinated ether (HFE) $C_6F_9OH_5$ (which is the preferred candidate RUBE™ LT2 working fluid) causes a huge loss of RF energy in that same range, meaning that the RF signals are greatly attenuated by the fluid. Note that every 3 dB of loss (i.e., –3 dB) represents a halving of RF energy. Thus, even the 20 dB loss incurred at about 1 GHz is a halving that occurs 6.7 times, which reduces the RF energy by a factor of more than 100 ($2^{6.7}=2^{\wedge}6.7=101.6$). As the frequency increases, the insertion loss, or attenuation, increases exponentially, so that the RF energy at around 7 GHz is on the order of –80 dB, meaning that the RF energy is reduced by a factor of more than 100 million ($2^{(80/3)}=2^{(26.7)}=2^{\wedge}26.7=106,528,681$). For intentional radiators, that is clearly not a good thing.

Since we are concerned about CPUs and FPGAs here, rather than intentional radiators like antennas, the RF energy absorbed by HFE $C_6F_9OH_5$ fluid is unwanted stray RF energy (i.e., energy that is unintentionally radiated). Thus, the exponentially increasing loss of stray RF energy with increasing frequency, due to attenuation by the HFE fluid, is actually a very good thing.

Stray RF energy has to go somewhere. The RF energy normally emitted from such chips tends to cause unwanted RF interference (RFI) or electromagnetic interference (EMI) that may interfere with other components (potentially causing internal negative impacts) or escape the system (potentially causing negative impacts). In a preferred embodiment where the preferred RUBE™ LT2 working fluid comprises HFE $C_6F_9OH_5$ or another external RF energy-absorbing fluid, the novel phase-change immersion cooling approach of certain versions of the present invention may cause unwanted RF energy to instead be absorbed into the RUBE™ LT2 working fluid, which increases the exergy (in this case, heat energy) of the working fluid. Thus, in addition to stray RF energy absorption, which may beneficially reduce RFI/EMI to other internal or external subsystems, the conversion from unwanted stray RF energy to increased exergy improves overall exergy recuperation and enables the beneficial transfer of exergy to subsystems which can put the exergy to good use.

In a preferred embodiment where the RUBE™ LT2 working fluid comprises HFE $C_6F_9OH_5$ or another RF energy-absorbing fluid, its RF energy-absorbing effect may also serve to help protect electronics from the effects of electronic warfare-style attacks, such as may emanate from high-power microwave (HPM) devices or other directed-energy weapons.

Despite their dielectric properties, RUBE™ CT and HT heat-transfer fluids are not phase-change working fluids. Rather, they may be thermal oils with a very low vapor pressure that may be well-suited for cryogenic temperatures and high temperatures, respectively, in order to efficiently support thermal exergy transport and storage (as described elsewhere). Thus, RUBE™ CT and HT fluids may serve as sources or sinks of thermal exergy, but may not normally be in direct contact with electronics (within the scope of certain versions of the present invention).

In a preferred embodiment, RUBE™ CT fluid may comprise a quasi-cryogenic fluid such as the commercially available Paratherm CR® fluid (Paratherm Corporation, West Conshohocken, Pa.), whose useful operating temperature range may extend from −88° C. to 218° C., with a minimum startup temperature of −112° C. RUBE™ HT1 fluid may comprise a high-temperature fluid such as the commercially available Paratherm NF® fluid, whose useful operating temperature range may extend from 49° C. to 315° C.

Additional RUBE™ working fluids (which may not be directly used with electronics cooling loads) may be described in context elsewhere in this document, and may include water and various additives or aqueous solutions. RUBE™ ST (Supercritical Transfer fluid, such as SCO2 operating from about 32° C. to 600° C.), RUBE™ XT (eXtremely high-temperature Transfer fluid, such as Lead-Bismuth Eutectic, or LBE, a liquid-metal alloy with a melting point of 123.5° C. and a boiling point of 1670° C., typically operating between 350° C. and 550° C., preferably with a mixed mean exit temperature of 500° C.), as well as several fuels that may also serve as RUBE™ working fluids. The set of working-fluid-fuels may comprise RUBE™ CF (Cryogenic-temperature Fuel such as LNG at −163° C. to −83° C.), RUBE™ LF (Low-temperature Fuel such as DME or LPG), RUBE™ MF (Medium-temperature Fuel such as alcohols, which may further comprise liquids such as methanol, ethanol, and isomers and mixtures thereof), RUBE™ HF (High-temperature liquid Fuel such as diesel, biodiesel, JP8, and mixtures thereof), RUBE™ SF (Supercritical-temperature Fuel, such as gasified LNG vapor operating from about −82° C. to 20° C.), and RUBE™ XF (eXtremely high-temperature Fuel such as Syngas vapor at about 1,000° C. to 1,400° C.).

For the purposes of illustration, each of the two most-referred-to (in this document) of the fluids above (i.e., RUBE™ LT2 and RUBE™ HT1) may be associated with its own color-coded "rainbow" of labeled temperature ranges that will generally remain consistent throughout the remainder of this document (exceptions are labeled on a per-figure basis). In practice, however, the actual temperature ranges for the depicted fluids in a particular channel may differ significantly from those shown, because the STEER apparatus may enable the operating parameters (e.g., temperature, pressure, flow rate) for a given working fluid to be varied dynamically and in real time at each interface, under computer control (e.g., via the SLAM apparatus [1]).

Furthermore, in practice a particular implementation of the STEER apparatus may control as many as twelve or more distinct working fluids (e.g., RUBE™ fluids CT, LT, MT, HT, ST, XT, CF, LF, MF, HF, SF, and XF), up to half of which (e.g., RUBE™ fluids CF, LF, MF, HF, SF, and XF) may also serve in normal roles as fuels (stored chemical energy sources). Although the example STEER Thermal Bus depicted here covers the system's central temperature range (−120° C. to 750° C.), the actual operating temperatures of the twelve RUBE™ working fluids may collectively extend from about −170° C. to about 1,400° C., representing a very large temperature differential of about 1,570° C.

Example

Comparing Air-Cooling to Cooling with RUBE™ LT2 Fluid

Volumetric Heat Capacity (VHC) is the capacity of a given volume of material to absorb thermal energy (heat). The higher the VHC, the more thermal energy the material can absorb before its temperature increases, and the more slowly the volume of material changes temperature.

As an engineered, inert, dielectric fluid, RUBE™ LT2 fluid may be selected as the working fluid for the optimal target operating temperature of devices to be cooled, such as electronic components, such that the target temperature corresponds to the boiling point of the working fluid. In this example, we'll assume that the RUBE™ LT2 fluid is 1-methoxy-heptafluoropropane ($C_3F_7OCH_3$), a preferred fluid. By operating at the boiling point of the working fluid, the fluid's capacity to absorb heat is better than water at the same temperature, by a factor of 47×, better than cold air (0° C.) by a factor of 150,000×, and better than warm air (40° C.) by a factor of 175,000×.

At sea level, dry, 0° C. air has a density of 1.293 g/cc and a VHC of 0.001297 J/cc. When using RUBE™ LT2 fluid as the working fluid, we multiply its specific heat (1.3 J/g) by its density (1.4 g/cc) to get its VHC of 1.82 J/cc, which is 1,403× greater (better) than air.

Note that, as air gets warmer, its VHC gets worse (lower), due to decreased density. Thus, at 40° C. (which is, for example, the maximum server air inlet temperature specified for a state-of-the practice commercial product, namely, SGI's circa 2009 CloudRack C2), the density of dry air drops from 1.293 g/cc to 1.127 g/cc (87% of its former density), which means the VHC of air at 40° C. also drops to 87%, or 0.00113 J/cc. Thus, as the air's temperature increases it rapidly becomes less effective as a coolant. This doesn't bode well for servers, because the cooling air's low VHC causes its temperature to increase quickly and significantly (making the VHC even worse) as it traverses a server's internals.

NOTE: Formerly known as Rackable Systems, SGI has a reputation for thermally efficient servers that are optimized for cloud computing. In 2009, SGI introduced a new server called CloudRack C2 with a novel specification of 40° C. (104° F.) cooling air at the server's air inlet, which is considerably higher than the 20° C. (68° F.) commonly specified. While the goal has merit, such implementations may work against the laws of physics, which are ignored at peril. In this particular case, higher inlet temperatures directly cause reduced internal air-cooling efficiency, which causes higher chip temperatures, which increases electron leakage in transistors, which increases the power dissipated (and operating costs), which further increases chip temperatures—which also reduces chip reliability, which increases failures, which increases downtime and maintenance, both of which further increase operating costs. The vicious circle may be terminated through The biggest thermal efficiency contributor to efficient cooling (and exergy recuperation) may occur through the use of RUBE™ LT2 fluid at its boiling point, where phase-change effects dominate, so the sub-boiling-point VHC may not be relevant at the steady-state temperature of a selected target boiling point, such as 34° C. At the boiling point, what really matters is the LHV, or Latent Heat of Vaporization. The LHV of RUBE™ LT2 fluid is 142 J/g., which means RUBE™ LT2 fluid has more than 100× as much heat-absorbing capacity at its boiling point as it does at lower temperatures. Compared to RUBE™ LT2 fluid's specific heat of 1.3 J/g, the LHV is 109× higher (142/1.3=109.2308), with the ability to absorb heat of 198.8 J/cc (142 J/g×1.4 g/cc=198.8 J/cc).

At an example steady-state operating temperature of approximately 34° C., RUBE™ LT2 fluid is 150,000× more efficient than 0° C. dry air (198.8 J/cc/0.001297 J/cc=153, 277×), and 175,000× more efficient than the 40° C. inlet air (198.8 J/cc/0.00113 J/cc=175,929×) specified as acceptable by SGI for its commercial CloudRack™ C2 servers.

In a preferred embodiment, RUBE™ LT2 fluid may be used as a coolant in an environment operating at ambient or near-ambient pressure (i.e., at its standard boiling point of 34° C.), in order to achieve results similar to those above (e.g., 150,000× more efficient than 0° C. dry air, and 175,000× more efficient than the 40° C. inlet air).

In an alternate preferred embodiment, RUBE™ LT2 fluid may be used as a coolant in an environment operating at sub-ambient pressure, such as 70% of ambient pressure (10 psi). At 10 psi, the boiling point of RUBE™ LT2 fluid may drop from 34° C. to 27° C., thereby causing a shift in the isothermal operating temperature. As the operating temperature is lowered, the thermal conductivity of RUBE™ LT2 fluid improves further (by about 2%, for this 7° C. shift). Also, by inducing some electronics components to operate at a lower temperature, they may actually consume and dissipate less power, thereby contributing to efficiency (see FIG. 48, FIG. 49, FIG. 50, FIG. 51, and associated discussion), while also creating thermal "headroom" which may enable the safe operation of more CPU cores, possibly at higher clock frequencies.

Figure 51:
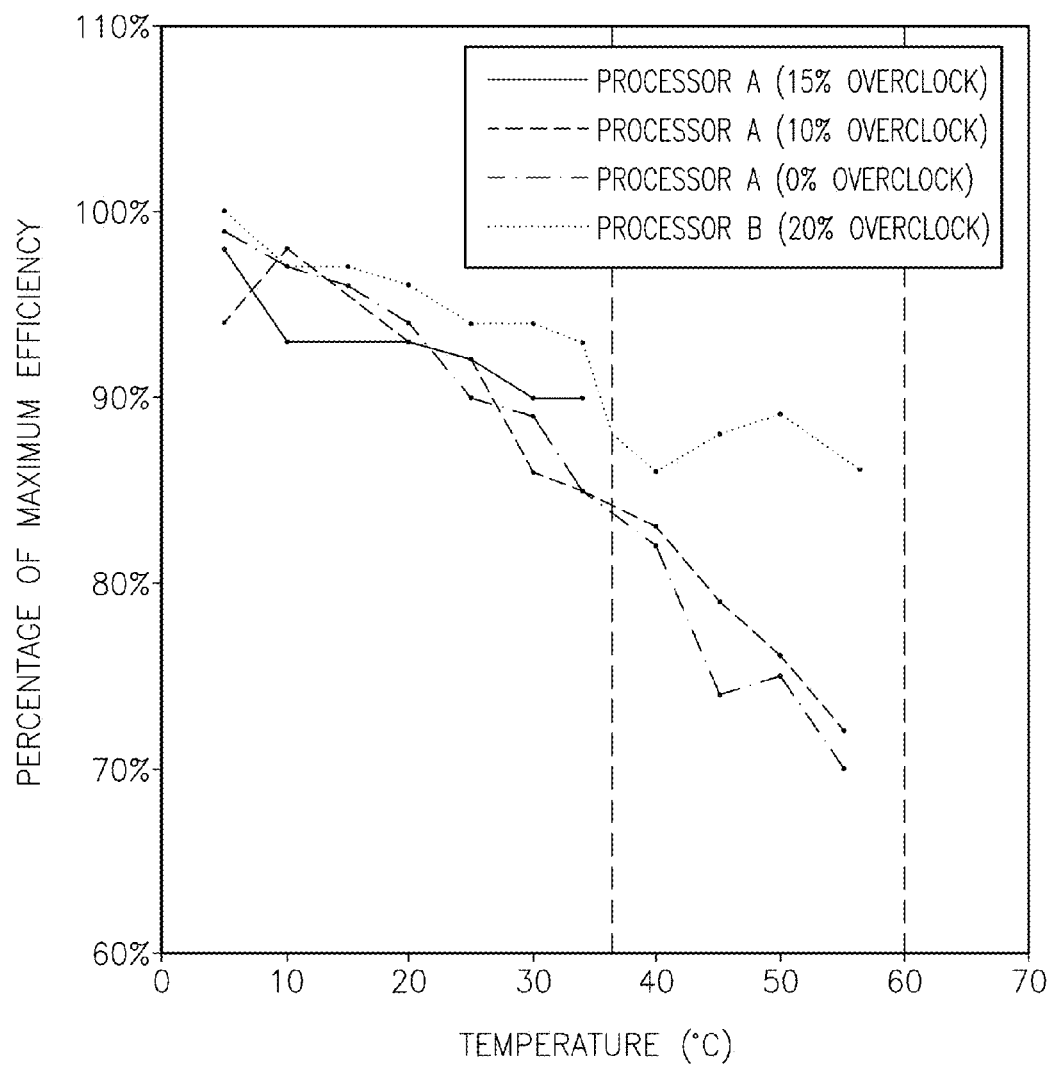
FIG. 51: Electronics Cooling Loads—Effect of Temperature on Processor Power Efficiency

NOTE: In the graph of FIG. 51, it can be seen the processor "A" without any overclocking, achieves its maximum power efficiency at about 5° C. At 34° C., the standard boiling point of RUBE™ LT2 fluid, its measured power efficiency is about 84% of its maximum. At 27° C. (i.e., the lowered boiling point for a sub-ambient pressure of 10 psi in the example above), its measured efficiency improves to about 90% of its maximum efficiency. Going the other direction, the processor's power efficiency drops off rapidly, so that at 45° C. it achieves less than 75% of its maximum.

Example

Comparing Water-Cooling to Cooling with RUBE™ LT2 Fluid

We can also compare to water, say at 25° C. and 100 kPa, which has a specific heat of 4.1813 J/g (or 3.22× greater than RUBE™ LT2 fluid at the same temperature and pressure). The VHC of water at 25° C., is 4.186 J/cc, so water has a VHC that is 3227× better than air, but only 2.3× better than RUBE™ LT2 Fluid (ignoring phase-change effects, to be described below). Of course, electronic circuits cannot be exposed to water, but that's a separate problem.

However, at the previous example's steady-state temperature of 34° C., the picture changes radically. RUBE™ LT2 fluid can absorb 198.8 J/cc as it tries to phase-change, compared to 4.186 J/cc for water, so RUBE™ LT2 fluid is more than 47× better than water (198.8/4.186=47.4916×) at absorbing heat (or recuperating exergy) at the target temperature (which is also the boiling point of the working fluid in this example). Of course, water has phase-change properties also, but at its boiling point of 100° C., most commercial/industrial-grade electronics would be rendered unreliable or inoperable (70° C. to 85° C., is typically their upper limit).

Example

Cooling with RUBE™ LT2 Fluid as a Means of Exergy Recuperation

Given a significant electronics load (say, kilowatt-scale and larger) cooled by RUBE™ LT2 fluid, for example, the heat dissipated by the electronics and rejected to (or acquired by) the working fluid may be sufficient to overcome the fluid's latent heat of vaporization, or nearly so, such that only a modest amount of additional thermal energy may be required to superheat the working fluid to the point of driving a suitable turboalternator, especially when recuperation also occurs at the turboalternator outlet. Note that, in a preferred embodiment, thermal exergy recuperated via the RUBE apparatus [3] may be transferred via the STEER apparatus [2] to the PERKS apparatus [5] (which are depicted notionally in FIG. 1), where it may be converted (in conjunction with exergy from other sources) to electrical power which may offset a portion of the power consumed by the electronics load of this example, thereby increasing the energy efficiency of the overall system.

2.6 STEER-Connected RUBE™ Thermal Pumps (Vapor Injector, Thermal Eductor)

Previous sections have depicted pumps in various drawings, beginning with FIG. 7. Some pumps may not be shown, and, if shown, may be optional. In a preferred embodiment, electric pumps may be variable speed and may operate with direct current (DC). However, not all pumps need be electric; some may be pneumatic, for example, or mechanically connected to a mechanical power source such as a rotating turbine. Another class of pumps may be thermally powered, or more precisely, thermodynamically powered, and this class of pumps is the subject of this section.

NOTE: To be more precise, so-called "thermal pumps," or "thermally powered" pumps, especially as described here, are actually thermodynamically powered. A thermal pump may use the exergy available at its interfaces to increase the motive force (i.e., some combination of input suction and output pressure). The exergy used doesn't strictly originate as differences in thermal energy, but rather, as a combination of thermodynamic effects that may take advantage of differences in temperature, pressure, and velocity, in conjunction with apparatus that facilitates the optimally advantageous energy transformations, without using any moving parts (that is, only the working fluid is in motion). The so-called "thermal pump" is that apparatus.

In the context of FRAME, the primary purpose of a thermal pump such as the example vapor injector [2.30] or thermal eductor [2.40] depicted in FIG. 37 may be to take advantage of the exergy available in the system, in order to reduce the amount of electrical energy otherwise required for pumping various fluids (such as coolants) around the system. In a manner not unlike electromechanical pumps, thermal pumps may be cascaded or paralleled with each other or with electromechanical pumps in useful series, parallel, or series-parallel combinations, in order to meet functionality or redundancy objectives.

Figure 39:
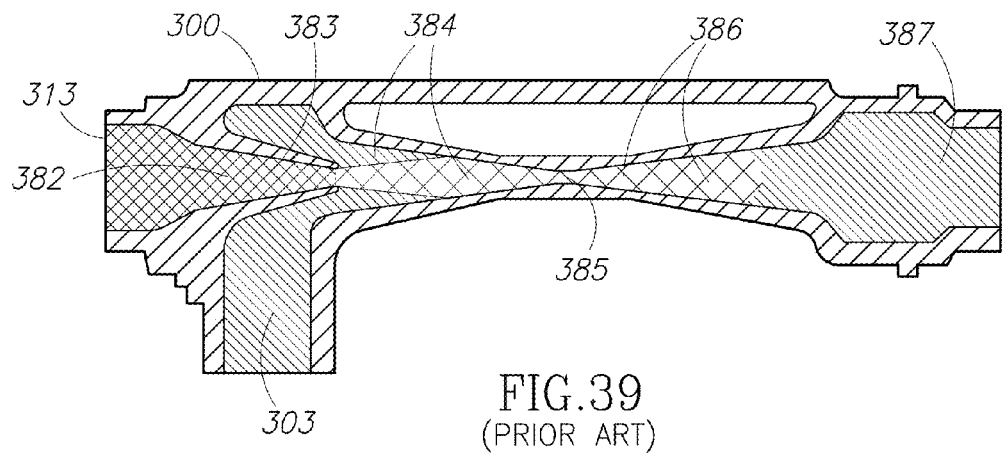
FIG. 39: PRIOR ART—Vapor Injector Described in US20090216910
Figure 75:
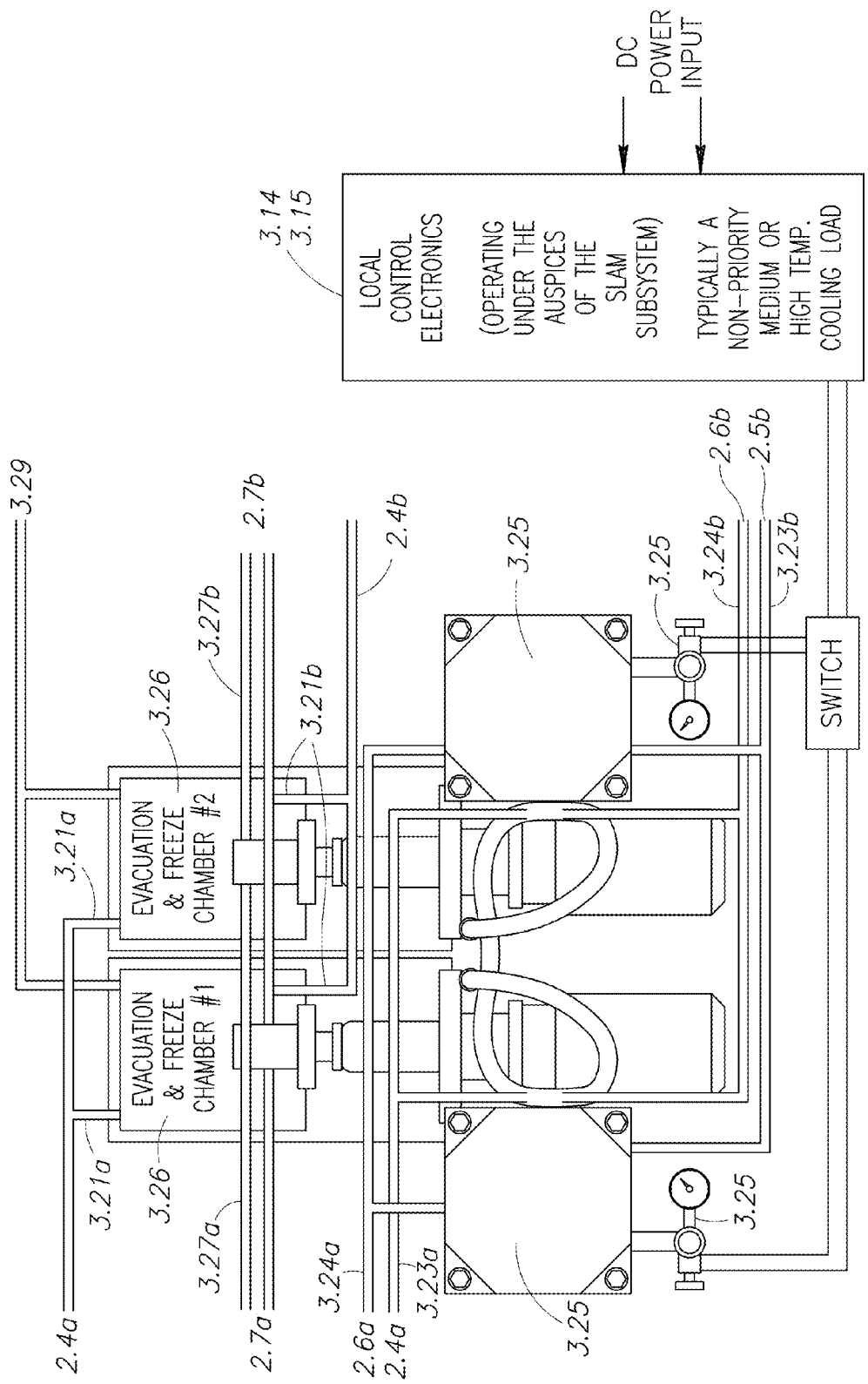
FIG. 75: RUBE™ Phase-Chase Working Fluid Degasser & Cryocooler—Example based on COTS Qdrive Pair

One example of the exergy available may arise from the temperature differences between "heat" sources and sinks (note that "heat" may be provided by a source that may actually be quite cold). For the purposes of the discussion immediately following, as well as for the subsequent details to follow shortly, the physical internals of the vapor injector [2.30] and thermal eductor [2.40] are sufficiently common so as to be described by a single drawing. The table in FIG. 38 identifies their respective interfaces, held in common:

The vapor injector [2.30] depicted in some detail within FIG. 37 (at left), as well as the key differences from earlier prior art, are well described in US20090216910 (PRIOR ART) (see discussion of FIG. 75 therein, reproduced here as FIG. 39). Here, these differences are summarized and the vapor injector [2.30] is further described in apposition to its dual, a thermal eductor [2.40], and both are described in conjunction with the STEER Thermal Bus channel groups [2.2a] [2.2b], which, as depicted, carry a phase-change working fluid. The same or similar devices may also be used with non-phase-change working fluids, but with severely reduced capacities (and this is done routinely in conventional designs), because the motive force will be limited to that provided by the Venturi effect and may not enjoy the significant contribution that may be possible with internal phase-change (e.g., condensation, with its commensurate reduction in fluid volume, which may create a partial vacuum and induce increased suction at the suction port). Such designs are known in the art, and thus not described here.

Thermal Pump Improvements Over Prior Art

Figure 40:
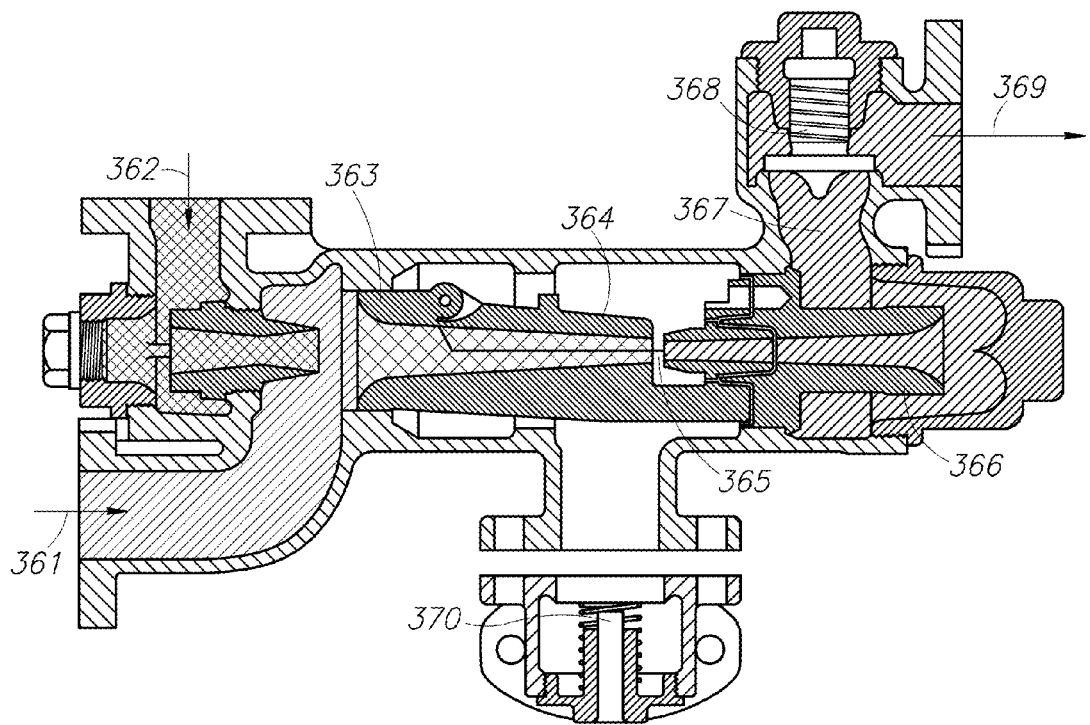
FIG. 40: PRIOR ART—Steam Injector Described in US20090216910

The vapor injector [2.30] and thermal eductor [2.40] depicted in FIG. 37 are unlike a steam injector of the prior art (see FIG. 74 of US20090216910, reproduced here as FIG. 40) primarily in that neither vapor injector [2.30] nor thermal eductor [2.40] has an overflow gap or overflow valve (or needle valves, clack valve, or other moving parts), and neither requires steam or a large temperature differential between its inlet ports, nor does either of them require overflow relief in order to commence operation. The vapor injector [2.30] and thermal eductor [2.40] also differ from a conventional eductor, aspirator, or other type of "jet pump" that is based solely on the Venturi effect (which uses a jet of motivating fluid to create a low pressure or partial vacuum that sucks in fluid at a suction port and propels it toward the outlet), in that the primary effect sought is thermodynamic, with the Venturi effect being secondary (and relatively weaker). Unlike Venturi-only jet pumps, the combination of thermodynamic and Venturi effects may enable the thermal pump to overcome a backpressure force at the outlet which is larger than the motive force at the inlet.

RUBE™ Vapor Injector and RUBE™ Thermal Eductor Duality

In a preferred embodiment, the vapor injector [2.30] depicted in FIG. 37, and its dual, the thermal eductor [2.40], may essentially serve as thermal "booster" pumps that normally mix two streams of the same phase-change working fluid that typically arrive at the inlets with different phases, temperatures, and pressures—and exit at a single outlet. In an alternate embodiment, the two inlet streams may comprise different phase-change working fluids, which may further comprise fluids having the same constituents but in different ratios.

In a preferred embodiment, both devices have a positive-pressure motive fluid port or inlet, and a "suction" port or inlet for the fluid to be pumped, as well as an outlet port. At startup, positive-pressure working fluid streams may be supplied at either or both of the ports or inlets, and the combined streams will exit the outlet—to the extent that the inlet pressures and the mixing of the fluids by the device is sufficient to overcome any backpressure seen at the outlet port. As the working fluid stream at the motive force inlet reaches optimal working pressure and temperature, the Venturi effect may create a partial vacuum ("suction") at the suction port, which may relieve the need for a continued positive pressure at that port (in other words, the effect may be sufficient to enable the externally supplied pumping force to be reduced or turned off).

In a preferred embodiment, if the working fluid streams differ in phase (i.e., one is liquid and the other is vapor), the relatively minor Venturi effect may be significantly amplified by the mixing of the two inlet streams, particularly if the vapor stream becomes sufficiently condensed such that the reduction in volume creates a relatively large partial vacuum at the suction port. For example, when RUBE™ LT2 fluid (see the tables of FIG. 32 and FIG. 33) is used as the working fluid, the reduction in fluid volume due to phase-change (in this case, condensation) may exceed 200:1, creating significant suction, so the thermodynamic effect may similarly exceed the Venturi effect, giving rise to the term "thermal pump."

Note that the same principles apply regardless of the boiling points of various phase-change working fluids. Thus, although the preferred embodiments described in some depth here contemplate the use of RUBE™ LT2 (an engineered dielectric fluid suitable for immersion of, or contact with, electronics, with a "low" boiling point typically in the range 20° C. to 40° C. at STP), the same concepts may be directly applied to phase-change fluids with very different boiling points like RUBE™ CF (Cryogenic-temperature Fuel such as LNG with a truly low boiling point of −161° C. at STP). In the case of LNG, even the "hot" side is very cold, since LNG cannot remain a liquid, regardless of pressure, above its critical temperature, which is only −83° C.).

The depicted vapor injector [2.30] and thermal eductor [2.40] may be considered "duals" of one another in the mathematical or category-theory sense, because the thermodynamic phases of the fluids at their respective inlets are reversed:

At the positive-pressure (motive force inlet) port, the apparent motive force for the vapor injector [2.30] may be provided by relatively high-pressure vapor at [2.34], whereas the motive force for the thermal eductor [2.40] may be provided by pressurized liquid at [2.44].

At the suction port, the vapor injector [2.30] may normally ingest liquid at [2.32], whereas the thermal eductor [2.40] may normally ingest vapor at [2.42].

In both types of devices, the resultant streams at their respective outlets may be an efficient thermal mixing of the two inlet streams that causes sufficient pressure to overcome the backpressure seen at said outlets. The RUBE™ Vapor Injector [2.30] and RUBE™ Thermal Eductor [2.40] depicted here may be particularly useful for pumping working fluid (e.g., RUBE™ LT2 fluid) toward a downstream destination that may be directly or indirectly supplying backpressure toward the respective device (thereby increasing its internal pressure), and which backpressure must be overcome by said device. To the extent this backpressure is fed back, directly or indirectly, to the device's inlets, it may help the device to overcome the device's internal pressure and thermally pump fluid toward the downstream destination, despite the backpressure. Whereas external pumping power (e.g., via an electric pump or other pressure source) may be needed initially, as the system's heat sources and sinks reach operating temperatures and pressures, less external power may be needed for pumping, since the thermal pumps like vapor injector [2.30] and thermal eductor [2.40] may naturally become more efficient and dynamically take on more of the pumping load.

RUBE™ Vapor Injector and RUBE™ Thermal Eductor Construction

In a preferred embodiment, the RUBE™ Vapor Injector [2.30] and RUBE™ Thermal Eductor [2.40] of FIG. 37 may be constructed by adapting the design criteria and manufacturing techniques currently used to construct conventional COTS eductors and thermocompressors. Since conventional devices use a relatively weak Venturi effect with a single-phase working fluid (e.g., water or compressed air), one adaptation is to design for a combination of Venturi and thermodynamic effects.

In a preferred embodiment, the available motive stream parameters (regardless of whether the stream is to be vapor or liquid) are used in the conventional way to design an injector eductor for maximum Venturi effect, on the assumption that the fluid in the suction stream will be the same type, but opposite phase. In particular, the design must consider the diameters of the inlet ports (motive and suction) and outlet port, and the diameters and tapers of the inlet cone, convergence or mixing cone, and divergence or exit cone. Thus, the Venturi aspect of the conventional design must account for the fact that if the motive stream is vapor, the suction stream will be liquid, and vice-versa, which is roughly analogous to conventional Venturi-effect-only designs, such as those where the motive stream is compressed air and the suction stream is a fluid, or the motive stream is water and the suction stream is unwanted air or vapor. Note that a given conventional design will be Venturi-optimal for either a liquid motive steam, or a vapor motive stream, but not both.

In a preferred embodiment, the design must then consider mass-flow rates and the effect of thermodynamic expansion or compression. For example, if the working fluid is RUBE™ LT2 fluid, the volume ratio of vapor vs. liquid is more than 100:1, and for RUBE™ CF fluid (LNG), the volume ratio of vapor vs. liquid is more than 600:1. Thus, for example, this means that if vapor entering one of the inlet ports is condensed by vapor entering the other inlet port, the volume of the resulting condensate will be less $1/100^{th}$ or $1/600^{th}$, respectively, of the volume of vapor before it condensed. This reduction in volume creates a partial vacuum that induces suction and may be used to increase the flow into (and out of) the device, and these flow increases must be accounted for in an optimal design. In a preferred embodiment, the velocity of the motive stream may also need to be adjusted (either by modifying the external requirement, or the inlet cone design, or both), in order to achieve sufficient outlet pressure (such as to overcome a downstream backpressure, if that is a requirement).

In a preferred embodiment, the design should also consider materials compatibility with the specific working fluids and temperatures of interest, and also, the manufacturability of the design with said material. In a preferred embodiment, for example, RUBE™ LT2 fluid may be used to cool electronics and acquire exergy in a subsystem similar to the depictions of FIG. 52, FIG. 53, FIG. 54, FIG. 55, FIG. 56, and FIG. 60, and in such an implementation, the inertness of the fluid and the moderate temperature range allows for a wide range of materials. Accordingly, in a preferred embodiment, the half-manifolds [3.16] or [3.17] depicted, for example, in FIG. 53, which may be constructed, for example, as an injection-molded hard-plastic component (and in this case, halves may be mirror-images of each other), may comprise any combination of built-in (i.e., injection-molded) RUBE™ Vapor Injector [2.30] or RUBE™ Thermal Eductor [2.40] components, each having a "suction" inlet port [2.32] or [2.42], a higher-pressure "motive" inlet port [2.34] or [2.44], an outlet port [2.35] or [2.45], along with the requisite set of internal cones (inlet cone, convergence/mixing cone, and divergence/outlet cone), respectively.

In another preferred embodiment, where a RUBE™ Vapor Injector [2.30] or RUBE™ Thermal Eductor [2.40] may be used in cryogenic service, such as with RUBE™ CF fluid (LNG), the very low temperatures involved (e.g., −162° C. or lower) and potentially high pressures (e.g., 1000 psi or higher) requires close attention to materials properties. In a preferred embodiment, devices for such extreme cryogenic service may be constructed of particular grades of stainless steel or Invar (a special steel with 36% nickel content, intended for cryogenic service). In a preferred embodiment, extreme temperature devices may be fabricated with vacuum-jacketed walls, or with custom deep-vacuum (e.g., down to $10^{-7}$ Torr) thermal barriers such as the commercially available Insulon™ Shaped-Vacuum™ thermal barrier technology offered by Concept Group, Inc. (www.conceptgroupinc.com).

RUBE™ Vapor Injector Interface to STEER Thermal Bus

In this example of FIG. 37, the "suction" inlet port [2.32] of vapor injector [2.30] may be connected to the outlet of a 2-port digital mixer valve [2.31], each of whose upstream inlet ports may connect to one of the two medium-temperature supply channels of the six RUBE™ LT2 supply channels [2.2a] available, such that the boiling point of the selected working fluid (e.g., RUBE™ LT2) may lie within the temperature range spanned by the channels. Thus, the inlet port [2.32] that may provide normally lower-pressure "cool side" working fluid ("coolant") to the vapor injector [2.30] may be supplied with working fluid, typically in liquid phase, from either of the two available channels depicted, or any mix of working fluid from any combination of the two channels, with a dynamically specified percentage from each channel. For example, if the temperatures currently available in the two channels are 20° C. and 30° C., FRAME may direct the STEER apparatus [2], via digital mixer valve [2.31], to deliver working fluid to inlet port [2.32] in the following flow percentages: 50% at 20° C. and 50% at 30° C.

Likewise, the normally higher-pressure "motive" inlet port [2.34] of vapor injector [2.30] may be connected to the outlet of a 2-port digital mixer valve [2.33], each of whose upstream inlet ports may connect to one of the two medium-temperature supply channels of the six RUBE™ LT2 supply channels [2.2a] available, such that the boiling point of the selected working fluid (e.g., RUBE™ LT2) may lie within the temperature range spanned by the channels. Thus, the inlet port [2.34] that provides "hot side" working fluid ("motive" fluid) to the vapor injector [2.30] may be supplied with relatively pressurized working fluid, typically in vapor phase, from either of the two available channels depicted, or any mix of working fluid from any combination of the two channels, with a dynamically specified percentage from each channel. For example, if the temperatures currently available in the two channels are 40° C. and 100° C., FRAME may direct the STEER apparatus, via digital mixer valve [2.33], to deliver working fluid to inlet port [2.34] in the following flow percentages: 0% at 40° C. and 100% at 100° C.

In this example above, there is a circuit depicted as the coolant supply-return path [2.2a] [2.31] [2.32] [2.35] [2.36] [2.2b], and another circuit depicted as the motive fluid supply-return path [2.2a] [2.33] [2.34] [2.35] [2.36] [2.2b], such that under computer control, working fluid from ingress ports [2.32] and [2.33] may become mixed within vapor injector [2.30], with subsequent exit occurring via egress port [2.35] and splitter valve [2.36], which may then dynamically distribute a percentage of the egress flow to each of the two return channels to which it connects (e.g., to the two medium-temperature return channels of the six RUBE™ LT2 return channels [2.2b] available). As depicted, the two return channels connected at splitter valve [2.36] may be in the two temperature ranges that partially overlap the four different temperature ranges of the supply channels [2.2a] connected at ingress ports [2.32] and [2.34].

Although FIG. 37 depicts a preferred embodiment where each vapor injector [2.30] is configured with 2-port digital mixer valves [2.31] [2.33] normally connected to a supply of fluids in the STEER Thermal Bus [2.2a]), and further is configured with a 2-port digital splitter valve [2.36] that accepts mixed fluid via egress port [2.35] (also with an associated outlet temperature, pressure, and volumetric flow or mass-flow rate), and returns it to STEER Thermal Bus [2.2b], the use of just two fluids is by no means a constraint. Alternatively, warmer or colder fluids may be supplied, and any positive number of ports may be implemented on the one or more digital mixer valves [2.31] [2.33] and digital splitter valves [2.36].

Furthermore, the number of ports implemented on digital mixer valves [2.31] [2.33] and digital splitter valves [2.36] need not match. For example, with 6-port digital mixer valves [2.31] [2.33] and digital splitter valves [2.36], any of the six temperature ranges depicted in STEER Thermal Bus supply [2.2a] may be mixed dynamically under system control, and subsequently returned to any of the six temperature ranges depicted in STEER Thermal Bus return [2.2b].

RUBE™ Thermal Eductor Interface to STEER Thermal Bus

In this example of FIG. 37, the lower-pressure "suction" inlet port [2.42] of thermal eductor [2.40] may be connected to the outlet of a 2-port digital mixer valve [2.41], each of whose upstream inlet ports may connect to one of the two upper-temperature supply channels of the six RUBE™ LT2 supply channels [2.2a] available, such that the boiling point of the selected working fluid (e.g., RUBE™ LT2) may lie within the temperature range spanned by the channels. Thus, the inlet port [2.42] that provides lower-pressure "hot side" working fluid to the thermal eductor [2.40] may be supplied with working fluid, typically in vapor phase, from either of the two available channels depicted, or any mix of working fluid from any combination of the two channels, with a dynamically specified percentage from each channel. For example, if the temperatures currently available in the two channels are 40° C. and 100° C., FRAME may direct the STEER apparatus [2], via digital mixer valve [2.41], to deliver working fluid to inlet port [2.42] in the following flow percentages: 90% at 40° C. and 10% at 100° C.

Likewise, the higher-pressure "motive" inlet port [2.44] of thermal eductor [2.40] may be connected to the outlet of a 2-port digital mixer valve [2.43], each of whose upstream inlet ports may connect to one of the two medium-temperature supply channels of the six RUBE™ LT2 supply channels [2.2a] available, such that the boiling point of the selected working fluid (e.g., RUBE™ LT2) may lie within the temperature range spanned by the channels. Thus, the inlet port [2.43] that provides "cool side" working fluid ("motive" fluid) to the thermal eductor [2.40] may be supplied with relatively pressurized working fluid, typically in liquid phase, from either of the two available channels depicted, or any mix of working fluid from any combination of the two channels, with a dynamically specified percentage from each channel. For example, if the temperatures currently available in the two channels are 20° C. and 30° C. FRAME may direct the STEER apparatus [2], via digital mixer valve [2.43], to deliver working fluid to inlet port [2.44] in the following flow percentages: 50% at 20° C. and 50% at 30° C.

In the example of FIG. 37, there is a circuit depicted as the vapor suction supply-return path [2.2a] [2.41] [2.42] [2.45] [2.46] [2.2b], and another circuit depicted as the motive fluid supply-return path [2.2a] [2.43] [2.44] [2.45] [2.46] [2.2b], such that under computer control, working fluid from ingress ports [2.42] and [2.43] may become mixed within thermal eductor [2.40], with subsequent exit occurring via egress port [2.45] and splitter valve [2.46], which may then dynamically distribute a percentage of the egress flow to each of the two return channels to which it connects (e.g., to the two medium-temperature return channels of the six RUBE™ LT2 return channels [2.2b] available). As depicted, the two return channels connected at splitter valve [2.46] may be in the two temperature ranges that partially overlap the four different temperature ranges of the supply channels [2.2a] connected at mixer valves [2.41] and [2.43].

Although FIG. 37 depicts a preferred embodiment where each thermal eductor [2.40] may be configured with 2-port digital mixer valves [2.41] [2.43] normally connected to a supply of fluids in STEER Thermal Bus [2.2a]), and further may be configured with a 2-port digital splitter valve [2.46] that may accept mixed fluid via egress port [2.45] (also with an associated outlet temperature, pressure, and volumetric flow or mass-flow rate), and may return it to STEER Thermal Bus [2.2b], the use of just two fluids is by no means a constraint. Alternatively, warmer or colder fluids may be supplied, and any positive number of ports may be implemented on the one or more digital mixer valves [2.41] [2.43] and digital splitter valves [2.46].

Furthermore, the number of ports implemented on digital mixer valves [2.41] [2.43] and digital splitter valves [2.46] need not match. For example, with 6-port digital mixer valves [2.41] [2.43] and digital splitter valves [2.46], any of the six temperature ranges depicted in STEER Thermal Bus supply [2.2a] may be mixed dynamically under system control, and subsequently returned to any of the six temperature ranges depicted in STEER Thermal Bus return [2.2b].

RUBE™ Vapor Injector and RUBE™ Thermal Eductor—Internal Principles of Operation

Since the RUBE™ Vapor Injector and RUBE™ Thermal Eductor are duals of each other, the same PRIOR ART drawing FIG. 39 (from FIG. 75 of US20090216910, "RUBE Vapor Injector—Principle of Operation") (PRIOR ART) may be used to describe their internal principles of operation.

In a preferred embodiment, internally either device may comprise three cones (inlet cone [383], combining cone [384] and delivery cone [386]), with a throat or bottleneck [385] between the latter two (but specifically no overflow gap or overflow valve). In a preferred embodiment, the idea is to use a pair of inlet streams of complementary phases (e.g., liquid and vapor) of the same working fluid, at least one stream of which is pressurized to some extent, in order to augment the flow of a combined stream toward a downstream destination, while achieving a moderated temperature and increased pressure.

NOTE: If the inlet streams are of the same phase (i.e., both liquid or both vapor), then any pumping effect may be limited to that provided by a possible Venturi effect, such as may be provided by a conventional eductor or other jet pump.

In a preferred embodiment, such as for electronics thermal stabilization applications, the working fluid may be an organic dielectric fluid such as RUBE™ LT2 fluid, with a normal boiling point between 20° C. and 40° C., which may comprise, for example, 1-methoxy-heptafluoropropane ($C_3F_7OCH_3$). Other working fluids may also be suitable, for example, such a fluorinated ketone with a normal boiling point between 35° C. and 60° C. In a preferred embodiment, the working fluid may expand substantially when heated and vaporize easily.

In a preferred embodiment, the working fluid that is to be pumped, or that is typically at a lower pressure, may enter at optionally check-valved inlet [303] (which is an alias for [2.32] or [2.42]), where it subsequently encounters the other, higher-pressure stream in combining cone [384]. The to-be-pumped inlet stream may be initially pressurized by external feed pump(s) or other means, but once the process gets going, the working fluid to be pumped may actually be sucked from the lower-pressure inlet into combining cone [384] due to the thermodynamic effect of the partial vacuum created by condensing whichever of the two inlet streams is primarily vapor, and to a lesser extent, by the Venturi effect). Depending on the actual thermodynamic conditions (which in a preferred embodiment may be actively monitored and controlled), external feed pump(s) or other pressurizing source may continue to operate, but at reduced load.

In a preferred embodiment, the working fluid that is to provide the motive force, or that is typically at a higher pressure, may enter through optionally check-valved inlet [313] a.k.a. [382] (which are aliases for [2.34] or [2.44]), and proceed to the converging inlet cone [383] where partial condensation may occur (if the fluid contains vapor), a partial vacuum may be created, and pressure energy may be converted into velocity (kinetic) energy, which may result in a high velocity jet at the nozzle of inlet cone [383], but with a drop in pressure.

In a preferred embodiment, high velocity working fluid from the nozzle of the converging inlet cone [383] may enter the converging combining cone [384] where it may contact and thoroughly mix with the lower-pressure, slower working fluid, resulting in a high vacuum as complete condensation of the vaporous fluid occurs. In a preferred embodiment based on RUBE™ LT2 fluid, the volume of the vapor may be more than 100 times greater (about 116×) than the volume of the liquid from which it was produced, so when condensation occurs in the combining cone [384], vapor may return to liquid with a typical volume reduction of more than 100:1, which may result in a partial vacuum that may provide suction at low-pressure inlet [303] (which is an alias for [2.32] or [2.42]).

In a preferred embodiment, in combining cone [384] the motive fluid's kinetic energy may be transferred to the slower, lower-pressure liquid with which it may make contact, which may result in a jet of heated liquid rushing through the combining cone [384], through the throat [385], and into the divergent delivery cone [386]. Note that, unlike the steam injector depicted in Fig. z21D (from PRIOR ART FIG. 74 of US20090216910), there is no overflow gap [365], and thus no overflow outlet, and no downstream overflow valve [370].

The diverging shape of the delivery cone [386] may convert the kinetic energy of the heated liquid from the combined streams into pressure energy that may be at least slightly higher than the downstream backpressure, so that the liquid may traverse delivery pipe [387] (which is an alias for [2.35] or [2.45]), and open the check-valved flow of working fluid toward its downstream destination.

Disabling conditions such as insufficient vapor speed, imperfect vapor condensation (say, due to overly warm fluid at liquid inlet [303] (which is an alias for [2.32] or [2.42]), or an overly hot valve body), may not occur in the RUBE™ Vapor Injector or RUBE™ Thermal Eductor, because their function is to reduce the total exergy expended for pumping under increased pressures, rather than to enable pumping in the first place. On the other hand, the hotter the load becomes, the more efficiently they may operate, and the greater "free" motive force they may supply. In a preferred embodiment, working fluid may always be delivered to the delivery outlet [387] (which is an alias for [2.35] or [2.45]), if it is supplied at either inlet [303] (which is an alias for [2.32] or [2.42]), or [313] (which is an alias for [2.34] or [2.44]), respectively. Because the RUBE™ Vapor Injector and RUBE™ Thermal Eductor may be more forgiving than a steam injector of the prior art, they may be relatively cheaper to manufacture (less precision machining, if any).

NOTE: Of course, the motive force isn't really "free," but rather, it originates from the system's exergy, which is a source that is generally neither considered nor accounted for.

Example RUBE™ Thermal Eductor Circuit

Figure 41:
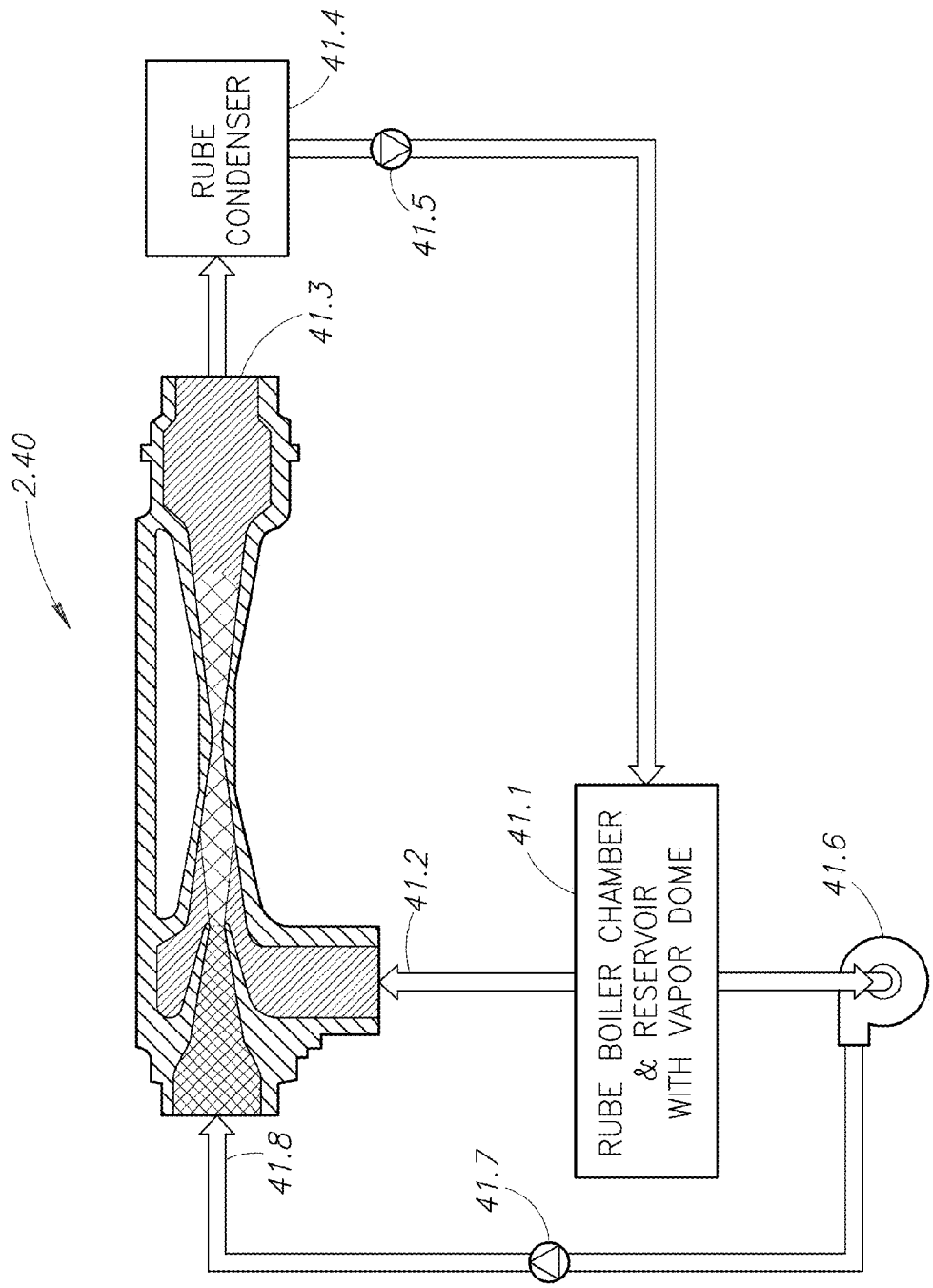
FIG. 41: Simplified Example RUBE™ Eductor Circuit

In the simplified example thermal eductor circuit of FIG. 41, a thermal eductor [2.40] works as a jet pump in series with conventional variable-speed pump(s) [41.6], through flow control valve(s) [41.7] which feeds motive port [41.8] of eductor [2.40]. With sufficient liquid pressure at the motive port [41.8], the Venturi effect may create suction at the eductor's suction port [41.2], which may actively draw from the boiling chamber and reservoir's [41.1] vapor dome, which helps to depressurize the reservoir [41.1] and reduce the boiling point of its phase-change working fluid.

As vapor from the eductor [2.40] suction port [41.2] becomes entrained in the liquid from the motive port [41.8] (within eductor [2.40]), it may condense, which significantly reduces its volume and thus creates additional suction at the suction port [41.2].

Vapor from the reservoir's vapor dome [41.1] may flow into suction port [41.2] and through eductor [2.40], due to vapor pressure in the reservoir [41.1], regardless of whether sufficient liquid motive is available at the eductor [2.40] motive port [41.8] to cause suction at eductor [2.40] suction port [41.2]. This flow path helps to depressurize the reservoir [41.1] and reduce the boiling point of the phase-change working fluid.

The eductor [2.40] (jet pump) "push" path at outlet [41.3] helps to push saturated or two-phase working fluid through the low-pressure-drop condenser [41.4] and flow control valve(s) [41.5] to reservoir [41.1].

NOTE: Under limited conditions, circulation from the reservoir [41.1] through the condenser [41.4] and back to the reservoir [41.1] may occur without any active electromechanical pumping, due to thermodynamic effects (e.g., thermosiphon action). Even when active pumping is used, these effects may allow the speed of pump [41.6] to be dynamically reduced under system control.

The "pull" path of pump(s) [41.6] draws from the coolest part of the reservoir [41.1] to ensure vapor-free working fluid, in order to prevent cavitation in pump(s) [41.6].

Pump(s) [41.6] may not always be powered on or active. When pumping is off, liquid may flow through pump(s) [41.6] anyway, due to vapor pressure in reservoir [41.1].

When pumping is on, the "pull" path of pump(s) [41.6] helps to depressurize the boiler chamber and reservoir [41.1]. The "push" path of pump(s) [41.6] actively pressurizes the eductor's motive port [41.8], which may provide sufficient motive to induce additional Venturi and thermodynamic effects that help to draw vapor from reservoir [41.1], further depressurizing it.

2.7 STEER-Compatible Modular Thermal Sources & Sinks

In a preferred embodiment, the arbitrary subsystem [3.1] of FIG. 13, whenever practical, may refer to some kind of modular unit that may be field-replaceable in the general case, such as those depicted as [3.1] in the example of FIG. 42 (see also each of the eight field-replaceable units depicted in FIG. 66). Note that in FIG. 13 and FIG. 42, the solid-line or dashed-line box, respectively, designating arbitrary subsystem [3.1] provides a functional delineation, not a physical one. This is explained further in the next subsection, which addresses blind-mate interfaces, flow-control, and fail-safe valves.

In FIG. 42, the arbitrary subsystem [3.1] of FIG. 13 has been replaced with a dashed-line box representing an embodiment of computing infrastructure comprising electronics implementing a Survivable Computing, Routing, & Associative Memory (SCRAM™)unit [3.1] (an example of which is discussed in US20090216910), one of whose external interfaces [3.10a] may be connected to the outlet of a 4-port digital mixer valve [2.4a] (discussed in a previous section), where each of the mixer's four upstream inlet ports may further connect to one of the four lower temperature supply channels (e.g., S4, S5, S6, and S7) of the six example RUBE™ LT2 supply channels [2.2a] available (see FIG. 14). Note that the mixer valve [2.4a] may control the flow of working fluid by adjusting the rate contributed from each of the four supply channels feeding its four ports, such that a single mixed flow may be available at its egress port (toward inlet [3.10a] of [3.1]). Consequently, the first inlet [3.10a] of SCRAM™ unit [3.1] may be supplied with working fluid from any one of the four lowest available channels [2.2a] depicted, or from any mix of working fluid from any combination of said channels, with a specified percentage from each channel.

In a preferred embodiment, and as depicted in FIG. 42, this set of four mixable channels may correspond to ranges of inlet temperatures that may be appropriate for a particular set of internal target devices (e.g., CPU chips) for which a nominally sub-30° C. working fluid (such as a direct immersion coolant like RUBE™ LT2) may be most beneficial, both to the target devices and to the overall system.

For example, if the temperatures currently available in the four channels are −60° C., 10° C., 15° C., and 38° C., the STEER apparatus may be directed to deliver working fluid to the first inlet port [3.10a] of SCRAM™ unit [3.1] via digital mixer valve [2.4a] with some combination of flow percentages such that the combination may result in a working fluid inlet temperature of no more than 30° C. at the corresponding SCRAM™ unit [3.1] ingress port [3.10a]. The as-mixed temperature delivered from digital mixer valve [2.4a] may be significantly lower (better) than the maximum target threshold, however, or even slightly higher (worse), but in any case may be the most optimal temperature that can be delivered based on the priority of the target inlet [3.10a] and the current state of the system.

For example, in a typical operational scenario, of the three ingress ports depicted, ingress port [3.10a] may have the highest priority, whereas ingress ports [3.11a] and [3.12a] may have much lower priority (e.g., this may correspond to a "don't care" condition for ports [3.11] and [3.12a] as long as the inlet temperatures are approximately within their respective ranges). In the example depicted here, flows from ingress ports [3.10a], [3.11a], and [3.12a] may ultimately exit via their corresponding egress ports and back to their respective return channels [2.2b] via digital splitter valves [2.4b], [2.5b], and [2.6b], respectively. The heat exchangers and pumps depicted notionally here appear more clearly in later 54 figures, with discussion.

In a preferred embodiment, any modular thermal source or sink [3.1] (such as the SCRAM™ units notionally depicted here, each of whose ingress/egress channels may dynamically be either source or sink) may connect to any combination of the STEER supply [2a] and return [2b] channels (see FIG. 14). In a preferred embodiment, the STEER-compatible RUBE™-based electronics cooling loads of the next section may be particularly optimal, due to intentional co-design. The aforementioned SCRAM™ units are, by design, a subset of RUBE™-based electronics cooling loads.

In a preferred embodiment, the arbitrary subsystem [3.1] does not have total control over the operating parameters (temperature, pressure, flow rate, etc.) of the working fluids delivered to it, and may have no control all (with the exception of flow shutoff, which it may unilaterally control). In a preferred embodiment, the operating parameters may be globally optimized by the SLAM apparatus [1] for a total set of co-located arbitrary subsystems [3.1], or a subset of said subsystems, preferably with collaborative input from said subsystems. In a preferred embodiment, the SLAM apparatus [1] may be distributed among the co-located arbitrary subsystems [3.1], and may be enclosed therein.

STEER Thermal Bus—Blind-Mate Interfaces, Flow-Control, and Fail-Safe Valves

NOTE: Mixers and splitters which internally have no check valves or other internal directional flow constraints may be interchangeable, and any such device may be referred to as a "mixer-splitter," especially when used in a bidirectional flow context. Since mixer and splitter valves as described herein are duals of each other (and in the absence of internal check valves, are interchangeable), the discussions and illustrations of supply-side blind-mate mixer valve configurations in this section are equally applicable to return-side blind-mate splitter valve configurations and will not be repeated.

Any number of systems, subsystems, components, or devices depicted as interfacing to the STEER Thermal Bus may be packaged together into a single field-replaceable unit (FRU) having a defined set of capabilities, which may generally include the capability for blind-mate insertion and removal (e.g., to enable automated handling by robotics). Accordingly, FRU working fluid interfaces, as contemplated in this document, may typically comprise any number of blind-mate couplers (i.e., two-piece couplers, with each half capable of opening fully when mated, and closing fully when unmated), as well as one or more computer-controlled flow-control valves on each side of the interface (i.e., between each blind-mate "half-coupler" and the rest of the equipment on the half-coupler's side of aforesaid interface. In general, none of these details may be depicted.

In lieu of depicting the blind-mate coupling details mentioned in the previous paragraph, each such interface may be depicted as one "port" of a single set of "mixer" valves (for fluid ingress from a STEER Thermal Bus supply source) or as one port of a single set of "splitter" valves (for fluid egress to a STEER Thermal Bus return). For example, the devices called out as [2.4a], [2.5a], and [2.6a] in FIG. 13 depict mixer valves for working fluid ingress, with mixer [2.4a] having 4 ports, mixer [2.5a] having 2 ports, and mixer [2.6a] having 2 ports. The example of FIG. 13 also depicts splitter valves for working fluid egress, which are called out as [2.4b], [2.5b], and [2.6b], with 4, 2, and 2 egress ports, respectively. In FIG. 13, for example, but also generally, the various mixers and splitters are each depicted as connecting to a called-out inlet or outlet of a subsystem or component which may be the subject of descriptive text. In the example of FIG. 13, the "arbitrary subsystem" [3.1] may be just such a subsystem, wherein ingress mixers [2.4a], [2.5a], and [2.6a] may transfer fluid from the STEER Thermal Bus supply [2.2a] to arbitrary subsystem [3.1] inlets [3.10a], [3.11a], and [3.12a], respectively, and egress splitters [2.4b], [2.5b], and [2.6b] may transfer fluid from arbitrary subsystem [3.1] outlets [3.10b], [3.11b], and [3.12b], respectively, to the STEER Thermal Bus return [2.2b]. In a setup like that depicted in FIG. 13, the physical enclosure of arbitrary subsystem [3.1] (which may be generally representative of any other similarly interfaced subsystems) may incorporate and enclose the depicted mixers [2.4a], [2.5a], and [2.6a] and splitters [2.4b], [2.5b], and [2.6b] within its boundaries, along with any other flow-control valves or other devices positioned between the aforesaid mixers/splitters and the enclosure's corresponding blind-mate half-couplers.

In accordance with the discussion in the previous paragraph, the box or other visual boundary delineating arbitrary subsystem [3.1] in FIG. 13, and also in FIG. 42 (and likewise in other figures may depict such delineation differently, or not at all), which is depicted as delineating arbitrary thermal subsystem [3.1] (along with its called-out working fluid inlets and outlets) from the STEER Thermal Bus supply [2a] and return [2b] (along with its called-out mixers and splitters), represents a functional delineation rather than a physical delineation. Depicting a physical delineation of working fluid interfaces would require a diagram incorporating such a delineation to "zoom in" so as to depict the bisection of blind-mate coupler halves (i.e., between half-couplers such as [2.4a.1] and [2.4a.2]) at their corresponding physical working fluid interfaces, as depicted in the examples of FIG. 43, FIG. 44, FIG. 45, FIG. 46, and FIG. 47, which is a level of detail (i.e., "clutter") that, for most diagrams in this document, is neither appropriate nor relevant.

Delineation of Functional and Physical Boundaries

As noted earlier in the discussion of FIG. 42, the dashed-line box designating arbitrary subsystem [3.1] provides a functional delineation, or boundary, rather than a physical one. This section addresses the physical delineation between an arbitrary subsystem [3.1] (especially STEER-compatible modular thermal sources and sinks) and the STEER Thermal Bus supply [2a] (see FIG. 14), and analogously, the physical delineation between arbitrary subsystem [3.1] and STEER Thermal Bus return [2b] (see FIG. 14). FIG. 43 depicts an excerpt from FIG. 13, where the boundary of arbitrary subsystem [3.1] delineates the functionality of, for example, a field replaceable unit (FRU).

Figures 45, 46:
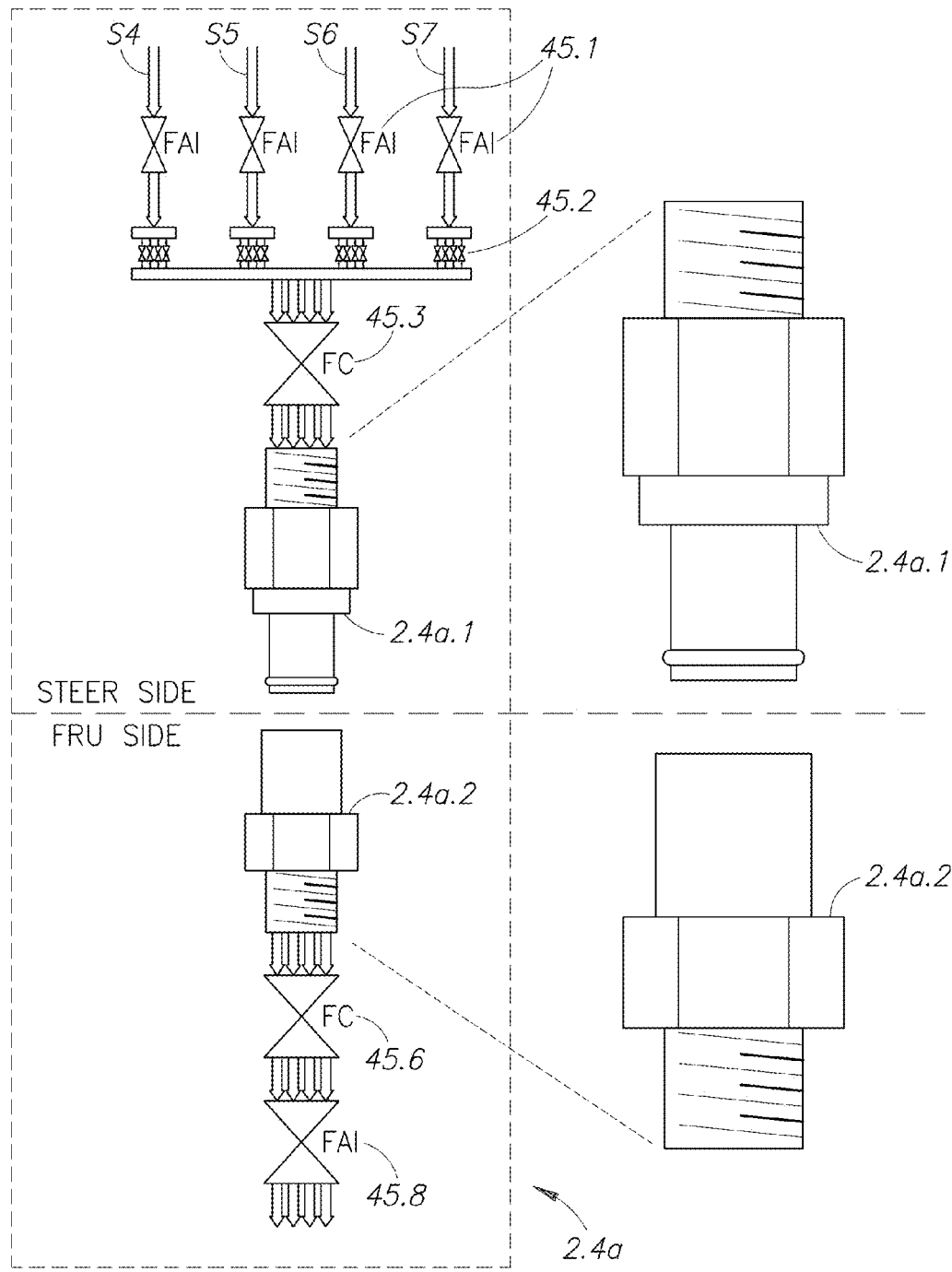
FIG. 45: STEER Thermal Bus—Blind-Mate Interfaces—Physical STEER-Side Mixing/Splitting Example
FIG. 46: STEER Thermal Bus—Blind-Mate Interfaces—Individual Mating Half-Couplers Example

In the example of FIG. 43, the dashed line around the four-port mixer valve [2.4a] encloses an abstraction of the aforesaid mixer valve (i.e., an area of focus which will be "zoomed in" on with the examples of FIG. 44 and FIG. 45. In a preferred embodiment, the abstraction may be instantiated in numerous ways, two examples of which are depicted in FIG. 44 and FIG. 45, which illustrate a physical interface boundary between mating coupler halves [2.4a.1] and [2.4a.2]. FIG. 44 depicts a physical configuration where the mixing occurs on the FRU side of the blind-mate interface. FIG. 45 depicts an alternative physical configuration where the mixing occurs on the STEER side of the blind-mate interface.

Zoomed-in Configuration Examples

In a preferred embodiment as depicted in FIG. 44, the instantiation of an abstract four-port mixer valve [2.4a] may comprise one or more layers of physical valves in series, so as to implement particular properties as needed. As depicted, the top layer (closest to the STEER Thermal Bus supply [2.2a]) of each thermal channel may comprise a single fail-as-is (FAI) valve [44.1] that, in normal operation, may serve as a robust flow shut-off valve (i.e., open or closed) under system control. However, if system control or power is lost, such valves may fail in their current operational mode (i.e., open or closed), thereby enabling continued operation at the current setting. Since the STEER Thermal Bus supply [2.2a] may be pressurized, the FAI valves [44.1] may serve an isolation role to keep potentially stressful pressures from propagating to downstream valves which may be more fragile.

In a preferred embodiment as depicted in FIG. 44, after the layer of FAI valves [44.1] may be a layer of physical digital flow control valves [44.2] (one set per thermal channel) which may carry out the function of the abstract mixer valves [2.4a] depicted in FIG. 43, and previously explained in the text near FIG. 17 (except that the outputs of the channel sets are not mixed on the STEER side of the interface). As depicted in FIG. 44, the physical digital flow control valves [44.2] may be essentially equivalent to latching digital rate control valves [230], and may each (independently) be of the partially parallel-redundant type described in FIG. 62 of US20090216910 (PRIOR ART), or a series-parallel redundant type as previously described and depicted in FIG. 15 and FIG. 16.

In an alternate preferred embodiment, this layer of flow control valves [44.2] may be omitted in favor of placing flow control/mixer valves on the LRU side of the blind-mate interface (to be discussed shortly). In still another embodiment, a layer of flow control or mixer valves may be instantiated on both sides of the blind-mate interface.

As depicted in FIG. 44, after the layer of physical digital flow control valves [44.2] (below it in the figure) may be a layer of fail-closed (FC) valves [44.3], again on a one-valve-per-channel basis. The FC valves [44.3], which may be robust, may ensure that no fluid will flow (or escape) if system control or power is lost, such as may occur during the normal course of FRU insertion, removal or transport. In a preferred embodiment, a blind-mate interface to the STEER Thermal Bus supply [2.2a]) comprises at least one layer of robust valves (either FAI or FC, and preferably FC), with at least one valve per thermal channel, on the STEER Thermal Bus supply [2.2a]) side of the interface (obviously, an equivalent configuration or its dual should be mirrored on the interface implementing the STEER Thermal Bus return [2.2b]).

As depicted in FIG. 44, after the outermost layer of FC (or FAI) valves (below it in the figure) may be a layer of blind-mate half-couplers [2.4a.1] (with embedded valves), on a one-coupler-and-valve-per-channel basis. These valves may comprise the physical blind-mate interface to the STEER Thermal Bus supply [2.2a], as represented by the horizontal dashed STEER/FRU demarcation line in FIG. 44, FIG. 45, FIG. 46, and FIG. 47. Below this dashed line, the other half of each blind-mate interface may be instantiated as part of an FRU, beginning with a layer of FRU-side half-couplers [2.4a.2] (one half-coupling per channel) that mate with their respective counterparts [2.4a.1] on the STEER side, as depicted. In a preferred embodiment as depicted in FIG. 44, below the layer of half-couplers [2.4a.2] may be a layer of FC valves [44.6] (one valve per channel), whose role is the same as its STEER-side counterpart.

In a preferred embodiment as depicted in FIG. 44, below the layer of FC valves [44.6] may be a layer of physical digital mixer valves [44.7] (one set per thermal channel) which carry out the function of the abstract mixer valves [2.4a] depicted in FIG. 43, and previously explained in the text near FIG. 17. In an alternate embodiment, this layer of mixer valves [44.7] may be omitted in favor of placing them on the STEER side of the blind-mate interface (to be discussed shortly in conjunction with FIG. 45).

In a preferred embodiment as depicted in FIG. 44, below the layer of digital mixer valves [44.7] may be a layer of FAI valves [44.8]. In the case of a single set of digital mixer valves, as depicted in FIG. 44, only a single FAI valve [44.7] may be needed (in the absence of TMR requirements), because the egress from a digital mixer valve [44.7] is a single stream (i.e., a mix of the thermal input channels). On the FRU side, output from each FAI valve (if present, or from the next higher layer if not) corresponds to a single fluid inlet channel to the FRU to which it is connected.

NOTE: In FIG. 44, the STEER-side digital flow control valves [44.2] (which may be less robust than the FAI or FC valves) may be omitted, so that fine-grained digital flow control may be accomplished only on the FRU side (i.e., by the digital mixer valves [44.7] depicted in FIG. 44, for ingress, or by counterpart digital splitter valves for egress, not depicted). This configuration allows the digital flow control valves (mixers and/or splitters) to remain on the FRU side only, where they may be automatically replaced whenever the FRU itself is replaced (i.e., as part of the FRU).

The example of FIG. 45 is configured similarly to FIG. 44, with a key difference being that the flows are mixed on the STEER side of the blind-mate interface, which may be beneficial (e.g., simpler, fewer components), but with the potential for a trade-off in flexibility or agility. In particular, the four sets of digital flow control valves [44.2] in FIG. 44 may be replaced with a single four-port digital mixer valve [45.2] as in FIG. 45. Likewise, the four STEER-side FC valves [44.3] in FIG. 44 may be replaced with a single STEER-side FC valve [45.3] in FIG. 45, and the four STEER-side blind-mate half-couplers [2.4a.1] in FIG. 44 may be replaced with a single blind-mate half-coupler [2.4a.1] in FIG. 45.

NOTE: By trading four half-couplers for one half-coupler on the FRU side, the FRU may lose flexibility in which thermal channels it may physically connect with. Depending on the actual implementation, this may be a moot point. In general, it may be anticipated that multiple fluid channels operating in parallel may be needed to support sufficient flow rates from the desired thermal channels, and these parallel flows may each need individual half-couplers, unless the flow-rate capacities of commercially available blind-mate couplers (circa 2011) significantly improve.

In the example of FIG. 45, the FRU side may also be simplified; the four FRU-side blind-mate half-couplers [2.4a.2] in FIG. 44 may be replaced with a single FRU-side blind-mate half-coupler [2.4a.2] as in FIG. 45. Likewise, the four FRU-side FC valves [44.6] in FIG. 44 may be replaced with a single FRU-side FC valves [45.6] as in FIG. 45, and the FRU-side 4-port digital mixer valve [44.7] of FIG. 44 may be omitted in a configuration like FIG. 45, since the flow may be mixed on the STEER side. The final FAI valve [45.8] (if present) may serve the same role in the example of FIG. 45 as it [44.8] may in FIG. 44.

Generalization of Configuration Examples

Similar instantiations may be used for mixer valves other than [2.4a], with different port counts, like [2.5a] or [2.6a], for example, by incorporating the appropriate number of valves and flow paths. Connections to the STEER Thermal Bus return [2.2b] are not depicted, as they may be implemented in exactly the same manner as their counterpart supply connections depicted in FIG. 43, FIG. 44, FIG. 45, FIG. 46, and FIG. 47—i.e., by maintaining the same STEER-side and FRU-side designations and orientations while connecting egress ports to their respective return channels.

Elsewhere in this document, in lieu of depicting the aforementioned blind-mate coupling details (i.e., in the immediately preceding paragraphs), each interface to a specific thermal supply channel may be depicted as one "port" of a single abstract set of "mixer" valves (for fluid ingress from a STEER Thermal Bus supply source) or as one port of a single set of abstract "splitter" valves (for fluid egress to a STEER Thermal Bus return). For example, the devices called out as [2.4a], [2.5a], and [2.6a] in FIG. 13 and in FIG. 43 depict abstract mixer valves for working fluid ingress, with mixer [2.4a] having 4 ports, mixer [2.5a] having 2 ports, and mixer [2.6a] having 2 ports. The example of FIG. 13 also depicts abstract splitter valves for working fluid egress, which are called out as [2.4b], [2.5b], and [2.6b], with 4, 2, and 2 egress ports, respectively. In FIG. 13, for example, but also generally, the various mixers and splitters are each depicted as connecting to a called-out inlet or outlet of a subsystem or component which may be the subject of descriptive text.

In the example of FIG. 13 and FIG. 43, the "arbitrary subsystem" [3.1] may be just such a subsystem, wherein ingress mixers [2.4a], [2.5a], and [2.6a] may transfer fluid from the STEER Thermal Bus supply [2.2a] to arbitrary subsystem [3.1] inlets [3.10a], [3.11a], and [3.12a], respectively, and egress splitters [2.4b], [2.5b], and [2.6b] may transfer fluid from arbitrary subsystem [3.1] outlets [3.10b], [3.11b], and [3.12b], respectively, to the STEER Thermal Bus return [2.2b] (egress flows and connections are not depicted in FIG. 43).

In a setup like that depicted in FIG. 13, the physical enclosure of arbitrary subsystem [3.1] (which may be generally representative of any other similarly interfaced subsystems) may incorporate and enclose the depicted mixers [2.4a], [2.5a], and [2.6a] and splitters [2.4b], [2.5b], and [2.6b] within its boundaries, along with any other flow-control valves or other devices positioned between the aforesaid mixers/splitters and the enclosure's corresponding blind-mate half-couplers. Examples of these are depicted in FIG. 44 and FIG. 45.

Field-Replaceable Unit (FRU) Packaging and Blind-Mate Couplers

In a preferred embodiment, any number of systems, subsystems, components, or devices depicted as interfacing to the STEER Thermal Bus may be packaged together into one or more field-replaceable units (FRUs), each having a defined set of capabilities, which may generally include the capability for blind-mate insertion and removal (e.g., to enable automated handling by robotics). Accordingly, in a preferred embodiment, FRU working fluid interfaces may typically comprise any number of blind-mate couplers (e.g., two-piece couplers such as the commercially available couplers [2.4a.1] and [2.4a.2] depicted in FIG. 46, with each half capable of opening fully when mated, and closing fully when unmated), as well as one or more computer-controlled flow-control valves on each side of the interface (i.e., between each blind-mate "half-coupler" and the rest of the equipment on the half-coupler's side of aforesaid interface. In general, none of these details may be depicted outside this section.

Figure 47:
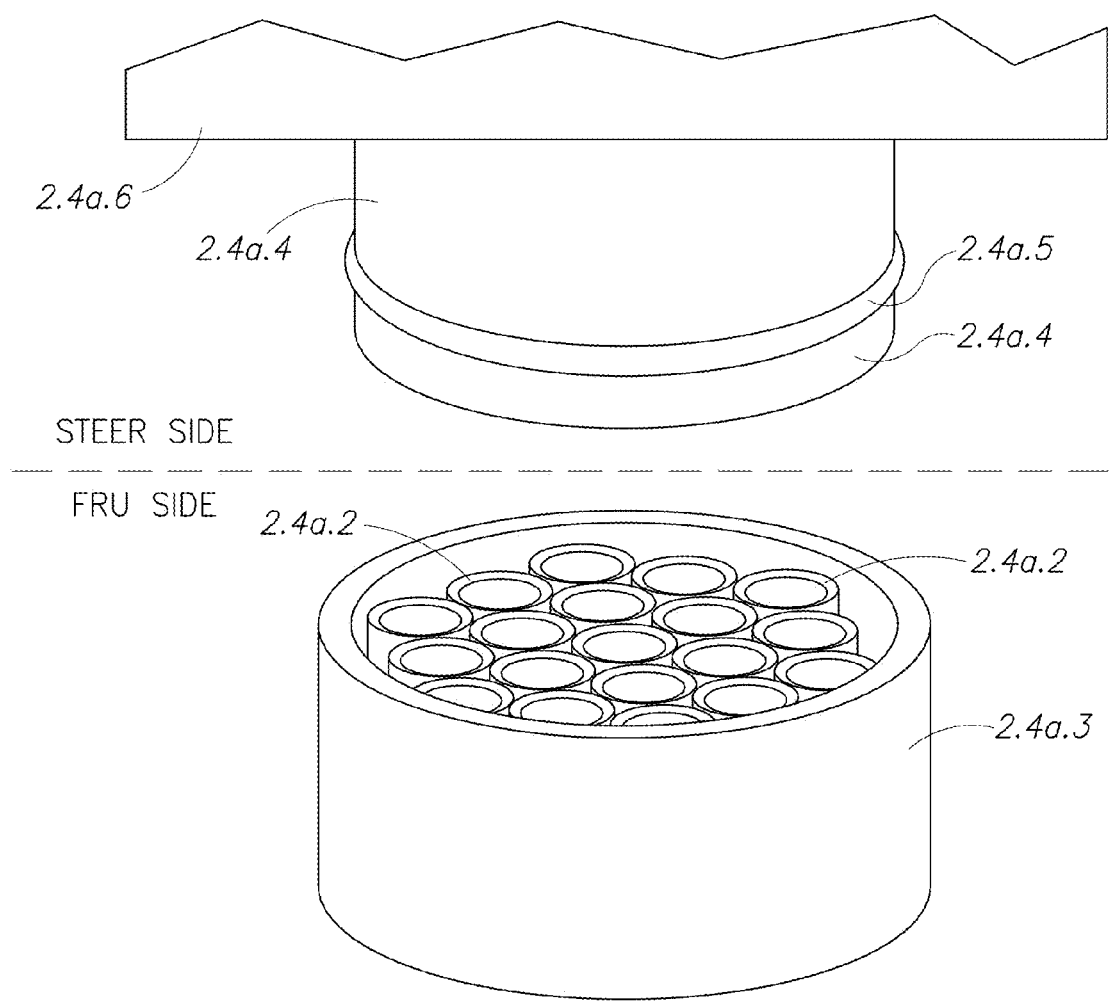
FIG. 47: STEER Thermal Bus—Blind-Mate Interfaces—Multiple Half-Couplers Enclosed in Outer Shell Example

In a preferred embodiment, each half of a multiplicity of blind-mate couplers [2.4a.1] or [2.4a.2] such as those depicted in FIG. 46 may be grouped and placed within the confines of a larger, blind-mate outer half-shell [2.4a.3] or [2.4a.4] (such as depicted in FIG. 47) that may provide mechanical protection functions. In a preferred embodiment, the outer shell [2.4a3] or [2.4a.4] may help with alignment and protection of the enclosed couplers during insertion and removal operations. In a preferred embodiment, the outer shell [2.4a.3] or [2.4a.4] may have a sealing mechanism [2.4a.5] (FIG. 47 depicts an O-ring, for example) that may enable the mated outer shell halves to provide a secondary fluid retention mechanism in the event of an inner coupling leak during operation (i.e., while mated with its counterpart on the other side of the interface, which causes its internal valves to be open).

In a preferred embodiment, an outer shell comprising blind-mate outer shell halves [2.4a.3] and [2.4a.4] such as that depicted in FIG. 47 may be configured with interstitial sensors to detect the presence or absence of escaped working fluid (absence being the normal condition), and the level or quantity of working fluid if present, along with temperature and pressure. In a preferred embodiment, each mated outer shell may protect only a single type of working fluid, so as to avoid the need to detect the escaped fluid type, and to simplify or avoid potential problems of interactions between escaped fluids. In an alternate embodiment, fluid-type sensors may be employed so as to enable the detection of specific fluids potentially escaping from their normal channels.

In a preferred embodiment, self-aligning blind-mate coupling halves may be conventionally mounted to a bulkhead [2.4a.6] on the STEER side, and to a counterpart FRU bulkhead on the FRU side.

In a preferred embodiment, the aforesaid STEER-compatible arbitrary subsystem [3.1], which may represent arbitrary STEER-compatible modular thermal sources and sinks, may incorporate automated or fail-closed ("FC") flow-control or shut-off valves that may retain a normally closed position for all external "plumbing" interfaces, to prevent the escape of working fluid whenever said arbitrary subsystem [3.1] may not be connected to the STEER supply [2.2a] and return [2.2b] buses, and at other appropriate times. This may likewise be generally true for the overall set of STEER Thermal Buses [2a] [2b] to which any arbitrary subsystems [3.1] may connect, so there may be similar flow-control/shut-off valves on the STEER Thermal Bus side of such interfaces.

In a preferred embodiment, each side of each blind-mating working fluid interface may comprise at least one FC valve. Further, in a preferred embodiment, modular field-replaceable units may interface with said STEER supply and return buses via specially constructed blind-mate fluid couplings that may open when a field-replaceable unit mates with the buses, and may close when said unit un-mates, and this open/close behavior may be mirrored on both sides of each such coupler.

In a preferred embodiment partly depicted in FIG. 42 (which is but one of several possibilities), a STEER-compatible modular unit [3.1] may be deployed at a co-designed SUREFIRE silo-based facility [7], as depicted notionally in FIG. 1 and described later. In a preferred embodiment, the STEER-compatible modular units [3.1] may be moved (e.g., via x-y-z axis translation or rotation) robotically (not depicted in FIG. 42) from/to a designated location (e.g., such as the center of a shaped platform that may be able to move vertically) in order to facilitate automated z-axis installation and removal, such that the blind-mate thermal interfaces to the STEER supply [2a] and return [2b] channels (and other interfaces as well, such as electrical and optical) may be conveniently positioned.

In a preferred embodiment with a robotic platform moving vertically along the center of a cylinder, such as the SUREFIRE silo-based facility [7] example depicted in FIG. 1 (which may be envisioned as being somewhat like an elevator moving up and down through the center of a stack of polygonal donuts), the blind-mate thermal interfaces to the STEER supply [2a] and return [2b] channels (and other interfaces as well, such as electrical and optical) may be conveniently positioned along the sides, top, bottom, and/or outer wall of each the STEER-compatible modular unit (but preferably not the innermost wall facing the center of the circular or polygonal arrangement).

3. RUBE (Recuperative Use of Boiling Energy)

3.1 RUBE™ Overview

RUBE is an acronym for Recuperative Use of Boiling Energy. RUBE [3] refers to a subsystem of certain versions of the present invention, as depicted notionally in FIG. 1. In a preferred embodiment, a RUBE apparatus [3] may comprise multiple subsystems or sub-subsystems that may function independently, may or may not be co-located, and may or may not directly connect to each other. For example, in the context of a computing infrastructure, data center servers, network switches, or other electronics loads (or any other power-consuming or heat-dissipating components) may be viewed as RUBE sub-subsystems, especially if in direct thermal communication with the RUBE apparatus [3]. In a preferred embodiment, such computing infrastructure may be co-designed with RUBE technology, so that it may actually become part of an integrated RUBE apparatus [3] and enjoy optimized thermal operation.

Furthermore, because the RUBE apparatus [3] may use low-temperature isothermal phase-change to recuperate waste heat energy (details to follow) as thermal exergy, the electrical loads themselves may operate more efficiently and reliably. An instructive example of this involves an electronics cooling load comprising processors or CPUs of a computing capability such as may be found in a data center. The inventors have observed that by keeping the processors or CPUs under test sufficiently cool, the processors actually dissipated significantly less power, with power reductions of up to 75%. Such reductions may thereby directly improve the total functionality delivered per unit of energy input (such as GFLOPS per watt, which is a measure of power efficiency), as was first discussed in US20090216910. Of course, improvements in CPU power efficiency in a data center may very well complement any other efficiencies achieved, such as significant reductions in parasitic loads (e.g., cooling). Also, TCO (total cost of ownership) may be significantly reduced as a direct consequence of increased component life and reliability, which also may be directly tied to reduced operating temperature (a well-known heuristic is that a 10° C. increase in operating temperature may reduce electronic component life by half, whereas similar decreases in operating temperature may double it).

An optimally advantageous aspect of the RUBE apparatus [3] may be its ability to facilitate or otherwise contribute to heat exchange oriented at, around, or through the boiling point of one or more working fluids, which may enable taking advantage of the relatively large thermal exergy transfer associated with phase-change behavior. In a preferred embodiment, various RUBE apparatus [3] may comprise co-designed subsystems and components such as working fluid mixers, separators, heat exchangers, heaters, subcoolers, and chillers that may be specifically oriented to enabling, facilitating, controlling, and optimizing local or remote exergy transfer associated with the phase-change behavior of selected working fluids, in conjunction with available exergy sources and sinks.

In a preferred embodiment, RUBE may exchange working fluid(s) with the STEER apparatus [2], and the exchanged fluid(s) may be used for cooling, or heating, thermal stabilization, exergy transfer, or other purposes.

In a preferred embodiment, a RUBE apparatus [3] may use a relatively low-temperature phase-change dielectric working fluid to isothermally recuperate exergy in the form of heat energy ("boiling energy") from hot spots and warm spots and transport it via the STEER apparatus [2] for reuse elsewhere.

In a preferred embodiment, the RUBE apparatus [3] may serve a key role of recuperating low-grade or medium-grade heat (such as from electronics loads) and transferring it via the STEER apparatus [2] to other subsystems, such as PERKS apparatus [5] or STORE apparatus [6]. In a preferred embodiment, for example, the PERKS apparatus [5] may use the exergy in the low-grade heat recuperated by the RUBE apparatus [3] to aid in the generation of additional electrical power and cooling. For another example, the STORE apparatus [6] may use the exergy in the low-grade heat recuperated by the RUBE apparatus [3] to aid in the generation of additional heat-driven cooling (e.g., via adsorption or absorption chilling processes). In a preferred embodiment, the additional electrical and cooling power may be subsequently used by electronics loads like those from which RUBE apparatus [3] may recuperate exergy.

In a preferred embodiment, RUBE may exchange working fluid(s) with the STEER apparatus [2] (and thereby, with other subsystems, such as the PERKS apparatus [5]), and the exchanged fluid(s) may be used for cooling, or heating, thermal stabilization, exergy transfer, or other purposes. Furthermore, in a preferred embodiment, various FRAME subsystems and components may comprise RUBE apparatus [3] and components (e.g., by co-design, embedding, attachment, or other means of incorporation) at a very low level of design (e.g., treating a PERKS apparatus [5] component with a specialized RUBE coating). In various preferred embodiments, the RUBE apparatus [3] may comprise co-designed applications of specialized additives, surface coatings, treatments, and coverings in order to achieve specific RUBE or non-RUBE subsystem or component properties or behaviors with respect to electrical or thermal conductivity, surface area, surface roughness or topology, wettability, adhesion, sealing, absorption, adsorption, chemical or material compatibility or protection, temperature range, durability, bioresistance, optical properties. RF and electromagnetic properties, and other properties or behaviors.

3.2 RUBE™ Electronics Cooling

Electronics Cooling for Reliability and Performance

It is generally well known in the electronics industry that, from a reliability viewpoint, a 10° C. increase in operating temperature (e.g., beyond a moderate operating threshold) may halve the useful lifetime of an integrated circuit "chip" or similar device. This may be a predominant data center problem that is partly masked by the fairly rapid equipment turnover (mostly servers) often performed in the name of technology advancement (combined with convenient replacement of "flakey" equipment). It is very likely that a non-trivial percentage of replacements due to failed or failing equipment may be avoided or delayed, either because the failures are transient (and go away at lower temperatures) or permanent-but-preventable (with proper thermal management).

Bad News for High-Heat Servers: CPU Throttling Due to Hidden Thermal Problems

Data centers consume a lot of power, so there is much to motivate actions to reduce that consumption. One such action which may be short-sighted is to increase the temperature setpoints at which servers operate, thereby reducing the costs of cooling the servers and the processors they contain. This may be short-sighted because, besides negatively impacting server reliability, heat can also have a serious, yet hidden, impact on both server performance and on energy requirements (energy being the power required over a period of time). As temperatures increase, transistors get "leaky" (i.e., electrons leak like water) and more power is required, which further increases the temperature and creates a need for additional cooling, which requires still more power.

Modern CPUs are designed to use thermally induced throttling to avoid internal overheating and subsequent self-destruction. Such self-preservation efforts consequently also throttle the CPU performance. Memory subsystems (e.g., dual-inline memory modules, or DIMMs) are also heat-sensitive and may suffer from heat-induced transient data loss (flakey operation) or outright hardware failures. Modern memory subsystems may be similarly temperature-throttled, but may compensate via actual reduction in memory traffic, rather than a direct change in internal operating frequency. On modern DIMMs, a thermal sensor integrated on each DIMM module signals the CPU chipset to throttle memory traffic to the DIMM if its temperature exceeds a programmable critical trip point. Of course, if a CPU's memory channels slow down, its performance and throughput must decrease also.

VRMs (voltage regulator modules) typically found in servers do not throttle performance, but by their nature operate with highest efficiency at lower temperatures. Higher temperatures mean more power is wasted as heat, which also requires additional cooling, and which may contribute to higher local temperatures (e.g., within a server) that force CPUs and memory to throttle anyway.

Although one might not observe an immediate decrease in reliability due to increasing the temperature setpoints in a data center (e.g., to save energy at the data center level), there will likely be an observed decrease in throughput across the data center, unless mitigating measures are taken (and effective). Similar effects may also be observed with unintentional events too, such as dusty heat exchangers, failing fans or blowers, unequal pressurization, or otherwise restricted airflow.

The Non-Obvious Relationship between CPU Temperature and CPU Power Requirements

It may be intuitive that as a processor or CPU (such as may be found in a data center server) does more processing, it may require more power, and thus produce more heat, resulting in a higher CPU temperature, which calls for more cooling, which may also require more power. It may virtually unknown, however, just how large a role the actual processor temperature plays in controlling the amount of power required.

To compensate for increased temperatures, various thermal throttling mechanisms may kick in—notably internal clock frequency reduction—which reduces throughput but may prevent meltdown. Through measurement, one may discover that as the processor temperature goes up (with no other changes, including no changes to the work to be accomplished), the server's throughput goes down.

Conversely, however, if the CPU temperature goes down, so may the power dissipation, regardless of the processing load. This may also be true even for an idling CPU (essentially zero load), so that reducing its temperature reduces its power dissipation below what may have been thought to be the minimum (without actually powering anything down or otherwise further reducing the clock frequency).

This little-known phenomenon has been documented in manufacturer-provided thermal data for various CPUs, but such data may not be generally available. Nonetheless, the phenomenon is known to hold for a large number of CPUs based on SOI (silicon-on-insulator) chip manufacturing technology (SOI has been in widespread use for years, and future technologies may exhibit similar properties). The degree to which the phenomenon occurs may vary with each specific processor model, as may be observed FIG. 48 and in the table of FIG. 49 (excerpted from Table-22 in US20090216910). For competitive reasons, the practice of documenting the thermal properties of a processor in such detail may not continue in the future and may have already been discontinued prior to the reading of this document. Nonetheless, FIG. 48 and FIG. 49 provide actual manufacturer-supplied data for three unnamed but currently or previously popular CPUs (labeled here simply as "A," "B," and "C") intended for use in data center server environments.

Figures 48, 49:
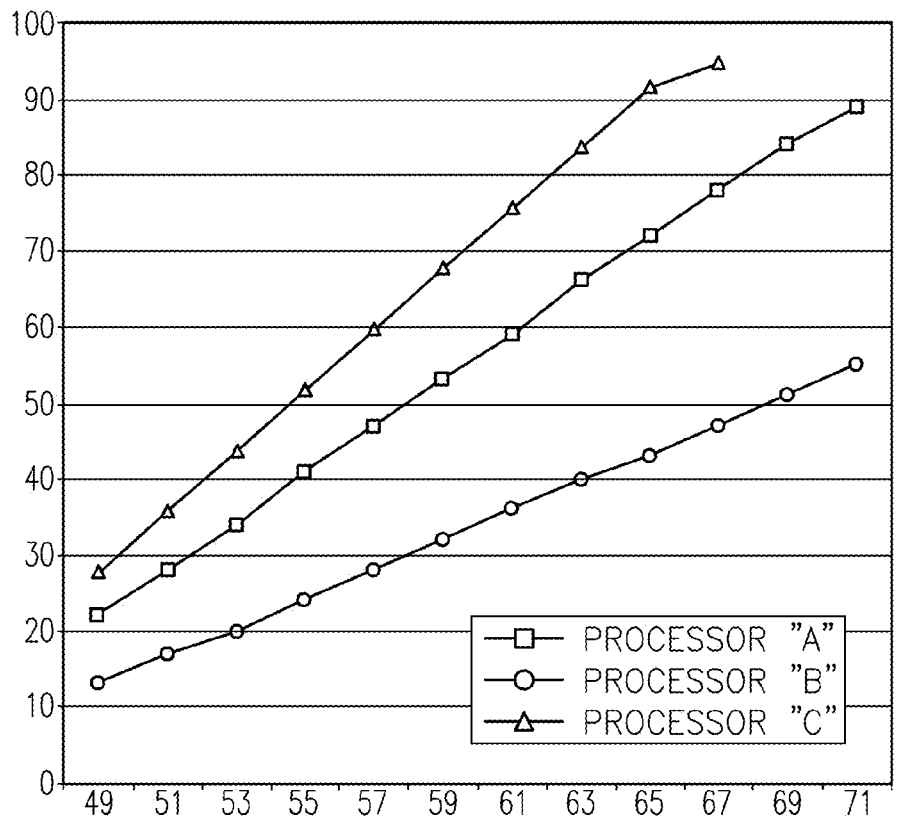
FIG. 48: Electronics Cooling Loads—Power Dissipation Specified as a Function of CPU Temperature ($T_{CASE}$)
FIG. 49: Power Dissipation Specified as a Function of CPU Temperature ($T_{CASE}$)

In FIG. 49, the manufacturer-supplied data covers a typical range of processor temperatures, based on the temperature ($T_{CASE}$) of the "case" (chip packaging) enclosing the CPU, which (in an operational system) is normally attached to a heat sink and/or heat spreader or other cooling apparatus. The data in FIG. 49 reflects a constant clock frequency and processing load for each processor, so that the only independent variable is temperature. For each processor, power dissipation is the dependent variable for a given temperature. Processors generally cannot control the internal ambient temperature, but each processor is free to manage its temperature excursions (and thus its power dissipation) to the extent it can, such as by throttling performance, slowing internal clock frequencies, etc., and in some cases, turning off unneeded cores or other functionality. Regardless of internal ambient temperature, a CPU must keep its power dissipation at or below its thermal design power (TDP). In the examples of FIG. 49, the TDP corresponds to the largest power dissipation value listed for a given processor.

FIG. 48 is a graph of the data in the table of FIG. 49, and clearly reveals the linear nature of the functional relationship between a processor's case temperature (for SOI-based processors at least) and its power dissipation, with the last row of FIG. 49 identifying the approximate slope of the line for each example processor. Whereas current thinking in the state of the practice is that even an idle processor typically consumes 50% to 60% of its maximum power, FIG. 48 and FIG. 49 strongly suggest that such thinking may be significantly flawed, since the power dissipation (including that of an idle processor) is at least partly a direct function of its case temperature, which in this figure is the only independent variable.

A modern processor's power dissipation will rarely exceed its TDP (thermal design power) more than just briefly, because it will take internal measures to prevent self-destruction due to over-heating. In FIG. 49, the highest power given for a particular processor is paired with a $T_{CASE}$ value corresponding to the case temperature at which that processor's TDP occurs under normal conditions.

Thus, for example, the highest power shown for Processor "B" is 95 watts, which corresponds to a case temperature of 67° C., so the CPU may aggressively throttle its operations (i.e., cut its internal frequency and performance, etc.) to limit its power dissipation, in order reduce its case temperature below the allowable maximum of 67° C. for Processor "B," as given in FIG. 49. The key problem is that the temperature profile imposed on the processor (e.g., ambient cooling air) will drive the processor's power dissipation to fairly large extent, regardless of what the processor is actually doing (e.g., even if it is idling). If the externally imposed temperature is not sufficiently cool, then Processor "B" will be unable to cool itself by slowing down a "normal" amount, and the CPU will continue to throttle itself even more, until its case temperature reaches a maximum 67° C., at which point it may be consuming maximum power while producing very few operations per second. In this example, if the ambient environment is anywhere near 67° C., the processor will barely be processing, even with a very high workload.

FPGAs as Reconfigurable Application-Specific Hardware Processors

Other devices beside processors also may be very sensitive to operating temperature. In some very high-performance server environments, FPGAs (field-programmable gate arrays) may be employed as reconfigurable application-specific hardware processors to execute predefined tasks at speeds not possible with general purpose processors. The midrange to high-end FPGAs typically used for such purposes may often be viewed as power-hungry devices that run "hot" (typically upwards of 85° C.).

Figure 50:
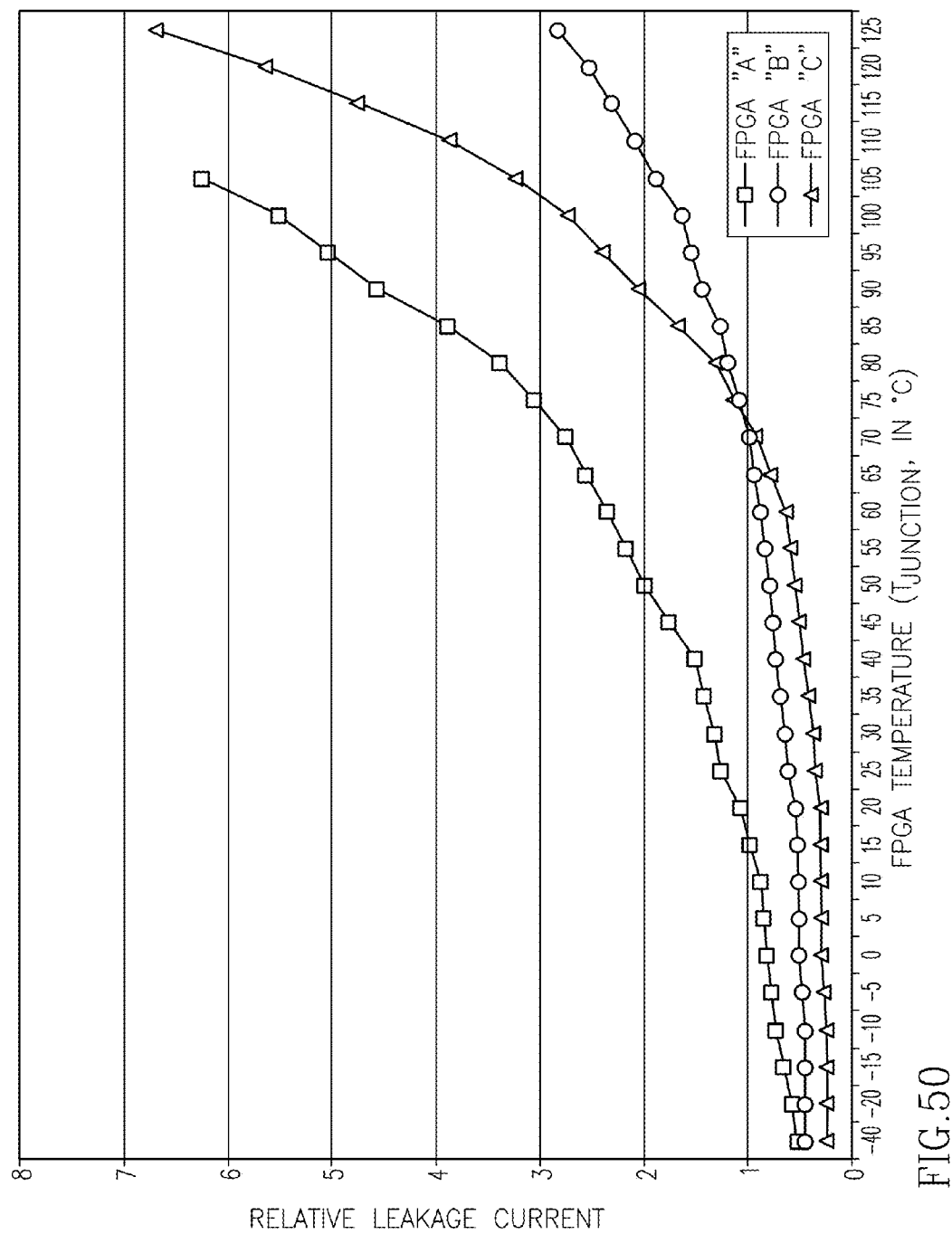
FIG. 50: Electronics Cooling Loads—Relative Leakage Current vs. Temperature ($T_{CASE}$) for Three FPGA Devices

FIG. 50 is a graph of relative static leakage current vs. temperature for three different commercially available FPGA devices ("A," "B," and "C") having similar logic density. Note that a graph of power loss due to leakage current would have the same shape, since power is just current (which is graphed) multiplied by voltage (which is a constant here). In this graph, leakage current is the sum of the source-to-drain leakage and the gate leakage, which are inversely proportional to channel length and gate oxide thickness, respectively. In semiconductor physics, a reduction in transistor length causes an increase in leakage current. In other words, the current "leaks" electrons more easily due to smaller physical distances, so this effect gets worse as the industry progresses toward smaller device geometries.

Multiplying the leakage current by the operating voltage yields the static power loss due to leakage current. Static current leakage causes power ("static power") to be consumed even when the FPGAs are not performing tasks (which may be somewhat equivalent to a CPU idling). Current leakage, and therefore static power loss, may be dramatically influenced by junction temperature ($T_{JUNCTION}$), which is of course closely related to case temperature ($T_{CASE}$), and in many applications they may be assumed to be approximately equal. In particular, the source-to-drain leakage component of the total current leakage increases exponentially with increasing temperature, whereas the gate leakage increases more slowly with increasing temperature.

In FIG. 50 we can see that a relative leakage current of one (unity) occurs at about 15° C. for FPGA "A," and at about 75° C. for FPGAs "B" and "C." However, for cooler temperatures, all three devices may enjoy a relative leakage current substantially less than unity. FPGA "A" and "C" see a minimum relative leakage current of about 0.5 at −40° C. (a difficult-to-achieve temperature), whereas the minimum for FPGA "B" drops to about 0.25 at that temperature and holds steady to about 25° C. A preferred focus here is not the minimum relative leakage current, but rather the very large range of values it may take on. For example, consider that FPGA "A" has a maximum relative leakage current exceeding 6, but compared to a minimum of 0.5, it may changes by a factor of more than 12× over its operating temperature range. FPGA "B" has an even wider range, from 0.25 to almost 7 (6.7), corresponding to a relative leakage current that may change by a factor of more than 26× over its operating temperature range.

While it may be convenient to let these devices run hot in particular environments or situations, it may be very advantageous to run them cooler by using the mechanisms of certain versions of the present invention to recuperate thermal exergy, while keeping the relative leakage current around unity or even substantially below, thereby dissipating far less power in the first place.

It is an object of certain versions of the present invention to provide an infrastructure capable of operating unattended servers and other electronics continuously at higher speeds and much lower temperatures than conventional servers are typically run, so as to increase performance and reliability while reducing power consumption and maintenance costs. It is a further object to reduce the electrical energy required to achieve sufficiently cool environments, so that electrical power savings resulting from operating at reduced temperatures are not frittered away on the cooling apparatus required to achieve such reduced temperatures.

Good News for Well-Cooled Servers: Major Power Savings and Better Reliability with No Performance Loss Although FIG. 49 reveals some very bad news for high-heat server environments that may cause processors to exceed the $T_{CASE}$ temperature corresponding to the TDP, thereby inducing throttling, it also reveals very good news for well-cooled server environments. Whereas our example Processor "B" will dissipate 95 watts at 67° C., according to FIG. 49, if the case temperature can be kept to 49° C. or less it may also deliver the same performance as is available at 95 watts, while dissipating only 28 watts. That's a savings of 70% in CPU power dissipation.

Looking at it another way, by dropping the temperature of Processor "B" by 22° C. (from 71° C. to 49° C.), the power dissipation can be slashed by 67 watts (from 95 watts to 28 watts). This savings may be applied as an operational cost reduction, for example, or to meet a reduced power budget, or used to expand the processing capacity without exceeding a power ceiling. In particular, the 67-watt savings may be enough to power two more processors at the same temperature, and still be 11 watts under the original 95-watt power requirement (95 watts−(28 watts×3)=11 watts). Alternatively, the savings may be sufficient to power one or more additional processors AND their support subsystems (e.g., memory, network communications, local data storage, etc.).

With our example processor temperature ($T_{CASE}$) drop of 22° C., a significant increase in reliability (on the order of 4×) may also be expected on average, for the reduced-temperature processor, given a doubling of expected life for each 10° C. drop. Of course, the useful processor temperature drop is by no means limited to "only" 22° C.

Note that the power savings of 67 watts per processor may not be that significant if the increase in cooling power requirements exceed the processor power savings, which could easily occur with conventional approaches. An object of certain versions of the present invention is to achieve such processor power savings while also achieving further power savings in the systems that keep the processors (and the rest of the processing system) cool.

A further implication of FIG. 48 and FIG. 49 is that overclocking may be safely and reliably used to increase performance up to some threshold as long as the processor is kept sufficiently cool. The overclocking performance threshold is unlikely to be related to temperature or power in a well-cooled environment. Rather, the limits are likely to be related to the underlying capabilities of various components to operate together above specific frequencies, possibly due to non-obvious constraints such as available clock multipliers, transistor switching speeds, signal integrity, and mismatched components or configuration settings. Nonetheless, it has been repeatedly demonstrated that speed-ups of 15% are everyday occurrences with stock cooling systems, and speed-ups of 20% to 30% are relatively common with commercially available premium cooling systems. However, the types of systems achieving these speed-ups tend to be poorly suited to data center use (especially on the higher end of the speed-up range), and are generally not intended for long-term unattended operation.

Under extreme cooling conditions such as may be sponsored by a CPU manufacturer (using liquid nitrogen as a cryogenic coolant, for example), speed-ups on the order of 100% have been demonstrated on "unlocked" processors (i.e., processors without manufactured-in governors intended to severely constrain overclocking efforts). Unlike the systems with less aggressive speed-ups, no integrated processor/cooling system combination with a speed-up on the order of 100% is known to be commercially available or able to sustain continuous unattended operation, even with an unlocked processor.

Advanced Processor Capabilities Utilizing TDP Headroom and Artificial TDP Caps

TDP headroom is the difference (if any) between the power dissipated during "normal" operation (i.e., at normal processor frequency, voltage, etc.) and the thermal design power (TDP) of the processor. TPD headroom can be used in several ways:

- Some advanced multicore processors may utilize the availability of TDP headroom to offer an internal "turbo" capability (essentially a manufacturer-controlled form of "overclocking") whereby the processor may operate at higher frequencies and/or voltages (resulting in faster performance per core), until the TDP headroom is no longer available (as determined by the processor itself).
- Some advanced multicore processors may recognize idle cores (or may be configured with idle cores) that may be powered off or placed in a processor state that dissipates very little power, thereby creating TDP headroom for the remaining cores, which may be placed in a turbo/overclocking mode that may greatly exceed the performance rate that is possible when all cores are operating. This may be particularly valuable for single-threaded tasks that cannot take advantage of multiple cores.
- Some advanced multicore processors may recognize idle cores (or may be configured with idle cores) and other underutilized functionality that may be powered off or placed in a state that dissipates very little power, simply for the purposes of reducing power consumption and saving energy.

In a preferred embodiment, the aforementioned implications of FIG. 48 and FIG. 49 may be applied in order to create substantial thermally-induced TDP headroom that may be utilized by advanced processors as described above. By operating such processors well below the maximum temperature ($T_{CASE}$) associated with their TDP ratings, the processors may achieve the same performance, but with much lower power dissipation, thereby increasing the TDP headroom.

Manufacturer-controlled "turbo" modes or other internal overclocking strategies that are inherently TDP limited may naturally take advantage of the available headroom without the need for external overclocking mechanisms. Again, the overclocking performance threshold is unlikely to be related to temperature or power in a well-cooled environment, such as one employing a preferred embodiment of certain versions of the present invention. Rather, as with traditional overclocking, the limits are likely to be related to the underlying capabilities of various components to operate together above specific frequencies (including the CPU cores themselves), possibly due to non-obvious constraints such as available clock multipliers, transistor switching speeds, signal integrity, and mismatched components or configuration settings.

Another advanced processor capability is the ability to programmatically (i.e., in software) set an artificial power threshold or "cap" (which is a "policy" limit) that the processor respects (using internal algorithms) in a manner that may be very similar to the TDP (which is an actual design limit). The intent of such a capability may be two-fold: 1) to enable greater enterprise control over power consumption, and 2) to enable the setting of power limits without actually capping CPU frequencies. Incorporation of advanced processors with the aforesaid power capping functionality into a system along with a preferred embodiment of certain versions of the present invention may be particularly advantageous due to the latter's ability to thermally induce a performance increase in the former (by creating additional TDP headroom, which may increase "power cap" headroom by the same amount), in terms of performance-per-watt, so that for any arbitrary power cap (which may be measured in watts or equivalent units), the highest possible absolute performance may thereby be achieved.

Processor Overclocking May Reveal Hidden Thermal Problems

"Overclocking" a processor (increasing its operating frequency beyond its normal specification) may be done to increase its throughput and per-core performance, as well as its energy efficiency (e.g., operations per second per watt). However, increasing a processor's clock frequency (thereby attempting to accomplish more operations per second) consequently increases the amount of power it consumes, and thus also increases the power it must dissipate. In general, data centers do not overclock processors because doing so may be fraught with problems, many of which may be directly related to increased heat and the need for additional cooling and power (which may already be acute problems at many data centers).

Overclocking may be very valuable if the thermal and reliability issues are managed properly (and there's an entire industry organized around doing so). Overclocking may also be quite useful as a technique in the area of accelerated life testing, since it may force operation at the extreme limits of the devices under test.

The graph in FIG. 51 depicts processor efficiency and the effect of the processor's case temperature ($T_{CASE}$) during a series of experiments at 100% load with a 50% stress level and various overclocking (OC) profiles. To normalize the results, FIG. 51 depicts processor efficiency as a percentage of maximum observed efficiency for each processor, as a function of $T_{CASE}$. Dashed vertical lines indicate what may be nominal upper temperature ($T_{CASE}$) limits for normal operation of conventional system CPUs (60° C.) and SCRAM™ system CPUs (36° C.), assuming identical CPUs. FIG. 51 demonstrates that these upper limits should generally be avoided for at least a subset of processors, such as processor "A," which does not appear to be well-suited to overclocking. The rightmost side of each graphed line corresponds to the highest temperature where the processor functioned properly and every calculation was verified to be correct; beyond the rightmost end of each processor-specific line, the processor was either unstable (wrong answers) or simply ceased to operate (e.g., internal thermal shutdown).

NOTE: When processors calculated wrong answers, it was simply detected by observing that repeated calculations of mathematical problems having only one correct solution yielded different answers. This phenomenon occurred only at the highest temperatures for a given processor, and accounts for the termination each line graphed in FIG. 51.

Note, however, that FIG. 51 also reveals that neither processor "A" nor processor "B" can be safely operated near the 60° C. line (operation that may be typical with data center servers and conventional air cooling), and this is true even when overclocking is not used (i.e., 0% overclocking). With just 15% overclocking, processor "A" ceases to be reliable before even the 36° C. line is reached, suggesting that there may be little possibility of successful overclocking with data center servers and conventional air cooling, unless specific processor models are carefully selected, perhaps with processors individually qualified and binned, and possibly not even then.

FIG. 51 clearly demonstrates that significant efficiencies and raw performance may be available if the CPUs can be cost-effectively cooled (such as via the cooling apparatus and methods of certain versions of the present invention) to much lower temperatures than may be possible in conventional data centers, such as well to the left of the 36° C. line, regardless of whether overclocking is used Note that the vertical 60° C. line also represents a threshold at which many processors may become unstable, and even if stable, may be expected to be reliable only half as long as processors operating at 50° C. Likewise, a processor operating at 70° C. may be reasonably expected to be reliable only a fourth as long as processors operating at 50° C.

Electronics Cooling Loads—Priority & Non-Priority

Figures 52, 53:
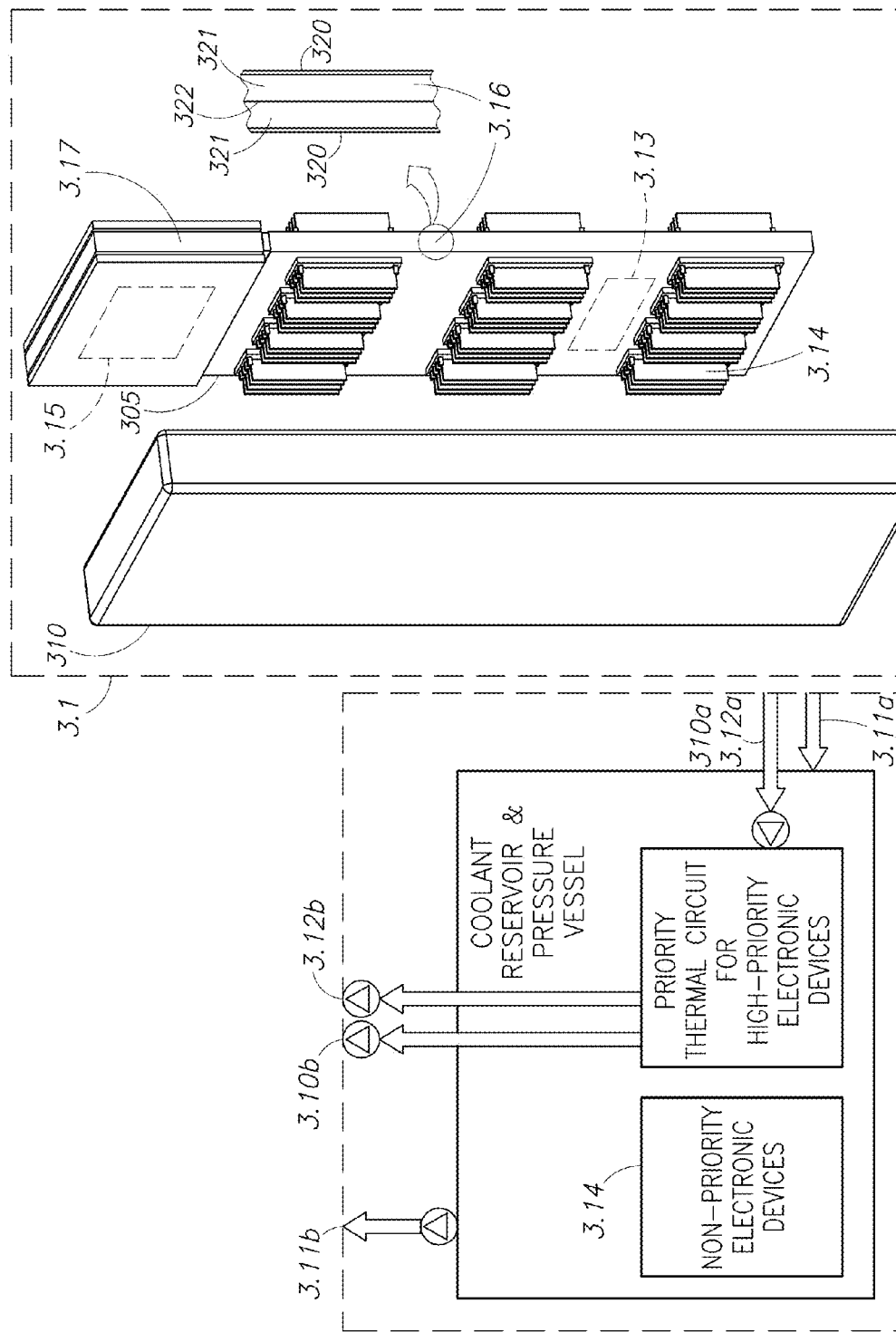
FIG. 52: RUBE™ Electronics Cooling Loads—Priority & Non-Priority
FIG. 53: PRIOR ART—RUBE™ Electronics Cooling Loads Described in US20090216910

In a preferred embodiment, an electronic subsystem [3.1], preferably modular, an example of which is depicted in FIG. 52 and FIG. 53, comprises a closed coolant reservoir [310] whose working fluid (e.g., coolant) [319] supply [3.11a] and return [3.11b] circuits may be connected to STEER supply [2.2a] and return [2.2b] thermal buses of FIG. 42 (with corresponding labels), and one or more RUBE™ Manifold assemblies [305] which may be connected to individual or shared working fluid (e.g., coolant) supply [3.10a] [3.12a] and return [3.10b] [3.12b] circuits that may be distinct from those connected to the enclosing coolant reservoir [310].

In a preferred embodiment, some priority thermal circuits may provide sub-cooled fluid that is of lower temperature than the coolant [319] of the enclosing coolant reservoir [310], while other priority thermal circuits may provide fluid that is the same temperature as the coolant [319] of the enclosing coolant reservoir [310], but more fully saturated, and still other priority thermal circuits may provide fluid that is at a higher temperature and operating pressure than the coolant [319] of the enclosing coolant reservoir [310].

In a preferred embodiment, the priority thermal circuits may operate individually and independently of each other, and at different operating temperatures and pressures.

Generally, the working fluid exiting a priority thermal circuit may exit with more enthalpy (and therefore, more exergy) than when it entered, due to the heat absorbed in its role as a coolant. In one preferred embodiment, however, the working fluid exiting a priority thermal circuit may exit with less enthalpy than when it entered, such as when the working fluid encounters the "cold" side of one or more thermoelectric devices whose function may be to cool the fluid rather than to heat it. In such a configuration, the "hot" side of said thermoelectric devices may not be participating in a priority thermal circuit, and may thus preferably reject heat to the coolant [319] of the enclosing coolant reservoir [310] in the same manner as other non-priority devices.

In a preferred embodiment, the RUBE™ Manifold assemblies may further be partly immersed, or preferably fully immersed in the coolant [319] of the enclosing coolant reservoir [310]. Each RUBE™ Manifold assembly [305] may fully or partly enclose, or attach to, a number of electronic devices, printed circuit boards (PCBs), subsystems, or other thermally relevant components, wherein the interior of a RUBE™ Manifold [305] may provide a priority thermal circuit to any of such devices which it may fully or partly enclose. In such an embodiment, electronic devices [3.14] or other components not participating in the priority thermal circuit(s) which may be provided by a RUBE™ Manifold assembly [305] may instead be directly immersed in coolant [319] by virtue of being otherwise enclosed within coolant reservoir [310], such as on the outside of PCB [320] (facing away from half-manifolds [3.16].

Classes of Electronics Cooling Loads

Three classes of power consumers will be discussed in further detail below:

Temperature-Dependent Power Consumers Class

Temperature-Independent Normal Range Power Consumers Class

Temperature-Independent "Extended Range" Power Consumers Class

An optimally advantageous cooling objective may be to minimize the wall superheat seen at the electronic devices (preferably to a delta-T of 5° C. or less), thus minimizing the devices' junction temperatures by minimizing their case temperatures ($T_{CASE}<T_{JUNCTION}$), with a $T_{JUNCTION}$ target as far below 40° C. as practical for SOI (silicon-on-insulator) devices such as CPUs, and for other electronic devices whose power dissipation is a function of temperature (i.e., with all other factors constant).

Furthermore, it is well understood that both the power efficiency and reliability of many electronic devices may degrade with increased operating temperature, and degradation may often be non-linear. Also, to avoid self-destruction due to high internal temperatures, many electronic devices and multi-device components may dynamically induce cooperative or internal throttling to reduce temperature and prevent further temperature increases. Temperature-induced throttling is typically a hidden source of performance degradation, which may be severe, and may be a common outcome of misguided efforts to reduce energy costs through suboptimal cooling system redesign or adjustments to cooling systems (such as raising chiller set points).

Figure 54:
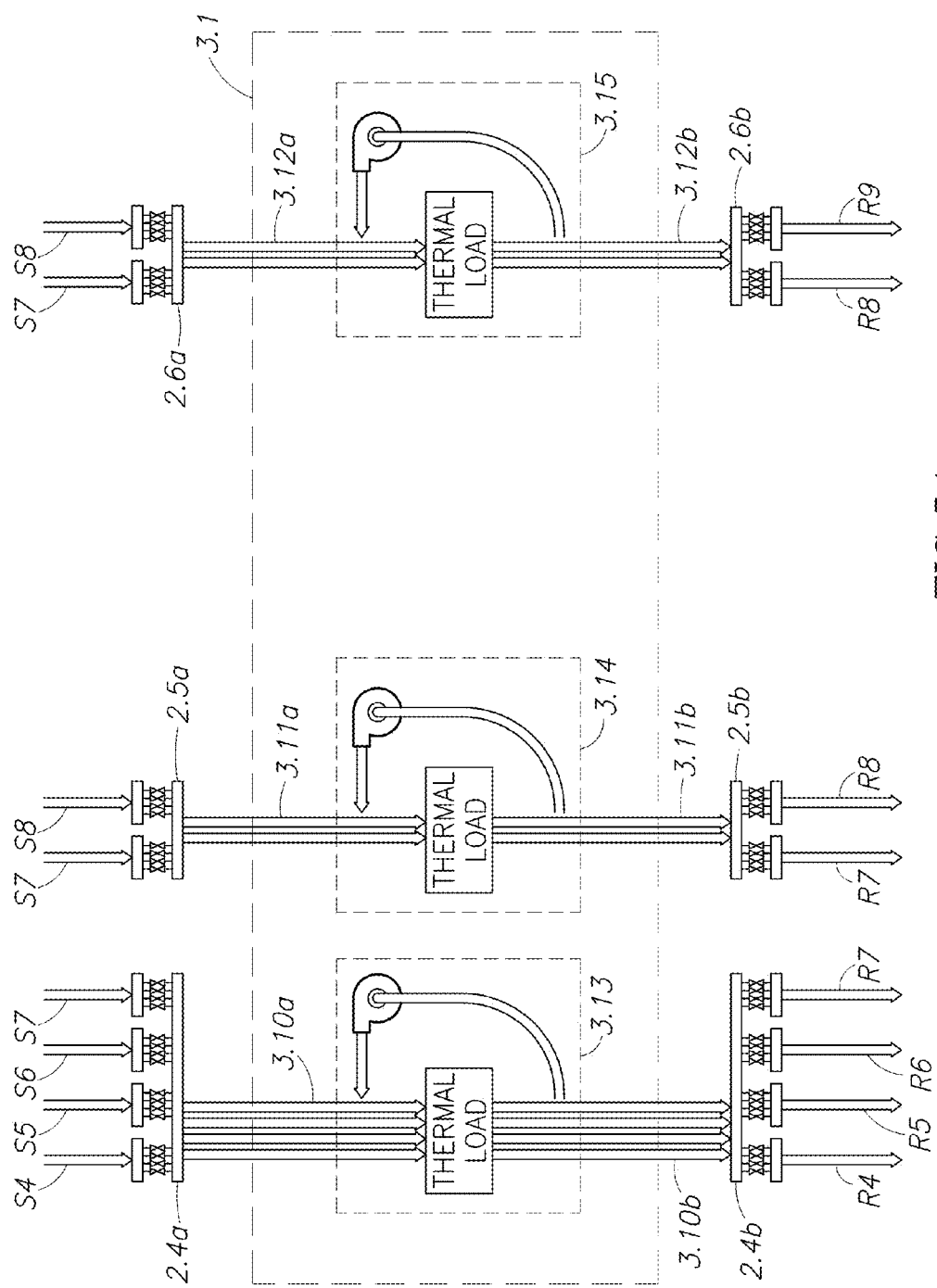
FIG. 54: RUBE™ Electronics Cooling Loads—Thermal Handling for Different Classes of Loads

Referring to FIG. 54, in a preferred embodiment, a FRAME implementation may treat various electronics cooling/thermal loads differently, in general, according to which of three temperature classes they fall into, such that their respective heat exchangers [3.13] [3.14] [3.15] may comprise primarily the electronic devices themselves, via direct immersion in a phase-change fluid such as RUBE™ LT2, whose boiling point at the operating pressure approximates (preferably, within 5° C.) the upper limit of the maximum desired case temperature ($T_{CASE}$) of the electronic devices to be cooled or thermally stabilized thusly.

Note:

The heat exchange surfaces [3.13] [3.14] [3.15] of the thermal load in FIG. 54 may correspond roughly to those of the electronic devices [3.13] [3.14] [3.15] in FIG. 53. Also note that the PCB itself should be considered as a device to be cooled (and possibly an active one, such as if it contains embedded devices within its layers). When a PCB reaches saturation temperature, it may be unable to effectively conduct heat away from the active devices for which it is a substrate. Since the PCB is immersed along with the devices which use it as a substrate, it benefits directly from the same immersion cooling, while also drawing heat away from said devices.

Again referring to FIG. 53 and FIG. 54, PCBs may attach to the outsides or insides of hollow or semi-hollow manifold-halves [3.16] (a.k.a. 321 in FIG. 70 to FIG. 72 of US20090216910) (PRIOR ART). The hidden (not visible) side of such a PCB may comprise devices [3.13] whose surfaces face the manifold-half, while the visible side may comprise devices [3.14] whose surfaces face away from a half-manifold [3.16]. A PCB may both enclose devices [3.13] and entrap working fluid between itself and the outside of a half-manifold [3.16]. When half-manifolds [3.16] are mated as in FIG. 53, any hidden channels formed thereof may comprise the basis for a separate (e.g., high-priority) direct immersion cooling circuit [2.4a][3.10a], [3.13], [3.10b], [2.4b]. This may be in addition to the path [2.5a], [3.11a], [3.14], [3.11b], [2.5b], wherein the exposed outside faces of the PCBs may be isothermally liquid-cooled by direct immersion in a dielectric phase change fluid such as RUBE™ LT2, contained in an outer reservoir enclosing the electronics loads [3.1]. In an alternate embodiment, openings in the PCBs may enable a short-circuit path [3.10a], [3.13], [3.14], [3.11b], thereby bypassing splitter valve [2.4b] and mixer valve [2.5a]. In this case, after cooling the devices [3.13], the working fluid may escape through openings in the PCB so that it may mix with the fluid that cools the outsides of the PCBs and devices [3.14] thereon, with egress via [3.11b] and splitter valve [2.5b].

In a preferred embodiment, PCBs and electronic devices to be cooled or thermally stabilized may be coated with a very thin layer of RUBE™ Diamond Top-Coating (a dielectric thermally conductive coating comprising, for example, fine diamond powder in a base epoxy, paint, or other bonding agent, as described further in a later section), which may minimize thermal resistance and promote nucleate boiling of the working fluid with minimal device wall superheat (preferably, within 3° C., such that $T_{CASE}<=T_{BoilingPoint}+3°$ C.). The RUBE™ Diamond Top-Coating may significantly enhance the transfer of heat to the working fluid, from both the electronic devices (i.e., from their cases and leads), and from also from the PCB itself. Typically, 20% to 80% of the heat from a PCB-mounted device may be conducted directly to the PCB, which may become thermally saturated, so in a preferred embodiment, the PCB may be cooled in the same way as temperature-independent normal range power consumers (described below).

In a preferred embodiment, the aforementioned three temperature classes may be described in more detail as follows, with examples provided in the next section:

Temperature-dependent power consumers (those which inherently consume noticeably less power at lower temperatures, for a given performance level (i.e., without changing other operating parameters, such as clock rates). Preferably, this class may be cooled with a "priority" cooling circuit like (or similar to) that depicted above by the coolant supply-return path [2.2a] [2.4a] [3.10a] [3.13] [3.10b] [2.4b] [2.2b]. In a preferred embodiment, the operating pressure of the priority cooling circuit may be the same as or lower than that of other ("normal") cooling circuits, such that the boiling point of the coolant in the priority cooling circuit may be lower than the boiling point of the coolant in the normal cooling circuits (assuming the same working fluid, such that $T_{ReducedPressureBoilingPoint} <= T_{NormalBoilingPoint}$). In a preferred embodiment, the temperature of the priority cooling circuit's coolant may be well below both the normal boiling point of the fluid and the reduced-pressure boiling point (i.e., $T_{SubcooledFluid} <= T_{ReducedPressureBoilingPoint} <= T_{NormalBoilingPoint}$), such that $T_{CASE} <= T_{SubcooledFluid} + 3°$ C.).

Temperature-independent normal range power consumers (those that should operate at or below the normal temperature limits for commercial or industrial electronics, e.g., 70° C., 85° C.). Preferably, this class may be cooled with a cooling circuit like (or similar to) that depicted above by the coolant supply-return path [2.2a] [2.5a] [3.11a] [3.14] [3.11b] [2.5b] [2.2b], corresponding to direct immersion "bath" in a working fluid reservoir such that $T_{CASE} <= T_{NormalBoilingPoint} + 3°$ C.

Temperature-independent extended range power consumers (those that may safely operate at or above the normal temperature limits for industrial electronics, e.g., 85° C. to 125° C.). Preferably, this class may be cooled with an "extended temperature" cooling circuit like (or similar to) that depicted above by the coolant supply-return path [2.2a] [2.6a][3.12a] [3.15] [3.12b] [2.6b] [2.2b]. In a preferred embodiment, the operating pressure of the extended temperature cooling circuit may be the same as or higher than that of other ("normal") cooling circuits, such that the boiling point of the coolant in the extended temperature cooling circuit may be higher than the boiling point of the coolant in the normal cooling circuits (assuming the same working fluid, such that $T_{IncreasedPressureBoilingPoint} >= T_{NormalBoilingPoint}$). In a preferred embodiment, for example with a wall superheat $T_{Superheat} <= 3°$ C., the temperature of the extended temperature circuit's coolant may be well above the normal boiling point of the fluid, although due to the laws of thermodynamics it cannot exceed the increased-pressure boiling point (i.e., $T_{NormalBoilingPoint} <= T_{ExtendedTemperatureFluid} <= T_{IncreasePressureBoilingPoint}$), such that $T_{CASE} <= T_{IncreasedPressureBoilingPoint} + 3°$ C.).

Electronics Cooling Loads—Example (SCRAM v3 CHARM Modules)

The example in FIG. 54 depicts a STEER Thermal Bus with a supply [2a] and return [2b] having somewhat overlapping temperature ranges and possibly diverse working fluids. An example arbitrary system [3.1] comprising electronics-based thermal loads interfaces with one of the working fluids, over a subset of the depicted temperature ranges (see FIG. 14 for example labeled temperature ranges and fluids). In the example of FIG. 54, arbitrary system [3.1] needs the working fluid to be supplied at up to three different logical ingress ports [3.10a] [3.11a] [3.12a], each of which may require a specific combination of inlet temperature, pressure, and volumetric-flow or mass-flow rate, and each of which has a corresponding logical egress port, e.g., [3.10b] [3.11b] [3.12b], also with an associated outlet temperature, pressure, and volumetric flow or mass-flow rate.

In a preferred embodiment, all electronic devices to be cooled or thermally stabilized, regardless of "class" (described further below) may be coated with a very thin layer of RUBE™ Diamond Top-Coating (a dielectric thermally conductive coating comprising fine diamond powder in a bonding agent) to minimize thermal resistance and promote nucleate boiling of the working fluid with minimal device wall superheat (preferably, within 3° C. such that $T_{CASE} <= T_{BoilingPoint} + 3°$ C.).

Temperature-Dependent Power Consumers Class

In the example depicted in FIG. 54, the electronics loads [3.13] exposed to working fluid within the pair of half-manifolds [3.16] correspond to temperature-dependent power consumers that inherently consume noticeably less power at lower temperatures, for a given performance level (i.e., without changing other operating parameters, such as clock rates). By segregating the working fluid to which this class of electronics is exposed, the working fluid in the priority cooling circuit may be maintained under computer control at a lower temperature than the ambient working fluid temperature [3.14] (e.g., outside the pair of half-manifolds [3.16]), thereby reducing the power dissipated by the temperature-dependent power consumers [3.13] therein (i.e., within the pair of half-manifolds [3.16]). In a preferred embodiment, the operating pressure of the priority cooling circuit may be the same as or lower than that of the ambient working fluid [3.14], such that the boiling point of the coolant in the priority cooling circuit may be lower than the boiling point of the coolant in the non-priority cooling circuits (assuming the same working fluid, such that $T_{ReducedPressureBoilingPoint} <= T_{NormalBoilingPoint}$). In a preferred embodiment, the temperature of the priority cooling circuit's coolant may be subcooled to well below both the normal boiling point of the fluid and also the reduced-pressure boiling point (i.e., $T_{SubcooledFluid} <= T_{ReducedPressureBoilingPoint} <= T_{NormalBoilingPoint}$), such that $T_{CASE} <= T_{SubcooledFluid} + 3°$ C.). An optimally advantageous cooling objective is to minimize the wall superheat seen at these electronic devices (preferably to a delta-T of 5° C. or less), thus minimizing the devices' junction temperatures by minimizing their case temperatures ($T_{CASE} < T_{JUNCTION}$), with a $T_{JUNCTION}$ target as far below 40° C. as is practical or cost-effective for SOI (silicon-on-insulator) devices such as CPUs, and for other electronic devices whose power dissipation is a function of temperature (i.e., with all other factors constant).

In this example, the first inlet port [3.10a] is connected to the outlet of a 4-port digital mixer valve [2.4a], each of whose upstream inlet ports connects to one of the four lowest temperature supply channels of the six available RUBE™ LT2 supply channels [2.2a]. Thus, the first inlet port [3.10a] of arbitrary subsystem [3.1] may be supplied with working fluid from any one of the four available channels depicted, or any mix of working fluid from any combination of channels, with a dynamically specified percentage from each channel.

For example, if the temperatures currently available in the four channels are −60° C., 10° C., 15° C., and 38° C., FRAME may direct the STEER apparatus [2], via digital mixer valve [2.4a], to deliver working fluid to inlet port [3.10a] in the following flow percentages: 25% at −60° C., 50% at 10° C., 25% at 15° C., and 0% at 38° C. In this example, there is a "priority" cooling circuit depicted above as the coolant supply-return path [2.2a] [2.4a] [3.10a] [3.13] [3.10b] [2.4b] [2.2b], such that under computer control, flow from the from ingress port [3.10a] passes to devices [3.13] through the pair of half-manifolds [3.16] via a typically turbulent internal path (not shown) in order to cool the electronics [3.13] exposed to the fluid therein, then subsequently exits via egress port [3.10b] and passes through splitter valve [2.4b], which then dynamically distributes a percentage of the egress flow to each of the four return channels to which it connects (i.e., to the four lowest temperature return channels of the six RUBE™ LT2 return channels [2.2b] available). As depicted, the four return channels connected at splitter valve [2.4b] are in the same four temperature ranges as the supply channels connected at ingress [2.4a].

Temperature-Independent Normal Range Power Consumers Class

Even for electronic devices whose power consumption is not significantly a function of temperature, it may be well understood that both the power efficiency and reliability of many such devices may degrade with increased operating temperature, possibly with non-linear degradation and temperature-induced throttling.

In a preferred embodiment, FRAME may treat electronics cooling loads, in general, as being members of the temperature-independent normal range power consumers class, such that their respective heat exchangers [3.14] comprising primarily the electronic devices themselves, via direct immersion in a phase-change fluid such as RUBE™ LT2, whose boiling point at the operating pressure may approximate (preferably, within 5° C.) the upper limit of the maximum desired case temperature ($T_{CASE}$) of the electronic devices to be cooled or thermally stabilized thusly. In essence, this class of devices [3.14] may be simply immersed in a bath of working fluid (rather than actively directing the fluid through particular channels or paths, although such active direction may be optional) at the desired temperature, preferably a closed bath comprising an pressure vessel (preferably insulated) to contain the phase-change working fluids and the immersed electronics, and preferably with a means for circulating or turbulating the working fluid within the bath, along with a means for rejecting heat recuperated by the working fluid.

In this example, the inlet port [3.11a] may be connected to the outlet of a 2-port digital mixer valve [2.5a], each of whose upstream inlet ports may connect to one of the two medium-temperature supply channels of the six RUBE™ LT2 supply channels [2.2a] available, such that the boiling point of the selected working fluid (e.g., RUBE™ LT2) may lie within the temperature range spanned by the channels. Thus, the inlet port [3.11a] that provides working fluid to the electronics loads [3.14] may be supplied with working fluid from either of the two available channels depicted, or any mix of working fluid from any combination of the two channels, with a dynamically specified percentage from each channel.

For example, if the temperatures currently available in the two channels are 20° C. and 34° C., FRAME may direct the STEER apparatus [2], via digital mixer valve [2.5], to deliver working fluid to inlet port [3.11a] in the following flow percentages: 0% at 20° C. and 100% at 34° C. In this example, there is a cooling circuit depicted above as the coolant supply-return path [2.2a] [2.5a] [3.11a] [3.14] [3.11b] [2.5b] [2.2b], such that under computer control, working fluid from the from ingress port [3.11a] may flow around the exposed electronic devices [3.14] outside the pairs of half-manifolds [3.16] via arbitrary paths that typically may be turbulent due to vapor bubbles formed by nucleate boiling, thereby cooling the electronics exposed to said fluid, with subsequent exit occurring via egress port [3.11b] and splitter valve [2.5b], which may then dynamically distribute a percentage of the egress flow to each of the two return channels to which it connects (e.g., to the two medium-temperature return channels of the six RUBE™ LT2 return channels [2b] available). As depicted, the two return channels connected at splitter valve [2.5b] may be in the same two temperature ranges as the supply channels [2.2a] connected at ingress [2.5a].

In a preferred embodiment, the electronic devices may be cooled via isothermal heat exchange with the working fluid, such that a high degree of nucleate boiling may occur, and such that, due to the intentional synergy resulting from combination of an engineered working fluid (e.g., RUBE™ LT2) and a boiling enhancement coating (e.g., RUBE™ Diamond Top-Coating) on the electronics surfaces, many fine-grained vapor bubbles may evolve simultaneously from the multitudinous nucleation points, rather than fewer and much larger vapor bubbles and slugs as would normally occur with more viscous fluids and surfaces not specifically optimized to symbiotically enhance boiling incipience (assuming an equally low boiling point, because otherwise such fluids may not boil at all).

In a preferred embodiment, the electronics and circuit boards may also be packaged and oriented to take advantage of the inherent upward motion of said vapor bubbles, such that the movement of the bubbles may contribute beneficially to turbulent, non-laminar flow of working fluid across the diverse device surfaces.

In a preferred embodiment, the increased vapor pressure associated with the formation of said bubbles may significantly increase the internal operating pressure of the containing pressure vessel (not shown, but not unlike a boiler or tea kettle), such that the pressure may completely provide (or at least contribute to) the motive force needed to reject a portion of the working fluid and its recuperated heat from the containing vessel (not shown) through digital splitter valve [2.5b]. Because the heat exchange may be isothermal, there may be no vertical temperature gradient in the working fluid (the liquid temperature is the same at the bottom as it is at the top), thereby alleviating thermally induced mechanical stresses that may otherwise be imposed upon the devices and packaging.

Temperature-Independent "Extended Range" Power Consumers Class

In this example, the electronics loads [3.1], and specifically devices [3.15] exposed to working fluid within the pair of half-manifolds [3.17], correspond to extended temperature range components or subsystems that may safely operate at or above the normal temperature limits for industrial electronics (e.g., 85° C. to 125° C.). Preferably, this class may be cooled with an "extended temperature" cooling circuit like (or similar to) that depicted above by the coolant supply-return path [2.2a] [2.6a] [3.12a] [3.15] [3.12b] [2.6b] [2.2b].

In a preferred embodiment, the operating pressure of the extended temperature cooling circuit may be the same as or higher than that of other ("normal") cooling circuits, such that the boiling point of the coolant in the extended temperature cooling circuit may be higher than the boiling point of the coolant in the normal cooling circuits (assuming the same working fluid, such that $T_{IncreasedBoilingPoint} >= T_{NormalBoilingPoint}$). In a preferred embodiment, the temperature of the extended temperature circuit's coolant may be well above the normal boiling point of the fluid, although it cannot (due to the laws of thermodynamics) exceed the increased-pressure boiling point (i.e., $T_{NormalBoilingPoint} <= T_{ExtendedTemperatureFluid} <= T_{IncreasedPressureBoilingPoint}$), such that $T_{CASE} <= T_{IncreasedPressureBoilingPoint} + 3°$ C.). By segregating the working fluid to which this class of electronics is exposed, the working fluid in the extended temperature circuit may be maintained under computer control at a higher temperature than the ambient working fluid temperature [3.14] (e.g., outside the pair of half-manifolds [3.17]), thereby using the temperature-independent extended range power consumers therein (i.e., within the pair of half-manifolds [3.17]) to inject additional heat energy into the working fluid therein, an object of which may include enhancing the preheating performance of the electronics loads [3.1] in order to improve the efficiency of thermal exergy recuperation and subsequent downstream power generation, which may further enhance overall system efficiency.

In this example, the inlet port [3.12a] is connected to the outlet of a 2-port digital mixer valve [2.6a], each of whose upstream inlet ports may connect to one of the two lowest temperature supply channels of the six RUBE™ LT2 supply channels [2.2a] available. Thus, the inlet port [3.12a] that provides working fluid to the electronics loads [3.15] via manifolds [3.17] may be supplied with working fluid from either of the two available channels depicted, or any mix of working fluid from any combination of the two channels, with a dynamically specified percentage from each channel.

For example, if the temperatures currently available in the two channels are about 20° C. and 34° C., FRAME may direct the STEER apparatus, via digital mixer valve [2.6a], to deliver working fluid to inlet port [3.12a] in the following flow percentages: 0% at 20° C. and 100% at 34° C. In this example, there may be a cooling circuit depicted above as the coolant supply-return path [2.2a] [2.6a] [3.12a] [3.15] [3.12b] [2.6b] [2.2b], such that under computer control, working fluid from ingress port [3.12a] may pass to devices [3.15] through the pair of half-manifolds [3.17] via a typically turbulent internal path (not shown) in order to cool the electronics [3.15] exposed to the fluid therein, with further increased turbulence likely due to vapor bubbles that may be formed by nucleate boiling, thereby enhancing the cooling of the electronics exposed to said fluid, with subsequent exit occurring via egress port [3.12b] and splitter valve [2.6b], which may then dynamically distribute a percentage of the egress flow to each of the two return channels to which it may connect (e.g., to the two upper-temperature return channels of the six RUBE™ LT2 return channels [2.2b] available).

As depicted in FIG. 54, only one of the two return channels connected at splitter valve [2.6b] may overlap with the two temperature ranges of the supply channels [2.2a] connected at ingress [2.6a]. The non-overlapping return channel exiting splitter valve [2.6b] may span a higher temperature range and thus may effectively constitute a mostly vapor or vapor-only channel.

3.3 RUBE™ Vapor-Liquid Separator-Reservoir

Figure 55:
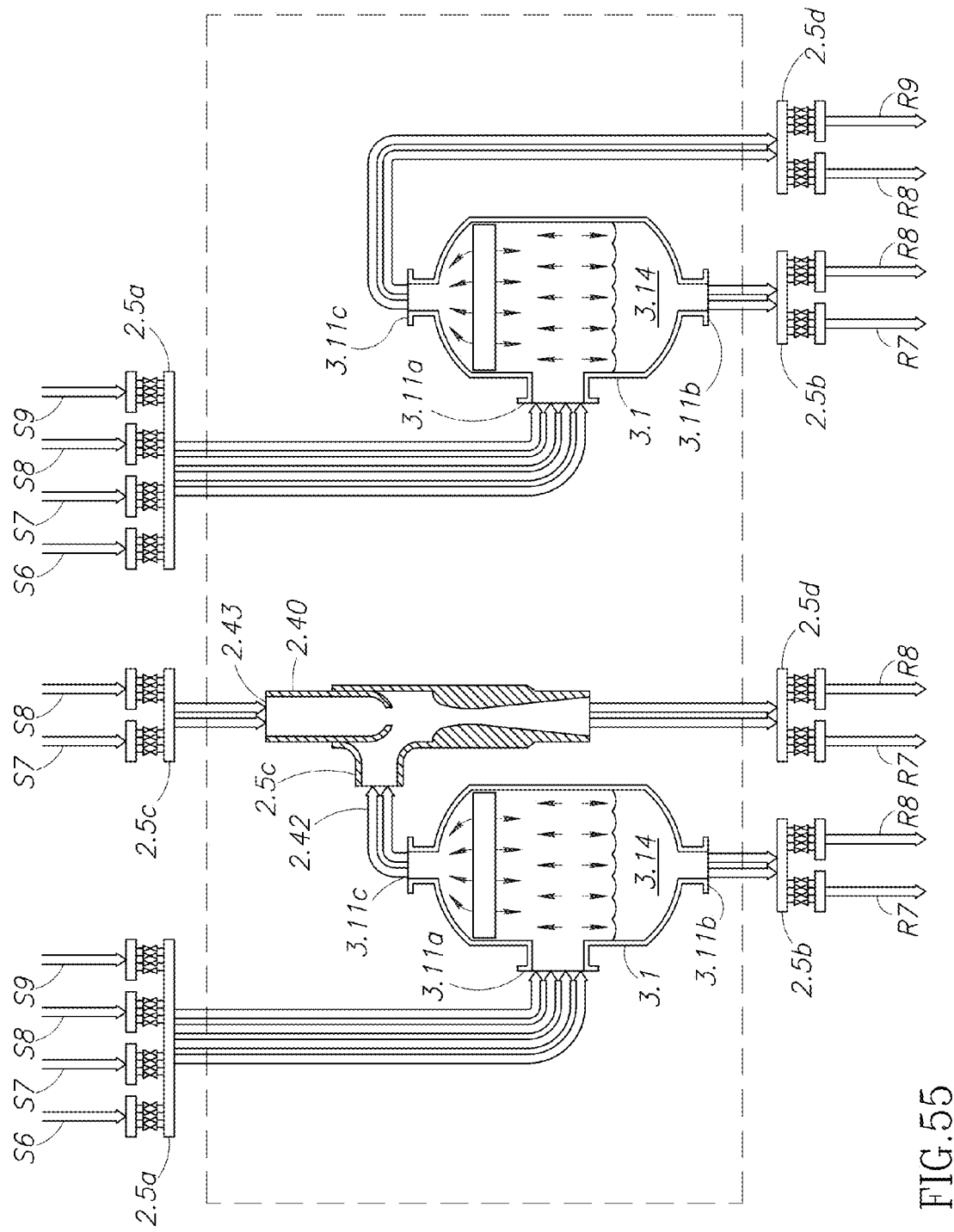
FIG. 55: RUBE™ Vapor-Liquid Separator-Reservoir with Medium-Temperature Electronics Cooling Loads FIG. 56—Example Closed Bath Immersion—Vapor-Liquid Separator-Reservoir with Electronics Modules

Although a vapor-liquid separator (which may also serve as a reservoir) has a well-defined function in the art (i.e., to separate vapor from liquid), in a preferred embodiment it may be used to implement a "closed bath immersion" system for cooling electronics loads by recuperating exergy in the form of low-grade heat energy. Using the previous example in FIG. 54 and also FIG. 55 as a starting point, FIG. 56 more clearly depicts the virtual plumbing circuit of an example of electronics cooling loads as contained in a pressure vessel [3.1] and connected to a STEER Thermal Bus with a supply [2.2a] and return [2.2b], interfacing with one of the two depicted working fluids, over a subset of the depicted temperature ranges. Two configurations are depicted in FIG. 55, one with a thermal eductor [2.40] (at left in the figure) and one without a thermal eductor (at right in the figure). In either configuration, the depicted pressure vessel may experience a partial vacuum (i.e., suction) at [3.11c], since the downstream destination is the STEER Thermal Bus return [2.2b]. Also, the depicted pressure vessel may be of relatively arbitrary shape, and need not resemble the standard symbols depicted in this example.

Medium Temperature Closed Bath Immersion with Phase-Change Fluid

In the earlier example of FIG. 54, the electronics-based thermal loads of an arbitrary system [3.1] may need the working fluid to be supplied at up to three different logical ingress ports [3.10a] [3.11a] [3.12a], each of which may require a specific combination of inlet temperature, pressure, and volumetric-flow or mass-flow rate, and each of which has a corresponding logical egress port, i.e., [3.10b] [3.11b] [3.12b], also with an associated outlet temperature, pressure, and volumetric flow or mass-flow rate. One of the three logical ingress ports of FIG. 54, namely [3.11a], and its corresponding logical egress port, namely [3.11b], are incorporated into the examples of FIG. 55 and FIG. 56, wherein the depiction may represent a medium-temperature cooling circuit involving a potentially two-phase working fluid (i.e., a phase-change working fluid which may be present in a liquid-only phase, vapor-only phase, or some combination, and wherein the phase make-up may vary according to the working fluid operating pressures and temperatures).

Figure 56:
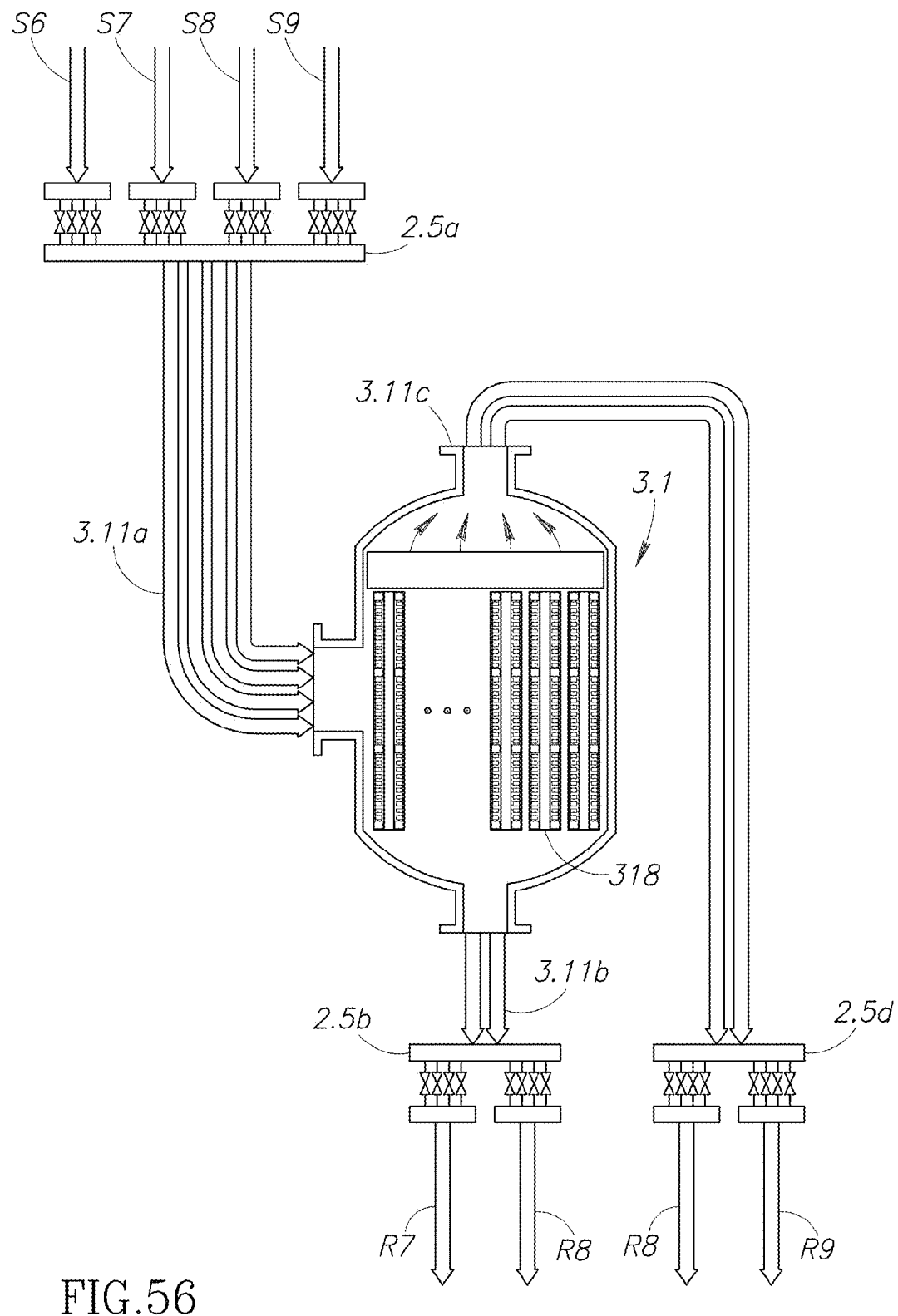

In a preferred embodiment, the pressure vessel [3.1], such as the example depicted in FIG. 55, may enclose or contain heat-dissipating modules [318] which may further comprise electronic devices [3.14], such that all or part of said devices may be in intimate thermal communication with the working fluid (for example, in conjunction with closed bath immersion), as depicted in FIG. 56. The pressure vessel [3.1] may be optimally advantageous to the implementation of closed bath immersion as contemplated here, in order to prevent any unwanted escape of working fluid vapor while taking advantage of the exergy in the phase-change fluid, such as to help provide motive force. In a preferred embodiment, as depicted in FIG. 55 (at left), the pressure vessel [3.1] may also serve as a vapor-liquid separator/reservoir [3.1] that may accept ingress flows from digital mixer valve [2.5a] as described in the earlier example of FIG. 54. Egress flows from vapor-liquid separator/reservoir [3.1] may be divided between digital splitter valve [2.5b] (as described in the example of FIG. 54) and an alternate vapor-only egress path (not shown in FIG. 54).

In a preferred embodiment, vapor may be beneficially removed via a vapor outlet [3.11c] (which may function as an additional outlet to augment the logical egress port [3.11b], and which may thereby further reduce the internal pressure of the pressure vessel) by directly or indirectly connecting it to the suction port [2.42] of an optionally co-located thermal eductor [2.40], which may be essentially a thermal pump (previously described) that may entrain the vapor in a stream of motive liquid prior to returning it to the STEER Thermal Bus [2b] through its outlet port [2.45] and digital splitter valve [2.5d].

Depending on the relative temperatures and pressures of the fluids at the motive port [2.43] and suction port [2.42] of thermal eductor [2.40], any entrained vapor may condense partially or fully when mixed with the motive fluid (e.g., the same type of working fluid, but at a relatively lower temperature and/or higher pressure, such that the mixed fluids shift to a lower aggregate pressure) within the eductor, which may thereby increase the suction at the suction port [2.42], thereby inducing the egress of vapor from the pressure vessel of vapor-liquid reservoir [3.1] via vapor outlet [3.11c]. The fluid at the eductor's outlet port [2.45] may be two-phase fluid if the entrained vapor only partially condenses, or liquid if it fully condenses. Note that the configuration and operation of a thermal eductor [2.40] is described in an earlier section.

In another preferred embodiment, vapor may be removed from the depicted pressure vessel [3.1] (see FIG. 55, at right) via vapor outlet [3.11c] by directly returning it to the STEER Thermal Bus through digital splitter valve [2.5d]. Note that, in this case, the STEER Thermal Bus may use downstream thermal eductors or other means (not shown) to motivate and direct the working fluid from digital splitter valve [2.5d] toward a downstream destination.

Figure 58:
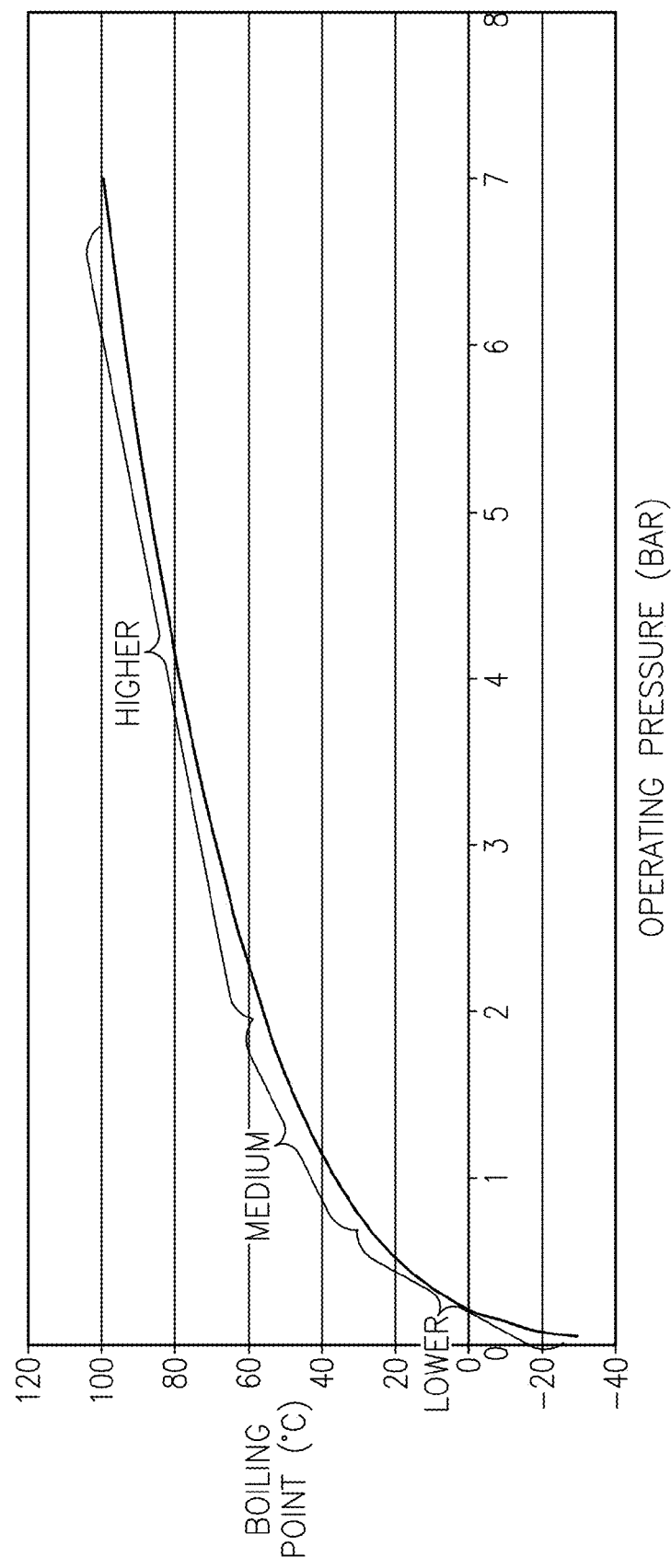
FIG. 58: RUBE™ LT2 Fluid Candidate $C_3F_7OCH_3$—Operating Pressure vs. Boiling Point
Figure 59:
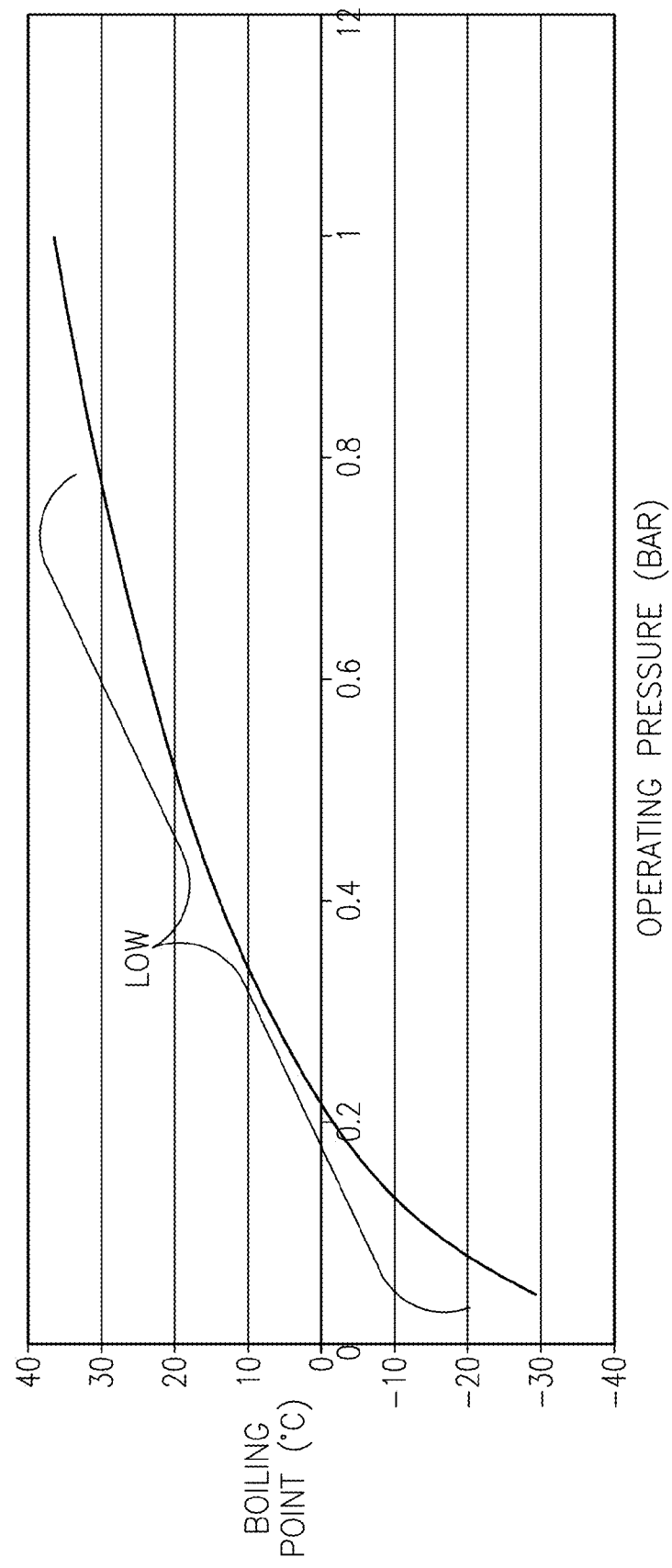
FIG. 59: RUBE™ LT2 Fluid Candidate $C_3F_7OCH_3$—Low-End Operating Pressure vs. Boiling Point

FIG. 58 provides the boiling point temperatures for a preferred RUBE™ LT2 fluid at various operating pressures up to 7 bar (see FIG. 57 for the corresponding data, as graphed in FIG. 58 and FIG. 59). The medium temperatures addressed in the examples of this section may correspond to a pressure range, for example, from about 0.8 bar (600 Torr) to about 2 bar (1500 Torr), with associated boiling point temperatures of about 30.5° C. to about 56.3° C., respectively. In a preferred embodiment, the actual temperature range selected for the medium temperature range may be optimally selected according to specific criteria, such as to encompass the operational characteristics of a class of electronic devices (e.g., the temperature-Independent normal range power consumers class of the previous section, as described in the text accompanying FIG. 54).

From FIG. 57 and FIG. 58, we can see that as the operating pressure increases in the "medium" range from 0.8 bar to 2 bar, the boiling point of the RUBE™ LT2 working fluid also increases from 30.5° C. to 56.3° C. This range corresponds to a satisfactory, if not ideal, temperature range for most electronic devices, and especially for processors and memory devices often found in computing systems. Note that this temperature range corresponds to a range of boiling points. Once a boiling point is selected, it may become an essentially static operating temperature that enables the medium temperature electronics to operate isothermally (i.e., all indexed to the same temperature, namely, the boiling point of the working fluid). When the working fluid is at its boiling point, there are essentially no thermal gradients in the fluid, even if some of the immersed devices are hotter than others (because their additional heat energy is absorbed by the phase-change (from liquid to vapor) of the working fluid, which liquid must remain at a constant temperature (for a given pressure). Over time, the operating pressure and boiling point temperature may vary dynamically under system control, as a means of reconfiguring the operational parameters of the system.

The discussion, operating characteristics, and principles of medium temperature operation as described in this subsection also apply to the low-temperature and high-temperature operation of the next two subsections, and their respective circuits, and thus may serve as a conceptual jumping-off point.

Lower Temperature Closed Bath Immersion with Phase-Change Fluid

From the table of FIG. 57 and graph in FIG. 58 (and also FIG. 59, which provides additional detail for pressures below 1 bar), we can see that as the operating pressure increases in the "medium" range from 0.1 bar to 0.8 bar, the boiling point of the RUBE™ LT2 working fluid also increases from −15.4° C. to 30.5° C. This range corresponds to a satisfactory, but possibly not ideal, temperature range for temperature-sensitive CPUs or processors based on SOI (silicon-on-insulator) technology, as described in the previous section.

Recalling the discussion of the previous section, a reduction in the temperature of an SOI-technology CPU or other device may directly drive a reduction in the power required by the device at a given operating frequency and processing load. Thus, it may be very beneficial to operate such devices at reduced temperatures, especially if temperature reductions can be achieved with little or no net increase in operational expense (e.g., increase power requirements attributed to increased cooling levels and lower temperatures). Alternately, the ability to isothermally control the temperature ($T_{CASE}$) of a CPU or other device may enable a higher operating frequency and processing load for the available power.

Simply decreasing the temperature of the working fluid (say, by simply chilling it) can lower the temperature of the devices being cooled, such as CPUs, but may not do so uniformly, or stably, or cost effectively. The problem is that lowering the temperature of liquid-phase working fluid by chilling alone may have little effect on system operating pressure or boiling point. Thus, the heat absorbed by the working fluid as electronic devices (for example) are cooled or thermally stabilized, may be sensible heat that may cause the temperature of the working fluid to increase as heat is absorbed. Different devices may encounter working fluid of different temperatures (i.e., heat exchange is not isothermal), and relatively hot devices may cause relatively larger temperature changes to the working fluid. Thus, subsystems comprising circuit boards further comprising various power-dissipating devices may all be exposed to thermal gradients, meaning that a system may experience not only thermal gradients, but also thermally induced mechanical stresses, even at the chip level (i.e., different locations on a single device may also experience such thermal gradients, and any induced stresses).

In a preferred embodiment, the cooling-without-inducing-a-thermal-gradient problem may be solved by controlling the boiling point of the working fluid so that it matches the desired operating temperature of the devices to be cooled. Thus, if the operating temperature needs to be lowered significantly, then the boiling point may need to be lowered also, in order to maintain isothermal heat exchange. This also has the intentional effect of greatly increasing the heat exchange capacity, since latent heat exchange at the boiling point may transfer an order of magnitude more energy per degree than is possible with sensible heat exchange well below the boiling point. The boiling point of the selected fluid as specified at atmospheric pressure is the starting point, and said boiling point may then be increased or decreased to the target boiling point ($T_{BoilingPoint}$) by increasing or decreasing, respectively, the operating pressure, which may be the pressure ($P_{BoilingPoint}$) at the target boiling point. In general, a device's temperature excursions ($T_{SUPERHEAT}$) above the boiling point of the working fluid should be minimized, assuming the boiling point is below the maximum target device temperature ($T_{CASE}$). In a preferred embodiment, the target boiling point may be a temperature just below the target device operating temperature ($T_{CASE}$), such that the temperature difference is at least equal to the wall superheat ($T_{SUPERHEAT}$) of the device being cooled (i.e., $T_{BoilingPoint} \leq T_{CASE} - T_{SUPERHEAT}$). At a suitable operating pressure and boiling point, the working fluid may then isothermally cool the devices immersed therein.

In a preferred embodiment, reducing the operating temperature of a subsystem like that in FIG. 55 and FIG. 56 may be straightforwardly accomplished via a reduced operating pressure and boiling point, effected by a combination of measures such as the following:

Increasing the suction force (or decreasing the backpressure) at outlet [3.11b] of vapor-liquid separator-reservoir 3.1.

Increasing the suction force (or decreasing the backpressure) at outlet [3.11c] of vapor-liquid separator-reservoir 3.1.

Increasing the motive force at inlet [2.43] of thermal eductor [2.40], which may increase the suction at inlet [2.42].

Decreasing the fluid temperature at inlet [2.43] of thermal eductor [2.40], which may increase the suction at inlet [2.42].

In a preferred embodiment, devices of the temperature-independent normal range power consumers class as depicted in the examples of FIG. 55 and FIG. 56 (and previously described in the text accompanying FIG. 54) may have little need for cooling temperatures below the normal boiling point (i.e., the boiling point at ambient pressure) of the selected working fluid (such as RUBE™ LT2), such as when the normal boiling point is already well below the upper temperature limits of the devices [3.14] and none of the devices is fabricated with temperature-sensitive SOI technology.

However, devices of the temperature-dependent power consumers class (those which inherently consume noticeably less power at lower temperatures, for a given performance level, i.e., without changing other operating parameters, such as clock rates) may benefit significantly from this setup. Accordingly, in a preferred embodiment, an approach similar to that of FIG. 55 and FIG. 56 may be implemented for devices of the temperature-dependent power consumers class, substituting the components of a lower-temperature priority circuit (previously described) in the conceptual depiction of a vapor-liquid separator-reservoir, as in the example of FIG. 60.

Figure 60:
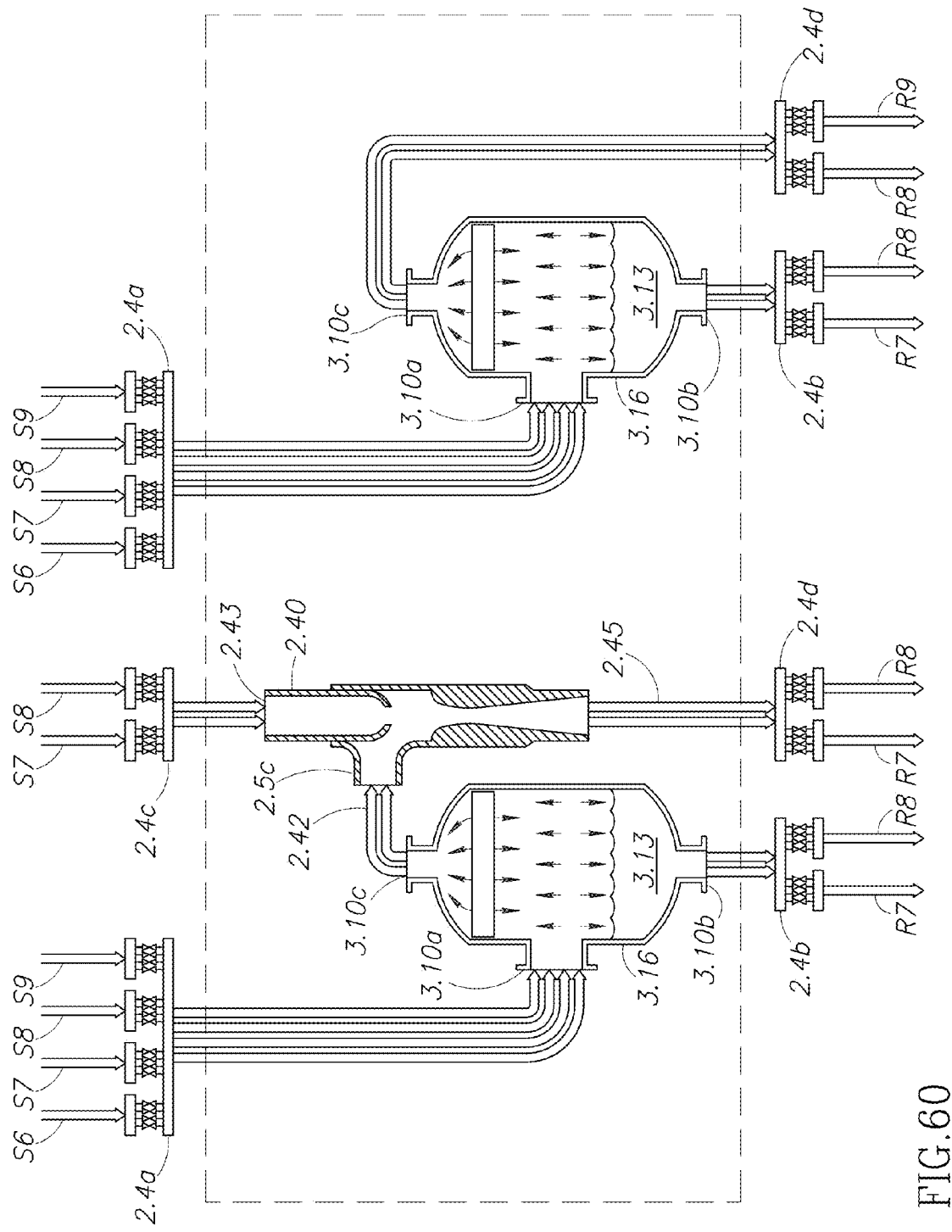
FIG. 60: RUBE™ Vapor-Liquid Separator-Reservoir with Lower-Temperature Electronics Cooling Loads

In a preferred embodiment, the pressure vessel [3.1] may further comprise and enclose one or more interior pressure vessels, such as that which may be formed by a pair of manifolds [3.16] as depicted in the example of FIG. 60, which may further enclose or contain electronic devices such as [3.13], such that all or part of said devices may be in intimate thermal communication with working fluid contained therein (i.e., in conjunction with closed bath immersion).

The outer and inner pressure vessels [3.1] and [3.16] may be optimally advantageous to the implementation of closed bath immersion as contemplated here, in order to prevent escape of working fluid vapor while taking advantage of the exergy in the phase-change fluid, such as to provide motive force. In a preferred embodiment, as depicted in FIG. 60 (at center), the pressure vessel [3.16] may also serve as a vapor-liquid separator/reservoir [3.16] that may accept ingress flows from digital mixer valve [2.4a] as described in the earlier example of FIG. 54. Egress flows from vapor-liquid separator/reservoir [3.16] may be divided between digital splitter valve [2.4a] (as described in the example of FIG. 54) and an alternate vapor-only egress path (not shown in FIG. 54). In a preferred embodiment, vapor may be beneficially removed via a vapor outlet [3.10c] (which may function as an additional outlet to augment the logical egress port [3.10b], and which may thereby further reduce the internal pressure of the pressure vessel) by directly or indirectly connecting it to the suction port [2.42] of an optionally co-located thermal eductor [2.40], which may be essentially a thermal pump (previously described) that may entrain the vapor in a stream of motive liquid prior to returning it to the STEER Thermal Bus [2b] through its outlet port [2.45] and digital splitter valve [2.4d].

Depending on the relative temperatures and pressures of the fluids at the motive port [2.43] and suction port [2.42] of thermal eductor [2.40], any entrained vapor may condense partially or fully when mixed with the motive fluid (e.g., the same type of working fluid, but at a relatively lower temperature and/or higher pressure, such that the mixed fluids shift to a lower aggregate pressure) within the eductor, which may thereby increase the suction at the suction port [2.42], thereby inducing the egress of vapor from the pressure vessel of vapor-liquid reservoir [3.16] via vapor outlet [3.10c]. The fluid at the eductor's outlet port [2.45] may be two-phase fluid if the entrained vapor only partially condenses, or liquid if it fully condenses. Note that the configuration and operation of a thermal eductor [2.40] is described in an earlier section.

In another preferred embodiment, vapor may be removed from the depicted pressure vessel [3.16] (see FIG. 60, at right) via vapor outlet [3.10c] by directly returning it to the STEER Thermal Bus through digital splitter valve [2.4d]. Note that, in this case, the STEER Thermal Bus may use downstream thermal eductors or other means (not shown) to motivate and direct the working fluid from digital splitter valve [2.4d] toward a downstream destination.

The temperature ranges depicted in FIG. 60 are the same as in FIG. 55 and FIG. 56, because it is likely that there may be significant overlap in the temperature ranges, operationally speaking. However, it may be quite reasonable to operate the lower-temperature configuration of FIG. 60 at much lower temperatures, including well into the sub-zero temperature range depicted on the STEER Thermal Bus of FIG. 60.

Higher Temperature Closed Bath Immersion with Phase-Change Fluid

From FIG. 57 and FIG. 58, we can see that as the operating pressure increases in the "higher" range from 2 bar to 7 bar, the boiling point of the RUBE™ LT2 working fluid also increases from 56.3° C. to 99.6° C. The low end of this higher range, up to about 60° C., corresponds to the upper end of the temperature range for commercial-grade electronic devices that need to be operated reliably (keeping in mind that every 10° C. increase in operating temperature may reduce their reliability by half).

However some devices are designed to operate reliably at much higher temperatures. With by-design higher temperature devices, device safety or reliability may not be the key factors that determine the appropriate target operating parameters; performance, efficiency, or temperature derating, for example, may be more relevant factors.

Figure 61:
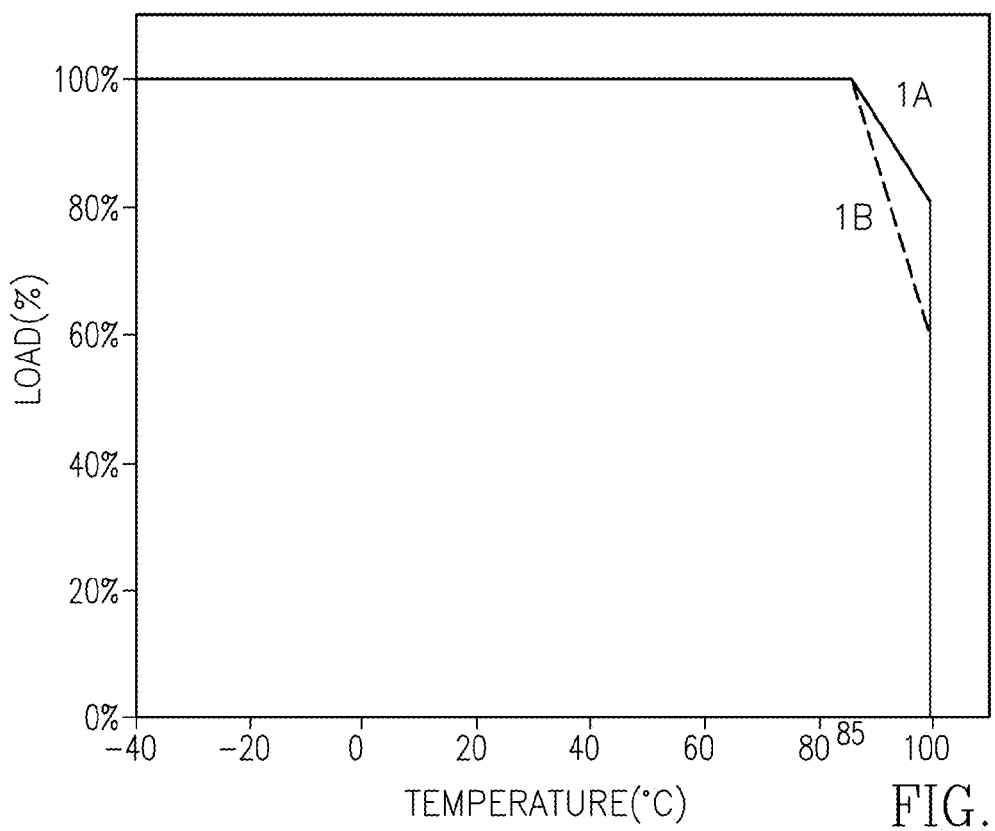
FIG. 61: Example Temperature-Based Derating Curves for High-Reliability Electronics Cooling Loads 1A & 1B

FIG. 61 and FIG. 62 depict temperature derating curves for examples comprising two variants of two different devices. All four example devices are of the temperature-independent "extended range" power consumers class described in the previous section. As devices of this class are examined in more detail, it will be clear to those skilled in the art that such devices are not "completely" temperature-independent, but rather, are "relatively" temperature-independent, especially when compared to the operating characteristics of devices intended for medium and lower temperatures.

In FIG. 61, the derating curves of devices 1A and 1B indicate that both devices may operate at 100% of their rated loads at temperatures up to 85° C. However, between 85° C. and 100° C., device 1A is derated linearly down to 80% of its rated load, while device 1A is derated linearly down to 60% of its rated load. Similarly, the derating curves of devices 2A and 2B in FIG. 62 indicate that, whereas device 2A may operate at 100% of its rated load at temperatures well beyond 100° C., device 2B may operate at 100% of its rated load at temperatures only up to 94° C., after which it derates linearly down to about 82% of its rated load. Thus, while derating may play a role at the high end of the operating temperature ranges of these devices, there may be no reason to constrain these devices to the sub-60° C. cooling limits of the medium temperature devices discussed previously (e.g., electronic devices of the temperature-Independent normal range power consumers class, as described in the text accompanying FIG. 54, with an operating pressure range, for example, from about 0.8 bar to about 2 bar, and associated working fluid boiling point temperatures of about 30.5° C. to about 56.3° C., respectively).

Although devices 1A, 1B, 2A, and 2B of FIG. 61 and FIG. 62 would operate perfectly as these lower "normal" temperature ranges, to do so would mean that: (1) extra exergy must be expended to achieve artificially low cooling for that range, and (2) exergy recuperated via transfer from the devices to the working fluid would be at lower temperatures and/or pressures, and would thus constitute a lower grade of exergy (due to having less enthalpy).

In a preferred embodiment, devices of the temperature-independent "extended range" power consumers class described in the previous section may be operated at elevated temperatures and pressures that may approach but not exceed 100% load according to their respective temperature derating thresholds. In an alternate embodiment, the operating temperature corresponding to the 100% threshold may be exceeded, up to the maximum allowable device temperature, if the derated load percent is not exceeded.

In a preferred embodiment, other temperature-affected characteristics of devices in the temperature-independent "extended range" power consumers class described in the previous section may also become relevant to the selection of target operating temperatures and pressures. For example, the curves in FIG. 63 and FIG. 64 depict the overvoltage turn-off time and overcurrent turn-off time, respectively, for an overvoltage protection (OVP) regulator and inrush current limiter, as a function of the operating temperature.

In these curves, we can see that the overvoltage turn-off time increases with temperature (by about 75 ns, from 50° C. to 125° C.), which may or may not be optimally advantageous for a particular design. In general, the extent to which specific device characteristics (e.g., such as the overvoltage turn-off time in FIG. 63) may be optimally advantageous may thus induce constraints on the selected operating temperature (for example, constraining the operating temperature to 100° C. will cause the overvoltage turn-off time to increase by only about 50 ns, which may be perfectly acceptable).

In contrast, the overcurrent turn-off time vs. temperature curve of FIG. 64 indicates that the overcurrent turn-off time actually decreases with increasing temperature. Thus, in this example, increasing the temperature from 50° C. to 100° C. may cause the overcurrent turn-off time to decrease by about 450 ns (0.45 µs), whereas increasing the temperature from 50° C. to 125° C. may cause the overcurrent turn-off time to decrease by about 750 ns (0.75 µs). Assuming these turn-off times are acceptable, and would only improve with increasing temperature, in these examples one would not expect overcurrent turn-off time to become a constraint on the upper operating temperature threshold.

In a preferred embodiment, the target operating pressures and temperatures may be determined on the basis of the most limiting of the relevant constraints. In the case of the temperature-independent "extended range" power consumers class, and the exemplary curves of FIG. 61, FIG. 62, FIG. 63 and FIG. 64, a preferred upper limit on the target device operating temperature ($T_{CASE}$) may be, for example, about 100° C. If we allow a basic wall superheat of about 3° C., as previously discussed, with perhaps a safety factor of 3× due to the extended temperature range, for a maximum wall superheat of 9° C. (i.e., $T_{SUPERHEAT}$=9° C.), this would correspond to a target working fluid boiling point of about 91° C. (i.e., $T_{BoilingPoint}$=91° C.). Interpolating from FIG. 57, for RUBE™ LT2 working fluid, a boiling point of about 91° C. occurs at an operating pressure of about 5.6 bar (81 psi), so at this operating pressure and boiling point, the working fluid may isothermally cool the devices (temperature-independent "extended range" power consumers) immersed therein.

Figure 65:
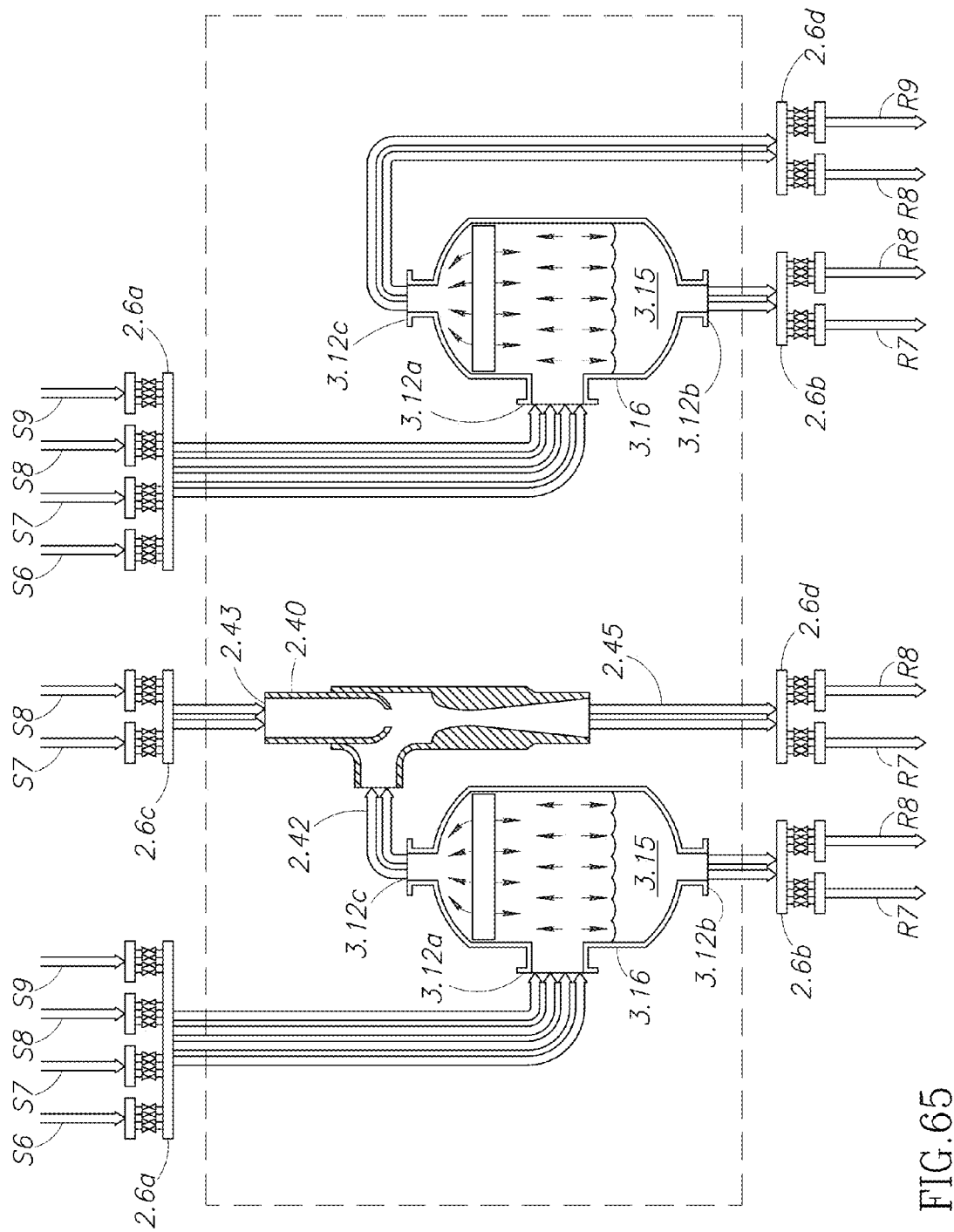
FIG. 65: RUBE™ Vapor-Liquid Separator-Reservoir with Higher-Temperature Electronics Cooling Loads

In a preferred embodiment, an approach similar to that of FIG. 55, FIG. 56, and FIG. 60 may be implemented for devices of the temperature-independent "extended range" power consumers class, substituting the components of a higher-temperature priority circuit (previously described) in the conceptual depiction of a vapor-liquid separator-reservoir, as in the examples of FIG. 65.

In a preferred embodiment, the pressure vessel [3.1] may further comprise and enclose one or more interior pressure vessels, such as that which may be formed by a pair of half-manifolds [3.16] as depicted in the example of FIG. 65, which may further enclose or contain electronic devices [3.15] such as those of the temperature-independent "extended range" power consumers class, such that all or part of said devices may be in intimate thermal communication with working fluid contained therein (i.e., in conjunction with closed bath immersion).

In one embodiment, reducing the operating temperature of a subsystem like those depicted in FIG. 65 may be easily accomplished via a reduced operating pressure and boiling point in a manner similar to that applied to the example of FIG. 60, but that may be the opposite of what is needed here. Whereas the example of FIG. 60 may seek to reduce the operating temperature by operating at sub-ambient pressures, the example of FIG. 65 may seek to increase the operating temperature by operating above ambient pressure, and indeed, at multiples of ambient pressure.

In a preferred embodiment, raising the operating temperature of a subsystem like either of those in FIG. 65 may be straightforwardly accomplished via an increased operating pressure and boiling point, effected by a combination of measures such as the following:

Decreasing the suction force (or increasing the backpressure) at outlet [3.12b] of vapor-liquid separator-reservoir 3.16, or closing it off altogether.

Decreasing the suction force (or increasing the backpressure) at outlet [3.12c] of vapor-liquid separator-reservoir 3.16, or closing it off altogether.

Decreasing the motive force at inlet [2.43] of thermal eductor [2.40], which may decrease the suction at inlet [2.42].

Increasing the fluid temperature at inlet [2.43] of thermal eductor [2.40], which may decrease the suction at inlet [2.42].

Another contrast between the examples of FIG. 60 and FIG. 65 is that, whereas configurations of the former could be viewed as having an inlet flow that is more constricted than the outlet flows (with suction at outlet [3.12c] thus creating a partial vacuum), configurations of the latter could be viewed as having an outlet flow that is more constricted than the inlet flow. In a preferred embodiment, the particular combination of measures used to control the operating pressure and temperature may be dynamically selected, and may partly depend upon the availability of upstream working fluid resources and the demand for downstream working fluid resources (for example, which would be most helpful in a downstream subsystem—liquid, vapor, or two-phase fluid?).

The outer and inner pressure vessels [3.1] and [3.16] may be optimally advantageous to the implementation of closed bath immersion as contemplated here, in order to prevent escape of working fluid vapor under pressure while taking advantage of the exergy in the phase-change fluid, such as to provide motive force. In a preferred embodiment, as depicted in FIG. 65 (at left), the pressure vessel [3.16] may also serve as a vapor-liquid separator/reservoir [3.16] that may accept ingress flows from digital mixer valve [2.6a] as described in the earlier example of FIG. 54. Egress flows from vapor-liquid separator/reservoir [3.16] may be divided between digital splitter valve [2.6a] (as described in the example of FIG. 54) and an alternate vapor-only egress path (not shown in FIG. 54). In a preferred embodiment, vapor may be beneficially removed via a vapor outlet [3.12c] (which may function as an additional outlet to augment the logical egress port [3.12b], and which may thereby further reduce the internal pressure of the pressure vessel) by directly or indirectly connecting it to the suction port [2.42] of an optionally co-located thermal eductor [2.40], which may be essentially a thermal pump (previously described) that may entrain the vapor in a stream of motive liquid prior to returning it to the STEER Thermal Bus [2b] through its outlet port [2.45] and digital splitter valve [2.6d].

Depending on the relative temperatures and pressures of the fluids at the motive port [2.43] and suction port [2.42] of thermal eductor [2.40], any entrained vapor may condense partially or fully when mixed with the motive fluid (e.g., the same type of working fluid, but at a relatively lower temperature and/or higher pressure, such that the mixed fluids shift to a lower aggregate pressure) within the eductor, which may thereby increase the suction at the suction port [2.42], thereby inducing the egress of vapor from the pressure vessel of vapor-liquid reservoir [3.16] via vapor outlet [3.12c]. The fluid at the eductor's outlet port [2.45] may be two-phase fluid if the entrained vapor only partially condenses, or liquid if it fully condenses. Note that the configuration and operation of a thermal eductor [2.40] is described in an earlier section.

In another preferred embodiment, vapor may be removed from the depicted pressure vessel [3.16] (see FIG. 65, at right) via vapor outlet [3.12c] by directly returning it to the STEER Thermal Bus through digital splitter valve [2.6d]. Note that, in this case, the STEER Thermal Bus may use downstream thermal eductors or other means (not shown) to motivate and direct the working fluid from digital splitter valve [2.6d] toward a downstream destination.

The temperature ranges depicted in FIG. 65 are the same as in FIG. 55, FIG. 56, and FIG. 60, because it is likely that there may be significant overlap in the temperature ranges, operationally speaking. However, it may be quite reasonable to operate the higher-temperature configuration of FIG. 65 at much higher temperatures, including well into the 40° C. to 130° C. vapor temperature range depicted on the STEER Thermal Bus of FIG. 65.

Closed-Bath Immersion with Phase-Change Fluid Vs. Open Bath Immersion with Phase-Change Fluid Closed-Bath Pressure Vessel vs. Unsealed Open Bath Tank—Basic Approach The first and most obvious difference between closed-bath immersion with dielectric phase-change fluid (as taught herein) and open-bath immersion with dielectric phase-change fluid (as taught elsewhere) is the basic approach for containing the working fluid so that it may accomplish its phase-change work without escaping the system. Note that, by using one or more dielectric phase-change working fluids at their respective boiling points (which may include a mixture of such fluids), either approach may operate isothermally and thus avoid temperature glide (and any associated thermal stresses).

Figure 67:
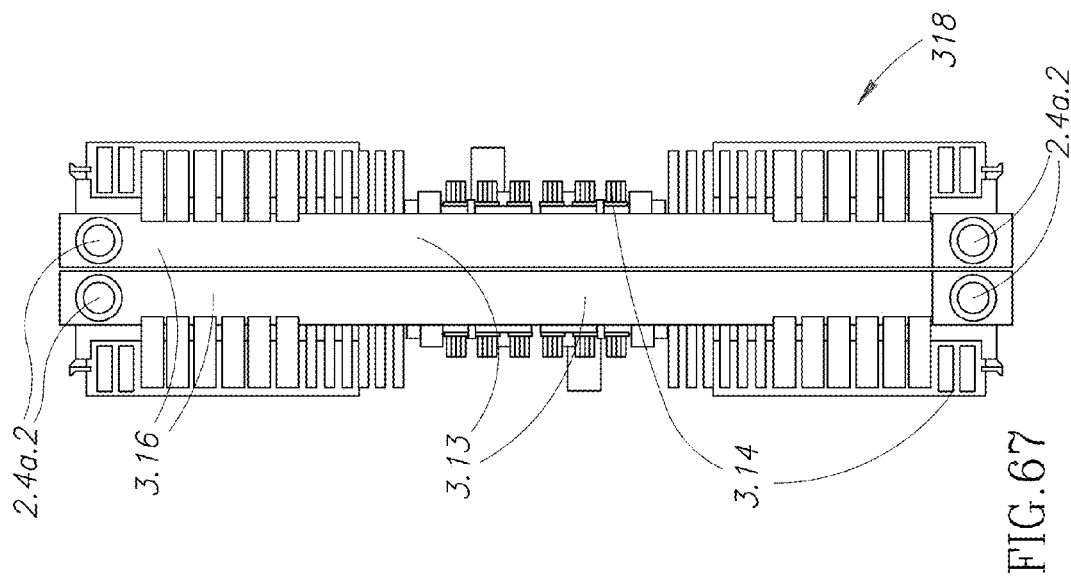
FIG. 67: PRIOR ART—Example Closed-Bath Immersion Modules—Internal, Not Field-Replaceable

In a preferred embodiment, closed-bath immersion may be based on a sealed, pressure-controlled, fully closed-loop system allowing no working fluid vapor to escape under normal conditions, as depicted in earlier figures, and also in FIG. 66 and FIG. 67. In the example of FIG. 66, the unit [3.1] depicts a closed-bath immersion unit whose installation or field replacement may be fully automated. FIG. 67 depicts an alternate view of a modular internal subsystem such as from FIG. 54, as viewed from a backplane or other connecting plane (many such subsystems may be enclosed within the unit [3.1] depicted in FIG. 66. In a preferred embodiment, other co-designed aspects of the system may allow long-term operation with graceful degradation, intentionally and generally eliminating the need for field repair or maintenance, especially on a small scale such as board-level or server-level replacement (and thus eliminating "accessibility" constraints) of internal subsystems such those depicted in FIG. 67. In a preferred embodiment, for example, the combination of simple robotics and modular systems may enable fully automated replacement of an entire "factory-certified" pressure vessel [3.1] in the field, thus obviating the need for easy board-level access by humans, and also enabling extreme packaging density and power density. In a preferred embodiment, a field-replaceable unit may comprise a pressure vessel for closed-bath immersion, and may also comprise separate interior pressure vessels, each of which may also implement closed-bath immersion. A closed-bath immersion unit [3.1] such as depicted in FIG. 66 may further comprise hundreds or thousands of physical multicore processors, and may not need to be replaced unless significant degradation has occurred to the unit as a whole.

In a preferred embodiment, the example internal subsystem of FIG. 67 (which may comprise many processors, memory, etc.), may be a modular factory-certified pressure vessel that may be intended to be easily factory-replaceable or depot-replaceable, but not field-replaceable (e.g., when enclosed within an outer pressure vessel and immersed in a closed bath within same). For example, the internal subsystem of FIG. 67 may implement a lower temperature vapor-liquid separator-reservoir (e.g., a pair of half-manifolds 3.16 may also form an interior pressure vessel for closed-bath immersion, but may not be field-replaceable; priority devices 3.13 may be on the PCB's reverse side, hidden within half-manifolds 3.16) that may serve as a priority circuit for working fluid, as previously depicted in FIG. 60. In such an embodiment, the modular internal subsystem, whether a pressure vessel or not, may be fully enclosed within a field-replaceable unit (FRU) [3.1] which is both larger and also an "outer" pressure vessel. In FIG. 67, non-priority devices 3.14 may be outside the half-manifolds 3.16 (and thus excluded from the closed bath of the interior pressure vessel), but within the closed bath of the enclosing pressure vessel [3.1], which may be larger. In one embodiment, the outer pressure vessel [3.1] (which may be field-replaceable) may be only slightly larger, so as to enclose a single modular internal subsystem, as depicted in FIG. 53 (also see inset FIG. 70 from US20090216910) (PRIOR ART). In a preferred embodiment, the outer pressure vessel [3.1] may be significantly larger, such as depicted in FIG. 66, and previously as an arbitrary subsystem [3.1] in FIG. 42, so as to enclose any number of modular internal subsystems, such that the handling of the outer pressure vessel [3.1] and its enclosed subsystems may be fully automated.

Figure 68:
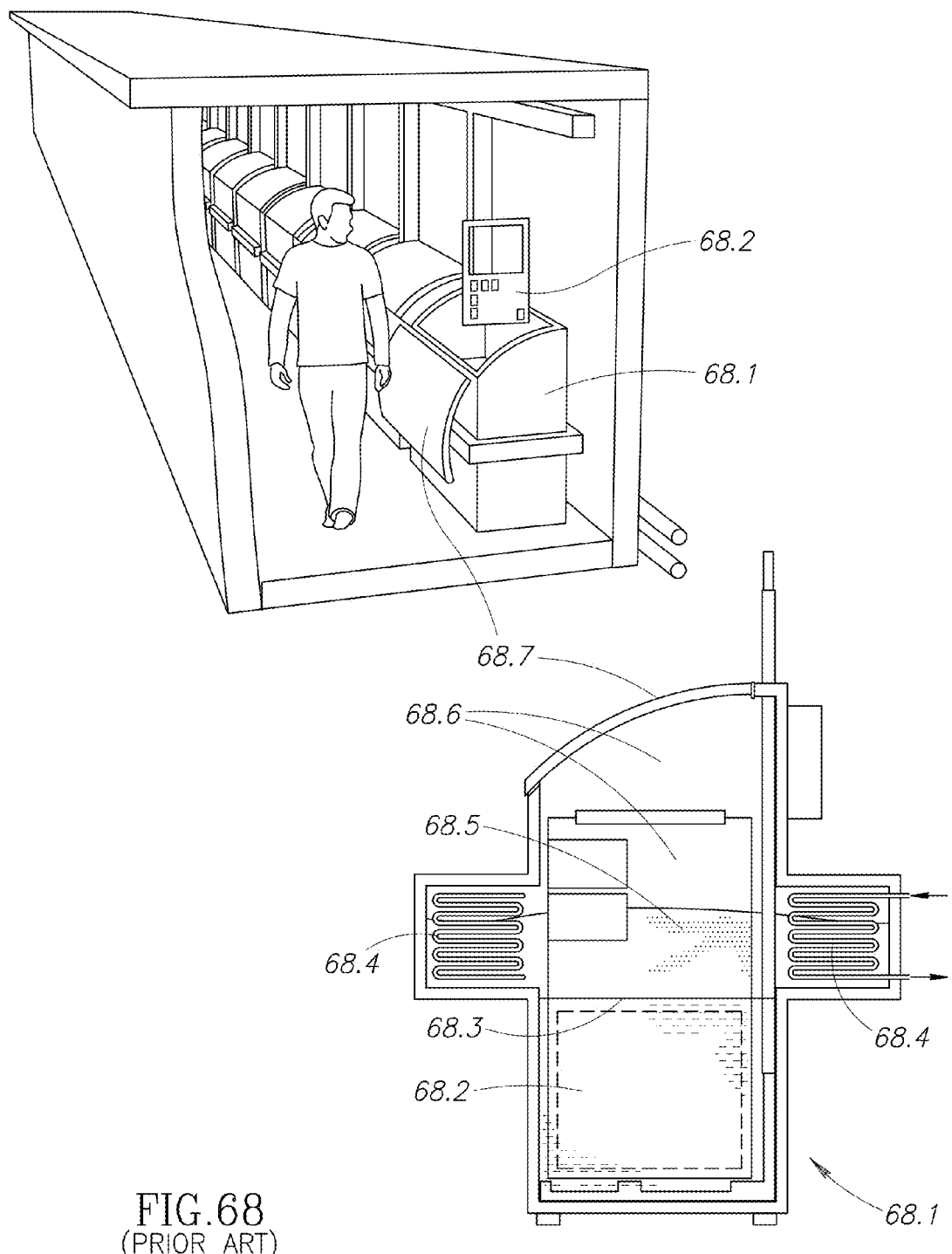
FIG. 68: PRIOR ART—Example Open-Bath Immersion (OBI) Concepts (3M Corp.)

Whereas closed-bath immersion is based on a sealed, pressure-controlled, fully closed-loop system, open-bath immersion as depicted in FIG. 68 (PRIOR ART) may be based on a tank or bath of dielectric working fluid that may be open to ambient air and which is thus constrained to operate properly only at ambient pressure. Fundamentally, open-bath immersion may be based on an open-to-the-air tank so that humans may easily add, replace, or remove electronic devices (e.g., compute servers) from the open bath during normal operation, such as for maintenance purposes, as illustrated in FIG. 68 (at left).

NOTE: An open-bath immersion unit itself, such as the unit [68.1] depicted in FIG. 68, may not be a field-replaceable unit (FRU) under the normal definition of the term, although field replacement may be possible. Due to the need for human access, an open-bath immersion unit [68.1] may occupy only a small portion of the total data center volume required. A field-replaceable server or other electronics board [68.2] that may be human-accessible and easily removed from an open-bath immersion unit [68.1] may account for only a portion of the volume required for such a unit (perhaps one-third of the entire open-bath unit), due to the need for overhead vapor space, condensing apparatus, and clearance for human access.

In a system based on open-bath immersion with phase-change working fluid, it is preferred to prevent the working fluid from evaporating to the open air, due to the volatility of the working fluid. This may be accomplished primarily in two ways:

1. First, a suitable working fluid may be chosen that has a boiling point above the ambient temperatures expected, but below the maximum operating temperature of the devices to be cooled, so as to inherently reduce the rate of evaporation as much as possible while accomplishing phase-change cooling. Typically, a suitable working fluid may have a boiling point in the range of 49° C. to 60° C. (note that this is well below the 100° C. boiling point of water, so the working fluid will naturally evaporate much faster than water even at ambient temperatures (e.g., 20° C.).

2. Second, one or more condensers [68.4] may be placed in the tank [68.1], in the airspace [68.5] above the surface [68.3] of the working fluid, as depicted in FIG. 68 (at lower right). The condenser(s) [68.4] typically would be placed so as to avoid obstructing the insertion or removal of the devices to be cooled (e.g., electronic circuit boards). As working fluid vapor rises from the surface [68.3], it may be condensed to liquid by the condenser(s) [68.4] and simply fall back to the surface [68.3], using a mechanism not unlike a vapor degreaser. The airspace [68.6] in the tank [68.1] may be kept relatively colder than the ambient temperature, somewhat like a chest freezer, so the top [68.7] can be opened without instantly letting all the "cold" out (although vapor diffusion will still occur). If devices such as circuit boards [68.2] are removed slowly enough (say, for maintenance), any fluid contained thereon will flash to the condenser(s) [68.4] in the same way as vapor rising from the surface, so the circuit boards [68.2] may be completely dry upon removal (unlike open-bath immersion with single-phase fluids, where circuit boards removed for maintenance may be wet and oily).

Reducing Device Power Dissipation at the Source vs. Preventing Device Meltdown

In preferred embodiments of closed-bath immersion disclosed herein, pressure vessels may be utilized to control the operating pressures and temperatures of selected working fluids for several reasons, the first of which may be to maintain the operating temperatures of electronics loads at specific setpoints that correspond to desired thermal behaviors of the temperature-controlled devices, such as power dissipation (see FIG. 48, FIG. 49, FIG. 50, FIG. 51, and associated discussion).

In the case of devices of the temperature-dependent power consumers class, for example (i.e., those devices which inherently consume noticeably less power at lower temperatures, for a given performance level, i.e., without changing other operating parameters, such as clock rates), closed-bath immersion as taught here may enable such devices to operate at significantly lower temperatures and pressures that may be selected and maintained dynamically, thereby reducing the power dissipated at the source devices, which automatically reduces the heat to be subsequently rejected (regardless of the rejection means).

In contrast, open-bath immersion, which must operate essentially at ambient pressure, cannot—by definition—reduce or increase the operating pressure, and thus cannot dynamically control the boiling point of the working fluid. Rather, the operating temperature is fixed at the boiling point of the selected working fluid at ambient pressure and temperature (adjusting the ambient environment itself may be possible, but may have only insignificant effects). In order to minimize the loss of working fluid to the environment as vapor, dielectric fluids with relatively high boiling points may be most appropriate (typically 49° C. to 60° C., and more likely, about 49° C. to 56° C.). As a consequence, with suitable boiling enhancement coatings to reduce wall superheat and subsequent device "meltdown" or overheating, and to keep the average junction-to-fluid temperature difference to about 9° C., electronic devices may be kept to an operating temperature of about 58° C. to 65° C., thereby sacrificing, for example, the power savings and reliability enhancement possible by operating SOI-technology-based devices (such as CPUs) at lower temperatures (again, see FIG. 48, FIG. 49, FIG. 50, FIG. 51, and associated discussion).

A related approach in the industry (e.g., by IBM) contemplates non-phase-change cooling fluid (e.g., water) at up to 60° C. in an attempt to reduce the energy expended for cooling, with the intent to ensure that the processor operating temperatures remain well below 85° C. (the cooling system comprises micro-channel liquid coolers which attach directly to the processors only, and not to the myriad support devices, which must be cooled by some other means such as moving air). However, given the availability of 60° C. (140° F.) cooling water as contemplated, a cooling system based on open-bath immersion might utilize a dielectric phase-change fluid with a boiling of, say, 74° C. (165° F.), which could be easily condensed by 60° C. cooling water. If the average junction-to-fluid temperature difference could be held to about 9° C. (which becomes increasingly difficult with increasing temperatures), then electronic devices such as processors may be kept to an operating temperature of about 83° C., just under the 85° C. maximum of certain classes of "premium" chips, and the resulting 73° C. water temperature would be hot enough to efficiently reject to ambient (i.e., without a cooling tower) even in the hottest climates. However, efficiently rejecting to ambient may be a short-sighted goal (see next subsection), and operating at such high temperatures sacrifices the power savings and reliability enhancement possible by operating SOI-technology-based devices (such as CPUs) at much lower temperatures (see FIG. 48 and FIG. 50), and also requires high-priced premium chips rated for high temperatures.

Optimal vs. Suboptimal Recuperation & Reuse of System Exergy

In this context, "optimal" means that the underlying devices being cooled may operate at the most efficient or otherwise ideal temperature for the class of devices to which they belong, while also maximizing the "net system exergy" actually recuperated and reused. Here, "net system exergy" refers to the difference between the reusable exergy recuperated and the exergy expended to recuperate it, where "exergy" itself refers to "available energy" and comprises electrical, thermal, chemical (fuel), mechanical, and other forms of energy. In general, it is preferable to recuperate and reuse exergy within the system, rather than rejecting to the environment. In other words, it is preferred to minimize energy losses of all types, and to intentionally reject energy to the environment only when optimally advantageous.

In preferred embodiments of closed-bath immersion disclosed herein, pressure vessels and dynamically managed thermal priority circuits may be utilized to control the operating pressures and temperatures of selected working fluids in order to recuperate or "harvest" exergy at temperatures optimal for each of several device classes. Exergy is first saved by operating devices more efficiently, thus reducing initial power dissipation and also the amount of heat to be rejected. Additional exergy savings may accrue to the extent that recuperated thermal exergy is used to provide motive force within the system (see STEER apparatus [2] and RUBE apparatus [3], described elsewhere) in lieu of electro-mechanical pumping (which, for example, not only requires additional exergy input in the form of electrical energy, but also requires additional exergy input to recuperate or reject the heat produce by the electro-mechanical pumping apparatus).

In preferred embodiments of closed-bath immersion disclosed herein, further net system exergy increases may accrue, for example, to the extent recuperated thermal exergy may be used to enable the efficient generation of additional or auxiliary electrical power (see PRIME apparatus [4] and PERKS apparatus [5], described elsewhere), which may be used for any purpose, including to power additional devices without increasing the external energy supplied to the system (e.g., from fuel or the electrical grid), or to offset and thereby reduce the amount of external energy supplied to the system in the first place. For example, the coolest temperatures of recuperated exergy (such as from temperature-sensitive CPUs) may be used to vaporize and superheat cryogenic fuel such as LNG, whose resulting high-pressure (e.g., 1000 psi) vapor may drive a non-combustion turboalternator to generate electrical power. In another example, the hotter temperatures of recuperated exergy (such as from high-reliability voltage converters) may be used in the final stages of a low-pressure (e.g., 100 psi) turboalternator to generate electrical power. In both of these example, in accordance with the laws of thermodynamics, the pressure losses in the associated turbomachinery result in refrigeration (temperature loss) of the motive vapor stream, which reduces the amount of exergy lost (i.e., it is used to produce electrical power rather than rejecting it to the environment) and also produces a beneficial effect ("chilling") that is of further use within the system. In a preferred embodiment, efficient power auxiliary generation is a direct consequence of efficiently recuperating thermal exergy along a temperature spectrum which may range from as low as −122° C. to as high as 130° C. within the same system, for a preferred working fluid such as RUBE™ LT2 (there may be lower and higher temperatures present in the system, and thus, other working fluids).

In contrast, open-bath immersion with phase-change fluid may be suboptimal with respect to recuperation and reuse of system exergy. First, the devices to be cooled, especially CPUs, tend to operate at the high end of their temperature range, where they may consume the most power. While the open-bath immersion cooling approach requires only electrical pumping energy (which may be relatively modest compared to power-hogging vapor compression as used in refrigeration) to transfer energy away from the bath via a liquid-to-liquid (e.g., phase-change-fluid to cooling water) heat exchanger, more energy must be removed due to the increased power dissipation of the devices being cooled. Although exergy in the form of medium-grade heat energy may be recuperated into the water (e.g., yielding water at about 49° C. for a device temperature of 58° C.), the water may have very limited opportunities for reuse, especially within a data center environment (it may be used for building heating or snow melt in the winter, for example, or heating a swimming pool). However, the hot water may very easily be used to efficiently reject heat directly to the environment, due to the relatively higher-than-ambient temperature, but, in the context of this document, doing so should be recognized as a sheer waste of exergy.

Closed-Bath Equivalent of Open-Bath Immersion with Phase-Change Fluid

Some discussions of open-bath immersion with a dielectric phase-change fluid highlight the open nature of the bath as a primary advantage, due to not requiring the expense of achieving a closed system. Actually, such systems are "semi-open," like a chest freezer, which means that they are also "semi-closed." One key difference between closed-bath systems as taught here, and "semi-open" or "semi-closed" bath systems is that the former intentionally operate under controlled pressure or partial vacuum, whereas the latter intentionally operate only at ambient pressure. At ambient pressure, there is less need for seals, hermetic connectors, etc., which may simplify the design and reduce some of the costs (but these may be traded off for other costs).

In an alternate embodiment, a closed-bath system may be made to emulate "semi-open" or "semi-closed" bath systems to a fair degree, by embedding an internal condenser in a vapor space at the top of a closed-bath system, such that the internal pressure may be maintained substantially at ambient pressure. In such a system, the thermodynamic behavior may emulate "semi-open" or "semi-closed" bath systems, but, depending on the actual design, the system may not enjoy the easy-human-access advantage of a "chest freezer" style design. What should be obvious, however, is that there are a number of trade-offs, some of which are called out as follows:

For a tank, container, or other apparatus of a given volume, a portion of the volume must be utilized for liquid bath portion containing the electronics to be cooled, and a portion must be reserved for the vapor portion containing the embedded condenser. This means that the electronics density (i.e., revenue-producing density) must be reduced (relative to a closed-bath design), and the volume given up may be substantial. In the cutaway side view of FIG. 68 (at right) (prior art), note the relative area of the depicted circuit board compared to the total side-view area; it appears that less than half the available apparatus volume is available for revenue-producing electronics.

Although the cost of the container may possibly be reduced by virtue of not needing to be a pressure vessel in the traditional sense, a non-pressure vessel may be much less amenable to be shipped as a unit ready for fully automated deployment (comprising, for example, automated installation, configuration, and unattended operation). Due to lower quality standards, and lower cost construction, such a vessel may have a higher propensity for leakage.

To be efficient, all devices will operate isothermally at exactly one temperature, which is at the boiling point of the phase-change working fluid at ambient pressure. Depending on the selected working fluid, this temperature may not be ideal (e.g., in terms of performance, reliability, efficiency, etc.) for many (or any) of the devices to be cooled. Achieving isothermal operation with separate isothermal operating temperatures for different thermal classes of devices (while operating at ambient pressure) would call for segregating the devices into different baths with different phase-change working fluids (i.e., having different boiling points at ambient pressure), which may not be cost-effective, or even feasible.

It should be pointed out that there may be no actual benefit to embedding a condenser within a closed-bath system in order to partly emulate "semi-open" or "semi-closed" bath systems, and in particular, in order to achieve operation at ambient pressure. In a preferred embodiment, closed-bath systems as taught herein and connected to the STEER apparatus [2](e.g., the STEER Thermal Bus) may be operated at any of a wide range of controlled pressures, including at ambient pressure. However, in an alternate embodiment, hybrid operation may be beneficial, wherein one or more embedded condensers (or more generally, any types of heat exchangers) may enable the auxiliary heat exchange with other working fluids which may be incompatible or operating at entirely different pressures, or where a separation of working fluid streams is called for.

Note that such embedded condensers or other heat exchangers may add weight and occupy volume that may reduce the functional density of a modular unit [3.1]. In the case of a compute-oriented unit, for example, reduced functional density may comprise reduced performance in terms of weight or mass, such as TFLOPS per pound or TFLOPS/kg, or volume, such as TFLOPS per cubic foot or TFLOPS/m$^3$. To the extent that embedded condensers or other heat exchangers negatively impact electrical efficiency, reduced functional density may also comprise reduced performance in terms such as TFLOPS/KW or GFLOPS/watt., and may also negatively impact power usage effectiveness, or PUE.

NOTE: TFLOPS refers to trillions of floating point operations per second, a measure of compute capability.

Closed-Bath Immersion with Phase-Change Fluid vs. Immersion or Submersion with Single-Phase Fluid The use of single-phase working fluids for cooling is well known and understood in the art. When the devices to be cooled by immersion (or "submersion" as some say) are electrical or electronic, such working fluids must be dielectric to avoid short circuits, and may need to have other characteristics as well (being non-corrosive, for example, and chemically compatible). Relatively common dielectric single-phase working fluids may comprise vegetable oil, mineral oil, transformer oil, engineered thermal oils, and any number of oils of proprietary concoctions. Also, deionized water may be sufficiently dielectric to be used in carefully controlled circumstances, but if contaminated, it may lose its dielectric properties and cause short circuits, so we will not discuss it further as a candidate immersion working fluid.

Several benefits may accrue with the use of single-phase working fluids, which tend to be mostly oils, for immersion cooling:

Cheap or relatively cheap fluid cost, depending on actual fluid selected

Industrial grade thermal oils may meet specific (and relevant) quality standards High heat capacity and high heat-removal efficiency, especially relative to air cooling High boiling point, low volatility, thereby generally avoiding most evaporation issues Provides good coverage of immersed devices, and may not require much circulation for low heat fluxes There may also be some concerns when using oil-based single-phase working fluids for immersion cooling, and these are more pronounced when compared to the phase-change working fluids suitable for closed-bath immersion. Some concerns include:

Oils are messy; immersed circuit boards are wet and oily upon removal, which is undesirable Oils have much higher viscosity, and therefore require more energy for pumping, which is undesirable The cooler that devices need to be, the higher the viscosity gets, which is undesirable (wrong direction)

Oils operate without phase-change, and thus acquire only sensible heat, not latent heat (loss of 10× advantage)

Oils do not operate at boiling point, and thus cannot operate isothermally (high heat fluxes may induce thermal stress)

Oils cannot avoid temperature glide (thermal gradients), although faster pumped flows may help (takes more energy)

At electronic device temperatures, heat is relatively difficult to acquire (and even harder to reject, especially to air)

Nonetheless, in an alternate embodiment a closed-bath immersion system with single-phase working fluid, and preferably a thermal oil such as RUBE™ HT1 (see the tables of FIG. 30 and FIG. 31), may be connected to the STEER apparatus [2] depicted notionally in FIG. 1. The STEER apparatus [2] may transfer exergy-laden working fluid to devices capability of benefiting from it and/or rejecting it.

3.4 RUBE—Thermoelectric Subcooler Unit (TSU)

In the context of FRAME, the primary purpose of a Thermoelectric Subcooler Unit (TSU) [3.19] may be to provide rapid thermal response capability under system control, so as to produce working fluid within a particular temperature range that may be needed in a priority thermal circuit elsewhere in the system (e.g., for enhancing computational performance in an HPC context or when operating at very high utilization levels, or to compensate failed or degraded-operation components elsewhere in the system).

Figure 69:
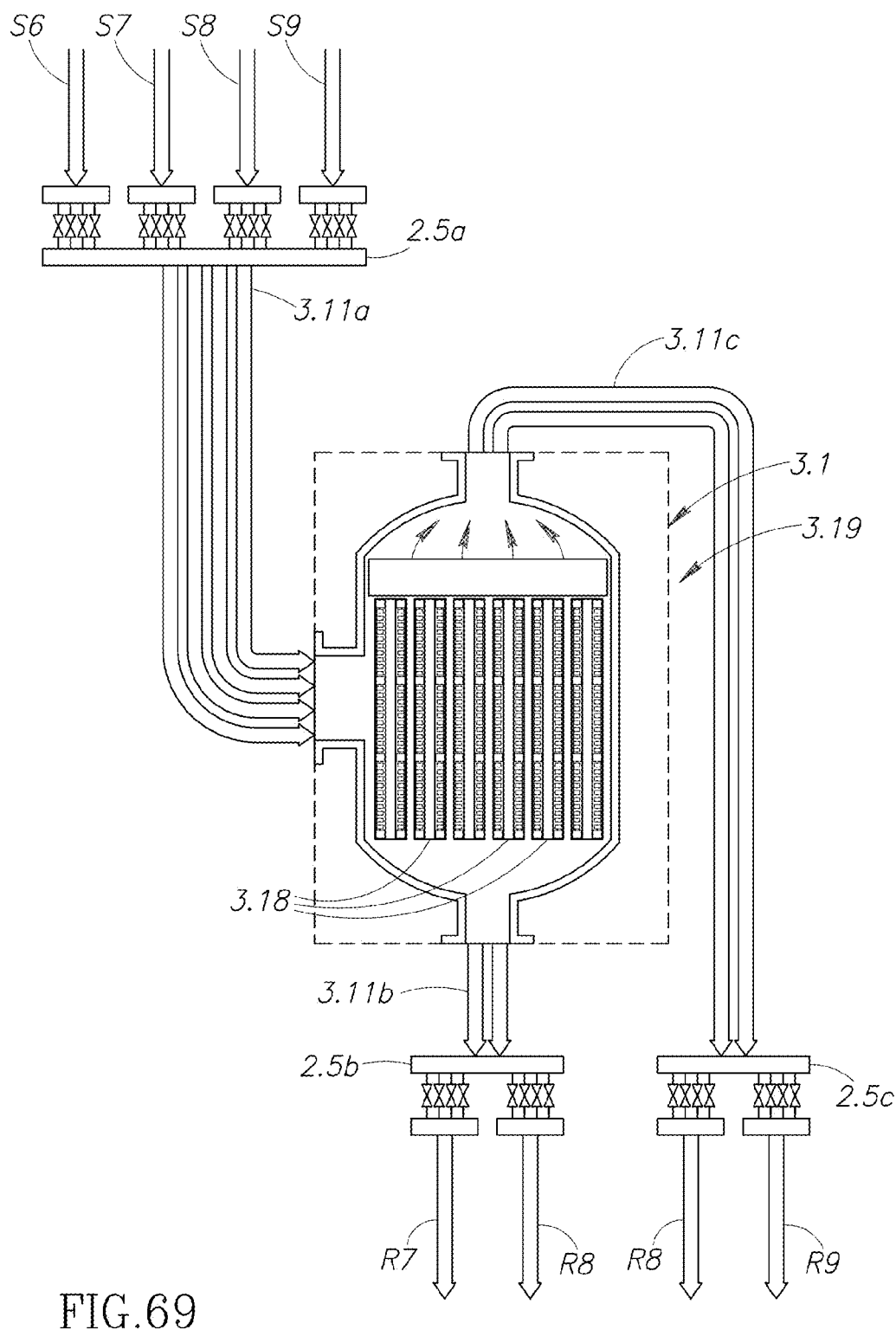
FIG. 69: RUBE™ Thermoelectric Subcooler Unit (TSU)—Shared Outer Reservoir Cooling Circuit Example
Figure 70:
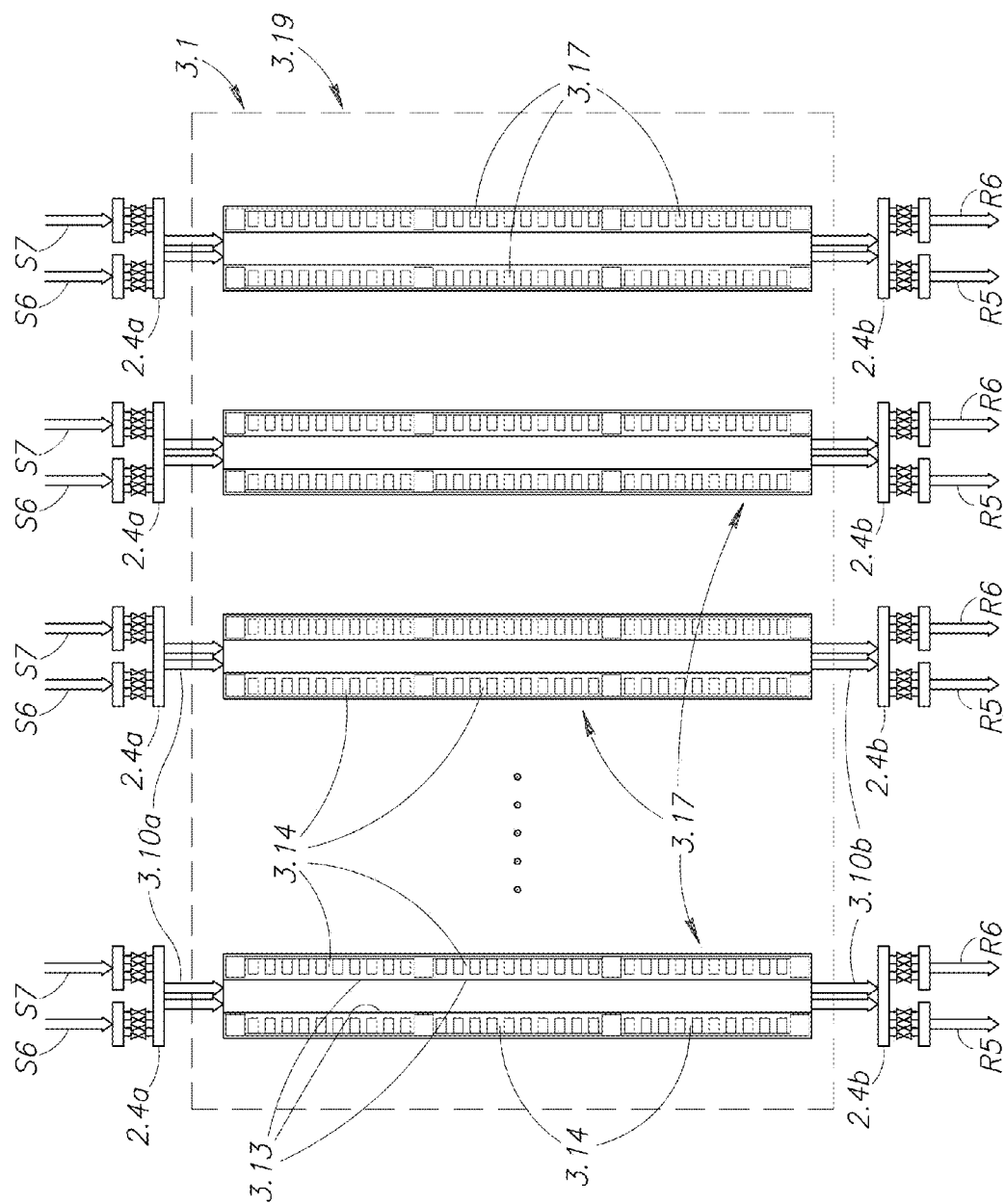
FIG. 70: RUBE™ Thermoelectric Subcooler Unit (TSU)—Individual Internal Module Cooling Circuits Example
Figure 71:
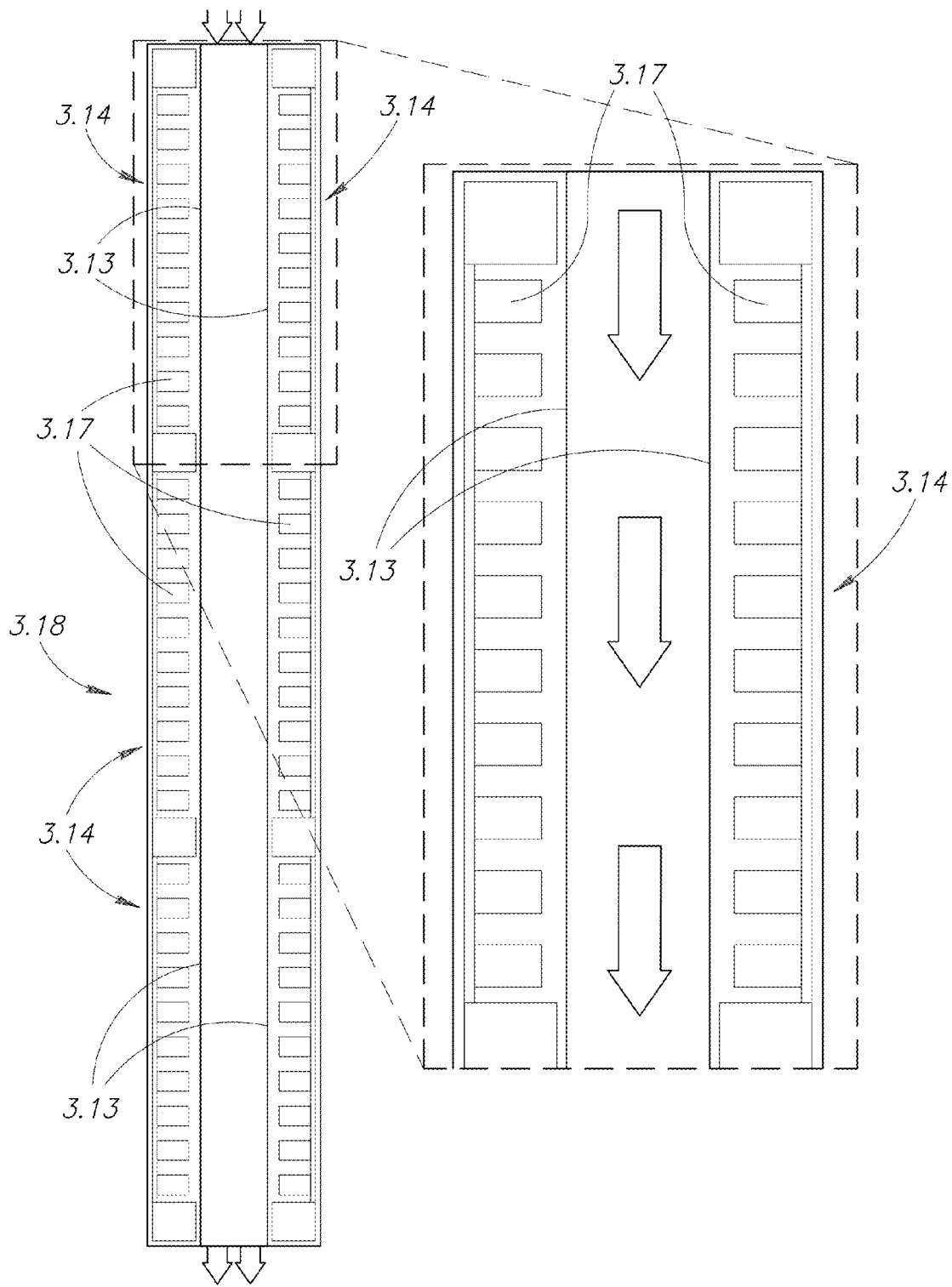
FIG. 71: RUBE™ Thermoelectric Subcooler Unit (TSU)—Individual Internal Module—Zoomed-In Example

FIG. 69, FIG. 70, and FIG. 71 collectively depict one example of an arbitrary subsystem [3.1] which happens to be a TSU [3.19], which is a special type of electronics cooling load [3.1] (which also may be included within some other electronics cooling load). In this example, one or more TEC array modules [3.18] of specially configured high-performance Peltier thermoelectric cooling (TEC) devices [3.17] (called out in FIG. 70 and FIG. 71) may serve to process one or more working fluids from a supply [2.2a] (see FIG. 14) by actively transferring thermal exergy from a priority thermal path [2.2a] [2.4a] [3.10a] [3.13] [3.10b] [2.4b] [2.2b] (thereby cooling the fluid in that path) to a return [2.2b] (see FIG. 14) via a heat rejection path [2.2a] [2.5a] [3.11a] [3.14] [11b] [2.5b] [2.2b] (thereby heating the fluid in that path, which corresponds to the internal coolant reservoir of TSU [3.19]), while also presenting an additional electronics cooling load at the reservoir-exposed surface [3.14] due to the electrical energy required to effect the active transfer. In this "normal" mode, the interior surfaces [3.13] of the TEC devices [3.17] (see FIG. 70 and FIG. 71) are the "cold" surfaces, and the non-interior (i.e., reservoir-exposed) surfaces [3.14] are the "hot" surfaces.

Reverse operation may also be carried out with no further configuration change (the electrical polarity may be dynamically reversed under system control, thereby reversing the "hot" side and "cold" side roles), such that thermal exergy may be actively transferred from path [2.2a] [2.5a] [3.11a] [3.14] [11b] [2.5b] [2.2b] (thereby cooling the fluid in that path, which corresponds to the internal coolant reservoir of TSU [3.19]) to the priority thermal path [2.2a] [2.4a] [3.10a] [3.13] [3.10b] [2.4b] [2.2b] (thereby heating the fluid in that path), while also presenting an additional electronics cooling load at interior surface [3.13] due to the electrical energy required to effect the active transfer. In this "reverse" mode, the interior surfaces [3.13] of the TEC devices [3.17] are the "hot" surfaces, and the non-interior (reservoir-exposed) surfaces [3.14] are the "cold" surfaces.

The example of FIG. 69 and FIG. 70 depicts a STEER Thermal Bus with a supply [2a] and return [2b] having somewhat overlapping temperature ranges and possibly diverse working fluids. An example arbitrary system [3.1] comprises electronics-based thermal loads in the form of a TSU that interfaces with one of the example working fluids at supply [2a] and return [2b], over a subset of the depicted temperature ranges (see FIG. 14 for the labeled temperature ranges and fluids). Note that the fluids and ranges depicted here and in FIG. 14 are exemplary and not limiting.

Independent Fluid Streams per TEC Array Module, with Shared "Hot-Side" Fluid Reservoir In the TSU [3.19] example depicted in FIG. 69 (which depicts only shared "hot-side" reservoir channels [3.11a] [3.11b] [3.11c] and does not show interior cold-side channels [3.10a] [3.10b] for the TEC array modules [3.18]) and FIG. 70 (which depicts only individual interior cold-side channels [3.10a] [3.10b] for each internal TEC array module [3.18], but not the shared "hot-side" reservoir channels [3.11a] [3.11b] [3.11c]), the electronics cooling load [3.1] corresponding to TSU [3.19] may process the working fluid supplied at one or more potentially different ingress ports of one or more digital mixer valves [2.4a] (for example, one 2-port digital mixer valve [2.4a] for each TEC array module [3.18]), each of which may individually require a specific combination of inlet temperature, pressure, and volumetric flow or mass-flow rate, and each of which may have a corresponding ingress port [3.10a] that may supply the priority thermal surfaces [3.13] (as clarified in FIG. 71, these are the interior cold surfaces of the individual Peltier devices [3.17]) of said corresponding TEC array module [3.18].

Although FIG. 70 depicts a preferred embodiment where each TEC array module [3.18] may be configured with a 2-port digital mixer valve [2.4a] normally connected to a supply of already sub-cooled fluid (e.g., mid-range in the STEER Thermal Bus [2.2a]), and further may be configured with a 2-port digital splitter valve [2.4b] that may accept processed fluid from TEC array module [3.18] via egress port [3.10b] (also with an associated outlet temperature, pressure, and volumetric flow or mass-flow rate), and returns it to STEER Thermal Bus [2.2a], the use of just two fluids or temperature ranges is by no means a constraint. Alternatively, warmer or colder fluids may be supplied, and any positive number of ports may be implemented on the one or more digital mixer valves [2.4a] and digital splitter valves [2.4b]. Furthermore, the number of ports implemented on digital mixer valves [2.4a] and digital splitter valves [22.4b] need not match. For example, with 6-port digital mixer valves [2.4a] and digital splitter valves [2.4b], any of the six example temperature ranges depicted in STEER Thermal Bus supply [2.2a] (see FIG. 14) may be heated or cooled dynamically under system control, and subsequently returned to any of the six temperature ranges depicted in STEER Thermal Bus return [2.2b]. A similar any-number-of-ports situation holds for the one or more digital mixer valves [2.5a] and one or more digital splitter valves [2.5b] (which are analogous to digital mixer valves [2.4a] and digital splitter valves [2.4b], respectively), except that they may control the flow of working fluid to the shared coolant reservoir of TSU [3.19].

In a preferred embodiment, all the TEC array modules [3.18] within a TSU [3.19] may process the same type of working fluid (e.g., RUBE™ LT2), albeit at potentially different temperatures, pressures, and flow rates, and the TSU [3.19] may also use that same working fluid in its shared coolant reservoir. In another embodiment, all the TEC array modules [3.18] within a TSU [3.19] may likewise process the same type of working fluid, but it may differ from the type of working fluid in the shared coolant reservoir of TSU [3.19]. In still another embodiment, any of the TEC array modules [3.18] within a TSU [3.19] may likewise process (i.e., at potentially different temperatures, pressures, and flow rates) a type of working fluid that may substantially differ from that of its neighbors within the TSU [3.19], and may also differ from the type of working fluid in the shared coolant reservoir of TSU [3.19]. In the latter two cases, care should be taken to ensure working fluid compatibility in the case of inadvertent mixing, such as in the case of vessel failure.

Additionally, as depicted in FIG. 69 and FIG. 70, the one or more TEC array modules [3.18] may share a coolant reservoir within TSU [3.19], by way of being fully immersed within it, such that the exposed normally "hot" surfaces [3.14] of each TEC array module [3.18] may reject heat directly to the shared coolant, which may be separately supplied via one or more digital mixer valves [2.5a], may optionally recirculate within the reservoir via one or more low-energy pumps, and which may separately exit TSU [3.19] and return to the STEER Thermal Bus via one or more digital splitter valves [2.5b]. Operationally, the shared-reservoir aspect of TSU [3.19] may be substantially like that of the RUBE™ Vapor-Liquid Separator-Reservoir described in section 3.3 (see FIG. 55 and FIG. 66).

Thermally Conductive TEC Device Coatings

In a preferred embodiment, all electronic devices of TSU [3.19] to be cooled or thermally stabilized, and particularly including TEC array modules [3.18], and more particularly, surfaces [3.14] and [3.13] of TEC devices [3.17], may be coated with a very thin layer of RUBE™ Diamond Top-Coating (e.g., a dielectric thermally conductive coating comprising fine diamond powder in a bonding agent) to minimize thermal resistance and promote nucleate boiling of the working fluid with minimal device wall superheat (preferably, within 3° C., such that $T_{CASE} \leq T_{BoilingPoint} + 3°$ C.).

In an alternate embodiment, RUBE™ Metal Coating (described later) may first be selectively applied to surfaces [3.14] and [3.13] of TEC devices [3.17], carefully excluding the porched area (which, in an optional subsequent step, may instead be coated with a very thin layer of RUBE™ Diamond Top-Coating), prior to assembly into TEC array modules [3.18]. In a preferred embodiment, either or both of surfaces [3.14] and [3.13] of TEC devices [3.17], may be enhanced during manufacturing, or prior to (or in lieu of) of surface coating, by etching, cutting, molding, or otherwise creating 3D surface textures that may increase the surface area available for heat transfer.

Coefficient of Performance (COP) Considerations

The solid-state design of the TEC devices [3.17] means that a combination of chilling and heating effects may be accomplished without mechanical moving parts, albeit with additional electrical power. However, if thermally engineered correctly, a TEC-based system may easily achieve a COP (coefficient of performance) well above 2, and as high as 9, during normal operation. The realized COP may also be significantly higher, rising exponentially as the required amount of chilling ($\Delta T$) is decreased, thereby enabling a normal COP as high as 10 to 15, or even higher under typical operating conditions when only small temperature differentials ($\Delta Ts$) may be required in order to maintain a working fluid temperature within its specification. Smaller $\Delta Ts$ may occur, for example, when heat is dissipated isothermally (as it may be in a preferred embodiment), or the temperature of the working fluid to be chilled is already lower than its specified maximum (as it may be in a normal sub-cooling scenario), or when the temperature of the working fluid into which heat is rejected is less than its specified maximum (as it may be in a normal heat-rejection scenario).

In a preferred embodiment, each TEC device [3.17] may be of a high-watt-density (HWD) design, comprising a pair of thin ceramic substrates [3.14] [3.13] in parallel, with very short thermoelectric elements (see inset for [3.17]) sandwiched between them, preferably based on micro-alloyed thermoelectric materials such as $Bi_2Te_3$, so as to enable a $Q_{MAX}$ approaching or exceeding 150 watts per square inch of TEC surface area (one side, e.g., [3.13] or [3.14]). In a preferred embodiment, the number of such TEC devices [3.17] in a system may be such that a particular cooling requirement may be met with only 5% to 30% of the devices operating at 100% of $I_{MAX}$, or preferably only 5% to 20% of the devices operating at 100% of $I_{MAX}$, or still more preferably only 5% to 10% of the devices at $I_{MAX}$, or equivalently, 100% of the devices operating at 5% to 30%, 5% to 20%, or 5% to 10% of $I_{MAX}$, respectively, or any combination of devices and operating currents thereof that yield similar percentages of $I_{MAX}$. An optimal COP may be achieved by operating at minimized percentages of $I_{MAX}$.

In a preferred embodiment of a TSU [3.19] based on thermal interfaces to STEER Thermal Bus supply [2a] and return [2b] channels (see FIG. 14) as depicted in FIG. 69, FIG. 70, and FIG. 71, the COP may vary according to dynamically selected operating temperatures and pressures, with a typical COP goal of at least 4 (in other words, for every 100 watts of electrical energy input, at least 400 watts of active cooling may be delivered). In addition, thermal exergy rejected from the TSU (including heat produced by the electrical energy input, as well as by any upstream power supplies and controllers) may be recuperated by downstream processes in exactly the same way that thermal exergy may be recuperated from the standard electronics loads [3.1] in earlier figures.

Construction and Manufacturing Considerations

In a preferred embodiment, a TEC array module [3.18] may comprise one or more TEC devices [3.17], one or more TEC array PCBs, power supplies and controllers, and other support circuitry, such as sensors, and a variety of conventional PCB-related items such as connectors and fasteners. In a preferred embodiment, a TEC array PCB may be designed and fabricated so as to provide a TEC-device-sized opening in the PCB for each TEC device [3.17] to be incorporated therein, such that a TEC device [3.17] of the proper size may be pressed into each such opening (like a puzzle piece into a puzzle), enabling the TEC device [3.17] to be substantially co-planar with the PCB, or attached to the PCB in a close parallel plane. In a preferred embodiment, the aforementioned opening in the PCB may be stepped or beveled slightly to allow for error-free insertion (especially if such insertion may be part of a manual process), such that the stepped or beveled surfaces of the TEC array PCB openings may mirror the corresponding surface features of the TEC devices to be inserted therein. In a preferred embodiment, the TEC devices [3.17] may be pressed into the TEC array PCB from the same side, as part of a single TEC array PCB manufacturing operation, such that the TEC devices [3.17] may thereafter be soldered (e.g., via a reflow soldering operation) onto the TEC array PCB along with any other TEC array module [3.18] electronic devices, without the need for lead wires as may often be found on TEC devices. In a preferred embodiment, the TEC devices [3.17] may be "porched" so as to simplify soldering and lend mechanical support to the pressed-in configuration. In a preferred embodiment, RUBE™ Diamond Solder Mask materials and processing (described elsewhere) may be used in place of conventional solder mask materials and processing, in order to enhance heat transfer.

In a preferred embodiment, at least one side of the TEC array PCB may be substantially copper plated in the area immediately area around and between the TEC devices [3.17], such that a surface of the devices may be in thermal communication with the copper plating corresponding to that surface, thereby effectively extending the thermal surface area of the TEC devices [3.17] on that side.

In one embodiment, a single TEC array PCB may be replaced with a pair of back-to-back TEC array PCBs (mechanically acting as a single, thicker PCB), separated by an optional thermal insulation layer (no fluid flow is needed between the two back-to-back PCBs, and ideally, no flow should exist), such that one side of each PCB of the back-to-back TEC array PCB pair is substantially co-planar with either the "hot" surface or "cold" surface of the TEC devices [3.17] attached to it (the PCB pair may be primarily a mechanical and electrical support mechanism which may also serve a fluid separation role).

In a preferred embodiment, care should be taken to ensure that the "hot" side and "cold" side of the TEC array PCB (or pair of back-to-back TEC array PCBs acting as one) are in not in thermal communication except through the TEC devices [3.17] themselves (i.e., there must be no thermal "short circuit" between "hot" and "cold" surfaces, or else significant thermal losses may occur).

In a preferred embodiment, prior to inserting each TEC device [3.17] into a TEC array PCB for subsequent soldering, a bead of epoxy (preferably epoxy with a low coefficient of thermal expansion after curing, and preferably not thermally conductive, unless the TEC array PCB is plated in such a way as to enable surface area expansion without thermally short-circuiting the "hot" and "cold" sides, in which case thermally conductive epoxy may be preferred) may be drawn around the perimeter of the TEC device [3.17] in order to seal it, such that when the device is pressed into a TEC-device-sized opening in the TEC array PCB, a gas-tight seal between the TEC device [3.17] and the TEC array PCB may be formed and further maintained after the epoxy has cured. In some embodiments, a mechanical clip or other retention mechanism may additionally be used to temporarily secure TEC devices [3.17] to the TEC array PCB (e.g., during fabrication, such as before the epoxy has cured), or even to secure them permanently. However, note that, unlike the usual or conventional construction of TEC-device-based assemblies, a preferred embodiment may not use compression on the primary surfaces of the TEC devices for device retention or to create a thermal interface of low thermal resistance.

In a preferred embodiment, a combination of RUBE™ Metal Coating and RUBE™ Diamond Top-Coating materials and processing (described elsewhere) may be used to enhance heat transfer between the "hot" and "cold" surfaces of the TEC devices [3.17] and their respective working fluids.

Example Operating Parameters and Performance Values

A commercially available exemplary high-watt-density (HWD) TEC device has the following exemplary published parameters (see the table of FIG. 72) at the two different exemplary hot-side operating temperature points of 27° C. and 50° C. (however, the device has a maximum operating temperature of 130° C., and thus need not be constrained to between these two particular operating points).

In an example based on this exemplary TEC device, the manufacturer notes that for optimal operation (maximum COP), the maximum current would be 10% to 15% of the 13.9A $I_{MAX}$ specification (say, 12% of 13.9 A, or 1.7 A). Thus, operating at a current of 1.7 A and a voltage of 13.8 VDC, power dissipation would be about 23.5 watts. At a COP of 4.3, this yields 101 watts of cooling at a hot-side temperature of 27° C., with delta-T of around 10° C. In an example of a TEC array module [3.18], with say an 8×10 array of 80 such TEC devices [3.17] on each of two opposing TEC array PCB planes (with cold surfaces [3.13] facing each other), at a COP of 4.3 the 160 TEC devices [3.17] may collectively deliver more than 16 KW of cooling for a power input of about 3.75 KW. Given an example TSU [3.19] comprising 50 or more TEC array modules [3.18] with the same operating parameters, they may collectively deliver more than 800 KW (227.5 tons) of cooling for a power input of about 188 KW. Note that the example TSU [3.19] may require less space than a typical half-size filing cabinet.

In a preferred embodiment, RUBE™ LT2 fluid (comprising 1-methoxy-heptafluoropropane, or $C_3F_7OCH_3$) has a normal boiling point of 34° C. at STP. To operate isothermally (i.e., at the boiling point of the fluid) with a hot side at 27° C. (say, in order to use the published parameters of FIG. 72 as an example), the operating pressure of the RUBE™ LT2 working fluid may be reduced to 0.7 bar, or about 10 psi (70% of atmospheric pressure), thereby shifting its boiling point to 27° C., without accounting for the TEC wall superheat. If we assume a hot-side TEC wall temperature of 27° C. and a superheat of 3° C., the working fluid boiling point would need to be 24° C. which occurs at to 0.62 bar, or about 8.9 psi.

In an alternate embodiment, similar reduced-pressure 27° C. operating conditions may be established with an alternate candidate working fluid, such as RUBE™ LT2 fluid comprising a fluorinated ketone $CF_3CF_2C(O)CF(CF_3)_2$, except that an even lower operating pressure may be used (this particular alternative fluid has a boiling point of 49° C. at STP).

The current required to produce a high COP may be a very low percentage of the TEC rated maximum current (10% to 15% of $I_{MAX}$). In other words, the TEC devices [3.17] must pump the desired heat while "idling" at a low percentage of $I_{MAX}$ in order to achieve a high COP. For this exemplary TEC device, with $I_{MAX}$=13.9 A, the optimal current will be in the range 1.4 A to 2.1 A (corresponding to idling at 10% to 15% of $I_{MAX}$). To achieve the same total cooling power while idling as would be available while operating at 100% of $I_{MAX}$, many more TEC devices [3.17] may be needed, so redundancy may be built in. In a pinch, such as to compensate for one or more failing TEC devices [3.17], the surviving devices may operate at higher current and lower COP. In other words, the built-in redundancy allows the same work to be accomplished without changing the level of committed operational flows, but less efficiently from an electrical power efficiency viewpoint (or alternatively, to maintain the same COP, less work may need to be done, or the committed operational flows may need to be reduced).

3.5 RUBE—Phase-Change Fluid Degasser & Cryocooler

RUBE™ LT2 phase-change working fluids may be inert, dielectric fluids with boiling points in the same general range as the desirable operating ranges for many electronic devices to be cooled. Any of the RUBE™ LT2 working fluid candidates, and also others, may usable with the degassing and subcooling apparatus depicted in this section, although perhaps at somewhat different operating temperatures (e.g., their boiling and freezing points may differ). The example temperature ranges depicted in FIG. 73, FIG. 74, and FIG. 75 may be typical for a RUBE™ LT2 fluid such as 1-methoxy-heptafluoropropane ($C_3F_7OCH_3$), a hydrofluorinated ether (H FE).

Figure 73:
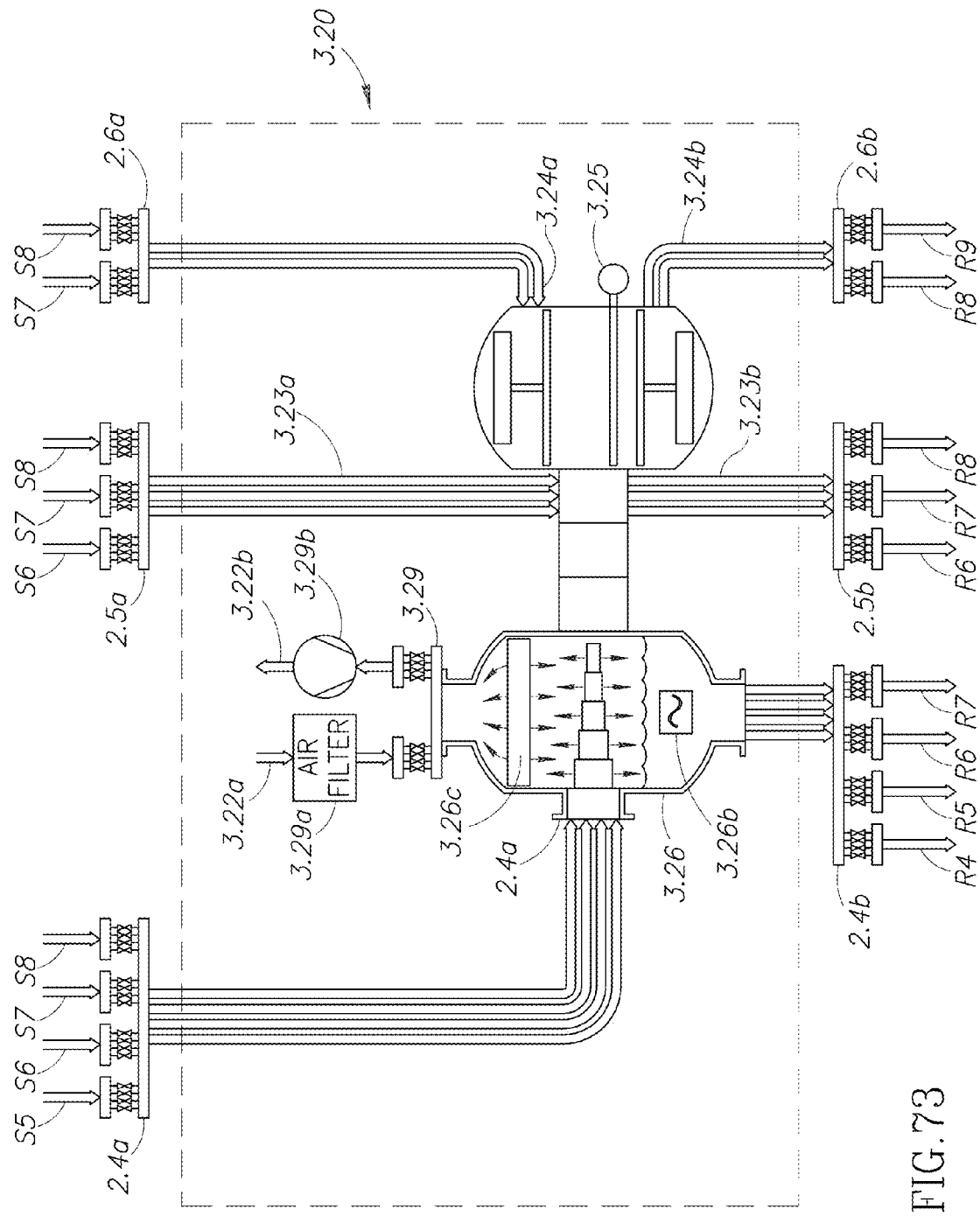
FIG. 73: RUBE™ Phase-Chase Working Fluid Degasser & Cryocooler—Basic Example
Figure 74:
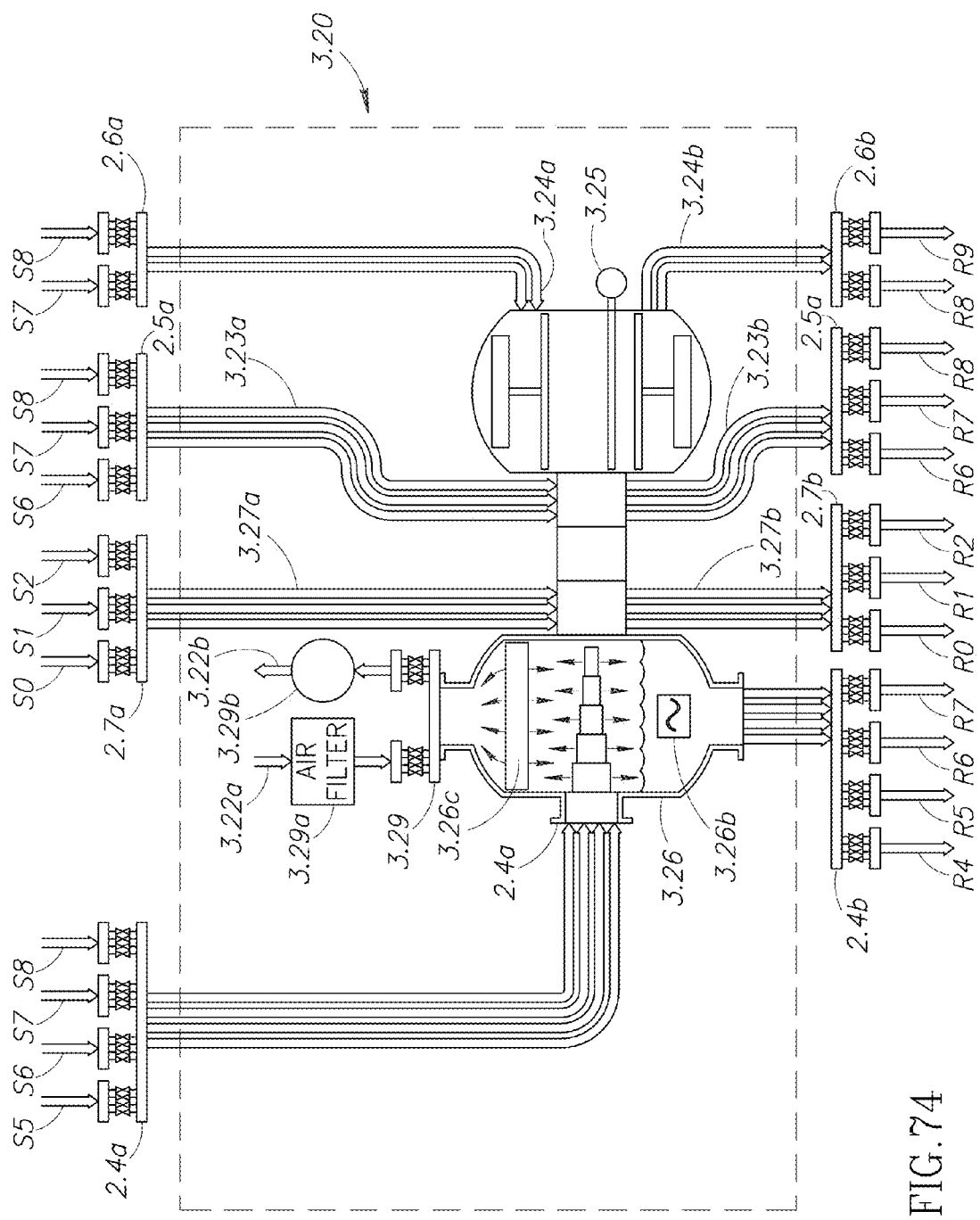
FIG. 74: RUBE™ Phase-Chase Working Fluid Degasser & Cryocooler—Advanced Example

In applications such as thermal management, working fluids such as RUBE™ LT2 fluids may benefit from being "degassed" to remove "noncondensables" prior to use, and also periodically, to the extent that noncondensable gases may be introduced into the fluids via the outgassing of various electronic devices and materials. The multipurpose degassing and cryocooling apparatus [3.20] depicted in the examples of FIG. 73, FIG. 74, and FIG. 75 may enable on-demand or continuous batch-oriented degassing of a primary working fluid, and also on-demand or continuous cryocooling or subcooling. In the examples of FIG. 74 and FIG. 75, an auxiliary working fluid (e.g., RUBE™ CF fluid, or LNG) may optionally aid with the cooling or receive cooling.

Continuous or Intermittent Subcooling or Quasi-Cryocooling

Cryocooling or subcooling may occur continuously or intermittently, even without performing the degassing operation, if needed (under system control, such as via the SLAM apparatus [1]). Within this document, "subcooling" refers to cooling at or below the boiling point of the working fluid, whereas "quasi-cryocooling" refers to cooling to much colder temperatures, approaching or extended below the freezing point of the working fluid, toward actual cryogenic temperatures. The actual cryogenic temperature range has been defined as 123K to down to 0K, or absolute zero (i.e., from −150° C. down to −273.15° C.), the temperature at which molecular motion ceases completely (in theory). In a preferred embodiment, quasi-cryocooling may be used to freeze a batch of otherwise volatile primary working fluid (e.g., RUBE™ LT2 fluid) so that noncondensable gases ("noncondensables") may be easily evacuated without loss of working fluid liquid or vapor.

Batch-Oriented Degassing via Freezing & Evacuation of Uncondensables

In a preferred embodiment, the degassing of RUBE™ LT2 working fluid (which may be considered the primary working fluid in the context of this section) may be accomplished as a batch operation that may take advantage of thermally excited single-phase or two-phase primary working fluid (a combination of vapor and liquid at the boiling point) introduced to an Evacuation & Freeze Chamber [3.26] via feed inlet [3.21a], and said fluid may be further excited via an optional ultrasonic transducer [3.26b], thereby causing agitation which may aid in the release of entrained noncondensables from the working fluid.

In a preferred embodiment, optional ultrasonic agitation may continue as primary fluid, which may be of decreasing temperature (relative to the chamber), may be introduced to the Evacuation & Freeze Chamber [3.26]. Primary fluid introduced at decreasing temperatures may have a chilling effect on any existing primary fluid in the chamber [3.26], which may cause some or all of any condensable vapor present therein to condense, which may induce a partial vacuum that may further help to draw out noncondensables. In a preferred embodiment, primary working fluid introduced to the chamber [3.26] (especially decreasing temperature fluid intended to have a chilling effect) may be sprayed into the chamber [3.26] by way of an inlet diffuser/sprayer (distributor) [3.26a], as depicted in the example of FIG. 73 (see inset at left).

In a preferred embodiment, an "active" (powered) cryocooler [3.25] may be in thermal communication with the Evacuation & Freeze Chamber [3.26], such that the temperature of chamber [3.26] and/or heat exchange surfaces embedded within may follow the temperature of cryocooler [3.25] (to within an acceptable approach temperature), and so that any working fluid contained within the chamber [3.26] and exposed to any of the aforementioned heat exchange surfaces embedded within may follow the temperature of said chamber [3.26] and aforementioned heat exchange surfaces to within an acceptable approach temperature.

In a preferred embodiment, the functionality and cooling capabilities of an active cryocooler [3.25] may be augmented or substituted statically or dynamically by auxiliary cryocooling means (which may be passive), such as through auxiliary cryogenic fluids flowing with ingress through auxiliary feed inlets [2.7a] in a manner so as to enable thermal communication with chamber [3.26] and/or heat exchange surfaces embedded within, and with egress via auxiliary feed outlets [2.7b], as depicted in the examples of FIG. 74 and FIG. 75). To the extent that the aforesaid auxiliary fluids are insufficiently cold to be considered cryogenic under a relevant definition, then subcooling, rather than cryocooling, of the primary working fluid may occur. Depending on the relative temperatures and flow rates of the primary and auxiliary working fluids, and also the cryocooling capacity of the underlying (unaugmented) active cryocooler [3.25], it may be possible for both primary and auxiliary working fluids to exit at colder temperatures than they entered. If auxiliary fluids which are relatively warmer than the primary working fluid are allowed ingress through the aforementioned auxiliary feed inlets [2.7a], so as to enable thermal communication with chamber [3.26] and/ or heat exchange surfaces embedded within, and with egress via auxiliary feed outlets [2.7b], then the auxiliary circuit so formed may be thought of as a "thawing tube" or "thawing tubes" (which will be referred to later).

In a preferred embodiment, the active cryocooler [3.25], as augmented or substituted by the aforementioned auxiliary means, may continue chilling the fluid in the Evacuation & Freeze Chamber [3.26] to lower temperatures than may be possible via the admission of the available cool or cold primary working fluids alone, until a threshold is reached (generally not close to the point of freezing). In a preferred embodiment, for degassing purposes, the working fluid may be chilled well below the boiling point (which will drop with reduced pressures) so as to induce maximal condensation of any working fluid vapor.

In a preferred embodiment, with upstream mixer valves [2.4a] closed or partly closed (so as to reduce the ingress of primary working fluid to chamber [3.26] to a flow rate that is zero, or to some rate less than that of the egress of said fluid), a portion of the liquid-phase primary working fluid may be pumped out of the chamber [3.26] through primary feed outlet(s) [3.21b] to splitter valves [2.4b] and to the STEER Thermal Bus return [2.2b], which may thereby further increase any partial vacuum in chamber [3.26] and may thus further aid in the drawing out of noncondensables from any liquid contained therein, even as the working fluid liquid may be further chilled (the partial vacuum will also reduce the boiling point, which may vaporize working fluid if not accounted for). In a further preferred embodiment, the vapor contained in chamber [3.26] may be dynamically sampled and analyzed at this point to determine, among other things, the types and levels of noncondensables. In a still further preferred embodiment, the results from sampling and analyzing noncondensables may serve to inform various control processes (e.g., within the SLAM apparatus [1]), so that frequency and duration of degassing processes, and related operating parameters, may be dynamically adjusted, which may enable, for example, power savings and efficiency improvements.

In a preferred embodiment, the one-way, filtered-air inlet [3.29a] may then be opened to allow the admission of air (or other clean and relatively low-cost gases whose freezing points are well below that of the primary working fluid) into the chamber, so as to relieve any vacuum or partial vacuum and enable the majority of the now-chilled fluid contained therein to be easily pumped out of the chamber [3.26] through primary feed outlet(s) [3.21b] to splitter valves [2.4b] and then to the STEER Thermal Bus return [2.2b] (where its exergy may be used immediately elsewhere, or transferred to a downstream reservoir of the appropriate temperature). In an alternate embodiment, a non-majority portion (or possibly none) of the fluid may be pumped out of the chamber [3.26], in order to increase the amount of primary working fluid that may be frozen and degassed during each batch (which may significantly lengthen the duration of each batch-freezing operation).

In a preferred embodiment, after the desired liquid level in chamber [3.26] has been established in accordance with the preceding paragraph, the headspace in chamber [3.26] may contain mostly noncondensable vapor (and possibly some amount of vapor-phase primary working fluid, but this is to be avoided). In a preferred embodiment, all vent valves [3.29] may be closed and the remaining working fluid liquid may be further chilled until completely frozen (e.g., at approximately −122° C. or somewhat below, for a preferred RUBE™ LT2 fluid). The vacuum pump [3.29b] may then be allowed to evacuate the chamber [3.26], thereby removing the air and noncondensables via vent [3.22b], while leaving any frozen working fluid intact. In a preferred embodiment, any frozen working fluid may occupy a relatively small percentage of the available volume in chamber [3.26], with most or all of the frozen fluid residing on high-surface-area heat exchange surfaces designed to accommodate thermal cycling at cryogenic temperatures, so as to avoid thermal and mechanical stresses somewhat akin to those which may occur with "frost heaving." In a preferred embodiment, the vacuum pump circuit may then be deactivated, completing the degassing of a batch of working fluid, although the fluid may remain frozen (and unpumpable) for a time.

In a preferred embodiment, the degassing of a batch of working fluid via freezing and evacuation of noncondensables may be followed by a period of subcooling or quasi-cryocooling wherein the frozen (or thawing) working fluid may be used as a cold source. In a preferred embodiment, subcooling or quasi-cryocooling may commence (without further degassing) by admitting relatively warmer RUBE™ LT2 fluid of the desired temperature from the STEER Thermal Bus supply [2.2a] through mixer valves [2.4a] and primary feed inlet [3.21a] so as to melt the frozen working fluid in chamber [3.26] while chilling the admitted fluid, with egress occurring through [3.21b] to splitter valves [2.5b] and STEER Thermal Bus return [2.2b]. The inlet and outlet flow rates may be controlled to achieve the desired fill level within the chamber [3.26]. The selected inlet temperature and net flow rates may determine the outlet temperature achievable for the available subcooling capacity.

In a preferred embodiment, wherein the frozen (or thawing) primary working fluid may be used as a cold source, the aforementioned auxiliary fluids, if insufficiently cold to be considered cryogenic under a relevant definition, may be sufficiently warm to use as a heat source (i.e., cold sink) for melting and warming the said frozen (or thawing) primary working fluid, by introducing the auxiliary fluids with ingress through auxiliary feed inlets [2.7a] in a manner so as to enable thermal communication with chamber [3.26] and/or heat exchange surfaces embedded within, and with egress via auxiliary feed outlets [2.7b], as depicted in the examples of FIG. 74 and FIG. 75).

In a preferred embodiment, a new degassing batch operation may be initiated at any time, and the period of subcooling or cryocooling may be continuous (e.g., even after the frozen work fluid has melted) or it may be terminated at any time.

Acoustic Stirling Cryocoolers as a Preferred Active Cryocooling Mechanism

Unlike traditional Stirling machines, acoustic Stirling cryocoolers [3.25](such as the units depicted as [3.25] in the examples of FIG. 73, FIG. 74, and FIG. 75, which may be commercially available from Qdrive.com) may have no mechanical parts operating in the cold region of the system, enabling the units to be oil-free and maintenance-free. Instead, there may be only an acoustic network of compressed helium that may act like an internal piston. Furthermore, there may be no cold moving parts, valves, or contact seals. Only the pistons of the resonant linear motors move, and only in balanced pairs to form an ambient-temperature Pressure-Wave Generator (PWG), which may provide the acoustic power source for a cryogenic cooling cycle (described in some detail at the cited Internet URL).

Subcooling, Cryocooling, and Degassing Processes—Possible Embodiments

The process descriptions in the following subsections may apply to the basic example embodiment of FIG. 73 generally, and to the more advanced example embodiment of FIG. 74 and FIG. 75 specifically:

Cooling and/or degassing of primary working fluid by cryocooler

Cooling and/or degassing of primary working fluid by auxiliary fluid

Cooling and/or degassing of primary working fluid by cryocooler and auxiliary fluid simultaneously Cooling of auxiliary working fluid by cryocooler Continuous or Intermittent Subcooling Operation of Primary Working Fluids During continuous or intermittent subcooling operation, it may be typical to subcool the working fluid to a few degrees or a few tens of degrees below its boiling point. This type of operation may achieve cooling that is very similar to that which may be achieved by a Thermoelectric Subcooler Unit (TSU) [3.19] as described in the text accompanying the example of FIG. 69. FIG. 70, and FIG. 71 (see section 3.4). Many factors affect the amount of subcooling possible for a given amount of power. One manufacturer of Stirling coolers and cryocoolers (corresponding to components labeled [3.25] in FIG. 73. FIG. 74, and FIG. 75) measured a coefficient of performance (COP) of 3, for a temperature differential between 0° C. and 30° C., which would also be a typical subcooling range for RUBE™ LT2 working fluid. A COP exceeding one means that more refrigeration power was yielded than electrical energy required as input, which is desirable (not unlike the operation of a heat pump used for cooling buildings and residences).

For subcooling operations, a COP of 3 is comparable to the COP of TSU [3.19] in the example of FIG. 69 and FIG. 70, which may have a COP in the range of 2 to 9. However, there may be a significant difference in their respective refrigeration capacities and achievable temperature ranges. The greater the temperature differential (i.e., "lift") that must be achieved, the lower the COP will likely be. Whereas the TSU [3.19] of FIG. 69 and FIG. 70 may have a refrigeration capacity (in $KW_T$ or refrigeration tons) which exceeds the refrigeration capacity of a RUBE™ Degasser & Cryocooler [3.20] by orders of magnitude, the latter may achieve a very low temperature—one that may be orders of magnitude lower than the former (see the next section on cryocooling operation).

To enable subcooling operation (i.e., at or below the boiling point of the working fluid at the current pressure), the vent valves [3.29] depicted in the examples of FIG. 73 and FIG. 74 may be initially closed after the system is charged, or may be closed after first evacuating chamber [3.26] of air and/or noncondensable gases, such as through the use of a vacuum pump [3.29b]. With the vent valves [3.29] closed, either or both cryocooler(s) [3.25] as depicted in the examples of FIG. 73 and FIG. 74 may be powered on, such that a cooling effect may be achieved, and working fluid may circulate by way of the STEER apparatus [2], such as from the STEER Thermal Bus supply [2.2a] through mixer valves [2.4a] to either or both of the feed inlets [3.21a] of Evacuation & Freeze Chambers [3.26], exiting at either or both of the chambers [3.26] at the corresponding outlets [3.21b] to splitter valves [2.5b] and on to STEER Thermal Bus return [2.2b].

In this mode of operation, working fluid passing through the Evacuation & Freeze Chambers [3.26] of powered-on cryocoolers [3.25] will be chilled by some amount on exit. The amount of refrigeration applied to the working fluid may be dynamically constrained by the maximum cooling capacity, the working fluid inlet temperature and flow rate, and the AC power delivered by the local control electronics [3.14] or [3.15] under the control of the SLAM apparatus [1] notionally depicted in FIG. 1. With all else being equal, the slower the working fluid flow rate, the colder the fluid may become (i.e., slower flows enable lower temperatures).

Note that two temperature plateaus may be encountered, namely, at the boiling point and freezing point of the working fluid. At the boiling point, energy (latent heat) may be removed from the working fluid without necessarily changing the temperature of the working fluid. Only after the latent heat has been removed will the temperature be able to drop below the boiling point, after which the temperature may continue to drop or hold steady at a new subcooled threshold, according to the rate at which sensible heat is removed. At the freezing point, another plateau is encountered during removal of the heat of fusion from the working fluid.

Continuous or Intermittent Cryocooling of Primary Working Fluids

Cryocooling on a continuous or intermittent basis is essentially identical to subcooling as described in the previous section, except that the relevant temperature range and thresholds are different, the flow rates generally may be significantly reduced, and the COP may be significantly lower (due to the potentially very large lifts needed to achieve cryogenic temperatures). For instance, the commercially available Q<small>DRIVE</small> Model 2S132K-FAR Acoustic Stirling cryocoolers [3.25] depicted in the example of FIG. 75 require a maximum of 600 watts each to achieve 22 watts of cooling at 77K (−196.15° C., a standard threshold of comparison), corresponding to a COP of about 0.037). The actual cryogenic temperature range has been defined as 123K to down to 0K, or absolute zero (i.e., from −150° C. down to −273.15° C.), the temperature at which molecular motion ceases completely (in theory). In the examples of FIG. 73 and FIG. 74, when RUBE™ LT2 is the selected working fluid (e.g., an HFE such as $C_3F_7OCH_3$), the freezing point is about 151K (−122° C.), which is not quite into the cryogenic range under the definition given here. Since the freezing point of RUBE™ LT2 fluid is about 74K (74° C.) warmer than the 77K threshold used for COP comparisons, it is clear that the COP will be significantly higher than 0.037. Based on an approximate heat of fusion for RUBE™ LT2, the cryocooler [3.25] of in the example of FIG. 75 may require about 60 watts to achieve 22 watts of cooling at 151K (−122° C.), which is a COP of 0.37 (i.e., 10× better than the COP at 77K). Quasi-cryogenic cooling, even at warm temperatures, will increase the COP further.

NOTE: Qdrive is now a part of Chart Industries, a global manufacturer of standard and custom engineered products and systems for a wide variety of cryogenic and heat transfer applications. Its development collaborators include Los Alamos National Laboratory, and the Applied Research Laboratory at Penn State University, both global leaders in thermoacoustics, as well as leading superconducting products companies, major international refrigeration manufacturers, NASA, DoE, DoD, and national laboratory and university researchers globally.

A COP less than one means that more energy is supplied as input to drive the refrigeration than is output as thermal refrigeration power by the process (the difference being lost as heat energy); thus there must be good reason to achieve the associated levels of cooling (and these reasons are many in the real world). Generally speaking, good reasons might include achieving one or more capabilities that would otherwise be out of reach. Specifically, in the context of computing infrastructure, this could include the ability to achieve otherwise unreachable levels of performance (e.g., via extreme overclocking) or reliability, or power savings elsewhere that more than compensate for the refrigeration losses due to a fractional COP, or any combination of the above.

In a preferred embodiment where a cryocooling subsystem such as [3.20] of FIG. 73, FIG. 74, or FIG. 75 may be interfaced to the STEER apparatus [2], a significant portion of the exergy normally counted as loss in the COP calculations may actually be recuperated by the RUBE™ apparatus [3]. In this regard, the electrical energy input, for example, may be considered as serving two purposes: 1) to refrigerate, and 2) to heat, and both purposes may be achieved efficiently. Thus, the traditional COP calculation may be misleading, because the system effectively may operate at much higher efficiencies than a simple COP calculation would indicate (not unlike a combined heat and power, or CHP, system).

To enable cryocooling operation (i.e., well below subcooling and approaching, but not reaching, the freezing point of the working fluid at the current pressure), the vent valves [3.29] depicted in the example of FIG. 73 may be initially closed after the system is charged, or may be closed after first evacuating chamber [3.26] of air and/or noncondensable gases, such as through the use of a vacuum pump [3.29b]. With the vent valves [3.29] closed, either or both cryocooler(s) [3.25] as depicted in the examples of FIG. 73 and FIG. 74 may be powered on, such that a cooling effect may be achieved, and working fluid may be circulate by way of the STEER apparatus [2], such as from the STEER Thermal Bus supply [2.2a] through mixer valves [2.4a] to either or both of the feed inlets [3.21a] of Evacuation & Freeze Chambers [3.26], exiting at either or both of the chambers [3.26] at the corresponding outlets [3.21b] to splitter valves [2.5b] and on to STEER Thermal Bus return [2.2b].

Batch-Oriented Degassing Operation with an Alternate Dual-Cryocooler Embodiment

In an alternate embodiment, at the beginning of a degassing operation, both cryocoolers [3.25] depicted in the example of FIG. 75 may be powered on, as during continuous or intermittent cryocooling operation such as described in the two sections previous (one of these two modes of operation may be viewed as a prerequisite for batch-oriented degassing). Hereafter, in this subsection, Evacuation & Freeze Chamber [3.26] #1 and #2 may be referred to as simply "Chamber 1" and "Chamber 2."

In a preferred embodiment, a dual-cryocooler configuration may be operated in a ping-pong fashion as described below, rather than as a pair of independently operating circuits. In this embodiment, local control valves and pumps (not depicted) may enable the cross-connection of pair of cryocoolers in a fashion that enables ping-ponged local operation. Specifically, the pair of cryocoolers may operate in complementary process steps so that working fluid from one cryocooler may be fed directly into the other to enable synergistic pre-cooling or other load-sharing functions. This may entail being able to connect the output of Chamber 1 to the input of Chamber 2, or to the auxiliary fluid inlet of Chamber 2, and vice-versa.

In a preferred embodiment, if any "thawing tubes" (as previously described) are present in Chamber 2 [3.26], and if they contain any working fluid with a freezing point at or above that of the primary working fluid, such tubes may be drained at the beginning of this process to prevent freezing of the fluid in a circuit that may be needed for thawing frozen primary working fluid.

Chamber 2's cryocooling may then be enabled (e.g., by operating the active cryocooler [3.25] associated with Chamber 2, or by circulating auxiliary cryogenic fluids as previously described, or some combination thereof), and Chamber 2 may stop exchanging primary working fluid with the STEER Thermal Bus supply [2a] and return [2b] (so there may be no Chamber 2 circulation at all), which may cause the fluid in Chamber 2 to freeze, at which point a vacuum pump may evacuate Chamber 2 of noncondensable gases.

A. After Chamber 2 is frozen and degassed, Chamber 1 (or Chamber 1 thawing loop, if present) may stop exchanging primary working fluid with the STEER Thermal Bus supply [2a] and return [2b], and may instead circulate fluid through Chamber 2 (or through Chamber 2's thawing loop, if present). Circulation of Chamber 1's fluid through Chamber 2 or Chamber 2's thawing loop continues as long Chamber 2 remains "significantly" colder than Chamber 1 (as determined by a threshold setting). This causes heating and/or thawing to occur in Chamber 2, and also causes pre-cooling to occur in Chamber 1. Note that the cryocoolers in both chambers may still be operating, which may slow down the temperature rise in Chamber 2 and accelerate the temperature drop in Chamber 1.

B. When Chamber 2 is no longer significantly colder than Chamber 1, Chamber 1 may drain its own thawing loop (if present) in preparation for freezing, and may also stop circulating its fluid through Chamber 2 or Chamber 2's thawing loop (so there is no Chamber 1 circulation at all), which may cause the primary working fluid in Chamber 1 to freeze, at which point a vacuum pump may evacuate (and thereby degas) Chamber 1.

C. At the same time that Chamber 1 stops circulating its fluid through Chamber 2 or Chamber 2's thawing loop, Chamber 2 may begin exchanging primary working fluid with the STEER Thermal Bus supply [2a] and return [2b], with its cryocooler still running. This may decrease the temperature of the fluid returned to the STEER Thermal Bus return [2.2b], and also increase the temperature in Chamber 2, as they try to approach equilibrium. Equilibrium will probably not be reached, however, because the Chamber 2 cryocooler is trying to refrigerate Chamber 2, and a variety of heating and cooling sources and sinks are operating on the STEER Thermal Bus [2.2]. This may continue until Chamber 1 is frozen and evacuated (degassed). The process then alternates to the opposite chamber, starting at (D).

D. After Chamber 1 is frozen and degassed, Chamber 2 may stop exchanging primary working fluid with the STEER Thermal Bus supply [2a] and return [2b], and may instead circulate fluid through Chamber 1 or Chamber 1's thawing loop. Circulation of Chamber 2's fluid through Chamber 1 or Chamber 1's thawing loop continues as long Chamber 1 remains significantly colder than Chamber 2. This may cause heating and/or thawing to occur in Chamber 1, and also may cause pre-cooling to occur in Chamber 2. Note that the cryocoolers in both chambers are still operating, which may slow down the temperature rise in Chamber 1 and accelerate the temperature drop in Chamber 2.

E. When Chamber 1 is no longer significantly colder than Chamber 2, Chamber 2 may drain its own thawing loop (if present) in preparation for freezing, and may also stop circulating its fluid through Chamber 1 or Chamber 1's thawing loop (so there is no Chamber 2 circulation at all), which may cause the primary working fluid in Chamber 2 to freeze, at which point a vacuum pump may evacuate (and thereby degas) Chamber 2.

F. At the same time that Chamber 2 stops circulating its fluid through Chamber 1 or Chamber 1's thawing loop, Chamber 1 may begin exchanging primary working fluid with the STEER Thermal Bus supply [2a] and return [2b], with its cryocooler still running. This may decrease the temperature of the fluid returned to the STEER Thermal Bus return [2.2b], and also increase the temperature in Chamber 1, as they try to approach equilibrium. Equilibrium will probably not be reached, however, because the Chamber 1 cryocooler is trying to refrigerate Chamber 1, and a variety of heating and cooling sources and sinks are operating on the STEER Thermal Bus [2.2]. This may continue until Chamber 2 is frozen and evacuated (degassed). The ping-ponged process then starts over at (A).

Continuous or Intermittent Cryocooling of Auxiliary Working Fluids

Cryocooling of auxiliary working fluids (e.g., "cryogenic fluids") on a continuous or intermittent basis may be simpler than primary working fluids, primarily due to the non-involvement of external vent [3.29a] and vacuum pump [3.29b] mechanisms as depicted in FIG. 74. In a preferred embodiment, cryocooling apparatus comprising acoustic Stirling cryocoolers [3.25] such as the examples of FIG. 74 and FIG. 75 may be used to reduce the temperature of the aforesaid auxiliary working fluids into a desired cryogenic range, or to shift cryogenic fluids to lower temperatures, such as the previously described RUBE™ CT fluid, whose useful operating temperature range may extend as low as −88° C., or RUBE™ CF, a cryogenic-temperature fuel such as LNG with a liquid-phase temperature range of −163° C. to −83° C.

In particular, the vapor pressure of RUBE™ CF (e.g., LNG) increases rapidly as it warms up, from near atmospheric pressure at a temperature of about −163° C. (i.e., just below its atmospheric boiling point of −161° C.), to more than 650 psia as it approaches its supercritical temperature of −83° C. For this reason, RUBE™ CF working fluid may be advantageously cooled via continuous or intermittent cryocooling to a temperature below −163° C. such as for spraying into the headspace over fluid stored in an insulated pressure vessel at or around −163° C., in order to condense and thereby reliquefy vaporous working fluid (i.e., "boil-off gas", or BOG) and thereby reduce both the temperature of the stored fluid and the pressure in the storage vessel. In this application the lift may be only a few degrees, so the COP may be relatively higher (the smaller the lift, the larger the COP).

In an alternative embodiment, apparatus such as that in the examples of FIG. 74 and FIG. 75 may be designed to accommodate much higher pressures, so as to enable small-scale liquefaction of gases such as NG, $CO_2$, $O_2$, Ar, and $N_2$, for example (these gases, in particular, may be useful in the context of FRAME, and may be locally utilized).

3.6 RUBE—Surface Coatings and Treatments

In the context of FRAME, RUBE™ surface coatings and treatments may be classified as either primarily thermal, with conventional heat exchange issues (and electrical properties notwithstanding), or thermochemical (which adds to the underlying thermal complexity by introducing adsorption issues). Since RUBE™ subsystems may be centered around the application of phase-change fluids at their boiling points, it seems prudent to understand and optimize the parameters that determine such things as boiling efficiency and efficient isothermal heat transfer. Surfaces that promote efficient boiling are paramount. Moreover, surfaces whose morphology enjoys an abundance of cavities that promote nucleate boiling are of principal interest from a technological point of view, regardless of whether such morphologies are natural or artificial.

The theory of nucleate boiling (the most efficient form of boiling) has been well developed and is well understood in the art. The parameters of importance in promoting vapor-phase nucleation in a nucleate boiling surface-working fluid system include the specific heat of the working fluid, the specific heat of the surface material, the heat transfer coefficient, the latent heat of vaporization, the thermal conductivity of the working fluid and the heating surfaces, the geometry and abundance of nucleation sites, the temperatures of the working fluid (liquid and vapor) and surface, the working fluid viscosity, the surface tension, and the densities of the working fluid in its liquid and vapor phases.

The nucleate boiling phenomenon involves two separate operations. The first of these is the nucleation of the vapor phase within the liquid while the second is the subsequent growth of the vapor phase to form bubbles within the liquid. It has been postulated that improved efficiency of heat transfer can be attained when the nucleation process does not have to be continuously redone. This nucleation process requires a large amount of superheating, which partly accounts for its efficiency. Improved efficiency can be observed if the thermal energy is transferred from the surface to the working fluid by the growth of pre-existing vapor phase nuclei. This approach has resulted in the specification of reentrant cavities as highly effective nucleate boiling sites.

The parameters that affect efficient thermochemical adsorption are also greatly affected by thermal issues, not the least of which is that, since adsorption is an exothermic reaction that is temperature-limited, the failure to efficiently remove heat may prevent or terminate the very reaction sought, and the reverse is true for desorption. Because most sorbents are relatively poor thermal conductors, it may be optimally advantageous to restrict sorbents to very thin layers having minimal thermal resistance, but high surface area, if maximal adsorption rates are to be obtained. However, having very thin sorbent layers, while good for heat transfer, may place a severe constraint on adsorption capacity. The solution to these apparent difficulties lies in the manufacture of sorbent coatings comprising appropriate constituents, and the integration of said sorbent coatings with efficient thermal coatings to enable the manufacture of an effective, efficient heat exchanger having sorbent surfaces. The fact that efficient nucleate boiling surfaces serendipitously also have very high surface areas is key to making thin, highly efficient sorbent surfaces that also enjoy high capacity.

The remainder of this section deals with these thermal and thermochemical surface coatings and treatments in terms of specific application areas having specialized requirements.

RUBE™ Coatings for Electronics Cooling Loads

For many electronics cooling loads (e.g., semiconductor-based components), the primary consideration for functionality and reliability is the junction temperature, which must be kept within component-specific temperature limits. In general, junction temperatures greater than those specified for reliability (e.g., stress ratings) may cause permanent damage, and device functional operation at or above such conditions is not implied. Exposure to absolute maximum rating conditions may affect component reliability.

Junction temperatures specified for functionality are those below which applications embedding the subject components should be designed to operate (functionality to specifications is not guaranteed at or above these temperatures).

Figure 76:
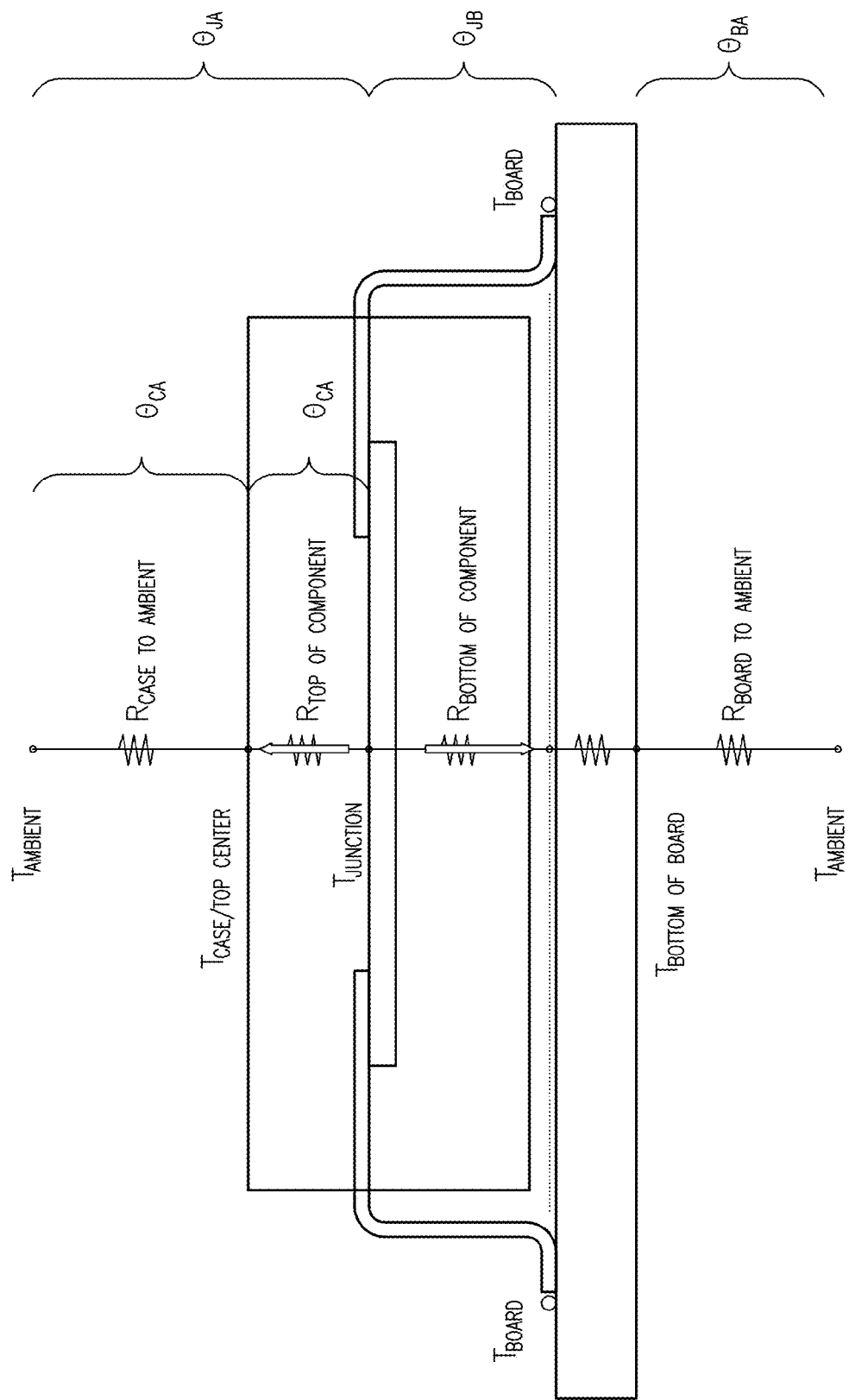
FIG. 76: Depiction of Thermal Resistance Parameters as Defined by JEDEC

Although the junction temperature may be rather difficult to measure without special test equipment and test die, it may be estimated by measuring the case temperature or board temperature, and using that measurement in conjunction with the junction-to-case or junction-to-board thermal resistance ($\theta_{JC}$ or $\theta_{JB}$, respectively) and estimated power. FIG. 76 depicts various JEDEC-defined thermal resistance parameters that may be relevant to such calculations. A key identifying the parameters is provided below:

| PARAMETER | DESCRIPTION |
|---|---|
| $T_J$ | Junction temperature ($T_{JUNCTION}$) |
| $T_B$ | Board temperature |
| $T_C$ | Case temperature ($T_{CASE}$) |
| $P_B$ | Power through board (20%-95% of total) |
| $P_C$ | Power through case (5%-80% of total) |
| $\theta_{BA}$ | Thermal resistance from board to ambient |
| $\theta_{CA}$ | Thermal resistance from case to ambient |
| $\theta_{JA}$ | Thermal resistance from junction to ambient |
| $\theta_{JB}$ | Thermal resistance from junction to board |
| $\theta_{JC}$ | Thermal resistance from junction to case |

Either of two simplified formulas may be used to estimate the junction temperature, depending on whether the total power dissipated by a component ($P_{TOTAL}$) is mostly toward its case (i.e., the top of the component) or toward the substrate to which it may be attached (e.g., a printed circuit board, or PCB), as follows:

Power dissipated primarily toward case: $T_J = T_C + (P_C \times \theta_{JC})$

Power dissipated primarily toward board: $T_J = T_B + (P_B \times \theta_{JB})$

If the relative dissipation of the total power is known for each direction (e.g., what percentage goes toward the case vs. toward the board), then both equations may be used with the appropriate weighting.

$P_B$, or power dissipated through the board, may be 20% to 95% of $P_{TOTAL}$. $P_C$, or power dissipated through the case, may be 5% to 80% of $P_{TOTAL}$. For example, in a system with no moving air, no heat sinks, and a 4-layer PCB, 95% of the power may be dissipated into the PCB, with only 5% dissipated through the case to ambient. With the same conditions, but a 2-layer board, 85% of the power may be dissipated into the PCB, with only 15% dissipated through the case to ambient. At the other end of the spectrum, with a large heat sink applied to the component's case, only 20% of the may be dissipated into the PCB, with 80% dissipated through the case to the large heat sink, and then to ambient. In each case, the power is dissipated toward the path of least thermal resistance, and those paths may vary dynamically.

When components dissipate power toward a PCB or heat sink, the heat must then be removed from the PCB or heat sink, or else thermal saturation will occur. As thermal saturation occurs, the effective thermal resistance increases and the PCB or heat sink is less able to dissipate power from component(s). In air-cooled systems, high-velocity air may be required to cool the component cases, heat sinks, and the PCB itself.

It is an object of certain versions of the present invention to eliminate or minimize the need for heat sinks, and especially large sinks, on electronic components, while maximizing the power dissipation capacity. As noted earlier (see Table: "Selected Example Subset of RUBE™ Candidate Working Fluids" and associated text), due to its Latent Heat of Vaporization, RUBE™ LT2 fluid at 34° C., is 150,000× more efficient at cooling than 0° C. dry air. In a preferred embodiment, RUBE™ LT2 fluid may be used to acquire exergy in the form heat energy directly from various heat-emitting surfaces, such as electronics cooling loads (e.g., components, heat sinks, and PCBs, etc.). In order to maximize the heat transferred to RUBE™ LT2 fluid per unit time, especially in the case of high-heat-flux components, a preferred embodiment increases the nucleate boiling site density and heat dissipation surface area, and minimizes the incipience wall superheat, through the use of one or more boiling enhancement coatings, such as RUBE™ Diamond Top-Coating, RUBE™ Solder-Mask, RUBE™ Metal Coating, or RUBE™ Diamond Coating.

Ebullient heat transfer is a method of dissipating high amounts of thermal energy into a working fluid at its saturation temperature, or boiling point, such that the working fluid may appear bubbly and self-agitating as it boils. Efficient heat transfer requires a nucleate boiling regime, and specifically, the prevention of film boiling (whereby a film of vapor forms that insulates the substrate to be cooled from the working fluid intended to cool it, which may cause the temperature of the substrate to increase dramatically and become significantly superheated).

In a preferred embodiment intended to maximize nucleate boiling heat transfer performance of a surface, and especially those involving electronic components, one or more surface coatings may be applied to help optimize three key parameters that should be considered.

1. The first parameter is the wall superheat required to initiate boiling. The surface must reach the incipient wall superheat condition to initiate the nucleation process, but the temperature at which this occurs must be minimized. The incipient wall superheat is inversely proportional to the volume of vapor/gas entrapped in a surface irregularity, so this means that any coating that may be applied must significantly improve the ability to entrap vapor/gas over that of an uncoated surface.

2. The second performance parameter to be considered is the heat transfer coefficient in the nucleate boiling regime. Increasing the boiling heat transfer coefficient from the surface leads to lower surface temperatures. More heat is removed as the nucleation site density of the surface increases, so this means that any coating that may be applied must significantly increase the nucleation site density over that of an uncoated surface.

3. The third boiling performance parameter to be considered is the Critical Heat Flux (CHF) which is the highest heat flux that can be removed without exposing the surface to film boiling. While the ability to sustain high CHF is desirable in that it provides headroom for operation under extreme conditions, such conditions may cause a significant increase in operating temperature, which may cause various electronic components to dissipate even more power than they would otherwise (strictly due to the temperature increase). Thus, it is an object of the invention to operate at flux levels well below the CHF, and this may be simplified by applying coatings that enable a high CHF.

RUBE™ Diamond Top-Coating

Objects of this invention include minimizing wall superheat (i.e., of a substrate), prevention of film boiling (because vapor film serves as an unwanted insulator), and minimizing the effective thermal resistance between a substrate and the selected working fluid with which it may be in direct contact (see $R_{CASE}$ and $R_{BOARD}$ in FIG. 76, and also FIG. 74), which implies minimizing the effective post-application thermal resistance of the RUBE™ Diamond Top-Coating itself.

In a preferred embodiment, heat-emitting surfaces (especially those in proximity of electronics or electrical flows) that may be immersed in, or in direct contact with, RUBE™ LT2 two-phase fluids may be coated with a with RUBE™ Diamond Top-Coating, which may be highly thermally conductive but electrically non-conductive (i.e., dielectric), and may significantly increase nucleation sites (which may entrap vapor and thereby promote nucleate boiling), increase heat exchange surface area, and reduce thermal resistance.

Regardless of the methods used for manufacturing and application (to be discussed shortly), the resulting diamond-based RUBE™ Diamond Top-Coating must be electrically non-conductive but highly thermally conductive, with significantly enhanced nucleation sites appropriate for the selected working fluid (e.g., RUBE™ LT2).

A useful aspect of top-coating may be its application to a partially or fully populated PCB or other substrate. Thus, the application of top-coating may occur en masse (e.g., on partially or fully populated PCBs) rather than on a piecemeal basis, thereby reducing manufacturing costs.

In a preferred embodiment, RUBE™ Diamond Top-Coating may be selectively applied to "thermal hotspots" such as individual high-heat-flux (or potentially high-heat-flux) electronic devices, and this may be especially beneficial in a system having direct immersion cooling (thereby obviating the need for attached heat exchangers and the requisite thermal interface material, e.g., thermal grease, typically used to aid the heat transfer between said devices and heat exchangers). More preferably, RUBE™ Diamond Top-Coating may be applied, like a quasi-conformal top-coating, to an entire fully populated printed circuit board (PCB), with only external connectors masked (devices or subassemblies with dedicated connectors may be coated separately, or left uncoated, and then plugged in later after the connector masking is removed), so that all potential heat sources/sinks (e.g., electronic devices, including integrated heat spreaders, if any), along with their leads, edges, and exposed PCB traces, may be in thermal contact with the RUBE™ Top-Coating material, which may then provide an enhanced thermal interface to the coolant with which it may subsequently be in direct contact. Unlike some conformal coatings, however, it generally may not be optimally advantageous to fully encapsulate the coated object or fill every gap, because the primary goal may be to dramatically increase the number of nucleation (boiling incipience) sites while minimizing the thermal resistance of doing so, and thus the aforementioned top-coating may be considered a minimal-thickness "boiling enhancement" top-coating.

Minimizing the thickness of the RUBE™ Diamond Top-Coating may directly minimize its thermal resistance while still improving boiling incipience (due to the embedded diamond powder), which are the primary goals, while also secondarily reducing materials cost and even the weight of the finished PCBs. One very desirable effect of this may be to simultaneously increase the overall heat transfer area and reduce the thermal resistance to an extent not possible with directly attached heat sinks (thereby eliminating the need for them, along with the thermal interface material typically associated with attaching them), while also reducing the thermal saturation of the PCB itself.

Additionally, there are three primary preferred embodiments of RUBE™ Diamond Top-Coating and numerous variations of each, and these embodiments and their variations may be applied sequentially, in any order, in any combination, so as to obtain specific characteristics as desired. The three primary embodiments, all diamond-based, are listed below in order of increasing thermal resistance, and described in subsequent subsections:

RUBE™ Diamond Vapor Top-Coating Manufactured and Applied via Chemical Vapor Transport (CVT)

Figure 77:
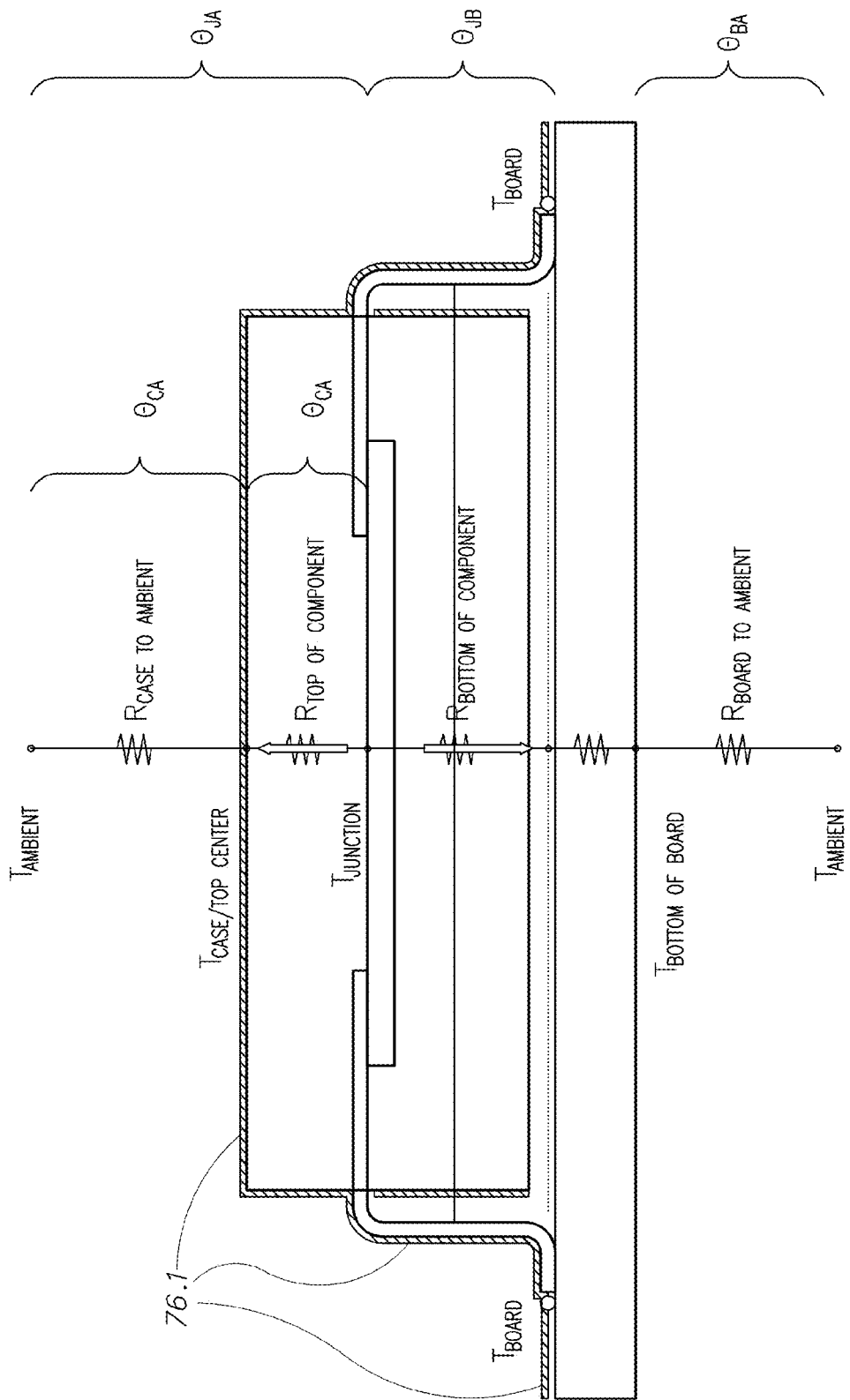
FIG. 77: Depiction of RUBE™ Diamond Top-Coating—Example
Figure 78:
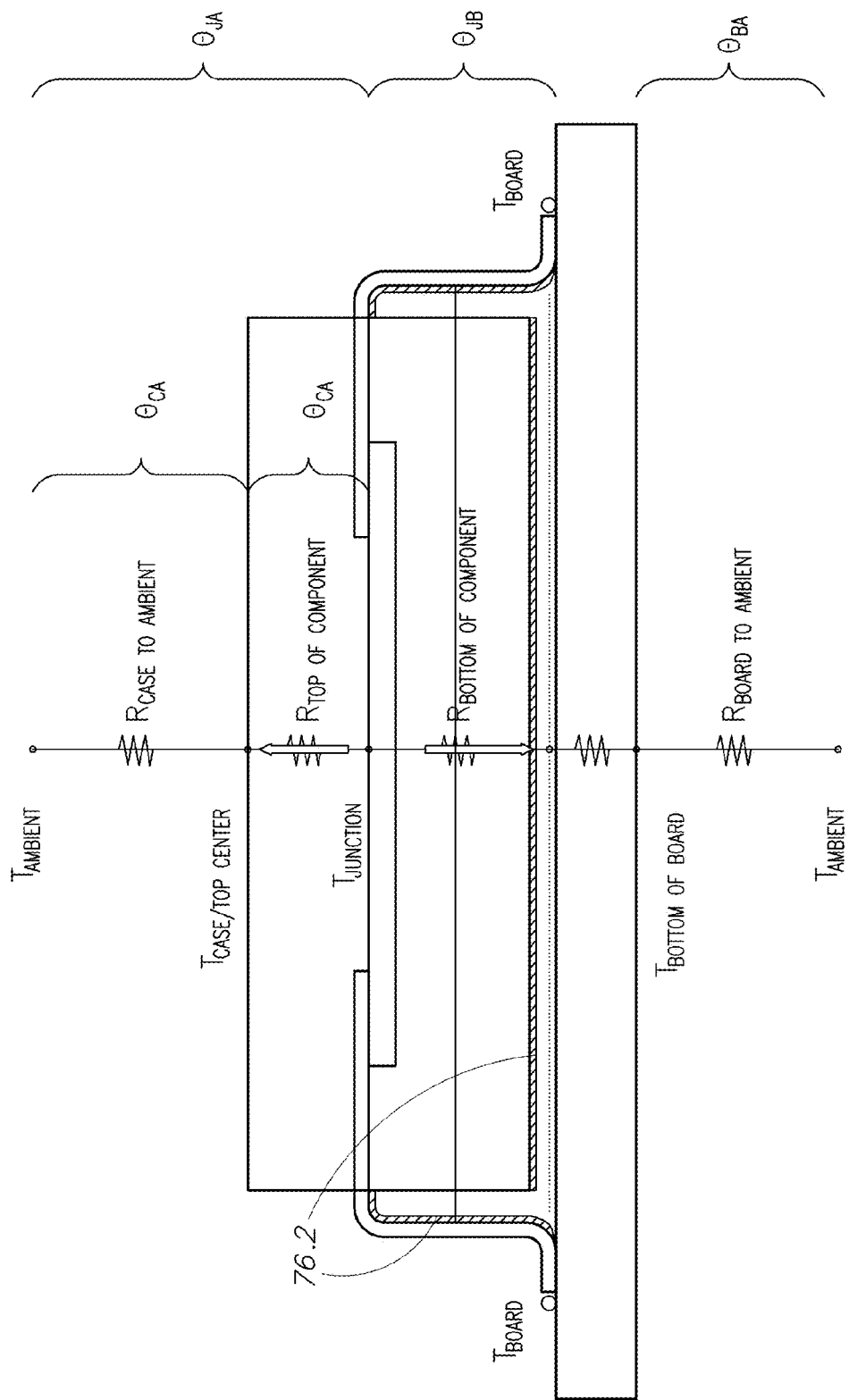
FIG. 78: Depiction of RUBE™ Diamond Vapor Top-Coating—Example
Figure 79:
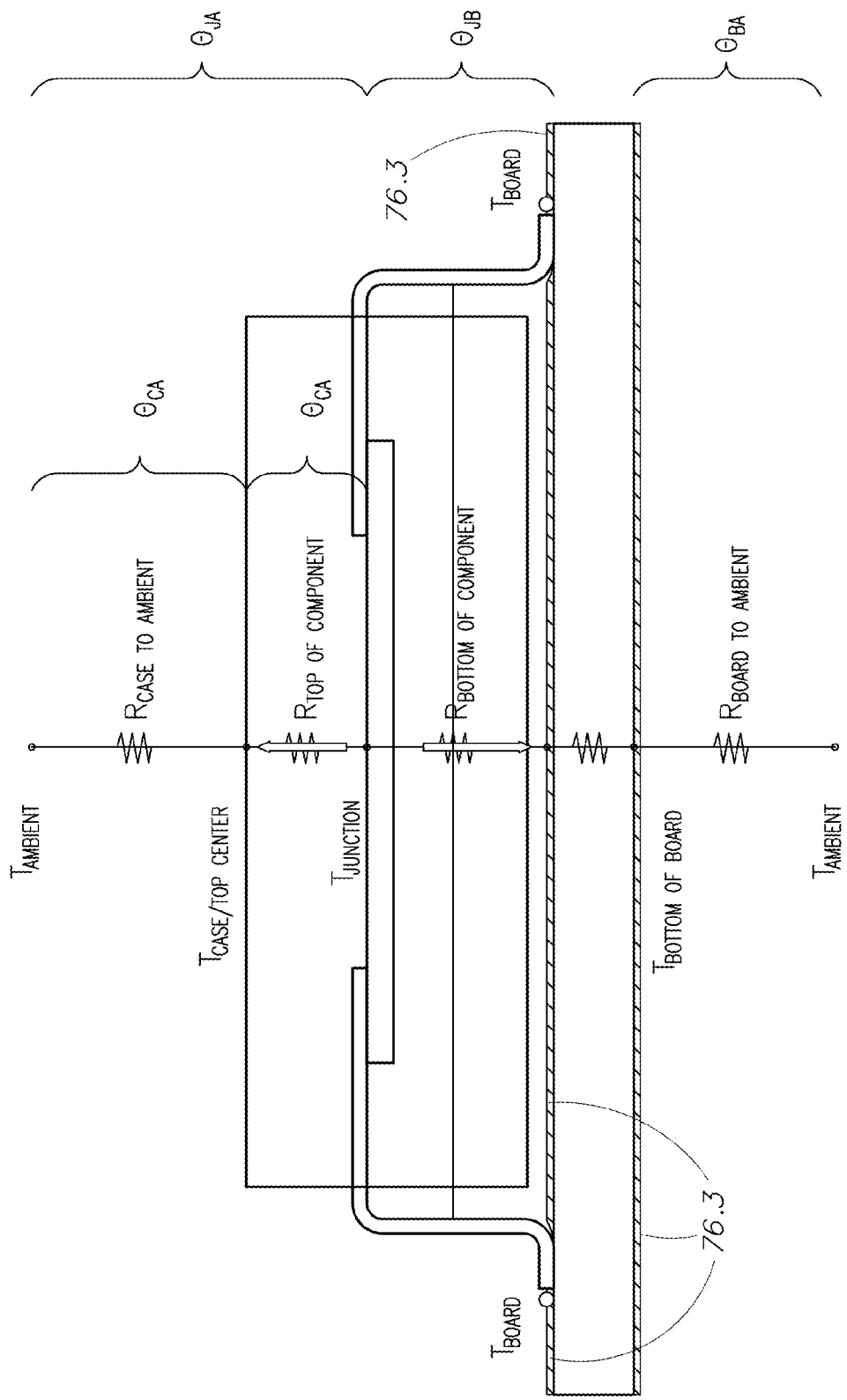
FIG. 79: Depiction of RUBE™ Solder-Mask—Example FIG. 80A to FIG. 80I (series): Notional Example of RUBE™ Diamond Top-Coating Quasi-Photolithographic Thought Experiment

RUBE™ Diamond Photolithographic Top-Coating Manufactured and Applied via Photolithography RUBE™ Diamond Top-Coating Paint Manufactured as a Paint and Applied Separately FIG. 77, FIG. 78, and FIG. 79, which start from FIG. 76, depict post-application RUBE™ Diamond Top-Coating on a component and underlying substrate such as a PCB. The shading [76.1] of FIG. 77 represents any of the three embodiments above). The shading [76.2] in FIG. 78 depicts a CVT-based RUBE™ Diamond Vapor Top-Coating, which is a particular embodiment described in the next section, and which may be applied to surfaces that may be inaccessible to the other embodiments. As depicted by shading [76.3] in FIG. 79, any embodiment of RUBE™ Diamond Top-Coating may also be applied over a RUBE™ Diamond Solder Mask layer, to be discussed later.

RUBE™ Diamond Vapor Top-Coating Manufactured & Applied via Chemical Vapor Transport (CVT)

In a preferred embodiment, a tightly adhering diamond-based RUBE™ Diamond Vapor Top-Coating may be manufactured with a desired morphology (e.g., continuous film, isolated facets, etc.) directly onto a substrate comprising the electronic components to be coated (for example, a fully populated PCB), without the use of glues, solvents, or filler materials, thereby combining the steps of manufacturing and applying a conformal coating. In this embodiment, the RUBE™ Diamond Vapor Top-Coating which results may be virtually pure carbon comprising high-quality diamond (verifiable by Raman spectroscopy to have a sharp peak at about 1332 $cm^{-1}$).

In a preferred embodiment, RUBE™ Diamond Vapor Top-Coating, prior to application, may comprise diamond manufactured at low temperature (about 125° C.) and low pressure (about 0.1 atmosphere) utilizing chemical vapor transport (CVT) which may be generated and applied substantially as described in U.S. Pat. No. 7,118,782B2 (2006), except that the carbon vapor may be applied directly onto a substrate comprising the electronic components to be coated. In a further departure from U.S. Pat. No. 7,118,782B2, the substrate (for example, a fully populated PCB), prior to the application of carbon vapor, may be prepared by rinsing with RUBE™ LT2 fluid (which may serve as a solvent) and drying.

In a preferred embodiment, in order to increase the diamond nucleation density (i.e., the number of diamond particles manufactured per unit area on the substrate) prior to generation and transport of the RUBE™ Diamond Vapor Top-Coating vapor, in accordance with U.S. Pat. No. 7,118,782B2, the substrate may be optionally scratched with diamond powder by sonicating it in an ultrasonic bath comprising a suspension of diamond powder. In a preferred embodiment, the diamond powder may be very fine natural or synthetic diamond powder in a PSD preferably comprising irregular shapes in statistical size ranges such as 6 to 12 microns or more preferably 15 to 25 microns (for example, LS6PGT metal bond monocrystalline diamond powder, which may be commercially available from LANDS Superabrasives. New York City, N.Y.), and may be suspended in RUBE™ LT2 fluid for sonication, and more preferably, in a further departure from U.S. Pat. No. 7,118,782B2, the solvent rinse steps and sonication steps may be combined. In still another preferred embodiment, the CVT-based RUBE™ Diamond Top-Coating may be applied as an intermediate or finish coat over any RUBE™ coating described in subsequent sections, except those directly implementing sorbent layers.

A significant advantage of CVT-based RUBE™ Diamond Vapor Top-Coating, over other methods of manufacturing and applying RUBE™ Diamond Top-Coating, is that the carbon vapor may enable deposition of diamond on surfaces that may be inaccessible to other methods of application. FIG. 74 depicts an example where CVT-based RUBE™ Diamond Vapor Top-Coating may coat the underside of an electronic component's case (depicted with red dots), as well as the inside surfaces of its electrical leads, both of which normally dissipate power directly and/or transmit it to the PCB substrate. By coating surfaces that may otherwise be unexposed and therefore potentially uncoated, the CVT-based RUBE™ Diamond Vapor Top-Coating may significantly improve the component's nucleation site density and heat transfer area, and thereby reduce its potential wall superheat during subsequent operation.

RUBE™ Diamond Photolithographic Top-Coating Manufactured & Applied via Photolithography In another preferred embodiment, a tightly adhering diamond-based RUBE™ Diamond Photolithographic Top-Coating may be manufactured with a desired morphology (e.g., roughness, pits, isolated facets, etc.) directly onto a substrate comprising the electronic components to be coated (for example, a fully populated PCB) through an optionally iterative quasi-photolithographic process, thereby combining the steps of manufacturing and applying a quasi-conformal coating. For an informal, notional description of key aspects of the process, refer to the sidebar, "RUBE™ Diamond Photolithographic Top-Coating—THOUGHT EXPERIMENT" and the associated FIG. 80 series (i.e., FIG. 80A to FIG. 80I).

Conventional photolithography (or "optical lithography") is a process used in microfabrication to selectively remove parts of a thin film or the bulk of a substrate, and is comparable to a high precision version of the method used to make printed circuit boards. Photolithography uses light to transfer a geometric pattern from a photomask to a light-sensitive chemical "photoresist" on the substrate, after which a series of chemical treatments then either engraves the exposure pattern into (or enables deposition of a new material in the desired pattern upon) the material underneath the photo resist. For example, complex integrated circuits may iterate through dozens of photolithographic cycles. Photolithography may create extremely small patterns (down to a few tens of nanometers in size), while affording exact control over the shape and size of the objects it creates, and cost-effectively creating patterns over an entire surface. The main disadvantages of conventional photolithography are that it requires a flat substrate to start with, it is not very effective at creating shapes that are not flat, and it can require extremely clean operating conditions.

Whereas conventional photolithographic processes may be concerned with improving the consistency and accuracy of the reproduction of the fine details of a positive or negative optical "mask" pattern (e.g., artwork) onto a substrate, the photolithographic process of certain versions of the present invention may be primarily concerned with superimposing a thin, three-dimensional thermally conductive (but electrically non-conductive) matrix having reentrant cavities (whose composition is maximally diamond and minimally photoresist, with several optimally advantageous properties) onto a "substrate" which may typically comprise a fully or partially populated PCB having its own complex three-dimensional topology. The photolithographic process of certain versions of the present invention does not suffer from the aforementioned disadvantages of conventional photolithography.

In an embodiment based on photolithography, RUBE™ Diamond Photolithographic Top-Coating may comprise a positive photoresist (e.g., a positive-tone photodefinable polyimide such as DNQ-Novolac, which may have a dielectric constant of about 3) prior to application, which may, during or after application, further comprise thermally conductive but electrically non-conductive cavity-generating particles (preferably diamond powder), along with solvent and other additives well known in the art.

The post-application thermal resistance of the RUBE™ Diamond Photolithographic Top-Coating may be minimized by: 1) maximizing the thermal conductivity of its post-application constituents, such as diamond powder and intentionally surviving photoresist (polyimides may exhibit exceptional thermal and mechanical properties, including a relatively low CTE and relatively high glass transition temperature, $T_G$, partly because of their high molecular weight and aromatic structure); 2) minimizing the overall thickness of the coating as applied, and particularly, by minimizing the percentage of photoresist that may remain after a given development step, so that only "essential" (i.e., intentionally surviving) photoresist remains for the purpose of binding the diamond particles to the substrate or to each other; and 3) maximizing the number of reentrant cavities and nucleation sites, such as by utilizing some combination of multiple process iterations with varying photoresist density, layer thicknesses, and irregular particle sizes and shapes, and preferably, particles with relatively higher surface roughness and surface-area-to-mass ratio ($m^2$/kg) than may be commonly contemplated.

Figure 80A:
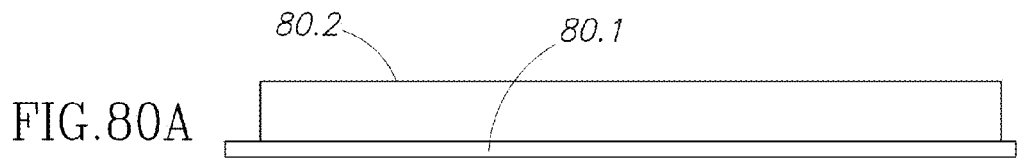
FIG. 80A: Envision covering a floor with a thin layer of adhesive
Figure 80B:
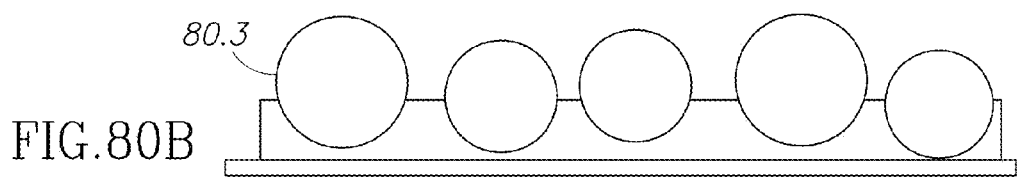
FIG. 80B: Cover adhesive with various sizes of beach balls, leaving space between them
Figure 80C:
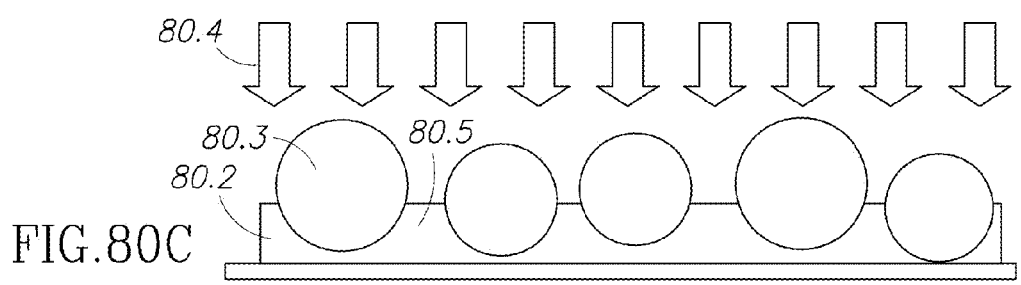
FIG. 80C: Expose excess adhesive to "magic" light to enable washing it away
Figure 80D:
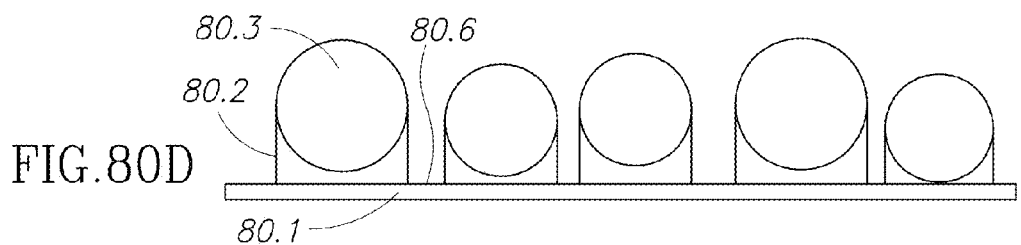
FIG. 80D: Wash away excess (unshadowed) adhesive

RUBE™ Diamond Photolithographic Top-Coating—THOUGHT EXPERIMENT:

To conceptualize the idea behind this iterative process before it is described in more technical terms, one may envision covering a floor [80.1] with a thin layer of adhesive [80.2] as depicted in FIG. 80A, then covering it with various sizes of beach balls [80.3] as depicted in FIG. 80B, to an areal density of perhaps no more than 75% so that, on average there is a fair amount of space between the beach balls. Any adhesive [80.5] that is not underneath (and therefore shadowed by) a beach ball (adhering it to the floor) may then be removed by a process involving exposing the excess adhesive to a "magic" light [80.4] as depicted in FIG. 80C, that allows it to be washed away easily, as depicted in FIG. 80D [80.6].

NOTE: The "magic" light [80.4] is depicted in FIG. 80C and FIG. 80G as vertically oriented and coming from above. Although it may be quite intense, it is typically not laser light, so it may be somewhat diffuse and may strike surfaces from angles other than perpendicular to the horizontal plane.

Figure 80E:
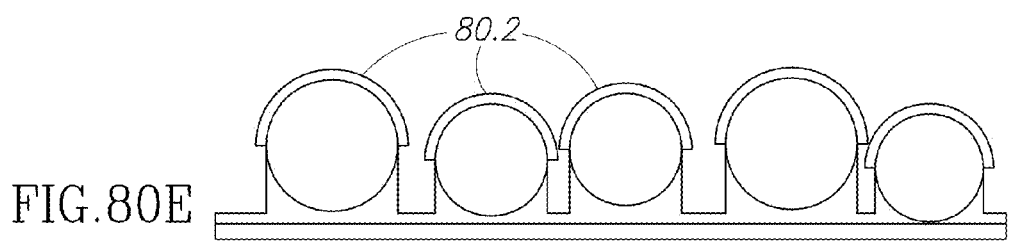
FIG. 80E: Cover beach balls and exposed floor with another thin adhesive layer
Figure 80F:
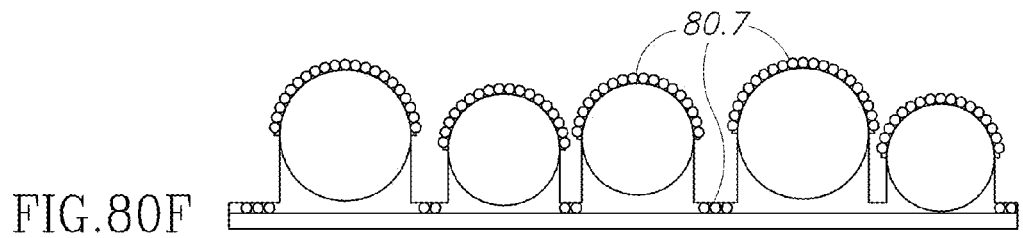
FIG. 80F: Cover adhesive with various sizes of relatively smaller balls
Figure 80G:
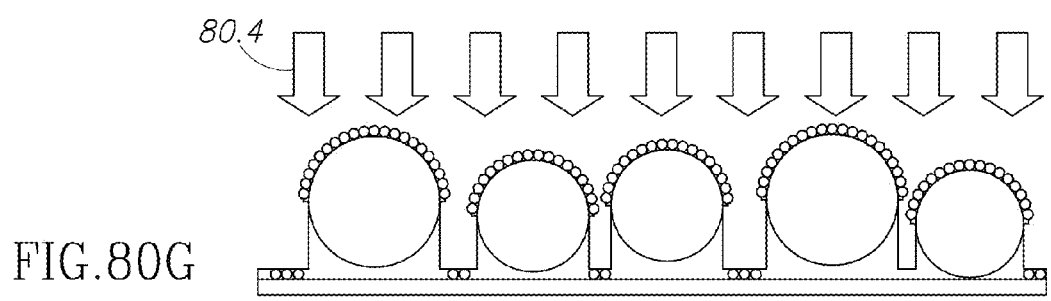
FIG. 80G: Expose excess adhesive to "magic" light to enable washing it away
Figure 80H:
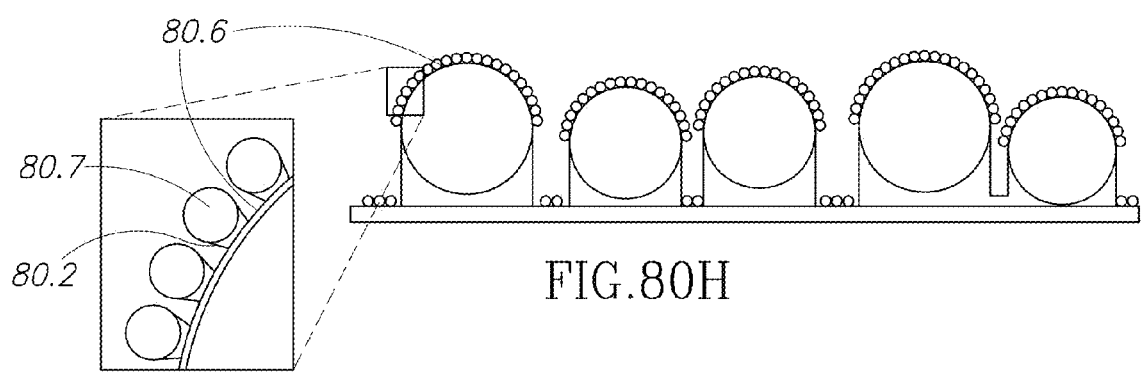
FIG. 80H: Wash away excess (unshadowed) adhesive

In a second iteration, adhesive [80.2] may be applied again as depicted in FIG. 80E, such that a thin layer may cover the beach balls [80.3] and any visible floor areas [80.1] between the beach balls. This time, however, relatively smaller balls [80.7] such as ping-pong balls and gumballs may be applied instead of beach balls [80.3], as depicted in FIG. 80F, and they may stick to both the beach balls [80.3] and any visible floor areas [80.1] between the beach balls. With the ping-pong and gumballs [80.7] in place, any excess adhesive that is not shadowed by some kind of ball (i.e., adhering it to the floor or another ball) may then removed by exposing it to the "magic" light [80.4] again as depicted in FIG. 80G, and washing it away, as depicted in FIG. 80H [80.6].

In a third iteration, adhesive [80.2] may be applied yet again, such that a thin layer may cover the exposed surfaces of the various balls applied so far, as well as any still-visible floor areas [80.1] between the various balls. In this third iteration, however, relatively intermediate-sized balls [80.8] may be applied, such as soccer balls and basketballs, so that they adhere to the other balls [80.3] [80.7]. Note that these intermediate-sized balls [80.8] may snuggle in somewhat between and atop the underlying beach balls [80.3], but may not actually touch any beach balls [80.3], due to the intervening ping-pong balls and gumballs [80.7], which may behave like stand-offs. Now, with the various balls [80.3] [80.7] [80.8] in place, any adhesive [80.2] that is not shadowed by some kind of ball (i.e., adhering it to the floor [80.1] or another ball [80.3] [80.7] [80.8]) may then be removed via exposure to the aforementioned "magic" light [80.4].

Figure 80I:
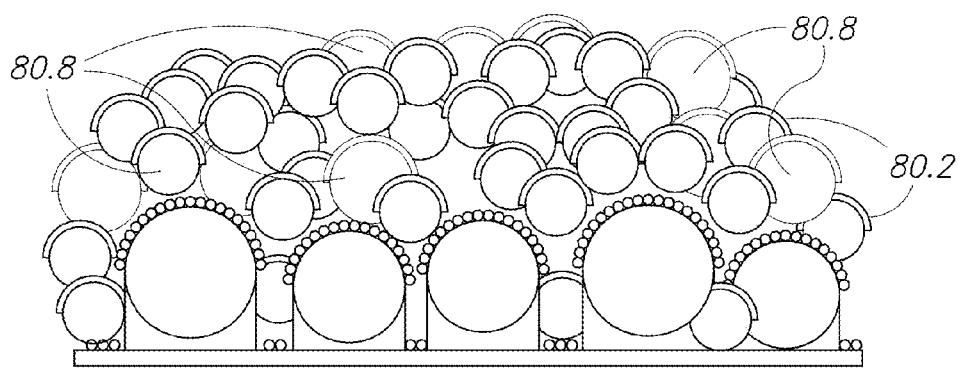
FIG. 80I: More iterations build up layers of balls with gaps between them

Any number of iterations may be used, and different size balls [80.3] [80.7] [80.8] may be used as desired, as depicted in FIG. 80I.

In a final iteration, adhesive [80.2] may be applied again such that a thin layer may cover the exposed surfaces of various sizes of balls [80.3] [80.7] [80.8], as well as any still-visible floor areas [80.1] between the various balls. In this final iteration, however, very small balls may be applied, such as BBs or small ball-bearings. Again, once the various balls are in place, any excess adhesive [80.2] that is not shadowed by some kind of ball (i.e., adhering it to the floor or another ball) may then removed by exposing it to the "magic" light [80.4] again as depicted in FIG. 80G, and washing it away as in FIG. 80H [80.6].

At this point you might imagine that the overall depth of the balls is roughly the sum of the average sizes of the individual balls [80.3] [80.7] [80.8] applied in each iterative layer. Also, while the larger balls may have relatively larger reentrant cavities between them, the smaller balls may serve to amplify the overall surface area and the total number of reentrant cavities.

Variations on this thought experiment may also be useful, such as following any layer of relatively larger balls with a layer of relatively smaller or very small balls to further increase the overall surface area and the total number of reentrant cavities. In another variation, a layer of these relatively smaller or very small balls may be added to a layer of relatively larger balls without the intervening steps of adhesive application and removal, so that they may only adhere to excess adhesive that is still exposed after the immediately previous layer of relatively larger balls has been placed, thereby reducing the number of adhesive application and removal steps.

NOTE: This thought experiment is substantially analogous to the sequence of steps for manufacturing and applying the RUBE™ Diamond Photolithographic Top-Coating, as is taught next. Of course, the physical scale is different, since the diamond particles in the actual process are many orders of magnitude smaller than the balls in the thought experiment.

In a preferred embodiment, the RUBE™ Diamond Photolithographic Top-Coating may be manufactured and applied via a sequence of steps which may be repeated as desired while varying key parameters to achieve particular effects, as taught below.

Step 1: In a preferred embodiment, but only in the first iteration of steps, the substrate may be cleaned, dehydrated, and primed with an adhesion promoter such as liquid hexamethyldisilazane (HMDS), which may be commercially available, for example, as MicroChem AP 8020 (20% HMDS). In an alternate embodiment, a bubbler and gaseous HMDS may be used. In a preferred embodiment, the substrate may be baked for three minutes at 110° C. after the primer has been applied.

If available, a commercially available oven such as Y.E.S. Primeoven LP-5 may simplify the priming and baking of the substrate.

In still another alternate embodiment, the substrate may be subjected to a proprietary adhesion promotion treatment such as those which may be commercially available from Aculon, Inc., of San Diego, Calif., in the form of interfacial treatments of dissimilar materials, and particularly, treatments involving phosphonates and organometallics to prime or activate substrate surfaces such as polymers and metals. If subsequent iterations are used, they should exclude this priming step.

Step 2: Sparsely apply a thin layer, such as 0.5 micron to 20 microns thick, or more preferably, 0.5 micron to 5 microns thick (still more preferably, the thickness may range from less than 10% to about 80% or more of the mean diamond particle size used in step 3, below) of positive photosensitive etch resist ("photoresist") to the substrate via a photoresist-application process, such as spraying, spray coating, or dip coating, which are well known in the art, adjusting the viscosity as optimally advantageous for the selected photoresist and application equipment. In a preferred embodiment, a spray may be applied from an overhead direction, so that spray droplets may be naturally directed toward the substrate by gravity.

Note that spray coating may be strongly preferred over dip coating, in order to minimize undesirable photoresist fill-in of areas which may be shadowed from the irradiation to be applied in step 4. Also, it may not be necessary to fully coat the substrate with photoresist in a single pass of the process steps; it may be advantageous to "spatter" the photoresist so as to create the effect of "dots" of photoresist on the substrate, with uncovered areas between dots, thereby leaving the uncovered areas for subsequent iterations of the process steps.

Figure 81:
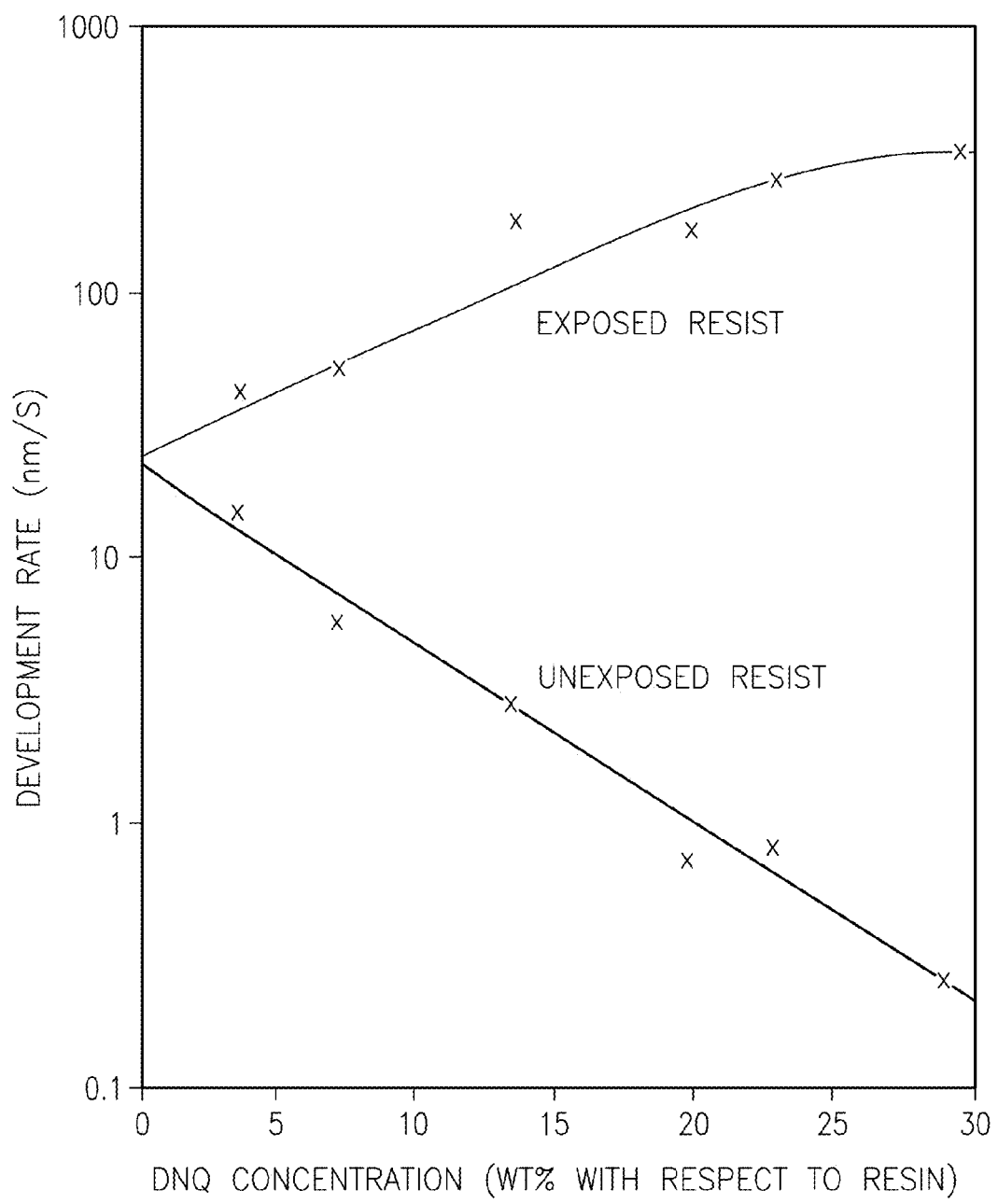
FIG. 81: Meyerhofer plot: DNQ Concentration vs. Development Rate (Source: Clifford L. Henderson)

One very common positive photoresist is based on a mixture of diazonaphthoquinone (DNQ), a dissolution inhibitor, and Novolac resin (a phenol formaldehyde resin). The DNQ concentration may be varied up to a maximum of about 30%, with 20% being common (see FIG. 81). As depicted in FIG. 81, higher levels of DNQ increase the photosensitivity, thereby improving the ability to eliminate exposed photoresist while retaining unexposed photoresist, with a 20% loading by weight corresponding to about three orders of magnitude in contrast between the dissolution rates of exposed and unexposed photoresist. The viscosity of the solution may be adjusted by varying the polymer resin to solvent ratio, which may allow photoresists to be formulated for a variety of coating thicknesses and application methods. Novolac resins may be soluble in a variety of common organic solvents including cyclohexanone, acetone, ethyl lactate, NMP (1-methyl-2-pyrrolidinone), diglyme (diethyleneglycol dimethyl ether), and PGMEA (propyleneglycol methyl ether acetate, which is commonly used with DNQ-Novolac, due to its relatively benign characteristics with respect to human exposure). For viscosity control, positive photoresist solutions may comprise 15% to 30% polymer resin (by weight), with the balance comprising solvent. In one embodiment, the positive photoresist of selected process steps may further comprise fine diamond powder (e.g., preferably from somewhat less than 1 micron to about 3 microns) in order to enhance its thermal conductivity, which may require a further varying of the polymer resin to solvent ratio to establish the desired viscosity. Note that, by design, the presence of opaque diamond powder may reduce the ability of step 4's irradiation to deeply propagate through the "bleaching" effect, which may limit the usable thickness of any photoresist layer containing opaque diamond powder. The intent is to limit unexposed individual layers to the approximate thickness of any diamond particles embedded therein, regardless of whether the particles originate in the photoresist or are "injected" in a subsequent step (e.g., such as by forcibly directed diamond powder as in step 3, below).

In a preferred embodiment for laboratory-scale application of photoresist, an aerosol spray can of positive photoresist may be utilized, such as MicroChem XP MicroSpray, which comes premixed. When spraying with this particular product, 6 to 8 fairly quick right-angle overlapping passes back and forth may yield a thickness of about 9 microns (a range of 6 to 16 microns may be typical). A single pass at a distance of 3 inches from the substrate may yield a thickness of about 1 to 1.5 microns, but not necessarily with complete coverage, so that limiting the number of passes to one or two, possibly in junction with increasing the distance to the substrate, may be used as a means to "spatter" the photoresist as mentioned earlier in this step, if desired. In accordance with the manufacturer's instructions, prior to use, the MicroChem XP MicroSpray aerosol can should be at room temperature for one hour prior to use. Although the manufacturer suggests shaking the can vigorously 10 times and waiting 5 minutes prior to use, in a preferred embodiment the 5-minute post-shaking delay may be shortened or omitted, which may advantageously increase the amount of vapor bubbles entrained in the photoresist, and may therefore result in a somewhat increased spattering effect, and also an increase in vapor bubbles entrained within any photoresist that may be subsequently deposited on the substrate. The manufacturer also suggests waiting an additional 5 minutes at room temperature (20° C.) after spraying, before taking the next step (which would normally be a soft-bake), so that any entrained micro-bubbles will disappear, in order to maximize the smoothness of the coating on the substrate (which is not what is desired here). However, in a preferred embodiment the 5-minute post-application delay may also be shortened (say, to a minute or so) or omitted entirely, which may increase the amount of vapor bubbles still entrained in the photoresist upon entry to the next step.

Step 3: Optionally, soft-bake the substrate for 1 to 3 minutes (or, more preferably, for 1 to 1.5 minutes, or even less) at 110° C., so that the photoresist deposited on its surface may become somewhat "tacky" and some or all of the entrained vapor micro-bubbles may surface or "pop," possibly leaving microscopic craters or other topological features.

In a preferred embodiment, this step helps to keep the photoresist from shifting under the motive force associated with the "dusting" of the substrate in the next step. In an alternate embodiment, any such shifting may be desirable, as it may result in a thinning of the photoresist as it spreads, such as when the photoresist is spattered onto the substrate, leaving uncovered areas between droplets.

Step 4: "Dust" the substrate with a selected diamond powder by forcibly directing the powder toward the substrate at a convenient angle between 45 and 90 degrees (an angle closer to perpendicular may be preferred in general, especially for flat substrates, but angles such as 45 degrees may be helpful for dusting the sides of surfaces which protrude from the substrate at any angle) with sufficient motive force so that particles may become embedded in any photoresist that may have adhered to the substrate in step 2.

In a preferred embodiment, the motive force may be supplied by entraining diamond particles in a stream of dry, filtered, oil-free compressed air with just enough pressure and proximity to cause diamond particles to penetrate the photoresist sufficiently so as to make contact with an underlying substrate (which may be other diamond particles). Alternatively, step 4 may be eliminated or augmented for any iteration of the process by embedding the selected diamond powder directly into the positive photoresist deposited in step 2.

In photolithography terms, the collection of applied diamond particles diamond particles (whether embedded into, or "dusted" onto, the photoresist) represents the "mask" that determines which parts of the photoresist will be exposed in the next step (in a conventional process, the mask would typically comprise optical artwork in a negative or positive pattern of clear areas and black areas). Whereas jewelry-quality diamonds may be very clear and pass light easily (which is not what is desired here, since it would transmit light rather than mask it), a suitable diamond powder as contemplated here may be relatively opaque or quite opaque, as depicted in the examples of FIG. 77, thus blocking most or all of the light in a manner similar to conventional artwork-based masks, regardless of the particle size distribution (PSD) selected.

Figure 82:
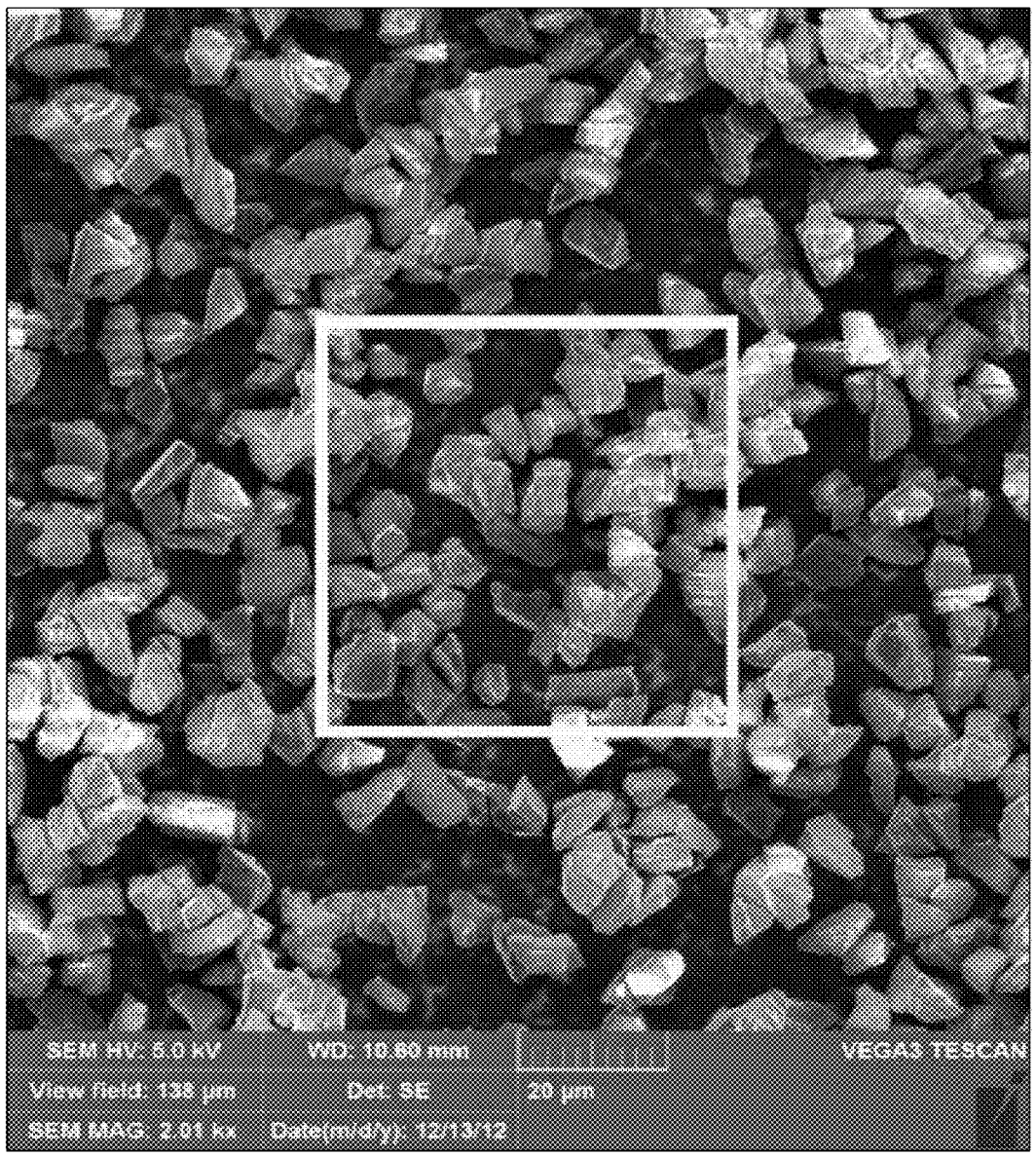
FIG. 82: RUBE™ Diamond Top-Coating—Examples of Monocrystalline Diamond Powder Suitable for Masking (2000×)
Figure 83:
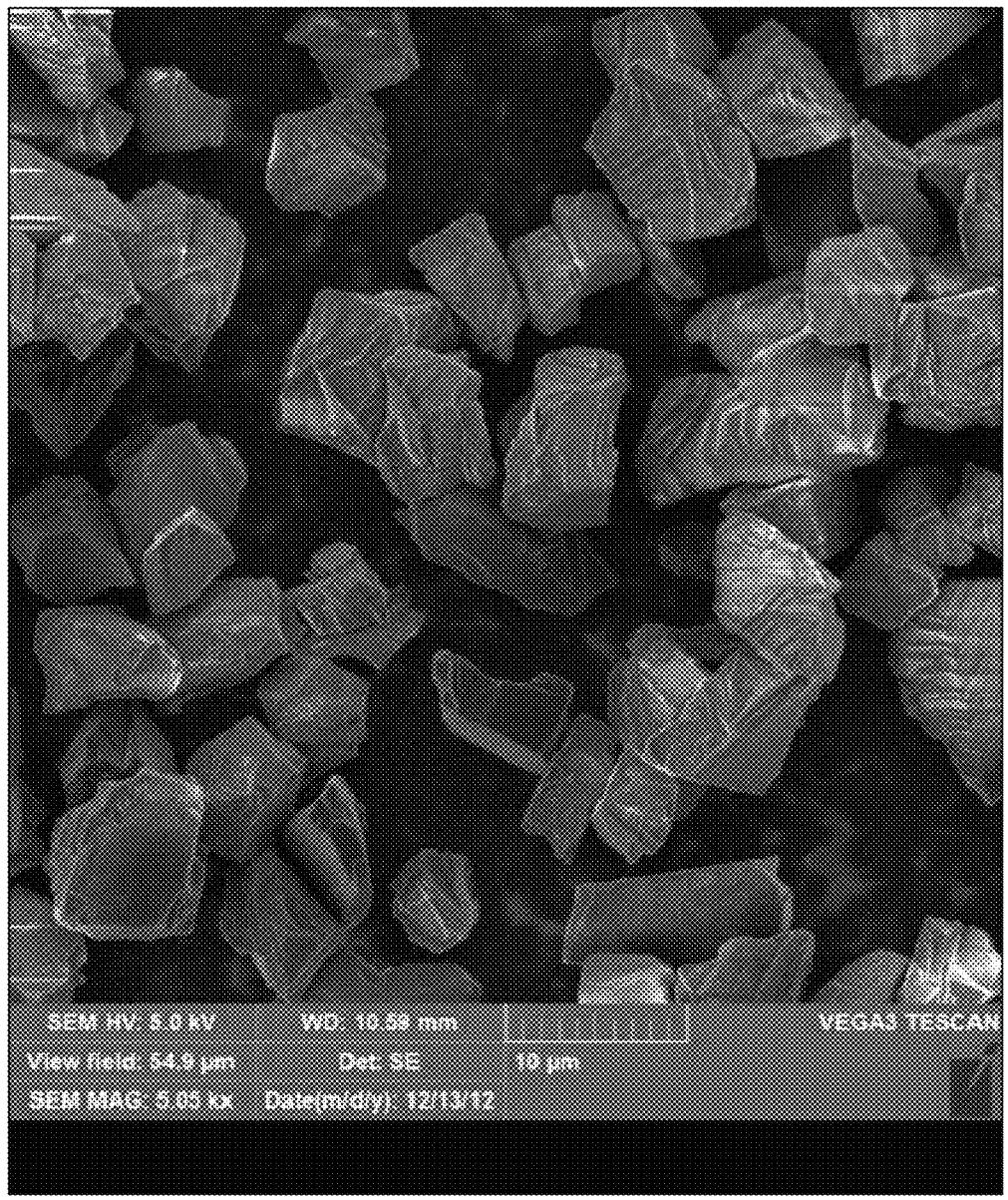
FIG. 83: RUBE™ Diamond Top-Coating—Examples of Monocrystalline Diamond Powder Suitable for Masking (5000×)

In a preferred embodiment, a suitable diamond powder may comprise an economical grade of commercially available monocrystalline diamond powder having a standard PSD such as the 6 to 12 micron PSD diamond particles depicted in FIG. 82 at 2000×, which in this particular example may have a mean size of about 9 microns. FIG. 83 is a "zoomed-in" view of a central portion of FIG. 82, at 5000×. An inherent economy may derive from the fact that these diamond particles may be irregular with blocky shapes, with minimal grading, which may make them much less desirable for many superabrasive applications, but well-suited for certain versions of the present invention. In a preferred embodiment, a suitable diamond powder may comprise very fine natural or synthetic diamond powder in a PSD preferably comprising irregular shapes in statistical size ranges such as 2 to 4 microns, 6 to 12 microns, and 15 to 25 microns (for example, LS6PGT metal bond monocrystalline diamond powder, which may be commercially available from LANDS Superabrasives, New York City, N.Y., and which, in a PSD of 2 to 4 microns, may have an effective surface area of approximately 2.4 $m^2/g$ or 2,400 $m^2/kg$).

Figures 84, 85:
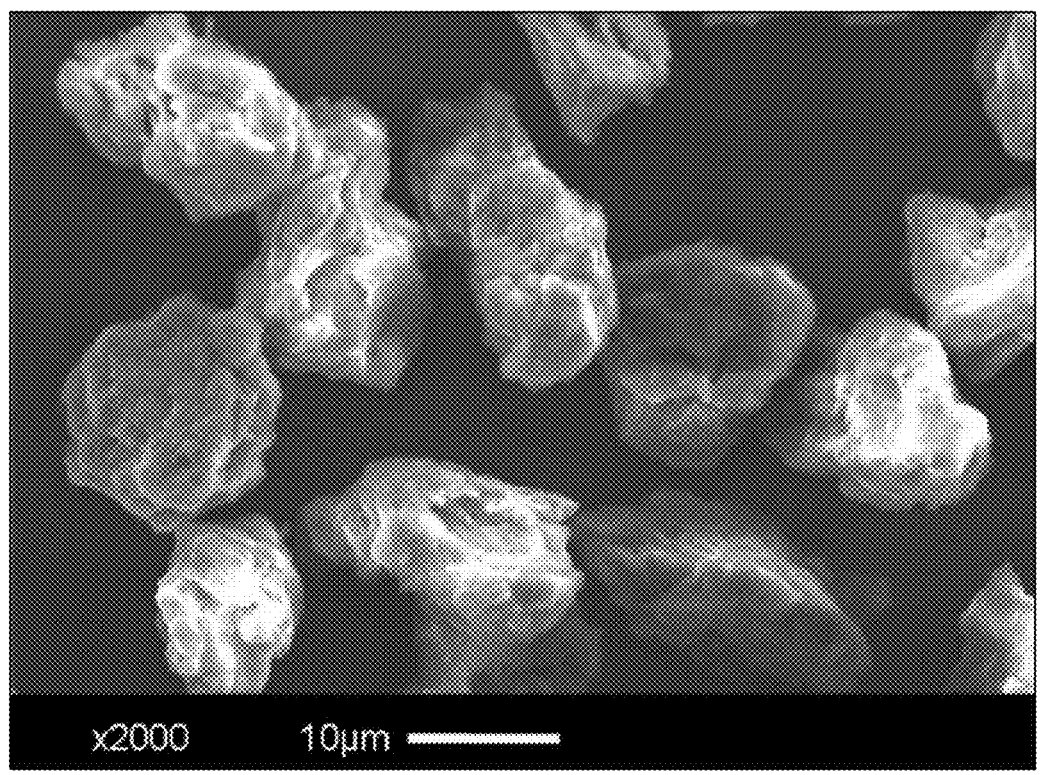
FIG. 84: RUBE™ Diamond Top-Coating—Examples of Polycrystalline Diamond Powder (2000×)
FIG. 85 Relevant Electrograining Results—Surface Roughness vs. Electrolyte Type

In another preferred embodiment, a suitable diamond powder may comprise a commercially available polycrystalline diamond powder having a standard PSD and further comprising nano-crystallites, such as that depicted in FIG. 84, which in this particular example may have a mean size of about 12 microns.

If cost is not an issue, polycrystalline diamond powder may be most preferable, generally speaking, since its nano-crystallites may form a large number of cavities and potential nucleation sites in each diamond particle, with a commensurate surface-area-to-mass ratio (e.g., $m^2/kg$, which may often be 2× to 4× that of monocrystalline diamond of the same PSD), all of which may also contribute significantly to the total number of reentrant cavities formed by proximately located particles. In one embodiment, polycrystalline diamond powder may be used in conjunction with less expensive monocrystalline diamond powder, in a ratio that may be determined by economics, in order to achieve some of the potential topological advantages of polycrystalline diamond powder while mitigating the expense.

NOTE: For sake of comparison, one may refer to US2010/0064593 A1, which includes a comparison of the properties of its subject experimental etched monocrystalline diamond particles with reference particles, and in particular, with monocrystalline and polycrystalline diamond particles, all of which are about 8 microns in size. In FIG. 13 of that document, the etched monocrystalline diamond particles of Run #9 have a final size of about 7.87 microns and a surface-area-to-mass ratio of 0.78 $m^2/g$ (780 $m^2/kg$). Comparatively, conventional monocrystalline diamond particles are listed with a size of 8.69 microns and a surface-area-to-mass ratio of 0.55 $m^2/g$ (550 $m^2/kg$), whereas conventional polycrystalline diamond particles are listed with a size of 8.07 microns and a surface-area-to-mass ratio of 1.7 $m^2/g$ (1,700 $m^2/kg$), which is about 3× higher. Also keep in mind that the polycrystalline diamond particles achieve this surface-area-to-mass ratio with less than 93% of the size of the monocrystalline diamond particles (i.e., 8.07 vs. 8.69 microns). However, as cited earlier in this step, a preferred diamond powder such as LS6PGT metal bond monocrystalline diamond powder in a PSD of 2 to 4 microns (which may be commercially available from LANDS Superabrasives, New York City, N.Y.) may have an effective surface area of approximately 2.4 $m^2/g$ or 2,400 $m^2/kg$, which is 41% high than that of said polycrystalline diamond particles (but comparable larger sizes of the exemplary LS6PGT diamond powder may have less total surface area per gram).

In an alternate embodiment, a suitable diamond powder may comprise a monocrystalline diamond powder that may, by virtue of its cavities and surface roughness, somewhat simulate the surface morphology of polycrystalline diamond powder, which morphology may be artificially induced through etching in accordance with various methods of US2010/0064593 A1, which may have the effect of increasing the number of cavities and potential nucleation sites, as well as the surface-area-to-mass ratio.

Step 5: Soft-bake the substrate again, this time for a full 3 minutes at 110° C., so that any remaining entrained vapor micro-bubbles may surface or "pop," possibly leaving microscopic craters or other topological features, and the topology of the diamond-embedded substrate may stabilize and become fixed in place.

Optionally, use heat (typically 100° C. to 130° C., but well below $T_G$) to reflow the resist. Note that common positive photoresist structures may reflow ("rounden") beyond their softening point of typically 100° C. to 130° C., and optionally this behavior may be used to cause thinning and spreading of existing photoresist structures, which may shift them closer to an underlying surface (due to gravity), and may cause a portion of the existing photoresist to move toward where it may become exposed and thereby subsequently removed if it becomes irradiated in step 6 of a subsequent iteration.

Step 6: Irradiate the substrate and its coatings with light energy at an exposure time, illumination intensity, and wavelength suitable for the selected positive photoresist and coating thickness, such as UV or near-UV light at a selected wavelength of about 300 nm up to about 500 nm, and typically about 350 nm to about 450 nm. In a preferred embodiment, an intensity on the order of 400 $mJ/cm^2$ (preferably, 350 to 450 $mJ/cm^2$) may be utilized in order to make the irradiated positive-working photoresist soluble in the developer solution to be used in the next step.

This step may be simplified through the use of commercially available equipment, such as the EVG 620 Mask Aligner (which may be available from the EV Group of Phoenix, Ariz.).

Irradiation of positive photoresists may form an indene carboxylic acid during exposure, making them soluble in aqueous alkaline solutions, such as may be utilized as the developer solution of step 7. Positive photoresists may develop where they have been exposed, while the unexposed areas (i.e., those areas masked or shadowed by the diamond or other opaque particles) may remain on the substrate.

The irradiating light energy may "bleach" the positive photoresist first encountered, making it transparent to the light energy and enabling the light to continue its penetration into deeper layers until a non-photoresist surface is encountered (e.g., a diamond particle or underlying substrate).

Novolac photoresists may have the characteristic of popping or forming voids after irradiation as a result of nitrogen generated during exposure, which may be conventionally undesirable. However, such popping and void formation may actually be beneficial in this embodiment, since any such voids may contribute to the reentrancy of the three-dimensional structure sought, and may help to minimize the percentage of photoresist that may remain in the final structure.

Step 7: Develop the substrate (with its adhering photoresist and diamond-powder-mask) in a metal-ion-free (MIF) solvent developer solution that is compatible with the selected photoresist, such as 2% to 3% Tetra-Methyl Ammonium Hydroxide (TMAH) in water, optionally with surfactants added for fast and homogeneous substrate wetting, which may remove any photoresist that has been adequately irradiated in step 6.

Preferably, other additives known in the art may also be used, such as for removal of photoresist residuals that may otherwise occasionally remain after development. In a preferred embodiment for laboratory-scale application, the photoresist comprises MicroChem XP MicroSpray positive photoresist or an equivalent, the substrate may be developed with for about minutes (e.g., 4 to 6 minutes) in 2.38% or 0.26N TMAH (which may be commercially available as RHEM CD-26 developer), or NaOH.

In a preferred embodiment, the substrate may be moved gently in the developer solution. In an alternate preferred embodiment, gentle fluid agitation or sonication may be used to aid or enhance removal of irradiated photoresist.

Step 8: Rinse (e.g., in pure water) and dry the substrate, taking care to avoid contamination (especially if additional process steps will be performed).

Step 9: Optionally repeat the process, beginning with step 2, varying selected parameters and optional process steps as desired, such as may be notionally depicted in FIG. 80.

Step 10: As the final step of photoresist processing (performed only once), hard-bake the diamond-coated substrate beginning at 120° C. to 125° C. with a sequence of slowly increasing temperatures. In a preferred embodiment, the temperature is increased in steps of 5° C. for one hour per step, until 140° C., is reached. In a preferred embodiment, the hard-bake is continued at 140° C. for two hours, then at 150° C. for another hour, to make the positive remaining photoresist permanent.

Crosslinking of remaining positive photoresist may be optionally activated under higher energy deep ultraviolet (DUV) radiation (such as wavelengths in the 150 nm to 300 nm range, and typically less than 250 nm, and preferably less than 200 nm), but this may only apply for photoresist that can be irradiated by the available light source (i.e., not shadowed by something).

Step 11: In a preferred embodiment, apply a layer of CVT-based RUBE™ Diamond Vapor Top-Coating (in accordance with the embodiment of the previous section) to superimpose a thermally conductive topology-following layer on the lithographic layer, including any remaining positive photoresist, to improve the overall morphology and thermal conductivity.

RUBE™ Diamond Top-Coating Paint Manufactured as a Paint & Applied Separately

In another alternative preferred embodiment that separates the manufacturing and application steps, RUBE™ Diamond Top-Coating may comprise a paint prior to application, which may further comprise thermally conductive but electrically non-conductive cavity-generating particles, solvent, and thermally conductive binding agent, with the particles in a suspension or dispersion of, for example, 100:1 solvent and binding agent, in a ratio of about 16 grams to 20 grams of diamond particles per 100 ml of solvent and 1 ml of binding agent (after the application process is finished, only the thermally conductive particles and binding agent remain). In another preferred embodiment, the cavity-generating particles, solvent, and binding agent may occur in ratios as described in U.S. Pat. No. 5,814,392 (PRIOR ART), where the binding agent is a glue as described therein.

In a preferred embodiment, the cavity-generating particles may comprise natural or synthetic diamond powder such as those described in step 4 of the process of the previous section (examples of which are depicted in FIG. 82, FIG. 83, and FIG. 84), appropriately sized for the selected working fluid, considering its purity, surface tension, wetting properties, boiling point, molecular size, the desired embryonic bubble radius, and the desired coating thickness. In a preferred embodiment where RUBE™ LT2 fluid may be used as the working fluid, the cavity-generating particles may preferably be clean natural or synthetic monocrystalline or polycrystalline diamond powder of various sizes generally in the range 1 to 30 microns, preferably comprising irregular shapes in statistical size ranges such as 2 to 4 microns, 6 to 12 microns, and 15 to 25 microns (for example, LS6PGT metal bond monocrystalline diamond powder, which may be commercially available from LANDS Superabrasives, New York City, N.Y., and which, in a PSD of 2 to 4 microns, may have an effective surface area of approximately 2.4 $m^2$/g or 2,400 $m^2$/kg). In a preferred embodiment, the monocrystalline or polycrystalline diamond powder may comprise any combination of blocky, spikey, etched, and irregular surfaces and shapes, with a combination of spikey, etched, or irregular surfaces and shapes being preferred for the purposes of creating large numbers of appropriately sized reentrant cavities and nucleation sites.

In a preferred embodiment, the solvent may comprise isopropanol (IPA). In a preferred embodiment, the binding agent may comprise a dielectric but thermally conductive epoxy which may be commercially available. In an alternative embodiment, the binding agent may comprise a dielectric but non-thermally conductive epoxy that has been laden with said monocrystalline or polycrystalline diamond powder in order to make it thermally conductive, thereby avoiding the use of non-diamond (and therefore thermally inferior) components typically used to manufacture commercially available thermally conductive epoxies.

In a preferred embodiment where RUBE™ Diamond Top-Coating Paint may be used as a top-coating (outermost layer, directly exposed to a working fluid), it may comprise a formulation of sprayable two-part dielectric epoxy binding agent (otherwise rarely specified for conformal coating due to its permanence) and very fine (1-30 micron, or preferably 15-25 micron, or more preferably 6-12 micron, or still more preferably, PSDs as previously described) natural or synthetic diamond powder, in at least a 3:1 diamond-to-epoxy ratio by volume, or more preferably at least a 5:1 diamond-to-epoxy ratio by volume, and still more preferably (with respect to thermal performance) in an approximately 8:1 or greater diamond-to-epoxy ratio by volume, with diamond powder (in the selected ratio) pre-mixed into each part of the epoxy (i.e., resin and catalyst) prior to mixing the two parts of the epoxy together at application time. As previously mentioned, a solvent that is compatible with the binding agent may be used to dilute the mixture in order to make it into a sprayable paint. In alternative embodiments, one-part epoxies, paints, glues, or other bonding agents may be used, provided that that they are dielectric and compatible with the selected coolant (binding agents with high thermal conductivities are preferable, all else being equal).

In a preferred embodiment, a specific variant of RUBE™ Diamond Top-Coating Paint may be selected to correspond with the molecular geometry most favorable to a particular coolant (e.g., the selected RUBE™ LT2 working fluid), so that incipience of boiling may be maximized through the optimal granularity of nucleation sites, combined with minimized thermal resistance, and such that the underlying binding agent (e.g., epoxy, paint, etc.) may have desirable properties, including high compatibility with the selected working fluid.

In a preferred embodiment, the RUBE™ Diamond Top-Coating Paint may be applied as a quasi-conformal coating via manual or automated spray techniques, or via automated techniques such as curtain coating, preferably with a thickness from about 0.2 mil to about 2 mil (52 microns), or more preferably, from about 0.5 mil to about 1 mil (26 microns). Curtain coating may be most preferable, due to generally excellent thickness control (down to 6 microns or so), but other methods may assure similar levels of control. Since the preferred cavity-generating particles may comprise diamond powder, which is a superabrasive, any method involving spray nozzles may require additional quality control steps to monitor nozzle diameters and ensure timely replacement, although the actual parameters may depend on the materials used in nozzle manufacturing.

Thermospray Company (online at www.Thermospray.com) is an example of a commercial company which may be capable of manual or automated application of RUBE™ Diamond Top-Coating Paint (the company has been providing mil-spec and industrial coating services to leading aerospace and commercial interests since 1960).

Nordson ASYMTEK's SC-300 Swirl Coat Applicator (NordsonAsymtek.com) is an example of a commercially available conformal coating applicator which may be capable of automated application of RUBE™ Diamond Top-Coating Paint with a thickness down to 0.5 mil on the primary (horizontal) surfaces (and even less on vertical surfaces). In a preferred embodiment of a process based on this machine, a target thickness of 0.5 mil may require setting the SC-300 applicator to "swirl mode," with a film pattern width of 6.35 to 12.7 mm (0.25 to 0.50 inches), a material viscosity of 30 to 3500+mP·s (30-3500+cps), and a coating velocity of 127 to 381 mm/second (5 to 15 inches/second).

In a preferred embodiment, the RUBE™ Diamond Top-Coating Paint may be applied by spraying a thin layer (preferably 1 mil or less in as-finished thickness, and more preferably under 0.5 mil, and still more preferably under 0.3 mil, which may be verified by coupon or other means) over the entire PCB. Although a thinner top-coating is preferred, all else being equal, its finished thickness must be sufficient to ensure that the embedded diamond powder remains embedded in the bonding agent and cannot escape into the coolant, and this thickness is at least partly determined by the average size of the diamond powder (e.g., 5-15 microns), the diamond-to-bonding agent ratio (e.g., 5:1, 8:1, etc.), and the properties of the bonding agent. Preferably, a sprayable top-coating mixture may be obtained by premixing the diamond powder with each part of a two-part epoxy (i.e., prior to mixing the two parts), and temporarily diluting the epoxy as optimally advantageous by adding a thinner or solvent that will evaporate after the top-coating is applied to the PCB.

Recognizing that diamond powder with an average size of 1-30 microns is in the class of materials commonly referred to a "superabrasives," it may be optimally advantageous to inspect and/or replace spray nozzles somewhat more frequently than may be preferred if the top-coating contained no abrasives. In a preferred embodiment, the use of carbide nozzles may be preferable and may lengthen the useful life before replacement is needed (i.e., to keep the selected thickness within specification).

In a preferred embodiment, where RUBE™ Diamond Top-Coating Paint may be applied via manual or automated spraying equipment, the normal cumulative thickness of RUBE™ Diamond Top-Coating (comprising the aforementioned top-coating and any underlying layers, such as a layer of RUBE™ Diamond Solder Mask, which is described in the next section) may be between 0.3 mil and 2 mil, with better results (i.e., minimum device wall or surface superheat) obtained with a cumulative thickness somewhat less than 1 mil (since thermal resistance increases with coating thickness), and more preferably less than 0.5 mil.

RUBE™ Diamond Solder Mask

Originally, the primary requirement for a conventional solder mask was to prevent solder from bridging components to conductors on a PCB. With the advent and rapid popularity of surface mounting and fine-pitch components, solder mask tolerance and clearance requirements have tightened considerably, which, in conjunction with environmental concerns, have radically changed the available solder mask options. Current options include traditional screen-printable epoxy inks (note that the associated screen-printing process may not be appropriate for tight tolerance requirements), liquid photoimageable solder mask (LPSM), and dry film photoimageable solder mask (DFSM). Of these, dry film is not a suitable candidate for RUBE™ Diamond Solder Mask, as discussed below.

Today's solder masks must meet increased performance requirements beyond those originally envisioned. According to a commercial firm (www.PrecisionCircuits.com) specializing in solder masks, today's conventional solder masks may be expected to:
    Prevent solder bridging
    Provide environmental protection to circuitry
    Prevent metal migration
    Aid the assembly of SMDs
    Be compatible with SMD adhesives and conformal coatings
    Tent via holes
    Provide an insulation coating
    Be aesthetically pleasing
    Help to achieve high first-pass yields during application
    Help to achieve high first-pass yields in assembly process
    Be easy to clean to meet ionic contamination tests
    Meet strict UL and IPC criteria In a preferred embodiment, heat-emitting surfaces that may normally be covered with a conventional solder mask and may be immersed in, or in direct contact with, a working fluid such as RUBE™ LT2 two-phase fluids may instead covered with RUBE™ Diamond Solder Mask, which may be substituted for the conventional solder mask. RUBE™ Diamond Solder Mask may be highly thermally conductive but electrically non-conductive (i.e., dielectric), and may increase nucleation sites (which may entrap vapor and thereby promote nucleate boiling), increase heat exchange surface area, and reduce thermal resistance.

To minimize the thermal resistance of the PCB-to-working-fluid interface, it may be desirable to avoid or minimize the application of RUBE™ Diamond Top-Coating over an underlying conventional solder mask layer (due to the higher inherent thermal resistance of a conventional solder mask). Instead, in a preferred embodiment, the conventional solder mask may be replaced with one that is more thermally conductive (e.g., RUBE™ Diamond Solder Mask) and whose composition is similar to that of RUBE™ Diamond Top-Coating Paint, but with liquid photoimageable resist (thinned as optimally advantageous for application, per formulation preferences described later) substituted for the bonding agent in RUBE™ Diamond Top-Coating, but also with different ratios of diamond particles (e.g., diamond powder) to bonding agent.

Printed circuit boards (PCBs) may also have an underlying RUBE™ Diamond Solder Mask, which may comprise thermally conductive but electrically non-conductive cavity-generating particles (e.g., diamond powder), and which may directly substitute for an otherwise present conventional solder mask. The RUBE™ Diamond Solder Mask may share many thermal properties of RUBE™ Diamond Top-Coating, but may be utilize diamond particles in somewhat smaller statistical size ranges, and negative-tone photo-sensitive (prior to curing), so that it may be used in an LPSM (liquid photoimageable solder mask) process. The primary purpose of the RUBE™ Diamond Solder Mask may be to minimize or avoid the increased thermal resistance associated with a conventional solder mask, and thereby minimize the thermal resistance of the PCB-to-working-fluid interface.

In a preferred embodiment, the aforementioned effect of applying thermally enhanced RUBE™ Diamond Top-Coating to already-populated PCBs may be further augmented by embedding some of the aforementioned diamond powder (with possibly somewhat smaller particle sizes) into the underlying PCB solder mask itself (yielding a RUBE™ Diamond Solder Mask), as well as within any silk-screening ink used for device and/or location labeling, prior to populating the PCBs with devices and applying RUBE™ Diamond Top-Coating. Like a conventional solder mask, the RUBE™ Diamond Solder Mask may typically cover all exposed conductors and may also coat "via" holes (with or without tenting them, but, in the case of the RUBE™ Diamond Solder Mask, usually and preferably without via-tenting, so as to enhance thermal transfer).

Note that in some cases (particularly when the solder mask underlayer may not be directly exposed to the working fluid during PCB operation), diamond powder embedded within the RUBE™ Diamond Solder Mask may preferably be of a still smaller size, such as less than 1 micron, or 2 to 4 microns, instead of, say, 6 to 12 microns, with the diamond-to-epoxy ratio accordingly adjusted somewhat as optimally advantageous to account for the change in density, provided that the populated PCB (including exposed areas of the solder mask) is to be subsequently coated with the aforementioned RUBE™ Diamond Top-Coating options, keeping in mind that a key reason for diamond powder size selection in the top-coating is its propensity to create nucleation (boiling incipience) sites for the selected working fluid. Wherever the RUBE™ Diamond Solder Mask underlies the RUBE™ Diamond Top-Coating, there may be increased thermal resistance due to increased thickness of the combined layers, but the thermal resistance may be much less than if a conventional solder mask had been top-coated.

Discussion of RUBE™ Solder-Mask Candidates

Solder masks may generally be categorized as screen-printable or photo-imageable, with direct screen-printing of solder masks being older technology that may not be able to meet the tolerance and clearance requirements demanded by modern surface-mount assemblies. When older-technology screen-printable (but non-photo-imageable) epoxy solder masks are used, it may be useful to embed the aforementioned diamond powder directly into the solder mask ink (epoxy) prior to the actual screen-printing, thereby achieving a cost-effective RUBE™ Diamond Solder Mask for PCBs with very low resolution requirements (e.g., small PCBs with no gaps at or below 0.2 mm, since the repeatability of screen printing is around +/−0.2 mm).

Photo-imageable solder masks may be further categorized as dry film solder mask (DFSM) or liquid photo-imageable solder mask (LPSM or LSM). Either may potentially be diamond-enhanced to create a RUBE™ Diamond Solder Mask, with LPSM being strongly preferred over DFSM.

DFSM is the most expensive of the solder mask options, and may be supplied as a photo-sensitive film that has been widely used in the industry for more than a decade. Although it may be anticipated that diamond powder may be embeddable in the dry film solder mask material, the dry film itself is typically supplied in thicknesses of 75 microns (3 mils) and 100 microns (4 mils), and thus may be inherently much too thick, relative to a preferred thickness of less than 1 mil, and preferably under 0.5 mil, and more preferably under 0.3 mil (the thicker the material, the higher the thermal resistance, which is the opposite of what is needed).

Also, the choice of solder mask thickness may depend on the PCB design geometries and height of the circuitry (PCB traces). The film thickness selected will typically encapsulate the same conductor thickness, but a 75-micron-thick dry film may laminate circuit heights up to 100 microns, and a 100-micron-thick film may laminate circuit heights up to 125 microns, where said lamination of a circuit thermally insulates not only the top but also the sides of said circuit, which is the opposite of what is needed. Lastly, dry film solder mask is perhaps the only way to reliably tent via holes, which, although aesthetically pleasing, generally may the opposite of what is needed for enhancing thermal energy transfer from PCB to working fluid.

LPSM is newer than DFSM, and is based on photo-imageable inks that allow the image transfer tolerances of the solder mask to be just as precise as the process used to produce the pattern of conductive traces on the PCB. LPSM is well-suited for high technology PCBs, and especially for fine-pitch SMD (below 1.27 mm), partly because of its ability to reproduce size-for-size images, and partly because of the mask's finished thickness, which collectively enable good coverage of the subsequently screen-printed solder paste (a later step in the PCB assembly/manufacturing process). LPSM is especially useful for ultra-high-density PCBs, and these also tend to be the focus of the aforementioned RUBE™ diamond-based coatings, which are intended to help address thermal management issues such as those which may be associated with such PCBs operationally.

RUBE™ Solder-Mask Formulation

In a preferred embodiment where RUBE™ Diamond Solder Mask may be used as a PCB solder mask (e.g., an underlayer, typically top-coated with RUBE™ Diamond Top-Coating and thus less directly exposed to working fluid), the RUBE™ Diamond Solder Mask may comprise a formulation of two-part unexposed liquid photo-resist (further comprising, for example, commercially available CKXN0314 resist and CKXN0315 hardener mixed in a 3:2 ratio) and very fine natural or synthetic diamond powder in a PSD preferably comprising irregular shapes in statistical size ranges such as 2 to 4 microns, 6 to 12 microns, and 15 to 25 microns (for example, LS6PGT metal bond monocrystalline diamond powder, which may be commercially available from LANDS Superabrasives, New York City, N.Y.), in at least a 1:5 diamond-to-resist ratio by volume, or more preferably at least a 1:4 diamond-to-resist ratio by volume, and still more preferably (with respect to thermal performance) in an approximately 1:3 diamond-to-resist ratio by volume, and thinned 4% to 45% (for example, with a commercially available thinner such as XZ108), with the least amount of thinner being needed for screen-printed low-diamond-content compositions and the most thinner being needed for sprayed high-diamond-content compositions.

RUBE™ Solder-Mask Application

In a preferred embodiment, the RUBE™ Diamond Solder Mask may be applied via a fairly standardized LPSM process, thereby taking advantage of existing know-how and production equipment. Conceptually, the widely used LPSM process can be simplified to the following process steps, which may be either artwork-based or artwork-free:

Step 1: Silk-screen, spray or otherwise apply (e.g., via electrostatic coating, curtain coating, computer-controlled precision applicator, etc.) a photo—imageable ink (also known as "resist") onto a PCB while controlling mainly the thickness.

Step 2: Expose the coated PCB to a special light source through a high-precision image pattern, or via laser direct imaging (LDI), causing partial curing of the exposed areas so that they become solvent-resistant.

Step 3: Use a solvent to wash the ink or resist away from the non-exposed areas, leaving a precise solder mask image.

Step 4: Allow the solder mask image to complete the curing process, which may involve the application of heat.

In a preferred embodiment of a thermally enhanced solder mask (RUBE™ Diamond Solder Mask) created by an LPSM process, the aforementioned diamond powder may be mixed or embedded into the liquid solder mask material ("resist") prior to applying it to the PCB as in step 1, above. The actual application of the diamond-enhanced resist to the PCB may be via silk-screen, spraying, curtain-coating, or any other method, so long as the thickness is controlled well enough to meet the solder mask coverage requirements while preferably staying under a thickness of 1 mil, and more preferably under 0.5 mil, and still more preferably under 0.3 mil, so that the total thickness of a RUBE™ Diamond Solder Mask layer and a subsequently applied RUBE™ Diamond Top Coating layer together may be well under 2 mil, preferably under 1 mil, and more preferably under 0.5 mil. Note that in the case of conflict, the solder mask coverage requirements may safely take priority over the thickness ("thinness") preferences.

A conventional 75-micron-thick DFSM dry film may laminate circuit heights up to 100 microns, and a 100-micron-thick dry film may laminate circuit heights up to 125 microns, thereby thermally insulating both the top and sides of said circuit, which is the opposite of the effect desired in a preferred embodiment. Rather, maximum thermal conductivity is desired.

The RUBE™ Diamond Solder Mask, as a thermally enhanced diamond-based variant of conventional LPSM solder mask, may be adequate to cover the conductors, but with thinning out expected on line edges in a manner similar to its non-diamond-based counterpart. Both the diamond-enhanced material in general, and said thinning-out specifically, may be very beneficial from a thermal management viewpoint, because it may further reduce the thermal resistance and improve thermal conductivity. In fact, because each copper-trace-to-PCB edge is analogously somewhat like a road with a cliff on the side (but at micro-scale), there may actually be a further beneficial three-dimensional heat-transfer effect because the edge itself may also be RUBE™ Diamond Solder Mask-coated, thereby increasing the effective thermal surface area and number of potential nucleation sites. These factors may be additionally advantageous since the electrical conductors are copper and are thus also thermally conductive. Whereas copper PCB traces and pads (which may comprise PCB traces and pads which have been further plated with gold or other metallic layers) of all sizes and shapes may further serve as heat sinks and thermal conductors that may become thermally saturated (that is, they may stop being excellent heat sinks), the RUBE™ Diamond Solder Mask and RUBE™ Diamond Top-Coating, individually or in combination, may help transfer thermal energy from said PCB traces to the working fluid, thereby preventing or reducing thermal saturation.

In a preferred laser direct imaging (LDI)-based PCB manufacturing process where the solder mask is to comprise RUBE™ Diamond Solder Mask material, an artwork-free laser direct imaging of PCB materials may be used to accurately register and define features below 75 microns, typically in UV wavelengths, with no negative effects on yields, using commercially available equipment (such as the Orbotech DP-1000 LDI or similar machines). In particular, LDI may be used in conjunction with a UV laser-compatible RUBE™ Diamond Solder Mask formulation, as described earlier, comprising for example, a diamond-to-resist ratio as high as 1:3 and thinned as much as 45%, applied by spraying and appropriately tack-dried as needed (for example, by infrared at 110° C. to 130° C.), with LDI energies of 40-45 mJ/cm$^2$ at UV wavelengths, using commercially available equipment such as said Orbotech DP-1000 LDI, followed by developing (for example, with 1% Na2CO3 at 35° C. and a 45-55 second dwell) and washing, followed by an optional curing energy "bump" (for example, 1000-1200 mJ/cm$^2$ at UV wavelengths), and a final heat curing (for example, 50 to 70 minutes at 140° to 150° C.).

RUBE™ Heat Spreader and Heat Exchanger Surface Treatments

In a preferred embodiment, the thermal transfer efficiency of various heat spreaders and heat exchangers which may be present in the system may be significantly improved by enhancing the surface with one or more treatments such as etching or graining, and subsequently depositing or applying coatings that may individually or collectively increase the effective total surface area, surface-area-to-volume ratio (e.g., m$^2$/m$^3$), surface-area-to-mass ratio (e.g., m$^2$/kg), thermal resistance/conductivity, nucleation site quality and density (i.e., the abundance and spacing of high-quality nucleate boiling incipience points), fluid reentrancy, or other factors.

In a preferred embodiment, any non-electronic, metal-containing heat spreader or heat exchange surfaces which may be in contact with RUBE™ LT2 working fluids, regardless of phase, may be etched or grained prior to, or in lieu of, or subsequent to, various surface treatments and coatings.

In a preferred embodiment, a thermal transfer coating for heat exchanger surfaces may comprise a RUBE™ Diamond Top-Coating as previously described, or RUBE™ Metal Coating, or RUBE™ Braze Coating, or RUBE™ Diamond Coating as described below or elsewhere in this document, singly or in combination, or any other thermal enhancement coating that may be compatible with the heat exchange surface materials, working fluids (e.g., refrigerant), sorbent (if any), and other constituents, if any (e.g., binders, solvents, interstitial materials, etc.).

Note that appropriately selected thermal transfer coatings may also be helpful to improve any or all heat transfer surfaces which may be in thermal communication with sorbent. In a preferred embodiment, various of the aforementioned thermal transfer coatings may serve as one or more underlayers for subsequently applied sorbent coatings, and especially adsorbent coatings.

Chemical and Mechanical Surface Treatments

In the case of an adaptation of a commercially available adsorption chiller where compact, high-surface-area heat exchangers (as described in a later section) may be substituted for the standard ones (i.e., those which may be typically supplied with commercially available chillers), In a preferred embodiment, a heat spreader or heat exchange surface may be enhanced via various chemical means (e.g., acid etching), electrical means (e.g., electrolytic etching or electrograining), or mechanical means (such as sandblasting, sandblasting-like procedures but with superabrasives, or adding lamella, fins, turbulators, louvers, or other surface features). In a preferred embodiment, said surface enhancement methods may be applied in order to increase the effective surface area, to increase turbulence, or other factors, and may further incorporate one or more suitable thermal transfer coatings on the heat spreader or heat exchange surfaces, in order to further enhance the heat transfer area, further reduce the thermal resistance, or achieve other specific characteristics (e.g., more nucleation sites to enhance boiling incipience).

In a particular preferred embodiment, any combination of said heat spreader or heat exchange surface coating or treatment (which may be further described in subsequent sections) may be integrated into one or more miniature-scale apparatus suitable for processing the integrated heat spreader (IHS) such as may accompany certain commercially available integrated circuit chips or modules (for example, AMD's various multicore processor families). In a preferred environment, a numerically controlled, open-ended five-sided box may accommodate the integrated treatment apparatus, with a gasketed or sealed sixth side.

In one preferred embodiment, each treatment apparatus may accommodate a single treatment step (such as sandblasting, acid etching, electrolytic etching, priming, spraying, lithographic deposition, lithographic exposure, lithographic development, electroless deposition, electroplating, cleaning, soft-baking, or hard-baking). In a more preferred embodiment, some of the mechanisms for several separate treatment steps may be combined into a single multi-step apparatus (for example, there may be a sandblasting/cleaning combination or acid-etching/cleaning combination, a lithographic priming/deposition combination, a lithographic exposure/development combination, or an electrolytic etching/electroplating/electroless deposition combination).

Metal Surface Etching or Graining

In a preferred embodiment, one or more heat exchanger surfaces (whether internal or external) may be enhanced through surface etching or graining, in order to increase the effective substrate surface area, surface roughness (which may desirably increase turbulence in some cases), and the number and size of incipience points for localized nucleate boiling (when applicable). Also, when a heat exchanger surface, such as a fin or tube, may be used as a substrate, the surface may be etched or grained beforehand to improve the adhesion of a subsequently applied coating, or at any convenient time, such as to create or enhance a particular surface morphology. Surfaces may be mechanically grained, such as via ball-graining and slurry brushing; or electrograined, which is electrochemical etching via alternating current (AC) in an acidic solution, or electrolytically etched, which is etching via direct current (DC) in an electrolyte bath (all of these methods and numerous variations are well known in the art).

In the case of closely spaced heat exchanger fins such as those described in a preferred embodiment of a previously described compact adsorption chiller, mechanical graining processes may operate at a scale that may be insufficiently precise for (and possibly damaging to) thin metal fins set at a very fine pitch (in a preferred embodiment, for example, the fins may be about 50 microns thick and spaced less than 425 microns apart). In such cases, mechanical graining may be strongly contraindicated.

In the context of FRAME, it may be highly desirable to achieve a level of control over the surface topography and morphology that may result from metal surface etching or graining, so as to be able to balance potentially competing objectives and motivations for graining particular surfaces.

Conventional Electrograining of Aluminum in an Acid Electrolyte

Conventional electrograining as defined in U.S. Pat. No. 4,087,341 (1978) comprises the use of standard (symmetrical) alternating current (AC) in the electrograining process (such as current passed between two aluminum plates or sheets facing each other or between an aluminum plate and a suitable counter electrode) in an electrolytic cell containing an electrolyte.

Conventional electrograining typically results in an etched structure that depends almost entirely on the electrolyte itself, the main or sole solute of which would typically be nitric acid or hydrochloric acid. An electrolyte comprising mainly nitric acid typically yields a grained surface with a relatively finely pitted structure where the surface is formed of fine pits that contain many finer pits, which are generally shallow (a so-called "pits-within-a-pit" structure). In contrast, an electrolyte comprising mainly hydrochloric acid typically yields individual pits which are generally deep, but whose surface is relatively smooth (without the complex "pits-within-a-pit" graining that occurs with nitric acid). Thus, in the conventional electrograining process using conventional AC, the electrolyte composition considerably restricts the electrograining conditions, consequently limiting the resultant topography and pit size within narrow ranges that are inadequate to meet the needs of certain versions of the present invention, which would benefit greatly from a surface topography comprising a combination of generally deep pits (i.e., high aspect ratios) like those which may be caused by hydrochloric acid and so-called "pits-within-a-pit" structures like those which may be caused by nitric acid.

Preferred, Unconventional Electrograining with Regulated AC, but Asymmetric Anode and Cathode Voltages ($V_A > V_C$)

In a preferred embodiment, aluminum heat exchanger surfaces may be electrograined using any of several process variations originally intended for lithographic printing, as taught in U.S. Pat. No. 4,087,341, either prior to coating, or, in some cases, in lieu of coating. U.S. Pat. No. 4,087,341 teaches that the topography and pit size may be varied without impairing grain uniformity by independent control of both anodic and cathodic reactions, and that this may be accomplished by using "regulated alternating current" (hereafter, "regulated AC"). As taught in U.S. Pat. No. 4,087,341, regulated AC indicates an electric current in which the anodic voltage, cathodic voltage, and duty cycle are respectively independently regulated in contrast to conventional AC, and such regulation may be independent of the specific electrolyte chosen (e.g., mainly nitric acid or mainly hydrochloric acid).

U.S. Pat. No. 4,087,341 teaches that when an aluminum substrate is electrograined using as electrolyte either of hydrochloric acid or nitric acid, a uniformly and finely grained substrate with "pits-within-a-pit" structure may be efficiently obtained within a short time, by using regulated AC, which is characterized by applying an inter-electrode voltage in which the anodic voltage $V_A$ is arranged to be higher than cathodic voltage $V_C$, thereby adjusting anodic coulombic input ($Q_A$) to be greater than cathodic coulombic input ($Q_C$). The diameter and depth of the pits may be optionally adjusted by properly selecting the ratio of cathodic coulombic input to anodic coulombic input $Q_C/Q_A$ given by the voltage adjustment.

Although U.S. Pat. No. 4,087,341 does not teach the cause-and-effect relationships between various electrograining process parameters, it does provide enough data to draw specific conclusions highly relevant to certain versions of the present invention, particularly with respect to surface roughness ($H_{MAX}$), a measure of maximum pit depth (in microns), and uniformity. In particular, for certain versions of the present invention, using a sinusoidal regulated AC voltage waveform and an electrolyte comprising mainly hydrochloric acid may be preferred over other waveform and electrolyte combinations (in order to induce deeper pits), and strongly preferred over an electrolyte comprising mainly nitric acid regardless of waveforms, since the former bested the latter by a factor of 3 in terms of surface roughness ($H_{MAX}$), yielding a high of 10 microns for hydrochloric acid and a high of only 3.2 microns for nitric acid, as noted in the table of FIG. 85 (derived from Tables 1 and 2 of U.S. Pat. No. 4,087,341).

Post-graining surface roughness may be particularly relevant when compared to the particle size distribution of a preferred coating that may be applied subsequently, such as RUBE™ Sorbent, which, in one embodiment, may comprise a distribution of sorbent particle sizes that may include, for example, about 10% under 7 microns in size, and perhaps 50% under 30 microns in size (i.e., sieved with a finer mesh), and whose thermal enhancement particles (e.g., diamond powder) may be typically 0.5 microns to 7 microns in size, with a mean of about 3 microns to 4 microns. It may be beneficial, however, that the sizes of a portion of the particles of a subsequent coating somewhat exceed the surface roughness, so as to augment the opportunities for reentrant channels and paths among the various particles.

In a preferred embodiment, the electrolyte to be used for electrograining may be hydrochloric acid-based, comprising an aqueous solution containing 0.05 to 5 weight % of hydrochloric acid, to which slight amounts of inhibitors and stabilizers may be added as known in the art, for example, chlorides such as zinc chloride, ammonium chloride and sodium chloride, amines such as monoamine and diamine, organic compounds such as aldehyde and EDTA, and acids such as phosphoric acid, chromic acid and nitric acid.

Figure 88:
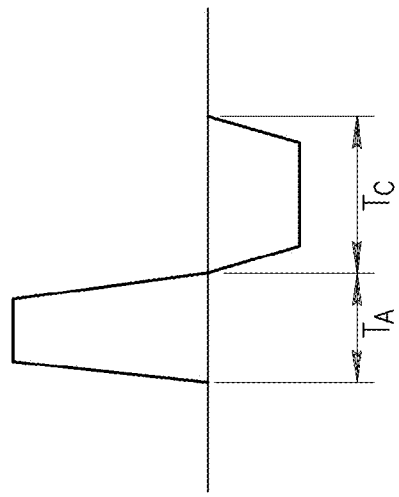
FIG. 88: RUBE™ Surface Treatment—Examples of Trapezoidal Voltage Waveform for the "Regulated AC" of U.S. Pat. No. 4,087,341
Figure 87:
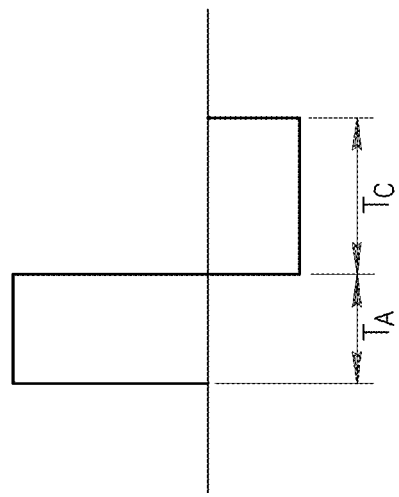
FIG. 87: RUBE™ Surface Treatment—Examples of Square Voltage Waveform for the "Regulated AC" of U.S. Pat. No. 4,087,341
Figure 86:
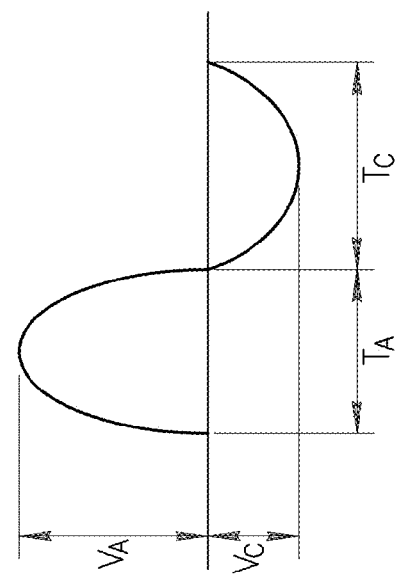
FIG. 86: RUBE™ Surface Treatment—Example of Sinusoidal Voltage Waveform for the "Regulated AC" of U.S. Pat. No. 4,087,341

FIG. 86, FIG. 87, and FIG. 88 show examples of voltage wave-forms for the regulated AC of U.S. Pat. No. 4,087,341 in which the shape of the wave-form varies for two different half cycle duration relationships, but the aforesaid regulated AC need not be limited to these specific voltage waveforms. Any of these waveforms may yield surface roughness and uniformity sufficient for a preferred embodiment, with the sinusoidal waveform generally yielding the most suitable results of the three shown here, and thus being the most preferable.

As taught in U.S. Pat. No. 4,087,341, the frequency of the regulated AC need not be limited to the ordinary AC frequency range provided by utility power (i.e., 50 Hz or 60 Hz). In a preferred embodiment for the preparation of heat exchanger surfaces as contemplated here, the frequency may be lower than 50 Hz, so as to obtain coarser pits, since higher frequencies tend to form finer pits on the grained surface.

In a preferred embodiment, the heat exchanger or other metal surface may be electrograined using a regulated AC having a voltage wave-form of the general type illustrated in FIG. 86, FIG. 87, or FIG. 88, where an inter-electrode voltage may be applied with the anodic voltage $V_A$ arranged to be higher than the cathodic voltage $V_C$, as depicted, thereby adjusting the anodic coulombic input $Q_A$ to be greater than the cathodic coulombic input $Q_C$. The ratio of the cathodic coulombic input $Q_C$ to the anodic coulombic input $Q_A$, i.e., $Q_C/Q_A$, needed to impart to the substrate a grained surface having a uniform and stable "pits-within-a-pit" structure is about 0.3 to 0.8, and preferably 0.4 to 0.7, where the electrolyte is of hydrochloric acid, the preferred voltage range is from 100V to 50V for the anodic voltage $V_A$, and the cathodic voltage $V_C$ is lower than the anodic voltage $V_A$.

In a preferred embodiment, the anodic half-cycle period or time $T_A$ in the regulated AC may be almost equal to cathodic half-cycle period or time $T_C$, but by extending the cathodic time $T_C$ relative to anodic time $T_A$ in the abovementioned range of coulombic input ratios $Q_C/Q_A$, it may be possible to reduce the amount of electrical energy required for electrograining, and consequently thereby also reduce power and electrolyte consumption. Although the anodic time $T_A$ in the regulated alternating current may be almost equal to the cathodic time $T_C$ in a preferred embodiment, increasing the cathodic time $T_C$ to exceed the anodic time $T_A$ (as depicted in FIG. 86, FIG. 87, and FIG. 88) in the above-mentioned range of coulombic input ratio $Q_C/Q_A$ may further reduce the time needed for electrograining, and thereby also further reduce power and electrolyte consumption.

Electrolytic Anodic Etching in an Aqueous Electrolyte with Low-Voltage DC

In a preferred embodiment, the electrolytic anodic etching process removes metal etched from the anode (which is the metal substrate to be etched, and which may be of arbitrary shape) and deposits all of it on the cathode (which may be an electrode or electrode array of the same or similar material). Depending on the nature of the cathode surface, the cathodes may either retain the metal or let it fall to the bottom of the electrolytic bath (from which it may be readily removed and recovered by filtration). In a particular embodiment, both the anode and the cathode(s) may comprise copper or alloys thereof, and especially those which may be commercially available as CuproBraze®-compatible materials, so any metals etched therefrom would likewise be comprise primarily copper.

US5102520 (1992) describes the problems with acid-based etching processes of the then-prior-art, including the need for rather strong acids and solvents that may be inherently dangerous and may also require substantial ventilation to protect workers from generated fumes. The problems of exhausted (spent) acid baths are also described, including that their disposal must include various neutralization steps that may be expensive, after which the baths may still contain large quantities of environmentally harmful metal (e.g., copper). U.S. Pat. No. 5,102,520 teaches that the solution to the problems of using harsh acids in prior etching procedures may be avoided by using an electrolytic process that requires only mild acids (e.g., pH preferably between 3 and 6, which is not low enough to act as an etchant or to require neutralization, and suitably between 3 and 5), or alternatively, non-acidic electrolytes (e.g., pH of 7, which is neutral, or higher, although the latter may be generally undesirable due to the formation of metallic oxides, which may tend to passivate the anode).

U.S. Pat. No. 5,102,520 also describes the problems with the electrolytic (anodic) etching processes of the then-prior-art, including that they may operate at high voltages and rather substantial current levels, thereby giving rise to the generation of gases such as oxygen and hydrogen, which in certain concentrations may be highly explosive and therefore hazardous. In the electroplating arts (which is rather the reverse of electrolytic etching), voltages may be kept under about 2 VDC, precisely to avoid the generation of hydrogen bubbles, partly because it interferes with a smooth, well-adhering deposit.

In a preferred embodiment, electrolytic or anodic etching of a metal substrate in preparation for further surface treatment (which may comprise various coating and treatments taught in a later section herein), may be accomplished by maintaining the etching operation within a narrow voltage range as taught by U.S. Pat. No. 5,102,520, wherein the minimum voltage is controlled by that potential needed to convert the metal of the object or surface(s) to be etched (which may be partly covered by resist, such as wherever the metal is not to be etched) into ionic form (i.e., at least at a magnitude corresponding to the ionization potential of the surface's metal in the selected non-acidic or mildly acidic electrolyte), and wherein the maximum voltage is that voltage above which hydrogen gas is generated at the cathode (i.e., not to substantially exceed the sum of the decomposition voltage of the aqueous electrolyte and the overvoltage of the selected cathode). In a preferred embodiment, positive DC voltage at a selected current level may be supplied to the anode (where the etching is to occur), with the negative voltage terminal of the supply source connected to the cathode.

In a preferred embodiment, the selected electrolyte must contain electro-conductive ions, but a low concentration such as 0.05M to 0.2M is adequate, and higher concentrations may not noticeably improve process performance. It is unimportant whether the selected anions are organic or inorganic, or whether they comprise a strong or weak acid. Sulfates (i.e., sulphates) may be preferred from the viewpoint of availability, solubility, and toxicity, but other anions such as chlorides, nitrates, and acetates may be used alternatively.

In a preferred embodiment which may be of particular value for use with CuproBraze®-compatible materials, the preferred electrolyte may be copper sulfate, with a pH preferably between 3 and 6, and suitably between 3 and 5, neither of which is a sufficiently strong acid to act as an etchant on its own, or to require neutralization (which would add expense). The electrolyte temperature is not particularly critical, but must remain above the freezing point of the selected electrolyte and below the softening temperature of the selected resist (if one is used), or otherwise up to about 34° C. (93° F.), which is also the boiling point of a preferred RUBE™ LT2 phase-change working fluid at STP. Lower temperatures may be used, and 22° C. (about 72° F.) may be common, especially if a resist used to mask out areas not to be etched.

NOTE: RUBE™ LT2 phase-change working fluid is mentioned here because it may be used to implement a very stable electrolyte coolant system based on isothermal heat exchange, without the use of actual refrigeration equipment. Heat from the electrolyte may transferred to the RUBE™ LT2 liquid via a liquid-to-liquid heat exchanger, causing phase-change in a portion of the fluid. RUBE™ LT2 vapor will readily condense to liquid at most ambient temperatures, thereby rejecting its heat to ambient (e.g., via a liquid-to-air heat exchanger), at which point it may be recirculated as liquid coolant.

In a preferred embodiment, and in accordance with U.S. Pat. No. 5,102,520, the specific DC voltages suitable for electrolytic etching depend upon a combination of the constituents of the electrolyte, the nature of the metal substrate (anode), and the nature of the electrode (cathode), and may be determined from known reduction potentials. In a preferred embodiment, the voltage must be sufficiently high to convert metal from the anodic substrate to be etched into ionic form (ions). In a preferred embodiment which may be of particular value for use with CuproBraze®-compatible materials, in a copper sulfate electrolyte, the preferred voltage may be from somewhat below 0.5 VDC to a normal upper limit of about 1.7 VDC, which is the highest voltage at which hydrogen is not generated at the cathode, which is more or less a function of the relationship between the material of the cathode (i.e., preferably, some sort of copper electrode, which may be of the same material as the substrate to be etched) and the selected electrolyte (preferably, copper sulfate), so it may differ for other combinations. In a preferred embodiment, an overvoltage phenomenon known in the art may also apply, which may raise the voltage at which hydrogen may be generated, such as to a higher upper voltage limit of about 2.2 VDC (which may be useful for optimizing the etching of larger assemblies, since equivalent coulombic inputs may be supplied at lower current levels).

In a particular embodiment involving CuproBraze®-compatible materials, it should be noted that the CuproBraze® alloys, while primarily copper, may also contain substantial amounts of zinc. For example, CuproBraze® brass alloy C66420 may comprise 85% copper and 14% zinc, with the balance being other additives such as 0.9% iron. This may be restrictive for some applications, since it may constrain the useful upper voltage limit. In a preferred embodiment, for example, the preferred etching voltage for zinc may be perhaps half that of copper, although this may be mitigated by the fact that intentional zinc etching might normally use zinc sulfate as the electrolyte rather than copper sulfate.

Etching times may vary from as little as 5 minutes at 0.5VDC to more than 90 minutes, and for a given surface area, higher voltages may cause etching to occur more quickly. Longer etching periods, higher voltages, and higher current levels (e.g., higher total coulombic inputs) may be needed for substantial surface areas, especially for deeper etches (note that electrolytic etching may completely cut through a metal substrate, and this may or may not be desirable).

The selected voltage and current profile may be applied and maintained until the desired depth of metal has been removed from the exposed metal surface(s), which, in a preferred embodiment may result in relatively deep pits (i.e., high aspect ratios), which may serve to not only increase the surface area and number of cavities, but also the reentrancy of those cavities (which may be especially helpful in conjunction with any subsequent coatings and depositions). In a preferred embodiment, specific patterns may be etched into the anodic substrate through the use of resists. In a particular preferred embodiment, a resist is coated onto the substrate in such a way that there is selective adhesion, and therefore selective etching, resulting in a desired pattern of surface roughness (e.g., pits and grooves with high aspect ratios, to aid in the formation of reentrant cavities).

U.S. Pat. No. 5,102,520 describes an apparatus for etching the aforementioned metallic object or surface(s) wherein the etchant force may be controlled by controlling the voltage, and by sensing the temperature and pH of the electrolyte so that the parameters may be manually maintained at the desired levels. In a preferred embodiment deviating substantially from U.S. Pat. No. 5,102,520, the simple manual controls contemplated in U.S. Pat. No. 5,102,520 may be further extended to comprise computer-monitored and controlled variation of process parameters, such as temperature, pH, voltage, current, and frequency. In particular preferred embodiment, the computer-controlled electrical parameters may comprise time-varying coulombic input profiles further comprising arbitrary current densities achieved with DC pulses having controllable amplitudes, pulse widths, and ramps, or low-frequency regulated AC waveforms which may be highly asymmetric (effectively toggling between etching and plating to induce particular surface morphologies).

The apparatus of U.S. Pat. No. 5,102,520 is further described as comprising a means for reversing the polarity of the anode and cathode (the applicability of this to certain versions of the present invention is rather the reverse of etching, namely, the ability to redeposit or plate metal onto a surface, potentially including the surface from which it originated, which is additionally described, extended, and applied in the next section (see RUBE™ Metal Coating).

In a preferred embodiment, deviating from the teachings of U.S. Pat. No. 5,102,520, the electrolytic bath may be sonicated or magnetically stirred to maintain ionic consistency of the electrolyte. In a preferred embodiment, the electrolyte may be circulated so as to be able to direct ion-rich flows where desired, which is particularly applicable in a reverse-etching scenario (i.e., where the roles of anode and cathode are reversed, so that the electrode becomes the anode, which may be "etched" to provide a source of metallic ions to be plated onto the target substrates (now fulfilling the cathode role). In a preferred embodiment, pumped liquid streams enable ion-rich flows to be directed toward difficult-to-reach cathodic surfaces. In a particular embodiment, said pumping action may be provided by a jet pump motivated by "clean" liquid at the motive port, which may be provided by a conventional electric or mechanical pump which may not tolerate exposure to the electrolyte.

In a preferred embodiment, certain versions of the present invention may utilize and extend the teachings of U.S. Pat. No. 5,102,520 to achieve low-voltage electrolytic etching of heat exchanger surface substrates primarily comprising various copper and copper alloy formulations, including, without limiting the generality of the foregoing, various commercially available, patented, and/or patent-pending formulations such as the CuproBraze® family of alloys and related brazing materials, products, and results of CuproBraze®-related processes. The substrates may be simple flat surfaces, or complex three-dimensional shapes (which may complicate cathode placement).

Figure 94:
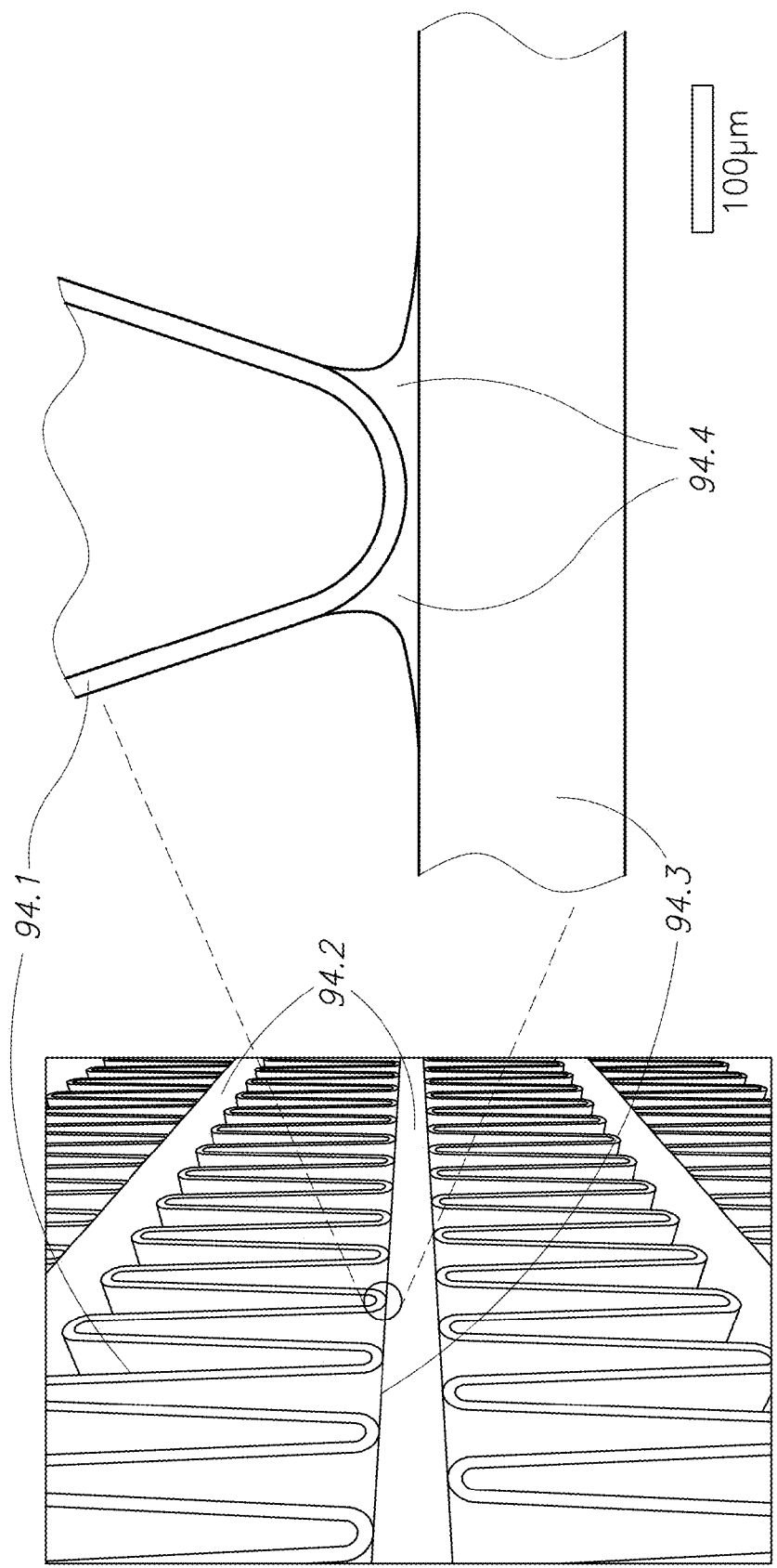
FIG. 94: RUBE™ Braze Coating—Microstructure of CuproBraze® Joint between CuproBraze® Fins and Flat Tubes Used as Substrates

For example, in a preferred embodiment, the "serpentine folded fin" (an example of which is depicted in FIG. 94), which is often characteristic of heat exchangers fabricated via CuproBraze® processes, may be electrolytically etched either before or after being partly coated with RUBE™ Braze Coating or other CuproBraze®-compatible braze paste (in fact, some of the paste's non-metallic binder constituents may serve as a resist, which may or may not be desirable), and these steps may be performed prior to, or after, the fin-material substrate is folded into its serpentine shape. In a preferred embodiment, at least an initial electrolytic etching of the surface, with a prior or subsequent coating step, may precede the folding step.

In another preferred embodiment, certain versions of the present invention may utilize or extend the teachings of U.S. Pat. No. 5,102,520 to achieve low-voltage electrolytic etching of heat exchanger surface substrates such as sheet metal strips or sheets destined to become heat exchanger tubes, for example, prior to folding and welding or brazing them into their final shape, and such etching may occur in addition to any prior etching steps. In particular, by electrolytically etching both sides of a substrate prior to shaping, the resulting tube or other three-dimensional shape may benefit from having both its interior and exterior surfaces treated in a straightforward way. Such treatments may be optionally extended or differentiated (e.g., for example, between exterior and interior surfaces) through the use of "resists" which may be applied as coatings to selectively control the electrolytic etching with respect to specific surface areas (e.g., by preventing, hampering, or accelerating the etchant forces in those areas), and such treatments may be combined in iterative process steps.

In still another preferred embodiment, certain versions of the present invention may utilize or extend the teachings of U.S. Pat. No. 5,102,520 to achieve low-voltage electrolytic etching of heat exchanger surface substrates after they have been assembled and brazed (or otherwise fabricated) into higher-order components, and such etching may occur in addition to any prior etching steps. As with simple substrates, such treatments may also be optionally extended or differentiated (e.g., for example, between exterior and interior surfaces) through the use of resists applied as coatings to selectively control the electrolytic etching with respect to specific surface areas (e.g., by preventing, hampering, or accelerating the etchant forces in those areas), and such treatments may be combined in iterative process steps.

RUBE™ Metal Coating

In a preferred embodiment, a heat exchanger surface that is thermally unenhanced, or has been enhanced by a combination of chemical or mechanical means, may be further enhanced by an application of RUBE™ Metal Coating, which may comprise, for example, electrolytically etching (e.g., roughening) a substrate and, optionally, subsequently electrolessly-plating or electroplating it (e.g., further roughening it via columnar formations), and then applying an optional microporous metallic coating, optionally followed by further sequences of etching and/or plating in an iterative fashion In one preferred embodiment, the process and apparatus of U.S. Pat. No. 5,102,520 (1992), which may be primarily viewed as means for etching, is further described as comprising the means for reversing the polarity of the anode and cathode, thereby reversing the etching process and enabling the ability to redeposit or plate metal onto a surface, potentially including the surface from which it originated. In a preferred embodiment, this technique may be used in conjunction with a just-etched substrate in order to reuse a portion of the metal removed through etching as the basis for redeposition of metal, in order to create columnar and/or dendritic features which may significantly increase the substrate's surface area, reentrant cavities, and nucleation sites. In the context of such embodiments, the underlying substrate may be an otherwise unenhanced simple substrate, or a more complex substrate comprising optional surface enhancements, which may further comprise porous or microporous morphologies such as the commercially available 3M™ Microporous Metallic Boiling Enhancement Coating (BEC) L-20227 depicted in FIG. 89 (SEM image provided by 3M Corporation).

In another preferred embodiment, the method and apparatus taught in US2010/0193365 A1 for constructing electrodes for a battery or an electrochemical cell may be integrated with the aforementioned teachings of U.S. Pat. No. 5,102,520, thereby enabling the adaptation of its method to the construction or treatment of enhanced thermal substrates (such as heat exchanger surfaces) rather than electrical substrates (e.g., electrodes for batteries or capacitors). In the context of such an embodiment, as with those which may comprise the aforesaid process and apparatus of U.S. Pat. No. 5,102,520, the underlying substrate may be an otherwise unenhanced simple substrate, or a more complex substrate comprising optional surface enhancements, which may further comprise porous or microporous morphologies such as those depicted in FIG. 89.

In a preferred embodiment, an exemplary heat exchanger surface may be formed by applying teachings from both U.S. Pat. No. 5,102,520 and US2010/0193365 A1 (the former teaches a means for artistic expression in the form of etchings, and the latter teaches a means for constructing electrochemical cells such as batteries and capacitors). The RUBE™ Metal-Coating may be manufactured and applied to an underlying substrate (simple or complex, and enhanced or not) via a sequence of steps which may be repeated as desired while varying key parameters to achieve particular effects, as taught below.

Step 1: Optionally apply metal surface etching or graining to an underlying substrate, in accordance with previous sections, which may comprise chemical, electrical, or mechanical means, singly or in combination.

In one embodiment, the substrate may comprise any of the not-yet-brazed components of a to-be-brazed assembly, preferably to be brazed in accordance with a CuproBraze®-compatible process, further comprising a RUBE™ Braze Coating as described in a later section.

Step 2: Optionally apply a porous or microporous coating onto the outermost underlying substrate so as to superimpose a mesh structure having reentrant cavities.

In one embodiment, a substrate (which may be preferably copper or an alloy thereof) that may be thermally unenhanced, or may have been enhanced by any combination of means in step 1, may be further enhanced by applying a thin layer (preferably less than 2 mm) of porous or microporous reticulated, open-celled organic foam layer (such as polyurethane with a 97% void volume, and having a pore density of 100 pores per inch or greater) so that the foam is in contact with the substrate, in accordance with the teachings of U.S. Pat. No. 4,129,181 (1978), then electrolessly applying a layer of copper to make it electrically conductive (the foam itself is an electrical insulator), preferably followed by a thin layer (in the range of about 6 to 65 microns) of electroplated copper (deposited via standard copper sulfate electroplating solution and DC voltage with a copper electrode), then subsequently pyrolyzing the foam at 300° C. to 480° C. (about 575° F. to 900° F.), so as to leave a three-dimensional copper mesh structure having a high density of nucleation sites and pore openings that may be in the range of 1 to 5 mils.

In another embodiment, the substrate may comprise a brazed assembly, preferably brazed in accordance with a CuproBraze®-compatible process, further comprising a RUBE™ Braze Coating as described in a later section.

Figure 89:
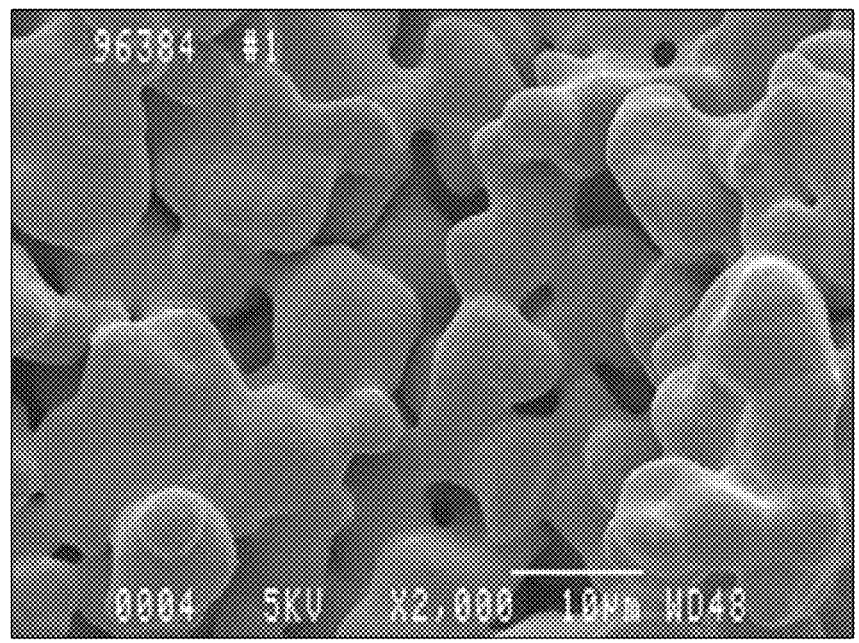
FIG. 89: PRIOR ART—Example of Microporous Heat Transfer Surfaces (SEM image courtesy of 3M Corporation)

In still another embodiment, depicted in FIG. 89, the aforementioned optional microporous metallic coating may further comprise a commercially available 3M® Microporous Metallic Boiling Enhancement Coating, or a similar coating, as may be described (but not directly called out) in U.S. Pat. No. 7,695,808 (2010). Prior to application, the commercially available 3M® Microporous Metallic Boiling Enhancement Coating may be a powder which may further comprise sub-20-micron copper particles coated with 0.5% silver by weight, which, in accordance with manufacturer recommendations may be applied to a copper or other metal substrate in a layer about 100 to 300 microns thick, and preferably, about 150 microns thick, with the powder either dry or in a volatile binder (e.g., as an emulsion comprising the selected coating powder with 10% to 15% oil), then elevated to an interim temperature suitable for evaporating or pyrolyzing the binder (e.g., 300° C. for a particular oil), if any, and then elevated to a fusion temperature (e.g., typically 850° C.) in the absence of oxygen (e.g., in a vacuum furnace or inert-gas atmosphere), such that the silver may diffuse into the copper, temporarily forming a eutectic that melts and re-solidifies, before cooling, as diffusion progresses, and such that the coating may provide optimal boiling heat transfer coefficients with selected engineered working fluids, such as RUBE™ LT2 fluids.

When the selected coating powder is 3M® Microporous Metallic Boiling Enhancement Coating, applied at a thickness of 150 microns, the resultant microporous coating depicted in FIG. 89 may contain about 0.52 kg of powder particles per square meter of heat exchange surface area (i.e., a surface coverage of about 1.92 m²/kg).

Step 3: Optionally deposit a barrier layer to prevent or inhibit diffusion of subsequently deposited materials into an exposed underlying substrate, if such prevention or inhibition of diffusion is needed. The barrier layer may be deposited via electroless deposition, electroplating, or chemical vapor deposition (CVD), all of which are well known in the art. Exemplary barrier layers (which may be catalytic layers serving as barrier layers) and barrier layer deposition techniques are further described in US2003/0143837 A1.

Figure 90:
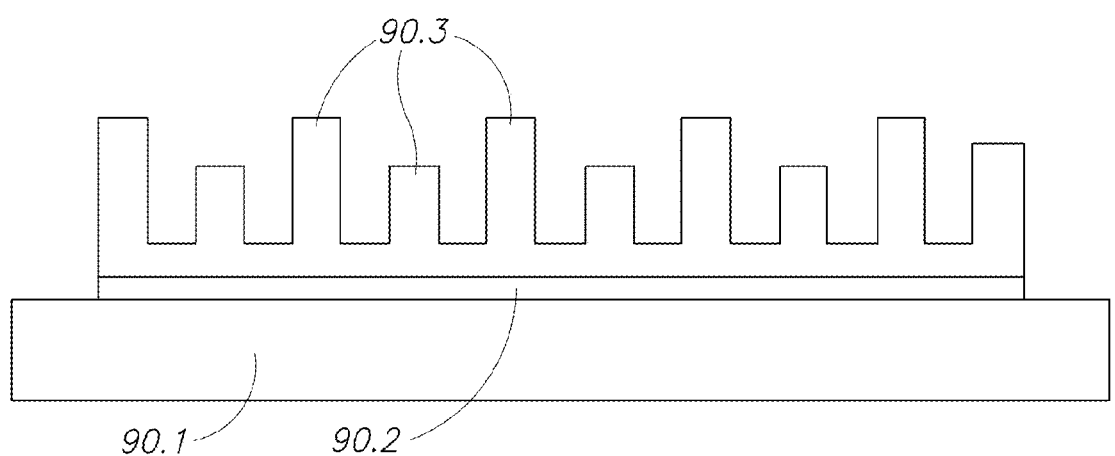
FIG. 90: RUBE™ Metal Coating—Examples of Seed Layer Options (adapted from FIG. 3D of US2010/0193365 A1)

Step 4: Optionally deposit a seed layer to provide an electrically conductive substrate for a subsequent step (this may only apply if the immediately underlying substrate or layer is electrically non-conductive, such as when diamond, or a dielectric sorbent, has been deposited or otherwise applied as a consequence of steps outside this process, as referenced in step 9). This layer may be a conventional metal layer as taught in US2010/0193365 A1 and notionally depicted in FIG. 90 as a seed layer [90.2] over a possibly non-conductive substrate [90.1], or, in a preferred embodiment which is a significant departure from US2010/0193365 A1, it may comprise metal-coated particles (for example, commercially available copper-coated, silver-coated, or nickel coated diamond powder, such as the copper-coated diamond powder depicted in FIG. 91, or other particles, such as the silver-coated copper "trees" depicted in FIG. 92 (whose examples are 18% silver, 35 μm average size, TD=2 g/cc), which may be deposited using a suitable deposition method (e.g., electroless). Other exemplary seed layers (which may be catalytic layers serving as seed layers) and seed layer deposition techniques are further described in US2003/0143837 A1.

Step 5: Optionally apply electroplating with a coulombic profile suitable for forming a columnar metal layer [90.3] over the electrically conductive substrate or seed layer [90.2] of a previous step, by establishing the preferred process conditions (such as those under which the evolution of hydrogen results in the formation of a porous metal film), as notionally depicted in FIG. 90.

In a preferred embodiment, the electrolytic anodic etching process of the previous section in accordance with U.S. Pat. No. 5,102,520 (1992) may be operated in reverse, such that the conductive substrate to be electroplated, which was the anode to be etched in the previous process, becomes the cathode in the reversed process, whereby a reversal of the previous etching process may become an electroplating process that may take advantage of metal ions already deposited onto what was previously the cathode, but is now the anode in the reversed process. Essentially, the reversed process may use what was previously a cathode (but is now an anode) as a source of metallic ions by "taking them back" and redepositing them at what is now the cathode (but was previously the anode). In this manner, the conductive substrate may be effectively reshaped through a sequence of etching and electroplating, with a reduced net loss of metal, and thus a reduced need for external sources of metal or metal ions.

In a preferred embodiment, the deposition bias may have a current density in the range of about 0.05 A/cm$^2$ to about 10 A/cm$^2$, but preferably under about 3 A/cm$^2$, and in some cases, more preferably under about 0.2 A/cm$^2$. The current density may be used as a means to influence the relative thickness of the columnar metal layer (i.e., its height, in a direction normal to, but away from, the underlying substrate) on a micron-scale, over a range spanning more than two orders of magnitude, from about 1 micron up to about 300 microns. The lowest current densities (and lowest coulombic input) may result in thinner, more planarized (but still columnar) metal layers, such as with a thickness of, for example, between about 1 micron and about 5 microns. In another example, the highest current densities (and highest coulombic input) may result in the thickest and most distinctly columnar metal layers, such as with a thickness of up to about 300 microns, with more moderate current densities resulting in columnar metal layers having a thickness of, say, between about 30 microns and about 50 microns.

Processing may be simplified by adapting a commercially available electroplating chamber to perform one of more of the processing sub-steps as taught here in an integrated application of U.S. Pat. No. 5,102,520 and process steps 208 and 210 of US2003/0143837 A1. Suitable plating solutions may include electrolyte solution containing a metal ion source, an acid solution, and optional additives. When the substrate is copper and the electrolyte is a copper ion source (e.g., copper sulfate), process step 208 of US2010/0193365 A1 may deviate slightly from U.S. Pat. No. 5,102,520, by suggesting a copper ion concentration ranging from about 0.1M to about 1.1M, and preferably from about 0.4M to about 0.9M. Further deviations may be primarily oriented around electrolyte formulations for specific applications (which may require particular additives, and the use of stronger acids), and may not be especially relevant to certain versions of the present invention.

U.S. Pat. No. 5,102,520 teaches a method to avoid the production of hydrogen during etching. However, in a preferred embodiment, during the reversal of said method to perform electroplating, it may be optimally advantageous to intentionally deviate from the etching-oriented process parameters taught therein (such as lower voltages) in order to intentionally cause the evolution of hydrogen. In a preferred embodiment, the electrode or electrode array (previously the cathode, but now the anode) may be aggressively etched in order to create a high concentration of metal ions in the electrolyte which can be directed toward the substrate to be electroplated (previously the anode, but now the cathode). In a preferred embodiment, it may also be desirable to reduce the diffusion boundary layer (such as through sonication, circulatory, or other mixing actions), which may advantageously increase the concentration of metal ions near what is now (i.e., in the electroplating process) the cathode.

NOTE: Diffusion describes the spread of particles from regions of higher concentration to regions of lower concentration. The diffusion boundary layer is a thin (micron-scale) layer of fluid which, by virtue of its proximity to the edge of the main body of fluid, is not well mixed with the main body of fluid. In particular, this means that the ion concentration in the diffusion boundary layer may differ significantly from that in the main body of fluid, which may be generally undesirable in a conventional process.

In a preferred embodiment adapted from process step 208 of US2010/0193365 A1, the diffusion boundary layer may be intentionally allowed to become so large as to cause the transition to a diffusion-limited process. This is not done by minimizing the ion concentration, but rather by creating an extremely high localized demand for ions. In essence, despite a potentially high ion concentration in the electrolyte, the coulombic input may be increased (i.e., by increasing the positive voltage to the cathode, or substrate to be plated) so much that the plating process cannot keep up with the delivered power level, and the plating rate becomes current-limited (i.e., at this point, increasing the voltage will not increase the plating rate).

In a preferred embodiment, the deposition process is intentionally diffusion-limited, so that metallic ions are deposited faster than they can be supplied from nearby electrolyte (hence the term "diffusion-limited" process, which in this case is synonymous with "mass-transport-limited" process). In a preferred embodiment, this intentional rate-limited behavior may cause a low-density columnar metallic film to be produced, due to the evolution of gas and resulting dendritic film growth. Ions to be deposited on the main substrate may instead encounter metallic "feelers" or dendrites comprising the most recently deposited metallic ions (which of necessity must grow away from the substrate), and may thus be deposited onto the new growths rather than on the main substrate. The more new growth there is away from the main substrate, the less likely it becomes that new depositions will occur directly on the main substrate.

In a useful embodiment, planarization capability (i.e., the ability to reduce or inhibit columnar or dendritic growth and encourage deposition onto the main substrate plane) may be increased by any means that may reduce the occurrence of diffusion limitations, which, at its simplest, may be just a matter of not letting them occur in the first place (i.e., don't turn up the voltage so high). Alternatively, the concentration of ions may be further increased through the addition of acids or acid electrolyte derivatives to the plating solution.

In a preferred embodiment, in accordance with process step 208 of US2010/0193365 A1, the plating solution may optionally comprise one or more additive compounds, up to about 15% by weight or volume, which may further comprise suppressors, enhancers, levelers, brighteners, and stabilizers. Some additives may improve the effectiveness of the plating solution for depositing metal (e.g., copper) to the substrate surface, while others may control bubble formation, decrease ionization rate of the metal atoms in order to inhibit the dissolution process, or cause a particular finish on the substrate.

In a preferred embodiment taught here as an adjunct to step 208 of US2010/0193365 A1, the electrolyte bath may further comprise a second metal ion (e.g., silver, nickel, zinc, etc., as a second metal in a primarily copper bath) that will plate out or be incorporated in the growing electrochemically deposited layer or on the grain boundaries of the electrochemically deposited layer (i.e., the columnar and dendritic growths). The formation of a metal layer that contains a percentage of a second element may be useful to reduce the intrinsic stress of the formed layer and/or improve its electrical and electromigration properties. In one embodiment, it may be desirable to add an amount of a silver (Ag), nickel (Ni), zinc (Zn), tin (Sn), or lithium (Li) metal ion source to a copper plating bath to form a copper alloy that may have between about 1% and about 4% of the second metal in the deposited layer.

Step 6: Optionally apply electroless plating to deposit selected three-dimensional, cavity-inducing metal or metal-coated particles having high-surface area, very high thermal conductivity, and a propensity to induce high-density reentrant cavities.

Figure 91:
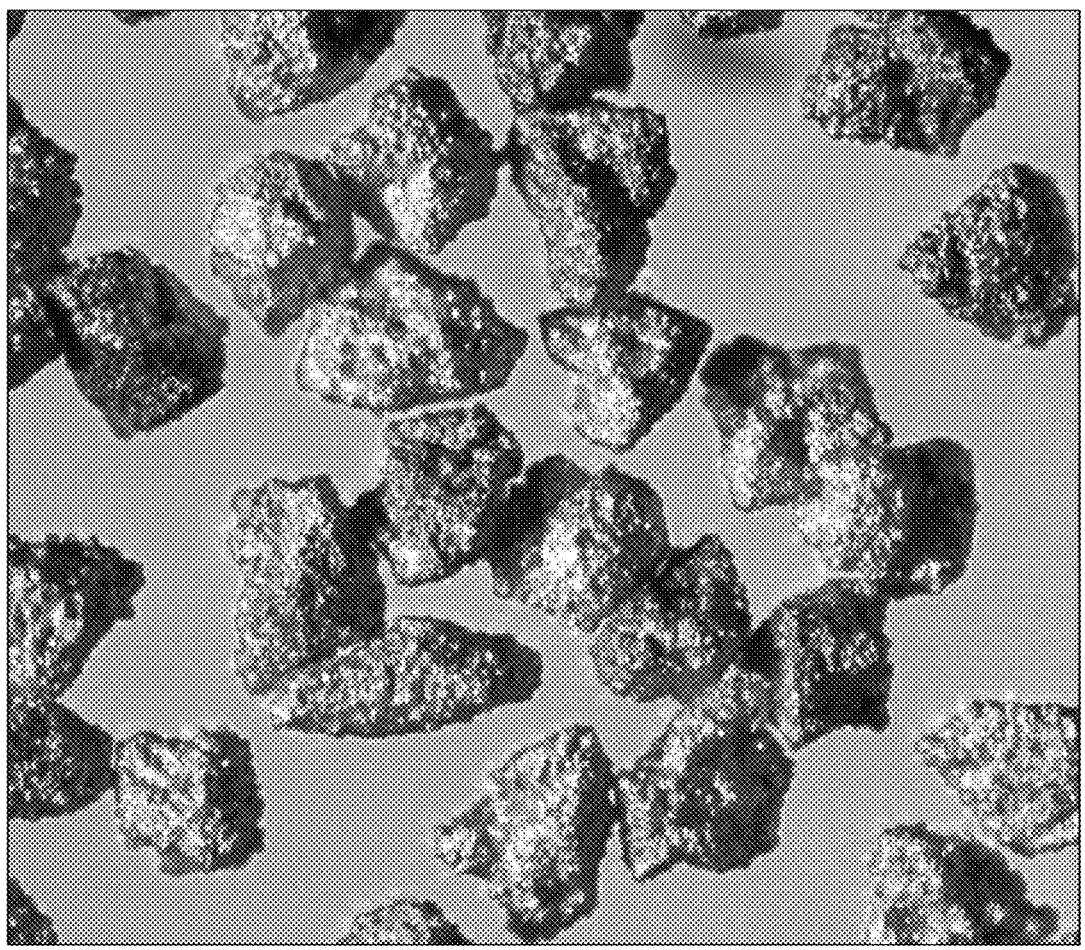
FIG. 91: RUBE™ Metal Coating—Examples of Copper-Coated Diamonds (SEM image courtesy of Advanced Abrasives)

In a preferred embodiment, copper-coated diamond powder (as previously depicted in FIG. 91 may be electrolessly deposited onto the nearest underlying substrate or growth, which may typically be a columnar metal layer as taught in step 5. Copper-coated diamond powders may be bounded with respect to the smallest sizes manufactured as a standard product (e.g., a typical minimum size range may be about 10 microns to 15 microns, with a mean particle size of about 15 microns), and this should be taken into consideration when determining the relative fit within enclosing (i.e., "sandwiched") layers.

Figure 92:
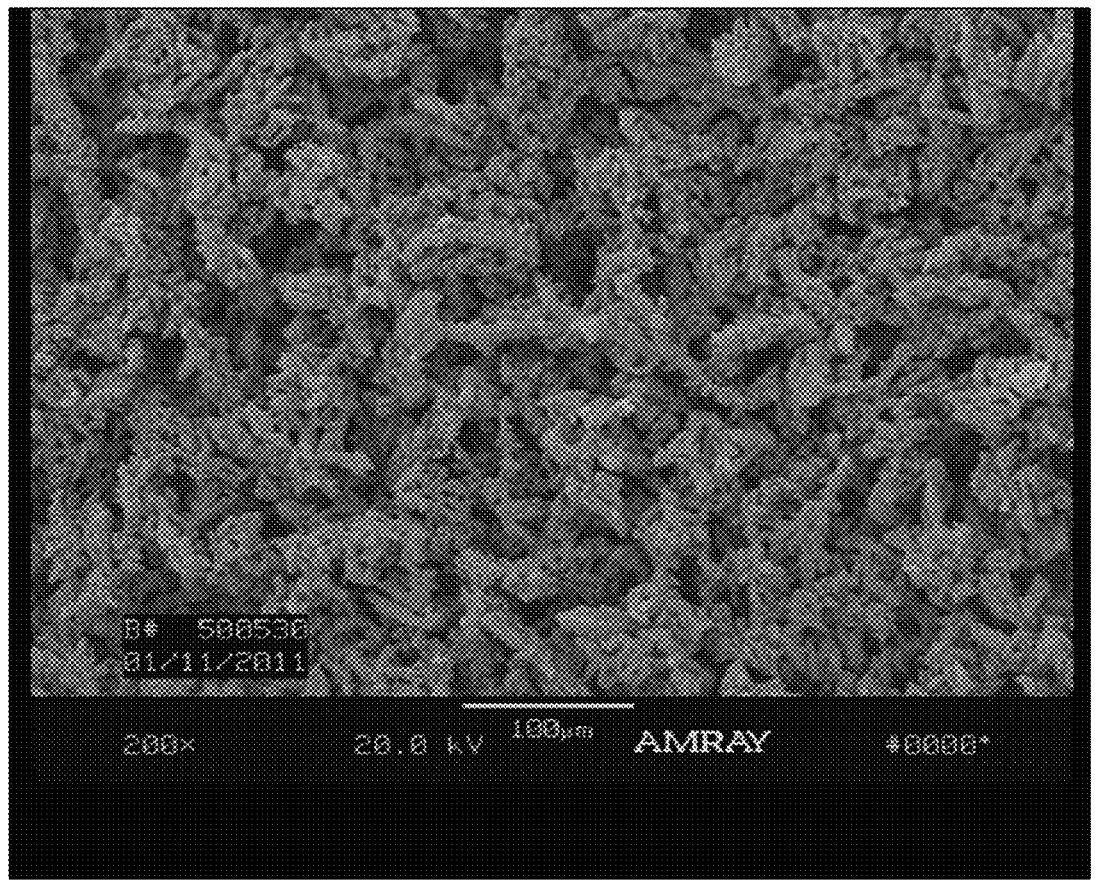
FIG. 92: RUBE™ Metal Coating—Examples of Reentrant-Cavity-Inducing Silver-Coated Copper "Trees" Material (Examples are 18% silver, 35 μm average size, TD=2 g/cc. SEM image courtesy of Ferro Corp.)

In another preferred embodiment, silver-coated copper "trees" as depicted in FIG. 92 (and which may be commercially available from Ferro Corp., of Mayfield Heights, Ohio) may be electrolessly deposited onto the nearest underlying substrate or growth, in lieu of the aforementioned copper-coated diamond powder. In still another preferred embodiment, said silver-coated copper "trees" may be utilized in conjunction with said copper-coated diamond powder, and they may be co-deposited in the same process iteration, or deposited separately in different process iterations. The mean particle size of the silver-coated copper "trees" (e.g., 35 microns) may affect their relative fit within enclosing layers.

Figure 93:
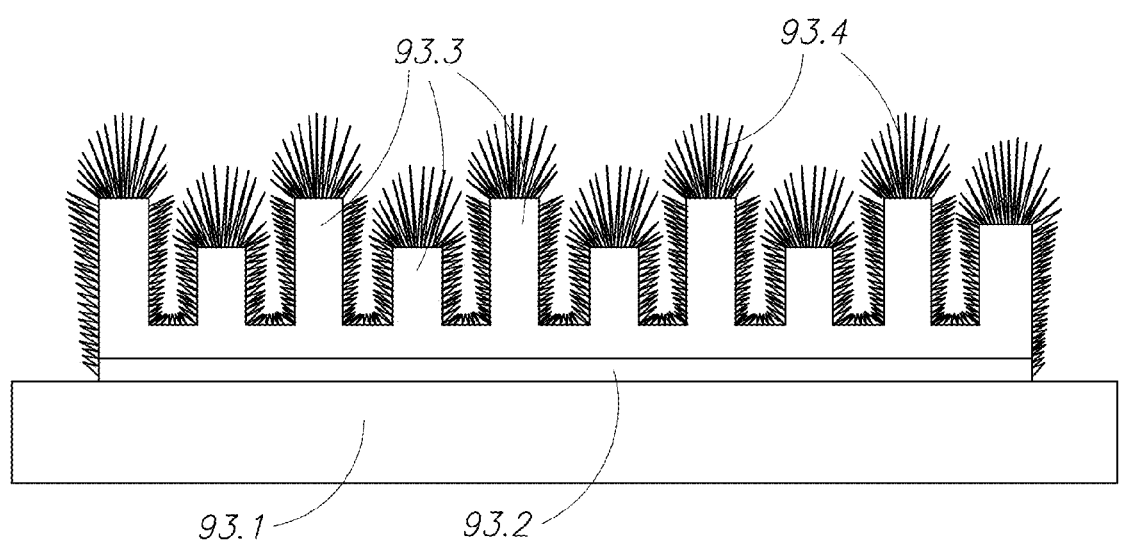
FIG. 93: RUBE™ Metal Coating—Notional Example of Dendritic Metal Layer

Step 7: Optionally, in a deviation from process step 210 of US2010/0193365 A1, apply dendrite-inducing electroplating onto the outermost of the substrates and or earlier growths resulting from any of the optional steps 1 to 6, in order to form a three-dimensional porous structure (as notionally depicted in FIG. 93) that may have porosity corresponding to between 30% and 70% of its total surface area.

This step is substantially the same as step 5, but with a variance in the coulombic delivery profile, so as to encourage dendrite growth over columnar growth. However, the dendrite growth tends to emanate from the electrolessly deposited particles of step 6 rather than the columnar layer of step 5. In particular, the voltage and corresponding current density may be increased beyond that used to deposit the columnar layer in step 5. In a preferred embodiment, the deposition bias may have a current density in the range of about 0.3 A/cm$^2$ to about 10 A/cm$^2$, but preferably under about 3 A/cm$^2$, and in some cases, more preferably under about 1 A/cm$^2$. The current density may be used as a means to influence the relative porosity of the dendritic structure, such as over ranges of porosities and pore sizes that may even be on different scales (i.e., orders of magnitude). For example, macroporous dendritic structures may have micron-scale pore sizes, such as up to about 100 microns, whereas mesoporous dendritic structures may have nanoscale pore sizes, with diameters between about 2 nm and 50 nm.

Note that columnar growth of step 5 must be encouraged first, for mechanical reasons, in a manner not unlike the manner in which a sturdy tree trunk necessarily precedes a large number of less-sturdy branches.

Step 8: Optionally deposit a metal passivation layer of typically sub-micron thickness, such as from about 1 nm to about 1000 nm (for example, from about 400 nm to about 600 nm), comprising copper or an alloy thereof (for example, a copper and tin alloy), in order to enhance the durability or longevity of the underlying dendritic structure of step 7, if step 7 is applicable.

Step 9: Optionally deposit additional (typically non-metal) layers as optimally advantageous (such as diamond, or sorbent), using their respective external deposition processes (described elsewhere). For example, a nanoscale monocrystalline or polycrystalline diamond layer may be deposited in order to enhance thermal performance, in addition to durability and longevity. In a preferred embodiment involving the deposition of a diamond layer, a RUBE™ Diamond Top-Coating method may be utilized, as described in a previous section; a carbon vapor transport (CVT) method such as RUBE™ Diamond Vapor Top-Coating may be strongly preferred, although more conventional methods may also be suitable. In a preferred embodiment involving the deposition of a sorbent, a RUBE™ Sorbent Coating method may be utilized, as described in a later section; an electrophoretic deposition method using nickel-decorated sorbent may be strongly preferred, although other methods may also be suitable.

Step 10: Optionally repeat the process, beginning with step 1, varying selected parameters and optional process steps as desired.

As a result of having applied RUBE™ Metal Coating to a suitable heat exchanger surface, whether internal or external, the surface may benefit by having an increased thermal exchange area (over that available on the underlying substrate) by way of an abundance of macroporous, mesoporous, or microporous cavities ("pores") which may be reentrant and optimally sized so as to facilitate the rapid onset (incipience) of nucleate boiling or fluid evaporation for selected engineered working fluids such as RUBE™ LT2 fluids, thereby minimizing both the wall superheat of the underlying substrate and the effective thermal resistance between the heat exchanger and the material with which it may be in intimate thermal communication (e.g., working fluid, or an additional layer such as a sorbent or RUBE™ Diamond Coating as described in a later section).

Additionally, as a result of an abundance of macroporous, mesoporous, or microporous cavities ("pores") which may be reentrant, RUBE™ Metal Coating may, when applied to a substrate that may act as a condenser of vapor onto its surface, substantially extend the condenser surface area while also enabling the immediate retention of substantial quantities of condensed liquid. In a preferred embodiment where said extended surface may be operated alternately as a condenser or evaporator, the working fluid to be evaporated may be substantially retained within the condenser itself without an additional need to transport it to or from another device or location.

RUBE™ Braze Coating

RUBE™ Braze Coating Background Information

Certain versions of the present invention comprise a method of manufacturing a heat transfer device such as a vapor-to-vapor or vapor-to-liquid heat exchanger that may be especially well-suited for use with phase-change working fluids operating over relatively wide temperature and pressure ranges, with the potential for correspondingly large temperature and pressure swings. In a basic process, the heat exchanger parts to be joined may be coated by thermally spraying a braze material, such as by plasma or wire-arc spraying, or by other application methods. Following assembly of all parts, the heat exchanger parts may be brazed together by heating the braze material to obtain brazed joints [94.4], such a between a fin [94.1] and the outer wall [94.3] of a tube [94.2], as depicted in FIG. 94, and thus form the heat transfer device. In a preferred embodiment, various of the heat exchangers for use in the FRAME apparatus of certain versions of the present invention may be advantageously constructed by modifying conventional heat exchanger fabrication or manufacturing processes in order to leverage economies associated with commercially available equipment. The modifications may be primarily concerned with augmentation of surface characteristics such as thermal surface area and topology, which may further comprise specialized coatings.

In a preferred embodiment, the application of special heat exchanger coatings may be integrated with the underlying heat exchanger fabrication or manufacturing processes, for the primary purpose of gaining process access to interior surfaces which would be otherwise relatively inaccessible in a finished heat exchanger (e.g., with a retrofit approach). In addition, by integrating the application of coatings with the underlying heat exchanger fabrication or manufacturing processes there may be significant opportunities for cost reduction, such as by streamlining redundant or overlapping steps.

In a preferred embodiment, a copper-brass brazing process such as the widely available CuproBraze® process represents a "best practice" that may be advantageously used to fabricate high-density RUBE™ phase-change heat exchanger assemblies which may comprise substrates further comprising serpentine folded fins [94.1] such as those sandwiched between flat tubes [94.2], as depicted in FIG. 94, wherein the fins [94.1] may provide the heat exchanger's primary vapor or air interface surfaces and the tubes [94.2] may provide its primary liquid interface surfaces, and wherein the CuproBraze® process may provide stronger, more durable, and more thermally efficient joints between said fins and tubes than previously possible, as depicted in FIG. 94, which may enable optimally advantageous high-density serpentine-fin designs comprising various RUBE™ surface coatings and treatments that may result in significantly enhanced thermal properties (over those presently available in the art).

NOTE: CuproBraze® and the CuproBraze® process are the intellectual property of the International Copper Association. Ltd., of New York City, N.Y., which licenses CuproBraze technology free of charge to heat exchanger manufacturers. The CuproBraze Alliance (CuproBraze.com) is a worldwide alliance of companies united by the common goal of promoting the CuproBraze technology for mobile and industrial heat exchanger applications, and summarizes the technology thusly: "CuproBraze heat exchangers are made using special anneal-resistant alloys of copper and brass. Tubes [94.2] are fabricated from brass strip and coated with a brazing filler material. The copper fins [94.1], coated tubes [94.2], headers and side supports made of brass are fitted together into a core assembly, which is then brazed in a furnace. CuproBraze technology is flexible and scalable."

In current practice, fins [94.1] like those depicted in FIG. 94 may start out as coils of copper strip, which must be converted into fins on a corrugated fin machine or fin mill. Numerous companies make tools and dies for processing metal strip and the high-speed machinery that folds, cuts and stamps copper strip into a wide variety of shapes, for external and internal fins. Fins may be folded into serpentine or square wave patterns, and with various cuts (e.g., split-fin design) to break up the boundary layer that may affect the transfer of heat from the fin to working fluid passing by the fin (especially when the working fluid is vapor or air, which may have inherently less heat transfer capability than liquid).

In current practice, tubes [94.2] like those depicted in FIG. 94 may start out as coils of brass strip. A tube mill gradually folds the brass strip into an open-seamed tube at high speed, and then carefully lines up the edges, which are typically joined by high-frequency induction welding in a later process step (or more preferably, in an advanced fabrication process based on U.S. Pat. No. 7,032,808 B2 (2006), as part of a one-shot brazing operation). The tubes [94.2] may be cut to length and passed on to subsequent process steps.

In a preferred embodiment, RUBE™ Braze Coating may comprise CuproBraze®-originated materials, and may further comprise additional CuproBraze®-compatible materials having desirable properties, and it is an object of versions of the present invention using the CuproBraze® process to integrate RUBE™ Braze Coating with the CuproBraze® process, in order to benefit from its designed-in advantages. Some of the key advantages of the CuproBraze® process over other methods which may be used to fabricate phase-change heat exchangers may include the following:

CuproBraze® processing comprises automated or semi-automated equipment (which may further comprise a continuous belt furnace), which can greatly reduce manufacturing costs compared to other manufacturing methods known in the art, which may be more labor-intensive. The CuproBraze® process is significantly enabled by OKC600, a novel brazing alloy-based filler material having numerous properties specifically engineered for reduced-temperature brazing processes (U.S. Pat. No. 5,378,294), along with several other new alloys, including new copper-fin and brass-tube alloys that have high strength at elevated temperatures. The table of FIG. 95 (from CuproBraze® Brazing Handbook, Edition #9, November 2009, page 28, obtained from www.CuproBraze.com) lists the nominal composition of CuproBraze® filler metals OKC600 and VZ 2255 (a filler which is mainly used for brazing foil but may also be used as a brazing powder). The table of FIG. 96 (adapted from Machine Design Magazine, http://machinedesign.com/article/back-to-the-future-with-copper-brazin-1211) lists nominal physical properties of selected copper and brass materials for Cupro-Braze.

Heat transfer devices produced in conjunction with the CuproBraze process may be compact and uniquely able to withstand vibrations, cycling, and elevated temperatures (well above 250° C., and up to 290° C., which is well below the melting points of copper and brass), which may allow for a wider range of operation in conjunction with the STEER Thermal Bus [2], and may also enable lighter mounting hardware and space-saving design layouts. CuproBraze® alloys for brass tubes and copper fins in heat exchangers may enjoy ultimate tensile strengths of 340 to 400 MPa at 25° C. and retain 70 to 75% of their strength at 250° C. Aluminum alloys for the same application may have reduced tensile strengths of 150 to 180 MPa at 25° C. and retain only 25 to 50% of their properties at 250° C. Due to a lower melting point, the tensile strength of aluminum declines rapidly at 150° C., and may be significantly weakened by repetitive thermal cycling, even in a relatively narrow range such as between 150° C. and 200° C. Aluminum's yield strength may be severely compromised above 200° C., and useless for many purposes above 250° C., with fatigue cracking problems greatly exacerbated at elevated temperatures.

Processes for manufacturing CuproBraze® assemblies may be both more forgiving and more efficient than those of aluminum. In particular, brazing temperatures may be ramped up faster, and less energy per unit may be required for brazing (e.g., 75 MWH per ton of aluminum vs. 30 MWH per ton of copper).

CuproBraze® processes and equipment are flexible and may enable efficient economies of scale, with quick product changeovers even at high throughput rates, yet do not require dedicated furnace(s) or production line(s), which may further enable short or singleton production runs (which may be particularly helpful for product development or limited production environments).

CuproBraze® brazing is fluxless and does not use lead and other toxic chemicals in the manufacturing process, thereby eliminating the need for a separate rinse step to remove the flux from the brazed product, while also eliminating expensive treatment of discharge water.

CuproBraze® allows for one-shot brazing, which enables making a complete heat exchanger in the brazing furnace, thus eliminating separate operations for attaching components such as inlet and outlet fittings.

CuproBraze® heat exchangers may be repairable in the plant or in the field (no brazing oven is required), and its materials may be virtually 100% recyclable.

RUBE™ Braze Coating Formulation and Preparation

In a preferred embodiment, RUBE™ Braze Coating may comprise essentially a qualifying commercially available premixed CuproBraze®-compatible braze paste and qualifying CuproBraze®-compatible additives further comprising selected three-dimensional, cavity-inducing metal or metal-coated particles having high surface area, very high thermal conductivity, and a propensity to induce high-density reentrant cavities.

Figure 97:
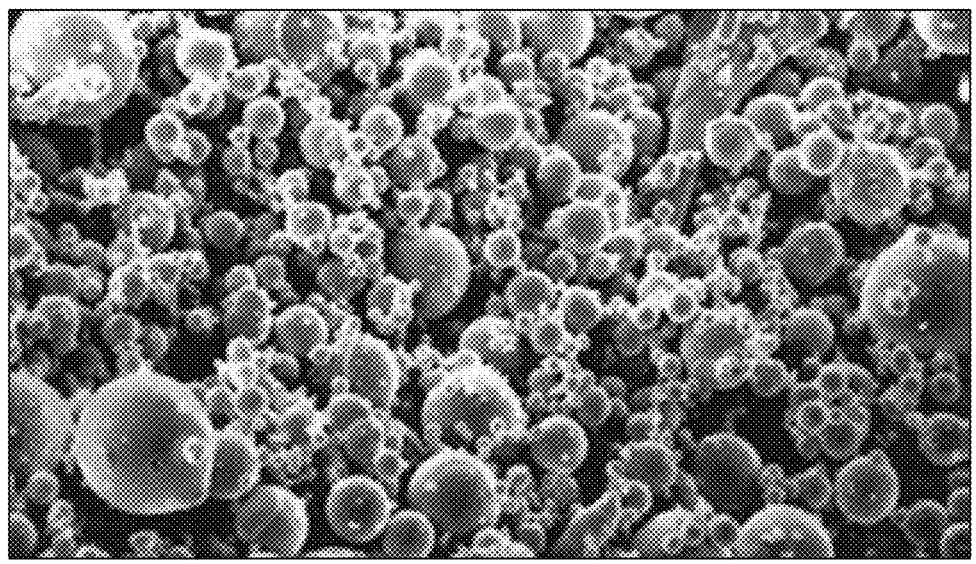
FIG. 97: RUBE™ Braze Coating—Typical Shape of OKC600 Brazing Powder (Source: Machine Design Magazine, http://machinedesign.com/article/back-to-the-future-with-copper-brazing-1211)
Figure 98:
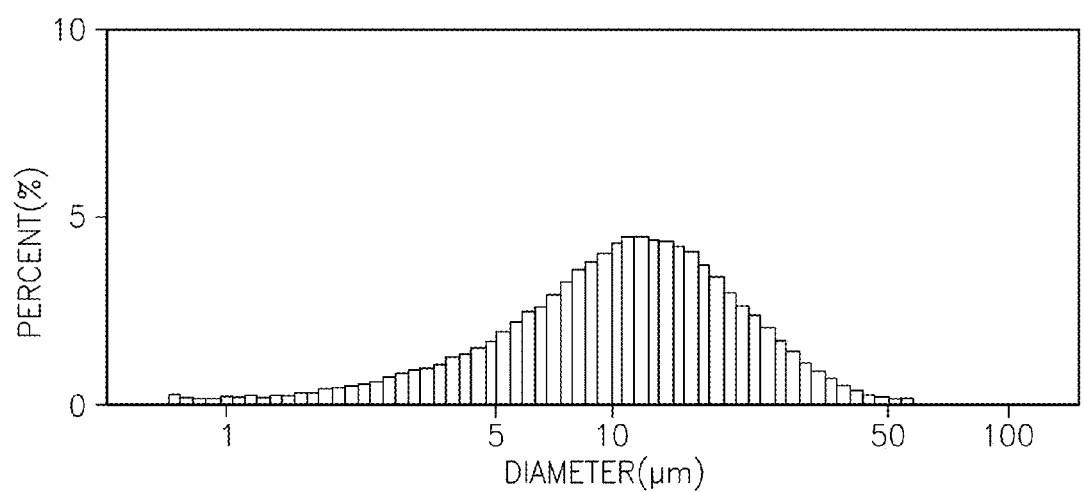
FIG. 98: RUBE™ Braze Coating—Particle Size Distribution of OKC600 Brazing Powder (Source: Machine Design Magazine, http://machinedesign.com/article/back-to-the-future-with-copper-brazing-1211)

In a preferred embodiment, a qualifying CuproBraze®-compatible braze paste may comprise a CuproBraze®-compatible brazing powder such as OKC600, and an environmentally friendly binder to enable the application and temporary adhesion of the selected brazing powder to an underlying substrate (the binder is subsequently eliminated during the brazing process). OKC600 is an alloy with the nominal composition listed in FIG. 95, which is gas-atomized to form a size-controlled filler powder as depicted in FIG. 97, with mean particle sizes in the range of 15 microns to 30 microns, with no particles larger than 90 microns, as depicted in the PSD shown in FIG. 98. The binder may be a chemical or a mixture of chemicals that may be specific for each braze paste manufacturer, it must decompose or evaporate cleanly below the brazing temperature and without leaving residues on the brazed substrates. Note that mixing of braze pastes with different kinds of binders may destroy the application and/or the brazing properties.

Commercially available CuproBraze®-compatible braze pastes normally have a long shelf life, and may be premixed and ready to use after stirring. Stirring recommendations from the paste manufacturer should be followed in order to secure good paste applicability. There may be pastes with different viscosities to be used at different kinds of joints, as well as different application methods.

Presently, there are two main types of CuproBraze® binder systems, solvent-based and thermoplastic. The solvent-based binders may be dissolved in a solvent, and solvent may be used as a thinner to adjust the viscosity. The solvent is evaporated during drying, leaving a hard binder and if the binder is mixed with a qualifying brazing powder and additives, after drying it will give a hard coating which only could be re-dissolved in a solvent.

In a preferred embodiment, qualifying braze-compatible additives may comprise: a) copper-coated diamond powder (as previously depicted in FIG. 91, having a typical minimum size range of about 10 microns to 15 microns, with a mean particle size of about 15 microns; b) silver-coated copper "trees" as previously depicted in FIG. 92, and having a mean particle size of 35 microns; and c) combinations of the foregoing.

Unlike the braze powder, which is intended to melt at lower brazing temperatures (OKC600 melts at 600° C. to 610° C. per FIG. 95), the qualifying CuproBraze®-compatible additives in RUBE™ Braze Coating have much higher melting temperatures, about 1085° C. (1984° F.) for copper, and about 962° C. (1763° F.) for silver, both of which are well above the CuproBraze® brazing temperature of 600° C. to 650° C. Thus, ignoring any diffusion that may occur, both the copper-coated diamond powder and the silver-coated copper "trees" may survive the brazing operation essentially intact, whereas, by design, the brazing powder itself will melt and flow (melted brazing powder applied along joints will flow into the joint through capillary action, giving rise to the term, "brazed joint").

The composition of RUBE™ Braze Coating with respect to the percentage of qualifying braze-compatible additives compared to the total is not particularly critical, because RUBE™ Braze Coating cannot have any impact on the quality of brazed joints. Rather, the RUBE™ Braze Coating comprises relatively expensive materials, namely copper-coated diamond powder and silver-coated copper "trees" whose primary contributions are high thermal conductivity, high surface area, and reentrant three-dimensional cavities, and there should not be more of the relatively expensive materials present than can be utilized in a single three-dimensional layer (brazing only occurs once), assuming that they are evenly dispersed with brazing alloy. On the other hand, if their percentage of the overall content is too low, then they will be overwhelmed by the brazing alloy, which will melt and simply fill in all the cavities and reduce the useful surface area. This situation must be avoided, since it serves no useful purpose. Rather, there should be enough brazing alloy to ensure that copper-coated diamond powder and silver-coated copper "trees" may braze to each other and to the substrate, such that the molten brazing alloy flows to where it is needed largely by capillary action. Depending on the mix of copper-coated diamond powder, silver-coated copper "trees," or other cavity-generating particles used, the brazing alloy should comprise less than one-third of the total mass of the RUBE™ Braze Coating mixture, and preferably between 5% and 30%.

RUBE™ Braze Coating Application as a Complement to Braze Paste

RUBE™ Braze Coating is not intended to replace braze pastes, which are still needed if brazed joints are desired. Brazing is normally concerned with forming of secure, thermally conductive joints, so braze pastes (and braze foils, which are out of scope here) are normally applied only at or near joints. In a typical brazed heat exchanger, brazing pastes may be used to form joints between the tubes and fins, as well as to join the tubes to the header. Other joints (e.g., tank to header) may also be brazed.

NOTE: In a preferred embodiment, RUBE™ Braze Coating may be applied at joints between the tubes and fins (since no fluid flows at such interfaces), but this practice may not be recommended. However, RUBE™ Braze Coating generally should not be applied to joints between tubes and headers, tanks to headers, or any other joint through which fluid may pass, unless the metal coatings of any RUBE™ Braze Coating-specific additives are of the same or very similar alloys as the other metals participating in the interface at the joint. Further explanation and workarounds for these cases are provided later, in the next section.

For tube-to-fin joints, as depicted in FIG. 94, brazing paste is normally applied on the overall tube surfaces, rather than just trying to apply paste at the precise joint where a fin and tube may meet (the fins may be spaced very closely, so such joints may be very close to each other anyway). In a preferred embodiment where RUBE™ Braze Coating is intended to complement braze pastes, a brazing paste may applied on the overall tube surfaces as usual, and the RUBE™ Braze Coating may be applied to the main fin area, but not the fin tips (which must remain free to contact the brazing paste on the tubes). The RUBE™ Braze Coating may be straightforwardly applied to both sides of the fin metal prior to folding it into a serpentine shape similar to that depicted in FIG. 94.

In an alternate preferred embodiment intended to complement braze pastes, the brazing paste (but not the RUBE™ Braze Coating) may be applied just to the fin tips, close to where they will contact the tubes, rather than coating the tubes themselves as in the previous embodiment. Application of the brazing paste to just the fin tips may be straightforwardly accomplished (say, by spraying or other means) prior to folding into a serpentine shape, or after folding (say, by a method where only the tips are dipped). Special machinery exists for fin-tip coating with brazing paste. Tubes do not have to be coated with brazing paste if the brazing paste is applied to the tips of the fins, typically by passing serpentine fins between two rollers, which coat both the top and bottom tips. The primary advantage to applying braze paste only to the fin tips may be a reduction in coating consumption by limiting the consumption of braze paste filler material to only that needed for actual joint-filling. In such an embodiment, the application of RUBE™ Braze Coating may complement the application of braze paste by applying RUBE™ Braze Coating to the non-fin-tip areas of the fin material (i.e., all the remaining areas which are not, or will not be, coated by braze paste). Depending on the masking methods available (especially with respect to automated equipment), the RUBE™ Braze Coating may be straightforwardly applied to not-yet-folded fin metal before, after, or coincident with the application of braze paste. Note, however, that whereas minor overspray of braze paste onto RUBE™ Braze Coating may have no negative impact, the reverse may not be true.

RUBE™ Braze Coating Application in Lieu of Braze Paste

The basic brazing process consists of melting, flowing and solidifying the filler material at the joint, usually resulting in an alloying reaction at the interface between the filler metal and the parent metal or metals, typically forming a metallic bond with the brazed surfaces (or parent metals). Typically, melted filler metal flows into the joint gap by capillary force, solidifies and forms a bond. The capillary force may be inversely dependent on the gap clearance, so the filler metal may flow better into narrower gaps than into wider gaps. Oxides and contamination of the surface may adversely affect the capillary force. Thus, the exact composition of the RUBE™ Braze Coating (not only the specific materials, but also the particle size distribution) may determine whether it may adversely affect the capillary force like a contaminant, or whether it may actually improve (increase) the capillary force. However, if RUBE™ Braze Coating-specific additives are of the same or very similar alloys as the other metals participating in the interface at the joint, then presence of its non-melting particles (e.g., copper-coated diamond powder particles, or silver-coated copper "trees") at a joint, such as in the gap between metal surfaces, may therefore narrow the gap and further increase the capillary force.

Several factors, such as joint clearance and geometry, may play significant roles in the mechanical performance of the finished joint. In general, the joint strength is higher for narrow joints, so as with capillary action, the presence of RUBE™ Braze Coating-specific additives may help or hinder, depending on their exact composition. Other effects of the geometry are the possibilities of slag entrapment and void formation in the joint, and RUBE™ Braze Coating-specific additives which are insufficiently compatible may induce behavior which may be similar to slag entrapment. The tiny intentional cavities and voids associated with RUBE™ Braze Coating-specific additives (e.g., copper-coated diamond powder particles, or silver-coated copper "trees") may normally encourage flows of melted filler material into them due to enhanced capillary action. However, if melted filler material does not fully fill such cavities (say, due to an insufficient local supply of filler material), then any voids remaining may induce behavior which may be like unwanted classic void formation, thus weakening the joint.

For tube-to-fin joints, as depicted in FIG. 94, brazing paste is normally applied on the overall exterior tube surfaces, rather than just trying to apply paste at the precise joint where a fin and tube may meet (the fins may be spaced very closely, so joints are very close to each other anyway). Alternately, rather than coating the tubes, the brazing paste could be applied just to the fins tip, close to where they will contact the tubes, but the primary advantage to doing so is a potential reduction is coating consumption by limiting the consumption to only that which directly feeds a joint, which may not be relevant to the application of RUBE™ Coating.

In a preferred embodiment, the calculation of the amount of RUBE™ Braze Coating to be applied to the tubes may be based on the tube dimensions rather than the fins-per-inch (fpi), as would be required if the fin tips were coated instead (which is not useful for the application of RUBE™ Braze Coating). If we base the calculated value on tube dimensions, we don't have to be concerned with the fpi. We can go a little heavy, such as with 200 g/m², and mix in other ingredients (e.g., copper-coated diamond powder particles, or silver-coated copper "trees").

RUBE™ Braze Coating Application Methods

RUBE™ Braze Coating may be applied via the same methods that may be used to apply CuproBraze®-compatible braze pastes, with the caveat that various braze pastes may be better suited to particular application methods, and any such limitations may extend to a formulation of RUBE™ Braze Coating comprising a particular braze paste. In general, a layer of RUBE™ Braze Coating may be applied on substrates (e.g., surfaces of heat exchanger parts) by many different methods, such as spraying, dipping, curtain coating, roll coating, etc.

RUBE™ Braze Coating may be sprayed onto substrates (e.g., tubes) with commercial spray guns in the same way that CuproBraze®-compatible braze pastes are commonly applied, such as by manual spraying or automatic spraying. When automatic spraying is utilized, both sides may be sprayed simultaneously.

In an automated application, the tubes being sprayed may have an open seam that will typically be closed via a subsequent high-frequency welding step (or more preferably, in an advanced fabrication process based on U.S. Pat. No. 7,032,808 B2 (2006), as part of a one-shot brazing operation). In the case of a downstream welding step, the application of coating to the tubes may be integrated with the tube-welding line (e.g., so that the tubes need not be turned prior to welding).

In a preferred embodiment, RUBE™ Braze Coating may be evenly applied with a dry coating weight of 200 g/m² to 300 g/m². This may represent a much heavier coating than if only braze paste is applied.

4. PRIME (Primary Reactor or Internal Multifueled Engine)

4.1 PRIME Overview

PRIME is an acronym for Primary Reactor or Internal Multifueled Engine. PRIME [4] refers to a subsystem of certain versions of the present invention, as depicted notionally in FIG. 1. In a preferred embodiment, PRIME may comprise a local power source, or prime mover (i.e., a machine, such as an engine or turbine, that transforms energy—such as from chemical, thermal, electrical or pressure form—to useful work, or to one or more alternative useful forms of energy).

NOTE: In the context of FRAME, stationary fuel cells are considered to be prime movers, although it can be argued that they are not, under the strictest definition of the term, since they their energy transformations are neither to nor from mechanical energy. However, when augmented with turboalternators (which are proper electro-mechanical machinery) such as those of the PERKS apparatus [5] operating in a combined cycle using exergy from the letdown pressure of vaporized fuel or from recuperated exhaust heat, the combination may be recognized as a proper prime mover. In any case, stationary fuel cells achieve their high efficiencies partly by avoiding conversions to/from mechanical energy, so the strictest definitions of prime mover may be outdated.

In a preferred embodiment, the PRIME apparatus [4] may comprise any number of prime mover apparatus, such as gas turbine or microturbine, fuel cell, or other apparatus (which may be commercially available off-the-shelf or in custom configurations, such as for OEMs or ODMs) operating independently or cooperatively under the control of the SLAM apparatus [1].

In a preferred embodiment, the PRIME apparatus [4] may comprise a combination of one or more microturbines and stationary fuel cells configured to operate in a diverse but complementary manner while sharing common fuel types and/or sources, yielding an aggregate output typically ranging from about 200 KW to about 4 MW of direct electrical power and from about 400 KW to about 5 MW or more of recuperable thermal power. In alternate embodiments, smaller or larger aggregations of electrical or thermal capacity may be employed, in accordance with local constraints or conditions.

In a preferred embodiment, the PRIME apparatus [4] may comprise any number of prime mover apparatus, such as gas turbine or microturbine, fuel cell, or other apparatus (which may be commercially available off-the-shelf or in custom configurations (such as for OEMs or ODMs). In a preferred embodiment, a prime mover apparatus may be co-designed with the PRIME apparatus [4] and other FRAME subsystems, so that it may essentially become part of the integrated PRIME apparatus [4] and enjoy optimized thermal operation.

In a preferred embodiment, a prime mover apparatus may be co-designed with the PRIME apparatus [4] and other FRAME subsystems, so that it may essentially become part of the integrated PRIME apparatus [4] such that it may enjoy optimized thermal operation and deliver maximal exergy with minimum operational costs and space requirements.

In a preferred embodiment, a prime mover apparatus may consume fuel and directly or indirectly transform latent chemical energy into a combination of high-grade electrical energy (typically corresponding to 25% to 50% of the fuel energy input) and potentially recuperable thermal exergy (typically 100% to 200% of the electrical output), with any otherwise unavailable energy (i.e., non-exergy) ultimately rejected to the ambient environment (e.g., as unrecuperable exhaust energy or "stack losses"), although possibly in a useful manner. In a preferred embodiment comprising cryogenic working fluids, in some operational modes there may be no energy that is intentionally rejected to the ambient environment (since even very low grade heat may be beneficially applied in conjunction with extremely cold fluids, due to the large temperature difference).

In a preferred embodiment, recuperable exergy originating with the PRIME apparatus [4] may be captured, transformed, stored, and/or further utilized by the various RUBE apparatus [3], PERKS apparatus [5], and STORE apparatus [6]. In a preferred embodiment, different "grades" or qualities of thermal exergy may be recuperated, segregated, stored, and transferred by the RUBE apparatus [3] and the STEER apparatus [2], in conjunction with the STORE apparatus [6], between various exergy sources and sinks such as the PRIME apparatus [4] and the PERKS apparatus [5].

While a prime mover's electrical output, if any, may typically be usable directly in accordance with a standard electrical specification, its thermal output generally may need to be recuperated in a manner specific to its intended use. In a preferred embodiment, an optimally advantageous intended use of the recuperated thermal exergy of the prime mover (or, alternatively, a substitute heat-producing device) may be to complete, if needed, the vaporization and/or superheating of phase-change working fluid exiting from various RUBE apparatus [3], and further, to provide optimally advantageous thermal exergy for superheating said fluid to a suitable temperature and pressure threshold such that the working fluid may drive turbomachinery (e.g., one or more of the kilowatt-scale FORCE turboalternators of the PERKS apparatus [5]), such as in a Rankine cycle or a closed Brayton cycle, combined cycle, or other cycles. In another preferred embodiment, an optimally advantageous intended use of the recuperated thermal exergy of the prime mover (or, alternatively, a substitute heat-producing device) may be to partly transform it to "cold energy" such as via sorption chiller mechanisms of the STORE apparatus [6], or to store or transport a portion of said recuperated or transformed thermal exergy via the storage and transport mechanisms of said STORE apparatus [6].

In other embodiments, one or more commercially available prime movers may be partly or fully replaced by or augmented with other significant heat-producing devices (with myriad efficiency differences and other trade-offs), such as internal combustion engines, inductively coupled plasma reactors, PV or thermal solar collectors, or various other heat sources, and such devices or heat sources may or may not be capable of also generating electrical power directly in addition to their thermal output. By attaching to or integrating said heat-producing devices with the FRAME system or any of its subsystems, it may become possible to fulfill an operational mission at a higher level of overall energy efficiency, and thus with a reduced rate of fuel or power consumption, which may further enable longer survival of the operational mission under curtailed supply conditions.

In a preferred embodiment, different working fluids at different operating temperatures and pressures may be delivered via the STEER apparatus [2] to the PRIME apparatus [4] so as to accomplish, for example, RUBE [3]-type cooling of its internal control and power-generation electronics, as well as recuperation of exergy, including from exhaust streams. Exergy flows from the PRIME apparatus [4] subsystems may subsequently be directly or indirectly delivered via the STEER apparatus [2] exergy flows to other subsystems, including to one or more of the FORCE turboalternators of the PERKS apparatus [5], as a means to help generate additional electrical power.

4.2 (Intentionally Omitted)

4.3 Stationary Fuel Cells

Natural Gas Fuel Cells as PRIME Subsystems

Figure 99:
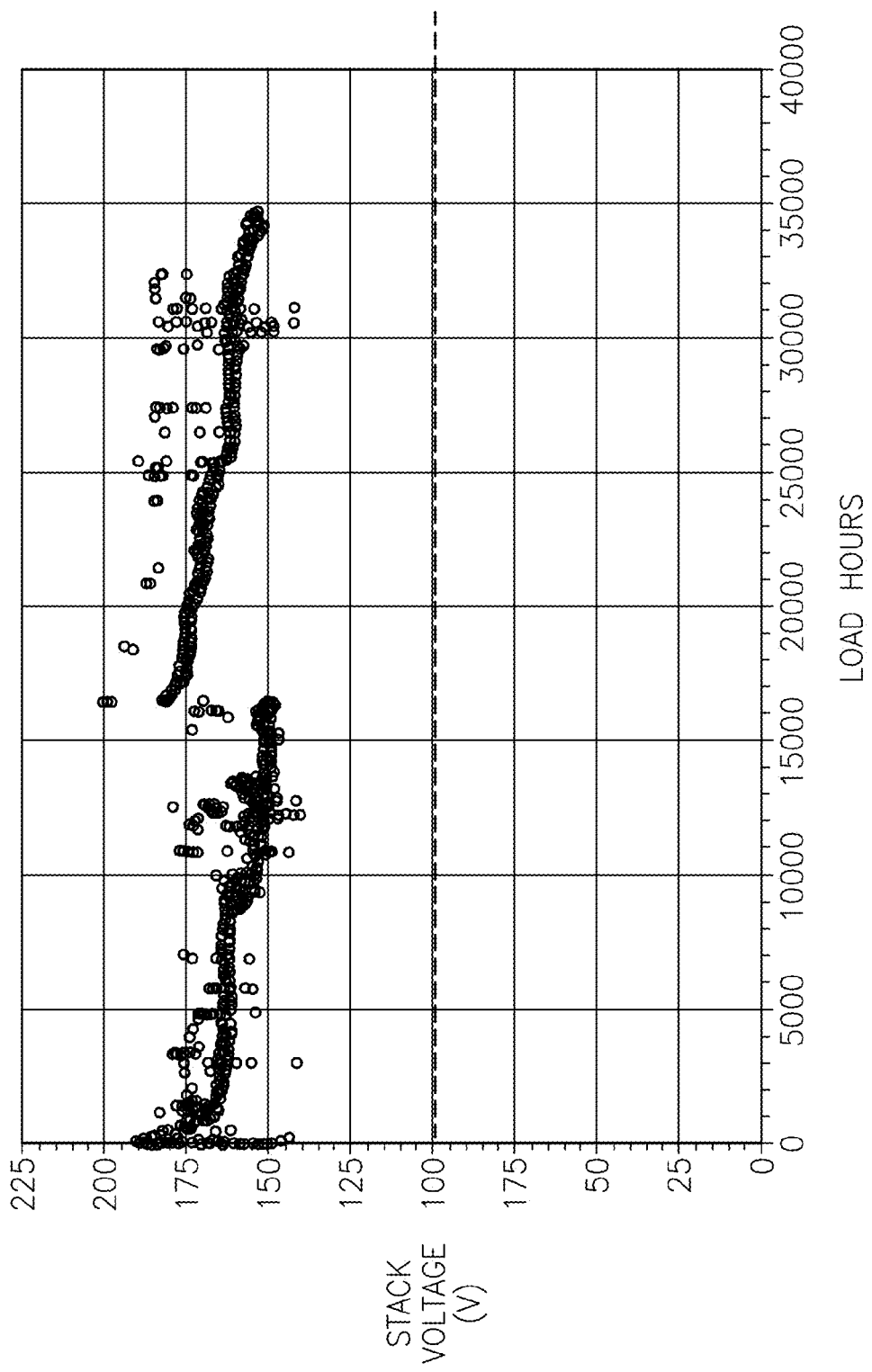
FIG. 99: PRIME—Why Ammonia-Free NG: Negative Impact of NH3 on Fuel Cell Stack Voltage

Stationary fuel cells powered by natural gas or other gaseous fuels may be well-suited to continuous operation as a power source within a computing infrastructure, because of the possibility of a continuous or quasi-continuous fuel supply via pipeline, renewable sources (e.g., biomass digester, landfill, etc.) or large capacity local fuel storage. However, the presence or formation of ammonia ($NH_3$), a contaminant in a gaseous fuel such as natural gas (NG) may negatively impact (i.e., shorten) the life of a fuel cell stack, as depicted in FIG. 99. Despite any upstream filtering of contaminants such as ammonia from the fuel gas, some ammonia may be formed during steam reformation within the fuel cell, as a consequence of nitrogen present in the fuel gas. A COTS natural gas fuel cell such as the commercially available PureCell Model 400 by UTC Power (www.UTCpower.com) may provide downstream ammonia-scrubbing to increase the fuel cell's tolerance to nitrogen in the fuel, by preventing most of the ammonia from reaching the anode side of the fuel cell.

The graph in FIG. 71 (excluding the dashed line) for UTC's PureCell Model 400 cell stack assembly (CSA), was made public at the EERE website (EERE.energy.gov). The graphed data points depict the effect of ammonia on a single 100 KW fuel cell stack assembly as may be found in a UTC PureCell Model 400 fuel cell as a set of four series-connected stacks yielding a total of about 400 KW. As shown, in the presence of ammonia, the fuel cell stack output voltage deteriorates over time, from a high in the range of up to about 200 VDC to an out-of-spec voltage below about 150 VDC (at which point the stack generally may need to be replaced (note that the discontinuity in the graph occurring at between 15,000 and 20,000 load hours reflects such a stack replacement).

NOTE: In a commercially available product such as the UTC PureCell Model 400, continued fuel cell stack operation below 150 VDC (for a single stack) may be possible, but generally may not be useful if it does meet the requirements of downstream components. For example, in the case of the UTC PureCell Model 400 fuel cell, the series output of four such stacks must deliver about 600 VDC to 800 VDC (an average of 150 VDC to 200 VDC per series-connected stack) to a downstream 400 KW DC-to-AC inverter and associated power conditioning apparatus. However, in the context of FRAME, in a preferred embodiment, a pair of such stacks in series may supply DC voltage to an individual DC power rail of the multiply redundant PERKS DC power bus, which may utilize power supply voltages as low as 200 VDC. Thus, the degraded output of an individual ammonia-impacted fuel cell stack (one of a series-connected pair) may fall to as low as 100 VDC and still be within specification, assuming the units are equally affected, or possibly even lower if the units are asymmetrically affected. The importance of this is not to suggest that ammonia may not need to be eliminated or otherwise scrubbed from the fuel supply, but rather that, in the case of fuel cell performance degradation, the survivability and continued operation of the system may be enhanced substantially by the tolerance of the FRAME/PERK subsystem to lower-voltage inputs.

The ammonia affecting a fuel cell stack comes from nitrogen ($N_2$) gas that may be present in the fuel supply, so pre-processing the fuel to remove any ammonia present (up "ammonia-scrubbing") may significantly lengthen fuel cell stack life, and such ammonia-scrubbing may be provided with the aforementioned commercially available PureCell fuel cell from UTC Power. However, the fuel cell stack life may be further enhanced by reducing the nitrogen content in the fuel supply, which may have the advantageous effect of also lengthening the life of ammonia-scrubbing apparatus, while reducing maintenance requirements. The composition of natural gas (NG) varies slightly according to its source and processing history, but pipeline-quality NG consists almost entirely of methane ($CH_4$), the simplest hydrocarbon compound, and liquefied natural gas (LNG) may be even more pure. Typically, the composition of LNG is 85 to 95+ percent methane, along with a few percent ethane, even less propane and butane, and possibly trace amounts of nitrogen (Source: www.netl.doe.gov/publications/factsheets/policy/Policy023.pdf).

In a preferred embodiment, the FRAME system, and in particular a PRIME subsystem comprising fuel cells, may utilize pipeline-quality NG as a primary fuel, and more preferably, NG which may have been locally vaporized (i.e., on site) from LNG that may be locally stored. In another preferred embodiment, available landfill gas (LFG) or other biogas (such as from an anaerobic biomass digester) may be substantially pre-processed (i.e., "scrubbed") to remove contaminants such as ammonia or nitrogen prior to immediate use, or prior to liquefaction to LNG (or less preferably, to CNG) for local storage. Note that reducing the nitrogen ($N_2$) content of NG or LNG increases its fuel value, and, in the case of LNG, also increases the amount of LNG that can be stored in tanks of a given capacity, which may justify the incremental cost of an appropriately sized $N_2$ stripper column.

Adapting a COTS Natural Gas Fuel Cell as a PRIME Subsystem

There may be significant benefits associated with adapting a COTS stationary fuel cell as a PRIME subsystem.

Figure 100:
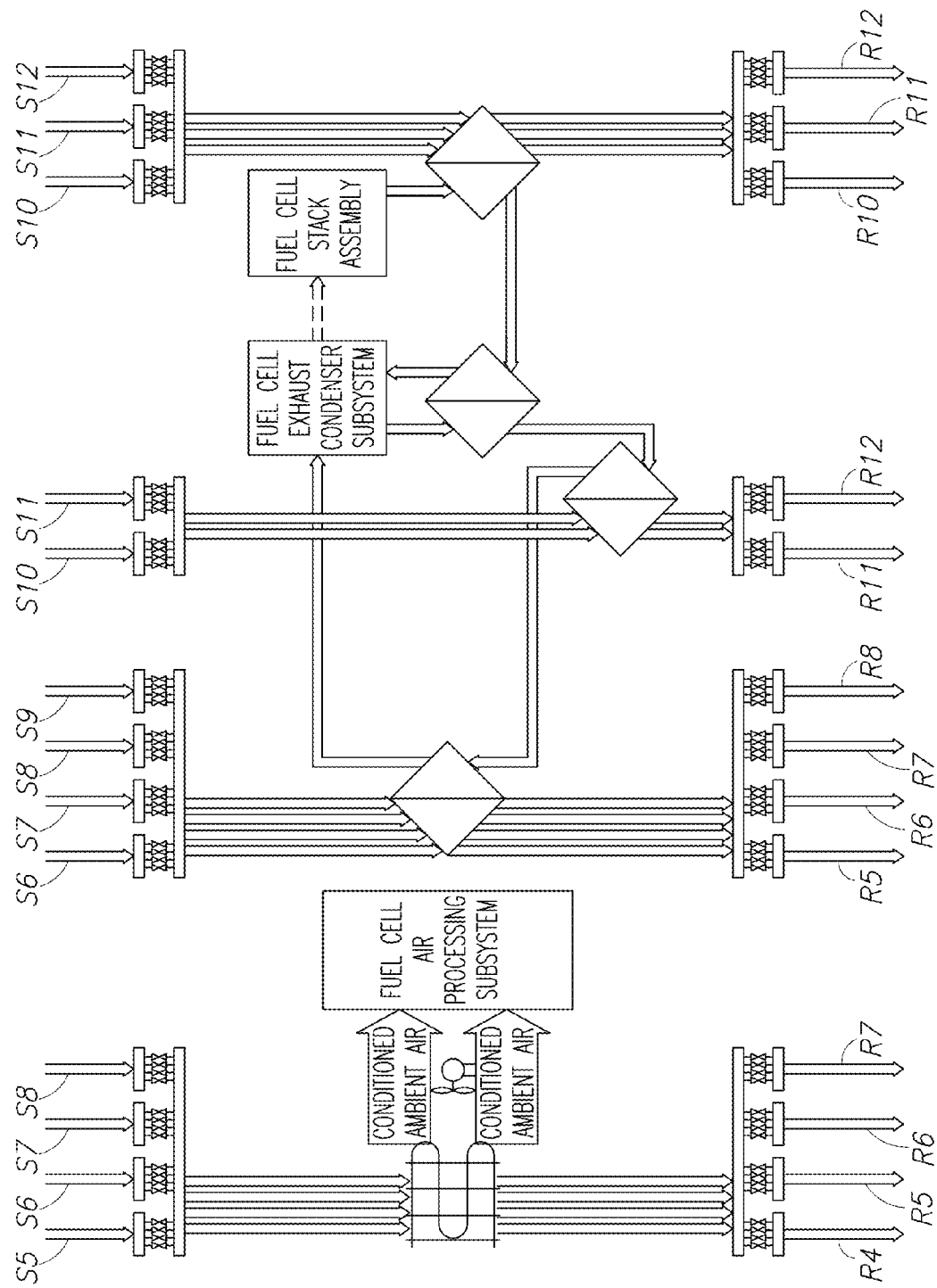
FIG. 100: PRIME—Adapting a COTS Stationary Fuel Cell as a PRIME Subsystem

For example, in a preferred embodiment wherein a modified version of a UTC Power PureCell Model 400 may be interfaced to the STEER Thermal Bus as depicted in FIG. 100, there may be no need to obtain the approximately 350 KWH of thermal exergy from the customer's electric distribution system to meet the PureCell Model 400 start-up power requirement, since it may be partly or entirely obtained directly from the STEER Thermal Bus. Likewise, there may be no need to parasitically power the air cooling module included in the COTS version of the PureCell Model 400, because any needed cooling may also be fully supplied by the STEER Thermal Bus (see next section).

NOTE: An unmodified UTC Power PureCell Model 400 (circa 2009) must be started using the customer's electric distribution system, which means it cannot initiate off-grid operation on its own (i.e., no "black start" capability). The start-up power requirement for the COTS unit is 158 kW peak (approximately 70 kW average) over a 5-hour period (i.e., about 350 KWH), which is primarily used to heat the ILS and CSAs to operating temperature using electrical heating elements. After start-up the powerplant will directly power its parasitic loads (i.e., its air cooling module and communication system) as internal loads, maintaining a net design output power (i.e., usable power) of 400 kW.

In a preferred embodiment, a modified version of the UTC Power PureCell Model 400 (comprising four cell stack assemblies, or CSAs, in series) may be adapted to be an element of the PRIME subsystem, thereby eliminating the need for the normally included 400 KW 480 VAC inverter and power conditioning module (and any associated inefficiencies). Instead of operating four stacks in series as the commercially available unit is normally configured, the same number of stacks may be operated as two independent pairs of two stacks in series, with each pair yielding more than 200 KW at DC voltages.

Figure 101:
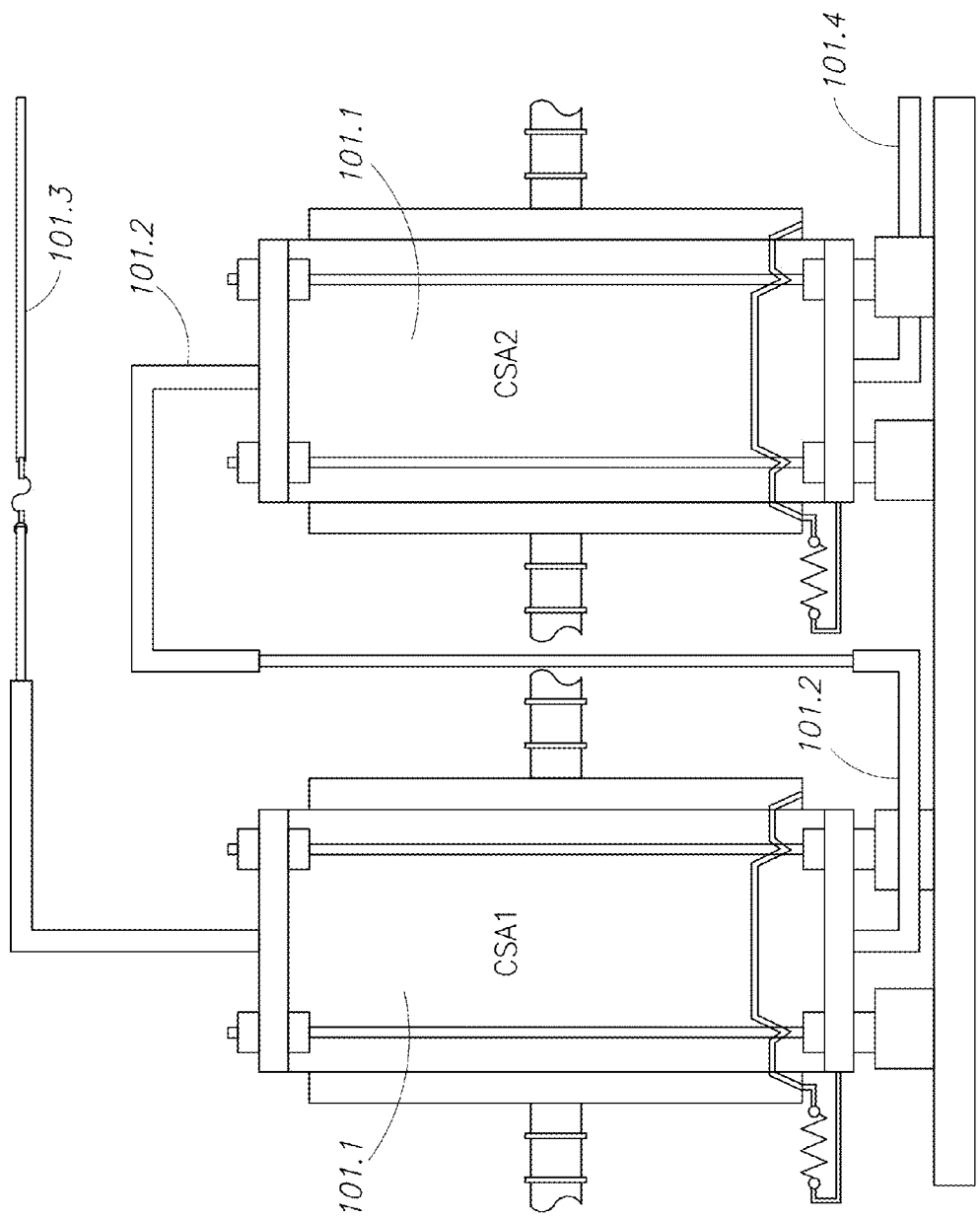
FIG. 101: PRIME—Series Configuration of UTC Stationary CSA-Pair (Not Commercially Available)

For example, a pair of PureCell Model 400 CSAs [101.1] may be configured in series, with each pair connected internally by a copper bus bar [101.2] as depicted in FIG. 101, to provide an independent DC power rail comprising a positive output on a copper bus bar [101.3] and negative return [101.4], and typically delivering more than 200 KW at 280 VDC to 400 VDC nominally. In the case of degraded CSA operation, as depicted in FIG. 99, the DC power rail may continue to operate normally as long as the total input voltage from the pair of CSAs remains at or above 200 VDC (thus, the output of each of a pair's stacks may safely degrade to as little 100 VDC rather than the normal minimum of about 150 VDC (see FIG. 99), which may provide significant operating reserve (i.e., well beyond the intended design life, without causing DC power rail failure).

Two such pairs may thus deliver two such independent (and redundant) 200 KW DC power rails, for a total of more than 400 KW at 280 VDC to 400 VDC nominal output, which is within the nominal PERKS subsystem DC bus operating voltage range of 200 VDC to 400 VDC. At end-of-life, as depicted in FIG. 99, the electrical power output may decrease, and the thermal power output may increase (in conjunction with an increase in fuel usage).

Adapting COTS Natural Gas Fuel Cell to the STEER Thermal Bus

Although a fuel cell may be commonly thought of as a way to produce electrical power, and may be relatively efficient at doing so, the reality is that a fuel cell produces more thermal power than electrical power, while consuming fuel and supporting parasitic electrical loads that may diminish its electrical output. In a preferred embodiment, a fuel cell adapted for use in the PRIME subsystem [4] may be connected to the STEER Thermal Bus [1] in such a way as to maximize the electrical power produced, and the exergy retained, while minimizing parasitic loads and fuel consumed per KW.

In a preferred embodiment, a commercially available fuel cell, for example, such as the PureCell Model 400 by UTC Power (UTCpower.com), or a derivative, or a derivative comprising subsystems thereof, may be adapted to the STEER Thermal Bus return [2.2a], such that waste heat from the fuel cell may be removed via dynamically controlled flows of engineered working fluids rather than water. There may be multiple grades of thermal exergy available from a stationary fuel cell such as the aforementioned. The highest heat grade may originate in the steam reformation process (where hydrogen is extracted from the fuel gas), with temperatures on the order of 150° C. Secondary heat may be available from a heat exchanger used to condense water from the exhaust vapor (for use in producing steam), with temperatures on the order of 65° C. Tertiary heat may be available from a heat exchanger, which, in a COTS configuration, may be used to reject excess heat to ambient via thermal communication with an auxiliary or external subsystem such as a dry cooler or cooling tower, for example.

In a specific example, involving a commercially available stationary fuel cell such as the PureCell Model 400, or a derivative of it, waste heat may be removed via water flowing through either or both of a pair of heat exchangers, as depicted in FIG. 100, one of which may supply "high-grade" heat and the other may "low-grade" heat, with any heat not removed at the high-grade exchanger becoming available at the downstream low-grade heat exchanger. Any unused heat not taken from the low-grade heat exchanger will be removed by an internally configured downstream dry cooler (liquid-to-air heat exchanger).

Stationary fuel cells may require a source of water to produce steam for internal steam reformation processes, to the extent that adequate quantities of water cannot be internally provided or made up by condensing water from the exhaust stream. For example, UTC's PureCell Model 400 may need a relatively small external water supply flow as part of its power cycle when the ambient temperature exceeds 86° F. (30° C.). Below that temperature, the UTC apparatus may obtain the needed water by condensing the moisture from its own exhaust vapor. For higher ambient temperatures, up to 110° F. (43° C.), the UTC apparatus requires clean make-up water supply of up to 1 GPM at 40 psig minimum. In a preferred embodiment involving a fuel cell that may sometimes need additional make-up water, such as, for example, a UTC PureCell Model 400, and where the system comprises sorption chillers, cryogenic working fluids, or other sources of "cold energy," said system may, in advance of need or on demand, condense water vapor from other vapor-producing devices, or from ambient air, and optionally store it (e.g., via the STORE apparatus [6] and STEER apparatus [2]) for subsequent use as make-up water.

Augmenting a Natural Gas PRIME Movers with a FORCE High-Pressure Turboalternator In a preferred embodiment, where a stationary fuel cell may be fueled with natural gas that may be locally vaporized from LNG, additional electrical output may be available through the process of adapting the pressure of the available fuel stream to the pressure needed by the stationary fuel cell. As a general example, a FORCE apparatus [6] (described in a later section) comprising a turboalternator may serve as a turboexpander (thereby potentially substituting and eliminating the need for a "let-down" pressure-reducing valve, or PRV) for a high-pressure vapor stream such as a 70-bar supercritical fuel vapor (e.g., vaporized LNG), in order to generate electrical power while reducing the high-pressure inlet stream to an outlet pressure that may be better suited for a relatively lower-pressure downstream device like a fuel cell. Note that the FORCE apparatus [6] may use a LNG vapor as a working fluid in this example, but no fuel is combusted or otherwise consumed by the FORCE apparatus [6], which may operate primarily on the pressure differential between its inlet and outlet streams.

In a preferred embodiment, a turboalternator like the aforementioned may be sized so as to closely correspond to the set of downstream devices it serves, with a correspondence possibly as close as one-to-one. For example, a single turboalternator may be matched with a single fuel-consuming device such as a fuel cell, such that the resulting let-down pressure effect of the turboalternator is to reduce the pressure to near, but slightly above, the required fuel inlet pressure of the fuel-consuming device (close enough so that a simple pressure regulator may be utilized to achieve the final inlet pressure). If the downstream device is, say, a microturbine or fuel cell which may operate at an inlet fuel natural gas (NG) fuel pressure of 5- to 6-bar, a FORCE turboalternator may be used to reduce the example 70-bar vaporized LNG fuel supply to a lower range that can be handled by the downstream device's pressure regulator.

In a more specific example, involving a commercially available fuel cell such as the PureCell Model 400 by UTC Power (UTCpower.com), or a derivative of it, the nominal fuel input rate is about 3.6 MMBTU/hour at a relatively high pressure, such as 5 to 6 bar (72 to 87 psi). Given a cryogenic LNG fuel supply, 3.6 MMBTU/hour corresponding to an LNG-to-NG vaporization rate of about 48 GPH, resulting in a mass flow rate of about 0.021 kg/s, at a pressure of, for example 70-bar. A turboalternator may be employed as a turboexpander to let down the pressure from 70 bar to 5 or 6-bar without consuming any fuel, while generating a small amount of additional electrical power and also significant refrigeration (due to expansion of the working fluid, the fluid exits at a lower temperature than it enters). Operationally, the pressure differential is sufficient to enable a turboalternator based on state-of-the-practice turbomachinery design principles (such as the FORCE turboalternator described in the previous section) to generate on the order of 3200 watts of electrical power and cause a temperature drop of more than 73° C. in the fuel at exit (from +22.5° C. to −51° C.). The power so generated is "free" from an energy viewpoint, but in a data center environment, for example, a single such turboalternator may be sufficient to continuously power another 50 to 100 revenue-producing CPUs or other processors. The additional refrigeration induced in the fuel may be beneficially extracted via simple inline heat exchanger suitable for both the fuel flow and the targeted heat sink (which, for example, may be coolant used to cool the aforesaid revenue-producing CPUs or other processors, as taught in the description of RUBE apparatus [3]). From a capital cost viewpoint, the cost of such a turboalternator is partly offset by the energy-wasting PRV it replaces, which would otherwise be needed at the fuel cell inlet. If such a fuel cell would have been fueled from a conventional NG pipeline supply rather than from LNG, then an inlet fuel compressor would have been required, with commensurate capital costs and parasitic power requirements.

In the case of a fuel cell with a very low inlet pressure of 0.02 to 0.04 bar (0.3 to 0.5 psi), a second, smaller turboalternator may be employed as a turboexpander to take advantage of a 5- to 6-bar pressure differential (although the second turboexpander would suffer from diminishing returns in this example, and would generate much less power, the power so generated would be "free" from an energy viewpoint, and otherwise a PRV would be needed at the fuel cell inlet). Thus, in order to support a one-to-one correspondence (for example) between the FORCE turboalternator and the downstream device, the mass-flow rate of the turboalternator may need to be generally on par with that of the downstream device, and such mass-flow-rate may be orders of magnitude below that of commercially available turboalternators (largely due to the combination of relatively low-density gaseous fuel and relatively low consumption rate of the downstream device). As a specific example, a commercially available backpressure turbine may utilize a mass-flow rate on the order of 11 kg/s (about 87.600 lbs/hour) of steam to generate on the order of 930 $KW_E$, whereas a FORCE turboalternator in a high-pressure fuel stream of a 200 $KW_E$ microturbine may utilize a mass-flow rate on the order of 0.045 kg/s (about 357 lbs/hour) of passed-through fuel to generate on the order of 3 $KW_E$ (e.g., 2 to 4 $KW_E$, and nominally 3.5 $KW_E$) of additional electrical power.

4.4 High-Heat Sources and Thermal PTO

FIG. 102 depicts examples of how a conventional high-heat power source [102.1] (e.g., gas turbine, microturbine, gas flare, boiler, gasifier, reactor, solar collector, geothermal well, or other heat source) may interface to the STEER Thermal Bus supply [2a] and return [2b] to recuperate exergy. There may also be exhaust heat [102.2] that is not recuperated in the FIG. 102 illustration.

NOTE: An example STEER Thermal Bus is depicted in FIG. 13 as having three different working fluids and a total of fourteen different temperature ranges. FIG. 14 provides a key to the example working fluids and temperature ranges assigned to each channel for illustrative purposes.

As depicted in FIG. 102, high-heat power source [102.1] has two heat exchanger circuits, [102.4] and [102.7]. As depicted, these may involve two potentially different working fluids and/or temperature ranges, with, for example, heat exchanger [102.4] receiving a lower temperature phase-change RUBE™ LT2 fluid (see FIG. 32 for example properties) from STEER Thermal Bus supply [2a] via ingress channels [102.3], and delivering it downstream to STEER Thermal Bus return [2b], via egress channels [102.5]. Similarly, example heat exchanger [102.7] may receive a higher temperature single-phase RUBE™ HT1 fluid (see FIG. 31 for example properties) from STEER Thermal Bus supply [2a] via ingress channels [102.6] and deliver it downstream STEER Thermal Bus return [2b] via egress channels [102.8].

FIG. 103 depicts an example of how an inductively coupled plasma (ICP) gasifier [103.1] may interface to the STEER Thermal Bus supply [2a] and return [2b]. The ICP gasifier [103.1] accepts carbon-based waste (fuel) [103.2] and produces very hot syngas fuel [103.3] as an output. As depicted in FIG. 103, ICP [103.1] has two heat exchanger circuits, [103.5] and [103.7]. As depicted, these may involve two potentially different working fluids and/or temperature ranges, with example heat exchanger [103.5] receiving a single-phase RUBE™ HT1 fluid (see FIG. 31 for example properties) via ingress channels [103.4] and delivering it downstream via egress channels [103.6]. Connections to example heat exchanger [103.7] are not shown in FIG. 103 (the syngas temperature may be up to 1400° C., which greatly exceeds the range available in the example STEER Thermal Bus as depicted in FIG. 13, or in the corresponding temperature key depicted in FIG. 14).

FIG. 104 depicts an example of a "Thermal Power Take-Off (PTO)" using a heat exchanger [104.1] to source or sink thermal energy in the 300° C. to 750° C. range, by interfacing to the STEER Thermal Bus supply [2a] and return [2b]. Example heat exchanger [104.1] may receive a single-phase RUBE™ HT1 fluid (see FIG. 31 for properties) via ingress channels [104.4] and deliver it downstream via egress channels [104.5]. In the example of FIG. 104, thermal power may be injected or extracted via Thermal PTO via working fluid moving through ingress channels [104.2] and egress channels [104.3].

NOTE: Heat exchangers may be generally be of the counterflow type when flow direction is relevant, in order to maximize heat transfer efficiency, even if depicted otherwise (i.e., as non-counterflow) for convenience (in order to simply the visual routing of depicted plumbing circuits).

5. PERKS (Peak Exergy Reserves, Kilowatt-Scale)

5.1 PERKS Overview

PERKS is an acronym for Peak Exergy Reserve, Kilowatt-Scale. PERKS [5] refers to a subsystem of certain versions of the present invention, as depicted notionally in FIG. 1. In a preferred embodiment, the PERKS apparatus [5] may directly capture excess or low-cost electrical energy from a multiplicity of sources (for example, from the utility grid, when electricity is cheapest or most readily available) and store it for later reuse, such as during peak periods (when power is most expensive or less available). The notion of "kilowatt-scale" here refers to a typical modular component having a variable and scalable capacity that may range from a few kilowatts to hundreds of kilowatts (a single local system typically may not exceed a few megawatts of aggregate power).

In a preferred embodiment, the PERKS apparatus [5] may provide all of the system's external electrical power interfaces, i.e., between the local system and any external facilities (such as, for example, the utility grid or a campus co-generation system). In one preferred embodiment, such as may be appropriate for a relatively large system with several megawatts of aggregate grid-tied power transfer (regardless of whether the local system is supplying or using utility power), the PERKS apparatus [5] may interface at medium distribution-level three-phase AC voltages (e.g., 15,000-volt class to 380 VAC to 480 VAC three-phase line-level voltages). In such a configuration, oil-cooled distribution-class transformers may be in thermal communication with the STEER apparatus [2], so that low-grade heat energy may be recuperated. It may be optimally advantageous that such a configuration may provide significant operating reserve for transformers so connected, such that overheating (and subsequent damage) may be prevented during periods of high levels of ground-induced currents (GICs), as further described later.

In a preferred embodiment, low-grade heat recuperated by the RUBE apparatus [3], such as from electronics loads, may be transferred via STEER apparatus [2]) to other subsystems such as the PERKS apparatus [5], which may utilize the low-grade heat to vaporize and superheat cryogenic fluids or fuels such as liquefied natural gas (LNG), so as to maximize the application of exergy and the resulting overall benefit from said exchange. In a preferred embodiment, for example, the working fluid used to vaporize cryogenic LNG with low-grade heat may itself become very cold in the process, which may be of significant benefit to RUBE apparatus [3]. At the same time, in a preferred embodiment, the LNG of this example may become vaporized, superheated, highly pressurized (>1000 psi) and ready for use as a gaseous fuel (NG, or natural gas).

In a preferred embodiment, exergy in the form of pressure energy may result from "boiling," vaporizing, and superheating the cryogenic fluid, and this exergy may be transferred (e.g., via STEER apparatus [2]) to PERKS apparatus [5], where it may enable the generation of additional electrical power, or it may be used in conjunction with adsorption or absorption chiller apparatus to generate refrigeration power.

In another preferred embodiment, the RUBE apparatus [3] may combine exergy in the form of "cold energy," such as in a cryogenic low-temperature liquid fuel such as liquefied natural gas (LNG), with exergy in the form of the aforementioned heat from hot spots and warm spots, any of which may be transported via the STEER apparatus [2]. In particular, LNG may be used as a phase-change working fluid, transitioning from at or below its boiling point to a temperature well above its critical point, using the aforementioned heat energy ("boiling energy") from hot spots and warm spots (which may be transported via the STEER apparatus [2] in a working fluid, such as relatively low-temperature phase-change dielectric working fluid) in order to recuperate the exergy ("available energy"), such as from the potential differences (e.g., temperature, pressure, chemical, state) between said cryogenic low-temperature liquid fuel and said working fluid. In a preferred embodiment, the exergy may be recuperated in either or both of at least two ways, 1) by directly cooling relatively low-temperature phase-change dielectric working fluid that may otherwise need to be cooled via some other method requiring additional energy input to the system, and 2) by directing the very high pressure stream (e.g., at or above 1000 psi) that may result from heating the cryogenic liquid fuel to well above its critical point to the inlet of a specially designed turboalternator which may then generate electrical or mechanical power, thereby reducing the need for additional energy input to the system.

In a preferred embodiment, RUBE apparatus [3] may contain, enclose, or connect to various exergy sources. In alternative embodiments, RUBE apparatus [3] may integrate tightly with (such as through co-design of) separate exergy sources and sinks, such as may be associated with external apparatus.

In a preferred embodiment of the overarching FRAME technology, the RUBE apparatus [3] may serve a key role of recuperating low- to medium-grade heat that may be used to partly or completely accomplish a phase-change in a working fluid, such that one or more downstream "booster" heat sources (such as from PRIME apparatus [4] or substitutes) may ultimately accomplish sufficient superheating and pressurization so as to enable the driving of turbomachinery. In a preferred embodiment, exemplary turbomachinery may comprise one or more FORCE turboalternators (see PERKS apparatus [5]) and generate modest amounts of additional electrical power (e.g., 15% to 45% beyond the electrical output of the PRIME apparatus [4] or substitute local power generation subsystems, with up to 30% being typical). In an alternative embodiment, exemplary turbomachinery may comprise pumps or other mechanical apparatus that may avoid parasitic loads (requiring additional electrical power) which would otherwise be present.

Whereas an additional 15% to 45% electrical energy output may correspond to 13% to 23% of the recuperable waste energy from the PRIME apparatus [4] or substitutes (which may appear outlandish at first glance due to the typically low-grade heat energy involved), the reality is that the additional electrical output may actually be driven by the exergy in the aggregated recuperable waste energy, which may also include the low-grade heat recuperated from the electrical load itself via the RUBE apparatus [3]. Considered thusly, the additional electrical power (e.g., about 15% to 45% beyond the electrical output of the PRIME apparatus [4] or substitutes) may correspond to a much lower percentage (e.g., about 6% to 15%) of the total recuperable waste heat energy, which may be quite reasonable. Thus, the recuperation via the RUBE apparatus [3] of waste heat energy from the electrical load may enable a higher rate of conversion of fuel to electrical energy than would otherwise be possible, and therefore higher overall system efficiency.

In another embodiment, such as may be appropriate for a system with a relatively smaller external interface having only a few megawatts (or perhaps less than a megawatt) of aggregate grid-tied power transfer (again, regardless of whether the local system is supplying or using utility power), the PERKS apparatus [5] may interface at line-level voltages (e.g., 380 VAC to 480 VAC three-phase, typically). In still another embodiment, the PERKS apparatus [5] may interface at intermediate or high DC voltages (e.g., at or below 600 VDC, or at significantly higher DC voltages, respectively).

Note that in these examples, the size or capacity of the external electrical interfaces does not necessarily constrain a system's local power production capacity, but only the local system's ability to acquire, buy, sell, transfer, or otherwise share power via said interfaces. In the absence of said interfaces, or in the case of malfunction, whether intentional or not, the local system may operate on a self-powered, stand-alone, or off-grid basis to the extent of its capacity and energy reserves.

In a preferred embodiment, the packaging and external electrical interfaces of the PERKS apparatus [5] may be fully or selectively conditioned (regardless of whether a particular electrical flow is inbound or outbound) so as to protect against electromagnetic pulse (EMP) and other inbound electromagnetic environmental effects (sometimes called "$E^3$" or "E3," but not to be confused with the "$e_3$" of the set of three distinctly different EMP field types, namely, $e_1$, $e_2$, and $e_3$). In a preferred embodiment, the PERKS apparatus [5], in conjunction with other co-located apparatus such as the SUREFIRE apparatus [7], may protect against the effects of EMP such as System EMP (SEMP), Nuclear EMP (NEMP) and High-altitude EMP (HEMP), as well as the effects of lightning strikes, geomagnetic storms, and other electromagnetic phenomena on local or external power systems and other conductors (such effects may include, for example, ground-induced currents, also known as GICs, whose quasi-DC voltages may saturate and destroy utility grid transformers through immediate or cumulative damage).

In a further preferred embodiment, the PERKS apparatus [5] and packaging may also fully condition the external signaling interfaces of the system (e.g., data and communications, both wired and wireless) to protect against $E^3$-type threats. In a still further preferred embodiment, the PERKS apparatus [5] and packaging may also extend to fully condition the external power and signaling interfaces of the system to meet strict protection requirements (e.g., security-related specifications, measures, and countermeasures restricting outbound emissions), so as to prevent intentional or unintentional information leakage.

In a preferred embodiment, the PERKS apparatus [5] may be co-designed with the SUREFIRE apparatus [7] and its modular payloads, in order to, for example, maximize the protection available from $E^3$ threats such as EMP and GIC, and various security threats related to electromagnetic phenomena, partly by virtue of the shielding and grounding afforded by the SUREFIRE apparatus [7] and its modular payloads (which by design may be viewed as sophisticated Faraday cages).

In a preferred embodiment, the PERKS apparatus [5] may also contribute to the system's electrical energy reserves by helping to reduce the amount of fuel required for local power production, regardless of whether the system's electrical system is grid-tied or off-grid, and, in a grid-tied configuration, regardless of whether the utility power grid is undergoing peak or off-peak loads external to the local system, or is in some state such that remedial action is required (such as peak-shaving, load-shedding, or rolling blackouts). Through the integration with other FRAME subsystems, the PERKS apparatus [5] may complement other means of achieving overall system efficiencies, yielding efficiencies which may be relatively higher than could otherwise be attained.

In a preferred embodiment, one or more independent, redundant subsystems each comprising a multiplicity of high-capacity, high-current, high-duty-cycle batteries and other electrical energy storage means may be used to provide independent, redundant, intelligently managed reconfigurable high-voltage DC power rails (for example, 200 VDC to 600 VDC on each rail, in one embodiment, or more preferably, approximately 200 VDC to 400 VDC on each rail, in another embodiment). In a preferred embodiment, the reconfigurability of said power rails may further comprise the rearrangement of parallel-series circuits so as to be able to bypass a failed or failing battery or other device, or to adjust the balance of power sources and loads on said power rails. In a preferred embodiment, the management and reconfiguration of said power rails may be dynamically provided by the SLAM apparatus [ ].

In a preferred embodiment, the PERKS subsystem components may be thermally stabilized (which may further comprise on-demand cooling or heating as optimally advantageous, with recuperation) via the RUBE apparatus [3] or RUBE-like interfaces that may help to provide integration with the STEER apparatus [2] for the supply and return of working fluids within the desired temperature ranges. A preferred object of the integration with the STEER apparatus [2] is to increase the reserve supply of electrical energy (which may further comprise the capability to generate it from non-electrical energy sources). Thus, any energy recuperated (for example, via thermal means such as RUBE apparatus [3] or RUBE-like interfaces) may quantitatively enhance the system's energy reserve, and its ability to achieve more work with a given supply or store of energy. Accordingly, the PERKS apparatus [5] may further comprise one or more FORCE turboalternators integrated with the STEER apparatus [2], primarily for the purposes of converting exergy in working fluids to additional kilowatt-scale electrical power.

FORCE is an acronym for Frictionless Organic Rankine Cycle Engine. In a preferred embodiment, the FORCE turbomachinery of the PERKS apparatus [5] may comprise one or more kilowatt-scale turboalternators, each further comprising a turbine-based pressure-differential "heat engine" and an electrical power generator or alternator, each of which may accept at its inlet, from the STEER apparatus [2], a superheated vapor stream comprising a selected working fluid at the required inlet temperature and pressure (i.e., within an operational range), and deliver from its outlet, to the STEER apparatus [2], a still-superheated vapor stream of relatively lower pressure and temperature. In a preferred embodiment, each associated turboalternator may produce a variable-frequency, variable-voltage "wild" alternating current (AC) which may be subsequently rectified or otherwise conditioned or smoothed as desired (internally or externally), and which may consequently serve as a primary or auxiliary power source. In a preferred embodiment, the electrical power output may be delivered directly to a PERKS [5] intelligently managed reconfigurable high-voltage DC power rail.

In a preferred embodiment, and on a scale which is typically smaller than the prime movers of the PRIME apparatus [4] (and which may comprise small-scale versions of apparatus which may otherwise by considered to be the PRIME apparatus [4]), the PERKS apparatus [5] may comprise any number of apparatus which may collect renewable energy and/or consume fuel or other forms of exergy supplied by the STEER apparatus [2], and which may serve as auxiliary power units in order to augment or transform the systems exergy reserves.

In a preferred embodiment, the PERKS apparatus [5] serving as auxiliary power units may comprise various significant heat-producing devices (with myriad efficiency differences and other trade-offs), such as internal combustion engines, fuel cells, catalytic heaters, inductively coupled plasma (ICP) reactors, photovoltaic (PV) or thermal solar collectors, or various other heat sources, and such devices or heat sources may or may not be capable of also generating electrical power directly in addition to their thermal output.

In another preferred embodiment, the PERKS apparatus [5] may comprise any number of apparatus which may consume fuel supplied by the STEER apparatus [2], but whose goal may be to directly or indirectly transform a portion of the fuel's latent chemical energy into high-grade "cold energy" (a form of exergy) such as that required to liquefy gases at cryogenic temperatures (e.g., such as liquefying natural gas, or NG, to LNG), a process generally referred to a "liquefaction." Typically, some portion of the gaseous fuel input may be consumed to power the process, some portion may be liquefied, and some may remain as fuel to be passed on as an output stream.

In a preferred embodiment, different working fluids at different operating temperatures and pressures may be delivered via the STEER apparatus [2] to the PERKS apparatus [5] so as to accomplish, for example, RUBE [3]-type cooling of its internal control and power-generation electronics, as well as recuperation of exergy, including from exhaust streams. Exergy flows from the PERKS apparatus [5] subsystems may subsequently be directly or indirectly delivered via the STEER apparatus [2] exergy flows to other subsystems, including to one or more of the FORCE turboalternators within the PERKS apparatus [5] itself, as a means to help generate additional electrical power.

5.2 PERKS FORCE (Frictionless Organic Rankine Cycle Engine)

In a preferred embodiment, the FORCE apparatus may comprise one or more kilowatt-scale turboalternators (e.g., turbomachinery-type devices), each further comprising a turbine-based pressure-differential "heat engine" and an electrical power generator or alternator), each of which may accept at its inlet, from the STEER apparatus [2], a superheated vapor stream comprising a selected working fluid at the required inlet temperature and pressure (i.e., within an operational range), and deliver from its outlet, to the STEER apparatus [2], a still-superheated vapor stream of relatively lower pressure and temperature.

In a preferred embodiment, where a FORCE turboalternator may be physically or virtually assigned to (e.g., "paired with") an upstream or downstream device, the system may gain considerable reconfigurability and efficiency, since the scaling and turn-down operations may be one-to-one (generally avoiding the situation where operation occurs at "off-design" points).

For example, the availability of an upstream source to supply working fluid at the proper temperature and pressure may constrain the input to a set of FORCE turboalternators, which may cause all of them to operate at an "off-design" point, so some may be "turned down" so as to be able to operate the remainder at the design point. In order to achieve this kind of dynamic fine-tuning flexibility, which is an object of the invention, the FORCE turboalternator units may need to have an appropriately fine-grained capacity relative to any upstream and downstream capacity constraints.

Figure 105:
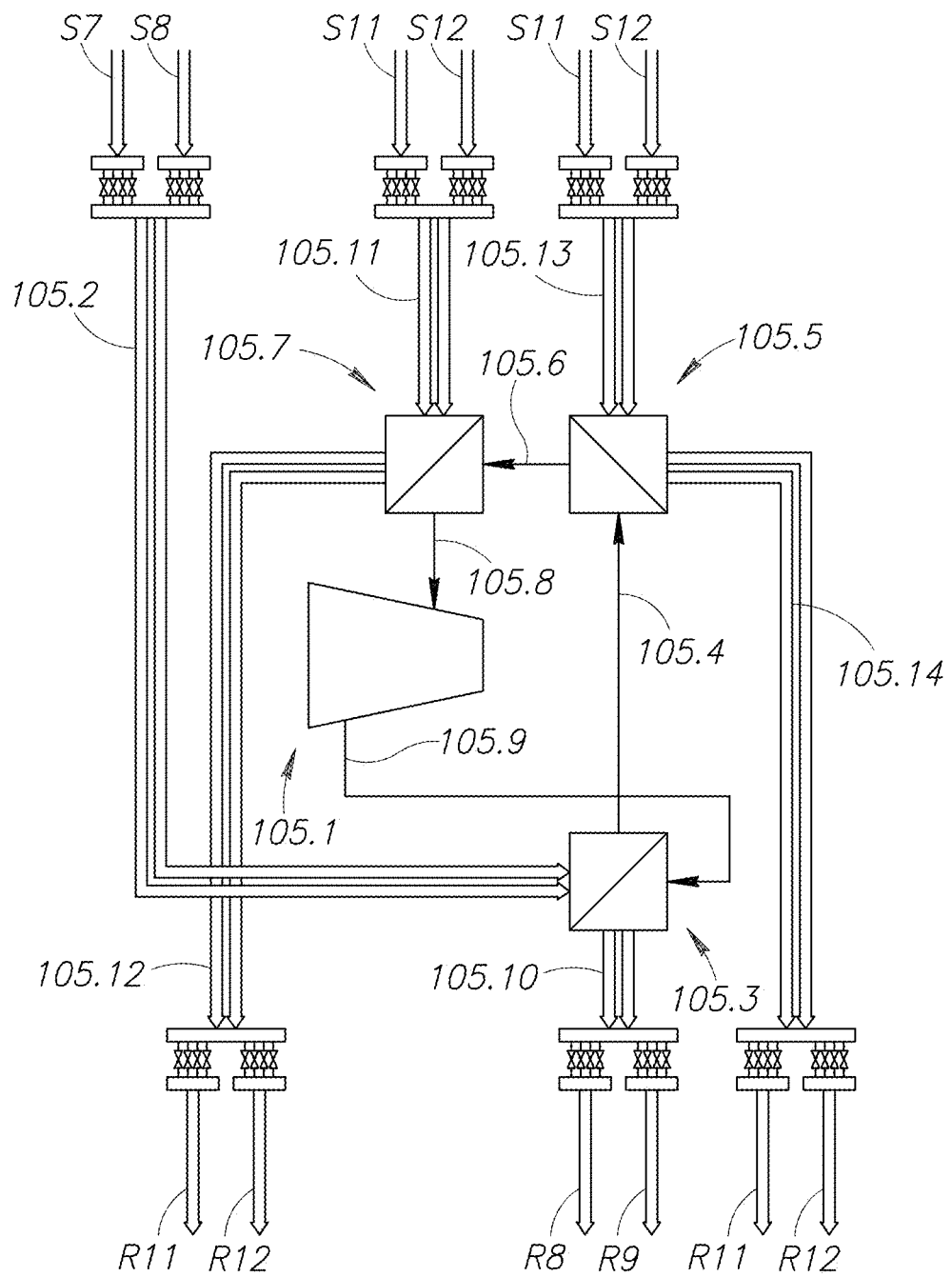
FIG. 105: PERKS—FORCE Turboalternator with Single RUBE™ LT2 Fluid
Figure 106:
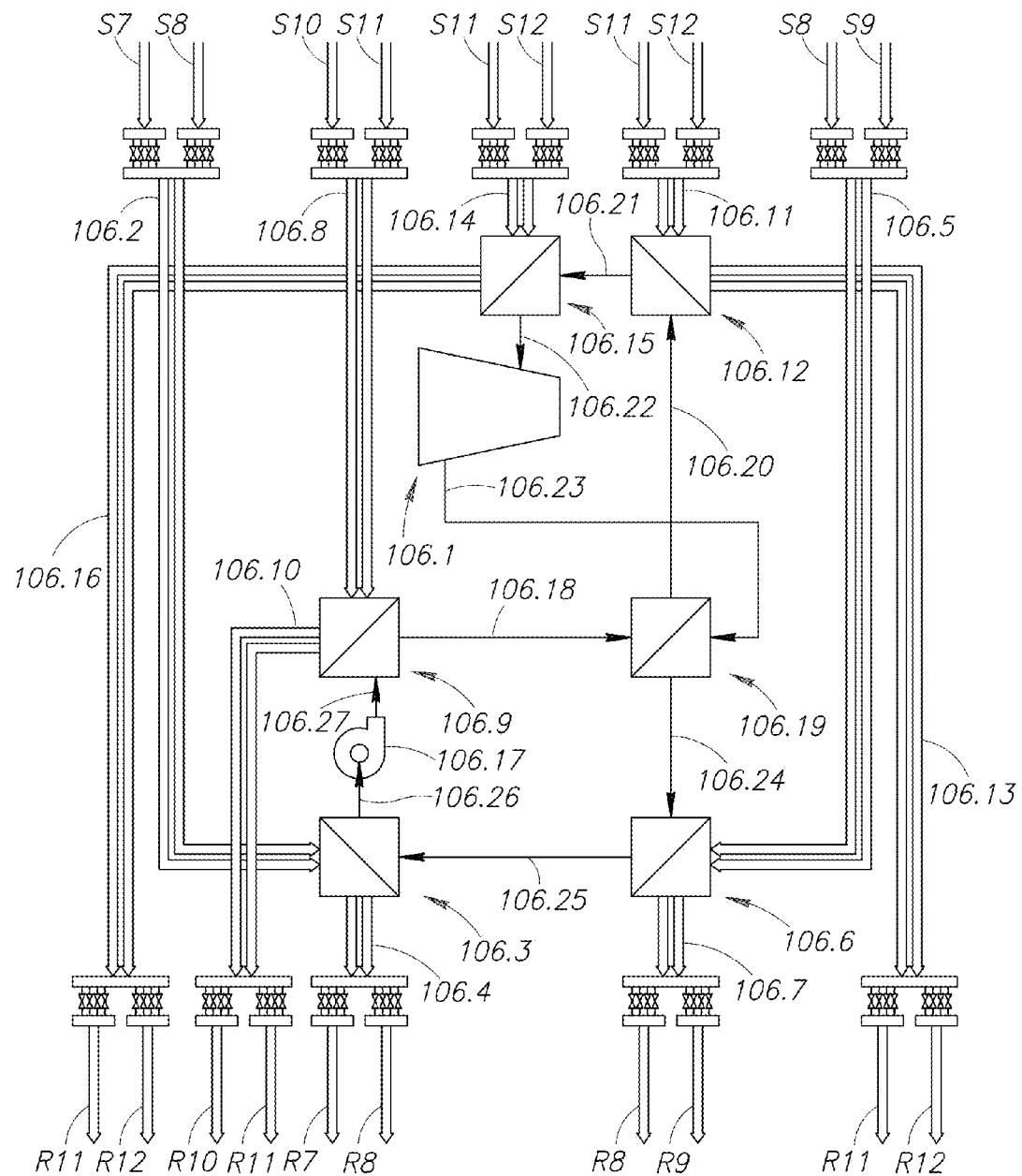
FIG. 106: PERKS—FORCE Turboalternator with Diverse RUBE™ LT2 Fluids

For example, a prime mover producing electrical power may be augmented by one or more auxiliary FORCE low-pressure turboalternators (such as is depicted in FIG. 105 and FIG. 106) that may recuperate heat energy from a prime mover, where each auxiliary unit may have an electrical output capacity on the order of 5% to 20% of the prime mover's capacity (i.e., a value which may be intentionally much less that the total amount of "waste" heat energy prior to recuperation.

In another example, a fuel-based prime mover consuming a natural gas may operate at a relatively low fuel pressure of, say, 1 to 10 psi for a particular low-pressure device, or perhaps 50-100 psi for a particular higher-pressure unit. Nonetheless either of these ranges may be an order of magnitude or more lower than the available fuel stream pressure of, say, 1000 psi or more. In this example, a prime mover producing electrical power may be augmented by one or more auxiliary FORCE high-pressure turboalternators that may recuperate pressure energy from the available fuel stream, where each auxiliary unit may have an electrical output design capacity that may be closely tied to the mass flow rate of the fuel that may be consumed by the prime mover, regardless of the efficiency or electrical output capacity (if any) of the prime mover. For example, said auxiliary unit may have an electrical output design capacity (in $KW_E$) on the order of up to 1%, or perhaps up to 2% of the prime mover's fuel input value (KW). How this relates to the prime mover's power output capacity depends greatly on the efficiency of the primer mover. For example, a 200 $KW_E$ microturbine operating at 33% electrical efficiency may consume 600 KW of natural gas to do so, and a high-pressure backpressure turbine on the fuel inlet may generate on the order of 3 $KW_E$, which corresponds to only 0.5% of the fuel value in KW, but 1.5% of the electrical power output. Thus, the auxiliary high-pressure turboalternator on the fuel inlet stream may effectively boost the microturbine electrical output by 1.5% with no additional fuel cost.

FORCE Low-Pressure Turboalternator

Referring to the example specifications in the table below, we can see that a single unit may generate 10 $KW_E$ with an inlet pressure of 6 bar, but only 3 $KW_E$ with half that pressure. Thus, if a pair of FORCE turboalternators operating in parallel is generating a total of 20 $KW_E$ at 6 bar, and the pressure from the upstream source drops from 6 bar to 3 bar, the pair may now generate a total of only 6 $KW_E$ at the 3-bar "off-design" point, which corresponds to 30% of the original capacity. Alternatively, if the pressure from the upstream source drops to 3 bar and, to compensate, one of the units is turned down (i.e., shut down and taken out of the circuit, for example, under the control of the SLAM [1] subsystems of FIG. 1), such that the upstream source may now deliver 6 bar again (because there's only one pressure-consuming turboalternator unit), then that remaining unit may now generate a full 10 $KW_E$ at the 6 bar design point, which corresponds to 50% of the original capacity (which is a lot better than the 30% that may occur with two units online). In this reduced-pressure scenario, running a single FORCE turboalternator may provide more than three times the power output of running two turboalternators in parallel (i.e., 10 $KW_E$ vs. 3 $KW_E$).

In a preferred embodiment, each associated turboalternator may produce a variable-frequency, variable-voltage "wild" AC current which may be subsequently rectified or otherwise conditioned or smoothed as desired (internally or externally), and which may consequently serve as a primary or auxiliary power source. In a preferred embodiment, the electrical power output may be delivered directly to a PERKS [5] subsystem as depicted notionally in FIG. 1.

In a preferred embodiment, the output power of any such turboalternator may be conditioned via an independent MPPT (maximum power point tracking) circuit as is well known in the art, and this conditioning may be provided by a PERKS [5] subsystem. In a further preferred embodiment, the output power may be conditioned in accordance with the immediate needs or demands of downstream power consumers, which power conditioning may be provided by a PERKS [5] subsystem, and may be coordinated or controlled by the SLAM apparatus [1], as notionally depicted in FIG. 1.

In a preferred embodiment, the working fluid may comprise a low-boiling point dielectric fluid such as that which may be selected as a coolant (e.g., such as RUBE™ LT2 fluid; see FIG. 32 for properties) for various electronic systems as described elsewhere in this document.

In a preferred embodiment, a relatively hot (e.g., 130° C. or lower) stream of relatively low-pressure (e.g., 6- to 8-bar) superheated RUBE™ LT2 working fluid may be supplied to the FORCE turboalternator apparatus by the STEER apparatus [2] in order to generate electrical power. Example specifications for operating temperatures and pressures for a low-pressure 10 $KW_E$ turboalternator are provided in the table below, with corresponding power outputs.

| Turboalternator Inlet | | | Turboalternator Outlet | | | |
|---|---|---|---|---|---|---|
| Pressure Bar | Boiling Point (@ pressure) ° C. | Design Temperature (@ pressure) ° C. | Pressure Bar | Boiling Point (@ pressure) ° C. | Design Temperature (@ pressure) ° C. | Power Output KW |
| 6 | 94 | 125 | 1 | 36 | 103 | 10 |
| 5 | 87 | 125 | 1 | 36 | 103 | 9.2 |
| 4 | 79 | 125 | 1 | 36 | 103 | 5.8 |
| 3 | 68 | 125 | 1 | 36 | 103 | 3.0 |
| 2 | 56 | 125 | 1 | 36 | 103 | 0.0 |
| 1 | 36 | 125 | 1 | 36 | 103 | 0.0 |

In a preferred embodiment, the reduced-pressure (e.g., from 6-bar to 1-bar) working fluid exiting the FORCE apparatus [6] may be cooled significantly (e.g., to 110° C. or lower), but still superheated, and so its thermal exergy (in this case, heat) may be immediately and directly recuperated, or alternatively, may be recuperated further downstream as appropriate. Either way, the working fluid may be returned to the STEER apparatus [2], where it may be further segregated or mixed, and redistributed where needed, according to its best and highest use, which may be determined and coordinated by the SLAM apparatus [1].

As an example, in a preferred embodiment, a set of FORCE turboalternators whose working fluid may be preheated and vaporized by electrical, electronic, or other low-grade heat-producing devices, and by recuperated heat from the set of FORCE turboalternators, and subsequently superheated by the exhaust of a 200 $KW_E$ microturbine, may generate on the order of 60 $KW_E$ of additional ("free") electrical power. When the 200 $KW_E$ microturbine output is added to the approximately 60 $KW_E$ generated by the set of FORCE turboalternators, it may result in a total power output on the order of 260 $KW_E$ from a 200 $KW_E$ microturbine, which corresponds to an immediate power generation improvement of about 30% (260/200=1.3).

PERKS FORCE Low-Pressure Turboalternator Interface to STEER

In the examples of both FIG. 105 and FIG. 106, recuperated heat energy from the prime mover is supplied via ingress of single-phase RUBE™ HT1 fluid (see FIG. 31 for properties) from STEER Thermal Bus supply [2a], with post-use egress through return [2b]. The phase-change RUBE™ LT2 fluids of both examples are also supplied from STEER Thermal Bus supply [2a], and ultimately returned via return [2b]. As noted elsewhere, in a preferred embodiment a fluid with a lower boiling point (such as $C_3F_7OCH_3$; see FIG. 32) may be preferred as the phase-change fluid. In the example of FIG. 106, which calls for diverse fluids with different boiling points, a fluid with a somewhat higher boiling point (such as $CF_3CF_2C(O)CF(CF_3)_2$; see FIG. 32) is also needed. Note, however, that the example virtual turboalternator circuit of FIG. 105 may be modified slightly or interfaced as-is to the example virtual turboalternator circuit of FIG. 106, such that "unused" exergy from one virtual circuit may be directly or indirectly transferred to the other. In the specific example of FIG. 106, one of the two diverse RUBE™ LT2 fluids may be identical to that used in the example of FIG. 105, so that the same fluid may flow within and between both circuits, enabling the direct transfer of exergy.

The examples of FIG. 105 and FIG. 106 depict virtual circuits using a single RUBE™ LT2 fluid and two diverse RUBE™ LT2 fluids, respectively, in conjunction with a FORCE turboalternator unit (for clarity, only external supply [2a] and return [2b] connections are shown as interfacing to the STEER apparatus [2]).

In the example of FIG. 105, a phase-change RUBE™ LT2 fluid (e.g., preheated by upstream electronics or other heat sources to a two-phase state in the range of 34° C. to 40° C.) may be supplied from STEER Thermal Bus supply [2a] via channels [105.2] to recuperator/heat exchanger [105.10], which adds exergy (e.g., to the range of 40° C. to 100° C.) recuperated from its counterflow fluid ingress channels [105.9]. With increased exergy, the phase-change fluid traverses channels [105.4] to superheater #1 (heat exchanger [105.5]), which adds exergy from its counterflow fluid ingress channels [105.13]. With further increased exergy, the phase-change fluid traverses channels [105.6] to superheater #2 (heat exchanger [105.7]), which adds exergy from its counterflow fluid ingress channels [105.11]. With a maximum of exergy (e.g., fluid in the range of 120° C. to 130° at a pressure of 6 bar), the phase-change fluid traverses channels [105.8] to turboalternator [105.1], which generates electrical power and significantly decreases the exergy in the phase-change fluid, which nonetheless remains superheated (e.g., in the range of 100° C. to 105° C. at a pressure of 1 bar). With decreased exergy, the phase-change fluid traverses channels [105.9] to recuperator/heat exchanger [105.10], where the exergy recuperated from ingress channels [105.9] is transferred to the fluid from the aforementioned ingress channels [105.2], thereby increasing the exergy of the fluid at aforementioned egress channels [105.4], while further decreasing the exergy of the fluid (e.g., to the range of 40° C. to 100° C.) exiting to the STEER Thermal Bus supply return [2b] via egress channels [105.10].

Continuing with the example of FIG. 105, high-temperature (e.g., in the range of 200° C. to 275° C.) single-phase RUBE™ HT1 fluid (see FIG. 31 for properties) from STEER Thermal Bus supply [2a], via ingress channels [105.5], supplies exergy to be transferred to superheater #1 (heat exchanger [105.5]) before exiting with decreased exergy (e.g., in the range of 150° C. to 200° C.) to the STEER Thermal Bus supply return [2b] via egress channels [105.14]. Similarly, high-temperature single-phase RUBE™ HT1 fluid from STEER Thermal Bus supply [2a], via ingress channels [105.13], supplies exergy to be transferred to superheater #2 (heat exchanger [105.7]) before exiting with decreased exergy (e.g., in the range of 150° C. to 250° C.) to the STEER Thermal Bus supply return [2b] via egress channels [105.12].

In the example of FIG. 106, a first phase-change RUBE™ LT2 fluid (e.g., preheated by upstream electronics or other heat sources to a two-phase state in the range of 34° C. to 40° C.) may be supplied from STEER Thermal Bus supply [2a] via channels [106.2] to condenser/heat exchanger [106.3], which transfers to it the exergy recuperated from the condensing of a second phase-change RUBE™ LT2 fluid (having a higher boiling point) in its counterflow fluid ingress channels [106.25], at which point the first fluid exits to STEER Thermal Bus return [2b] with increased exergy (e.g., but still in the range of 34° C. to 40° C.) via channels [106.4]. The second phase-change RUBE™ LT2 fluid, now condensed (and in the range of 40° C. to 50° C., for example) exits condenser/heat exchanger [106.3] as a liquid via channels [106.26] toward the inlet of pump [106.17], and from the pump's outlet through channels [106.27] to evaporator/heat exchanger [106.9]. High-temperature (e.g., in the range of 70° C. to 150° C.) single-phase RUBE™ HT1 fluid (see FIG. 31 for properties) from STEER Thermal Bus supply [2a], via ingress channels [106.8], supplies exergy to be transferred to evaporator/heat exchanger [106.9] before exiting with decreased exergy to the STEER Thermal Bus supply return [2b] via egress channels [106.10].

Continuing with the example of FIG. 106, the second phase-change RUBE™ LT2 fluid leaves evaporator/heat exchanger [106.9] with increased exergy (e.g., two-phase fluid in the range of 50° C. to 60° C.) via channels [106.18] to recuperator/heat exchanger [106.19], which adds exergy (e.g., to the range of 100° C. to 115(° C.) recuperated from its counterflow fluid ingress channels [106.23]. With increased exergy, the second phase-change RUBE™ LT2 fluid traverses channels [106.20] to superheater #1 (heat exchanger [106.12]), which adds exergy from its counterflow fluid ingress channels [106.11]. With further increased exergy, the phase-change RUBE™ LT2 fluid traverses channels [106.21] to superheater #2 (heat exchanger [106.15]), which adds exergy from its counterflow fluid ingress channels [106.14]. With a maximum of exergy (e.g., fluid in the range of 120° C. to 130° C. at a pressure of 6 bar), the second phase-change RUBE™ LT2 fluid traverses channels [106.15] to turboalternator [106.1], which generates electrical power and significantly decreases the exergy in the phase-change fluid, which nonetheless remains superheated (e.g., in the range of 130° C. to 143° C. at a pressure of 1 bar). With decreased exergy, the second phase-change fluid traverses channels [106.23] to recuperator/heat exchanger [106.19], where the exergy recuperated from the second phase-change RUBE™ LT2 fluid from ingress channels [106.23] is transferred to the fluid from the aforementioned ingress channels [106.18], thereby increasing the exergy of the fluid at aforementioned egress channels [106.20], while further decreasing the exergy of the fluid (e.g., to the range of 110° C. to 125° C.) toward the desuperheater/heat exchanger [106.6] via egress channels [106.24].

Further continuing the example of FIG. 106, a first phase-change RUBE™ LT2 fluid (e.g., preheated by upstream electronics or other heat sources to a two-phase state in the range of 40° C. to 100° C.) may be supplied from STEER Thermal Bus supply [2a] via channels [106.5] to desuperheater/heat exchanger [106.6], which transfers to it the exergy recuperated from the desuperheating of a second phase-change RUBE™ LT2 fluid (having a higher boiling point) inbound from its counterflow fluid ingress channels [106.24], at which point the first fluid exits to STEER Thermal Bus return [2b] with increased exergy (e.g., but still in the range of 40° C. to 100° C.) via channels [106.7]. The second phase-change RUBE™ LT2 fluid, now desuperheated (and in the range of 40° C. to 50° C., for example) as it exits desuperheater/heat exchanger [106.6] enters condenser/heat exchanger [106.3] as saturated vapor or two-phase fluid via channels [106.25].

FORCE High-Pressure Turboalternator

In another preferred embodiment, a relatively cold or cool (e.g., 0° C. to 25° C.) stream of relatively high-pressure (e.g., 60- to 80-bar) superheated working fluid may be supplied to the FORCE apparatus [6] by the STEER apparatus [2] in order to generate electrical power. In a preferred embodiment, the reduced-pressure (e.g., 7- to 12-bar) working fluid exiting the FORCE apparatus [6] may be cooled significantly (e.g., to −40° C. to −60° C.) while remaining superheated, and so its thermal exergy ("cold energy") may be immediately and directly recuperated, or alternatively, may be recuperated further downstream as appropriate. Either way, the working fluid may be returned to the STEER apparatus [2], where it may be further segregated or mixed, and redistributed where needed, according to its best and highest use, as coordinated by the SLAM apparatus [1].

In a further preferred embodiment, the working fluid may comprise a fluid which is cryogenic in its liquid phase, but a superheat or supercritical fluid in the temperature range of interest, such as Liquefied Natural Gas (LNG), which may be selected to serve the dual roles of "refrigerant" and "fuel" (e.g., such as RUBE™ CF or RUBE™ SF fluids) as described elsewhere in this document. In another embodiment, the working fluid may comprise a fluid which is cryogenic-capable (usable in a cryogenic range), but may also be well-suited to storage or transport as a liquid in several operating conditions (e.g., pressurized, quasi-pressurized, or refrigerated), and which may likewise be a superheated or supercritical fluid in the temperature range of interest, such as dimethyl ether (DME), which may be selected to serve the dual roles of "refrigerant" and "fuel" (e.g., such as RUBE™ LF fluids) as described elsewhere in this document.

Note that, although the FORCE apparatus [6] may use a cryogenic fuel as a working fluid, no fuel is combusted or otherwise consumed by the FORCE apparatus [6], which may operate primarily on the pressure differential between its inlet and outlet streams.

In a preferred embodiment, each turboalternator of the FORCE apparatus [6] may be a small, modular unit typically capable of generating from a few kilowatts to a few tens of kilowatts, with a size that may be generally relative to its electrical output capacity, but also may be dependent upon the densities, mass-flow rate, operating pressures, and operating temperatures of the working fluids and applications with which it may be compatible and for which it may have been designed or adapted. For example, in one preferred embodiment, a turboalternator may serve as a turboexpander (thereby potentially substituting and eliminating the need for a "let-down" pressure-reducing valve, or PRV) for a high-pressure vapor stream such as a 70-bar supercritical fuel vapor (e.g., vaporized LNG), in order to generate electrical power while reducing the high-pressure inlet stream to an outlet pressure that may be better suited for a relatively lower-pressure downstream device.

In a preferred embodiment, a turboalternator like the aforementioned may be sized so as to closely correspond to the set of downstream devices it serves, with a correspondence possibly as close as one-to-one. In this example, if the downstream device is, say, a microturbine or fuel cell which may operate at an inlet fuel natural gas (NG) fuel pressure of 5- to 6-bar, a FORCE turboalternator may be used to reduce the example 70-bar vaporized LNG fuel supply to a lower range that can be handled by the downstream device's pressure regulator.

In the case of a fuel cell with a very low inlet pressure of 0.02 to 0.04 bar (0.3 to 0.5 psi), for example, a second, smaller turboalternator may be employed as a turboexpander to take advantage of 5- to 6-bar pressure differential (although the second turboexpander would suffer from diminishing returns in this example, and would generate much less power, the power so generated would be "free" from an energy viewpoint, and otherwise a PRV would be needed at the fuel cell inlet).

Thus, in order to support a one-to-one correspondence (for example) between the FORCE turboalternator and the downstream device, the mass-flow rate of the turboalternator may need to be generally on par with that of the downstream device, and such mass-flow-rate may be orders of magnitude below that of commercially available turboalternators (largely due to the combination of relatively low-density gaseous fuel and relatively low consumption rate of the downstream device). As a specific example, a commercially available backpressure turbine may utilize a mass-flow rate on the order of 11 kg/s (about 87,600 lbs/hour) of steam to generate on the order of 930 $KW_E$, whereas a FORCE turboalternator in a high-pressure fuel stream of a 200 $KW_E$ microturbine may utilize a mass-flow rate on the order of 0.045 kg/s (about 357 lbs/hour) of passed-through fuel to generate on the order of 3 $KW_E$ (e.g., 2 to 4 $KW_E$, and nominally about 3.2 $KW_E$) of additional electrical power.

Additionally, the FORCE turboalternator of this example may enable bypassing fuel compression apparatus that may otherwise be required to boost lower NG pressures to the 5 or 6 bar pressure level typically required by a microturbine. Such compression apparatus may normally constitute a parasitic load on the order of 4 $KW_E$, thereby reducing the nominal 200 $KW_E$ microturbine output to 196 $KW_E$. When the 4 $KW_E$ savings is added to the 3 $KW_E$ generated by the example FORCE turboalternator (7 $KW_E$ combined total), it may result in a total power output on the order of 203 $KW_E$ from a 200 $KW_E$ microturbine that otherwise may produce only 196 $KW_E$, which corresponds to an immediate power generation improvement of about 3.6% (203/196=1.0357).

In a preferred embodiment, although such a FORCE turboalternator as just described may be individually paired with a downstream device such as microturbine (at least conceptually, since, in the context of FRAME, such assignments are "virtual"), it may not appreciably increase the packaging envelope of the downstream device, and may even reduce it (such as by eliminating the need for a fuel compressor in the aforementioned example). In this example, a FORCE turboalternator capable of generating 3 $KW_E$ from a 70-bar vaporized LNG fuel supply (to be consumed, for example, by a single 200 $KW_E$ microturbine or a trio of 65 $KW_E$ microturbines) may be very small, such as less than 8 inches long and less than 5 inches in diameter, with a rotor whose outside diameter may be between one and two inches. Because of the relatively low density of the gaseous fuel, and the high inlet pressure, the turbomachinery may rotate at between 200,000 RPM and 250,000 RPM nominally (220,000 RPM typical), with the rotor/shaft combination comprising the only moving part, one which rides on vapor bearings (i.e., a cushion of vaporized working fluid may provide the only lubrication, so no oil or other lubrication may be needed).

6. STORE (Storage & Transport of Operating & Reserve Exergy)

6.1 STORE Overview

STORE is an acronym for Storage & Transport of Operating & Reserve Exergy. STORE [6] refers to a subsystem of certain versions of the present invention, as depicted notionally in FIG. 1. In a preferred embodiment, thermal exergy in the form of available "heat energy" or "cold energy" contained in diverse working fluids and materials (further comprising the potential from temperature and pressure differences, such as between hot and cold fluids) and operating at diverse potentially useful temperature and pressure ranges may be safely stored and converted or transported using, for example, specially insulated tanks, pipes, tubing, heat exchangers or other low-loss STORE apparatus [6], and may be connected to STEER apparatus [2] directly or indirectly via heat exchangers (details to follow). Likewise, other forms of exergy (such as chemical or potential energy), may also be stored or transported in addition to, or in lieu of, thermal energy.

In a preferred embodiment, STORE apparatus [6] may comprise any combination of appropriately insulated storage, plumbing, and pumping subsystems and components, which may further comprise above-ground, in-ground, or underground thermal storage and transport systems, which may further comprise geothermal storage mechanisms wherein the earth itself (which may further comprise, without limiting the generality of the foregoing, solids, semi-solids, liquids, and gases) may serve as a thermal exergy source or sink, as appropriate.

It is common practice to use bus bar or bus tubing for part of the high-current electrical power distribution in a facility. The load-carrying capacity of said bus bar or bus tubing such as [6.60] as depicted in FIG. 109 is primarily a function of cross-sectional area and temperature rise, although the capacity may need to be derated or adjusted downward for alternating current (AC), due to the "skin effect." In a preferred embodiment of a FRAME SUREFIRE facility, electrical power distribution is entirely, or almost entirely, direct current (DC), which requires no derating.

Figure 109:
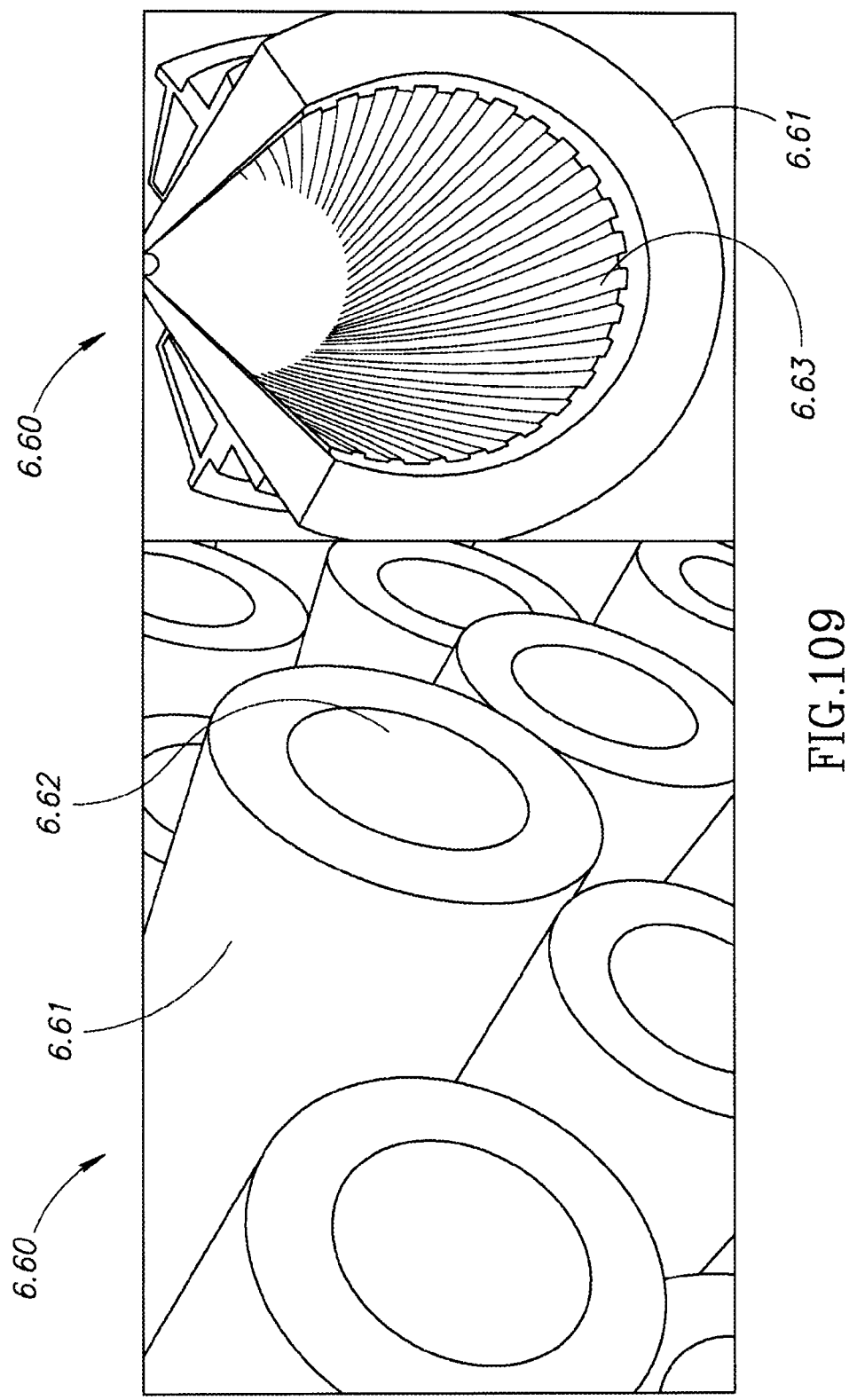
FIG. 109: STORE—Copper Bus Tubing as Circulating Storage Buffer—Examples

Due to the potential heat rise of bus bar or bus tubing, it is common practice (PRIOR ART) to avoid insulating or even painting it (i.e., leaving it bare, as can be seen in FIG. 109 at the shiny outer surface of wall [6.61]), since doing so reduces its ability to reject heat to the environment, thereby increasing the temperature rise. Thus, bus bar or bus tubing which is not bare should be derated to account for the increased temperature rise.

In a preferred embodiment, copper bus tubing [6.60] such as the examples of FIG. 109 (which depict said copper bus tubing used as circulating storage buffer) may be used for high-current electrical power distribution throughout a FRAME SUREFIRE facility, and also serve as a circulating storage buffer (see reservoir [6.51] in FIG. 107) for selected STEER working fluids, to which heat may be directly rejected to the inner surface of wall [6.61] (rather than rejecting heat to the environment). The current is carried in the copper of wall [6.61] of copper bus tube [6.60], while fluid is carried in the hollow portion [6.62] of the tube. The inner surface of wall [6.61] may have rifling or grooves [6.63] as depicted in FIG. 109 (at right) to improve thermal transfer efficiency through increased surface area and turbulence (reduced laminar flow).

In a preferred embodiment, the STEER Thermal Bus [2a] Supply channels and STEER Thermal Bus [2b] Return channels comprise pipe, tubing (see FIG. 109), manifolds, and other passive components further comprising materials and construction that may be compatible with, and suitable for, whatever fluid is intended to flow within. Additionally, said fluid supply and return channels may have varying capacities, useful/allowable operating temperature/pressure ranges, fluid compatibilities in general, or specific chemical resistances. In a preferred embodiment, the construction of some fluid channels may be oriented to materials suitability or compatibility with particular fluids, temperatures, pressures, or safety requirements. For example, as previously explained, in a preferred embodiment, channels for hot or cold fluids may be well insulated, such as with aerogel-based materials.

In one preferred embodiment, STORE apparatus [6] may comprise one or more novel "deep-hole" ground-coupled heat exchangers (GCHE) wherein each such device (see FIG. 119) may implement a counterflow heat exchanger (as a class, counterflow heat exchangers are known in the art to maximize efficient heat transfer), taking into account, for example, the "heat flow" of the earth itself, with a thermal gradient of 25° C. to 30° C. per kilometer of depth (away from tectonic plate boundaries, down to about 100 to 200 kilometers). In contrast, a common GCHE (see FIG. 118) may implement a concurrent or parallel flow heat exchanger that may work against itself as the working fluid flowing therein is returned to the surface. In a further preferred embodiment of a counterflow GCHE (see FIG. 119), integration with the STEER apparatus [2] may enable the direction of flow to be reversed on demand (see digital reversing valve [2.20] of FIG. 25 and usage examples in FIG. 26 and FIG. 27), which may further enable application of thermal exergy to meet a differing need, including the ability to "recharge" the thermal field toward a new threshold.

In a preferred embodiment, exergy may be stored in the form of temperature differentials between "cold energy" and "heat energy" reservoirs, such as the large temperature differential (477° C., or 858° F.) between cryogenically stored liquefied natural gas (LNG) fuel (which typically may be stored in liquid form at near-ambient pressure at −162° C. or lower, or as a liquid under higher pressures at or below the critical temperature of −83° C.) and thermal oil such as RUBE™ HT1 (high-temperature) fluid (which may be stored at +315° C.), or such as the smaller temperature differential (200° C., or 360° F.) between LNG fuel stored at about −162° C. and a phase-change working fluid such as RUBE™ LT2 at an operating pressure where its boiling point may be, say, about 38° C.

In another preferred embodiment, exergy may be stored and retrieved via alternating sorption and desorption cycles which take advantage of the working fluids and various temperatures and pressures that may be available via the STEER apparatus [2] from elsewhere in the system, which may also include the STORE apparatus [6] itself. Such alternation of sorption and desorption cycles may induce desirable temperature or pressure changes to the various working fluids involved, which may be manifest as refrigeration, for example.

6.2 STORE Modular Internal Thermal Storage

In a preferred embodiment, thermal exergy in the form of available "heat energy" or "cold energy" contained in diverse working fluids and materials (further comprising the potential from temperature and pressure differences, such as between hot and cold fluids) and operating at diverse potentially useful temperature and pressure ranges may be safely stored and converted or transported using, for example, specially insulated tanks, pipes, tubing, heat exchangers or other low-loss STORE apparatus [6], and may be connected to STEER apparatus [2] directly or indirectly via heat exchangers.

Figure 107:
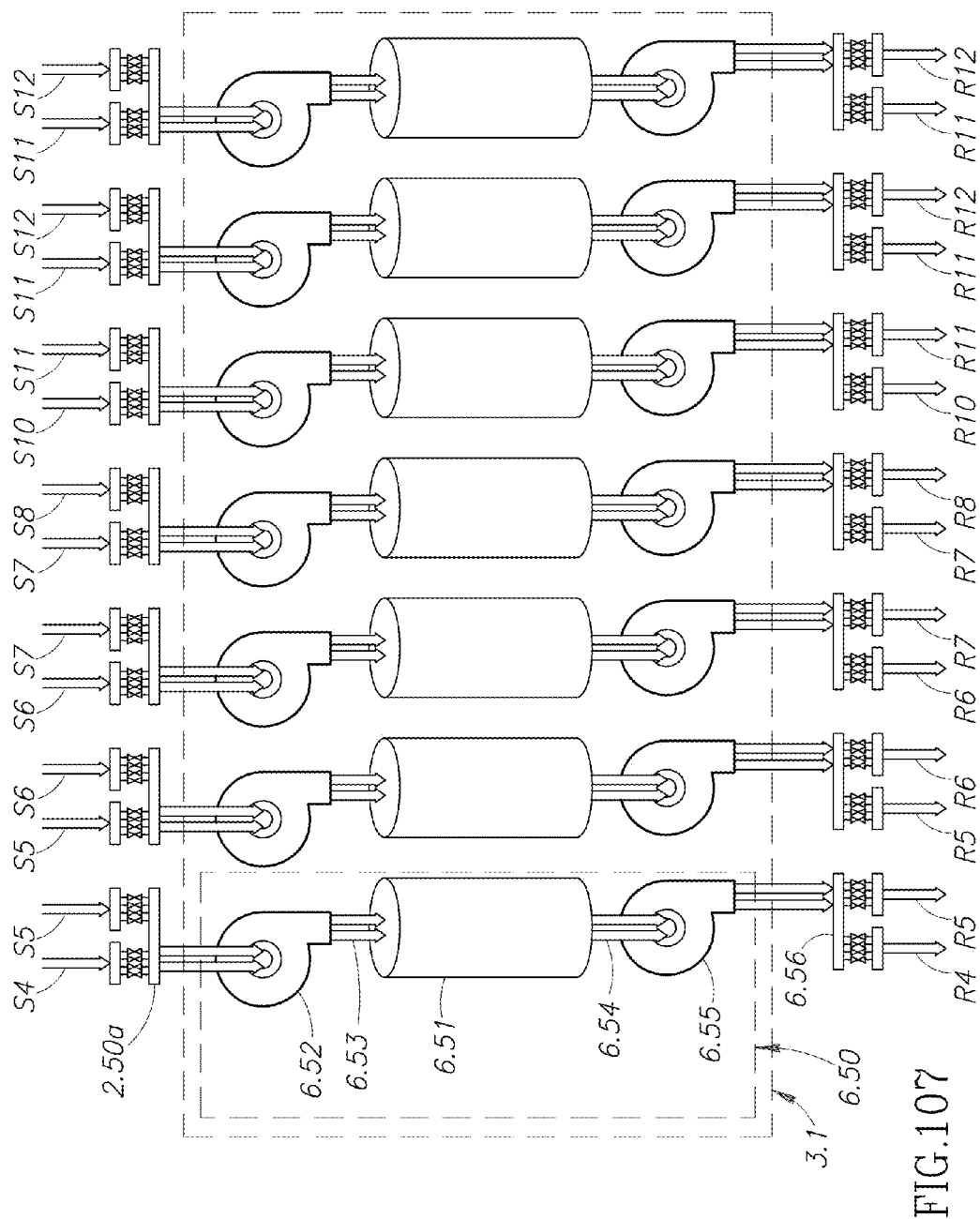
FIG. 107: STORE—Modular Thermal Exergy Reservoirs May Buffer Different Temperature Ranges
Figure 108:
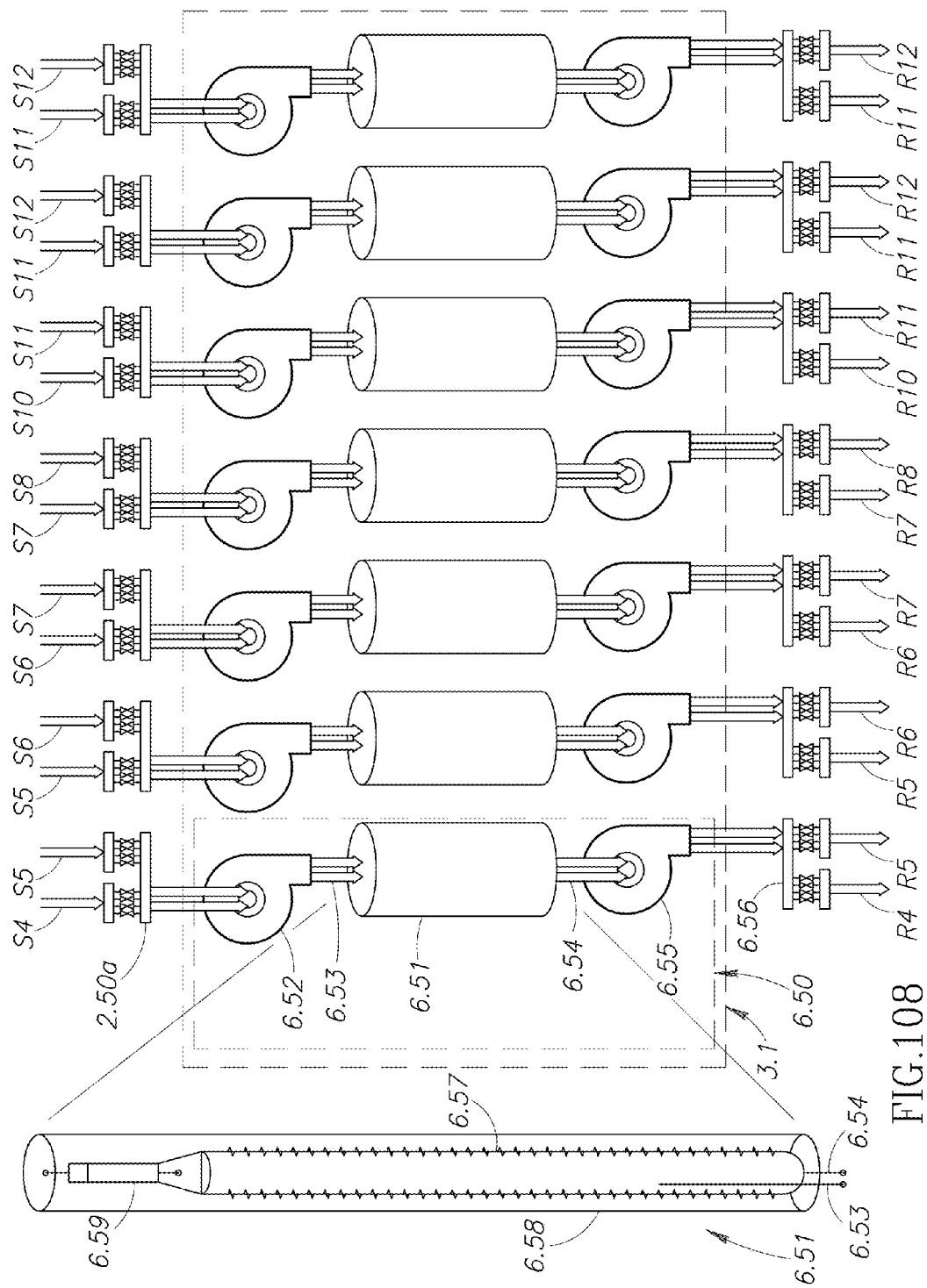
FIG. 108: STORE—Modular Thermal Exergy Reservoirs with Bellows—Example

FIG. 107 and FIG. 108 depict example embodiments where STORE [6] modular thermal exergy reservoirs [6.50] may buffer different temperature ranges and fluids (and by implication, pressure ranges; see FIG. 107 and FIG. 14). FIG. 107 depicts an example where a modular thermal exergy reservoir [6.50] comprises a reservoir (storage) [6.51] and variable-speed pumps [6.52] [6.55] in a push, pull, or push/pull configuration, with interfaces to the aforementioned STEER apparatus [2] via digital mixer valve [2.50a] and digital splitter valve [2.50b]. As previously noted, in a preferred embodiment, modular thermal sources and sinks may be dynamically controlled, and may also dynamically inserted and removed from FRAME's STEER apparatus [2], and such insertion or removal may be physical or virtual, under the dynamic control of the SLAM apparatus [1].

In a preferred embodiment, the FRAME system may be co-located with an embodiment of SUREFIRE apparatus [7], which, through co-designed functionality, may provide an optimal deployment arrangement of FRAME. The SUREFIRE apparatus [7] (examples of which are depicted in FIG. 120 to FIG. 138) may be considered a co-designed automated subsystem of FRAME capable of dynamically accepting, handling, securing, installing, configuring, operating, reconfiguring, and replacing modular payloads [3.1] comprising other FRAME subsystems (for example, the one or more modular thermal exergy reservoirs [6.50] of FIG. 107 and FIG. 108.

FIG. 108 depicts an example embodiment where a STORE [6] modular thermal exergy reservoir [6.50] further comprises a bellows apparatus [6.57] within an outer enclosure [6.58], wherein the bellows interior [6.51] is a variable-capacity reservoir, and actuator [6.59] compresses or extends bellows [6.57] (thereby dynamically decreasing or increasing the storage volume, respectively, which, as is known in the art, may affect the operating pressure and temperature in accordance with the combined gas law). As depicted in FIG. 108, an insulating sleeve [6.57] guides bellows [6.57] travel within enclosure [6.58].

6.3 STORE Cryogenic Fuel Storage—Buffering & Extended Storage

A FRAME system buffering facility that is located near (or directly connected to) a major LNG facility may reasonably require a somewhat lower storage capacity than a system which may operate mostly off-grid. The LNG facility itself may incorporate significant buffering, and long-term LNG purchase agreements may be in place as part of the arrangement. Thus, the buffering needed may apparently be more closely tied to energy security (and a particular threat model) than to strictly economic or logistic concerns.

NOTE: In this context, the NG and LNG gas distribution networks may be thought of as part of the utility grid, in contrast to, for example, landfill gas (LFG)-powered sites, where even a closed facility may continue producing methane for 40 years, because The design of many major LNG storage facilities, while varying widely, may be constructed to meet 10-day peak requirements on an annual basis. In other words, many LNG storage facilities can deliver 10% of storage quantities during each operating peak-day. If these peak days coincide, there may be shortfalls that could negatively impact a FRAME-system-based facility that may have insufficient LNG buffering capacity.

Aside from the fuel supply aspect, an important reason for co-locating a FRAME-system-based facility near a major LNG facility may be the aspect of thermal exchange with the LNG facility. That is, the FRAME-system may "export" exergy in the form of heat (which the LNG facility may utilize for LNG vaporization) and "import" cold energy (exergy obtained from LNG vaporization). This may beneficially reduce the energy costs of the LNG facility while also reducing its environmental impact (although, perhaps not by a large percentage, depending upon the scale and relative sizes of the two facilities). Exergy imported into the FRAME system may significantly decrease its footprint, but dependence on imported exergy may increase the need for local buffering and storage, to reduce the risk of a local shutdown in the event of a glitch with the LNG facility upon which it may normally depend.

Denitrogenation: Minimizing Nitrogen ($N_2$) Content of LNG to Maximize Storage Capacity In general, the nitrogen ($N_2$) content of commercially available LNG is already relatively low (typically around 1% or less), with definite geographic variation, as depicted in the table below.

TABLE

LNG Composition (Mole Percent) with Examples of Geographic Variation

| SOURCE | Methane | Ethane | Propane | Butane | Nitrogen |
|---|---|---|---|---|---|
| Alaska | 99.72 | 0.06 | 0.0005 | 0.005 | 0.20 |
| Algeria | 86.98 | 9.35 | 2.33 | 0.63 | 0.71 |
| Baltimore G & E | 93.32 | 4.65 | 0.84 | 0.18 | 1.01 |
| New York City | 98.00 | 1.40 | 0.40 | 0.10 | 0.10 |
| San Diego G & E | 92.00 | 6.00 | 1.00 | — | 1.00 |

(Source: Liquid Methane Fuel Characterization and Safety Assessment Report; Cryogenic Fuels, Inc. Report No. CFI-1600, December 1991)

While some locations may enjoy commercially available LNG with a nitrogen content well below an accepted or required threshold 1%, there are clearly U.S.-based sources where the percentage is much higher than the lowest values encountered (e.g., Baltimore and San Diego are 100× higher than New York City, and 5× higher than Alaska). From a storage viewpoint, the lower the nitrogen content, the higher the fuel value of the stored LNG, and thus the higher the stored fuel energy value (e.g., in BTU or KWH) for a given liquid tank capacity (e.g., in gallons or $m^3$). Additionally, there may be significant benefits to downstream fuel-consuming devices, such as fuel cells, which may have cell stacks that may be damaged by ammonia originating from nitrogen in the fuel stream.

When non-LNG sources of natural gas are to be converted to LNG for storage through liquefaction, the original nitrogen content may be significantly higher than in even the worst-case commercially available LNG and pipeline NG sources.

In a preferred embodiment, the LNG storage capability of the STORE apparatus [6] may further comprise apparatus for reducing the nitrogen content of LNG (a process called "denitrogenation") after it has been stored, or more preferably (when practical), prior to storage. If the nitrogen content is above a threshold value of, say, 1%, separating off the impermissible nitrogen amount from the liquefied natural gas may be required, and may in any case be beneficial to downstream devices and their intended end-uses. For example, an NG-fed stationary fuel cell may require a nitrogen concentration of less than 20 ppm (0.002%), in order to minimize the conversion of nitrogen to ammonia within an internal steam methane reforming (SMR) step, since ammonia is known to shorten the life of typical fuel cell stacks. (See FIG. 99 and associated discussion for more on this).

In a preferred embodiment, a low-temperature membrane-based process may be interfaced to the STEER Thermal Bus for one or more early stages of NG denitrogenation. In another preferred embodiment, a pressure-swing adsorption (PSA) process may be used to reduce the nitrogen content of LNG. In an alternative preferred embodiment, a commercial available apparatus such as that available from Praxair (www.praxair.com) may be similarly interfaced to the STEER bus to achieve NG denitrogenation.

In some preferred embodiments, methods for separating off nitrogen from LNG may be used, in which, by way of a stripping column which serves for separating off the nitrogen-rich fraction, nitrogen may be depleted somewhat more selectively and simultaneously than in some earlier methods, preferably while minimizing unwanted losses of methane to the nitrogen-rich fraction to be depleted. Such a method of the type in question for separating off a nitrogen-rich fraction from a liquefied hydrocarbon-rich fraction (e.g., LNG) may be taken, for example, from U.S. Pat. No. 5,893,274, or more preferably, from US2010/0275646 A1 or subsequent improvements thereof. In said methods, the liquid fraction produced in the bottom of the stripping column is the desired LNG product, whereas the nitrogen-rich gas fraction taken off at the top of the stripping column may be used as combustion gas (for example, as fuel for a microturbine, which is not harmed by nitrogen content). Note that although the presence of nitrogen may lower the fuel value of a combustion gas, it does not have the same negative impact in a combustion process such as that used by a microturbine as it does on the non-combustion electrochemical process such as that in a fuel cell.

6.4 STORE/RUBE—Sorption Chillers

STORE Sorption Chillers Overview

Generally speaking, a sorption chiller is a chiller which depends on a repeated cycle of either an adsorption (solid sorbent) or absorption (liquid sorbent) phase followed by a subsequent desorption or regeneration phase. In the adsorption or absorption phase a "sorbent" (i.e., drying agent, like silica gel, zeolites, or activated carbon, for example) attracts, holds, and condenses the refrigerant vapor, thereby removing heat from it (the heat is transferred to the sorbent). In the special case where the refrigerant is water, the sorbent may alternatively referred to as the "desiccant." In the desorption or regeneration phase, the sorbent releases the refrigerant, allowing it to return to a vapor state.

Either type of sorption chiller (i.e., adsorption or absorption) may be beneficially interfaced to FRAME's STEER Thermal Bus supply [2a] and return [2b] channels, as described earlier in this document. However, the emphasis herein is on adsorption-based cycles, which use solid sorbents, rather than absorption-based cycles, which use liquid sorbents. As is well known in the art, adsorption-based chillers may provide a number of distinct advantages over absorption-based chillers, the first of which accrues due to the use of a solid sorbent rather than a liquid. In practice, since they are based on solid sorbents, adsorption chillers may be inherently safer and require much less attention and maintenance than absorption chillers (which may use liquid sorbents like ammonia or bromine). Adsorption chillers may also operate reliably over a wider temperature range than absorption chillers.

Adsorption is a diffusion-controlled, time-related phenomenon that may be described as a three-step process:

Step 1: Adsorbate molecules (e.g., refrigerant) contact the external surface of the sorbent.

Step 2: Adsorbate molecules diffuse into the internal pore structure of the sorbent.

Step 3: Adsorbate molecules are attracted to the pore wall surfaces and held, primarily by chemical or electrostatic forces.

Adsorption capacity (i.e., how much refrigerant can be adsorbed) is determined by multiple factors, including the type of sorbent, its affinity for a selected refrigerant, the degree of prior adsorption of other fluids (whether intentional or not), the quantity and relative thickness of sorbent, the operating pressure, and the temperature of the sorbent (both in absolute terms and also relative to the refrigerant). Adsorption is an exothermic process whose efficiency may be adversely affected by sorbent thickness, since diffusion time increases with thickness, resulting in longer cycle times. Also, since sorbents tend to be relatively poor thermal conductors, overly thick sorbent may cause local heating (such heating may not only prevent adsorption, but may even cause desorption instead). During adsorption with high energy transfer rates, the exothermic energy of adsorption must be efficiently removed from the sorbent, or else the sorbent's effective capacity may be severely diminished. Thus, the thermal conductivity of the sorbent, and the ability of the substrate and the balance of the system to remove heat from the sorbent may also be very central factors influencing adsorption efficiency, and conversely, desorption efficiency.

In the context of FRAME, the primary purpose of a sorption chiller may be to provide an electrically efficient and exergy-efficient chilling capability under system control, so as to produce working fluid within a particular temperature range that may be needed in a priority thermal circuit elsewhere in the system (e.g., for enhancing computational performance in an HPC context or when operating electronics at very high utilization levels).

The operating principles of a gas-driven freezer with no moving parts have been known since at least 1824, said principle taking advantage thermodynamics, chemical properties, and gravity. Much-improved versions of such systems are still in wide use today (e.g., propane-powered refrigerators for recreational vehicles, etc.). Gas-powered absorption chillers of much larger scale also see wide use in modern industry, although they generally have some moving parts (e.g., pumps) to improve efficiency, so that gravity is less of a limiting factor. From an electrical power viewpoint, sorption chillers may be thought of as being highly leveraged, since only a few hundred watts of electrical power may be needed to generate tens or hundreds of kilowatts of cooling power.

In the preferred embodiments of certain versions of the present invention, relatively small amounts of electrical power may be primarily used for variable-speed circulating pumps, which may provide or augment motive forces for the system's working fluids, which may contain exergy to be transferred among subsystems as needed (preferably, waste heat may be a key source of exergy). Negligible amounts of electrical power may also be used to activate devices such as motorized or magnetic latching valves, dampers, locks, solenoids, and actuators, such as to aid in controlling or directing exergy flow or providing protective functions.

Adaptation of COTS Adsorption Chiller Units

Although neither the thermal coefficient of performance (COP) nor the space efficiency may be particularly high for commercial-off-the-shelf (COTS) sorption chiller units, if there is sufficient space to accommodate the optimally advantageous apparatus for a particular level of refrigeration, the lack of efficiency may not matter much as long as exergy such as waste heat is the primary energy source. In the context of FRAME, however, waste heat is a valuable exergy resource, so in FRAME it may be very important to optimize the thermal COP and space efficiency in addition to electrical efficiency, and in a preferred embodiment such optimizations may be enabled by interfacing a COTS sorption chiller [6.70] to the STEER Thermal Bus, via selected supply [1] and return [2] channels, an example of which is depicted in FIG. 110.

In a preferred embodiment, the sorption chiller [6.70], and specifically any adsorption/desorption chamber [3.30] may be currently in a desorption phase which may be called upon dynamically to double as a virtual "desuperheater" for superheated RUBE™ LT2 fluids which may be currently acting as a desorption heat source.

Adapting a COTS Adsorption Chiller to FRAME's STEER Thermal Bus

Figure 110:
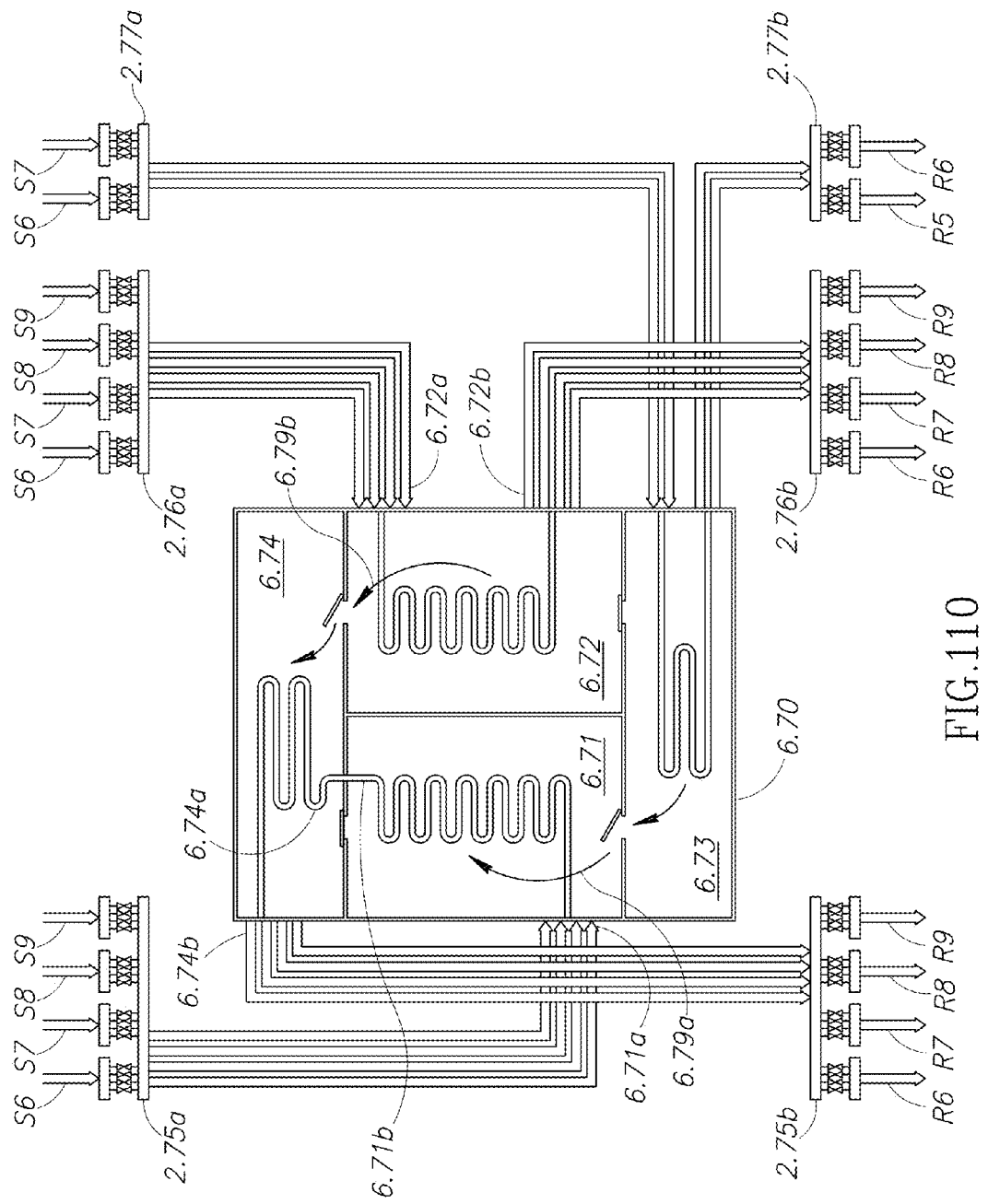
FIG. 110: Adaptation of COTS Adsorption Chiller Units

The example in FIG. 110 depicts interfacing to a subset of a STEER Thermal Bus with a supply [2a] and return [2b] having fourteen somewhat overlapping temperature ranges for an example working fluid Sorption chiller [6.70] is depicted as a commercially available ECO-MAX adsorption chiller from Power-Partners, Inc. (www.ECO-MAXchillers.com). It interfaces with the example working fluid over a subset of the depicted temperature ranges (see FIG. 14 for the labeled temperature ranges and fluids). Note that the fluids and ranges depicted here and in FIG. 14 are exemplary and not limiting. Although said chiller normally interfaces to water-based circuits (PRIOR ART), it can be seen that no water is required or used in the example configuration of FIG. 110. Other commercially available adsorption chillers may normally operate at somewhat different temperature ranges; adaptations of such units may either be constrained to the limits of the unit(s) being adapted, or they may take advantage of the wider range of temperatures generally available to said adaptations via the STEER Thermal Bus.

The sorption chiller [6.70] may interface with one of the two depicted working fluids available, and more specifically, with RUBE™ LT2 fluid at supply [1b] and return [2b], over a subset of the depicted temperature ranges. Alternatively, another RUBE™ LT2 fluid, not shown, may be substituted in the description that follows (with consideration for a boiling point that is 15° C. higher). RUBE™ LT2 fluids are inert, dielectric, phase-change fluids with boiling points in the same general range as the desirable operating ranges for many devices to be cooled. These fluids may be used with adaptations of COTS sorption chillers [6.70], such as the ECO-MAX adsorption chiller apparatus depicted in FIG. 110, as well as with other adaptations of non-commercial or custom sorption apparatus.

The depicted sorption chiller [6.70] interfaces to the STEER Thermal Bus supply [1b] and return [2b] channels may be substantially similar to what may be needed to support any of a wide variety of sorption chillers (both adsorption chillers and the much more common absorption chillers).

An adsorption chiller (rather than an absorption chiller) is depicted in FIG. 110 as a preferred embodiment because, in practice, adsorption chillers (which use solid desiccants, i.e., drying agents, like silica gel, zeolites, or activated carbon) typically may be inherently safer and require much less attention and maintenance than absorption chillers (which use liquid desiccants like ammonia or bromine). Adsorption chillers may also operate reliably over a wider temperature range than absorption chillers. The same basic thermal interfaces depicted here may be applicable to a wide variety of sorption chillers [6.70] and various combinations of internal refrigerants and desiccants, except that some chillers may require or enjoy a more or less restricted set of operating temperatures than those depicted here.

As noted earlier, the specific adsorption chiller technology depicted in FIG. 110 (which is of a typical commercial design) is that of an ECO-MAX chiller from Power-Partners, Inc. (www.ECO-MAXchillers.com), although it may be applied much differently than intended by the manufacturer (as described below). The adsorption chiller depicted here was originally designed to use water as the external working fluid (i.e., cool water as its coolant, and hot water as the heat source). When water is used as the working fluid, the process depends on the non-isothermal exchange of sensible heat, so as designed the process may be particularly sensitive to the differential temperatures and flow rates of the working fluids. Because this particular COTS apparatus is a two-chamber system that alternates adsorption and desorption between chambers, the same working fluid must be used for both coolant and heat source, but in the course of adaptation it has been determined that the working fluid need not be water. In a preferred embodiment, RUBE™ LT2 fluid in various temperature ranges may be substituted for water as the external working fluid used as a thermal exergy source or sink, and also as the working fluid to be chilled. When pure water is the fluid to be chilled, it must not be allowed to freeze (0° C.), so the lower limit of the output temperature may be about 4° C., whereas with RUBE™ LT2 as the fluid to be chilled, there is no need to artificially constrain the lower temperature limit around the freezing point of water (RUBE™ LT2 fluids are fully pumpable down to at least −120° C.).

RUBE™ LT2 fluids, in conjunction with the particular adaptation of sorption technology may operate in significantly different temperature ranges from each other, due to their respective boiling points, which may easily vary by 15° C. or more. The temperature ranges depicted here are for RUBE™ LT2 fluid with a nominal boiling point of 20° C. to 40° C., since it may be the more preferable of the two primary candidates fluids for phase-change cooling, primarily because: 1) it has the lower boiling point, and 2) the boiling point is still sufficiently high to isothermally reject heat (e.g., to ambient) without requiring a vapor compressor or refrigeration cycle (by simply increasing the system operating pressure, the boiling point may be sufficiently high to exceed the natural ambient temperature anywhere on earth). Alternative RUBE™ LT2 fluid candidates with higher boiling points (e.g., typically 40° C. to 60° C. vs. 20° C. to 40° C.) may be substituted as electronics coolants whenever such nominally higher boiling points may be acceptable or desirable (e.g., such as if it becomes optimally advantageous to reject heat to very high ambient temperatures at a lower operating pressure), provided that chemical compatibility is taken into account. Note that by independently changing the operating pressure of the subsystems containing the working fluids, the boiling point and temperature ranges of various RUBE™ LT2 fluids may be forced to substantially or entirely overlap.

Generally speaking, the principle of adsorption (and its inverse, "desorption") works with the interaction of gases and solids. With adsorption chilling, the molecular interactions between the solid desiccant ("sorbent") and the refrigerant gas allow the gas to be adsorbed into the sorbent, where it may held by molecular forces (e.g., van der Waals) at the lower end of the intended operating temperature range. The molecular forces may be overcome and the refrigerant gas released ("desorbed") by heating the sorbent to the upper end of the intended operating temperature range. In the commercially available ECO-MAX chiller [6.70] depicted in FIG. 110, the sorbent or desiccant is silica gel, a microporous solid desiccant made synthetically from sodium silicate, and the internal refrigerant is water. The sorbent and refrigerant are not intended to ever contact the external working fluids or the external fluid to be chilled. In the commercially available ECO-MAX chiller [6.70] depicted in FIG. 110, these external fluids are intended to be water (but need not be), so the lower end of the temperature range must remain above the freezing point of water.

As depicted, the commercially available ECO-MAX™ adsorption chiller [6.70] has four chambers, two of which are interchangeable adsorption/desorption chambers [6.71] that toggle between adsorption and desorption modes (one chamber in each mode). There is also an evaporator chamber [6.73], and a condenser chamber [74]. All four chambers are operated at nearly a full vacuum. The adsorption chambers [6.71] may be filled with sorbent (desiccant). Due to its high porosity, the sorbent typically has a high surface area (around 800 m$^2$/g for silica gel), which may allow it to adsorb refrigerant readily, making it useful as a desiccant. The sorbent may create an extremely low humidity condition in whichever one of the two adsorption chambers [3.30] is currently in the adsorption mode (depicted here as [6.71]), with a corresponding low internal pressure that may cause the internal refrigerant to evaporate or "flash" to vapor [6.79a] off the tubes in the evaporator chamber [6.73], at the temperature of the working fluid circulating therein, thereby chilling the external fluid circulating therein while also, due to the adsorption of the refrigerant vapor [6.79a] by the sorbent, transferring heat to the desiccant in the adsorption chamber [6.71]. As the refrigerant vapor [79a] is adsorbed, heat is generated in the desiccant that must eventually be removed via the cooling loop in [6.71], or else the desiccant will prematurely stop adsorbing refrigerant vapor [6.79a].

When the desiccant in adsorption chamber [6.71] becomes too saturated to efficiently adsorb more refrigerant vapor [6.79a], the process may be reversed. The desiccant may be heated via the same loop in [6.71] that was previously used for cooling (with the intent of overcoming the molecular attractions, e.g., van der Waals forces, between refrigerant vapor and desiccant), which may cause the desiccant to desorb the refrigerant (i.e., give off vapor [6.79b]) and dry out again, which may thereby somewhat increase the internal pressure of the corresponding chamber. Since the internal pressure differential may be caused by the adsorption or desorption of the refrigerant alone (water vapor, in this example), there may be no need for moving parts other than working fluid circulators, valves, and refrigerant dampers. In other words, an adsorption chiller may require no electrical or mechanical compressors, such as those in conventional vapor compression refrigeration cycles. Instead, the adsorption chiller [6.70] implements a "thermal compressor" apparatus comprising suitable desiccant, refrigerant, various chambers, a means for controlling the flow of refrigerant water vapor between the various chambers, and a means for heating and cooling the desiccant (further comprising one or more heat sources and sinks, heat exchangers, working fluids, circulators, valves, plumbing circuits, and controls).

The example commercially available ECO-MAX™ adsorption chiller [6.70] depicted in FIG. 110 is based on a simple sorption refrigeration process with silica gel as the sorbent and water as the internal refrigerant, and also using water in both the external working fluids (hot and cold) and the external fluid to be chilled. In the COTS unit, with water as the refrigerant and water-based external working fluids, the external working fluids operate in a temperature range that is suitable only for SENSIBLE heat exchange, but specifically NOT ISOTHERMAL heat exchange.

In a preferred embodiment of certain versions of the present invention, which is an adaptation of the commercially available ECO-MAX™ adsorption chiller [6.70] wherein the adaptation may be based on adsorption with isothermal rather than sensible heat exchange, and where the low-temperature constraints (e.g., the freezing point of water) on the chiller output may be eliminated, the prior-art process may be adapted as follows:

Under system control, the adsorption chiller [6.70] may circulate, in lieu of a water-based external working fluid, RUBE™ LT2 as the external working fluid at the appropriate inlet temperatures from the STEER Thermal Bus supply channels [2a] through digital mixer valves [2.75a] and [2.76a], through the adsorption/desorption chambers [6.71] and their internal heat exchanger tubes, and back to the STEER Thermal Bus return channels [2b] through digital splitter valves [2.75b] and [2.76b], while cycling the adsorption chambers [6.71] and [6.72] between the processes of adsorbing and desorbing.

Under system control, the adsorption chiller [6.70] may circulate, in lieu of a water-based external fluid to be chilled, RUBE™ LT2 as the external fluid to be chilled, at the appropriate inlet temperatures from the STEER Thermal Bus supply channels [2a] through digital mixer valves [2.77a] through the internal heat exchanger tubes in evaporator chamber [6.73], and back to the STEER Thermal Bus return [2b] channels through digital splitter valves [2.77b].

Due to the near vacuum within the chambers, the boiling point of the internal refrigerant (which is water in the case of the commercially available ECO-MAX™ adsorption chiller [6.70]) may be greatly reduced, which may cause the refrigerant to "flash" to vapor [6.79a] off the outer surface of the tubes in the evaporator chamber [6.73], creating the chilling effect captured in the RUBE™ LT2 external fluid to be chilled. Although the RUBE™ LT2 external fluid to be chilled may already be cold relative to other working fluids, it may be much warmer than the greatly reduced boiling point of the refrigerant, and the subsequent flashing of the refrigerant to vapor [6.79a] occurs as heat is conducted through the evaporator tube walls to the refrigerant. The heat so conducted may be intentionally "lost" from the fluid to be chilled, thus, the fluid from the STEER Thermal Bus supply [2a] channels through digital mixer valve [2.77a] may be caused to be substantially subcooled en route through the tubes in evaporator chamber [6.73] before completing the circuit back to the STEER Thermal Bus return [2b] through digital splitter valve [2.77b].

RUBE™ LT2 working fluid in its liquid phase (or as two-phase fluid) may be circulated in chamber [6.71] to isothermally remove the heat deposited in chamber [6.71] by the adsorption process, which may keep it sufficiently cool so as to enable further adsorption. The refrigerant vapor [6.79a] may enter adsorption chamber [6.71] through the open ports in the bottom of the chamber and may be adsorbed into the sorbent in chamber [6.71], whose temperature may be kept relatively constant by isothermal heat exchange with the RUBE™ LT2 working fluid serving as a coolant (heat sink).

At the same time, relatively hot RUBE™ LT2 working fluid (which may be two-phase fluid, saturated vapor, or superheated vapor, depending on the system-controlled operating pressure and temperature) may enter chamber [6.72] to regenerate or "desorb" the sorbent therein, while chamber [6.71] is in the adsorption process. Refrigerant vapor [6.79b] may be driven from the sorbent in chamber [6.72] by the relatively hot RUBE™ LT2 working fluid, which may readily give up its thermal exergy as it condenses. The desorbed refrigerant vapor [6.79b] may rise from chamber [6.72] to the condenser chamber [6.74] where it may then condense to a liquid state.

The refrigerant condensate from chamber [6.74] may be recycled in a closed-loop (not shown) to evaporator chamber [6.73] at the bottom of the machine (return channel not shown), where it may be immediately available for re-use.

As the sorption chiller [6.70] cycles, with chamber [6.71] undergoing adsorption and chamber [6.72] undergoing desorption, the pressure in chamber [6.71] may be slightly lower than in the evaporator chamber [6.73]. A portion of the refrigerant evaporator chamber [6.73] may evaporate ("flash" to vapor) and move to chamber [6.71] as vapor [6.79a]. Simultaneously, the pressure in chamber [6.72] may elevate slightly as the refrigerant vapor [6.79b] is driven from the sorbent in that chamber. The refrigerant vapor [6.79b] may be thus motivated from chamber [6.72] to the condenser chamber [6.74] where it may be condensed back to the liquid state and may then return to the evaporator chamber [6.73] as condensate.

When the sorbent in chamber [6.71] is saturated with refrigerant (vapor [6.79a] condenses to liquid as it is adsorbed) and the sorbent in chamber [6.72] is dry, the machine's process may reverse. A valve (not shown) may be opened between the two chambers, allowing the pressure to equalize. Internal valves (not shown) may disconnect the condenser chamber [6.74] inlet [6.74a] from adsorption chamber [6.71] outlet [6.71b] and also disconnect desorption chamber [6.72] outlet [6.72b] from digital splitter valve [2.76b]; the condenser chamber [6.74] inlet [6.74a] may then connect to desorption chamber [6.72] outlet [6.72b], and adsorption chamber [6.71] outlet [6.71b] may connect to digital splitter valve [2.76b], at which point the reconfiguration to reverse the roles of chambers [6.71] and [6.72] is complete.

RUBE™ LT2 fluid coolant may then be sent from the STEER Thermal Bus supply channels [2a] via digital mixer valve [2.76a] through chamber [6.72] and back to the STEER Thermal Bus return channels [2b] through digital splitter valve [2.76b], in order to transfer out any residual heat and begin cooling for the adsorption process. Meanwhile, relatively hot RUBE™ LT2 fluid may be sent from the STEER Thermal Bus supply channels [2a] via digital mixer valve [2.75a] to the internal heat exchanger tubes in chamber [6.71], which may begin heating for the desorption process, thereby transferring heat from the relatively hot working fluid to the desiccant contained in chamber [6.71], which may also reduce the temperature of the working fluid before returning to the STEER Thermal Bus return channels [2b] through digital splitter valve [2.75b]. With the reversal complete, adsorption in chamber [6.72] may commence while chamber [6.71] may then be dried by the desorption heating.

The depicted adaptation of the commercially available ECO-MAX™ adsorption chiller [6.70] may be capable of operating within a fairly wide range of temperatures, as indicated in the figure. Under system control, and with the flow of external working fluids (including their operating temperatures and pressures), the machine may self-regulate and balance its overall performance. In a preferred embodiment, for optimal performance of this invention's adaptation of ECO-MAX™ chillers using silica gel as the desiccant and water as the refrigerant, the relatively hot RUBE™ LT2 external working fluid should be about 50° C. to 105° C., or more preferably about 75° C. to 105° C.; the cool RUBE™ LT2 external working fluid ("coolant") about 10° C. to 35° C., or more preferably about 10° C. to 29° C.; and the RUBE™ LT2 external fluid to be chilled should have an output temperature of about 4° C. to 13° C.

In a preferred embodiment with RUBE™ LT2 fluid as an optimal heat source, where the fluid's vapor pressure P (in Pascals, Pa) at temperature T (Kelvin) may be approximated by the equation $\ln(P)=-3548.6/T+22.978$, for T in the range −30° C. to 165° C., the heat source fluid may be around 100° C. (about 373° K), which means that it will be a superheated vapor unless the operating pressure is above 641.212 Pa (i.e., about 641 KPa, 6.4 bar, or 93 psi). In a preferred embodiment, the still-superheated vapor emitted by a RUBE™ LT2 fluid-based FORCE Turboalternator (described elsewhere) may be an ideal source of heat in the 95° C. to 105° C. range, at an operating pressure of around 1 bar. In the case of superheated vapor, the vapor really "wants" to give up its heat, and will do so readily in a non-isothermal heat exchange. To the extent that the desorption cycle of the sorption chiller [6.70] removes all or most of the superheat of the hot vapor, it may optionally serve a "desuperheater" function for the associated power generation cycle. Thus, rather than rejecting the power cycle's excess heat to ambient, that very heat may optionally help to produce refrigeration.

In a preferred embodiment based on RUBE™ LT2 working fluid as both the coolant and heat source, the adsorption process may be driven by an isothermal heat exchange based on two-phase working fluid. As an isothermal coolant, RUBE™ LT2 fluid may be extremely efficient at accepting thermal exergy without exceeding its boiling point. While the boiling point of RUBE™ LT2 fluid may be conveniently in the 20° C. to 40° C. range at STP, it may be further lowered through a reduction in operating pressure, or raised through an increase in operating pressure.

In another preferred embodiment of certain versions of the present invention, which is a further adaptation of the commercially available ECO-MAX™ adsorption chiller [6.70], the adaptation described above may be further improved by one or more of the following:

selecting an alternative refrigerant, electing an alternative desiccant, modifying the operating pressures and temperatures to reflect the selected refrigerant and desiccant combination, with consideration to the operating pressures and temperatures of the external working fluids and external fluid(s) to be chilled, increasing the diffusion rate and effective sorbent capacity (which may be "reached" during a cycle)

effectively reducing the mean thermal resistance between external working fluids and internal sorbents, such as by increasing the heat exchange surface area between the desiccant and the external working fluids (specifically increasing the heat exchange surface-area to sorbent-volume ratio,), and matching the pore sizes of the sorbent with the molecule sizes of the refrigerant to ensure that all refrigerant molecules may be adsorbed (i.e., the sorbent pores are large enough to accommodate the refrigerant molecules).

Improved Refrigerant

In an alternative adaptation of a commercially available adsorption chiller such as the ECO-MAX™ adsorption chiller [6.70], but incorporating an alternative refrigerant, a preferred embodiment may substitute a preferred RUBE™ LT2 fluid as the refrigerant in lieu of water, thereby eliminating the freezing point of water as a low-temperature constraint. The table of FIG. 111 provides some comparative sample operating pressures along with the boiling point temperatures of water and a preferred RUBE™ LT2 fluid.

As described earlier, due to the near-vacuum within the chambers, the boiling point of the internal refrigerant (which is water in the case of the depicted commercially available ECO-MAX™ adsorption chiller [6.70]) may be greatly reduced from its STP boiling point, which may cause the refrigerant to "flash" off the outer surface of the tubes in the evaporator chamber [6.73], creating the chilling effect captured in the RUBE™ LT2 external fluid to be chilled. It may be seen from the table above that at a pressure of about 0.01 bar (i.e., a vacuum of about 8 Torr), the boiling point of water is about 3° C., which is very close to its freezing point of 0° C. Thus, if 3° C., is the boiling point or "flash" temperature of the refrigerant, then the non-flashed refrigerant must be even cooler, putting it dangerously close to freezing, which is the ultimate low-temperature constraint. Since the external fluid to be chilled must be warmer than 3° C. to cause flashing to occur, this also represents a sort of asymptotic limit for the chiller output temperature (which is depicted with a low end of 4.4° C. for the adapted COTS unit, with water as the refrigerant). Also, in order to achieve a 3° C. boiling point, a relatively near-vacuum of about 8 Torr may be required, and such a near-vacuum require more sophisticated equipment and more energy to maintain than a lower quality vacuum, such as the low-quality vacuum of only 188 Torr (about 3.6 psi) that may be needed to achieve a 3° C. boiling point with RUBE™ LT2 fluid as the refrigerant.

Furthermore, in a preferred alternative adaptation with RUBE™ LT2 fluid as the refrigerant in lieu of water, the low-temperature constraint may be essentially eliminated and replaced with an economic constraint that may depend only on the quality of the vacuum sought. For example, lower-cost commodity vacuum pumps may easily achieve vacuums in the 150 to 75 Torr range, corresponding to low refrigerant temperatures of −1.7° C. to −15.4° C., respectively, thus achieving more chilling power at lower cost (less capital and less electrical energy input) than with water as the refrigerant. Higher-quality vacuums may be achievable simply by selecting better pumps (which may be more expensive and consume more energy). As can be seen from the table, at an easily achievable vacuum of 38 Torr, the boiling point of water is about 30° C. (not low enough to be usable for many chilling needs), whereas the boiling point of RUBE™ LT2 fluid at that pressure is about −27.8° C.

Increased Effective Sorbent Capacity and Heat Exchanger Surface Area to Sorbent Volume Ratio Adsorption is a diffusion-controlled, time-related phenomenon that may be described as a three-step process:

Step 1: Adsorbate molecules (e.g., refrigerant) contact the external surface of the sorbent.

Step 2: Adsorbate molecules diffuse into the internal pore structure of the sorbent.

Step 3: Adsorbate molecules are attracted to the pore wall surfaces and held by chemical or electrostatic forces.

Adsorption efficiency may be adversely affected by sorbent thickness, since diffusion time increases with thickness, resulting in longer cycle times. Also, adsorption efficiency may be adversely affected by sorbent thickness, since sorbents tend to be relatively poor thermal conductors, which may cause local heating (which may not only prevent adsorption, but even cause desorption instead).

Matching of Improved Refrigerant with Improved Sorbent and Sorbent-Specific Surface Area Adsorption capacity and efficiency may be affected by many chemical and physical parameters, such as the specific adsorbate being adsorbed (e.g., the refrigerant), adsorbate concentration, adsorbate pH, adsorbate temperature, adsorbate molecule size, the specific sorbent, sorbent surface area, sorbent porosity (pore sizes and distributions), sorbent pH, sorbent temperature, and effective thermal resistance of the sorbent at the interface between adsorbate and the adsorption/desorption heat exchange apparatus.

In a still further alternative adaptation of a commercially available adsorption chiller such as the aforementioned ECO-MAX™ adsorption chiller [6.70], but incorporating an alternative sorbent, a preferred embodiment may advantageously substitute an appropriate activated carbon or polymer sorbent, as the sorbent in lieu of silica gel, thereby approximately doubling the adsorption surface area from around 800 m²/g for silica gel to 1400 m²/g to 1700 m²/g in the case of activated carbon.

Figure 112:
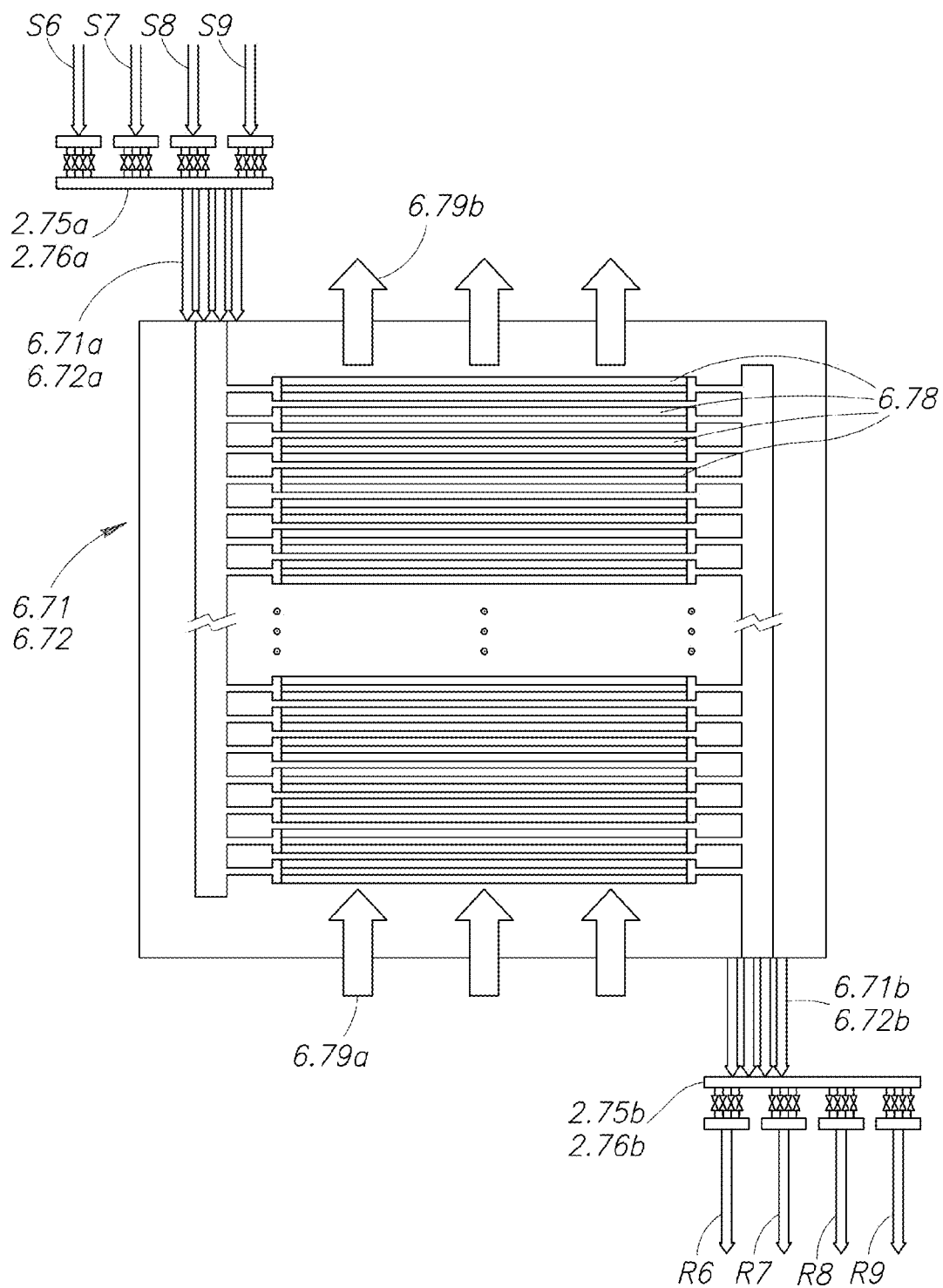
FIG. 112: Improved Adsorption Bed for Adapting a COTS Adsorption Chiller

FIG. 112 depicts an example of an improved adsorption bed which may be used for adapting a COTS adsorption chiller, or as a standalone sorbent bed and heat exchanger stack.

Note:

This may replace a sorbent bed in the adsorption chamber of an adaptation of a COTS adsorption chiller (see FIG. 110).

FIG. 112 depicts a sorbent bed comprising a stack of automotive-style fin-and-tube radiator heat exchanger (HX) cores [6.78] whose fins have been coated with a thin sorbent layer, said cores operating in parallel with shared inlets and shared outlets. A pair of chambers comprising such sorbent-bed-stacks [6.71] [6.72] as depicted in FIG. 112 may be substituted for the chambers [6.71] [6.72] in aforementioned ECO-MAX™ adsorption chiller [6.70] (see FIG. 110), where one stack [6.71] undergoes adsorption while the other [6.72] undergoes desorption, and vice-versa, as previously described. As in FIG. 110, there may be ingress of refrigerant vapor [6.79a] and egress of refrigerant vapor [6.79b] to expose said vapor to the sorbent surfaces. In a preferred embodiment, the STEER Thermal Bus supply [2a] may interface to the sorbent bed via digital mixer valves [2.75a] [2.76a] (see FIG. 110 and FIG. 112) to supply working fluid via ingress channels [6.71a] [6.72a] into the tubes of HX cores [6.78] in order to control the sorbent/desiccant temperature (10° C. to 29° C. typical at inlet for adsorption; 50° C. to 96° C. typical at inlet for desorption). As depicted in FIG. 112, outlet tubes connected to egress channels [6.71b] [6.72b] may interface via digital splitter valves [2.75b] [2.76b] to STEER Thermal Bus return [2b]. Working fluid outlet temperature increases during adsorption and decreases during desorption, relative to the inlet temperature.

Adaptation of COTS and other Absorption Chiller Units

Figure 113:
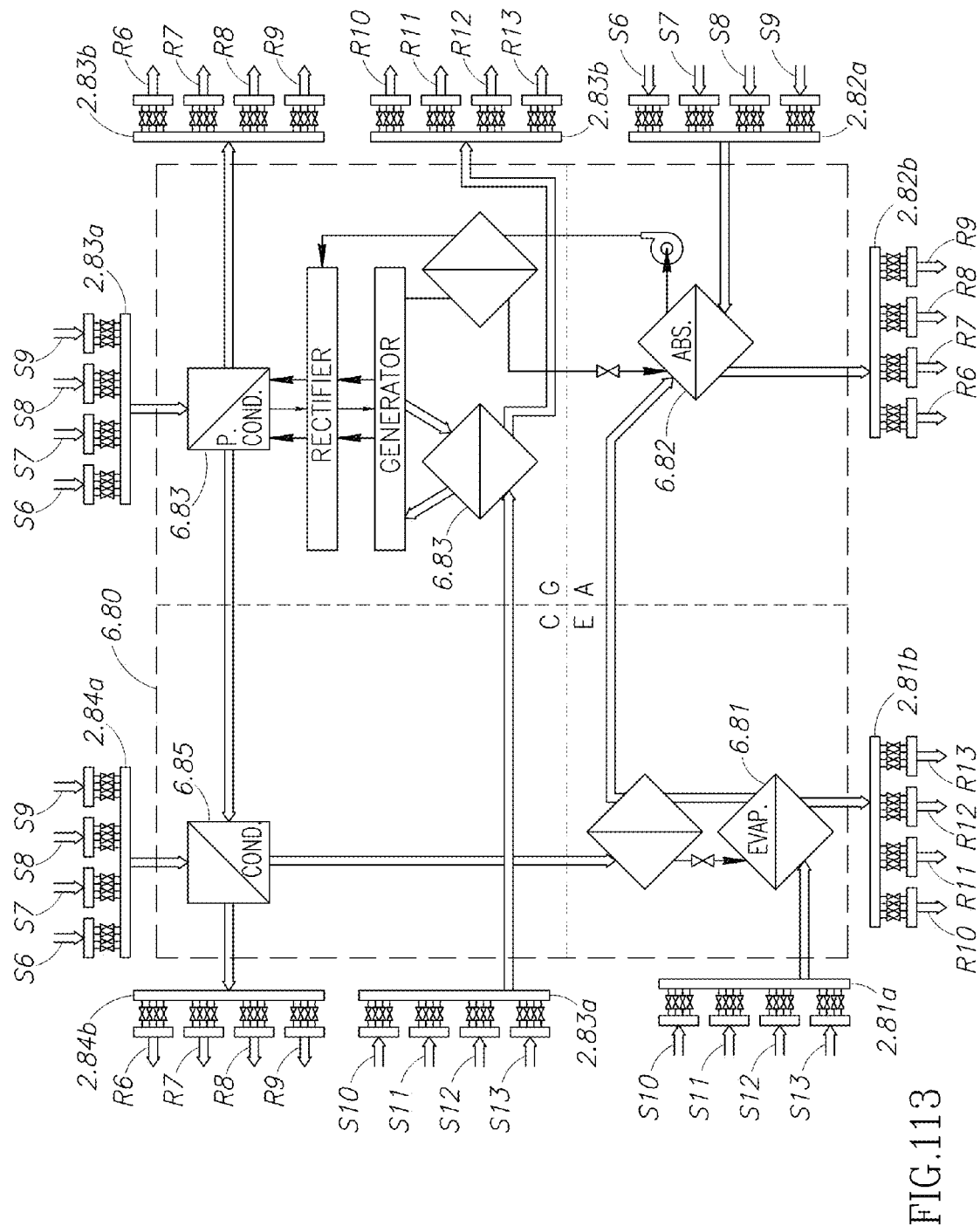
FIG. 113: Conventional Single-Effect Ammonia-Water Absorption Chiller Cycle Interfaced to STEER Thermal Bus

Analogous to the adsorption chiller example in FIG. 110, FIG. 113 depicts a STEER Thermal Bus with a supply [2a] and return [2b] interfaced with a generic example of a conventional absorption chiller [6.80], in this case, one having a conventional single-effect ammonia-water absorption chiller cycle. Commercially available absorption chillers may operate at various temperature ranges, so adaptations of such units may either be constrained to the limits of the unit(s) being adapted, or they may take advantage of the wider range of temperatures generally available to said adaptations via the STEER Thermal Bus.

6.4 STORE Thermal Interfaces to Ambient for Recharging & Heat Rejection

The ambient environment (which may include, for example the air, the ground, bodies of water, or other surroundings etc.) may be used as a source or sink of thermal exergy, in the form of heat, cold, or temperature differentials. FIG. 114, FIG. 115, FIG. 116, and FIG. 117 depict several generic thermal interfaces to the ambient environment for recharging thermal exergy (hot or cold "available energy") reservoirs and rejecting heat (or cold), any of which may interface with the STEER apparatus [1]. Each of the four thermal interfaces may be categorized as either ground-coupled or air-coupled heat exchange, and also categorized as either direct heat exchange or indirect heat exchange.

RUBE™ LT2 fluid is an inert, dielectric, phase-change fluids with a boiling point in the same general range as the desirable operating ranges for many devices to be cooled, and may also be used with the heat rejection apparatus depicted here. The temperature ranges depicted here are for RUBE™ LT2 fluid, since it may be the preferred fluid for phase-change cooling, primarily because: 1) it may have a lower boiling point than other RUBE™ fluids currently available (which may make it more useful for isothermally recuperating thermal exergy from electronics), and 2) the boiling point may still be sufficiently high to isothermally reject heat (e.g., to ambient) without requiring active chilling apparatus (such as a vapor compressor), and furthermore may operate much more efficiently than conventional air cooling.

STORE Ground-Coupled vs. Air-Coupled Heat Exchangers

With a nominal boiling point (at STP) of 34° C. (and higher boiling points at elevated pressures), RUBE™ LT2 fluid may isothermally (and thus, efficiently) reject heat to ground-coupled heat exchangers ("ground loops") such as those depicted in FIG. 115 and FIG. 116, and to air-coupled heat exchangers (e.g., "dry coolers") such as those depicted in FIG. 114 and FIG. 117, virtually anywhere in the world, and this is especially true for vertically oriented ground loops.

Although ground loops, such as those depicted in FIG. 115 and FIG. 116, may be oriented horizontally or vertically, horizontal ground loops require much more surface area for a given heat dissipation capacity, and are also placed much shallower (typically 10 feet of depth or less), which may provide less year-round thermal capacity and stability. In contrast, vertical ground loops require very little surface area but may be very deep, and may provide essentially constant service (in terms of temperature and capacity) on a year-round basis. At 30 feet below the surface, the average temperature may remain essentially constant year-round, varying geographically from about 7° C. to 26° C. (about 45° F. to 79° F.). The average temperature may vary with depth by a temperature-rise gradient of approximately 1.5° C. to 3° C. per 100 meters (328 feet) from the surface (except near tectonic plate boundaries), yielding an operating temperature range that may be highly efficient for isothermal heat exchange and easily sufficient for sensible heat exchange.

In a preferred embodiment, ground-coupled heat exchangers, typically U-shaped, may be oriented vertically and thermally grouted into boreholes that may be 50 to 1000 feet deep, or more preferably 300 to 1000 feet deep. In a preferred embodiment, boreholes may be placed 15 to 30 feet apart, depending on a variety of factors such as type of soil, soil conditions, underground temperature gradients, terrain, access rights, accessibility by drilling equipment, available surface area, aquifers that may be present, and zoning or regulatory requirements. A 1000-foot borehole may yield on the order of 20 $KW_T$ of year-round cooling, and may also have reserve capacity. Shallow boreholes and boreholes of inadequate capacity may be compensated through the placement of additional boreholes. In a preferred embodiment, boreholes may be recharged during off-peak loads or whenever ambient conditions are particularly favorable (e.g., cold weather), or there's a surplus of "cold" for some other reason.

In a more-preferred embodiment, novel ground-coupled heat exchangers may externally resemble a single vertically oriented pipe, rather than a U-shape, but otherwise may be fitted and thermally grouted into boreholes suitable for the aforementioned typically U-shaped ground-coupled heat exchangers. The novel heat exchangers are an object of certain versions of the present invention and are described further in a later section describing FIG. 118 and FIG. 119.

Air-coupled heat exchangers such as dry coolers, such as those depicted in FIG. 114 and FIG. 117, may not be needed when ground loops are available, but, in a preferred embodiment, may advantageously complement them. In a preferred embodiment, RUBE™ LT2 fluid may isothermally (and therefore efficiently) reject heat to air-coupled heat exchangers on a year-round basis, if desired, by letting the RUBE™ LT2 fluid operating pressure and boiling point modulate with air temperature (as optimally advantageous). Particular efficiency gains may be had when air temperatures are "cool" (e.g., below, say, "beach weather" temperatures of 30° C. or 86° F.). In a preferred embodiment, increasing and disproportionately larger efficiency gains may be had when air temperatures are "cold" (e.g., below 10-15° C. or 50-59° F.) or "very cold" (e.g., at or below "freezing" temperatures, say from 0° C. or 32° F. down to −40° C. or −40° F., or even colder). In a preferred embodiment, under system control, when sources of "cool" and "cold" are available that exceed what may be needed immediately for optimally efficient operation, or for buffered cold storage in highly efficient thermal storage reservoirs (described elsewhere in this document), the additional cold capacity may be used to automatically "recharge" ground loops as appropriate.

STORE Direct vs. Indirect Heat Exchangers

"Direct" heat exchangers (HX), whether ground-coupled or air-coupled, may directly circulate a refrigerant or other primary working fluid (e.g., RUBE™ LT2 fluid) through the loops that transfer thermal exergy to the ambient environment, which may increase operating efficiency by eliminating one or more sets of fluid-to-fluid heat exchangers and associated fluid-circulating apparatus.

Direct Ground-Coupled Heat Exchangers

In a preferred embodiment based on RUBE™ LT22 fluids, there is no risk of the coolant freezing due to exposure to the freezing ambient temperatures that may be encountered with "direct" air-coupled heat exchangers such as those depicted in FIG. 114 and FIG. 117, because both fluids are fully pumpable to −120° C. or below.

In a preferred embodiment, vertical geothermal boreholes (up to 1000 feet deep, or more, and placed around 10 to 30 feet apart) may be used as direct ground-coupled heat exchangers, such as those depicted in FIG. 115, in conjunction with RUBE™ LT2 fluids, to efficiently dissipate up to 20 KW or more per borehole without thermal saturation or long-term temperature rise (actual performance varies with local conditions), and may have the capacity to easily handle short-term spikes in heat load. In a preferred embodiment of direct heat exchange via vertical boreholes, the boreholes may be equipped with copper tubes or other low-thermal-resistance piping (rather than the PEX or equivalent tubing typically associated with indirect heat exchange, such as depicted in FIG. 116, via vertical boreholes). Note that direct heat exchange via vertical boreholes, while very efficient, may be significantly more expensive to deploy than indirect heat exchange via vertical boreholes, due to the more expensive materials (e.g., copper pipe rather than PEX tubing, and RUBE™ LT2 engineered fluids rather than water/glycol).

The higher efficiency and increased expense of more expensive materials such as copper may lead to a decision to use direct ground-coupled heat exchangers with shallower vertical boreholes, rather than indirect ground-coupled heat exchangers with deeper vertical boreholes. A key factor in this trade-off decision is that, in general, the deeper a vertical borehole is, the higher its thermal capacity will be (due to the greater volume of soil with which it can exchange heat), and thus the lower its risk of thermal saturation (unless a vertical borehole is deep enough for the thermal gradient of the earth to be a significant factor).

In a preferred embodiment, a relatively small number of direct heat exchange vertical boreholes may be used to complement a much larger number of indirect heat exchange vertical boreholes. In a preferred embodiment, the relatively small number of more expensive direct heat exchange vertical boreholes may be primarily held in reserve for efficient rapid response to emergent cooling requirements, while the lower-cost indirect heat exchange vertical boreholes may be operated on a full-time basis for primary cooling.

In a preferred embodiment, "direct" heat exchangers (HX) may also be coupled to solar PV panels with RUBE™ LT2 fluid as the coolant, which may significantly reduce PV panel temperatures through isothermal heat exchange, thereby directly increasing PV panel electrical efficiency (which typically drops dramatically with increasing temperatures), while also partly or fully evaporating the RUBE™ LT2 fluid. In a preferred embodiment, under system control the RUBE™ LT2 fluid heated or evaporated by way of solar PV panels may then be routed to a combination of downstream heating or superheating apparatus (whether conventional solar thermal or non-solar). In a preferred embodiment, the superheated vapor may subsequently applied directly or indirectly utilized for recuperative power generation (e.g., by directing the vapor to a FORCE Turboalternator power generation setup, described elsewhere, or by heating an intermediate working fluid such as RUBE™ HT1 ("high temperature"), which may later be utilized to access its stored thermal exergy. In a preferred embodiment, warm or hot fluid may be circulated (e.g., at night or during cold weather), to thermally stabilize the PV panels and reduce or eliminate thermal cycling, while simultaneously cooling the fluid. Such circulation may also prevent snow or frost accumulation, enabling maximum time on-sun during daylight hours.

Indirect Ground-Coupled Heat Exchangers

"Indirect" heat exchangers may use a secondary fluid (which may be typically less expensive than refrigerant or RUBE™ fluids) in conjunction with an intermediate (e.g., liquid-to-liquid) HX, so that heat may be rejected from the refrigerant into the secondary fluid, as depicted in FIG. 116 and FIG. 117, and then from the secondary fluid into the ambient environment through ground-coupled or air-coupled loops. Indirect ground loops (e.g., water/glycol-based) may be used to improve thermal stability for biomass processing, or placed horizontally to achieve ice-melting functions for runways, parking lots, etc. In a preferred embodiment, vertical geothermal boreholes (up to 1000 feet deep, placed around 20 feet apart) may be used as indirect ground-coupled heat exchangers to continuously dissipate up to 20 KW per borehole without thermal saturation or long-term temperature rise (actual performance varies with local conditions), and may have the capacity to easily handle short-term spikes in heat load.

U-Shaped Vertical Borehole Ground-Coupled Heat Exchanger (PRIOR ART)

Ground loop piping for use in closed-loop systems (such as depicted in FIG. 115 and FIG. 116) is designed for a long life, often up to 50 years. High-density polyethylene (HDPE) pipe in a closed-loop system may have a useful life span exceeding 200 years. Typically, a number of boreholes [6.99] about 4-6 inches in diameter are drilled 10 to 20 feet apart, at depths of 50 to 600 feet, and more typically, 150 to 300 feet deep. The objective of a vertical borehole [6.99] is to deploy a specific length of pipe rather than to reach a certain depth. Depth is a trade-off for ground area and drilling costs, which may be limited by soil type and soil conditions.

Figure 118:
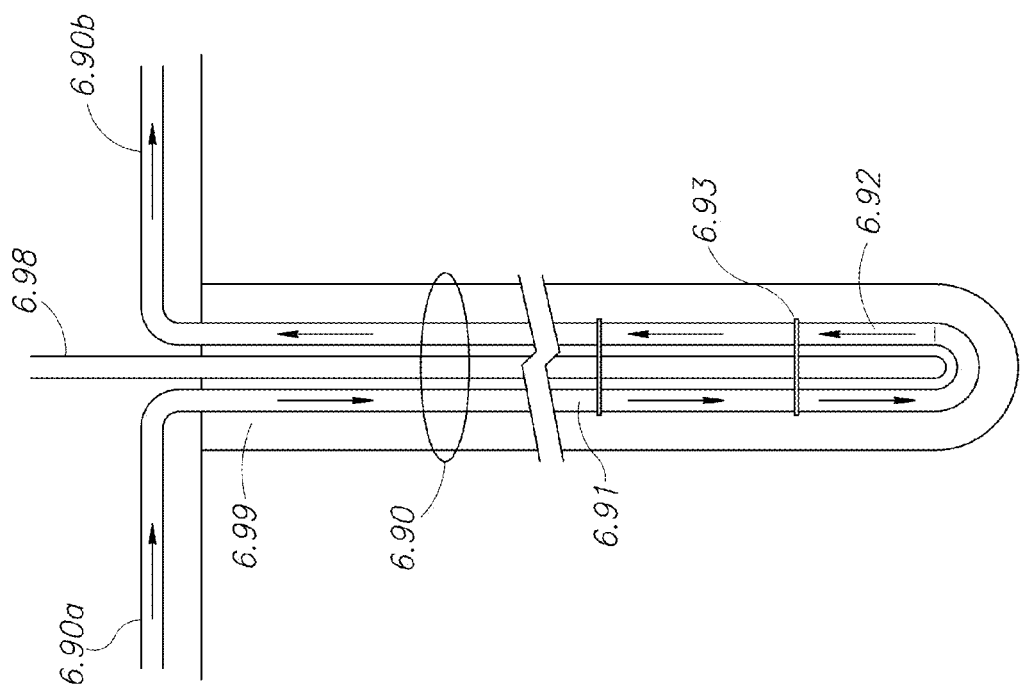
FIG. 118: Conventional U-Shaped Ground-Coupled Heat Exchanger—Example

A conventional "U-shaped" loop of piping as depicted in FIG. 118 may be inserted into each of these holes (with spacers [6.93]) followed by a special thermally conductive grout (injected via a removable pipe [6.98]) to seal and protect the piping. These "U-shaped" pipes are all connected together and run into the building itself (in conventional systems), or as depicted in FIG. 115 or FIG. 116 (in a FRAME context). Sections of pipe may be joined with thermal fusion, which forms a joint stronger than the pipe itself. New types of fittings such as stab fittings may prove reliable, but barbed fittings, clamps, and glued joints are known to be unreliable. The system of looped piping is filled with working fluid—typically a solution of water and bio-degradable antifreeze—and then sealed. Propylene glycol or methanol are commonly used to prevent freezing, and the choice of which may be determined by regulatory requirements.

STORE Counterflow Ground-Coupled Heat Exchanger

Although heat-exchanger type (such as counterflow vs. concurrent flow) may be commonly viewed as being related to fluid-to-fluid heat exchange, it may also be relevant, for example, in ground-coupled heat exchangers involving a thermal gradient (such as when ground temperature varies with depth). In a preferred embodiment, each novel ground-coupled counterflow heat exchanger may externally resemble a single vertically oriented pipe, rather than a U-shape, but otherwise may be fitted and thermally grouted into a borehole suitable for the aforementioned typically U-shaped ground-coupled heat exchangers.

In one preferred embodiment, STORE apparatus [6] may comprise one or more novel "deep-hole" ground-coupled heat exchangers (GCHE) wherein each such device may implement a counterflow heat exchanger (as a class, counterflow heat exchangers are known in the art to maximize efficient heat transfer), taking into account, for example, the "heat flow" of the earth itself, with a thermal gradient of 25° C. to 30° C. per kilometer of depth (away from tectonic plate boundaries, down to about 100 to 200 kilometers). In contrast, a common GCHE as depicted in FIG. 118 may implement a concurrent or parallel flow heat exchanger that may work against itself as the working fluid flowing therein is returned to the surface.

Figure 119:
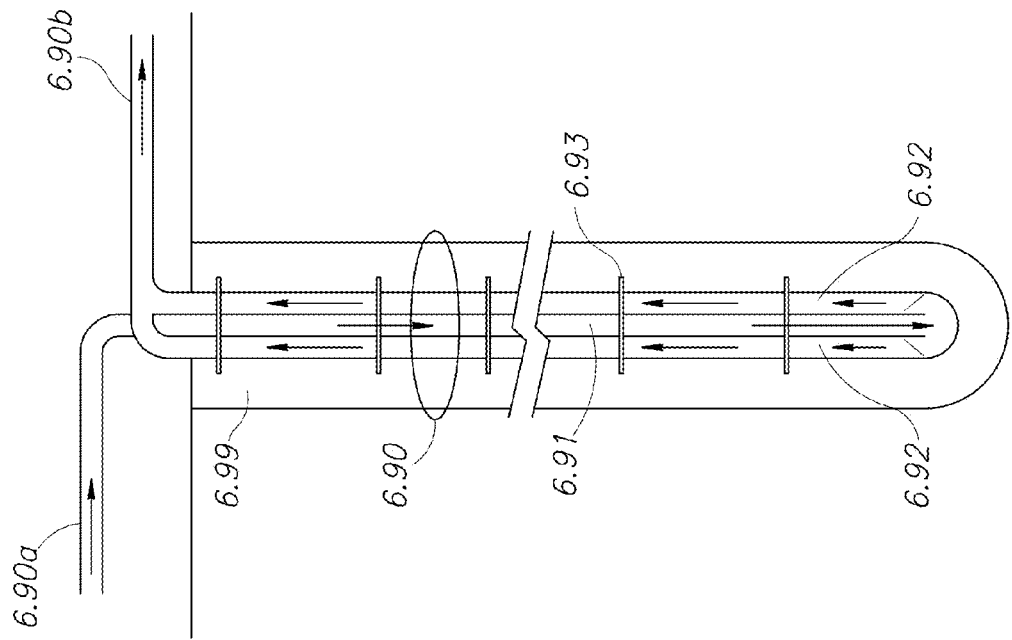
FIG. 119: Counterflow Ground-Coupled Heat Exchanger—Example

In a preferred embodiment, dual-concentric piping as depicted in FIG. 119 is inserted into each borehole to implement a counterflow GCHE, but may be otherwise plumbed conventionally as in FIG. 118. In a preferred embodiment based on HDPE, the inner piping is smooth conventional HDPE (lower cost and not very thermally conductive), while the outer piping may be thermally enhanced HDPE for geothermal use. In any case there is less inner piping heat transfer surface [6.91] than outer piping heat transfer surface [6.92] (due to the difference in diameters, for example). As can be understood from the large difference in surface areas, much less heat transfer occurs between the inner and outer piping than occurs between the outer piping and the borehole. Thus, the counterflow GCHE may be more efficient because the effective thermal flow is counter to the natural thermal gradient of the earth.

In a further preferred embodiment of a counterflow GCHE, integration with the STEER apparatus [2] may enable the direction of flow to be reversed on demand, which may further enable application of thermal exergy to meet a differing need, including the ability to "recharge" Be the thermal field toward a new threshold while still operating as a counterflow GCHE.

7. SUREFIRE (Survivable Unmanned Renewably Energized Facility & Independently Reconfigurable Environment)

7.1 SUREFIRE Overview

SUREFIRE is an acronym for Survivable Unmanned Renewably Energized Facility & Independently Reconfigurable Environment. SUREFIRE [7] refers to an optional apparatus or subsystem co-located with, and possibly annexed to, certain versions of the present invention, as depicted notionally in FIG. 1. In a preferred embodiment, the FRAME system may be co-located with an embodiment of SUREFIRE apparatus [7], which, through co designed functionality, may provide an optimal deployment arrangement of FRAME. Thus, for the purposes of this document, the SUREFIRE apparatus [7] (examples of which are depicted in FIG. 120 to FIG. 138) may be considered a co-designed automated subsystem of FRAME capable of dynamically accepting, handling, securing, installing, configuring, operating, reconfiguring, and replacing modular payloads [3.1] comprising other FRAME subsystems. (Conceptually, this may be akin to something like a secure, fully automated equipment warehouse, except that the "stored items" may be arbitrary subsystems [3.1] that may also be automatically installed, secured, configured, and placed into service while they're at rest, and also automatically removed or replaced and transferred elsewhere when optimally advantageous).

FRAME achieves some of its exergy use efficiencies by the SUREFIRE [7] data center form factor it enables, which is a vertical steel cylinder, or silo, buried underground, typically 60 to 130 feet deep, as taught in this section. For electronics designed with very high compute density and for operation unattended by humans, that is enough space to house the electronics and infrastructure for a very powerful data center, ranking with some of the most powerful conventional data centers now in use, plus the on-site power generation and other infrastructure equipment. This density is only possible with FRAME's phase-change liquid cooling (at this density, conventional air cooling could not keep the electronics from thermal shutdown or permanent damage).

Figure 120:
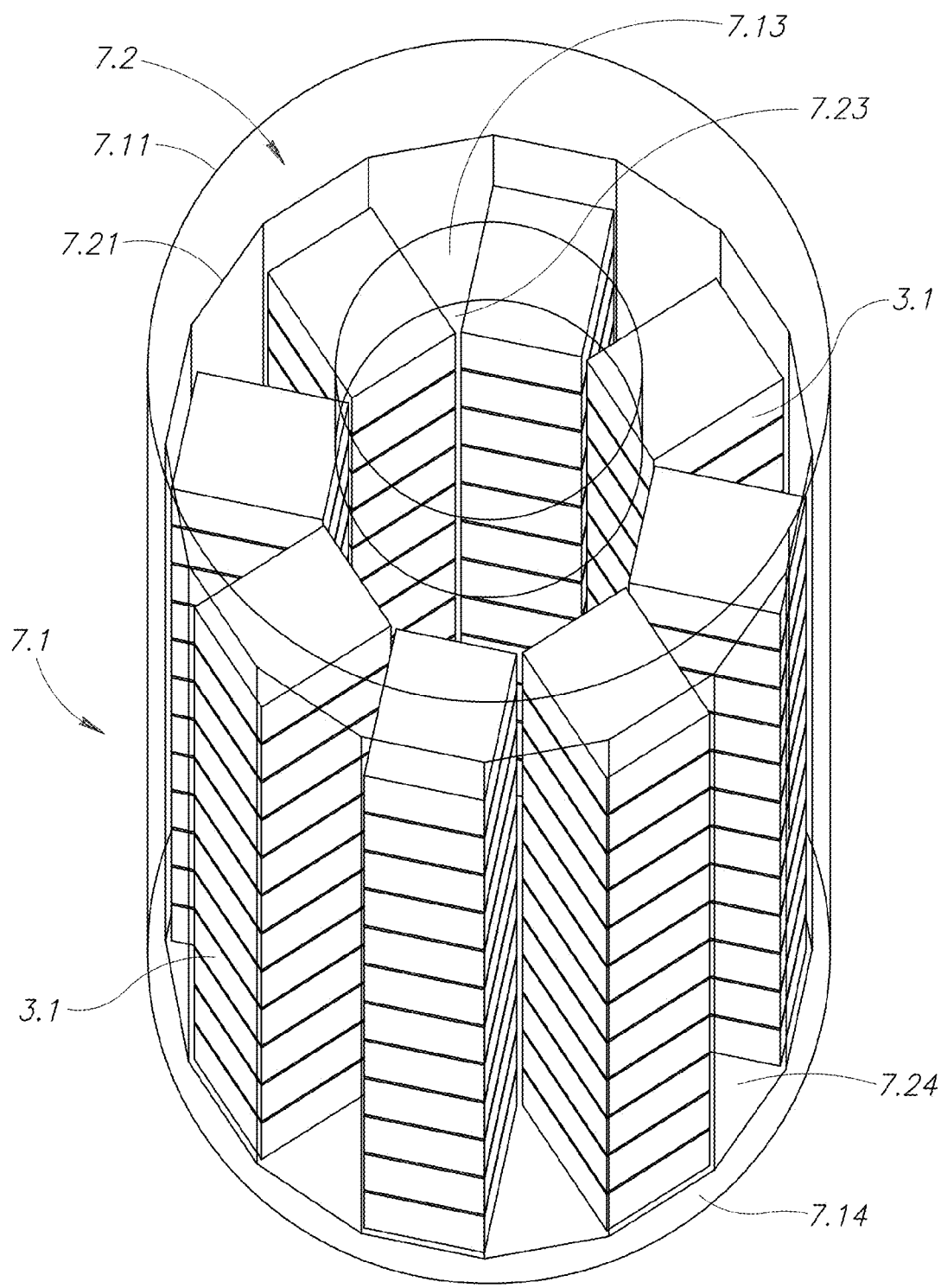
FIG. 120: SUREFIRE Silo with Modular Equipment—Like a Stack of Sliced 'Donuts'—Foreshortened Example
Figure 121:
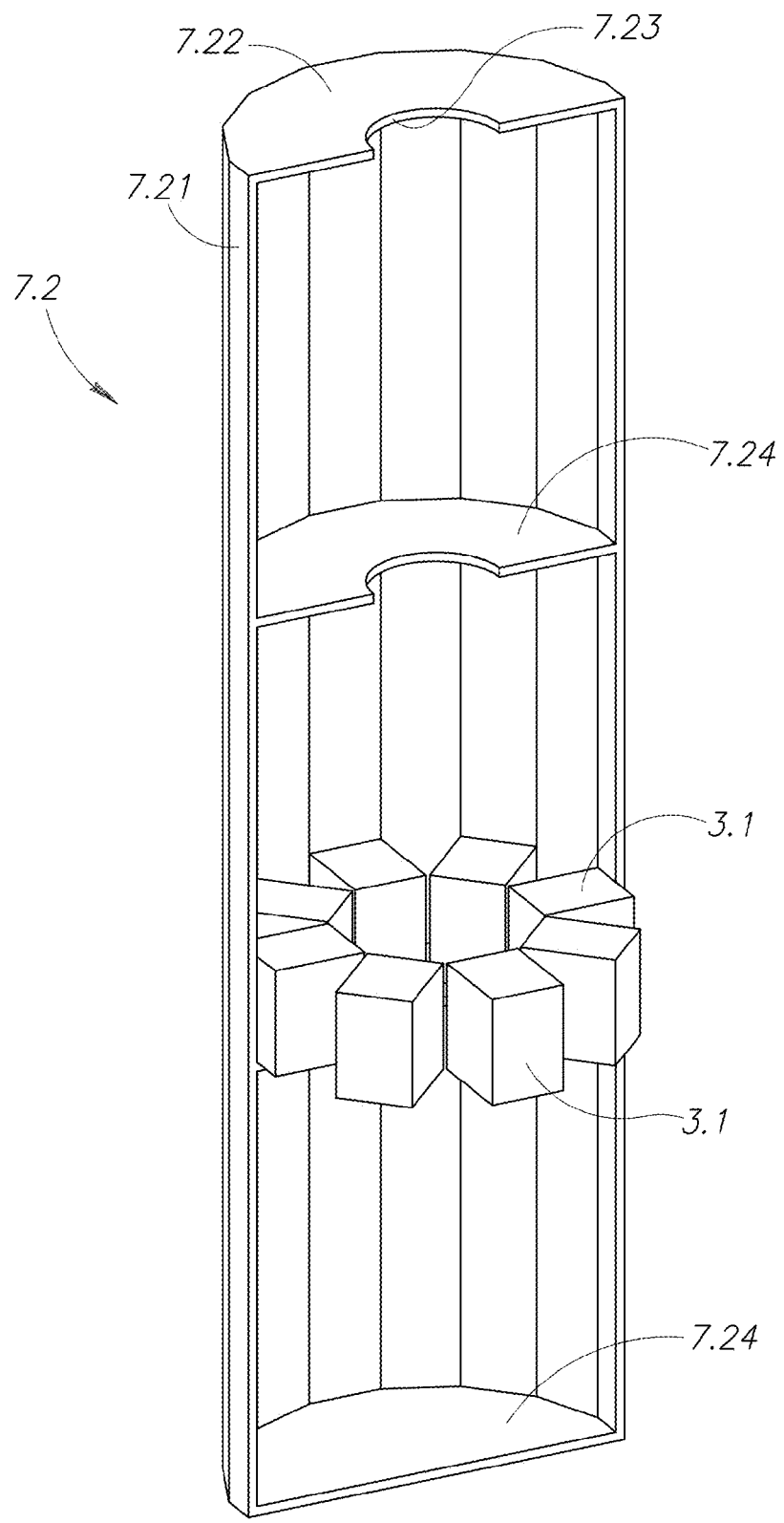
FIG. 121: SUREFIRE Silo with Modular Equipment—Like a Stack of Sliced 'Donuts'—Cutaway Example

In a preferred embodiment, each field-replaceable unit [3.1], for example, may typically contain thousands of processors and associated electronics in a volume approximating a two-drawer file cabinet. Since such a unit weighs several thousand pounds, it cannot be easily moved or installed by humans. Therefore, FRAME incorporates relatively simple automated handling of field-replaceable units, which is further enabled by the silo's cylindrical form factor. The silo resembles a highly efficient automated warehouse of very dense data center equipment. It may be viewed as a stack of doughnuts where the doughnuts have been sliced somewhat like a pizza, as can be seen in FIG. 120 and FIG. 121.

Figure 122:
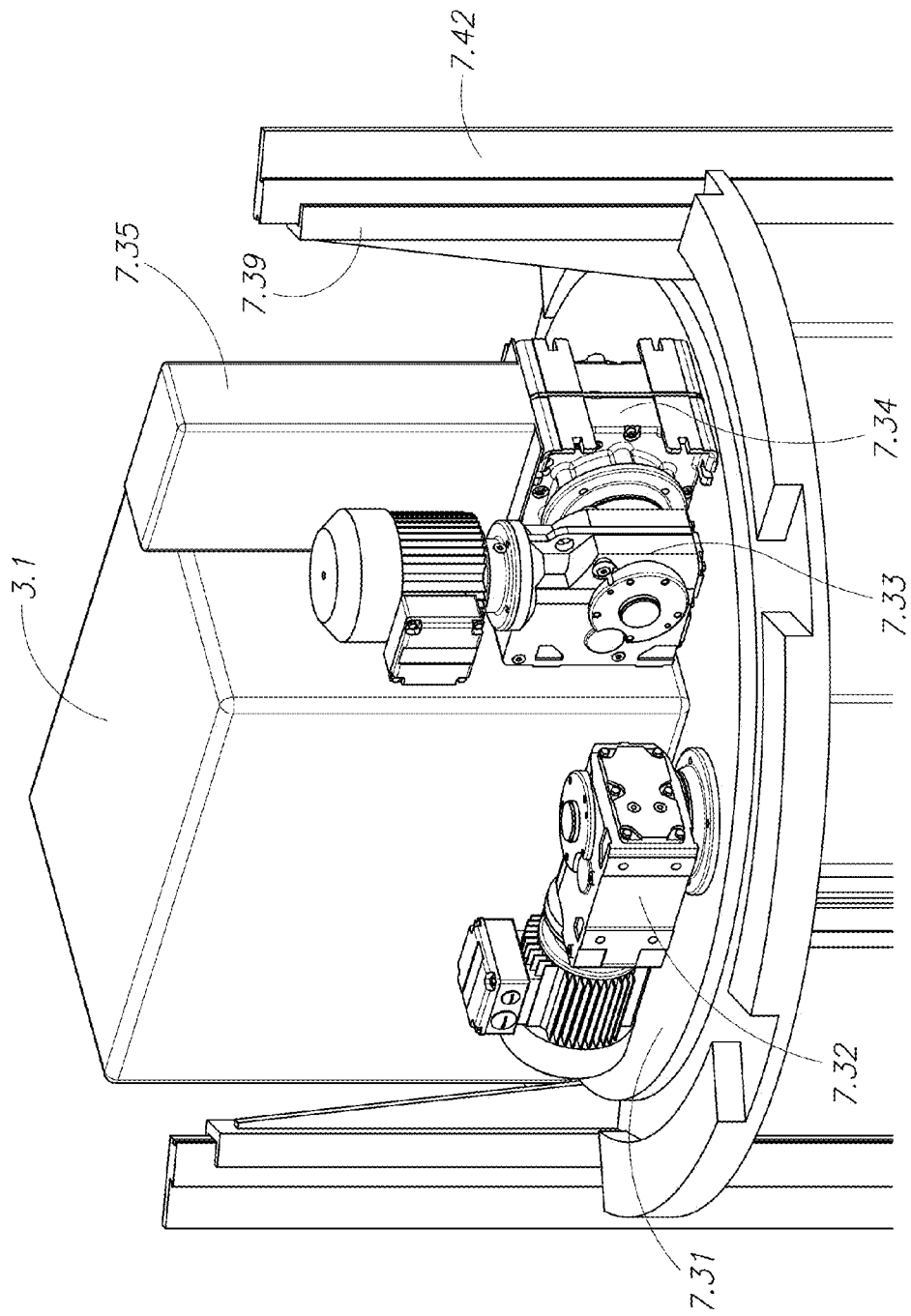
FIG. 122: SUREFIRE Top-Mounted Platform Robotics for Modular Equipment Insertion & Removal—Example
Figure 123:
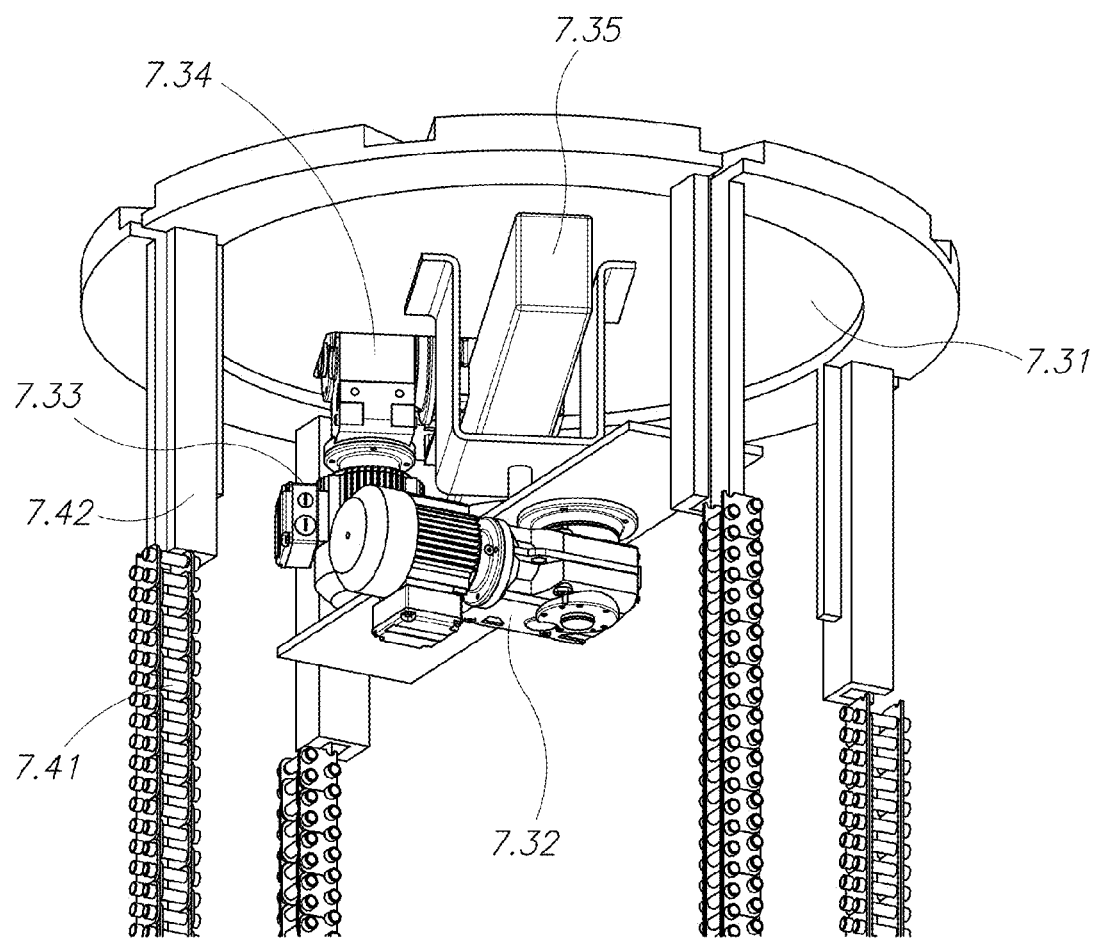
FIG. 123: SUREFIRE Under-Platform Robotics for Modular Equipment Insertion & Removal—Example
Figure 124:
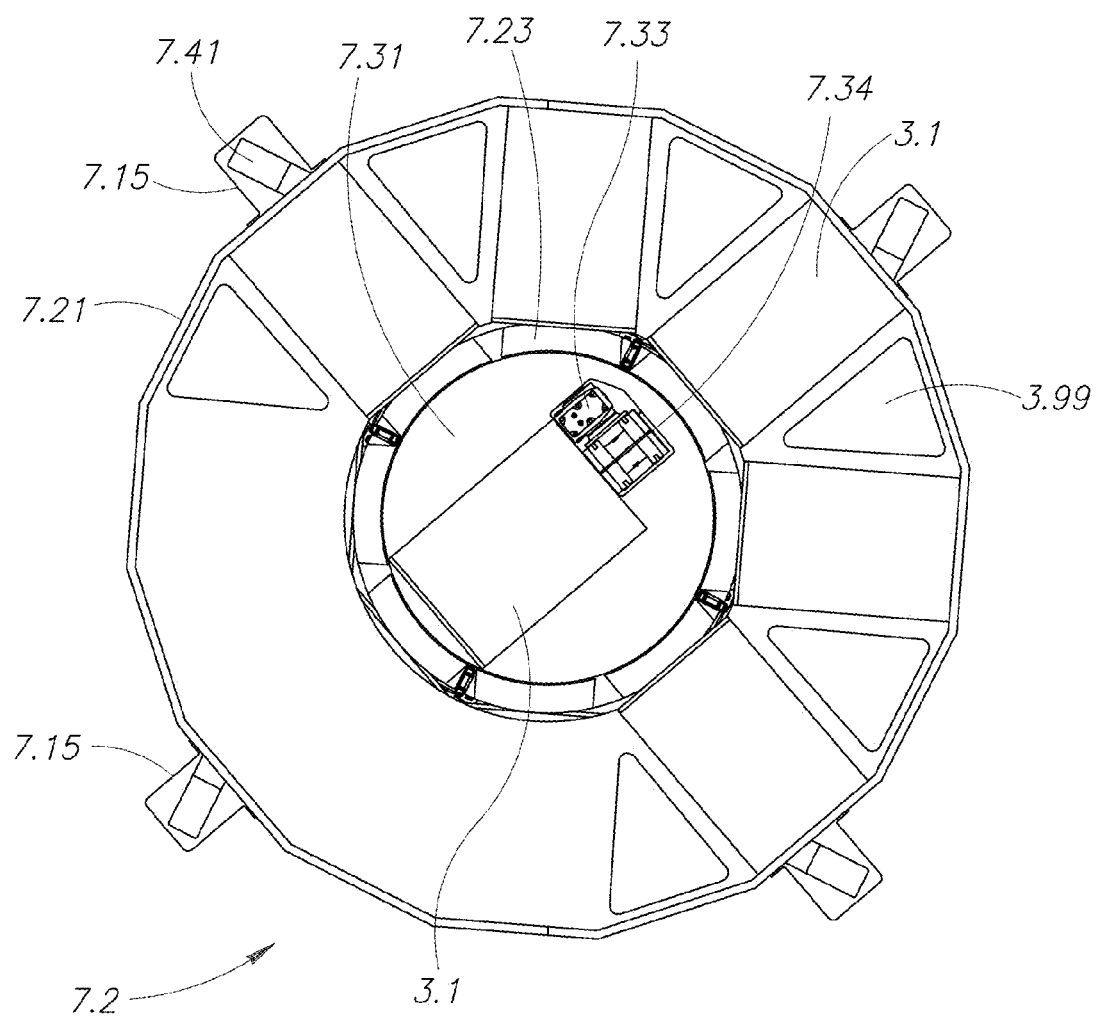
FIG. 124: SUREFIRE Under-Platform Robotics for Modular Equipment Insertion & Removal—Top-View Example
Figure 125:
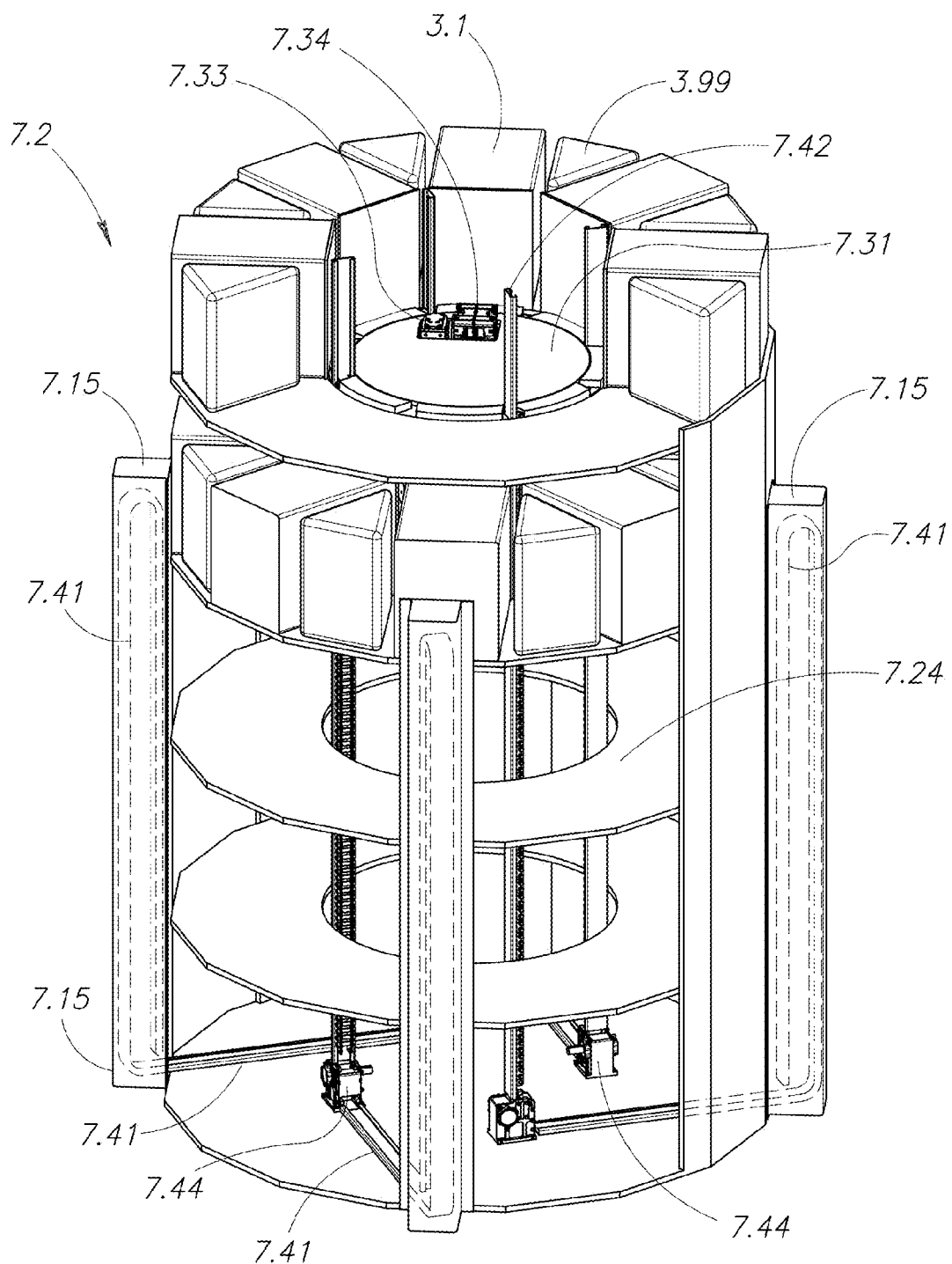
FIG. 125: SUREFIRE Automated Under-Platform Robotics Platform—Down Position Example

In a preferred embodiment, the space occupied by each "slice of doughnut" constitutes a location where field-replaceable units [3.1] can be plugged in (all connectors and couplers are blind-mating and therefore hands-free). In a preferred embodiment, automated handling equipment such as depicted in the examples of FIG. 122 to FIG. 138, which may be operated under the control of the SLAM apparatus [1], may move vertically in the "doughnut holes" (i.e., the hollow cylinder [7.13] around which the slots for field-replaceable units [3.1] are oriented, as depicted in FIG. 120) and may insert or remove field-replaceable units [3.1] by rotational and horizontal motion at a particular level. For example, as depicted in FIG. 122, FIG. 124, and FIG. 125, a rotary actuator [7.32] may rotate platform [7.31] to the proper slot at a given level, at which point linear actuator [7.33] may push an FRU [3.1] off the platform [7.31] into an unoccupied slot, or may pull an FRU [3.1] onto the platform [7.31] from an occupied slot. As depicted in the example of FIG. 123, rotary actuator [7.32] and linear actuator [7.33] may be configured underneath platform [7.31], rather than atop it, to provide more room for payload [3.1]. In a preferred embodiment where linear actuator [7.33] uses rigid chain, as depicted in the example of FIG. 122 and FIG. 123, then the chain storage cassette [7.35] may also be located underneath, as depicted in FIG. 123.

Figure 126:
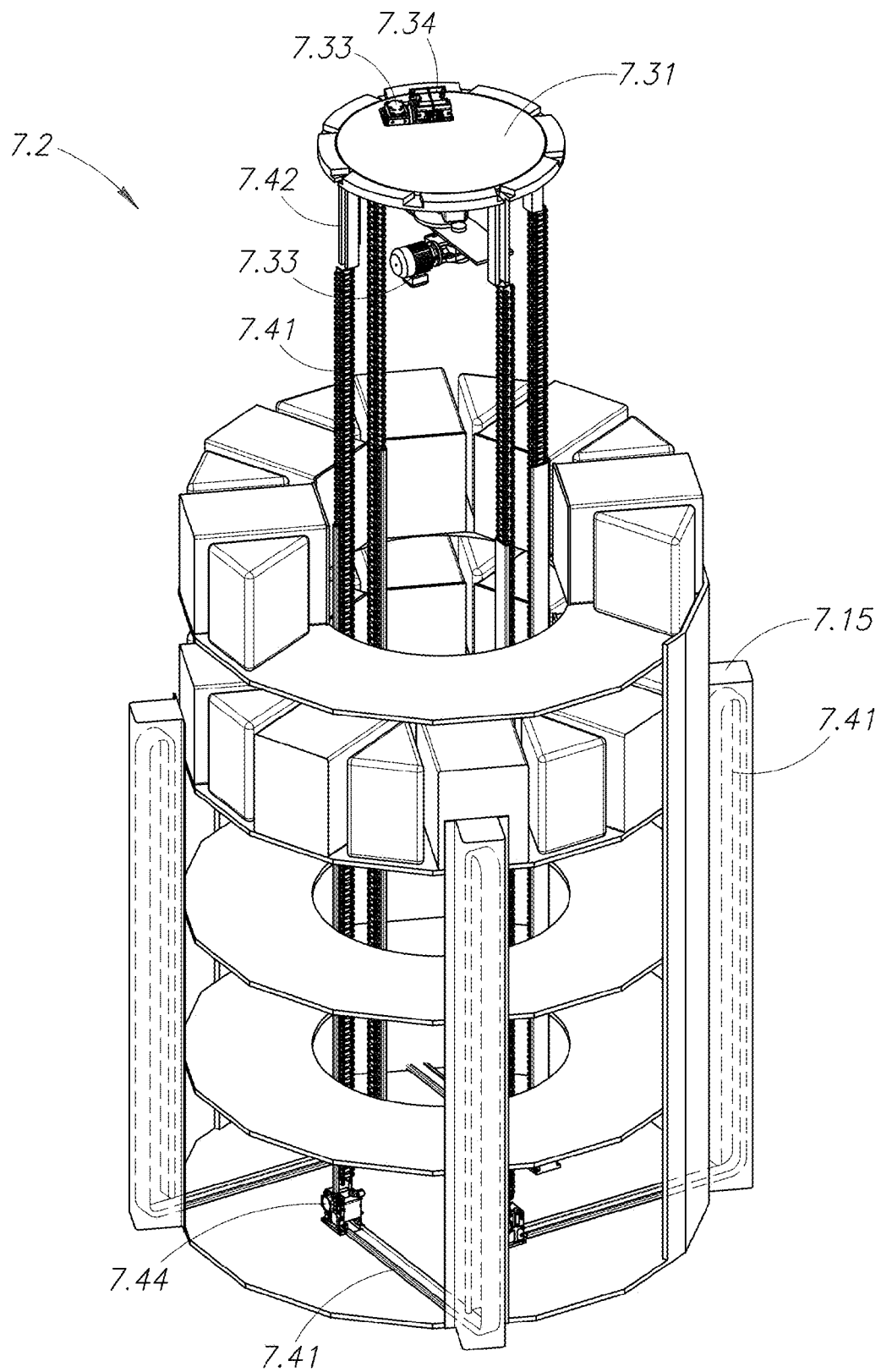
FIG. 126: SUREFIRE Automated Under-Platform Robotics—Up Position Example
Figure 127:
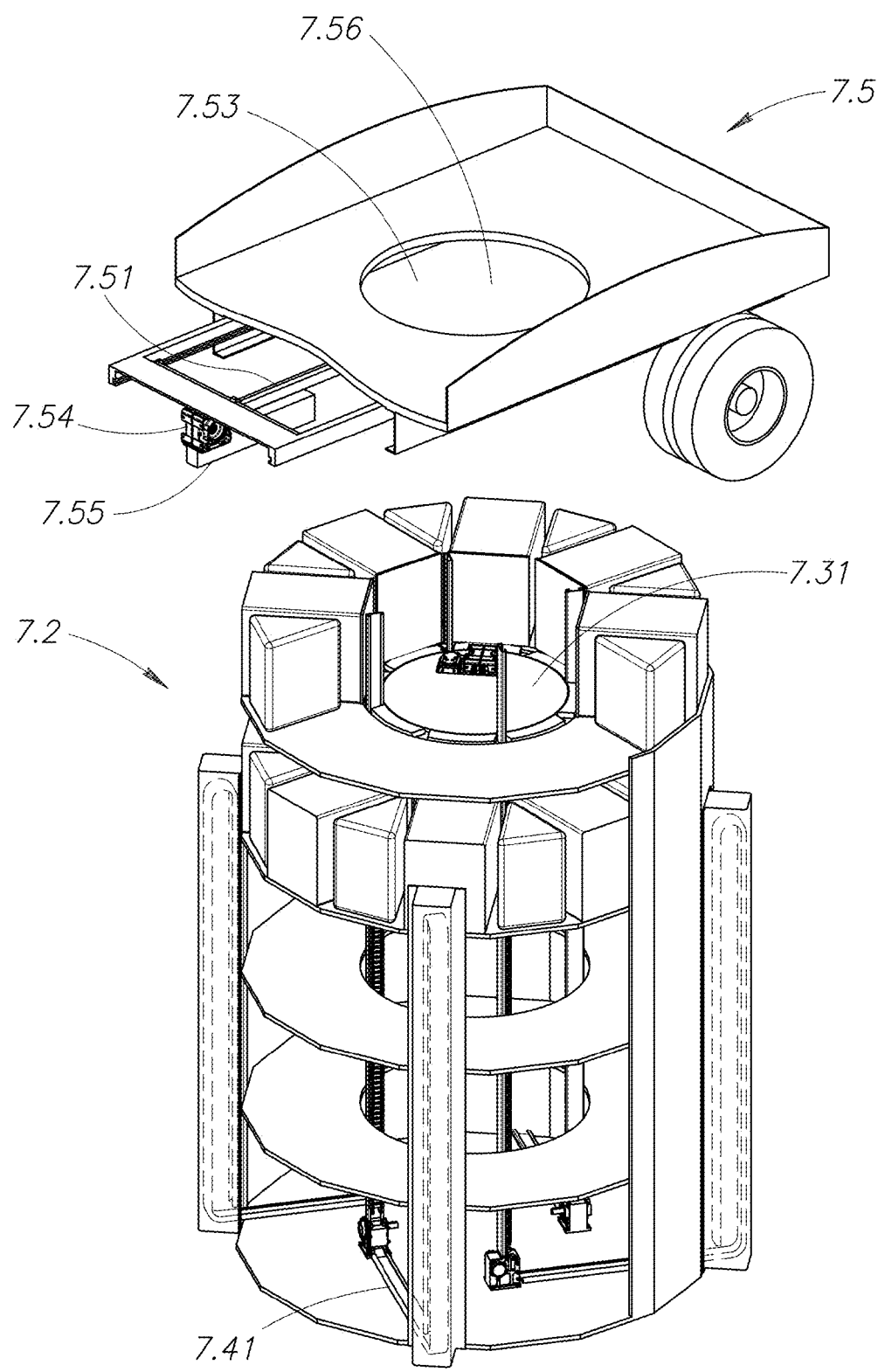
FIG. 127: SUREFIRE Automated Modular Equipment Insertion & Removal—Vehicle Closed Position Example
Figure 128:
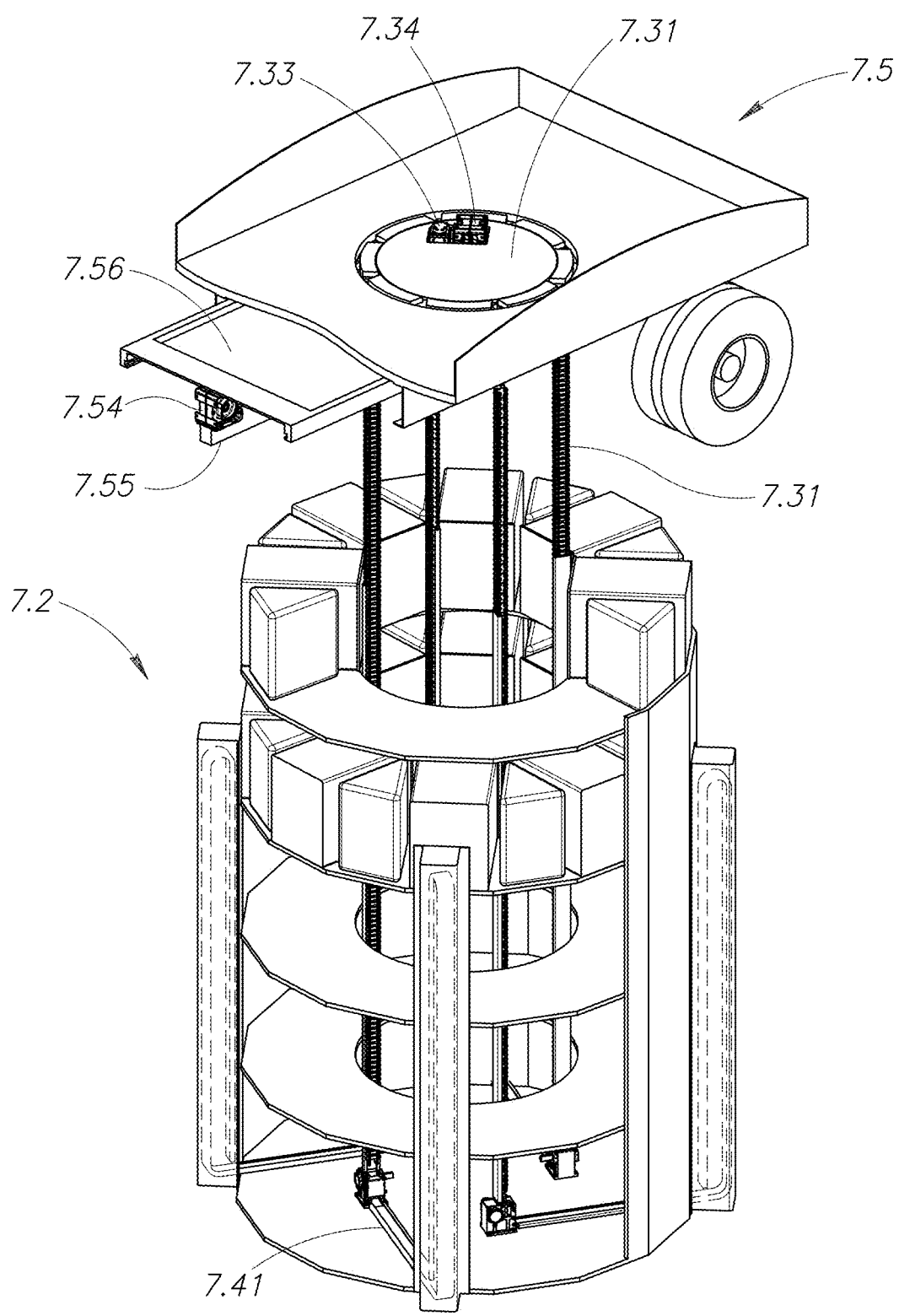
FIG. 128: SUREFIRE Automated Modular Equipment Insertion & Removal—Vehicle Open Position Example
Figure 129:
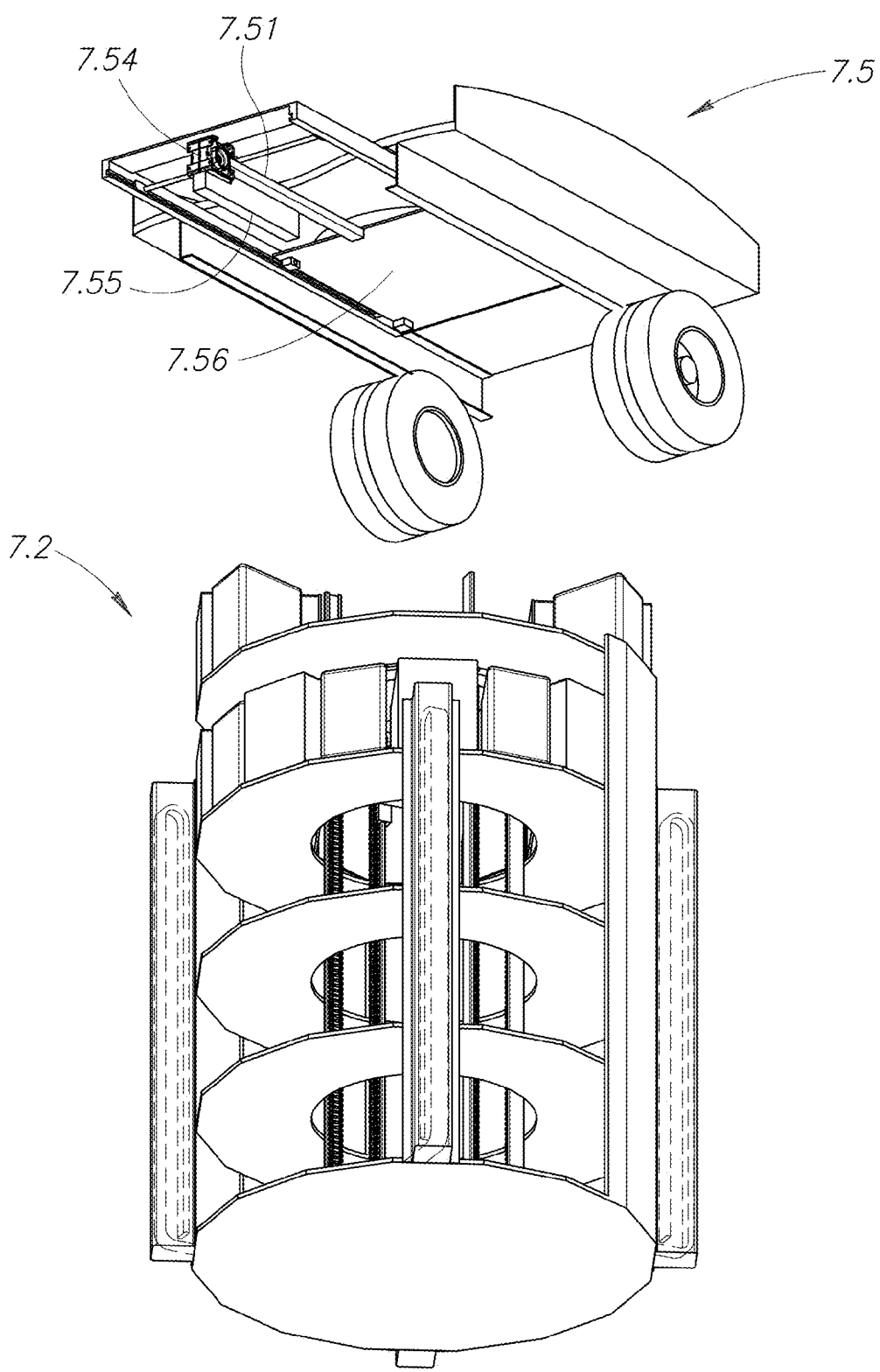
FIG. 129: SUREFIRE Automated Modular Equipment Insertion & Removal—Under Vehicle Closed Position Example
Figure 130:
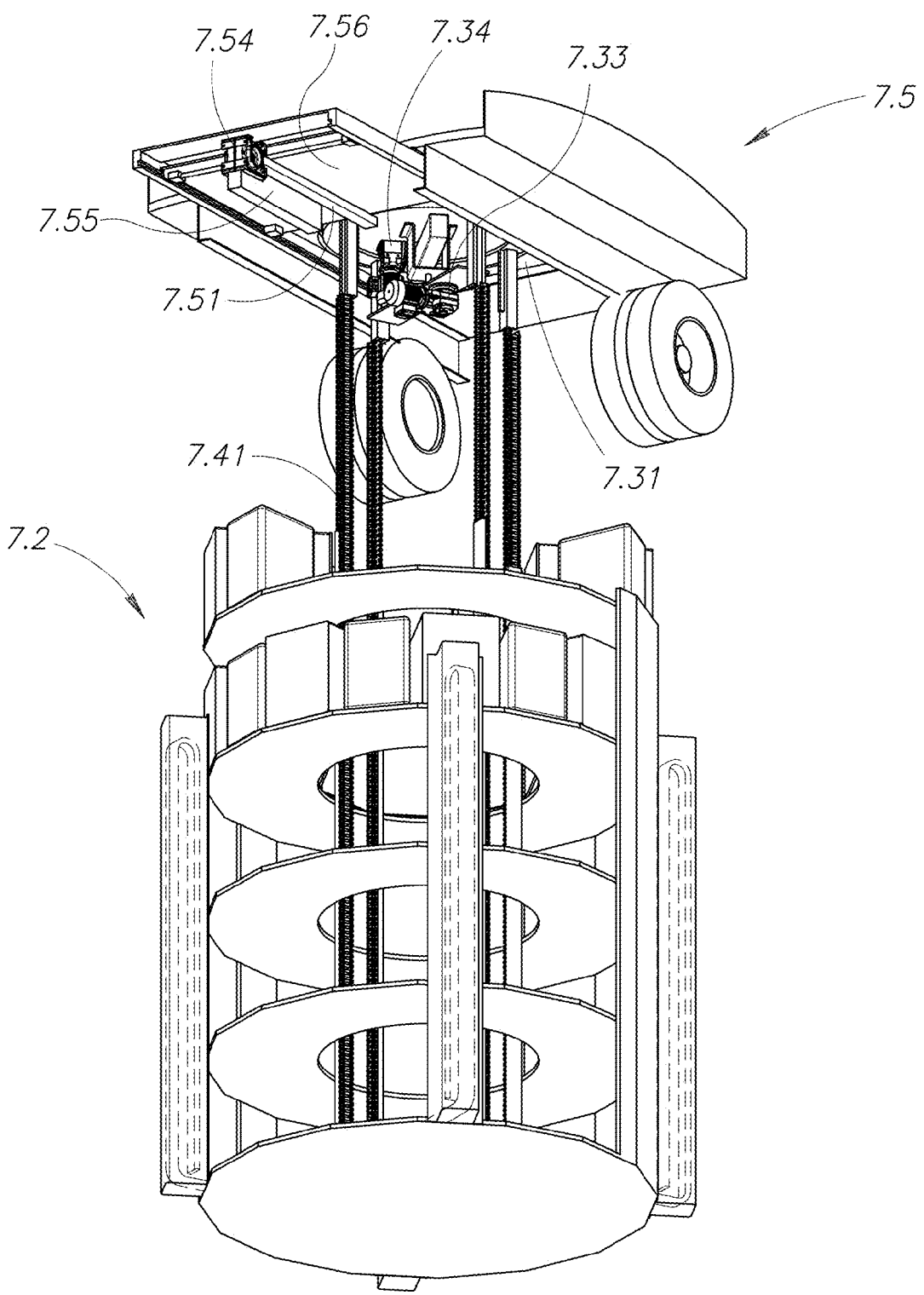
FIG. 130: SUREFIRE Automated Modular Equipment Insertion & Removal—Vehicle Open Position Example
Figure 131:
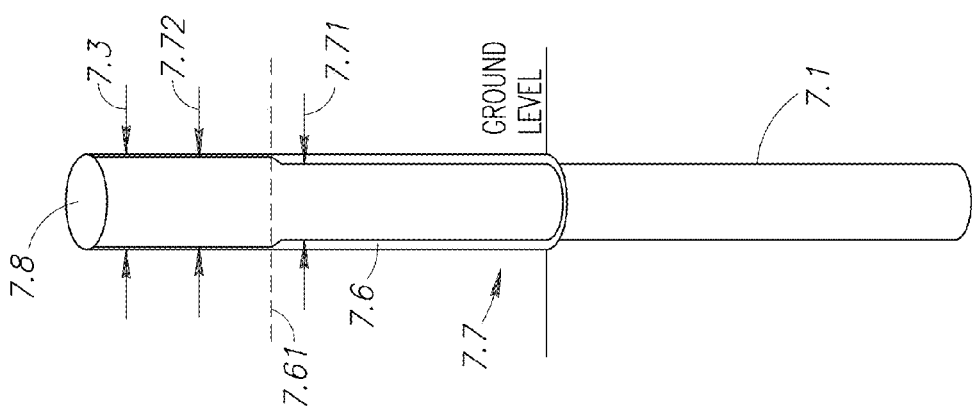
FIG. 131: SUREFIRE Optional Over-Mounted Monopole Tower Example—Oblique View

In a preferred embodiment, a vertical motion mechanism of the automated handling equipment may comprise rigid chain [7.41] as depicted in the examples of FIG. 123, FIG. 125, and FIG. 126, and suitable actuators [7.44] as depicted in the examples of FIG. 125 to FIG. 130. This same stack-of-doughnuts arrangement may be used for vehicles that service a silo (e.g., for transporting field-replaceable units [3.1] to or from a silo). In a preferred embodiment, as depicted in the examples of FIG. 126 to FIG. 130, the automated handling equipment (e.g., platform [7.31] and its associated actuators) may simply reach into a specially configured above-ground vehicle [7.5] to retrieve or insert a field-replaceable unit [3.1]. In a preferred embodiment, as depicted in the examples of FIG. 129 and FIG. 130, said above-ground vehicle [7.5] may further comprise access control mechanisms such as a secure sliding door [7.56] with its own linear actuator [7.54], rigid chain [7.51], and chain storage cassette [7.55], which may be operated under the control of the SLAM apparatus [1]. In one embodiment, said automated handling equipment may also handle field-replacement units that may normally reside in an optional top-mounted cylindrical tower [7.7] as depicted in FIG. 131 (and described in the next section) extending axially above the surface to a height of up to 110 feet (from the ground to the top of the tower wall). In a preferred embodiment, a dedicated set of automated handling equipment (which may operate in a similar manner to that of the silo-based apparatus) may be associated with said optional top-mounted cylindrical tower [7.7], so that it may be tailored to the specific needs of tower-mounted field-replaceable units.

With the silo's design for unattended operation and relatively small form factor, there are many items ordinarily requiring power (which goes into the numerator of the PUE fraction) that are not needed in a SUREFIRE [7] facility and may be missing entirely. These include everything for human support (lights, aisles, catwalks, ventilation, bathrooms, water coolers, telephones), space for staging, moving, and accessing rack-mounted gear such as servers and network switches, more space for extensive cabling and plumbing, backup diesel generators, and extra space to expand into in the future, to mention a few.

In addition to leaving out unnecessary components, the silo's cylindrical form factor is itself highly efficient in exergy usage. Primarily it enables any component to reach any other component by a route for which the horizontal distance is at most half the circumference of the inside diameter of the cylinder. Compare that proximity to the huge distances that wiring and plumbing must travel in conventional data centers, inherently consuming more exergy because of the consequent voltage and pressure drops, and associated increases in wire and pipe diameters.

7.2 SUREFIRE Facility Details

In a preferred embodiment exemplifying co-designed functionality, a manufactured SUREFIRE [7] subsystem (e.g., a silo or vault) may comprise a cylindrical outer sleeve or casing [7.1] and one or more large-scale stackable modular units [7.2] as depicted in FIG. 120 and FIG. 121, which may further comprise pre-tested, inspected, and certified plumbing, electrical, cabling, and security subsystems implementing the relatively fixed portions of the STEER apparatus [2], RUBE apparatus [3], PRIME apparatus [4], and PERKS apparatus [5].

In a preferred embodiment, a single SUREFIRE apparatus [7] silo may comprise a cylindrical outer sleeve or steel casing [7.1] with an inner diameter sufficient to contain an inner cylinder [7.2] further comprising a silo payload, as depicted in FIG. 120, such that the cylindrical outer sleeve or casing [7.1] may be inserted into the ground as a continuous single unit or in welded-on sections, to a depth sufficient to ensure that the top of selected silo payloads may be at the desired or required depth below the surface. In a preferred embodiment, a single SUREFIRE silo may comprise a cylindrical outer sleeve or casing [7.1] with an outer diameter of approximately 120 inches and inner diameter of approximately 118 inches, such that the casing may be inserted into the ground in welded-on sections, typically to the aforementioned depth of up to 130 feet, with said insertion accomplished using shaft drilling and boring techniques known to those skilled in the art, according to the site-specific terrain and soil conditions, which may further comprise solid rock.

Figure 134:
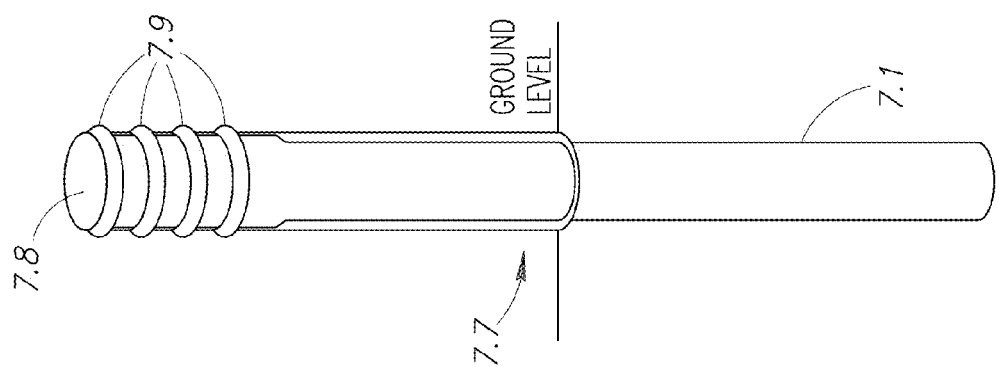
FIG. 134: SUREFIRE Monopole Tower Example & Integrated Radome Rings—Oblique View
Figure 138:
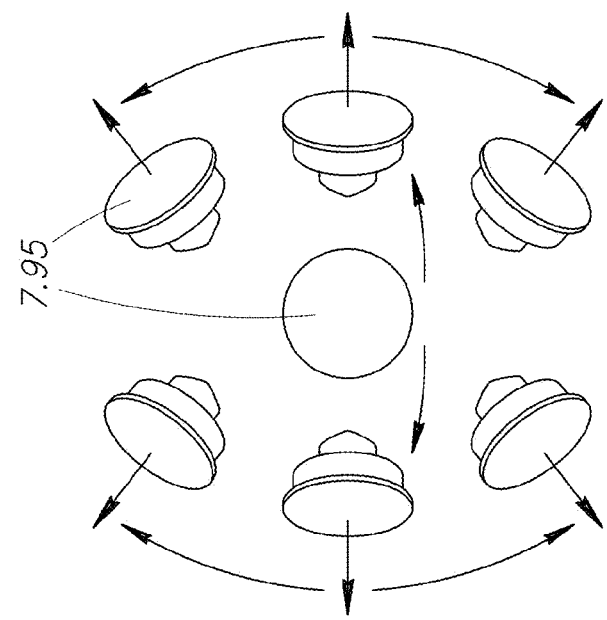
FIG. 138: SUREFIRE Integrated Radome Ring Example—Range of Motion of MMW Device on Gimbal

In a preferred embodiment, the SUREFIRE apparatus [7] may be implemented as an underground silo comprising an outer steel casing [7.1] and an inner modular silo unit [7.2], as depicted in the examples of FIG. 120 and FIG. 121, with an optional top-mounted cylindrical monopole tower [7.7] as depicted in FIG. 131 and FIG. 134, extending coaxially above the surface to a height of up to 110 feet (from the ground to the top of the tower wall), such that a protruding above-ground portion [7.6] of the outer steel casing [7.1] of the underground silo may overlap with (like a sleeve), and be in mechanical communication with, the inner wall [7.71] of the optional top-mounted tower [7.7], as depicted in the example of FIG. 131. The optional monopole tower [7.7] fits like a sleeve over the protruding 20 to 30 feet of a shaft casing that may be 80 to 160 feet tall, typically.

Figure 133:
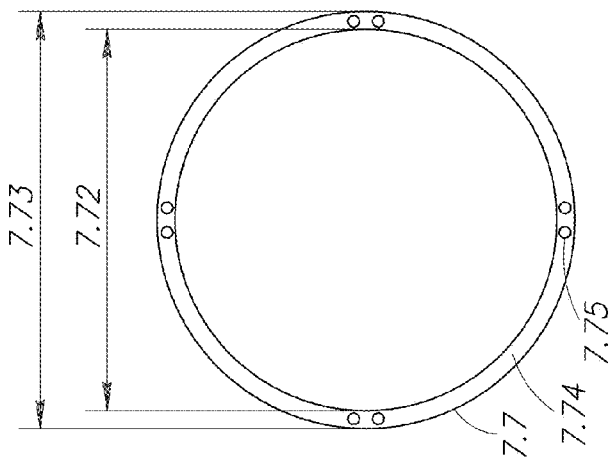
FIG. 133: SUREFIRE Optional Over-Mounted Monopole Tower Example—Top Cutaway View
Figure 132:
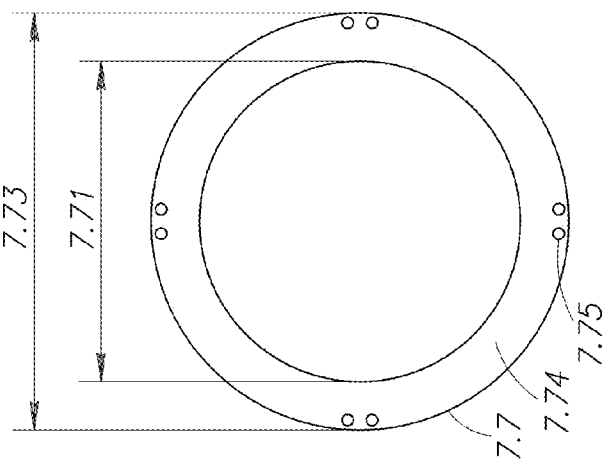
FIG. 132: SUREFIRE Optional Over-Mounted Monopole Tower Example—Cutaway View from Bottom

In a preferred embodiment, said tower wall may comprise resin-infused glass and/or carbon fiber skins, with foam core for rigidity, and may contain various embedded conduits [7.75], and said foam core may be thicker at the bottom than at the top. In a preferred embodiment, the outside diameter of said tower [7.7] at the base [7.73] may be about 13 feet, with an inside diameter [7.71] of about 10 feet, as depicted in FIG. 132. In a preferred embodiment, the outside diameter of said tower [7.7] at the top [7.73] may be about 13 feet, with an inside diameter [7.72] of about 12 feet, as depicted in FIG. 133.

NOTE: The monopole height and wall dimensions are conceptual, and thus approximations only. Wall thicknesses and the relative thickness of skins and core must be determined from maximum normal wind speeds (no monopole flexing or twisting) and maximum survival wind speeds (some monopole flexing may be desirable to prevent destruction or damage).

In a preferred embodiment, the larger internal diameter of said tower may be for the top 20 to 40 feet of a monopole that may be 60 to 110 feet tall, typically. In a preferred embodiment, as depicted in FIG. 131, the thicker walls at the base may extend as high vertically as the protruding above-ground portion [7.6] of the outer steel casing [7.1] of the underground silo with which it may overlap (i.e., like a sleeve).

In a preferred embodiment incorporating the top-mounted tower [7.7], the SUREFIRE apparatus [7] may use the tower [7.7] (and optionally, openings in the tower wall) as its primary ambient air interface, if any, which may further comprise or interface with ductwork, dampers, filters, and other HVAC-type equipment. In a preferred embodiment, modular field-replaceable HVAC-type equipment, whether silo-hosted or tower-hosted, may be treated as payloads for the automated mechanisms (e.g., robotics, actuators, positioners, rails, tracks, locks, pipes, tubes blind couplers and connectors, etc.) which implement and enable the automated dynamic deployment, configuration, transfer, or removal of modular units of the FRAME system.

In a preferred embodiment of the SUREFIRE apparatus [7] incorporating the top-mounted tower [7.7], the SUREFIRE tower [7.7] may comprise pre-tested, inspected, and certified automated mechanisms (e.g., robotics, actuators, positioners, rails, tracks, locks, pipes, tubes, blind couplers and connectors, etc.) which implement and enable the automated dynamic deployment, configuration, transfer, or removal of modular units [3.1] of the STEER apparatus [2], RUBE apparatus [3] (which may further comprise tower-hosted RF subsystems [7.95]), PRIME apparatus [4], and PERKS apparatus [5]. In an alternative embodiment, some of the automated mechanisms may be field-installed, and may require additional testing, inspection, and certification (e.g., in accordance with regulatory authorities). In a preferred embodiment of the SUREFIRE apparatus [7] incorporating a top-mounted tower [7.7], the SUREFIRE tower [7.7] may comprise exergy recuperation mechanisms (for example, conduits or channels [7.75], as depicted in FIG. 132 and FIG. 133) to remove heat from tower-based apparatus (or conversely, to deliver heat in certain cases). In a preferred embodiment of the SUREFIRE apparatus [7] incorporating a top-mounted tower [7.7], the SUREFIRE tower [7.7] may comprise renewable energy collection mechanisms, such as an automated fully or partly retractable multi-stage vertical axis wind turbine (VAWT), or multiple VAWTs, and concentrating or non-concentrating solar energy collectors.

In a preferred co-location arrangement, the SUREFIRE apparatus [7] may provide nearly ideal interfaces to energy and exergy sources and to the ambient environment, with a minimal footprint, while also providing significant security, survivability, and operational benefits.

Figure 135:
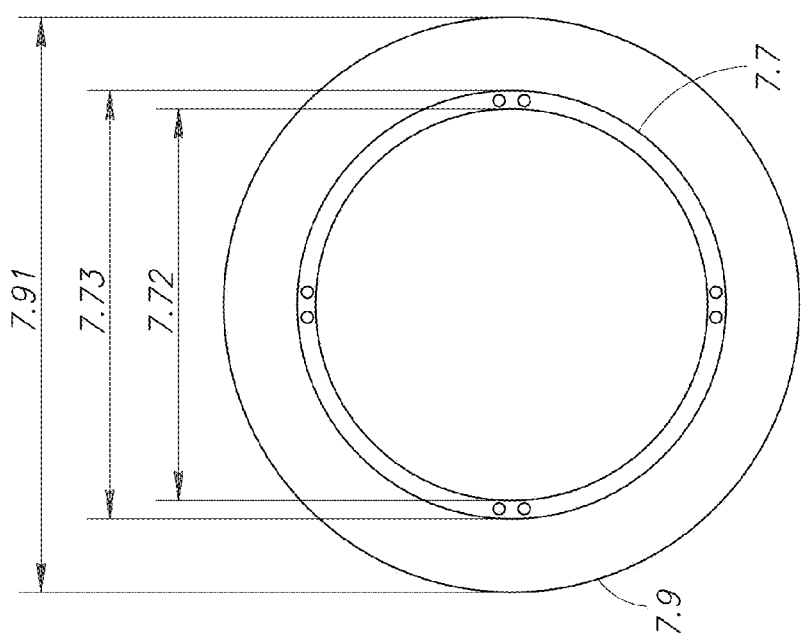
FIG. 135: SUREFIRE Monopole Example & Integrated Radome Rings—Top Cutaway View

In a preferred embodiment of the SUREFIRE apparatus [7] incorporating a top-mounted tower [7.7] as depicted in FIG. 131, the SUREFIRE tower [7.7] may be radio transparent (e.g., not unlike a radome), and further may host a relatively large number of RF-based subsystems [7.95] while shielding them from non-RF-based external hazards and threats (weather, ballistic projectiles, etc.). In a preferred embodiment of the SUREFIRE apparatus [7] incorporating a top-mounted tower [7.7] as depicted in FIG. 131, the SUREFIRE tower [7.7] may further a number of externally visible donut-shaped radomes ("integrated radome rings") [7.9], as depicted in the examples of FIG. 134 to FIG. 137. In a preferred embodiment, the outside diameter [7.91] of said "radome rings" [7.9] may be about 18 feet, with an inside diameter [7.73] of about 13 feet, as depicted in FIG. 135.

NOTE: The radome ring dimensions [7.9] are conceptual, and thus approximations only.

As depicted in FIG. 134, a radome ring comprises a radome attached or fastened to the outside wall [7.74] of said tower [7.7] and forming a circular RF-transparent raceway [7.9] around said tower (see FIG. 136) for reconfigurable antenna arrays.

Figure 136:
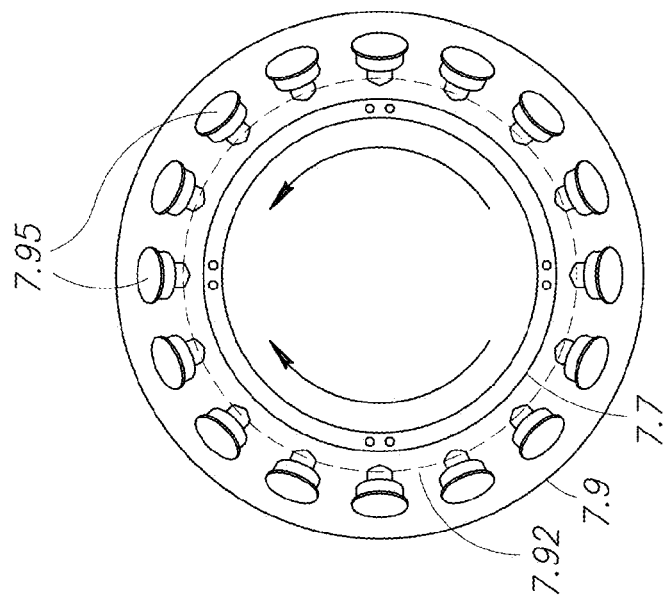
FIG. 136: SUREFIRE Integrated Radome Ring Example—Cutaway Top View with MMW Devices in Raceway

In a preferred embodiment, within said radome ring, any antenna hosted on an antenna platform [7.94] (see FIG. 137) may be dynamically repositioned around a bidirectional circular actuator track as depicted in FIG. 136, and repointed relative to its new location (see FIG. 138) via azimuth and elevation control actuators. If not otherwise obscured, said antenna platform may dynamically hold its antenna on its pointing target even as the antenna platform is repositioning itself, typically within a small fraction of one degree (such as a MMW dish with a 0.4 degree beamwidth).

Figure 137:
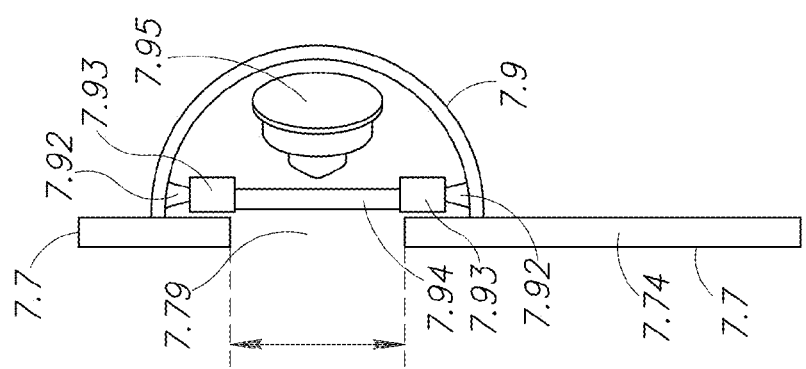
FIG. 137: SUREFIRE Integrated Radome Ring Example—Cutaway Side View with MMW Device on Gimbal/Track

In a preferred embodiment, tracks [7.92] within each raceway may carry power and signaling for one or more field-replaceable self-propelled antenna platforms [7.94] which interface to said tracks [7.92] via interface units [7.93], as depicted in the example of FIG. 137.

FIG. 137 depicts convenient openings or portals [7.79] in the wall [7.74] of the tower [7.7] for robotic insertion and removal of antenna modules or platforms [7.94].

In a preferred embodiment, the insertion of the cylindrical outer sleeve or casing [7.1] may be accomplished with shaft drilling and boring techniques known to those skilled in the art, according to the site-specific terrain and soil conditions, which may further comprise solid rock. In an alternate embodiment, the insertion of the cylindrical outer sleeve or casing may be accomplished with pile-driving techniques known to those skilled in the art. In one embodiment, the shaft into which the cylindrical outer sleeve or casing [7.1] is inserted may extend beyond the bottom of said cylindrical outer sleeve or casing [7.1].

In a preferred embodiment, the bottom of the cylindrical outer sleeve or casing [7.1] may be sealed from the underlying terrain by one or more plates, such as welded-on steel plate [7.14], which may be underlain by other materials, which may further comprise concrete, perlite, or other implementation-specific materials. In some preferred embodiments, the make-up of a cylindrical outer sleeve or casing [7.1] may be of a material other than steel, or may include a relatively high percentage of non-steel constituents, such as 36% nickel (i.e., to compose Invar), in order to achieve certain material properties needed for a specific implementation (such as strength, hardness, or brittleness at specific operating temperatures, for example). In one embodiment, the bottom of a SUREFIRE silo may be configured to securely host high-temperature PRIME apparatus [4], such a small modular reactor (SMR), whereas, in another embodiment, the bottom of a SUREFIRE silo may be configured to securely host STORE apparatus [6], such as superinsulated LNG fuel tanks optimized for cryogenic temperatures.

In a preferred embodiment, post-insertion openings or cuts (such as made by cutting torch or other field-deployable equipment) may be made in the cylindrical outer sleeve or casing [7.1] so as to accommodate or facilitate radial, coaxial, or other conduits for securely connecting the silo with other facilities, such as grounding systems, fuel storage and supply systems, co-located silos or towers, on-premises buildings and equipment, and nearby utilities. Subsequent to the creation of said openings or cuts and associated surface preparation, the corresponding conduits may be placed and installed in accordance with applicable requirements, standard practices, and regulatory requirements. In a preferred embodiment, seismic-tolerant conduit and attachment apparatus (such as commercially available FLEX-TEND® flexible ball joints and force-balanced flexible expansion joints, for example) may be utilized to accommodate combinations of vertical and horizontal ground movement (due to, for example, earthquakes) for conduits (such as plumbing, electrical, and fiber optic) which may be subject to ground motion or ground-motion-induced stresses. Connections and circuits to be routed through the aforesaid conduits may be installed in the same timeframe as the conduits or deferred until later.

In one preferred embodiment, the cylindrical outer sleeve or casing [7.1] of a SUREFIRE silo may extend to the apparent surface level (relative to the immediate area surrounding it at the surface), or somewhat below it, such that an access-control apparatus which may later be securely affixed to the top may appear to be flush with the as-finished surface area around the below-the-surface silo.

In a preferred embodiment, prior to affixing an access-control apparatus to the cylindrical outer sleeve or casing [7.1] of a SUREFIRE silo, one or more quasi-permanent "stackable" inner cylinders [7.2] further comprising silo infrastructural components may be inserted into the cylindrical outer sleeve or casing [7.1], such as by lowering them from above (e.g., by crane), via the opening at the top. In a preferred embodiment, the aforesaid inner cylinders [7.2] further comprising silo infrastructural components may be prefabricated, inspected, and pre-certified elsewhere prior to insertion and connection at the silo site. Onsite pre-insertion and post-insertion inspection may also be performed as needed, in accordance with regulatory and other requirements.

In an alternative preferred embodiment, the cylindrical outer sleeve or steel casing [7.1] of a SUREFIRE silo may extend well above the surface by an implementation-specific amount, such that an access-control apparatus may later be securely affixed anywhere within or above said extension [7.6] (that is, anywhere from just below the surface up to the top [7.61] of said extension [7.6], as depicted in FIG. 131). In another preferred embodiment, said cylindrical extension [7.6] may extend 10 to 30 feet or more above the surface (i.e., so that the top [7.61] of said extension is at 10 to 30 feet above ground level). In a preferred embodiment having said above-the-surface extension [7.6], an above-ground tower [7.7] may be overlaid onto the surface extension, like a sleeve, so that the tower fully overlaps and covers the above-the-surface extension.

In a preferred embodiment having said above-the-surface extension [7.6], and optionally, an above-ground tower [7.7], the combination may comprise an overhead or side-loading access-control apparatus, and said apparatus may further comprise, for example, an access-controlled sliding door in the outer wall of the surface extension-tower combination to enable automated loading and unloading of silo "payloads" [3.1] (e.g., such as modular electronics units, fuel tanks, power generation units, or infrastructure components).

In a preferred embodiment, said access-control apparatus and above-ground tower [7.7] may be affixed to the cylindrical outer sleeve or steel casing [7.1] in such a way so as to be removable only under certain conditions and activated only from within, thereby enabling eventual replacement or removal of the aforementioned quasi-permanent "stackable" inner cylinders [7.2].

In a preferred embodiment, after the one or more inner cylinders [7.2] further comprising silo infrastructural components have been inserted into the cylindrical outer sleeve or casing [7.1] of the SUREFIRE silo, any connections and circuits yet to be routed through the aforementioned conduits may be installed at this time or further deferred, as appropriate. Installation of any permanent or quasi-permanent connections between externalities and the aforesaid inner cylinders further comprising silo infrastructural components may then be completed and the work inspected, tested, and certified as needed, in order to assure that requirements are met and regulatory compliance is achieved. In a preferred embodiment, the access-control apparatus may then be affixed to the cylindrical outer sleeve or casing [7.1] of a SUREFIRE silo, and the work inspected, tested, and certified as needed to assure that associated requirements are met and regulatory compliance is achieved. After the completion of "final inspection," the SUREFIRE facility [7] may be considered a ready-to-use infrastructure, ready to accept pre-approved "payloads" (e.g., arbitrary subsystems [3.1], as depicted in the examples of FIG. 42, FIG. 120, FIG. 121. FIG. 122, and FIG. 124) whose automated acceptance and placement into a SUREFIRE silo may normally require no further human inspection or attention.

In a preferred embodiment, a SUREFIRE silo facility [7], along with an optional above-the-surface extension of the cylindrical outer sleeve or casing [7.1], an optional above-ground tower [7.7], and an access-control apparatus, may be capable of withstanding the eventualities of region-specific hazards or threats, such as earthquakes, hurricanes, tornadoes, floods, or fires. For example, in a preferred embodiment intended to withstand severe floods, an above-the-surface extension of the cylindrical outer sleeve or casing [7.1] and optional above-ground tower [7.7] may act as a "snorkel" that may enable continuous off-grid or on-grid operation despite the presence of potentially deep flood waters covering the normal ground surfaces.

In still another alternative preferred embodiment, multiple SUREFIRE silos may be colocated so as to share one or more optional above-the-surface extensions of cylindrical outer sleeves or casings [7.1], optional above-ground towers [7.7], or access-control apparatus. In a preferred embodiment, a seismically protected underground horizontal shaft (not depicted) may connect any pair of colocated underground silos, such that a linear-actuator-based or other type of conveyance system may securely shift modular payloads [3.1] between said silos, thereby implementing an underground side-loading capability. In a preferred embodiment, the underground side-loading capability may further comprise access-control apparatus. In a preferred embodiment, the conveyance system of the underground side-loading capability may be implemented with rigid chain and suitable actuators, preferably in a push-pull configuration between silos.

Note that, although some SUREFIRE apparatus [7] may be straightforwardly deployed and removed, its silo-based variants should generally be considered to be the counterpart of a permanent, non-movable physical plant, with a design life of ten to twenty years or more. A key goal is for a SUREFIRE apparatus [7] to remain in place without overhaul for its design life, at which point it may be removed, upgraded or remanufactured and reused, or recycled.

Note that, depending on one's viewpoint, the SUREFIRE apparatus [7] silo facility is both a subsystem and an independent-but-co-designed-facility to host the other FRAME subsystems. It has a symbiotic relationship with the other subsystems and provides permanent or quasi-permanent infrastructure components upon which the other subsystems depend. The SUREFIRE apparatus [7] silo facility stands in contrast to the other FRAME subsystems due to its permanent or quasi-permanent nature, whereas most of the subsystems may be viewed as comprising modular "payloads" [3.1] or field-replaceable units that may interoperate with it. This is somewhat analogous to a fighter jet carrying fuel tanks which can be jettisoned, and which may therefore be viewed as part of the vehicle's payloads. The fuel tanks themselves are also active subsystems for at least as long as they are connected to the vehicle, and the vehicle and its fuel tanks have a symbiotic relationship in that they need each other to operate. In this analogy, the SUREFIRE silo is the vehicle, which may be viewed as "quasi-permanent" in that it will likely last much longer than a jettisoned fuel tank.

8. Other Facility-to-FRAME Interfaces

In a preferred embodiment which may not comprise a SUREFIRE environment, the FRAME system may be co-located with facilities using air conditioning or chilled water for cooling data-center-like heat loads. Such facilities may route the hot return air or hot return water directly into a stand-alone RUBE apparatus [3] or through heat exchangers into the STEER apparatus [2], so that the RUBE apparatus [3] may reject additional heat into the hot return side (increasing overall efficiency), rather than creating an additional load on the facility's cold supply side (details to follow).

In another preferred embodiment which may not comprise a SUREFIRE environment, the FRAME system may be co-located with facilities having roof access or other access to outside air, or having access to one or more ground-coupled heat exchange loops, or access to other external heat sinks. Such facilities may reject heat to the FRAME system in a manner akin to a water-side economizer while avoiding most or all of the energy cost associated with a conventional CWS or HVAC system (FRAME, and specifically, the RUBE apparatus [3], may reject its waste heat primarily via isothermal phase-change heat-transfer, which may be thermodynamically efficient since no compressor may be required).

Alternatively, where applicable, low-grade waste heat may also be put to good use in heating or preheating applications (e.g., hot water heating, snow removal, etc.). The waste heat temperature available from FRAME may be significantly higher (e.g., by 10° F. to 30° F. or more) than typical data center waste heat, and therefore may be potentially more useful.

8.1 Interfaces to Conventional Facility CWS (Chilled Water System)

The FRAME thermal exergy recuperation and management interfaces depicted here may enable integration with legacy thermal management and heat rejection systems commonly found in conventional (legacy) data centers and other commercial facilities, and thus may not be needed in preferred non-legacy configurations such as the previously described SUREFIRE Facility [7].

Figure 139:
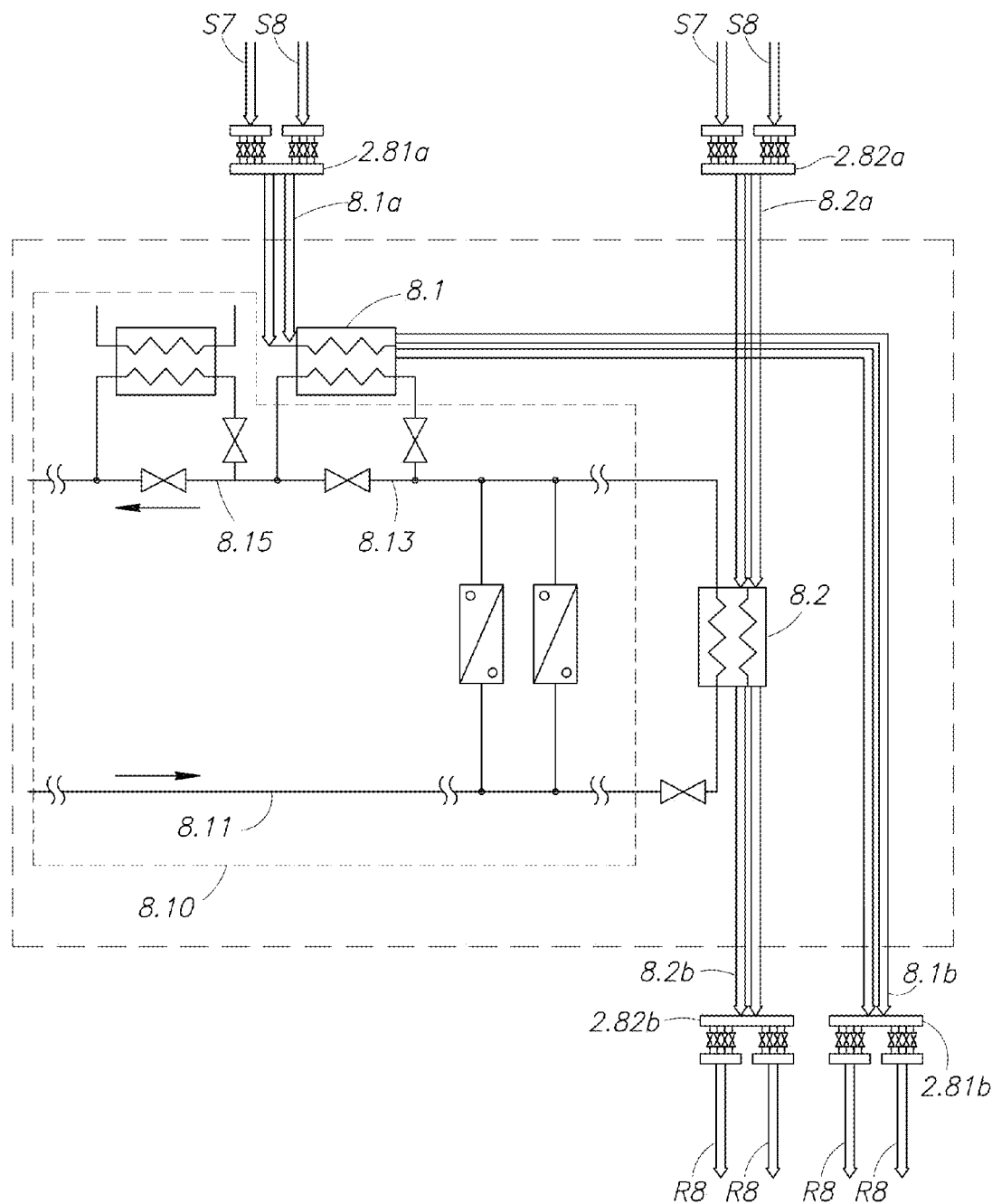
FIG. 139: Interface to Conventional Facility CWS (Chilled Water System)

As depicted in FIG. 139, the primary optional FRAME interface to a facility chilled water system (CWS) [10] may be via STEER Thermal Bus supply [2a] and return [2b], with ingress through digital mixer valves [2.81a] and [2.82a] to CWS heat exchangers [8.1] and [8.2], respectively, and with egress through digital splitter valves [2.81b] and [2.82b], respectively.

The CWS side of heat exchanger (HX) [8.1] may tap into the return (warm or hot side) of a facility's chilled water loop [8.13], and may reject additional heat to it before it actually branches [8.15] to any legacy CWS heat-rejection mechanisms (i.e., before flowing to the next stage of cooling, such as any combination of water-side economizers, cooling towers, chillers, and such).

Thus, the primary optional FRAME interface to a facility chilled water system (CWS) may be a heat exchanger [8.1] that may normally accept, as its cold input, the return water (typically up to 30° C. or 86° F., but possibly even warmer) that may have been already used to reject heat from servers and other equipment, and may normally be returned directly to the CWS heat-rejection mechanism at [8.15]. Instead, however, FRAME may transfer additional heat energy to this return water via the CWS side of heat exchanger [8.1], which may thereby further increase the return water's temperature and improve the efficiency of any downstream CWS heat-rejection mechanisms at [8.15].

In a preferred embodiment, the primary optional FRAME interface may implement a liquid-to-two-phase-fluid heat exchanger [8.1], that, depending on the dynamic variables involved (e.g., absolute and relative temperatures of the working fluids, flow rates, pressures) may or may not serve as a condenser, but in any case may transfer thermal exergy between FRAME and the CWS, under system control. The FRAME side inlet [8.1a] of heat exchanger [8.1] may circulate a RUBE™ LT2 ("low-temperature") working fluid, which may be an engineered phase-change fluid that is dielectric and chemically inert, with zero or minimal ODP (ozone depletion potential) and GWP (global warming potential), and with a boiling point that may be within the normal operating temperature ranges of electronics, and which therefore may provide the advantages of isothermal exergy transfer from the electronics or other cooled devices to the fluid. RUBE™ LT2 fluids may be placed in direct contact with electronics without short-circuit or corrosion issues. In practice, the preferred RUBE™ LT2 fluid for direct contact with electronics may be selected from among those with lower boiling points than the other RUBE™ dielectric fluids, so that electronics may be isothermally cooled to a lower temperature without increasing the parasitic energy losses. Lower operating temperatures mean that CPUs and memory may never thermally "throttle" as may commonly occur with air cooling.

In a preferred embodiment, the boiling points of the RUBE™ LT2 fluid may be further lowered in accordance with the laws of thermodynamics by reducing the system operating pressure on the FRAME side [8.1a] of heat exchanger [8.1], and this may be particularly advantageous when the return water at the tap-in point [8.13] is not at the upper end of its range, since it may allow the electronics cooled by the FRAME side path [8.1a] [8.1b] of the heat exchanger [8.1] to be operated at still lower temperatures with no loss of cooling efficiency. In terms of heat rejection, since even the warmest return water [8.13] from a chilled water system may typically be well below the normal boiling point of RUBE™ LT2 fluid (about 34° C. at STP), very efficient isothermal exergy transfer may occur since heat may be easily rejected to the return water at heat exchanger [8.1] (i.e., such heat rejection may not require chilled water). In a preferred embodiment, the boiling points of RUBE™ LT2 fluids may also be further raised in accordance with the laws of thermodynamics by increasing the system operating pressure on the FRAME side [8.1a] of heat exchanger [8.1], and this may be particularly advantageous if the CWS return water [8.13] temperatures were to be significantly elevated (e.g., above the normal or then-current boiling point of the phase-change working fluid at the FRAME side path [8.1a] [8.1b] of heat exchanger [8.1]), because isothermal heat rejection may still be enabled, with only minor increases in the operating temperature of the electronics or other devices being cooled by the FRAME side of the heat exchanger [8.1]. Conversely, the boiling points of RUBE™ LT2 fluids may also be further lowered in accordance with the laws of thermodynamics by decreasing the system operating pressure on the FRAME side [8.1a] of heat exchanger [8.1], and this may be particularly advantageous if the CWS return water [8.13] temperatures were to be significantly reduced (e.g., well below the normal or then-current boiling point of the phase-change working fluid at the FRAME side path [8.1a] [8.1b] of heat exchanger [8.1]).

In a preferred embodiment, the working fluid temperatures and pressures at the FRAME side inlet [8.1a] of heat exchanger [8.1] may be dynamically controlled by FRAME's control system. In particular, the set of digital valves [2.81a] (and also [2.81b], to the extent it may serve as a downstream throttle) may be configured so as to control, for example, the mix and rates of working fluids flowing to the inlet of heat exchanger [8.1]. In the example depicted, the dynamically determined mix may consist of a percentage of phase-change working fluid nominally in the 20° C. to 34° C. and another percentage in the 34° C. to 40° C. range (and either percentage may be zero), as needed to achieve the desired thermodynamic, stability, and energy management goals of the system. Likewise, the set of digital valves [2.82a] (and also [2.82b], to the extent it may serve as a downstream throttle) may be configured so as to control, for example, the mix and rates of working fluids flowing to the inlet of heat exchanger [8.2], but typically with different temperature ranges and operating pressures.

In a preferred embodiment, the set of digital valves [2.82a] [2.82b] may be dynamically configured, for example, to cause a load on the CWS by deriving cooling from CWS heat exchanger [8.2], or to relieve the load on the CWS by providing cooling to CWS heat exchanger [8.2], or to be transparent to the CWS by inducing no thermal effect on CWS heat exchanger [8.2].

The invention claimed is:

1. A silo for housing and implementing high-density infrastructure and electronics for a data center underground, the silo comprising:
   a cylindrical outer sleeve;
   an inner cylinder contained within the cylindrical outer sleeve, the inner cylinder comprising a plurality of doughnut-shaped levels, each level comprising one or more blind-mate couplers for receiving one or more field replaceable units, each field replaceable unit comprising electronics and/or infrastructure for a data center; and
   automated handling equipment situated within the cylindrical outer sleeve, the automated handling equipment configured to insert or remove a field replaceable unit through vertical motion within the holes formed by the doughnut-shaped levels and rotational and horizontal motion at a particular level.

2. The silo of claim 1, wherein the automated handling equipment is capable of reaching into an above-ground vehicle to retrieve or insert a field replaceable unit.

3. The silo of claim 1, further comprising one or more field replaceable units removably coupled to one or more of the blind-mate couplers.

4. The silo of claim 3, wherein at least one of the field replaceable units includes a pressure vessel that encloses a condensing mechanism and one or more heat dissipating components in intimate contact with a dielectric phase-change fluid for cooling the one or more heat dissipating components.

5. The silo of claim 4, wherein the one or more heat dissipating components are cooled via isothermal heat exchange with the dielectric phase-change fluid which causes nucleate boiling of the dielectric phase-change fluid.

6. The silo of claim 4, wherein all or part of a surface of at least one of the heat dissipating components comprises a thermally conductive and electrically non-conductive diamond-based coating which increases nucleation sites and aids in transferring heat from the at least one heat dissipating component to the dielectric phase-change fluid.

7. The silo of claim 6, wherein the diamond-based coating on all or part of a surface of at least one of the heat dissipating components having been at least partially created through a photolithographic process that comprises applying a positive photoresist to a substrate of the at least one of the heat dissipating components, dusting the substrate with a diamond powder, followed by exposure to UV light, developing and rinsing the photoresist, and baking.

8. The silo of claim 3, wherein at least one of the field replaceable units comprises a local power source or a prime mover, a prime mover being a machine that transforms energy to useful work or to one or more alternative useful forms of energy.

9. The silo of claim 3, wherein at least one of the field replaceable units comprises one or more turboalternators configured to convert exergy in a working fluid to electrical power, each turboalternator comprising:
   an inlet to receive a superheated vapor stream comprising a working fluid having particular pressure and a particular temperature;

a heat engine to recuperate heat or pressure energy from the vapor stream received at the inlet port;

an electrical power generator to generate electrical power from the recuperated pressure or heat energy; and an outlet to output superheated vapor stream having a pressure lower than the particular pressure or a temperature lower than the particular temperature.

10. The silo of claim 3, wherein at least one of the field replaceable units comprises one or more components configured to capture excess or electrical energy from one or more sources and store the captured energy for use during peak periods or as auxiliary energy.

11. The silo of claim 3, at least one of the field replaceable units comprising a sorption chiller to store and retrieve exergy from alternating sorption and desorption cycles, the sorption chiller configured to receive exergy inputs and to return exergy outputs via one or more of the blind-mate couplers.

12. The silo of claim 1, further comprising a plumbing subsystem to carry one or more phase-change fluids through the silo, the plumbing system configured to interact with one or more thermal interfaces to enable the one or more phase-change fluids to isothermally reject heat directly or indirectly to an ambient environment, the one or more thermal interfaces being an air-coupled heat exchanger, a ground-coupled heat exchanger, a heat exchange loop connected to an air-coupled heat exchanger, or heat exchange loop connected to a ground-coupled heat exchanger.

13. The silo of claim 12, wherein at least one of the thermal interfaces is a ground-coupled heat exchanger comprising a vertically oriented pipe thermally grouted into one or more boreholes.

14. The silo of claim 12, wherein at least one of the thermal interfaces is a counterflow ground-coupled heat exchanger comprising a vertically oriented concentric pipe pair.

15. The silo of claim 1, wherein the cylindrical outer sleeve comprises one or more openings, and the silo further comprises one or more conduits installed in one or more of the openings of the cylindrical sleeve for connecting the silo to another silo.

* * * * *